(12) United States Patent
Roper et al.

(10) Patent No.: US 11,023,055 B2
(45) Date of Patent: Jun. 1, 2021

(54) DEVICES, METHODS, AND GRAPHICAL USER INTERFACES FOR AN ELECTRONIC DEVICE INTERACTING WITH A STYLUS

(71) Applicant: Apple Inc., Cupertino, CA (US)

(72) Inventors: Gemma A. Roper, San Francisco, CA (US); Stephen O. Lemay, Palo Alto, CA (US); Arian Behzadi, San Francisco, CA (US); Parthiban Mohanraj, Milpitas, CA (US); Tiffany S. Jon, Cupertino, CA (US); Robert Garcia, III, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/417,214

(22) Filed: May 20, 2019

(65) Prior Publication Data

US 2019/0369755 A1 Dec. 5, 2019

Related U.S. Application Data

(60) Provisional application No. 62/679,461, filed on Jun. 1, 2018, provisional application No. 62/729,869, filed on Sep. 11, 2018.

(51) Int. Cl.
*G06F 3/0354* (2013.01)
*G06F 3/0482* (2013.01)
(Continued)

(52) U.S. Cl.
CPC .......... *G06F 3/03545* (2013.01); *G06F 3/038* (2013.01); *G06F 3/03547* (2013.01);
(Continued)

(58) Field of Classification Search
CPC .. G06F 9/453; G06F 3/03545; G06F 3/04162; G06F 3/03547; G06F 3/038;
(Continued)

(56) References Cited

U.S. PATENT DOCUMENTS

| 2014/0055427 A1* | 2/2014 | Kim ...................... G06F 3/0488 345/179 |
| 2015/0363035 A1* | 12/2015 | Hinckley .............. G06F 3/0416 345/173 |
| 2018/0239444 A1* | 8/2018 | Siddiqui ............... G06F 1/3212 |

OTHER PUBLICATIONS

Anonymous, "How to re-map the S-Pen Button and Insert/Remove to do Anything on the device. : galaxynote4," May 28, 2016, Retrieved from the Internet on Sep. 13, 2019: https://www.reddit.com/r/galaxynote4/comments/4ju5lh/how_to_remap_the_spen_button_and_insertremove_to/, pp. 1-6.

(Continued)

*Primary Examiner* — Robert J Michaud
(74) *Attorney, Agent, or Firm* — Fernando & Partners, LLP; Bejan Hafezzadeh

(57) ABSTRACT

In accordance with some embodiments, a method is performed at an electronic device. The method includes in response to detecting that the stylus is proximate to the electronic device, pairing the electronic device with the stylus. The method includes in response to pairing the stylus with the electronic device: displaying, on the display, a first representation of a first gesture performed on the stylus; obtaining finger manipulation data from the stylus via the communication interface, wherein the finger manipulation data indicates a finger manipulation input received by the stylus; and in response to obtaining the finger manipulation data, displaying, on the display, a second representation of a second gesture performed on the stylus corresponding to the finger manipulation input received by the stylus.

20 Claims, 207 Drawing Sheets

(51) Int. Cl.
  *G06F 3/038* (2013.01)
  *G06F 9/451* (2018.01)
  *G06F 3/041* (2006.01)
  *G06F 3/0488* (2013.01)
  *G06F 3/14* (2006.01)
(52) U.S. Cl.
  CPC ........ *G06F 3/0482* (2013.01); *G06F 3/04162* (2019.05); *G06F 3/04883* (2013.01); *G06F 3/14* (2013.01); *G06F 9/453* (2018.02); *G06F 2203/0381* (2013.01); *G06F 2203/04807* (2013.01)
(58) Field of Classification Search
  CPC .... G06F 3/0482; G06F 3/048883; G06F 3/14; G06F 2203/0381; G06F 2203/04807
  See application file for complete search history.

(56) References Cited

OTHER PUBLICATIONS

PCT International Search Report and Written Opinion dated Nov. 18, 2019, International Application No. PCT/US2019/034524, pp. 1-27.

\* cited by examiner

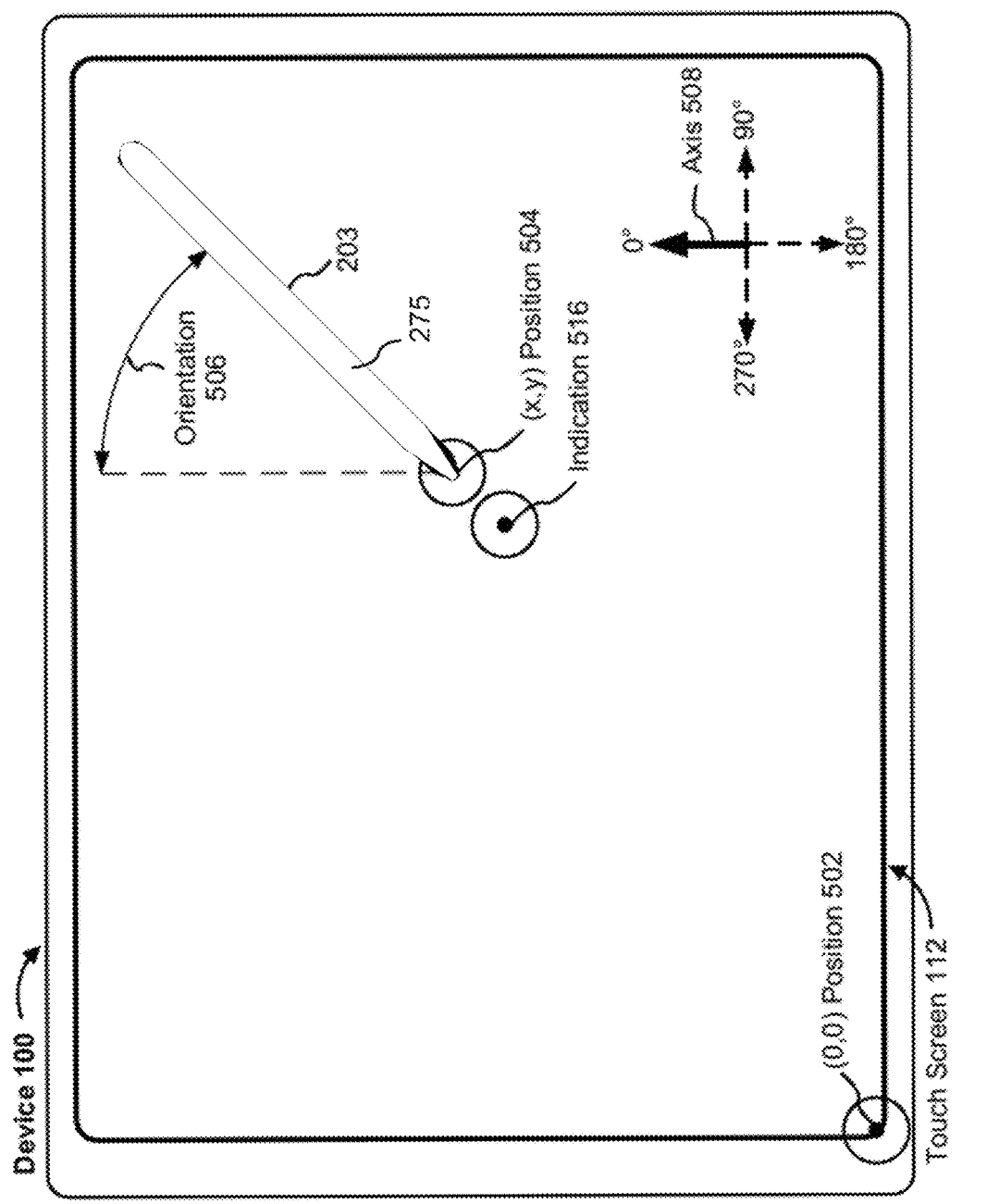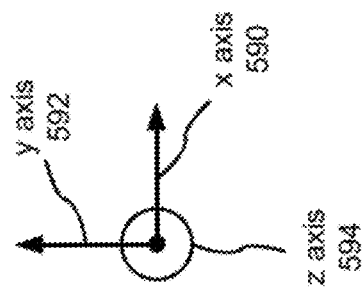
Figure 5A

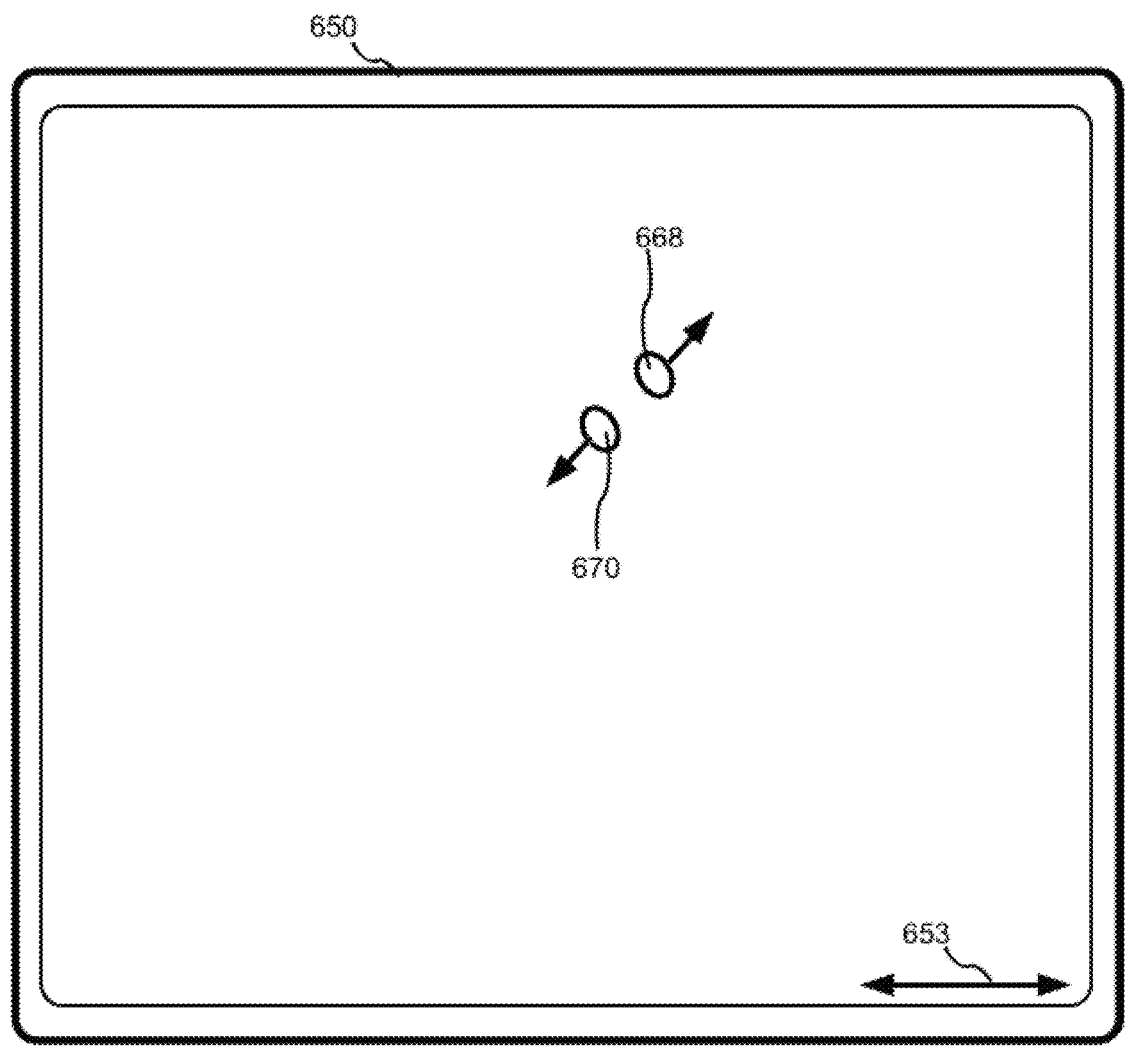
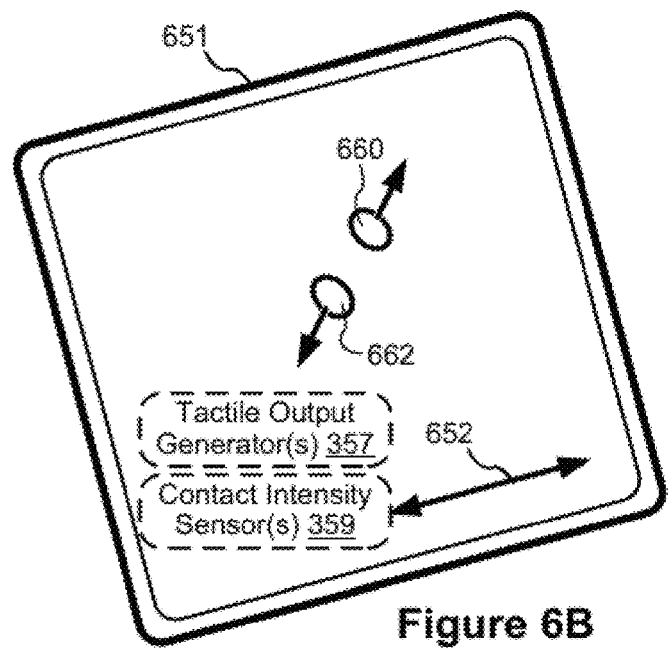
Figure 6B

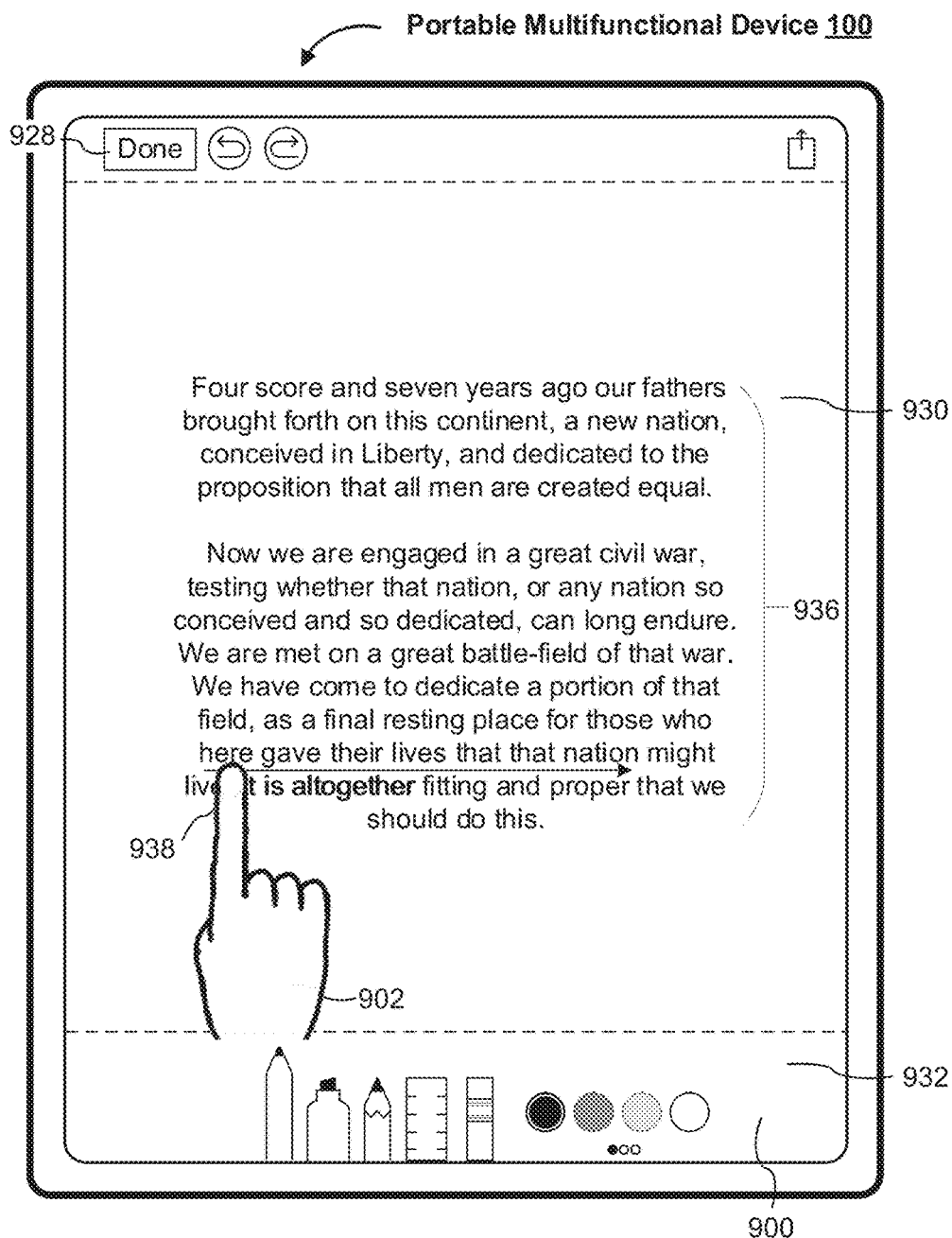
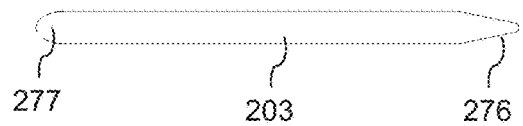
Figure 9N

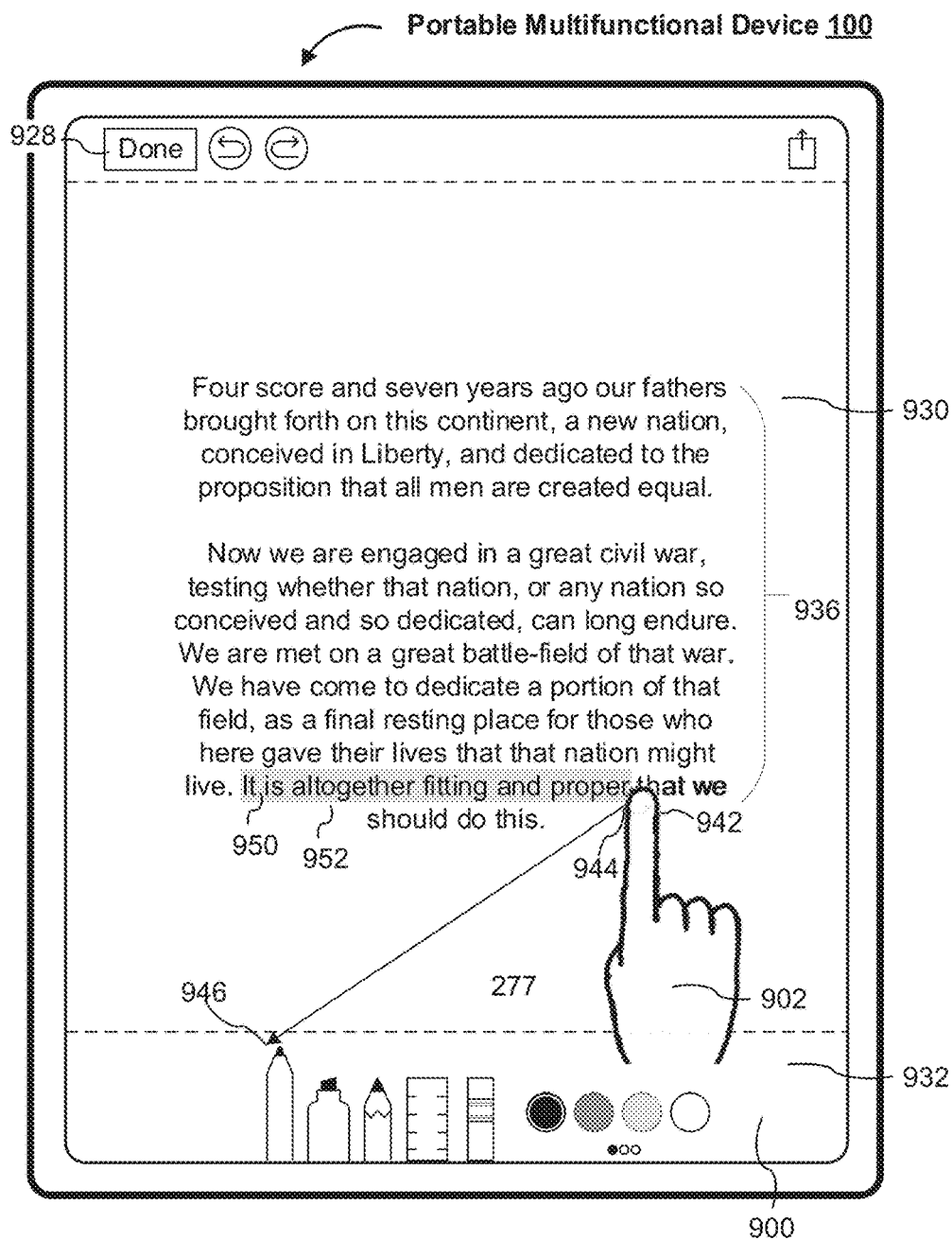
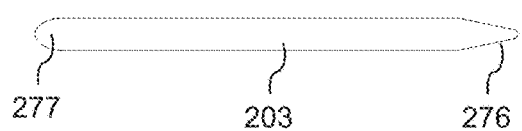
Figure 9O

1400

At an electronic device with one or more processors, a non-transitory memory, a touch-sensitive surface, a display, and a communication interface provided to communicate with a stylus: ⎯ 1402

While the electronic device is in a first state, obtain, at the electronic device, information about a current state of the stylus via the communication interface

| The electronic device operates in an inactive mode while the electronic device is in the first state | ⎯ 1404

| While the electronic device is in the first state, display, on the display, a first interface | ⎯ 1406

| At least a portion of the information about the current state of the stylus corresponds to touch sensor data from one or more touch sensors on the stylus | ⎯ 1408

In accordance with a determination, based on the information about the current state of the stylus, that a user is holding the stylus, display, on the display, a visual indication that the electronic device is in a second state that is different from the first state ⎯ 1410

| The electronic device operates in an active mode while the electronic device is in the second state | ⎯ 1412

| While the electronic device is in the second state, display, on the display, a second interface different from the first interface and the visual indication that the electronic device is in the second state | ⎯ 1414

| The visual indication corresponds to a drawing canvas associated with a drawing application | ⎯ 1416

| The visual indication corresponds to an application icon associated with a drawing application | ⎯ 1418

| Display, on the display, a drawing application interface; and Cease to display, on the display, one or more user interface elements associated with the drawing application interface | ⎯ 1420

| The visual indication corresponds to a first markup tool, wherein the first markup tool is the current active markup tool | ⎯ 1422

Figure 14A

1424 — In accordance with a determination that the user is not holding the stylus, maintain the electronic device in the first state 1426 — Display, on the display, a drawing application interface; and
Display, on the display, one or more user interface elements associated with the drawing application interface

1428 — While the electronic device is in the second state, obtain, at the electronic device, updated information about the current state of the stylus via the communication interface, wherein the updated information indicates that the user is no longer holding the stylus; and In response to obtaining the updated information:

Cease to display, on the display, the second interface and the visual indication; and Redisplay, on the display, the first interface

1430 — While the electronic device is in the second state, obtain first finger manipulation data from the stylus via the communication interface, wherein the first finger manipulation data characterizes one or more finger manipulation inputs received at the stylus; and In response to obtaining the first finger manipulation data:

Change the current active markup tool to a second markup tool; and

Update the visual indication to correspond to the second markup tool

Figure 14B

```
While the electronic device is in the second state, obtain first finger
manipulation data from the stylus via the communication interface, wherein the first    ⌐ 1432
finger manipulation data characterizes an upward swipe gesture received on the
stylus; and In response to obtaining the first finger manipulation data, display, on the
display, a color palette adjacent to the visual indication
```

```
While the electronic device is in the second state, obtain second finger
manipulation data from the stylus via the communication interface, wherein the          ⌐ 1434
second finger manipulation data characterizes a rotational gesture received at the
stylus; and In response to obtaining the second finger manipulation data:
        Change a color associated with the current active markup tool; and
        Update the visual indication to correspond to the color
```

```
While the electronic device is in the second state, obtain third finger
manipulation data from the stylus via the communication interface, wherein the third    ⌐ 1436
finger manipulation data characterizes a downward swipe gesture received at the
stylus; and In response to obtaining the third finger manipulation data, remove display of
the color palette on the display
```

```
┌─────────────────────────────────────────────────────────────────────┐
│ At an electronic device with one or more processors, a non-transitory memory, a │─ 1502
│ touch-sensitive surface, a display, and a communication interface provided to │
│ communicate with a stylus:                                          │
│     Detect an input, from the stylus, on the touch-sensitive surface of the │
│ electronic device                                                   │
└─────────────────────────────────────────────────────────────────────┘
                                  ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│     Obtain sensor data from the stylus; and                         │─ 1504
│     Determine, based on the sensor data from the stylus, a grip arrangement │
│ characterizing a manipulation of the stylus by a user, wherein the grip arrangement is │
│ determined during detection of the input                            │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │─ 1506
│  │  The grip arrangement is determined based on at least one of a gripe style, a │ │
│  │    grip location, or orientation of the stylus relative to a frame of reference │ │
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │─ 1508
│  │ At least a portion of the sensor data corresponds to touch sensor data obtained │ │
│  │                from one or more touch sensors on the stylus     │ │
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
                                 (A)
                                  ▼
┌─────────────────────────────────────────────────────────────────────┐
│ In response to detecting the input, and in accordance with a determination that the │─ 1510
│ stylus is being held according to a first grip arrangement, wherein the first grip │
│ arrangement of the stylus is determined based at least in part on sensor data │
│ detected by the stylus, make a first change to content displayed on the display │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │─ 1512
│  │ Making the first change includes displaying a first user element based on a first │ │
│  │       markup tool that corresponds to the first grip arrangement │ │
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │─ 1514
│  │  Making the first change includes changing an existing mark displayed on the │ │
│  │     display based on a first markup tool that corresponds to the first grip │ │
│  │                         arrangement                             │ │
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │       The first grip arrangement is detected based on the stylus being │ │─ 1516
│  │  detected in a right-side-up orientation of the stylus and touch inputs being │ │
│  │           detected near a first end of the stylus, and          │ │
│  │      Making the first change includes displaying a stroke on the display │ │
│  │      based on a writing tool that corresponds to the first grip arrangement │ │
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
└─────────────────────────────────────────────────────────────────────┘
```

Figure 15A

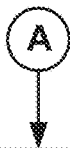

```
┌──────────────────────────────────────────────────────────────────┐
│ In response to detecting the input, and in accordance with a determination that the │─ 1518
│ stylus is being held according to a second grip arrangement different from the first │
│ grip arrangement, wherein the second grip arrangement of the stylus is determined │
│ based at least in part on sensor data detected by the stylus, make a second change │
│ to the content displayed on the display, wherein the second change to the content │
│ displayed on the display is different from the first change to the content displayed on │
│ the display │
│ ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│ │ Making the second change includes displaying a second user element based │ │─ 1520
│ │ on a second markup tool that corresponds to the second grip arrangement │ │
│ └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
│ ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│ │ Making the second change includes changing the existing mark displayed on │ │─ 1522
│ │ the display based on a second markup tool that corresponds to the second grip │ │
│ │ arrangement │ │
│ └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
│ ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │─ 1524
│ │ The second grip arrangement is detected based on the stylus being │ │
│ │ detected in an upside-down orientation of the stylus and touch inputs being │ │
│ │ detected near a second end of the stylus different from the first end of the │ │
│ │ stylus; and │ │
│ │ Making the second change includes removing an existing mark │ │
│ │ displayed on the display based on an erasing tool that corresponds to the │ │
│ │ second grip arrangement │ │
│ └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
│ ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │─ 1526
│ │ The second grip arrangement is detected based on the stylus being │ │
│ │ detected in a right-side up orientation of the stylus and touch inputs being │ │
│ │ detected near a second end of the stylus, and │ │
│ │ Making the second change includes displaying a stroke based on a │ │
│ │ painting tool that corresponds to the first grip arrangement. │ │
│ └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
│ ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │─ 1528
│ │ The second grip arrangement is detected based on the stylus being │ │
│ │ detected in an upside-down orientation of the stylus and touch inputs being │ │
│ │ detected near the first end of the stylus, and │ │
│ │ Making the second change includes changing an existing mark │ │
│ │ displayed on the display based on a smudge tool that corresponds to the │ │
│ │ second grip arrangement │ │
│ └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
└──────────────────────────────────────────────────────────────────┘
```

```
At an electronic device with one or more processors, a non-transitory memory, a    ┌─ 1602
touch-sensitive surface, a display, and a communication interface provided to
communicate with a stylus:
    Detect a touch input on the touch-sensitive surface; and
    ┌─ ── ── ── ── ── ── ── ── ── ── ── ── ── ── ── ── ── ── ── ── ── ┐
    │ Obtaining sensor data from the stylus via the communication interface, wherein │─ 1604
    │ at least a portion of the sensor data corresponds to touch sensor data from one │
    │             or more touch sensors on the stylus                                 │
    └─ ── ── ── ── ── ── ── ── ── ── ── ── ── ── ── ── ── ── ── ── ── ┘
```

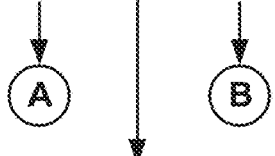

In response to detecting the touch input on the touch sensitive surface:  ─ 1606
    In accordance with a determination that sensor data obtained from the
stylus via the communication interface indicates that the stylus is being held by a
user, perform a first operation in response to the touch input
    ┌─ ── ── ── ── ── ── ── ── ── ── ── ── ── ── ── ── ── ── ── ── ┐
    │ Performing the first operation includes modifying one or more preexisting user │─ 1608
    │             interface elements displayed on the display                        │
    └─ ── ── ── ── ── ── ── ── ── ── ── ── ── ── ── ── ── ── ── ── ┘

┌─ ── ── ── ── ── ── ── ── ── ── ── ── ── ── ── ── ── ── ── ── ── ── ┐
│     In accordance with a determination that sensor data obtained from the stylus  │─ 1610
│ via the communication interface indicates that the stylus is being held by the user with │
│ a different hand than the one that corresponds to the touch input, perform the second │
│ operation in response to the touch input                                              │
└─ ── ── ── ── ── ── ── ── ── ── ── ── ── ── ── ── ── ── ── ── ── ── ┘

In response to detecting the touch input on the touch sensitive surface:  ─ 1612
    In accordance with a determination that the stylus is not being held by
the user, perform a second operation in response to the touch input, wherein the
second operation is different from the first operation
    ┌─ ── ── ── ── ── ── ── ── ── ── ── ── ── ── ── ── ── ── ── ── ┐
    │ Determining that the stylus is not being held by the user includes detecting an │─ 1614
    │             absence of sensor data from the stylus                              │
    └─ ── ── ── ── ── ── ── ── ── ── ── ── ── ── ── ── ── ── ── ── ┘
    ┌─ ── ── ── ── ── ── ── ── ── ── ── ── ── ── ── ── ── ── ── ── ┐
    │ Performing the second operation includes displaying one or more user interface │─ 1616
    │             elements on the display                                            │
    └─ ── ── ── ── ── ── ── ── ── ── ── ── ── ── ── ── ── ── ── ── ┘
    ┌─ ── ── ── ── ── ── ── ── ── ── ── ── ── ── ── ── ── ── ── ── ┐
    │ Performing the second operation includes navigating within a user interface    │─ 1618
    │             displayed on the display                                           │
    └─ ── ── ── ── ── ── ── ── ── ── ── ── ── ── ── ── ── ── ── ── ┘

```
At an electronic device with one or more processors, a non-transitory memory, a      ~1702
touch-sensitive surface, a display, and a communication interface provided to
communicate with a stylus:

While displaying a plurality of user interface elements on the display, obtaining
finger manipulation data from the stylus via the communication interface, wherein the
finger manipulation data includes information about one or more finger manipulation
inputs received by the stylus ┌─────────────────────────────────────────────────────────────────────┐
    │  At least a portion of the finger manipulation data corresponds to touch sensor  ~1704
    │                  data from one or more touch sensors on the stylus
    └─────────────────────────────────────────────────────────────────────┘

┌─────────────────────────────────────────────────────────────────────┐
    │ Displaying a drawing application interface that includes a canvas with a plurality  ~1706
    │ of preexisting marks displayed in response to previous inputs, from the stylus,
    │ detected on the touch-sensitive surface of the electronic device
    │   ┌─────────────────────────────────────────────────────────────┐
    │   │  The plurality of the user interface elements correspond to a subset of the  ~1708
    │   │          plurality of preexisting marks selected by the user.
    │   └─────────────────────────────────────────────────────────────┘
    │   ┌─────────────────────────────────────────────────────────────┐
    │   │  The plurality of the user interface elements correspond to a subset of the  ~1710
    │   │      plurality of the preexisting marks selected based on a location of the
    │   │    stylus relative to the electronic device during detection of the one or more
    │   │                         finger manipulation inputs.
    │   └─────────────────────────────────────────────────────────────┘
    └─────────────────────────────────────────────────────────────────────┘
```

(A)

```
    In response to detecting the finger manipulation data and in accordance with a
determination that the finger manipulation data indicates a first finger manipulation    ~1712
input on the stylus, performing a first operation on at least a subset of the plurality of
the user interface elements ┌─────────────────────────────────────────────────────────────────────┐
    │  The first finger manipulation input corresponds to a first gesture type detected  ~1714
    │                              on the stylus.
    └─────────────────────────────────────────────────────────────────────┘

┌─────────────────────────────────────────────────────────────────────┐
    │  The first finger manipulation input corresponds to a first direction of movement  ~1716
    │      of one or more fingers relative to a touch-sensitive surface of the stylus.
    └─────────────────────────────────────────────────────────────────────┘
```

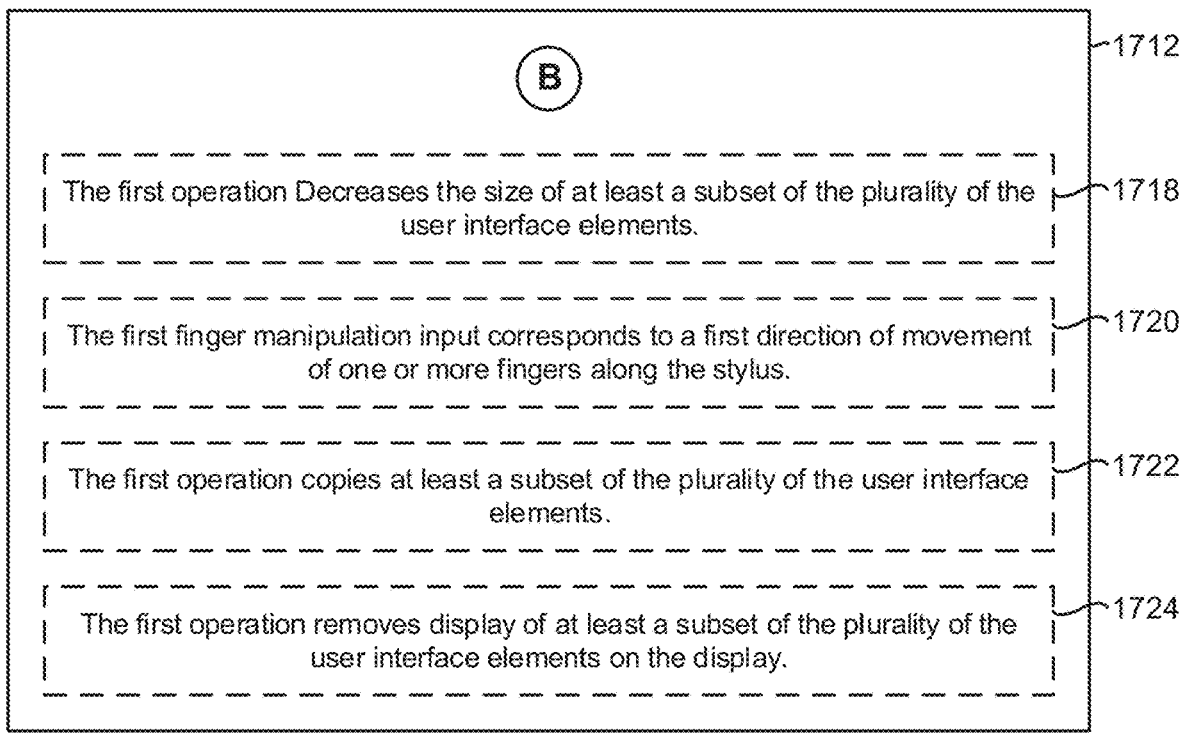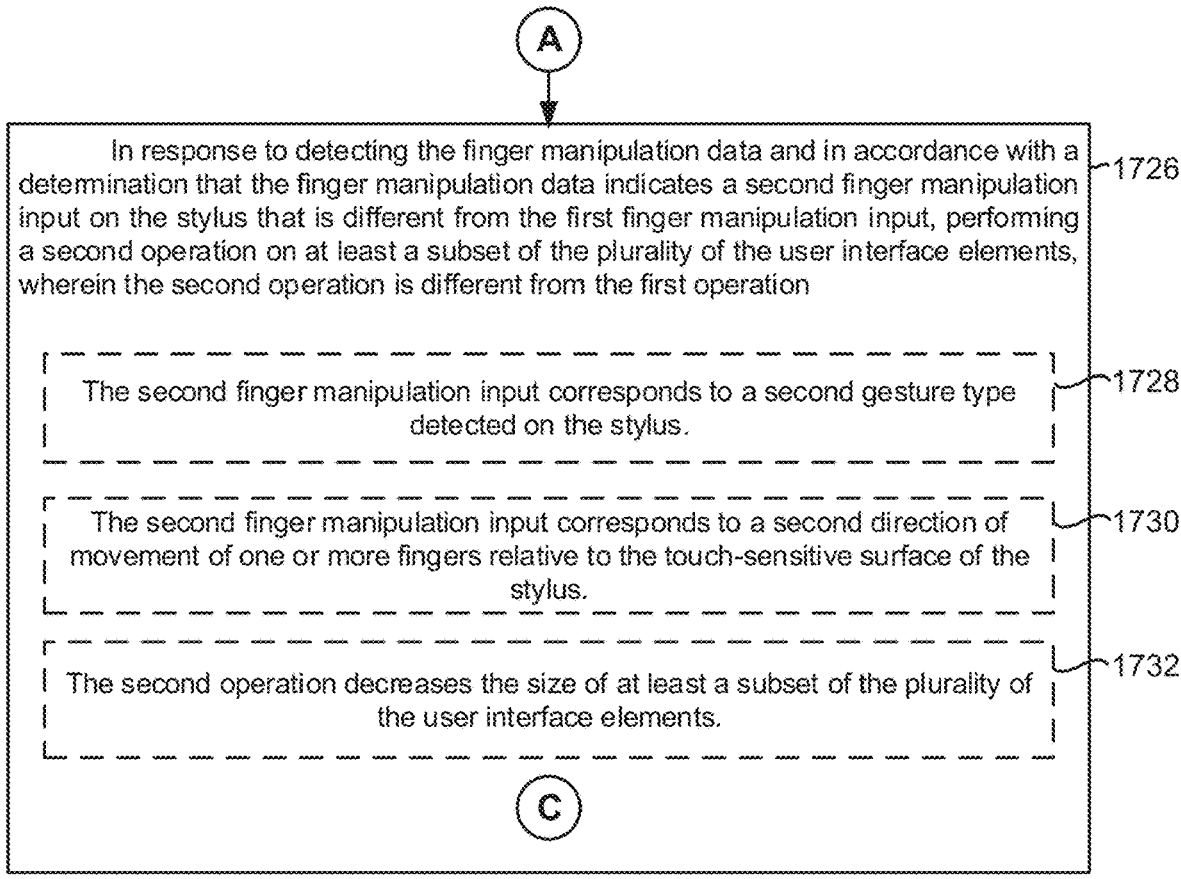
Figure 17B

1800

At an electronic device with one or more processors, a non-transitory memory, a touch-sensitive surface, a display, and a communication interface provided to communicate with a stylus: — 1802

Displaying, on the display, a selection user interface including a plurality of selectable items, wherein a first item among the plurality of selectable items is currently selected within the selection user interface > The selection user interface includes a radial menu. — 1804

> The plurality of selectable items in the selection user interface includes one or more representations of markup tools. — 1806

> The plurality of selectable items in the selection user interface includes a plurality of colors. — 1808

> The plurality of selectable items in the selection user interface includes a menu of representations of content. — 1810

Obtaining finger manipulation data from the stylus via the communication interface, wherein the finger manipulation data includes information about one or more finger manipulation inputs received at the stylus. — 1812

> At least a portion of the finger manipulation data corresponds to touch sensor data from one or more touch sensors on the stylus. — 1814

>> The touch sensor data indicates movement of one or more fingers along a touch-sensitive surface of the stylus. — 1816

| | |
|---|---|
| In response to obtaining the finger manipulation data:<br><br>    in accordance with a determination that the finger manipulation data satisfies a navigation criterion, changing display of the selection user interface in order to indicate movement of focus to a second item among the plurality of selectable items. | 1818 |
| The movement of focus corresponds to a direction of the movement of the one or more fingers along the touch-sensitive surface of the stylus. | 1820 |
| The second item is selected from the selection user interface in response to pausing movement of the one or more fingers along the touch-sensitive surface of the stylus for a predetermined duration while the second item has focus. | 1822 |
| The second item is selected from the selection user interface in response to obtaining second finger manipulation data indicating a tap input on the stylus while the second item has focus. | 1824 |

| | |
|---|---|
| In response to obtaining the finger manipulation data:<br><br>    in accordance with a determination that the finger manipulation data does not satisfy the navigation criterion, maintaining display of the selection user interface, wherein the first item among the plurality of selectable items currently has focus within the selection user interface. | 1826 |

| At an electronic device with one or more processors, a non-transitory memory, a touch-sensitive display, and a communication interface provided to communicate with a stylus: — 1902
Obtain input data from the stylus via the communication interface corresponding to an input detected at the stylus |

> The input corresponds to a tap input detected via one or more touch sensors on the stylus — 1904

> The input corresponds to a shake input detected via one or more accelerometers in the stylus — 1906

> Obtaining the input data occurs while the stylus is over a first portion of the touch-sensitive display — 1908

In response to obtaining the input data from the stylus:
In accordance with a determination that a distance between the stylus and the touch-sensitive display satisfies a first distance threshold when the input was detected at the stylus, display a first user interface element that corresponds to the input — 1910

> A dispersion pattern of the first user interface element is based on the distance between the stylus and the touch-sensitive display — 1912

> One or more physical properties of the first user interface element are based on the distance between the stylus and the touch-sensitive display — 1914

> The first user interface element corresponds to a bullet point displayed within an application interface — 1916

> The first user interface element corresponds to a paint blob displayed within an application interface — 1918

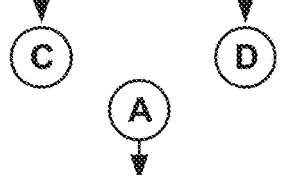

In response to obtaining the input data from the stylus:
In accordance with a determination that the distance between the stylus and the touch-sensitive display satisfies a second distance threshold when the input was detected at the stylus, forgo displaying the first user interface element that corresponds to the input — 1920

Figure 19A

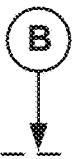

- Determining the distance between the stylus and the touch-sensitive display — 1922
  - The distance between the stylus and the touch-sensitive display is determined based on data obtained from one or more sensors of the electronic device — 1924
  - The distance between the stylus and the touch-sensitive display is determined based at least in part on data obtained from the stylus — 1926

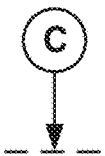

- The first user interface element corresponds to a selection user interface overlaid on an interface, the selection user interface including a plurality of selectable items, wherein a first item among the plurality of selectable items is currently selected within the selection user interface — 1928

- Obtain finger manipulation data received from the stylus, wherein the finger manipulation data characterizes one or more finger manipulation inputs received at the stylus; and
  In response to obtaining the finger manipulation data:
    In accordance with a determination that the finger manipulation data satisfies a navigation criterion, change display of the selection user interface in order to indicate movement of focus to a second item among the plurality of selectable items; and
    In accordance with a determination that the finger manipulation data does not satisfy the navigation criterion, maintaining display of the selection user interface, wherein the first item among the plurality of selectable items currently has focus within the selection user interface — 1930
  - The second item is selected from the selection user interface in response to pausing movement of the stylus relative to the user's fingers for a predetermined duration while the second item is in focus — 1932
  - The second item is selected from the selection user interface in response to obtaining second finger manipulation data indicating a tap input on the stylus while the second item is in focus — 1934

Figure 19B

> While displaying the first user interface element that corresponds to the input at a first location that corresponds to the first potion of the touch-sensitive display:
>
>     Obtain second input data from the stylus via the communication interface corresponding to a second input detected at the stylus while the stylus was over a second portion of the touch-sensitive display; and
>
>     In response to obtaining the second input data:
>
>         In accordance with the determination that the distance between the stylus and the touch-sensitive display satisfies the first distance threshold when the input was detected at the stylus, display the first user interface element that corresponds to the second input at a second location that corresponds to the second portion of the touch-sensitive display that the stylus was over when the second input was detected at the stylus; and
>
>         In accordance with the determination that the distance between the stylus and the touch-sensitive display satisfies the second distance threshold when the input was detected at the stylus, forgo displaying the first user interface element that corresponds to the second input

1936

>         In accordance with the determination that the distance between the stylus and the touch-sensitive display satisfies the second distance threshold when the input was detected at the stylus, display a second user interface element that corresponds to the input, wherein the second user interface element is different from the first user interface element

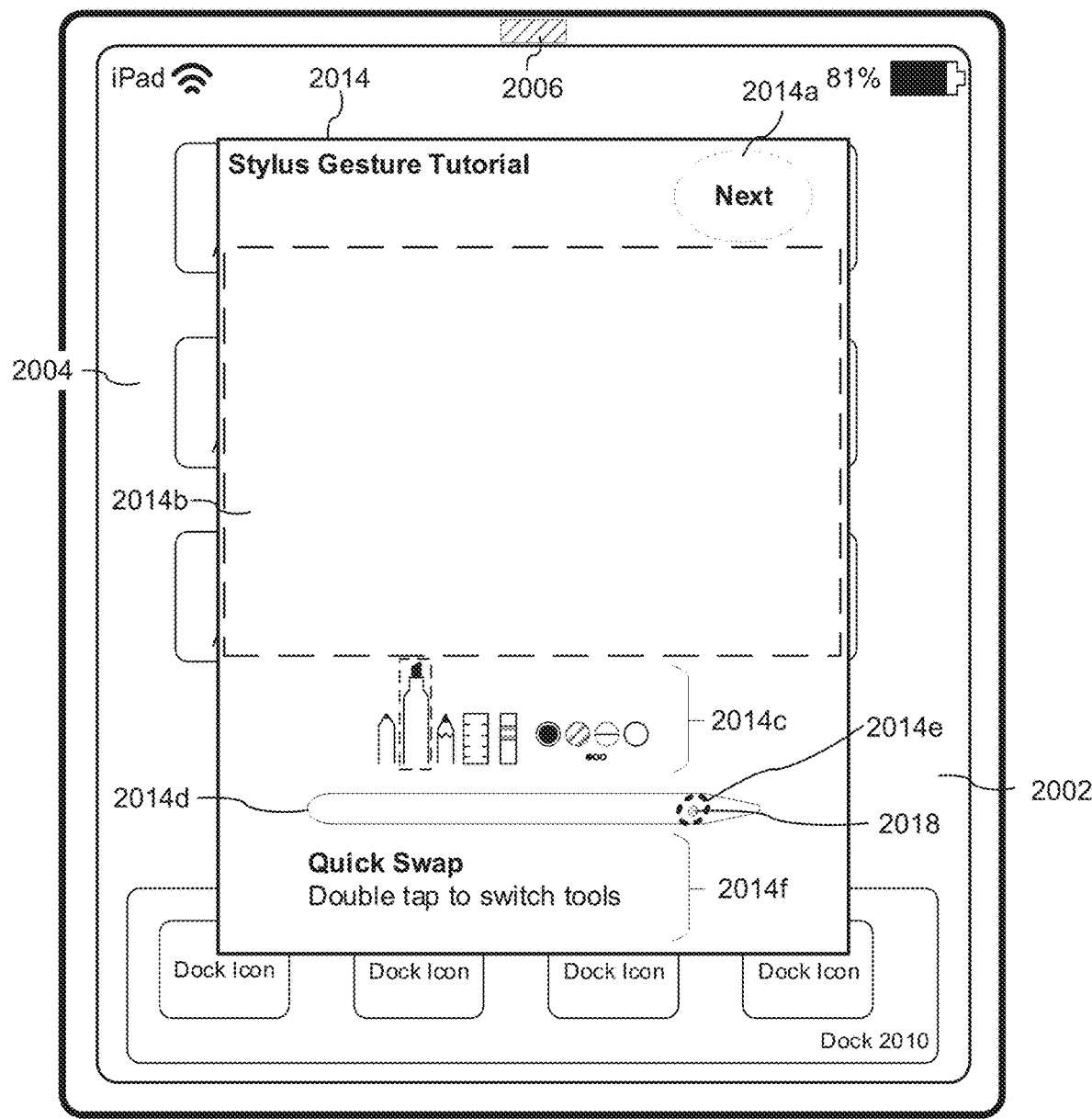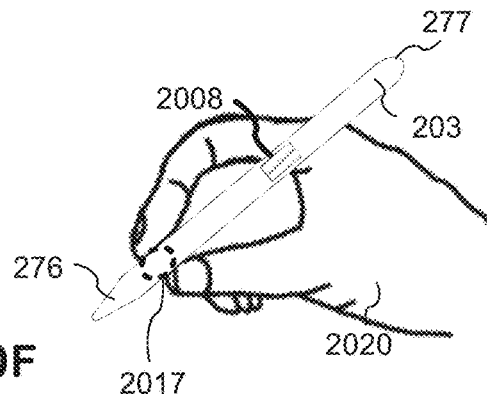
Figure 20F

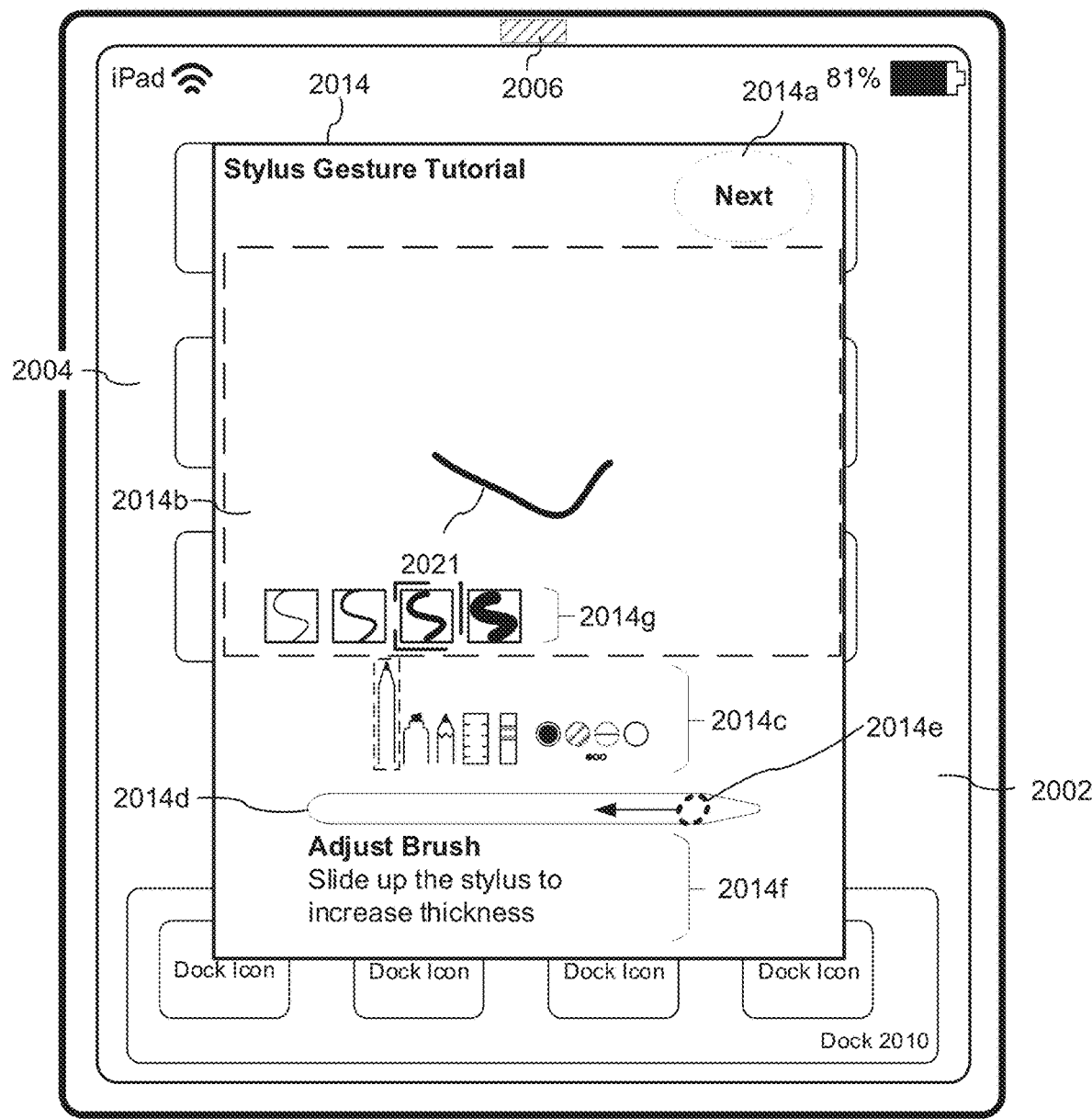
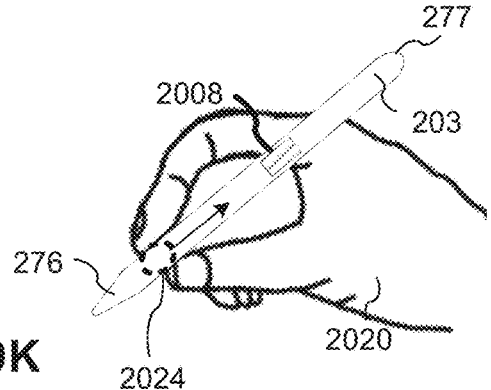
Figure 20K

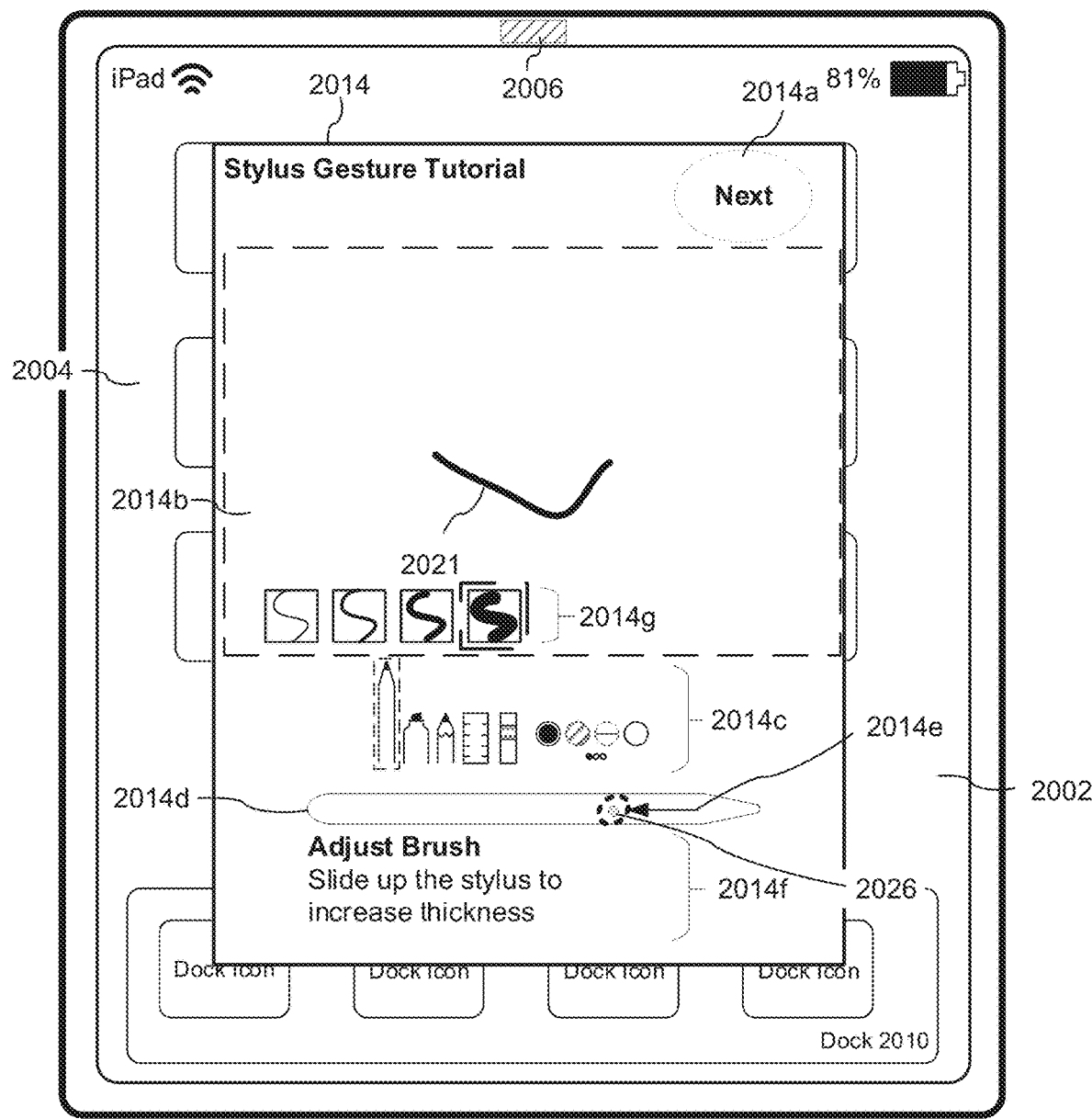
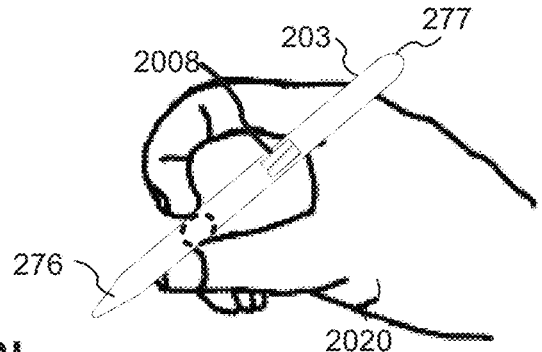
Figure 20L

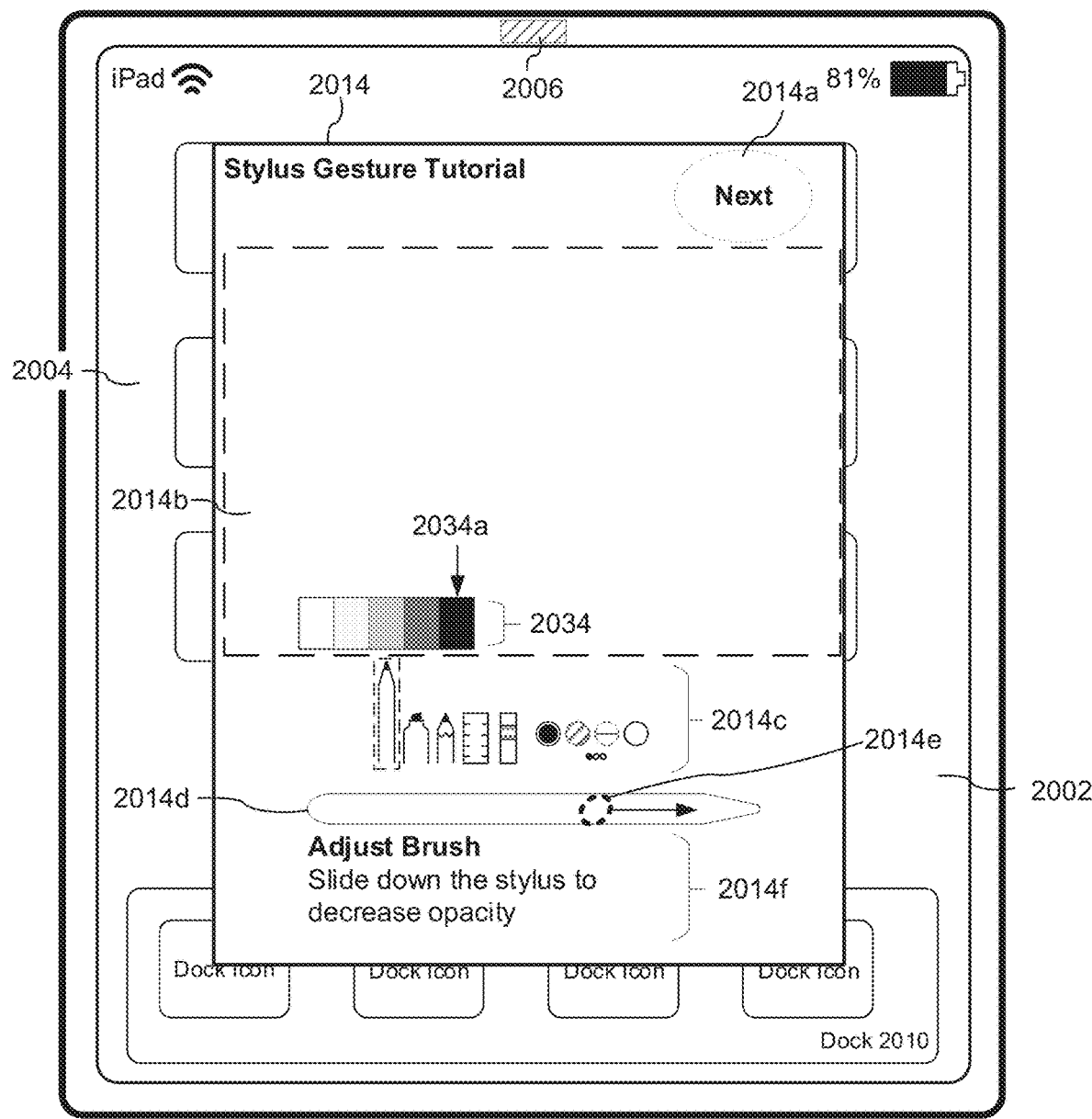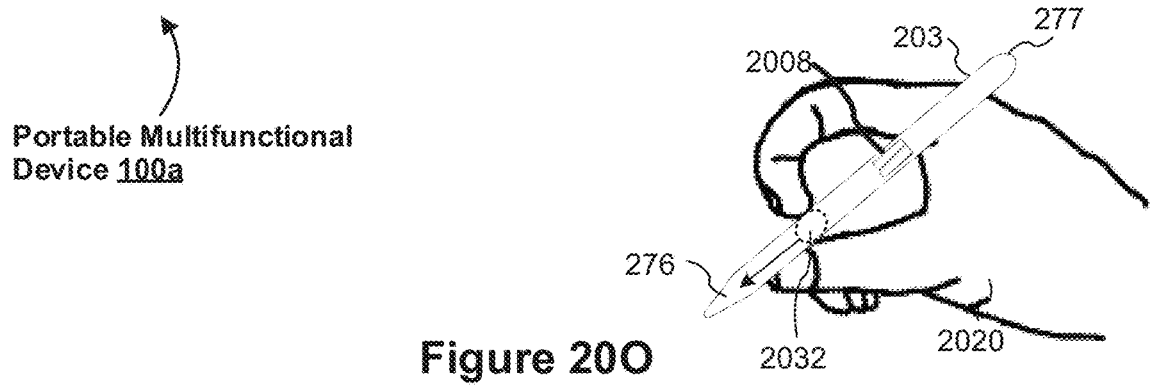
Figure 20O

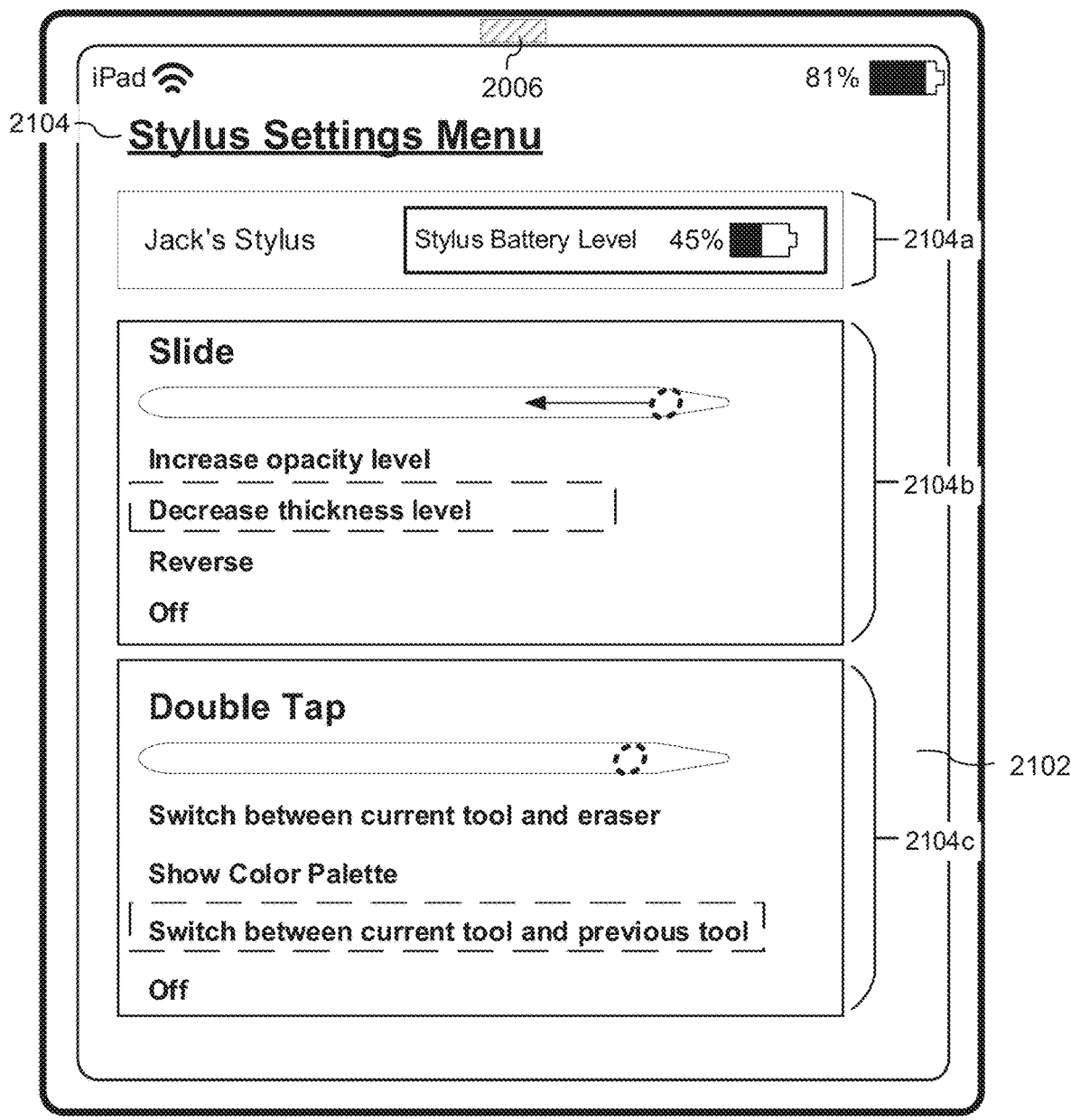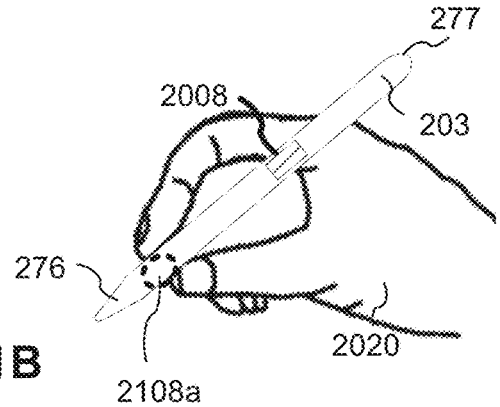
Figure 21B

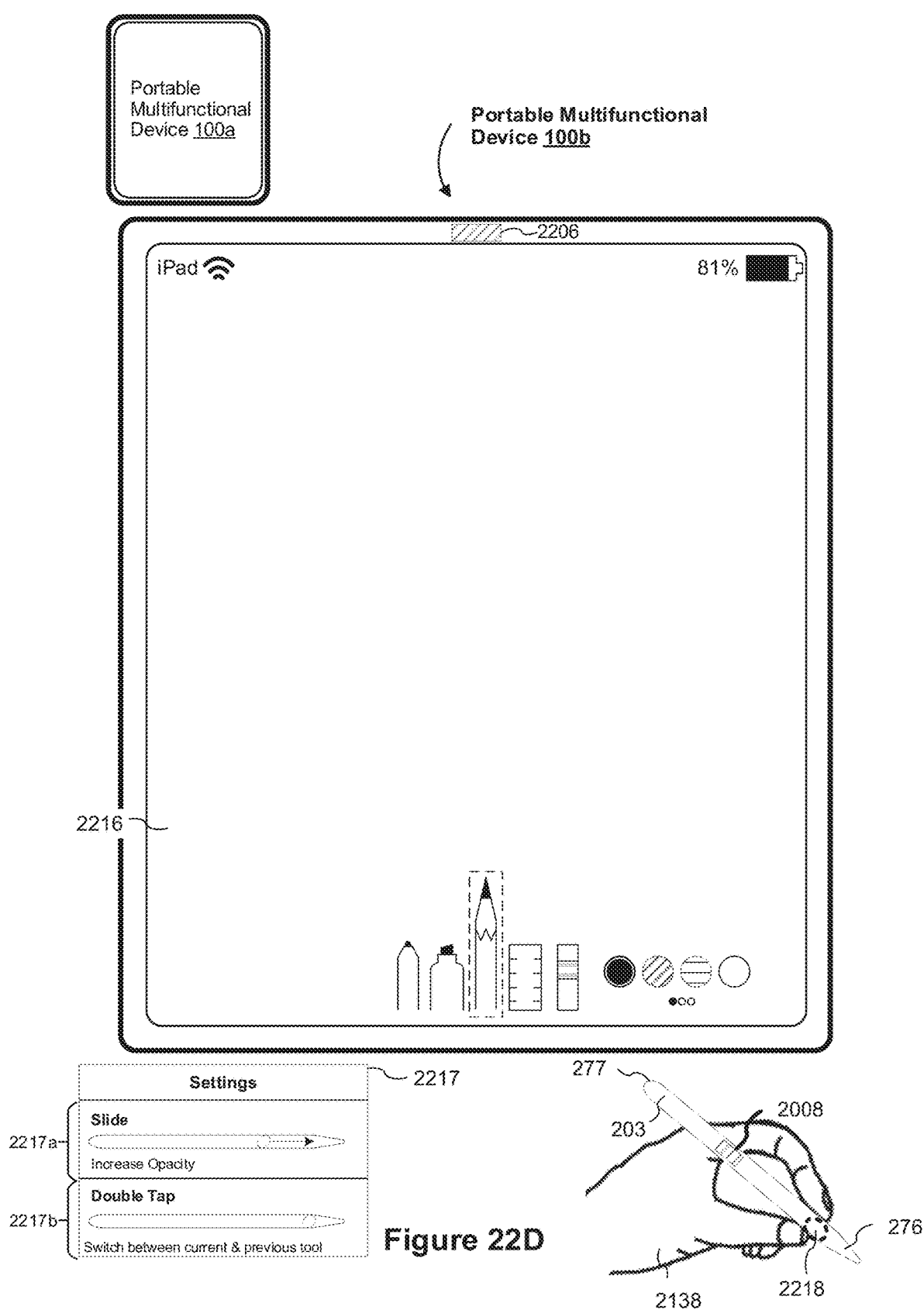

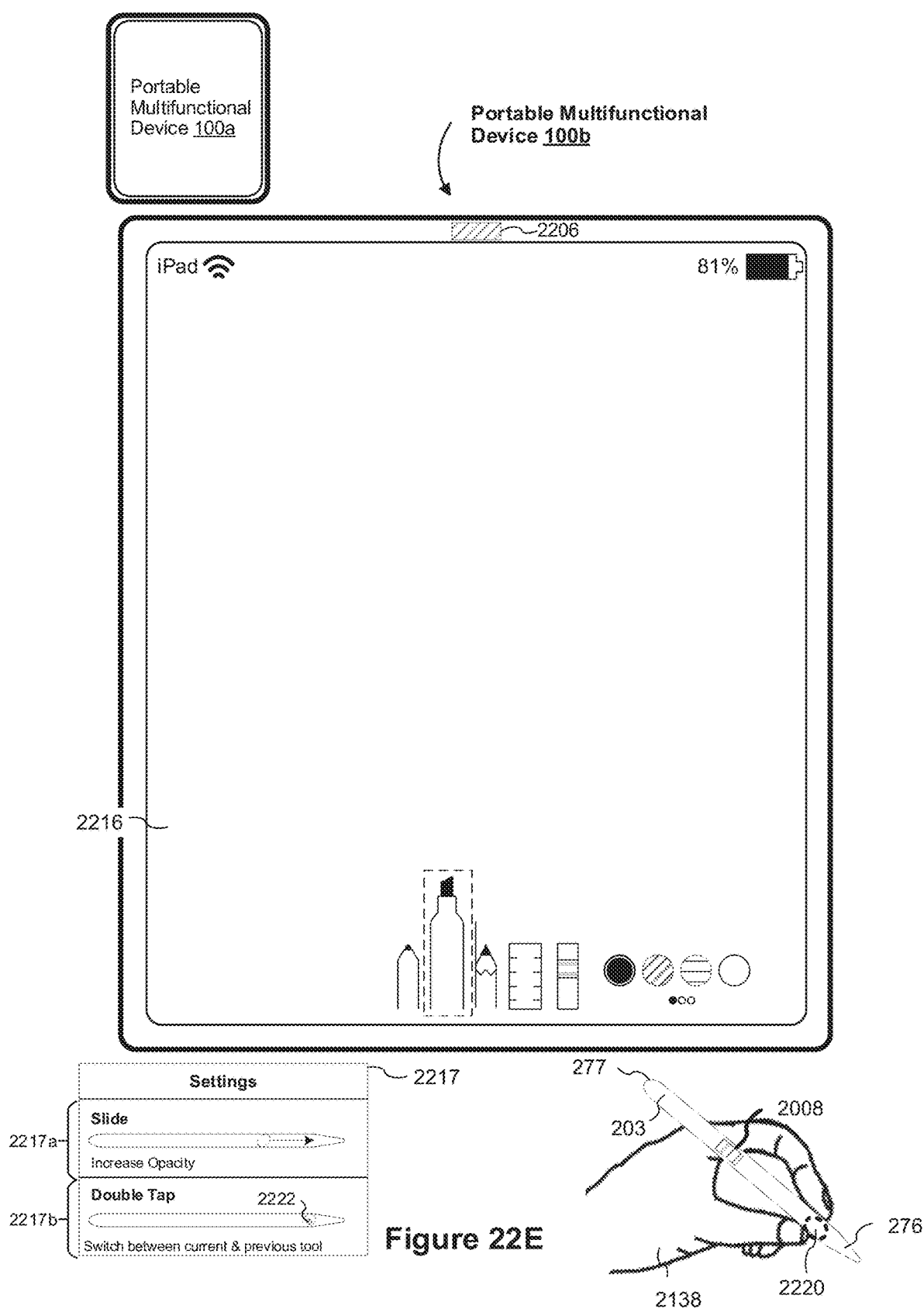

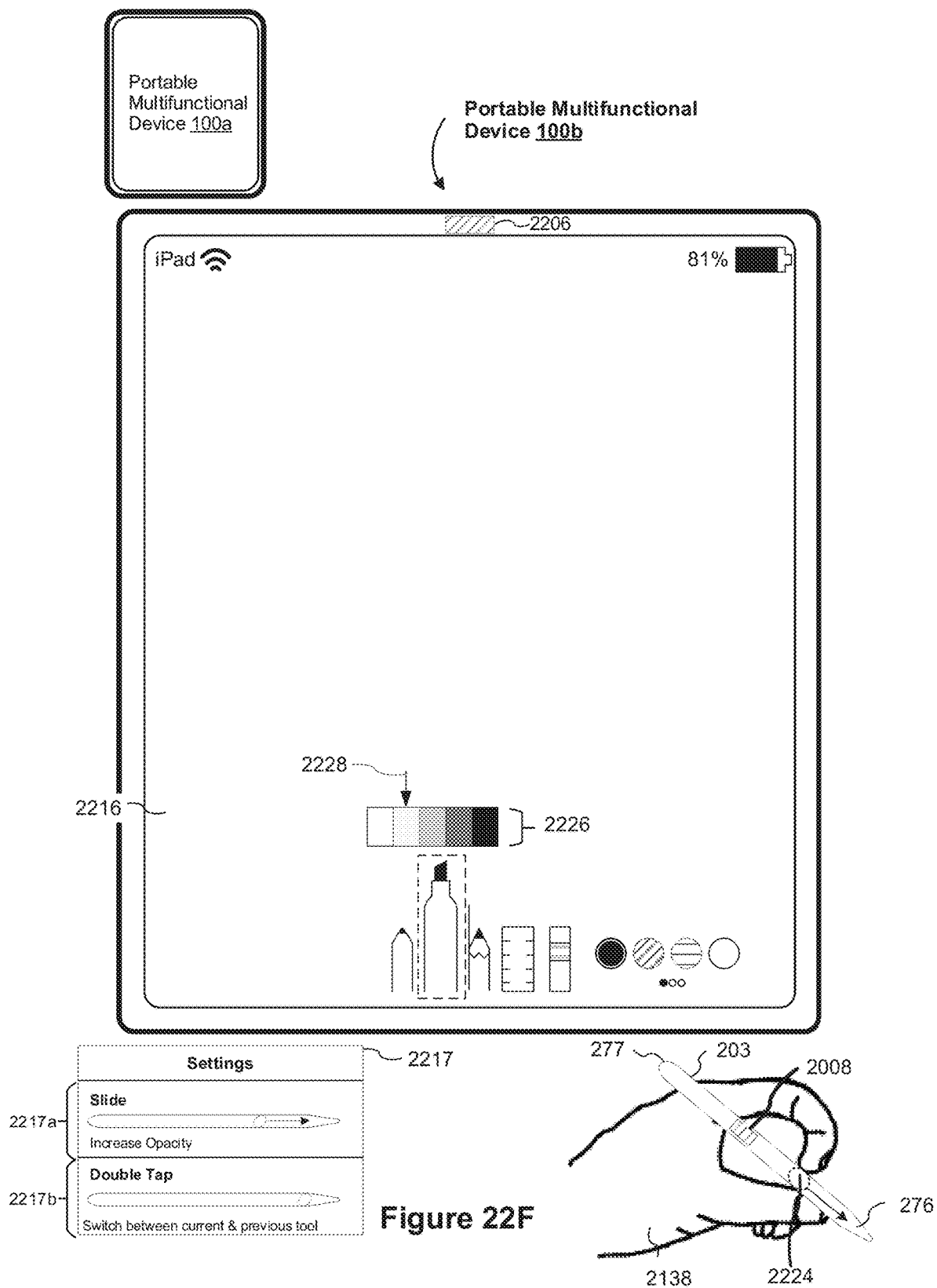

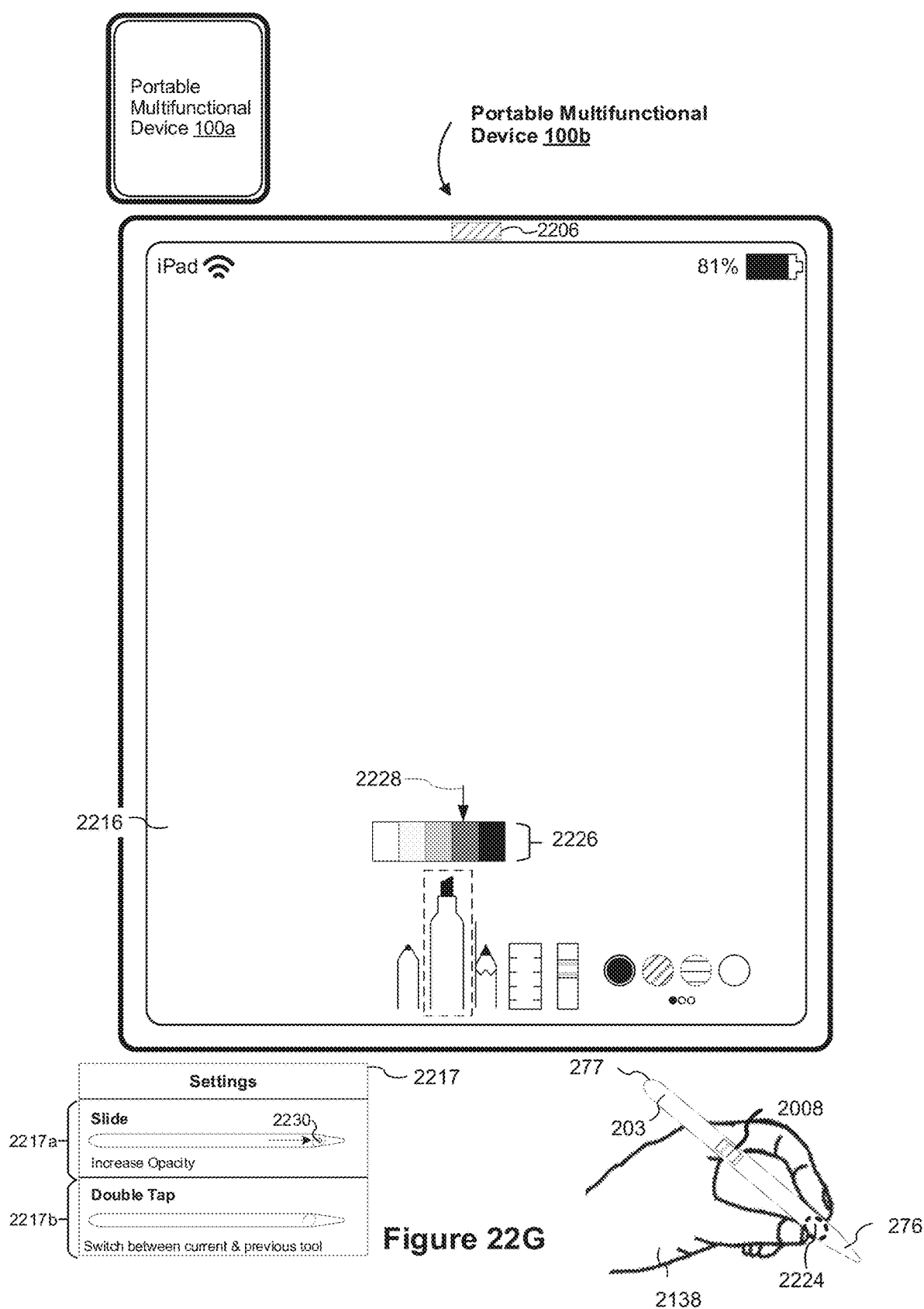

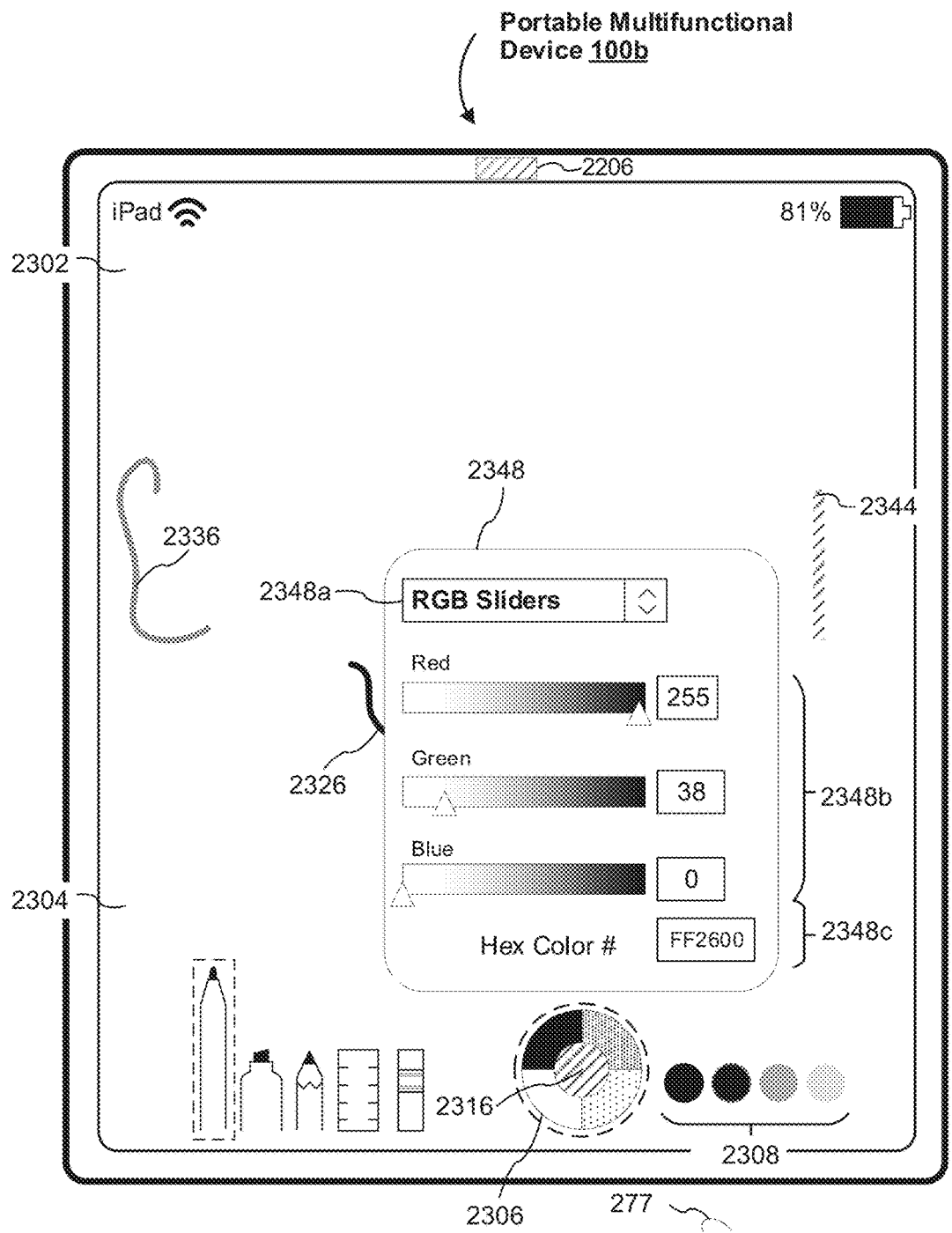
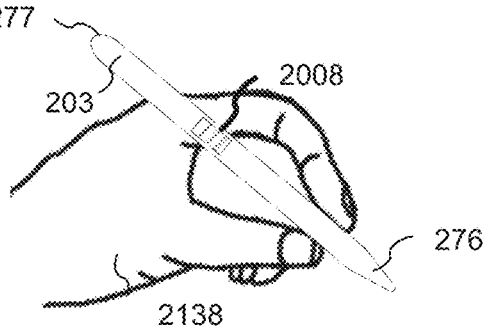
Figure 23Z

2400a

2402 — At an electronic device with one or more processors, a non-transitory memory, a display, a touch-sensitive surface, and a communication interface provided to communicate with a stylus:
In response to detecting that the stylus is proximate to the electronic device, pair the electronic device with the stylus

2404 — The stylus being proximate to the electronic device corresponds to the stylus not being in contact with the electronic device

2406 — The stylus being proximate to the electronic device corresponds to the stylus contacting the electronic device at a connection point on the electronic device

2408 — In response to pairing the stylus with the electronic device:
Display, on the display, a first representation of a first gesture performed on the stylus

2410 — Detect, on the touch-sensitive surface, one or more inputs corresponding to a request to select a particular tutorial, wherein the first representation of the first gesture is based on the particular tutorial

2412 — The first representation of the first gesture is predetermined

2414 — The first representation of the first gesture is displayed without user intervention

2416 — Display the first representation within a tutorial interface (A)

2418 — In response to pairing the stylus with the electronic device:
Obtain finger manipulation data from the stylus via the communication interface, wherein the finger manipulation data indicates a finger manipulation input received by the stylus

2420 — In response to pairing the stylus with the electronic device:
In response to obtaining the finger manipulation data, display, on the display, a second representation of a second gesture performed on the stylus corresponding to the finger manipulation input received by the stylus

2422 — The second representation of the second gesture is displayed in response to determining that the finger manipulation input satisfies a gesture criterion

2424 — Displayed the second representation within a tutorial interface (A)

2400b
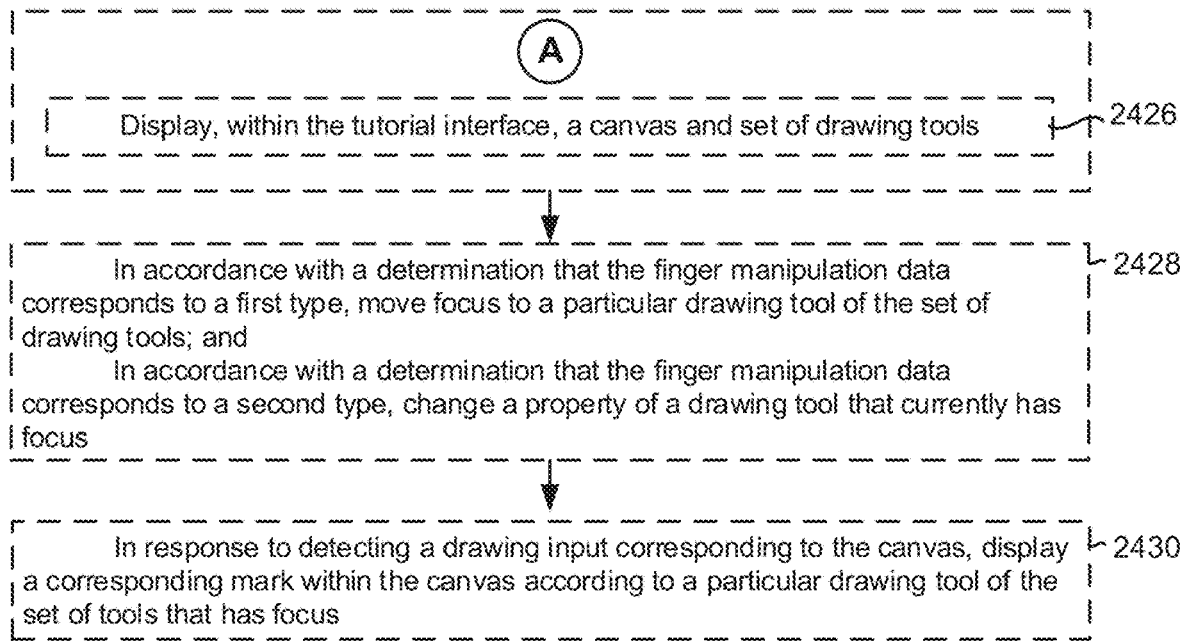
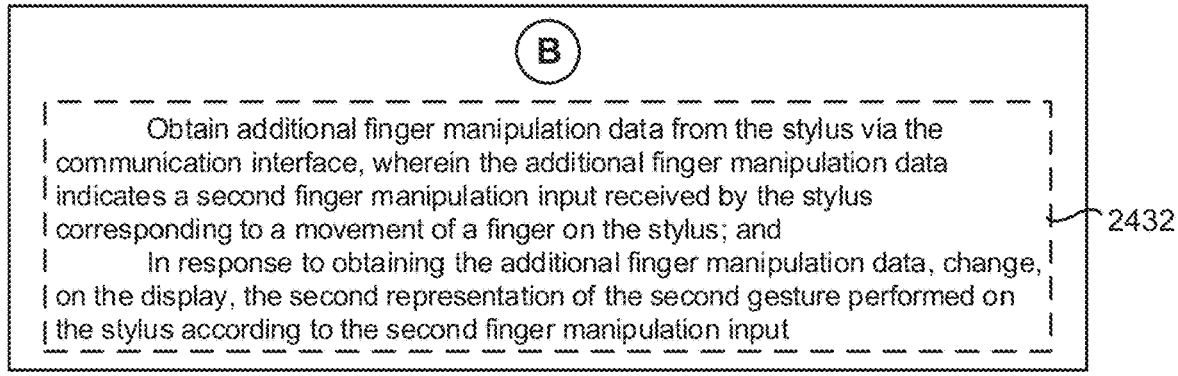
Figure 24B

2500b

While displaying, on the display, a settings interface provided for setting how the property of the stylus operations is affected in response to obtaining the finger manipulation data from the stylus:
    Detect, on the touch-sensitive surface of the electronic device, a settings input corresponding to the settings interface, wherein the settings input specifies how a particular property of the stylus operations is affected in response to a particular finger manipulation input received by the stylus; and
    In response to detecting the settings input, set how the particular property of the stylus operations is affected in response to determining that the finger manipulation data from the stylus is indicative of the particular finger manipulation input received by the stylus — 2520

The settings input specifies that the particular property of the stylus operations is unchanged in response to determining that the finger manipulation data from the stylus is indicative of the particular finger manipulation input received by the stylus — 2522

The settings input specifies that the particular property of the stylus operations corresponds to changing thickness of a line drawn by the stylus — 2524

The settings input specifies that the particular property of the stylus operations corresponds to changing opacity of a line drawn by the stylus — 2526

The settings input specifies that the particular property of the stylus operations corresponds to reversing how a swipe finger manipulation input received at the stylus affects line thickness or line opacity — 2528

The property of the stylus operation corresponds to line width — 2530

The property of the stylus operation corresponds to line opacity — 2532

The property of the stylus operation corresponds to an editing tool having focus — 2534

Changing the property of the stylus operations is in response to determining that the finger manipulation input satisfies a gesture criterion. — 2536

After changing the property of the stylus operations:
    Detect a subsequent movement of the stylus across the touch-sensitive surface; and
    Perform a subsequent stylus operation in the user interface in accordance with the subsequent movement and the property of the stylus operation — 2538

At a first electronic device with one or more processors, a non-transitory memory, a display, and a communication interface provided to communicate with a stylus: Detect an input corresponding to the stylus that is in communication with the first electronic device via the communication interface ～2602

Before detecting the input corresponding to the stylus, change a first setting of the stylus at a second electronic device ～2604

The input corresponds to a gesture detected at the stylus ～2606

The input corresponds to the stylus contacting a touch-sensitive surface of the first electronic device ～2608

(A)

In response to detecting the input corresponding to the stylus: In accordance with a determination that the first setting of the stylus has a first value, perform a first operation at the first electronic device ～2610

Display status information about the stylus, wherein the status information includes information indicative of the first setting of the stylus ～2612

The first setting includes a plurality of editing properties associated with a particular application ～2614

(B) (C)

(A)

In response to detecting the input corresponding to the stylus: In accordance with a determination that the first setting of the stylus has a second value that is different from the first value, perform a second operation at the first electronic device that is different from the first operation, wherein the value of the first setting was determined based on inputs at the second electronic device with which the stylus was previously in communication ～2616

In response to pairing the stylus with the first electronic device, obtain, from the stylus, data indicative of the first setting ～2618

After detecting the second input and while the color-picker user interface continues to be displayed on the display, detect a third input that corresponds to movement of a touch across the touch-sensitive surface at a location that corresponds to a drawing region on the display; and
    In response to detecting the third input:
        Draw a mark in the drawing region based on the movement of the touch, wherein the mark has a color that is based on the active color; and
        Cease to display the color-picker user interface on the display ⎯ 2728

Detecting a third input corresponding to the user-selected color selection affordance; and
    In response to detecting the third input:
        In accordance with a determination that a respective user-selected color is associated with the user-selected color selection affordance, assign the respective user-selected color as the active color without displaying, on the display, the color-picker user interface; and
        In accordance with a determination that no user-selected color has been associated with the user selected-color selection affordance, display, on the display, the color-picker user interface. ⎯ 2730

Figure 27C

DEVICES, METHODS, AND GRAPHICAL USER INTERFACES FOR AN ELECTRONIC DEVICE INTERACTING WITH A STYLUS

CROSS-REFERENCE TO RELATED APPLICATIONS

This application claims priority to U.S. Provisional Patent App. No. 62/679,461 filed on Jun. 1, 2018 and U.S. Provisional Patent App. No. 62/729,869 filed on Sep. 11, 2018, both of which are hereby incorporated by reference in their entirety.

TECHNICAL FIELD

This relates generally to an electronic device interacting with a stylus, including but not limited to the user interface on a display of the electronic device being affected by sensor data received from the stylus.

BACKGROUND

The use of touch-sensitive surfaces as input devices for computers and other electronic computing devices has increased significantly in recent years. Examples of touch-sensitive surfaces include touchpads and touch-screen displays. These surfaces are widely used to manipulate a user interface on a display.

However, touch-inputs, including gesture inputs, provide limited and inefficient control for manipulating the user interface. Accordingly, repetitive, complex, and/or cumbersome touch-inputs may be needed to manipulate the user interface in order to achieve a particular objective.

SUMMARY

Accordingly, there is a need for a robust mechanism for manipulating the user interface of a display at an electronic device. In particular, there is a need for the electronic device to have faster, more efficient methods and interfaces for user interface manipulation. Such methods and interfaces optionally complement or replace conventional methods for manipulating user interfaces. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices and methods. In some embodiments, the electronic device is a desktop computer. In some embodiments, the electronic device is portable (e.g., a notebook computer, tablet computer, or handheld device). In some embodiments, the electronic device is a personal electronic device (e.g., a wearable electronic device, such as a watch). In some embodiments, the electronic device has a touchpad. In some embodiments, the electronic device has a touch-sensitive display (also known as a "touch screen" or "touch-screen display"). In some embodiments, the electronic device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the user interacts with the GUI primarily through user interactions with the stylus while the stylus is not in physical contact with the touch-sensitive surface. In some embodiments, the user interacts with the GUI primarily through finger and/or hand contacts and gestures on the stylus while the user is holding the stylus. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with one or more processors, a non-transitory memory, a touch-sensitive surface, a display, and a communication interface provided to communicate with a stylus. The method includes, while the electronic device is in a first state, obtaining, at the electronic device, information about a current state of the stylus via the communication interface. The method further includes, in accordance with a determination, based on the information about the current state of the stylus, that a user is holding the stylus, displaying, on the display, a visual indication that the electronic device is in a second state that is different from the first state. The method further includes, in accordance with a determination that the user is not holding the stylus, maintaining the electronic device in the first state.

In accordance with some embodiments, a method is performed at an electronic device with one or more processors, a non-transitory memory, a touch-sensitive surface, a display, and a communication interface provided to communicate with a stylus. The method includes detecting an input, from the stylus, on the touch-sensitive surface of the electronic device. The method also includes, in response to detecting the input, and in accordance with a determination that the stylus is being held according to a first grip arrangement, wherein the first grip arrangement of the stylus is determined based at least in part on sensor data detected by the stylus, making a first change to content displayed on the display. The method further includes, in response to detecting the input, and in accordance with a determination that the stylus is being held according to a second grip arrangement different from the first grip arrangement, wherein the second grip arrangement of the stylus is determined based at least in part on sensor data detected by the stylus, making a second change to the content displayed on the display, wherein the second change to the content displayed on the display is different from the first change to the content displayed on the display.

In accordance with some embodiments, a method is performed at an electronic device with one or more processors, a non-transitory memory, a touch-sensitive surface, a display, and a communication interface provided to communicate with a stylus. The method includes detecting a touch input on the touch-sensitive surface. The method also includes, in response to detecting the touch input on the touch-sensitive surface, and in accordance with a determination that sensor data obtained from the stylus via the communication interface indicates that the stylus is being held by a user, performing a first operation in response to the touch input. The method further includes, in response to detecting the touch input on the touch-sensitive surface, and in accordance with a determination that the stylus is not being held by the user, performing a second operation in response to the touch input, wherein the second operation is different from the first operation.

In accordance with some embodiments, a method is performed at an electronic device with one or more processors, a non-transitory memory, a touch-sensitive surface, a display, and a communication interface provided to communicate with a stylus. The method includes, while displaying a plurality of user interface elements on the display, obtaining finger manipulation data from the stylus via the communication interface, wherein the finger manipulation data includes information about one or more finger manipulation inputs received by the stylus. The method also includes, in response to obtaining the finger manipulation data, and in accordance with a determination that the finger manipulation data indicates a first finger manipulation input on the stylus, performing a first operation on at least a subset of the plurality of the user interface elements. The method further includes, in response to obtaining the finger manipulation data, and in accordance with a determination that the finger manipulation data indicates a second finger manipulation input on the stylus that is different from the first finger manipulation input, performing a second operation on at least a subset of the plurality of the user interface elements, wherein the second operation is different from the first operation.

In accordance with some embodiments, a method is performed at an electronic device with one or more processors, a non-transitory memory, a touch-sensitive surface, a display, and a communication interface provided to communicate with a stylus. The method includes displaying, on the display, a selection user interface including a plurality of selectable items, wherein a first item among the plurality of selectable items is currently selected within the selection user interface. The method also includes obtaining finger manipulation data from the stylus via the communication interface, wherein the finger manipulation data includes information about one or more finger manipulation inputs received at the stylus. The method further includes, in response to obtaining the finger manipulation data, and in accordance with a determination that the finger manipulation data satisfies a navigation criterion, changing display of the selection user interface in order to indicate movement of focus to a second item among the plurality of selectable items. The method further includes, in response to obtaining the finger manipulation data, and in accordance with a determination that the finger manipulation data does not satisfy the navigation criterion, maintaining display of the selection user interface, wherein the first item among the plurality of selectable items currently has focus within the selection user interface.

In accordance with some embodiments, a method is performed at an electronic device with one or more processors, a non-transitory memory, a touch-sensitive surface, a display, and a communication interface provided to communicate with a stylus. The method includes obtaining input data from the stylus via the communication interface corresponding to an input detected at the stylus. The method also includes, in response to obtaining the input data from the stylus, and in accordance with a determination that a distance between the stylus and the touch-sensitive display satisfies a first distance threshold when the input was detected at the stylus, displaying a first user interface element that corresponds to the input. The method further includes, in response to obtaining the input data from the stylus, and in accordance with a determination that the distance between the stylus and the touch-sensitive display satisfies a second distance threshold when the input was detected at the stylus, forgoing displaying the first user interface element that corresponds to the input.

In accordance with some embodiments, a method is performed at an electronic device with one or more processors, a non-transitory memory, a display, a touch-sensitive surface, and a communication interface provided to communicate with a stylus. The method includes in response to detecting that the stylus is proximate to the electronic device, pairing the electronic device with the stylus. The method includes in response to pairing the stylus with the electronic device: displaying, on the display, a first representation of a first gesture performed on the stylus; obtaining finger manipulation data from the stylus via the communication interface, wherein the finger manipulation data indicates a finger manipulation input received by the stylus; and in response to obtaining the finger manipulation data, displaying, on the display, a second representation of a second gesture performed on the stylus corresponding to the finger manipulation input received by the stylus.

In accordance with some embodiments, a method is performed at an electronic device with one or more processors, a non-transitory memory, a touch-sensitive surface, a display, and a communication interface provided to communicate with a stylus. The method includes detecting movement of the stylus across the touch-sensitive surface. The method includes in response to detecting the movement of the stylus, performing a stylus operation in a user interface displayed on the display in accordance with the movement of the stylus. The method includes after performing the stylus operation in the user interface, obtaining finger manipulation data, via the communication interface, indicative of a finger manipulation input received at the stylus. The method includes in response to obtaining the finger manipulation data from the stylus: changing a property of stylus operations in the user interface based on the finger manipulation input; and displaying a visual indication of the change in the property of the stylus operations on the display of the electronic device.

In accordance with some embodiments, a method is performed at a first electronic device with one or more processors, a non-transitory memory, a display, and a communication interface provided to communicate with a stylus. The method includes detecting an input corresponding to the stylus that is in communication with the first electronic device via the communication interface. The method includes in response to detecting the input corresponding to the stylus: in accordance with a determination that a first setting of the stylus has a first value, performing a first operation at the first electronic device; and in accordance with a determination that the first setting of the stylus has a second value that is different from the first value, performing a second operation at the first electronic device that is different from the first operation, wherein the value of the first setting was determined based on inputs at a second electronic device with which the stylus was previously in communication.

In accordance with some embodiments, a method is performed at an electronic device with one or more processors, a non-transitory memory, a touch-sensitive surface, and a display. The method includes detecting, on the touch-sensitive surface, a first input corresponding to a user-selected color selection affordance. The method includes in response to detecting the first input, displaying, on the display, a color-picker user interface, wherein the color-picker user interface includes a plurality of options for selecting a user-selected color. The method includes detecting, on the touch-sensitive surface, a second input corresponding to a particular one of the plurality of options for selecting a user-selected color. The method includes in response to detecting the second input: assigning a first color, selected based on the particular one of the plurality of options for selecting a user-selected color, as an active color; in accordance with a determination that the second input was a continuation of the first input, ceasing to display the color-picker user interface upon detecting an end of the second input; and in accordance with a determination that the second input was detected after the first input ended and while the color-picker user interface continued to be displayed on the display, maintaining display of the color-picker user interface after detecting the end of the second input.

In accordance with some embodiments, an electronic device includes a touch-sensitive surface, a display, a communication interface provided to communicate with a stylus, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions, which, when executed by an electronic device with a touch-sensitive surface, a display, and a communication interface provided to communicate with a stylus, cause the electronic device to perform or cause performance of the operations of any of the methods described herein. In accordance with some embodiments, a graphical user interface on an electronic device with a touch-sensitive surface, a display, a communication interface provided to communicate with a stylus, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a touch-sensitive surface, a display, a communication interface provided to communicate with a stylus, and means for performing or causing performance of the operations of any of the methods described herein. In accordance with some embodiments, an information processing apparatus, for use in an electronic device with a touch-sensitive surface, a display, and a communication interface provided to communicate with a stylus, includes means for performing or causing performance of the operations of any of the methods described herein.

Thus, an electronic device with a touch-sensitive surface and a communication interface provided to communicate with a stylus exploits data received from the stylus. The received data indicates user inputs being detected at sensor(s) of the stylus. The sensors at stylus can detect a variety of user inputs and provides data indicative of these inputs to the electronic device. Based on the received data, the electronic device effects a variety of operations, such as drawing and navigation operations. Accordingly, the electronic device can perform a variety of operations without receiving inputs at the touch-sensitive surface of the electronic device. This improves the functionality of the electronic device in a number of ways, including longer battery life, less wear-and-tear. Additionally, the improved user interfaces enable more efficient and accurate user interactions with the electronic device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A-5B illustrate a positional state of a stylus relative to a touch-sensitive surface in accordance with some embodiments.

FIG. 6B illustrates an example user interface for a multifunction device with a touch-sensitive surface that is separate from the display in accordance with some embodiments.

FIGS. 14A-14C is a flow diagram illustrating a method of changing application states in accordance with some embodiments.

FIGS. 15A-15B is a flow diagram illustrating a method of changing stylus functionality in accordance with some embodiments.

FIGS. 16A-16B is a flow diagram illustrating a method of modifying touch input functionality in accordance with some embodiments.

FIGS. 17A-17C is a flow diagram illustrating a method of performing operations on existing marks based on finger manipulation inputs in accordance with some embodiments.

FIGS. 18A-18B is flow diagram illustrating a method of performing finger manipulations to a stylus in order to navigate within a menu in accordance with some embodiments.

FIGS. 19A-19C is a flow diagram illustrating a method for displaying user interface elements based on hover distance of the stylus in accordance with some embodiments.

FIGS. 22A-22G are illustrations of example user interfaces for maintaining stylus settings across electronic devices in accordance with some embodiments.

FIGS. 24A-24C is a flow diagram illustrating a method of displaying example user interfaces providing an interactive stylus tutorial in accordance with some embodiments.

FIGS. 25A-25B is a flow diagram illustrating a method of displaying example user interfaces for selecting stylus settings and drawing marks based on the stylus settings in accordance with some embodiments.

FIGS. 26A-26B is a flow diagram illustrating a method of maintaining stylus settings across electronic devices in accordance with some embodiment.

FIGS. 27A-27C is a flow diagram illustrating a method of displaying example user interfaces including a color-picker user interface to assign an active color in accordance with some embodiments.

DESCRIPTION OF EMBODIMENTS

Many electronic devices include touch-sensitive surfaces that allow users to manipulate user interfaces. For example, a finger stroke on a touch-sensitive surface paints a line on a canvas in a drawing application. However, existing methods for manipulating user interfaces are slow, cumbersome, and inefficient. For example, the number of kinds of inputs that can be registered at the electronic device in response to surface touches is limited. Even multi-step surface touches (e.g., gestures) provide relatively few input types because they still require touch contact with the screen.

The embodiments below address these problems by providing a separate instrument (e.g., a stylus) that exploits the myriad of intricate hand and finger manipulations of a user. The hand and finger manipulations are registered at the stylus and provided to the electronic device. Accordingly, the user need not constrain his/her hand and fingers to the screen in order to manipulate the user interface and therefore can utilize more hand and finger manipulations. These manipulations provide a richer and more robust instruction set to the electronic device than is achievable with touch screen inputs alone.

Figure 11A:
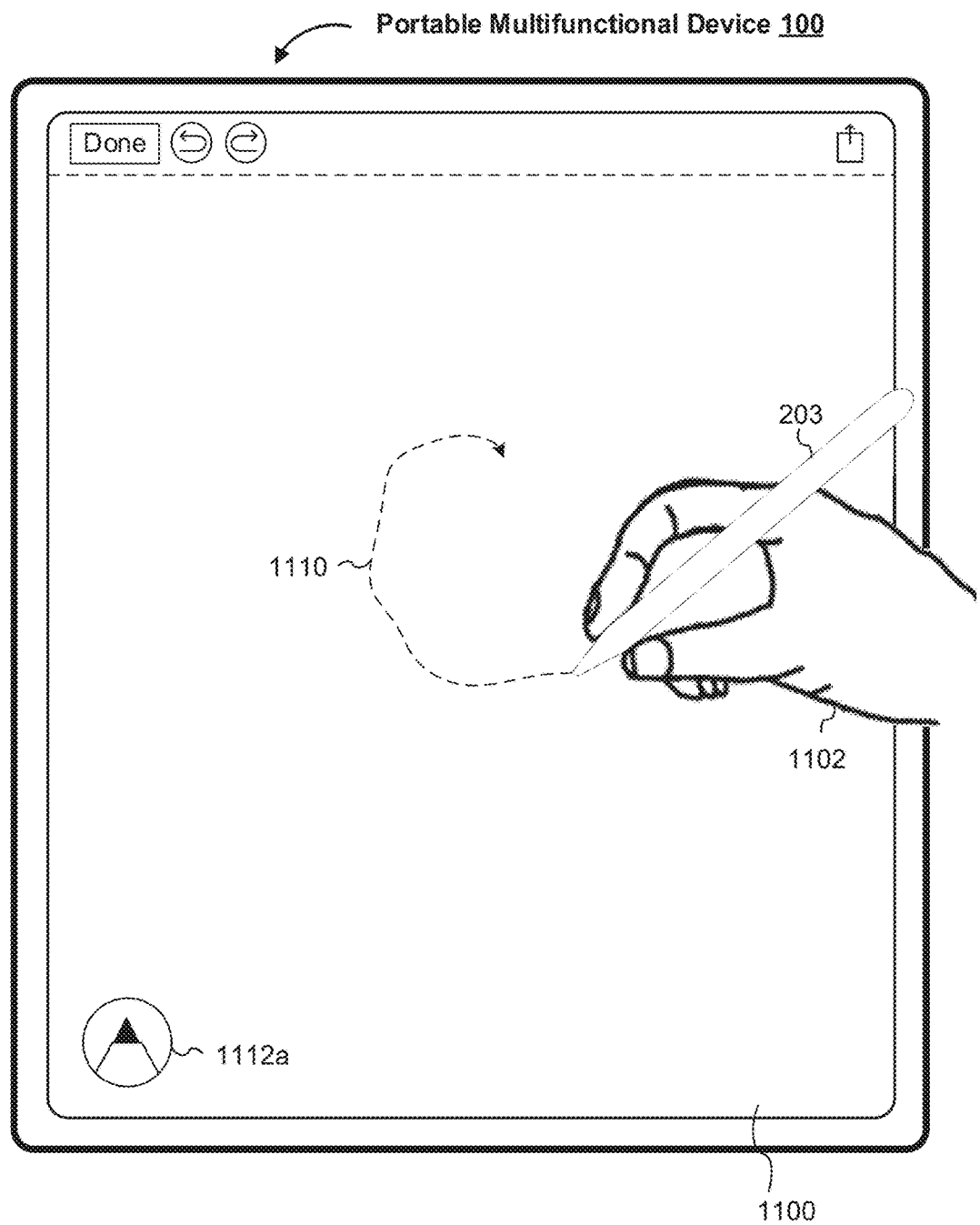
FIGS. 11A-11O illustrate example user interfaces for performing finger manipulations to a stylus in order to navigate within a menu in accordance with some embodiments.
Figure 11O:
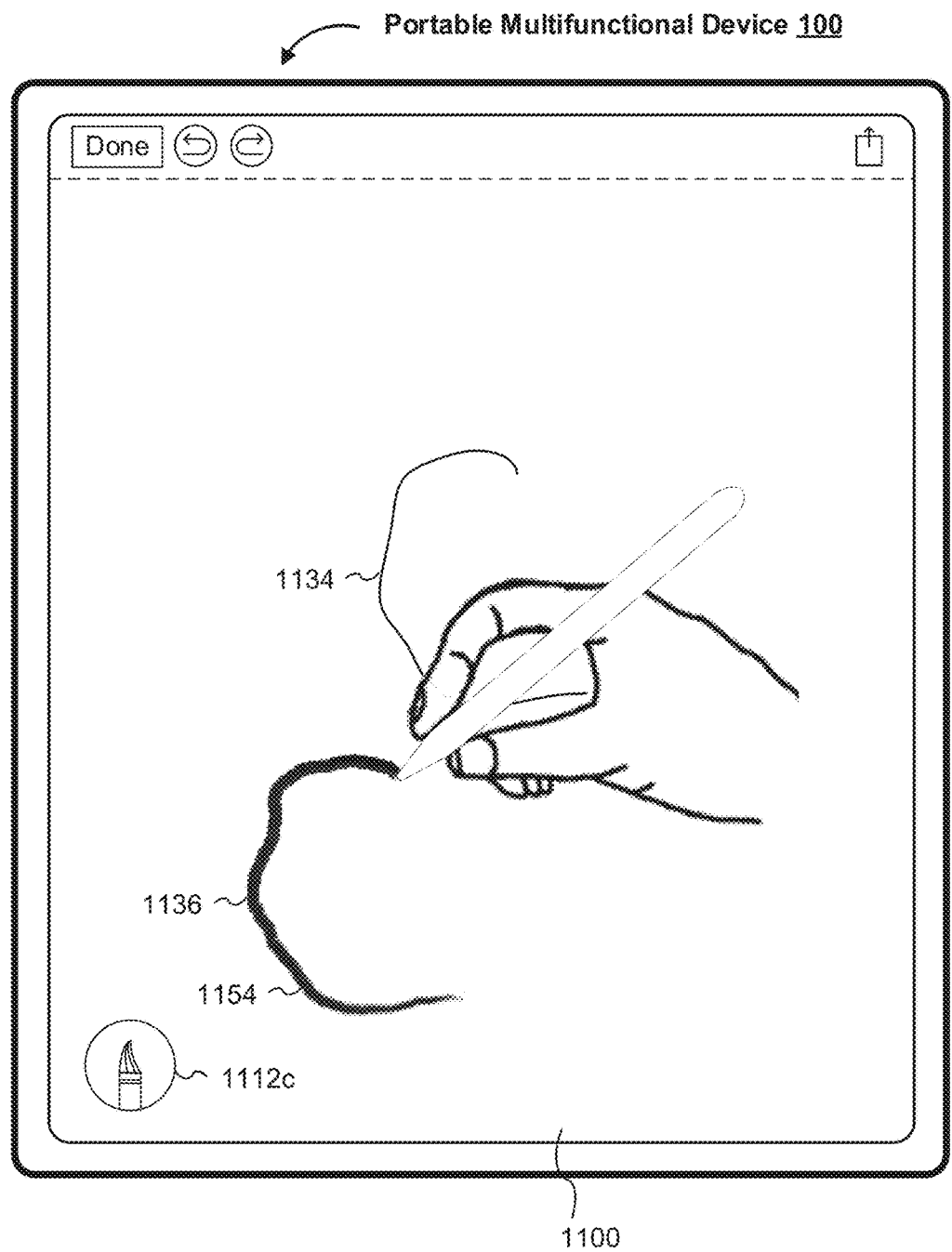
Figure 12A:
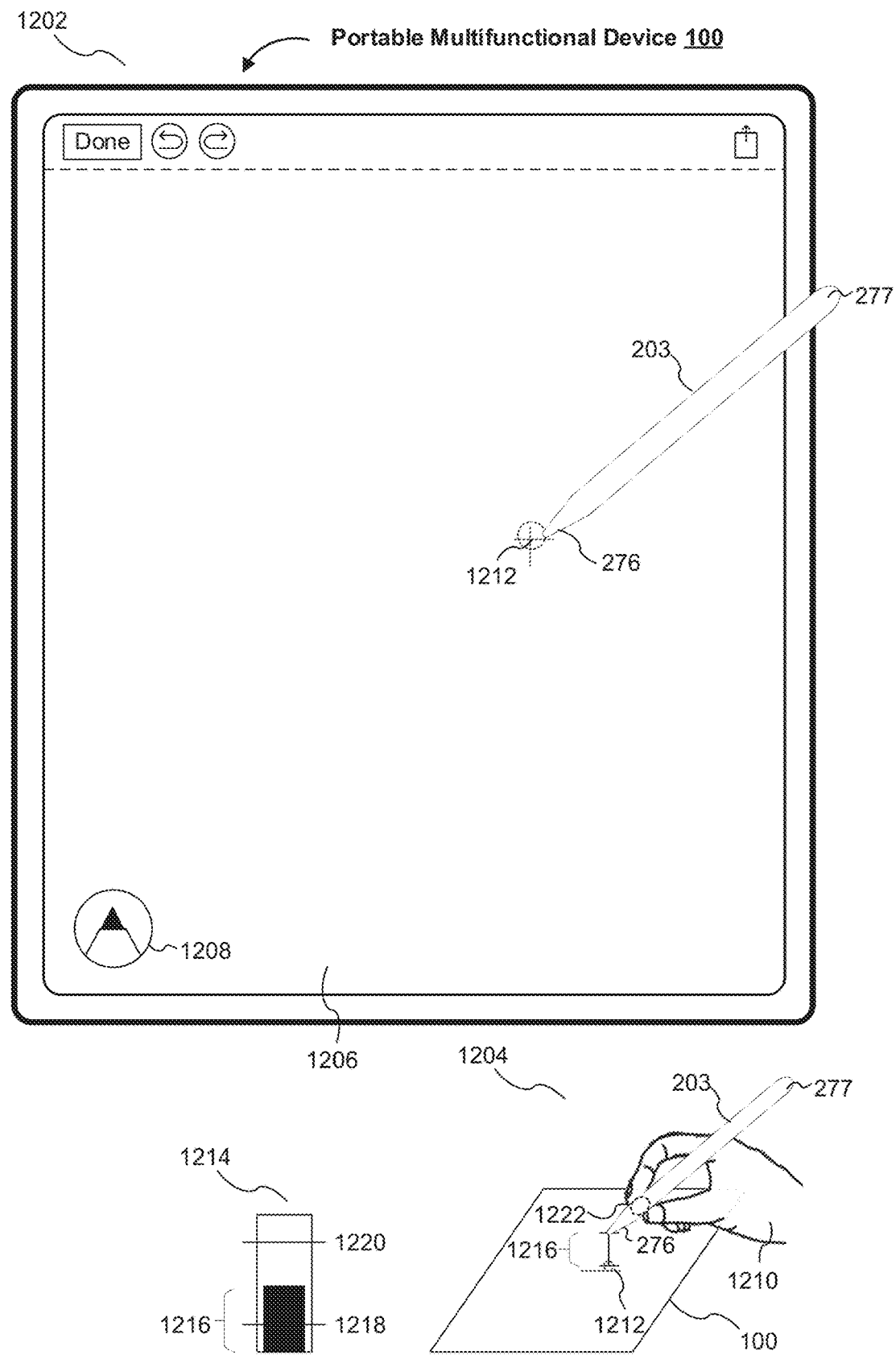
FIGS. 12A-12O illustrate example user interfaces for displaying user interface elements based on hover distance of the stylus in accordance with some embodiments.
Figure 20A:
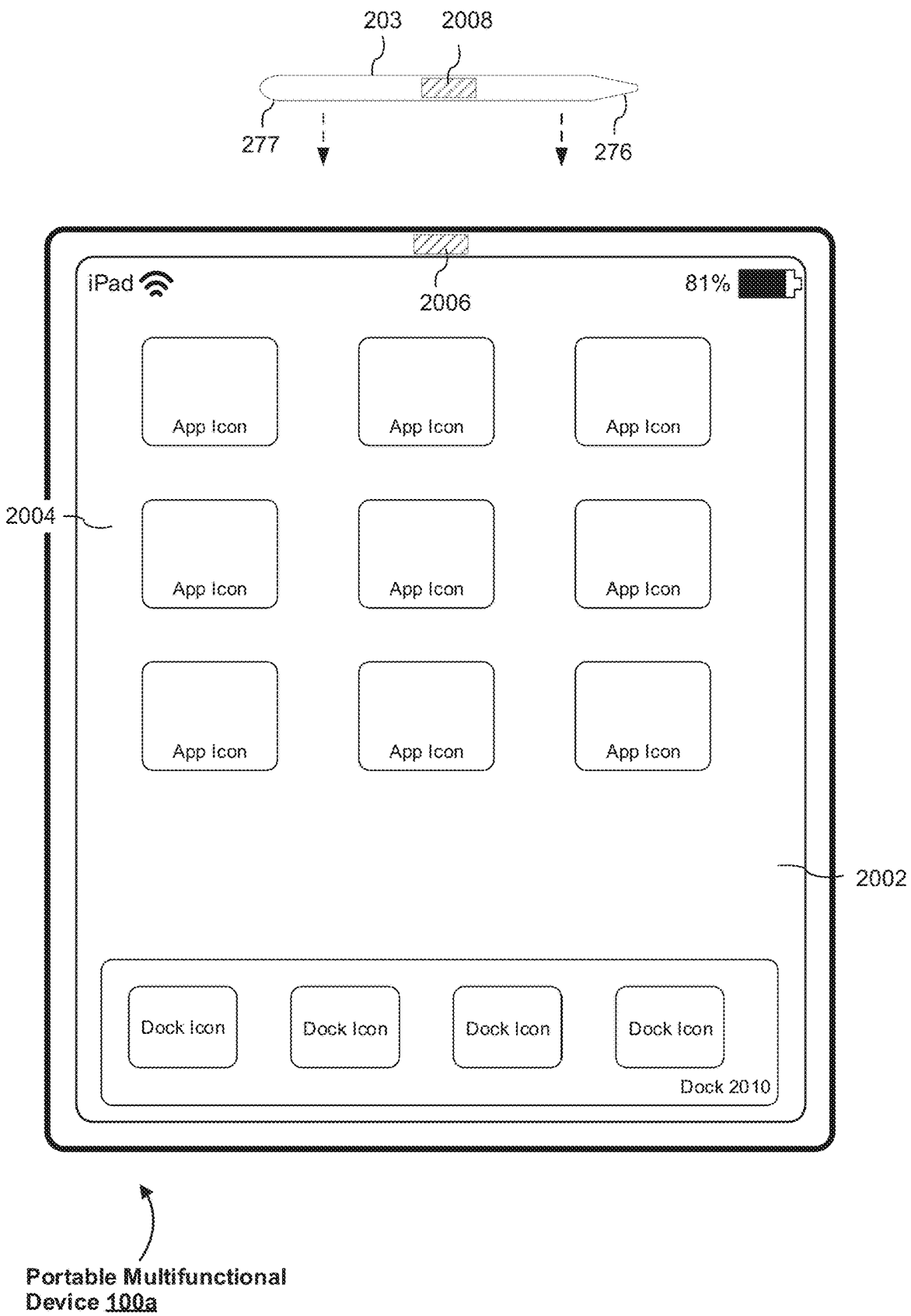
FIGS. 20A-20W are illustrations of example user interfaces providing an interactive stylus tutorial in accordance with some embodiments.

Below, FIGS. 1A-1B, 2-4, 5A-5B, and 6A-6B provide a description of example devices. FIGS. 7A-7Y illustrate example user interfaces for changing application states in accordance with some embodiments. The user interfaces in FIGS. 7A-7Y are used to illustrate the processes in FIGS. 14A-14C. FIGS. 8A-8H illustrate example user interfaces for changing stylus functionality in accordance with some embodiments. The user interfaces in FIGS. 8A-8H are used to illustrate the processes in FIGS. 15A-15B. FIGS. 9A-9P illustrate example user interfaces of modifying touch input functionality in accordance with some embodiments. The user interfaces in FIGS. 9A-9P are used to illustrate the processes in FIGS. 16A-16B. FIGS. 10A-10I illustrate example user interfaces for performing operations on existing marks based on finger manipulation inputs in accordance with some embodiments. The user interfaces in FIGS. 10A-10I are used to illustrate the processes in FIGS. 17A-17C. FIGS. 11A-11O illustrate example user interfaces for performing finger manipulations to a stylus in order to navigate within a menu in accordance with some embodiments. The user interfaces in FIGS. 11A-11O are used to illustrate the processes in FIGS. 18A-18B. FIGS. 12A-12O illustrate example user interfaces for displaying user interface elements based on hover distance of the stylus in accordance with some embodiments. The user interfaces in FIGS. 12A-12O are used to illustrate the processes in FIGS. 19A-19C. FIGS. 20A-20W illustrate example user interfaces providing an interactive stylus tutorial in accordance with some embodiments. The user interfaces in FIGS. 20-20W are used to illustrate the processes in FIGS. 24A-24C. FIGS. 21A-21AB illustrate example user interfaces for selecting stylus settings and drawing marks based on the stylus settings in accordance with some embodiments. The user interfaces in FIGS. 21A-21AB are used to illustrate the processes in FIGS. 25A-25B. FIGS. 22A-22G illustrate example user interfaces for maintaining stylus settings across electronic devices in accordance with some embodiments. The user interfaces in FIGS. 22A-22G are used to illustrate the processes in FIGS. 26A-26B. FIGS. 23A-23Z illustrate example user interfaces including a color-picker user interface to assign an active color in accordance with some embodiments. The user interfaces in FIGS. 23A-23Z are used to illustrate the processes in FIGS. 27A-27C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the electronic device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the electronic device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The electronic device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the electronic device optionally use at least one common physical user-interface device, such as the touch-sensitive surface. One or more functions of the touch-sensitive surface as well as corresponding information displayed on the electronic device are, optionally, adjusted and/or varied from one application to the next and/or within a respective application. In this way, a common physical architecture (such as the touch-sensitive surface) of the electronic device optionally supports the variety of applications with user interfaces that are intuitive and transparent to the user.

Figure 1A:
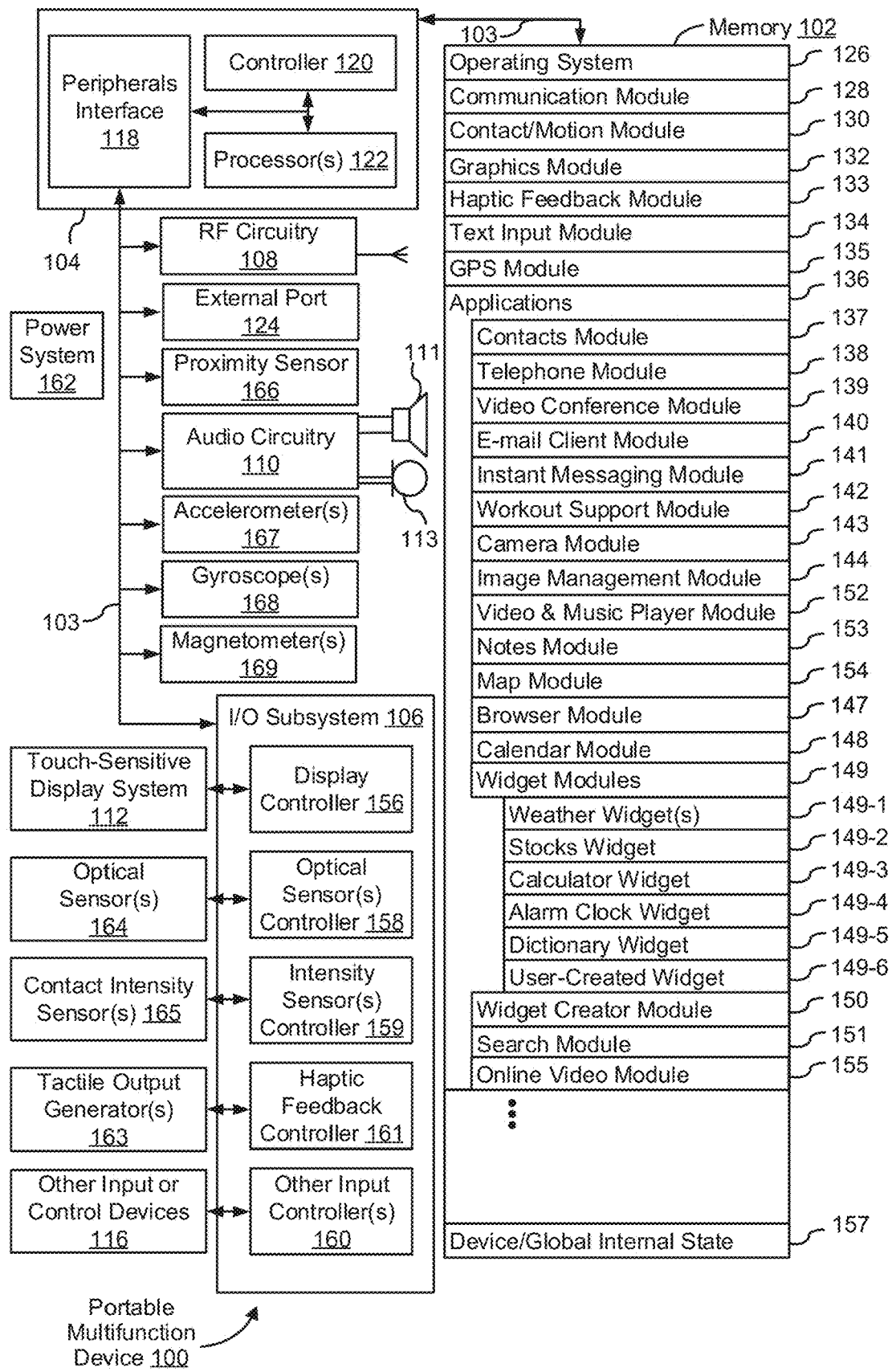
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating a portable multifunction device 100 with touch-sensitive display system 112 in accordance with some embodiments. Touch-sensitive display system 112 is sometimes called a "touch screen" for convenience and is sometimes simply called a touch-sensitive display. The electronic device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. The electronic device 100 optionally includes one or more optical sensors 164. The electronic device 100 optionally includes one or more intensity sensors 165 for detecting intensity of contacts on the electronic device 100 (e.g., a touch-sensitive surface such as touch-sensitive display system 112 of the electronic device 100). The electronic device 100 optionally includes one or more tactile output generators 163 for generating tactile outputs on the electronic device 100 (e.g., generating tactile outputs on a touch-sensitive surface such as touch-sensitive display system 112 of the electronic device 100 or touchpad 355 of device 300). These components optionally communicate over one or more communication buses or signal lines 103.

As used in the specification and claims, the term "tactile output" refers to physical displacement of an electronic device relative to a previous position of the electronic device, physical displacement of a component (e.g., a touch-sensitive surface) of an electronic device relative to another component (e.g., housing) of the electronic device, or displacement of the component relative to a center of mass of the electronic device that will be detected by a user with the user's sense of touch. For example, in situations where the electronic device or the component of the electronic device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the electronic device or the component of the electronic device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," or "roughness"), unless otherwise stated, the generated tactile output corresponds to physical displacement of the electronic device or a component thereof that will generate the described sensory perception for a typical (or average) user.

It should be appreciated that the electronic device 100 is only one example of a portable multifunction device, and that the electronic device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random-access memory and optionally also includes non-volatile memory, such as one or more magnetic disk storage devices, flash memory devices, or other non-volatile solid-state memory devices. Access to memory 102 by other components of the electronic device 100, such as CPU(s) 120 and the peripherals interface 118, is, optionally, controlled by memory controller 122.

Peripherals interface 118 can be used to couple input and output peripherals of the electronic device to CPU(s) 120 and memory 102. The one or more processors 120 run or execute various software programs and/or sets of instructions stored in memory 102 to perform various functions for the electronic device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and the electronic device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on the electronic device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the electronic device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the electronic device translates the rough finger-based input into a precise pointer/cursor position or command for performing the actions desired by the user.

In some embodiments, in addition to the touch screen, the electronic device 100 optionally includes a touchpad (not shown) for activating or deactivating particular functions. In some embodiments, the touchpad is a touch-sensitive area of the electronic device that, unlike the touch screen, does not display visual output. The touchpad is, optionally, a touch-sensitive surface that is separate from touch-sensitive display system 112 or an extension of the touch-sensitive surface formed by the touch screen.

The electronic device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The electronic device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of the electronic device 100, opposite touch-sensitive display system 112 on the front of the electronic device, so that the touch screen is enabled for use as a viewfinder for still and/or video image acquisition. In some embodiments, another optical sensor is located on the front of the electronic device so that the user's image is obtained (e.g., for selfies, for videoconferencing while the user views the other video conference participants on the touch screen, etc.).

The electronic device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of the electronic device 100, opposite touch-screen display system 112 which is located on the front of the electronic device 100.

The electronic device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

The electronic device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). Tactile output generator(s) 163 receive tactile feedback generation instructions from haptic feedback module 133 and generates tactile outputs on the electronic device 100 that are capable of being sensed by a user of the electronic device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of the electronic device 100) or laterally (e.g., back and forth in the same plane as a surface of the electronic device 100). In some embodiments, at least one tactile output generator sensor is located on the back of the electronic device 100, opposite touch-sensitive display system 112, which is located on the front of the electronic device 100.

The electronic device 100 optionally also includes one or more accelerometers 167, gyroscopes 168, and/or magnetometers 169 (e.g., as part of an inertial measurement unit (IMU)) for obtaining information concerning the position (e.g., attitude) of the electronic device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. The electronic device 100 optionally includes a GPS (or GLONASS or other global navigation system) receiver (not shown) for obtaining information concerning the location and orientation (e.g., portrait or landscape) of the electronic device 100.

Figure 3:
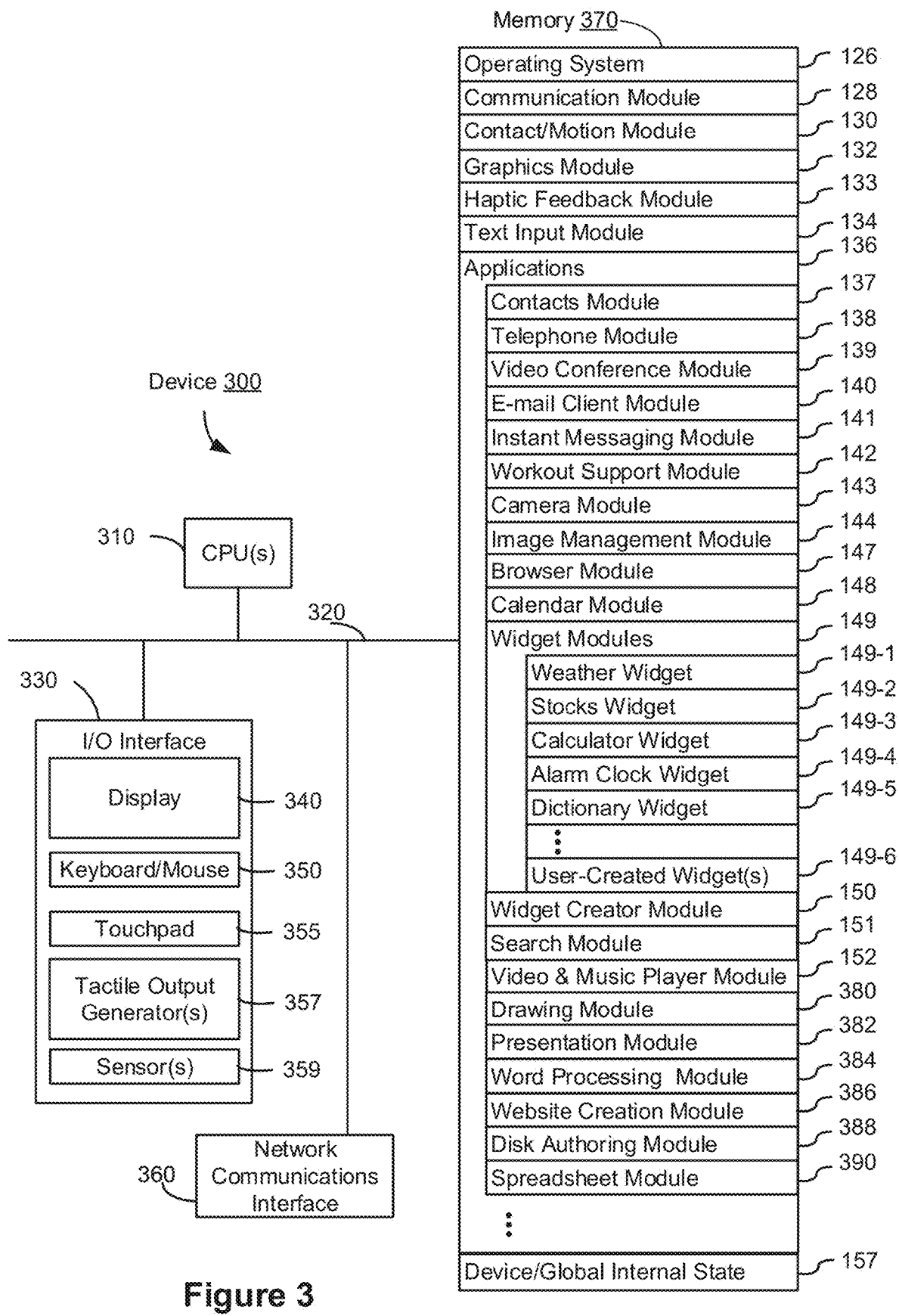
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the electronic device's various sensors and other input or control devices 116; and location and/or positional information concerning the electronic device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Position module 131, in conjunction with accelerometers 167, gyroscopes 168, and/or magnetometers 169, optionally detects positional information concerning the electronic device, such as the electronic device's attitude (e.g., roll, pitch, and/or yaw) in a particular frame of reference. Position module 130 includes software components for performing various operations related to detecting the position of the electronic device and detecting changes to the position of the electronic device. In some embodiments, position module 131 uses information received from a stylus being used with the electronic device to detect positional information concerning the stylus, such as detecting the positional state of the stylus relative to the electronic device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on the electronic device 100 in response to user interactions with the electronic device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the electronic device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154;
- online video module 155; and/or
- annotation application 195, which is used for providing annotations to user interfaces and optionally storing and/or accessing saved annotations 196 in memory 102.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, the electronic device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, the electronic device 100 is an electronic device where operation of a predefined set of functions on the electronic device is performed exclusively through a touch screen and/or a touchpad. By using a touch screen and/or a touchpad as the primary input control device for operation of the electronic device 100, the number of physical input control devices (such as push buttons, dials, and the like) on the electronic device 100 is, optionally, reduced.

The predefined set of functions that are performed exclusively through a touch screen and/or a touchpad optionally include navigation between user interfaces. In some embodiments, the touchpad, when touched by the user, navigates the electronic device 100 to a main, home, or root menu from any user interface that is displayed on the electronic device 100. In such embodiments, a "menu button" is implemented using a touchpad. In some other embodiments, the menu button is a physical push button or other physical input control device instead of a touchpad.

Figure 1B:
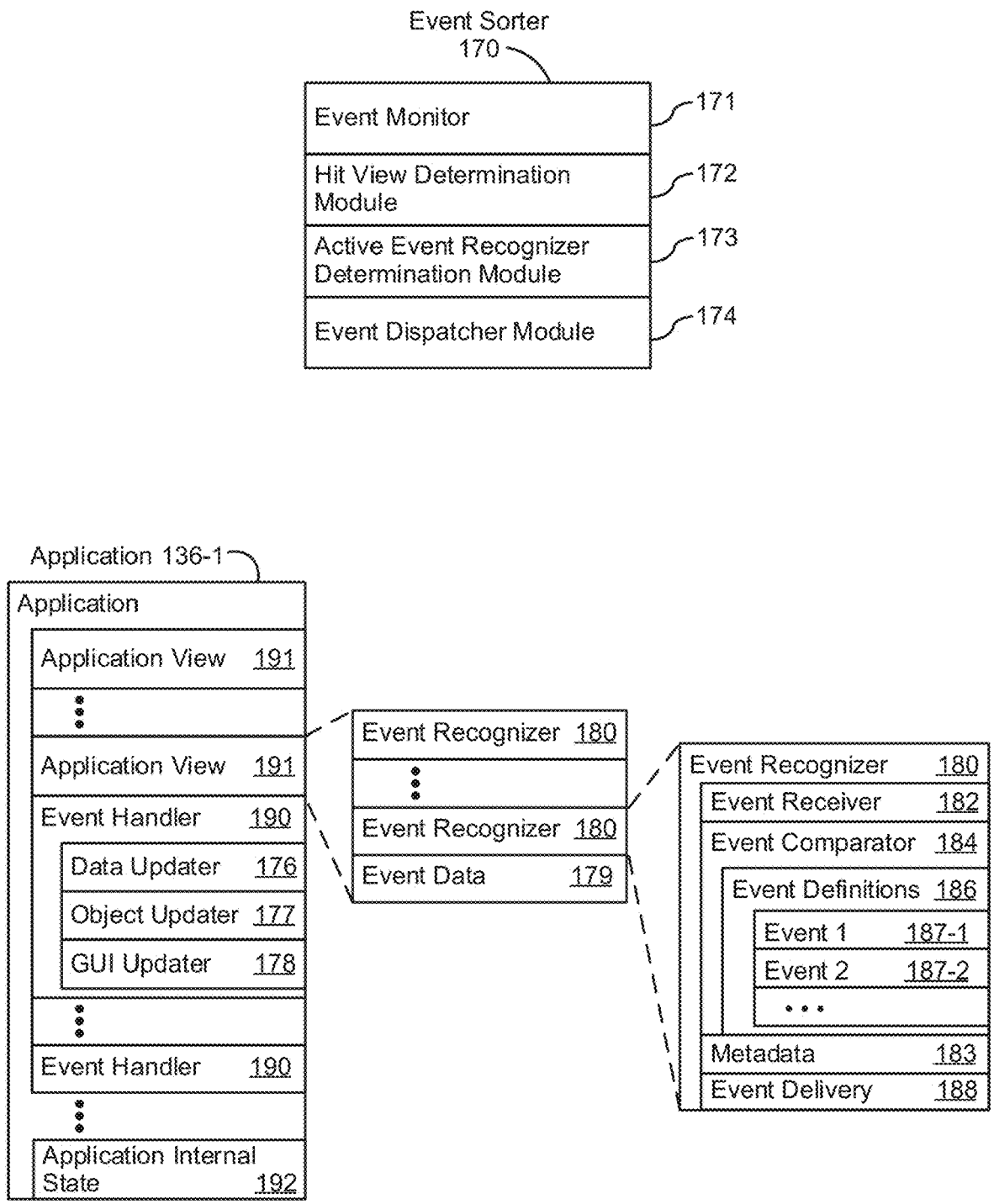
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (in FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173. Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the electronic device from one orientation to another (e.g., from a portrait orientation to a landscape orientation, or vice versa), and the event information includes corresponding information about the current orientation (also called device attitude) of the electronic device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137 or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the electronic device; oral instructions; detected eye movements; biometric inputs; and/or any combination thereof are optionally utilized as inputs corresponding to sub-events which define an event to be recognized.

Figure 2:
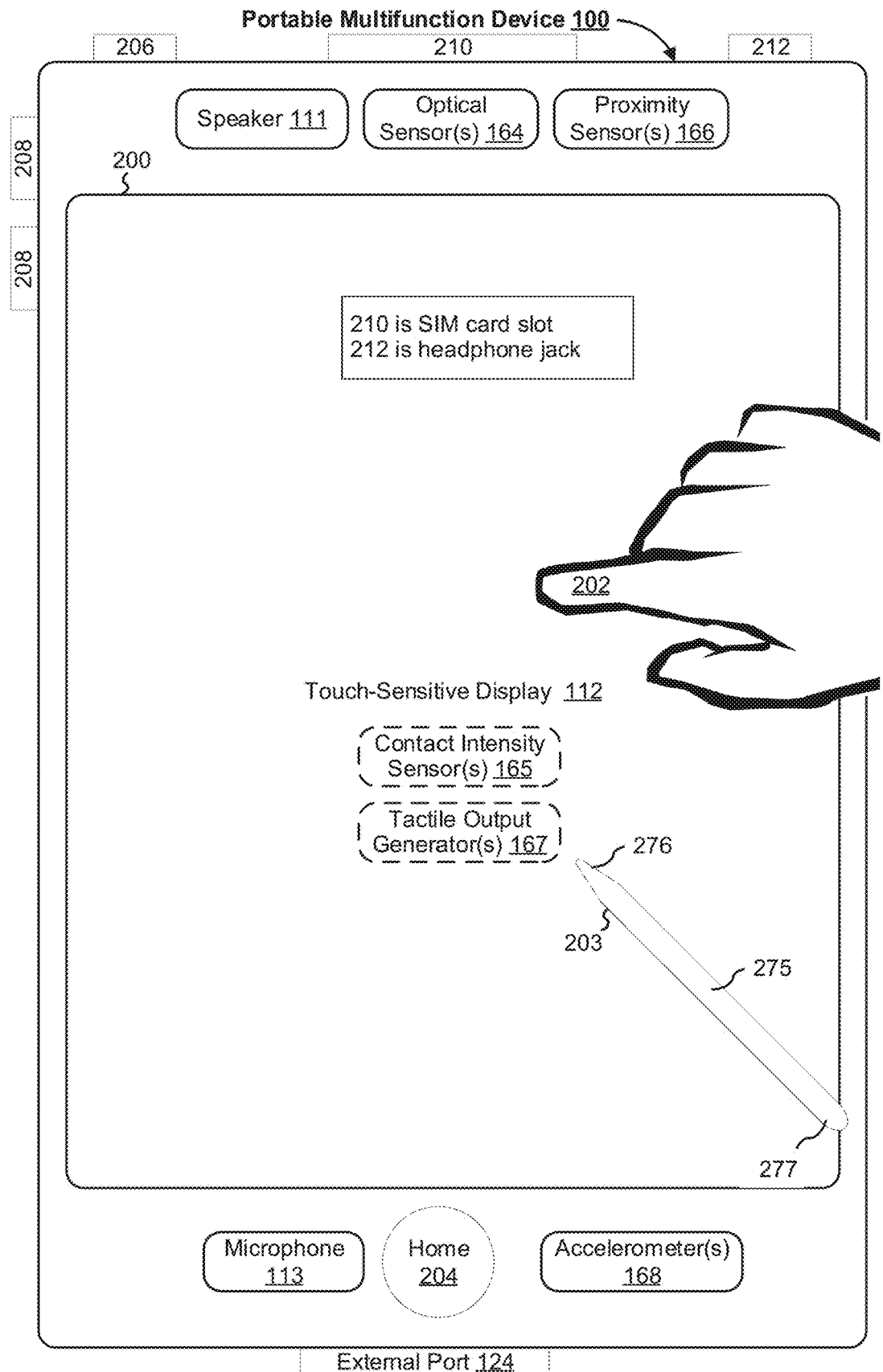
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with the electronic device 100. In some embodiments or circumstances, inadvertent contact with a graphic does not select the graphic. For example, a swipe gesture that sweeps over an application icon optionally does not select the corresponding application when the gesture corresponding to selection is a tap.

The stylus 203 includes a first end 276 and a second end 277. In various embodiments, the first end 276 corresponds to a tip of the stylus 203 (e.g., the tip of a pencil) and the second end 277 corresponds to the opposite or bottom end of the stylus 203 (e.g., the eraser of the pencil).

The stylus 203 includes a touch-sensitive surface 275 to receive touch inputs from a user. In some embodiments, the touch-sensitive surface 275 corresponds to a capacitive touch element. The stylus 203 includes a sensor or set of sensors that detect inputs from the user based on haptic and/or tactile contact with the touch-sensitive surface 275. In some embodiments, the stylus 203 includes any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive surface 275. Because the stylus 203 includes a variety of sensors and types of sensors, the stylus 203 can detect different a variety of inputs from the user, including the gestured disclosed herein with respect to the touch screen of the portable multifunction device 100. In some embodiments, the one or more sensors can detect a single touch input or successive touch inputs in response to a user tapping once or multiple times on the touch-sensitive surface 275. In some embodiments, the one or more sensors can detect a swipe input on the stylus 203 in response to the user stroking along the touch-sensitive surface 275 with one or more fingers. In some embodiments, if the speed with which the user strokes along the touch-sensitive surface 275 breaches a threshold, the one or more sensors detect a flick input rather than a swipe input.

The stylus 203 also includes one or more sensors that detect orientation (e.g., angular position relative to the electronic device) and/or movement of the stylus 203, such as an accelerometer, magnetometer, gyroscope, and/or the like. The one or more sensors can detect a variety of rotational movements of the stylus 203 by the user, including the type and direction of the rotation. For example, the one or more sensors can detect the user rolling and/or twirling the stylus 203, and can detect the direction (e.g., clockwise or counterclockwise) of the rolling/twirling. In some embodiments, the detected input depends on the angular position of the first end 276 and the second end 277 of the stylus 203 relative to the electronic device. For example, in some embodiments, if the stylus 203 is substantially perpendicular to the electronic device and the second end 277 (e.g., the eraser) is nearer to the electronic device, then contacting the surface of the electronic device with the second end 277 results in an erase operation. On the other hand, if the stylus 203 is substantially perpendicular to the electronic device and the first end 276 (e.g., the tip) is nearer to the electronic device, then contacting the surface of the electronic device with the first end 276 results in a marking operation.

The electronic device 100 optionally also includes one or more physical buttons, such as "home" or menu button 204. As described previously, menu button 204 is, optionally, used to navigate to any application 136 in a set of applications that are, optionally executed on the electronic device 100. Alternatively, in some embodiments, the menu button is implemented as a soft key in a GUI displayed on the touch-screen display.

In some embodiments, the electronic device 100 includes the touch-screen display, menu button 204, push button 206 for powering the electronic device on/off and locking the electronic device, volume adjustment button(s) 208, Subscriber Identity Module (SIM) card slot 210, head set jack 212, and docking/charging external port 124. Push button 206 is, optionally, used to turn the power on/off on the electronic device by depressing the button and holding the button in the depressed state for a predefined time interval; to lock the electronic device by depressing the button and releasing the button before the predefined time interval has elapsed; and/or to unlock the electronic device or initiate an unlock process. In some embodiments, the electronic device 100 also accepts verbal input for activation or deactivation of some functions through microphone 113. The electronic device 100 also, optionally, includes one or more contact intensity sensors 165 for detecting intensity of contacts on touch-sensitive display system 112 and/or one or more tactile output generators 163 for generating tactile outputs for a user of the electronic device 100.

FIG. 3 is a block diagram of an example multifunction device 300 with a display and a touch-sensitive surface in accordance with some embodiments. The electronic device 300 need not be portable. In some embodiments, the electronic device 300 is a laptop computer, a desktop computer, a tablet computer, a multimedia player device, a navigation device, an educational device (such as a child's learning toy), a gaming system, or a control device (e.g., a home or industrial controller). The electronic device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on the electronic device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. Memory 370 optionally includes one or more storage devices remotely located from CPU(s) 310. In some embodiments, memory 370 stores programs, modules, and data structures analogous to the programs, modules, and data structures stored in memory 102 of the portable multifunction device 100 (FIG. 1A), or a subset thereof. Furthermore, memory 370 optionally stores additional programs, modules, and data structures not present in memory 102 of the portable multifunction device 100. For example, memory 370 of device 300 optionally stores drawing module 380, presentation module 382, word processing module 384, website creation module 386, disk authoring module 388, and/or spreadsheet module 390, while memory 102 of the portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
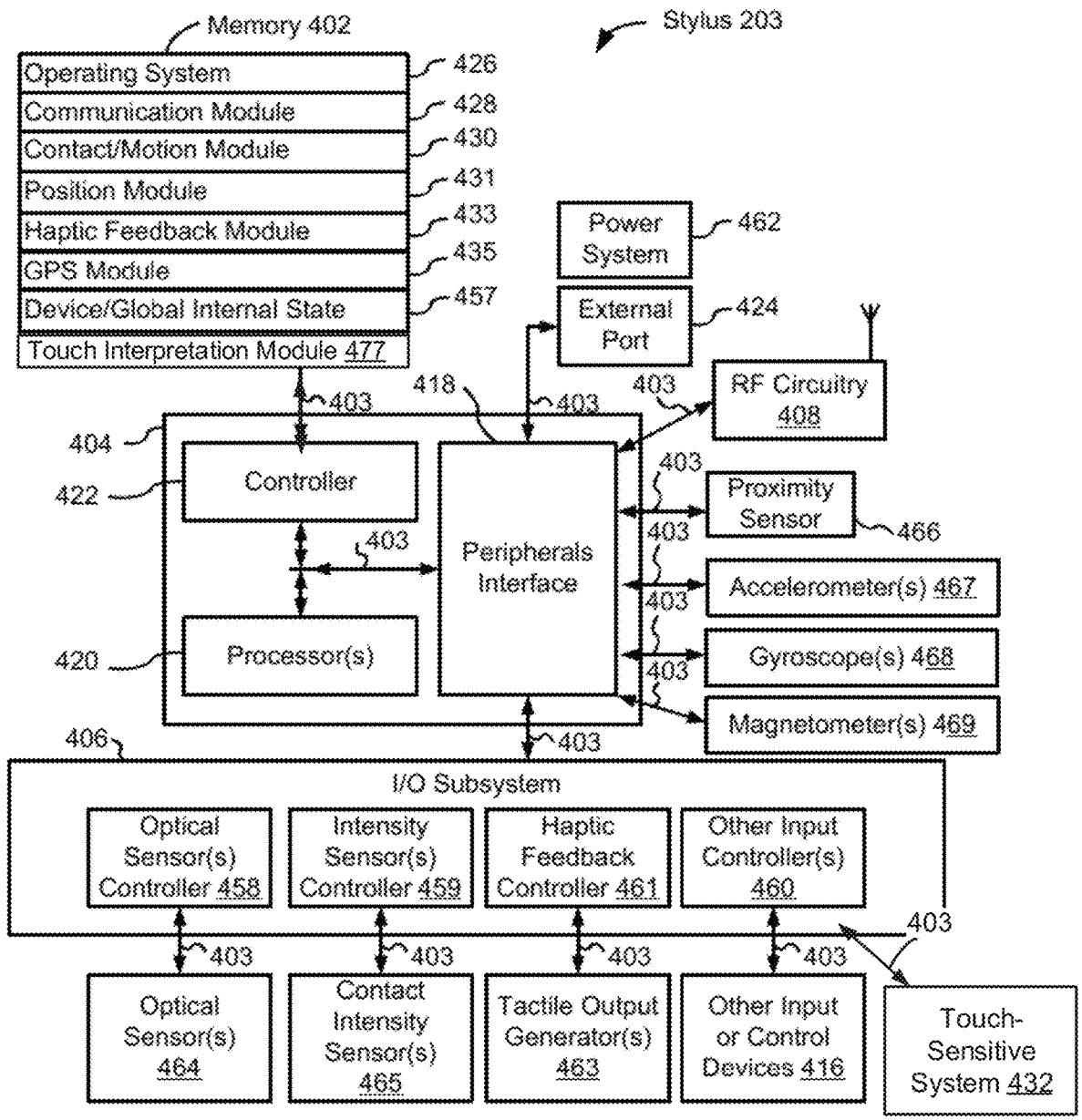
FIG. 4 is a block diagram of an example electronic stylus in accordance with some embodiments.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensity of contacts of stylus 203 on the electronic device 100 (e.g., when stylus 203 is used with a touch-sensitive surface such as touch-sensitive display system 112 of the electronic device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random-access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with the electronic device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 receive/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 receive light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 receive contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., the electronic device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). Tactile output generator(s) 463 receive tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 469 (e.g., as part of an inertial measurement unit (IMU)) for obtaining information concerning the location and positional state of stylus 203. FIG. 4 shows sensors 467, 468, and 469 coupled with peripherals interface 418. Alternately, sensors 467, 468, and 469 are, optionally, coupled with an input controller 460 in I/O subsystem 406. Stylus 203 optionally includes a GPS (or GLONASS or other global navigation system) receiver (not shown) for obtaining information concerning the location of stylus 203.

The Stylus 203 includes a touch-sensitive system 432. The touch-sensitive system 432 detects inputs received at the touch-sensitive surface 275. These inputs include the inputs discussed herein with respect to the touch-sensitive surface 275 of the stylus 203. For example, the touch-sensitive system 432 can detect tap, twirl, roll, flick, and swipe inputs. The touch-sensitive system 432 coordinates with a touch interpretation module 477 in order to decipher the particular kind of touch input received at the touch-sensitive surface 275 (e.g., twirl/roll/flick/swipe/etc.).

Figure 5B:
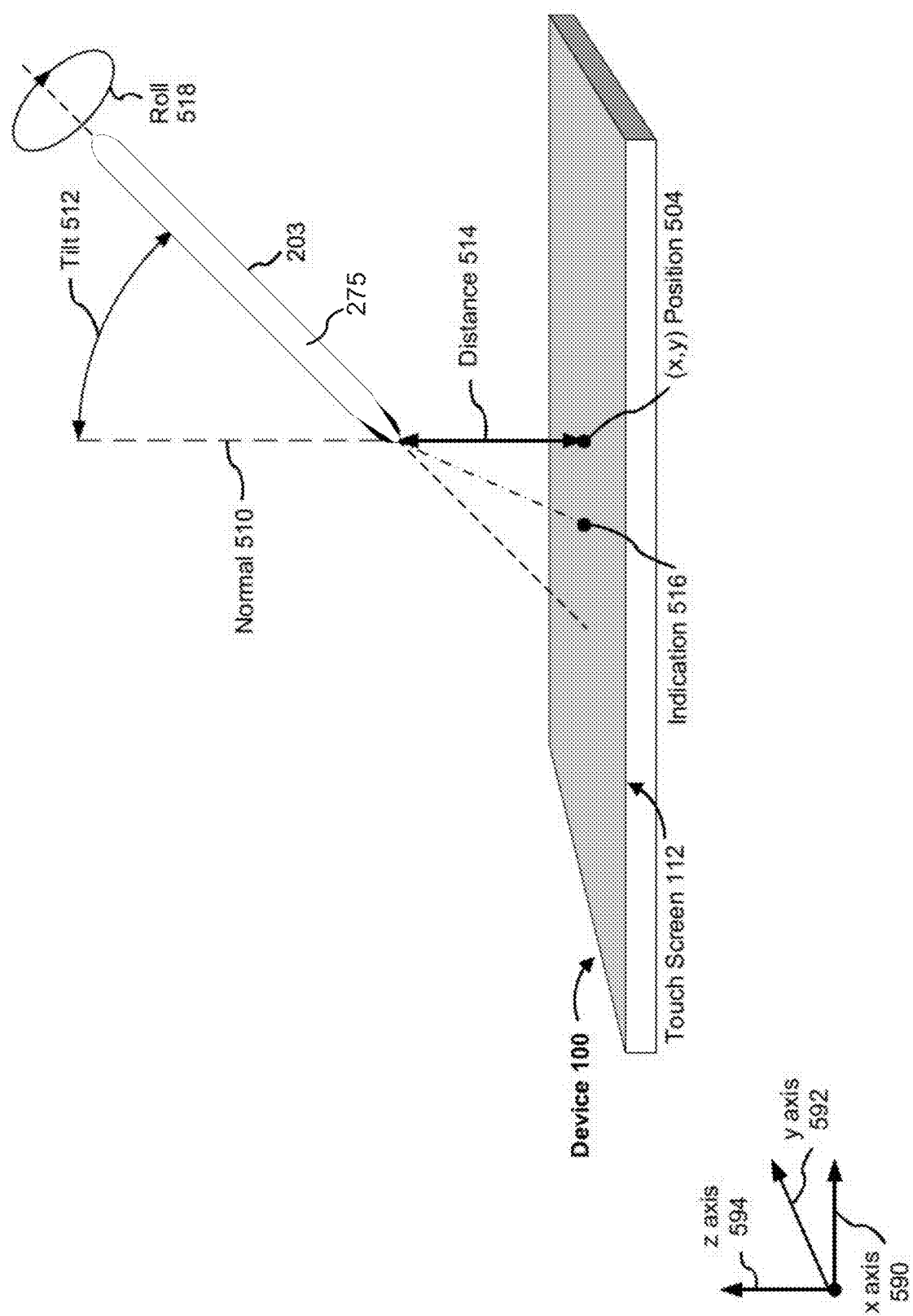

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Moreover, although not depicted, the memory 402 includes the touch interpretation module 477. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to an electronic device (e.g., the electronic device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of the electronic device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of the electronic device 100), and determining if the contact has ceased (e.g., detecting a lift-off event or a break in contact). In some embodiments, contact/motion module 430 receives contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the electronic device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the electronic device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431, in conjunction with accelerometers 467, gyroscopes 468, and/or magnetometers 469, optionally detects stylus movement gestures, such as flicks, taps, and rolls of the stylus. Position module 431 includes software components for performing various operations related to detecting the position of the stylus and detecting changes to the position of the stylus in a particular frame of reference. In some embodiments, position module 431 detects the positional state of the stylus relative to the electronic device and detects changes to the positional state of the stylus relative to the electronic device. As noted above, in some embodiments, the electronic device 100 or 300 determines the positional state of the stylus relative to the electronic device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

The touch interpretation module 477 coordinates with the touch-sensitive system 432 in order to determine (e.g., decipher or identify) the type of touch input received at the touch-sensitive surface 275 of the stylus 203. For example, the touch interpretation module 477 determines that the touch input corresponds to a swipe input (as opposed to a tap input) if the user stroked a sufficient distance across the touch-sensitive surface 275 in a sufficiently short amount of time. As another example, the touch interpretation module 477 determines that the touch input corresponds to a flick input (as opposed to a swipe input) if the speed with which user stroked across the touch-sensitive surface 275 was sufficiently faster than the speech corresponding to a swipe input. The threshold speeds of strokes can be preset and can be changed. In various embodiments, the pressure and/or force with which the touch is received at the touch-sensitive surface determines the type of input. For example, a light touch can correspond to a first type of input while a harder touch can correspond to a second type of input.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of the electronic device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., the electronic device 100). For example, the stylus measures the tilt (e.g., tilt 512, FIG. 5B) and/or the orientation (e.g., orientation 506, FIG. 5A) of the stylus and sends the measurement to the electronic device 100. In some embodiments, the positional state is detected in accordance with raw output, from one or more electrodes in the stylus, that is sensed by a touch-sensitive surface (e.g., touch screen 112 of the electronic device 100) instead of, or in combination with positional state detected in accordance with one or more measurements from stylus 203. For example, the touch-sensitive surface receives raw output from one or more electrodes in the stylus and calculates the tilt and/or the orientation of the stylus based on the raw output (optionally, in conjunction with positional state information provided by the stylus based on sensor measurements generated by the stylus).

FIG. 5A illustrates stylus 203 relative to a touch-sensitive surface (e.g., touch screen 112 of the electronic device 100) from a viewpoint directly above the touch-sensitive surface, in accordance with some embodiments. In FIG. 5A, z axis 594 points out of the page (i.e., in a direction normal to a plane of touch screen 112), x axis 590 is parallel to a first edge (e.g., a length) of touch screen 112, y axis 592 is parallel to a second edge (e.g., a width) of touch screen 112, and y axis 592 is perpendicular to x axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x axis 590 and y axis 592, as shown in FIG. 5A, or a pair of axes associated with an application displayed on touch screen 112).

In some embodiments, an indication (e.g., indication 516) is displayed on a touch-sensitive display (e.g., touch screen 112 of the electronic device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels.

FIG. 5B illustrates stylus 203 relative to a touch-sensitive surface (e.g., touch screen 112 of the electronic device 100) from a side viewpoint of the touch-sensitive surface, in accordance with some embodiments. In FIG. 5B, z axis 594 points in a direction normal to the plane of touch screen 112, x axis 590 is parallel to a first edge (e.g., a length) of touch screen 112, y axis 592 is parallel to a second edge (e.g., a width) of touch screen 112, and y axis 592 is perpendicular to x axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to they axis. Similarly, a "z axis" is distinct from the "x axis" and the "y axis," and is typically perpendicular to both the "x axis" and the "y axis."

Further, FIG. 5B illustrates roll 518, a rotation about the length (long axis) of stylus 203.

Attention is now directed towards embodiments of user interfaces ("UI") that are, optionally, implemented on a portable multifunction device 100.

Figure 6A:
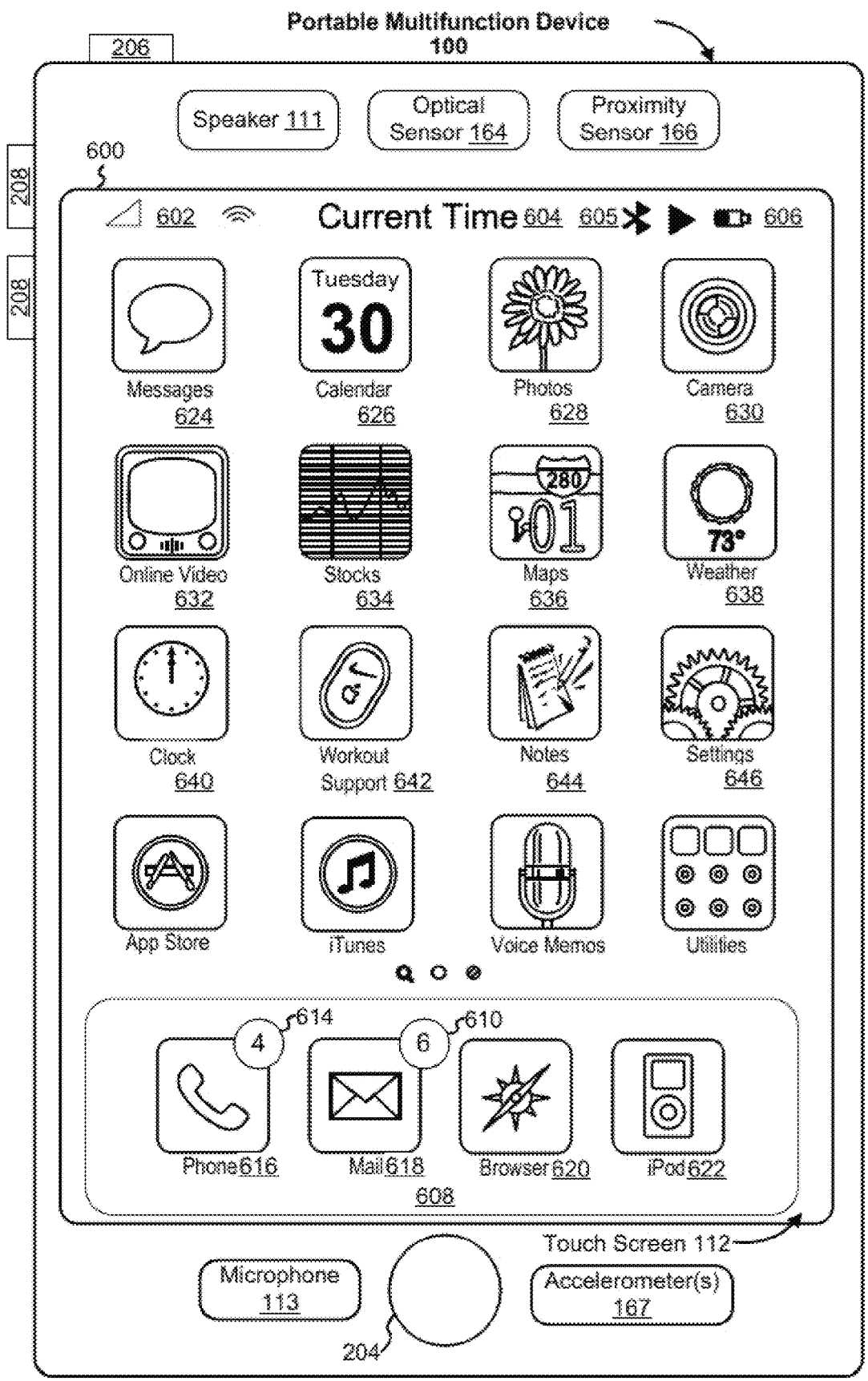
FIG. 6A illustrates an example user interface for a menu of applications on a portable multifunction device in accordance with some embodiments.
Figure 7A:
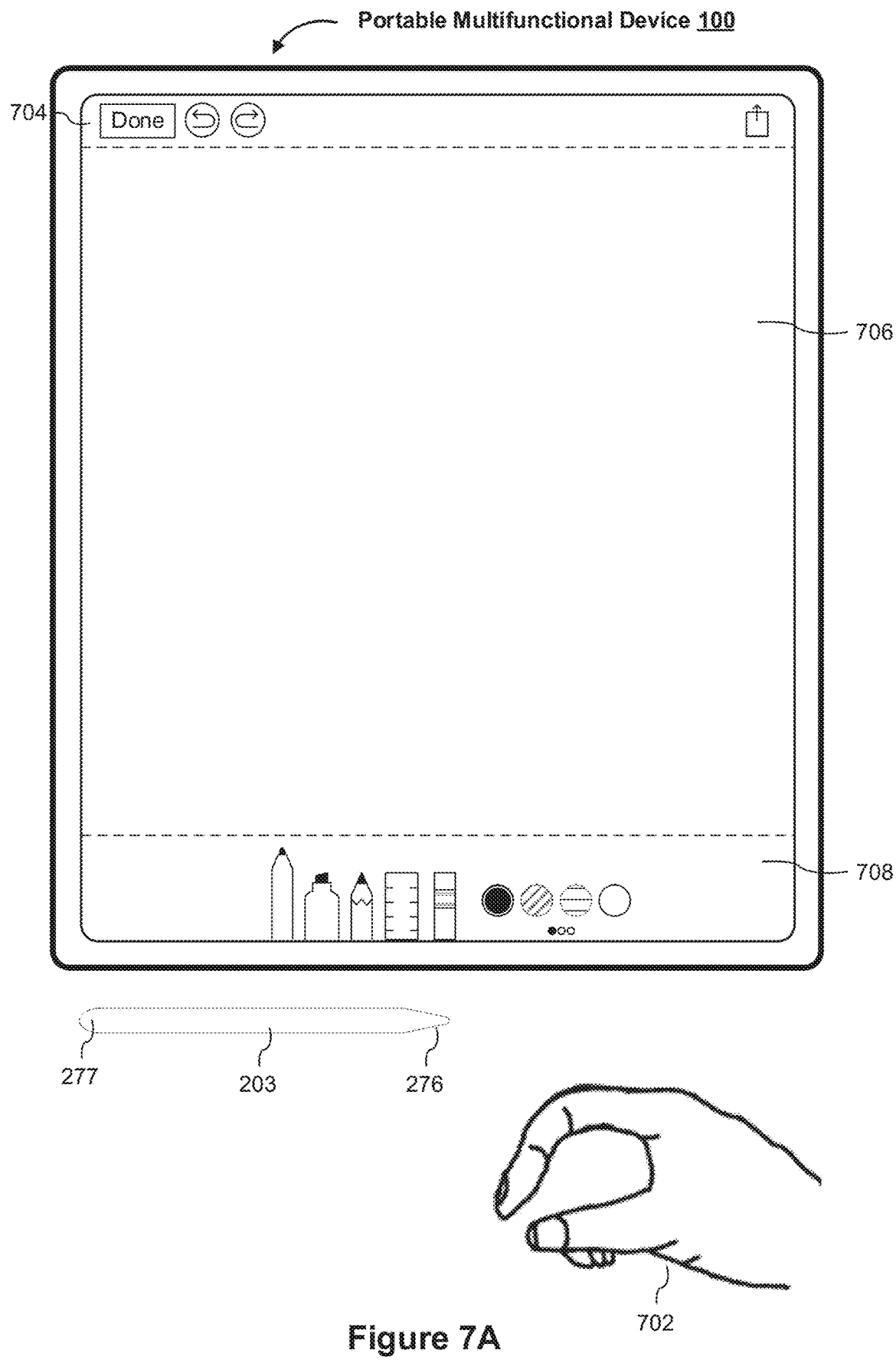
FIGS. 7A-7Y illustrate example user interfaces for changing application states in accordance with some embodiments.

FIG. 6A illustrates an exemplary user interface for a menu of applications on the portable multifunction device 100 in accordance with some embodiments. Similar user interfaces are, optionally, implemented on the electronic device 300. In some embodiments, user interface 600 includes the following elements, or a subset or superset thereof:

Signal strength indicator(s) 602 for wireless communication(s), such as cellular and Wi-Fi signals;
Time 604;
BLUETOOTH indicator 605;
Battery status indicator 606;
Tray 608 with icons for frequently used applications, such as:
Icon 616 for telephone module 138, labeled "Phone," which optionally includes an indicator 614 of the number of missed calls or voicemail messages;

Icon 618 for e-mail client module 140, labeled "Mail," which optionally includes an indicator 610 of the number of unread e-mails;

Icon 620 for browser module 147, labeled "Browser;" and

Icon 622 for video and music player module 152, also referred to as iPod® (trademark of Apple Inc.) module 152, labeled "iPod;" and Icons for other applications, such as:

Icon 624 for IM module 141, labeled "Messages;"

Icon 626 for calendar module 148, labeled "Calendar;"

Icon 628 for image management module 144, labeled "Photos;"

Icon 630 for camera module 143, labeled "Camera;"

Icon 632 for video editing module 155, labeled "Video Editing;"

Icon 634 for stocks widget 149-2, labeled "Stocks;"

Icon 636 for map module 154, labeled "Map;"

Icon 638 for weather widget 149-1, labeled "Weather;"

Icon 640 for alarm clock widget 149-4, labeled "Clock;"

Icon 642 for workout support module 142, labeled "Workout Support;"

Icon 644 for notes module 153, labeled "Notes;" and

Icon 646 for a settings application or module, which provides access to settings for the electronic device 100 and its various applications 136.

It should be noted that the icon labels illustrated in FIG. 6A are merely examples. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 6B illustrates an exemplary user interface on an electronic device (e.g., device 300, FIG. 3) with a touch-sensitive surface 651 (e.g., a tablet or touchpad 355, FIG. 3) that is separate from the display 650. Device 300 also, optionally, includes one or more contact intensity sensors (e.g., one or more of sensors 359) for detecting intensity of contacts on touch-sensitive surface 651 and/or one or more tactile output generators 357 for generating tactile outputs for a user of device 300.

FIG. 6B illustrates an exemplary user interface on an electronic device (e.g., device 300, FIG. 3) with a touch-sensitive surface 651 (e.g., a tablet or touchpad 355, FIG. 3) that is separate from the display 650. Although many of the examples that follow will be given with reference to inputs on touch screen display 112 (where the touch-sensitive surface and the display are combined), in some embodiments, the electronic device 100 detects inputs on a touch-sensitive surface that is separate from the display, as shown in FIG. 6B. In some embodiments, the touch-sensitive surface (e.g., 651 in FIG. 6B) has a primary axis (e.g., 652 in FIG. 6B) that corresponds to a primary axis (e.g., 653 in FIG. 6B) on the display (e.g., 650). In accordance with these embodiments, the electronic device 100 detects contacts (e.g., 660 and 662 in FIG. 6B) with the touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the electronic device on the touch-sensitive surface (e.g., 651 in FIG. 6B) are used by the electronic device to manipulate the user interface on the display (e.g., 650 in FIG. 6B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.) and/or stylus inputs, it should be understood that, in some embodiments, one or more of the finger inputs are replaced with input from another input device (e.g., a mouse-based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts (or stylus contacts) are, optionally, used simultaneously.

User Interfaces and Associated Processes

Attention is now directed towards embodiments of user interfaces ("UI") and associated processes that may be implemented on an electronic device, such as the portable multifunction device 100 in FIG. 1 or the electronic device 300 in FIG. 3, with a touch-sensitive display and optionally one or more sensors to detect signals from a stylus associated with the electronic device.

FIGS. 7A-7Y illustrate example user interfaces for changing application states in accordance with some embodiments. The user interfaces in these figures are used to illustrate the processes described below, including the processes in FIGS. 14A-14C. Although some of the examples which follow will be given with reference to inputs on a touch-screen display (where the touch-sensitive surface and the display are combined, for example on touch screen 112), in some embodiments, the electronic device 100 detects inputs on touch-sensitive surface 651 that is separate from display 650, as shown in FIG. 6B. In various embodiments, the electronic device 100 changes application states based on data received from a stylus 203.

In various embodiments, the touch-sensitive surface (e.g., the touch-sensitive surface 275 in FIG. 2 and FIGS. 5A-5B) of the stylus 203 detects touch inputs and gesture inputs, or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, a flick, a swipe, a tap, a double tap, and/or the like.

In various embodiments, the orientation and/or movement sensors (e.g., accelerometer, magnetometer, gyroscope) of the stylus 203 detect orientation/movement inputs or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, barrel rotation and/or direction thereof, twirl and/or direction thereof, orientation (e.g., position) of the tip 276 and/or the end 277 of the stylus 203 relative to a reference plane, and/or the like.

Figure 7B:
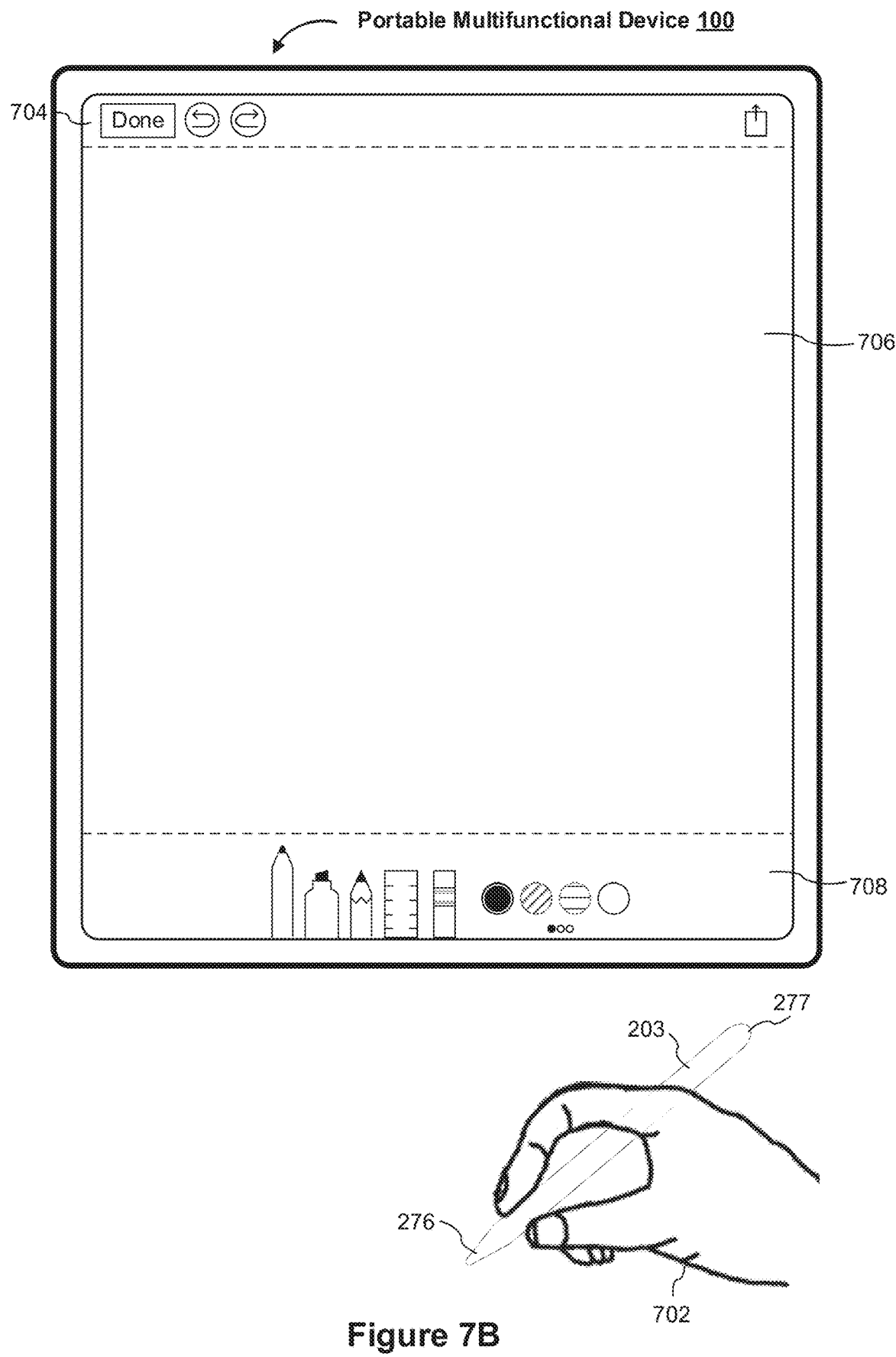
Figure 7C:
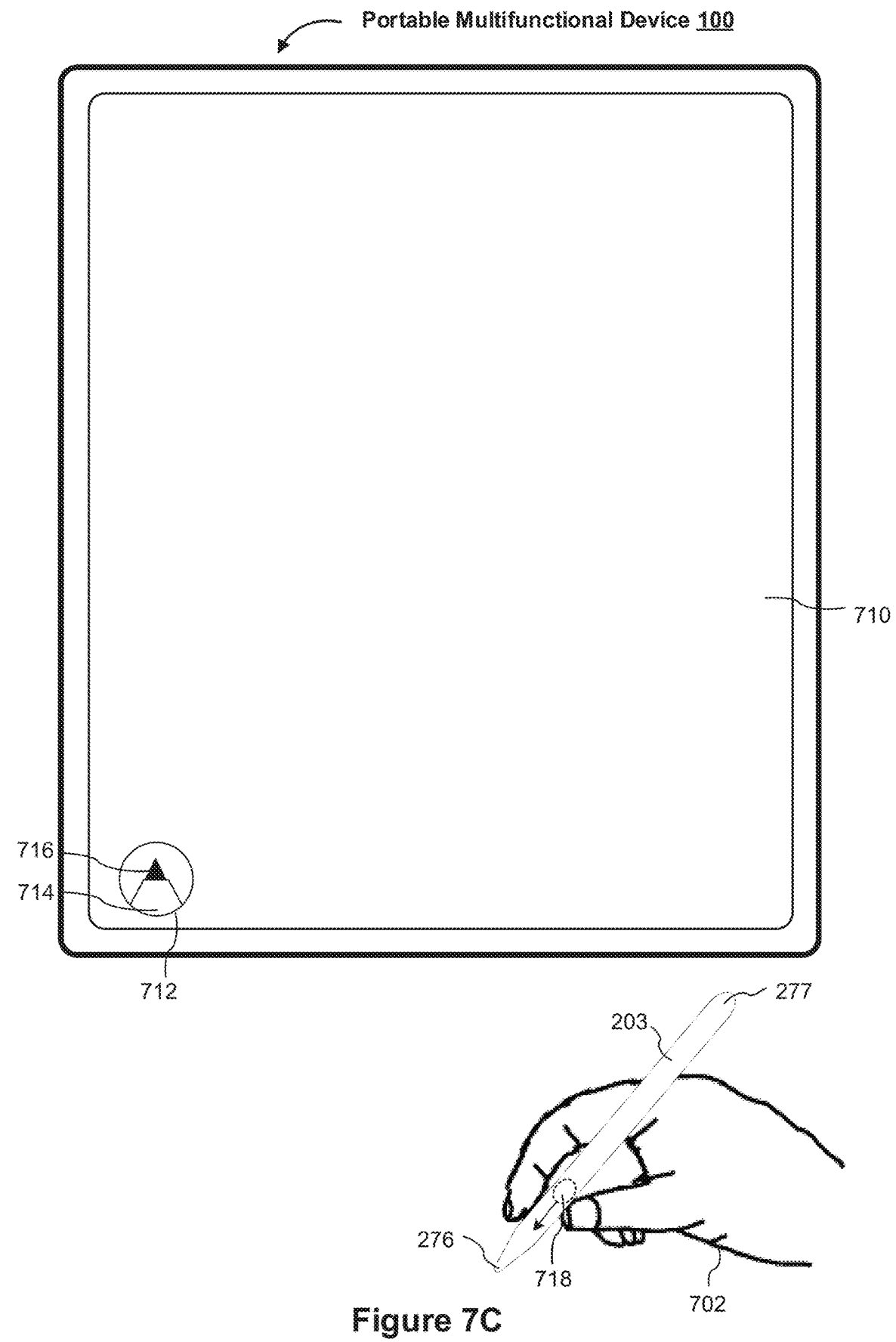

FIGS. 7A-7C show a sequence in which the electronic device 100 transitions from a first state to a second state according to a determination that a stylus 203 is being held by a user and displays a visual indication associated with the second state. FIG. 7A illustrates the electronic device 100 in a first state in which the stylus 203 is not being held by the hand of the user 702. The stylus 203 includes a tip 276 and an end 277 opposite the tip 276. As illustrated in FIG. 7A, the electronic device 100 displays a navigation region 704, a canvas region 706, and a toolbar region 708. The navigation region 704, the canvas region 706, and the toolbar region 708 are associated with a stylus-compatible application, such as a drawing application (e.g., a Notes or Drawing application).

As illustrated in FIG. 7B, the stylus 203 detects that it is being held by the hand of the user 702. This can occur when the hand of the user 702 takes hold of the stylus 203. In response to receiving data from the stylus 203 indicating that it is being held by the hand of the user 702, the electronic device 100 transitions from the first state to the second state. As illustrated in FIG. 7C, in the second state, the electronic device 100 ceases to display the navigation region 704, the canvas region 706, and the toolbar region 708. The electronic device 100 displays an enlarged canvas region 710 and a visual indicator 712 in order to indicate that the electronic device 100 is in the second state. The visual indicator 712 includes a marker icon 714 with a solid tip 716 in order to indicate that the stylus 203 would make solid marker marks on the enlarged canvas region 710. One of ordinary skill in the art will appreciate that the visual indicator 712 may take a variety of forms.

Figure 7D:
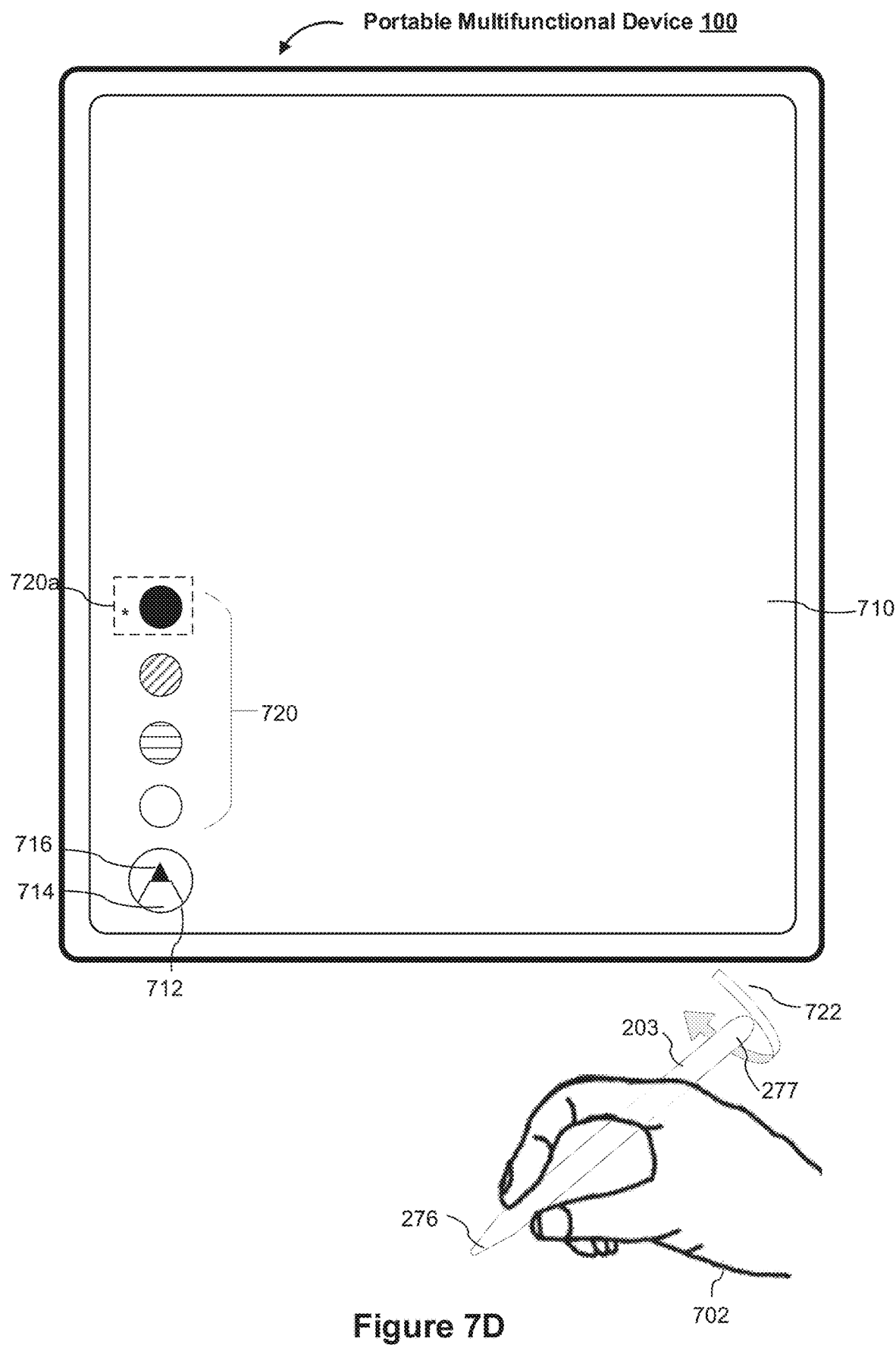

FIG. 7C-7H show various operations performed in the second state based on manipulation inputs received at the stylus 203. As described above, FIG. 7C illustrates the electronic device 100 in the second state. As illustrated in FIG. 7C, the stylus 203 detects a downward swipe gesture 718. In response to receiving manipulation input data from the stylus 203 indicating the downward swipe gesture 718, the electronic device 100 displays a color palette 720 adjacent to the visual indicator 712 in FIG. 7D. The color palette 720 includes four color indicators, each corresponding to different colors or patterns for the marker markup tool. One or ordinary skill in the art will appreciate that the color indicators in the color palette 720 may include a variety of styles and colors. FIG. 7D illustrates that the solid fill indicator 720a associated with solid marks is currently selected within the color palette 720 (e.g., currently selected). For example, the solid fill indicator 720a corresponds to the solid tip 716 of the marker icon 714.

As illustrated in FIG. 7D, the stylus 203 detects a rotational manipulation 722 in a counter-clockwise (from above) direction. One of ordinary skill in the art will appreciate that the stylus 203 may be rotated according to any number of angular manipulations. In response to receiving manipulation input data from the stylus 203 indicating the rotational manipulation 722 in FIG. 7D, the electronic device 100 displays a diagonal fill indicator 720b with focus and the solid fill indicator 720a without focus in FIG. 7E. Moreover, the electronic device 100 displays a corresponding diagonally-striped tip 724 for the marker icon 714 in FIG. 7E in order to indicate that the stylus 203 would make diagonally-striped marks on the enlarged canvas region 710.

Figure 7E:
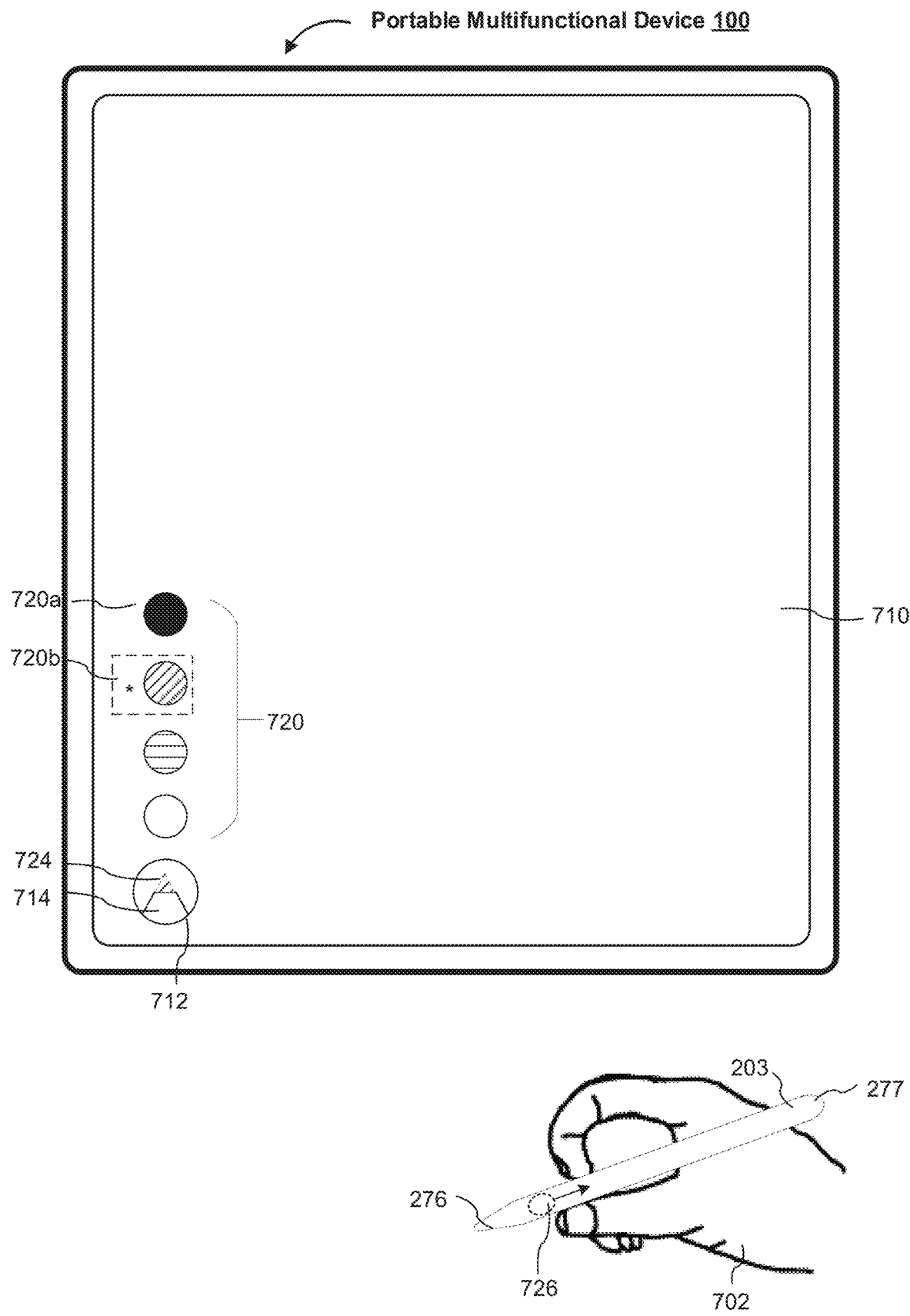

As illustrated in FIG. 7E, the stylus 203 detects an upward swipe gesture 726. In response to receiving manipulation input data from the stylus 203 indicating the upward swipe gesture 726 in FIG. 7E, the electronic device 100 ceases to display the color palette 720 in FIG. 7F. Moreover, the electronic device 100 maintains display of the visual indicator 712 including the marker icon 714 with the diagonally-striped tip 724.

Figure 7F:
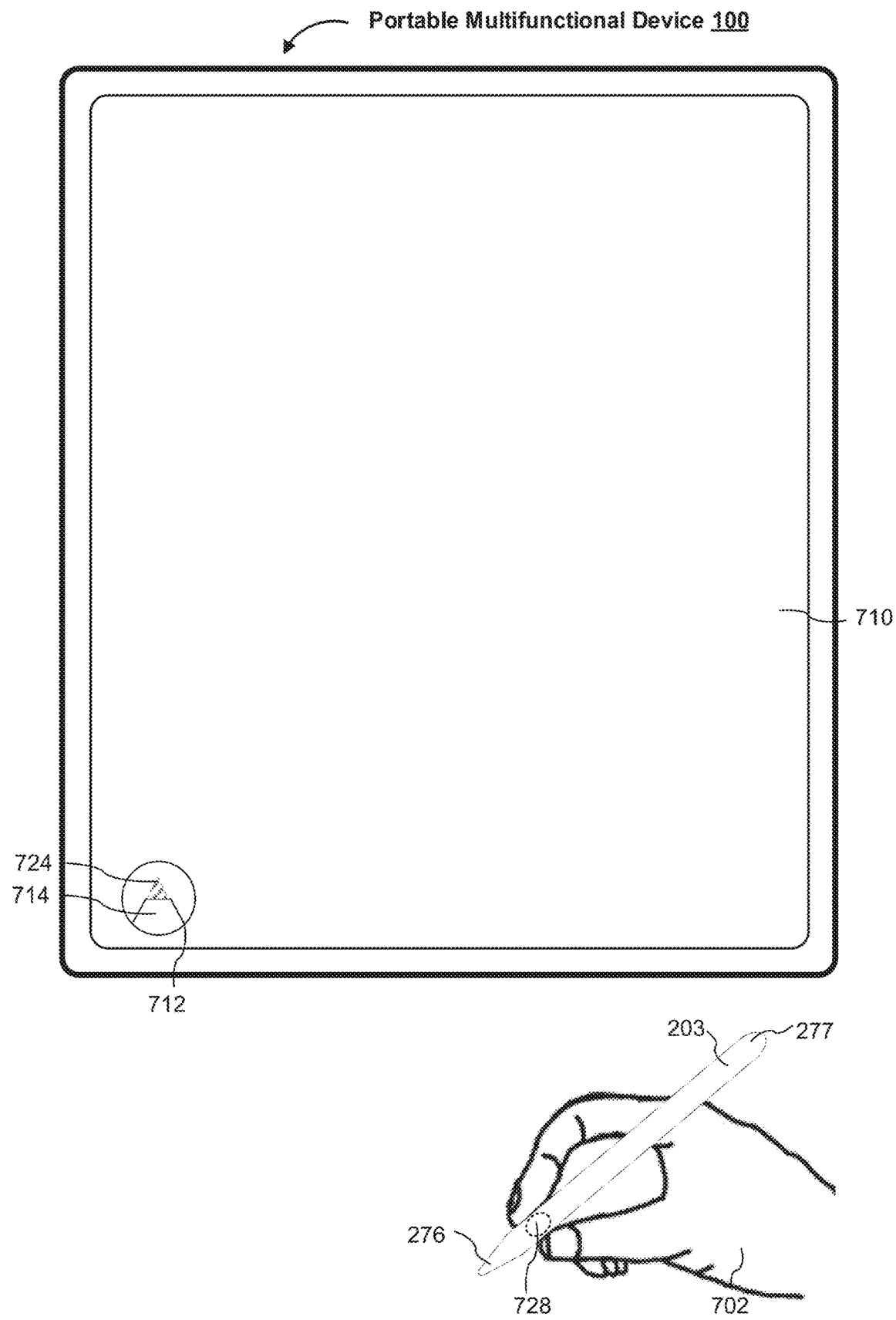

As illustrated in FIG. 7F, the stylus 203 detects a tap gesture 728. In response to receiving manipulation input data from the stylus 203 indicating the tap gesture 728 in FIG. 7F, the electronic device 100 updates the visual indicator 712 in FIG. 7G to include a pencil icon 730 in place of the marker icon 714 in FIGS. 7C-7F. This indicates that the stylus 203 would make pencil marks on the enlarged canvas region 710.

Figure 7G:
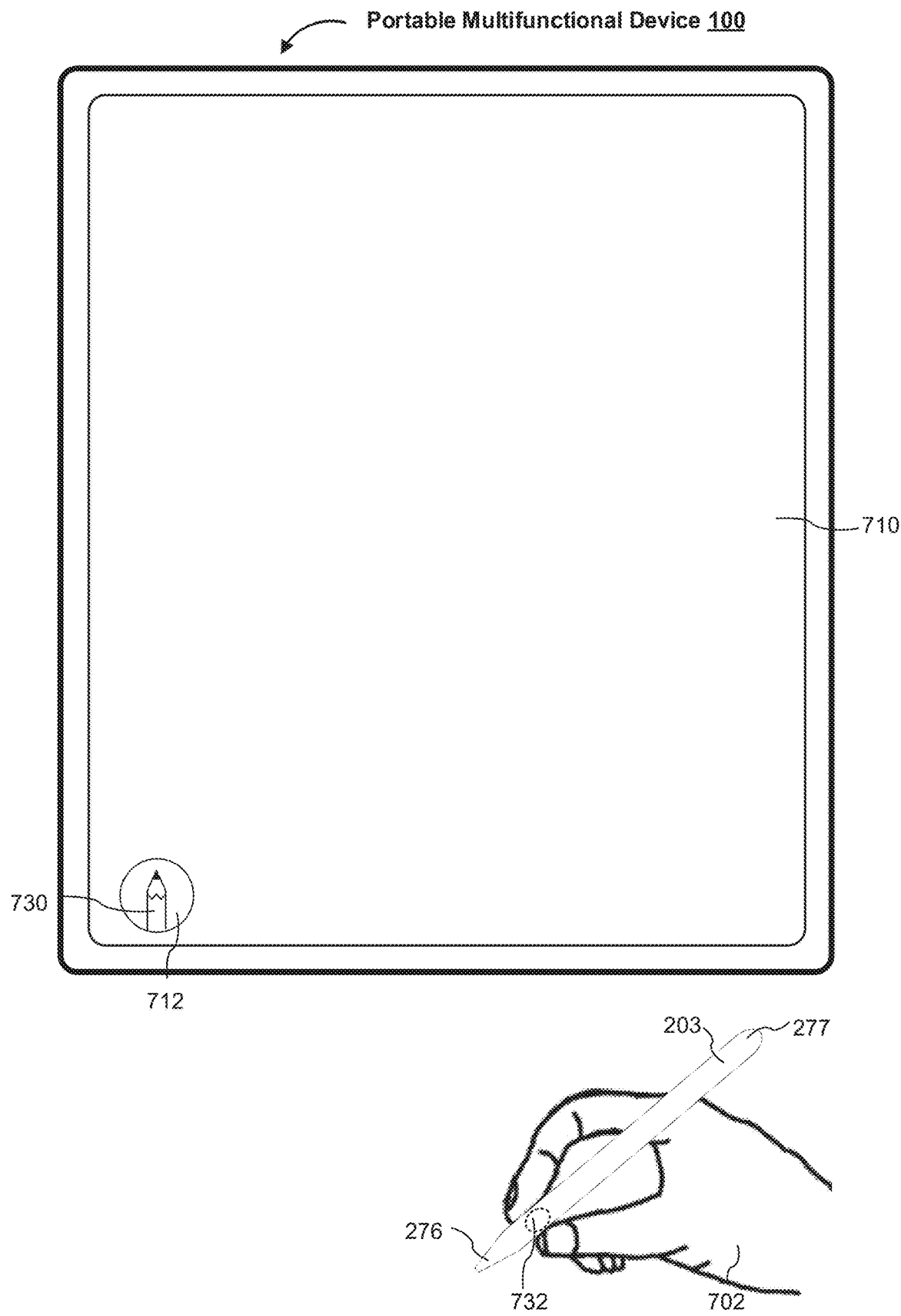

As illustrated in FIG. 7G, the stylus detects a subsequent tap gesture 732. In response to receiving manipulation input data from the stylus 203 indicating the subsequent tap gesture 732 in FIG. 7G, the electronic device 100 updates the visual indicator 712 in FIG. 7H to include a ruler icon 734 in place of the pencil icon 730. This indicates that the stylus 203 would function as a ruler with respect to the enlarged canvas region 710.

Figure 7H:
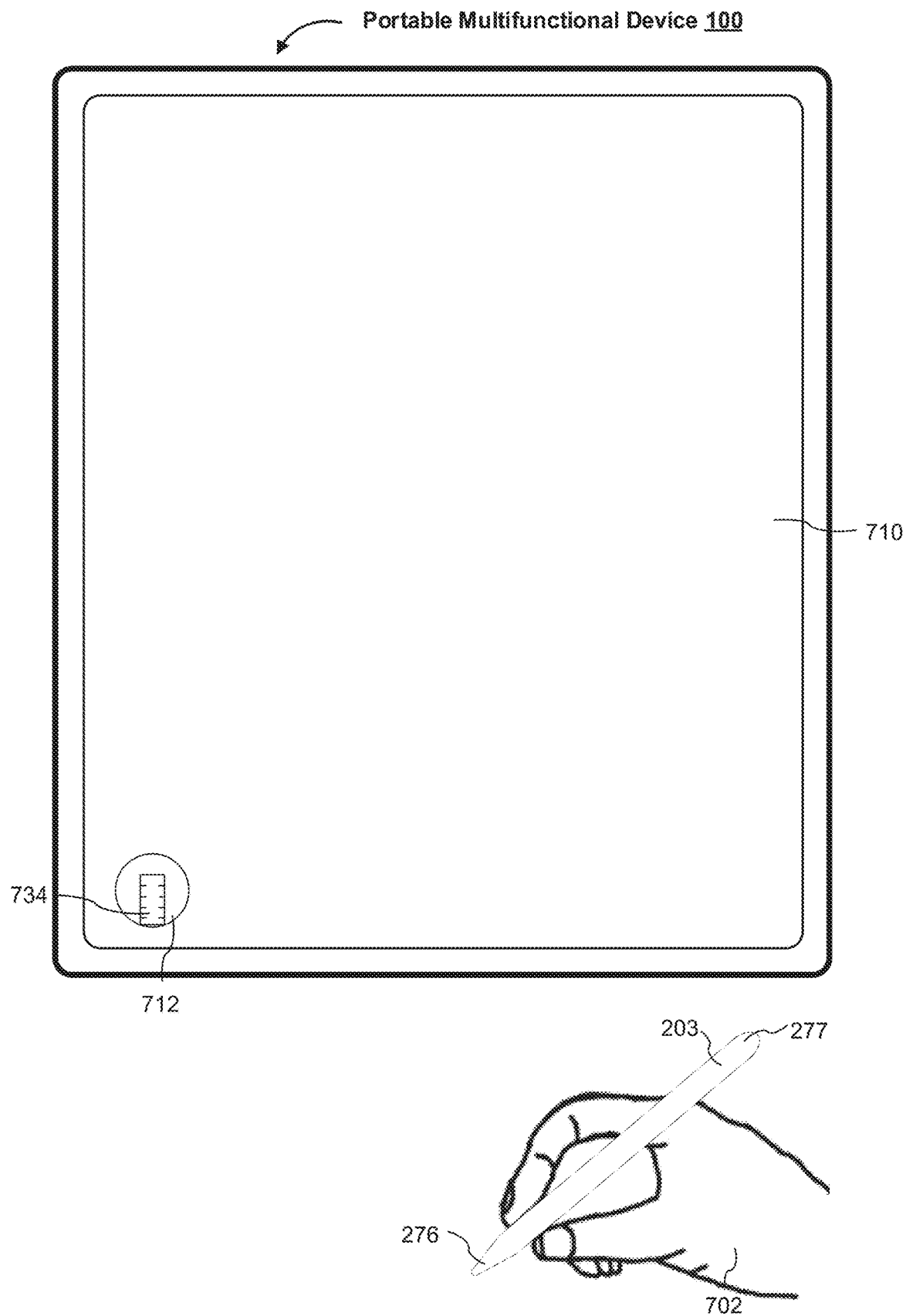
Figure 7I:
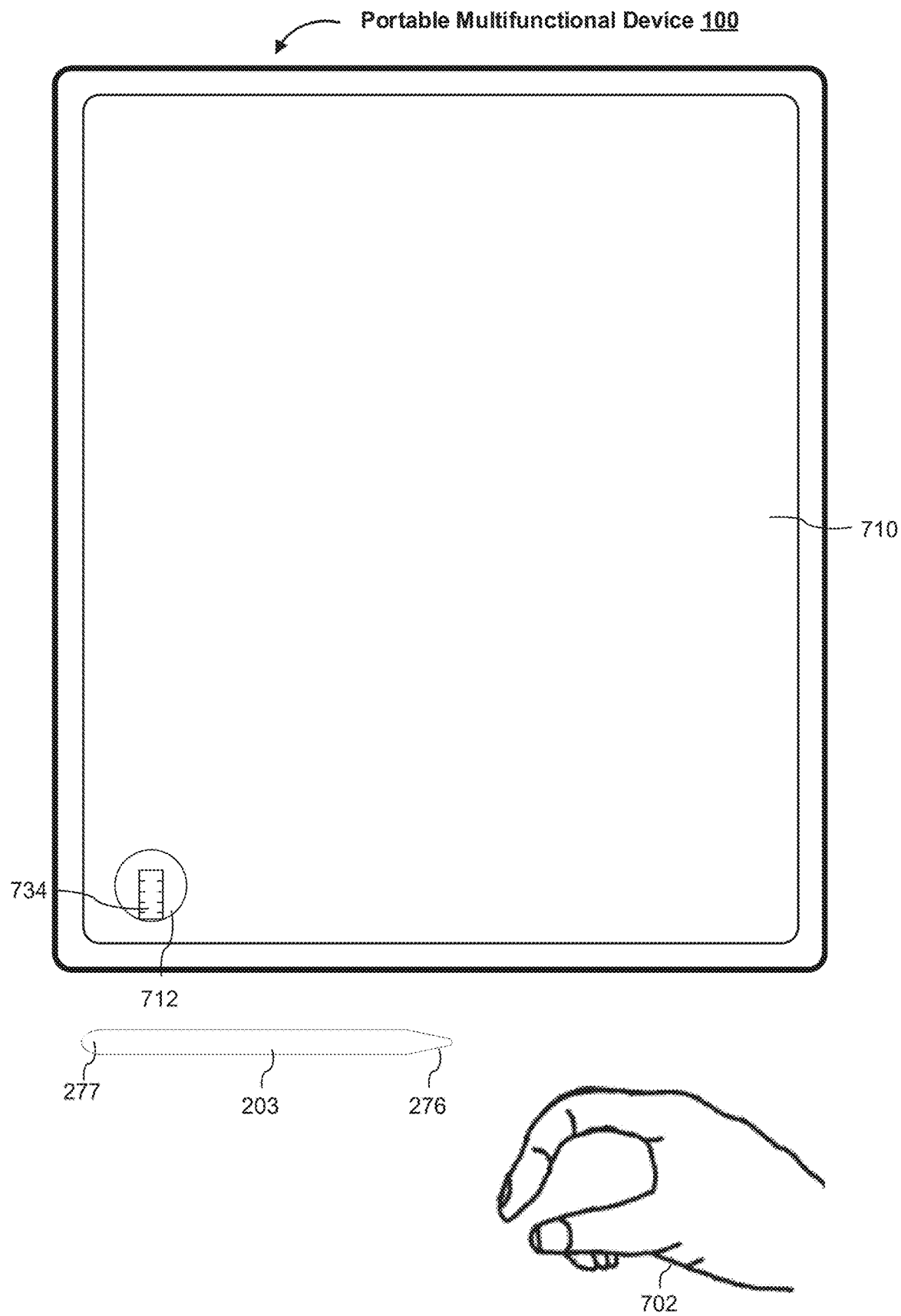
Figure 7J:
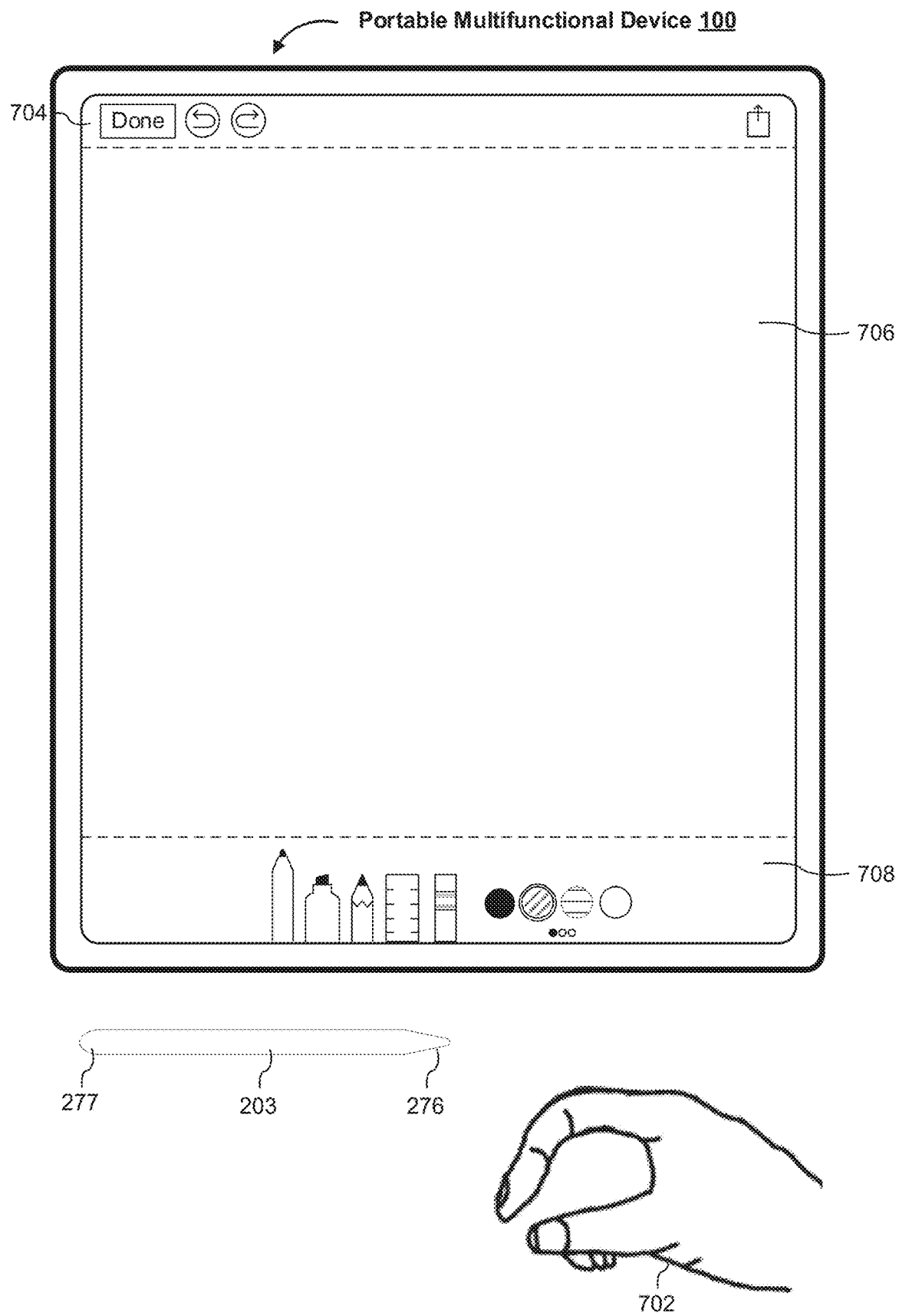

FIGS. 7H-7J show a sequence in which the electronic device transitions from the second state to the first state according to a determination that stylus 203 is no longer being held by the user. FIG. 7H illustrates the electronic device 100 in a second state in which the stylus 203 is being held by the hand of the user 702. As illustrated in FIG. 7H, the electronic device 100 displays the visual indicator 712 including a ruler icon 734.

As illustrated in FIG. 7I, the stylus 203 detects that it is not being held by the hand of the user 702. This can occur when the hand of the user 702 puts down the stylus 203. In response to receiving data from the stylus 203 indicating that it is not being held by the hand of the user 702, the electronic device 100 transitions from the second state to the first state. As illustrated in FIG. 7J, in the first state, the electronic device 100 ceases display of the enlarged canvas region 710 and the visual indicator 712. In FIG. 7J, the electronic device displays the navigation region 704, the canvas region 706, and the toolbar region 708 similar to FIGS. 7A-7B.

Figure 7K:
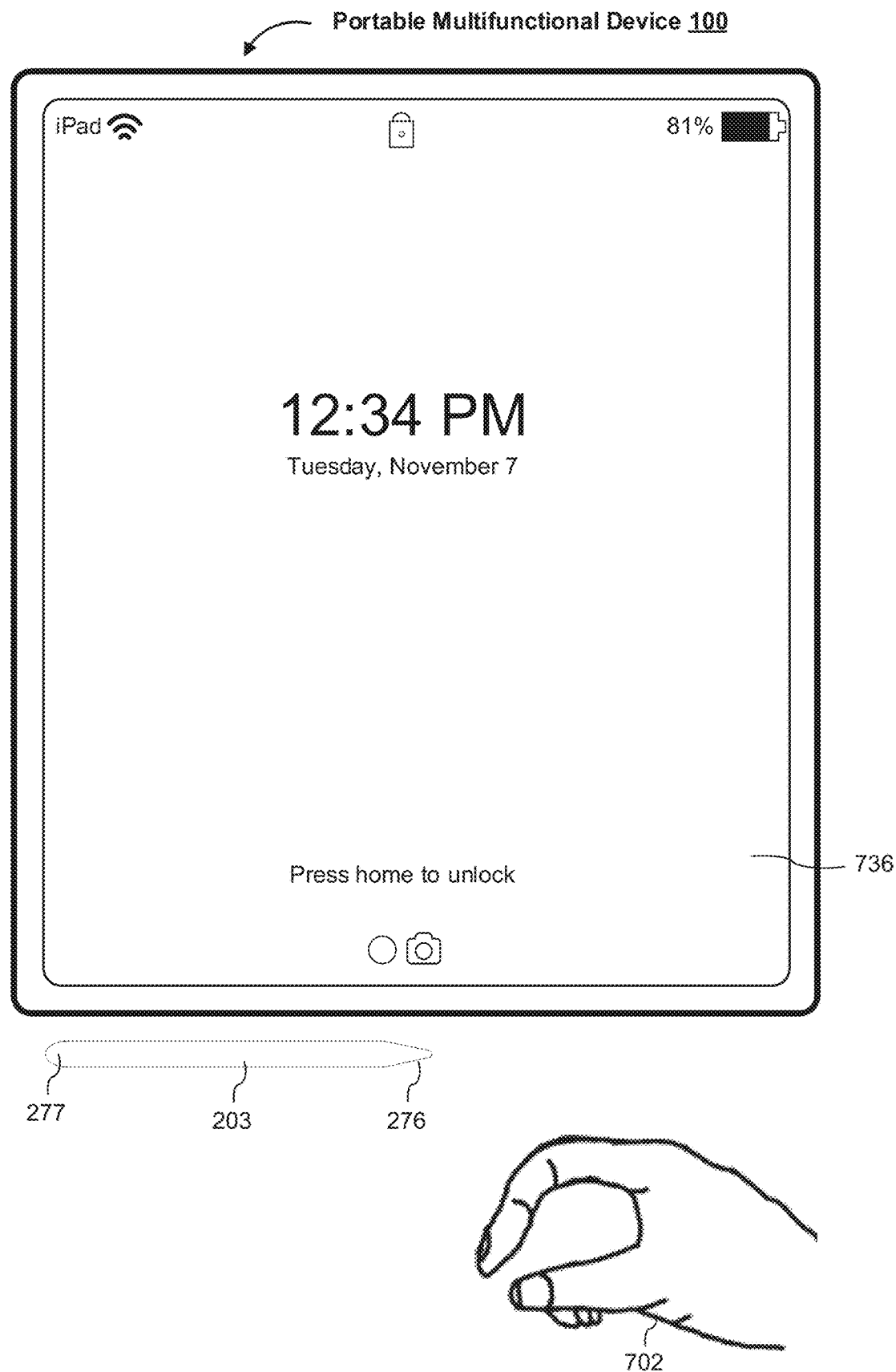
Figure 7L:
Figure 7M:
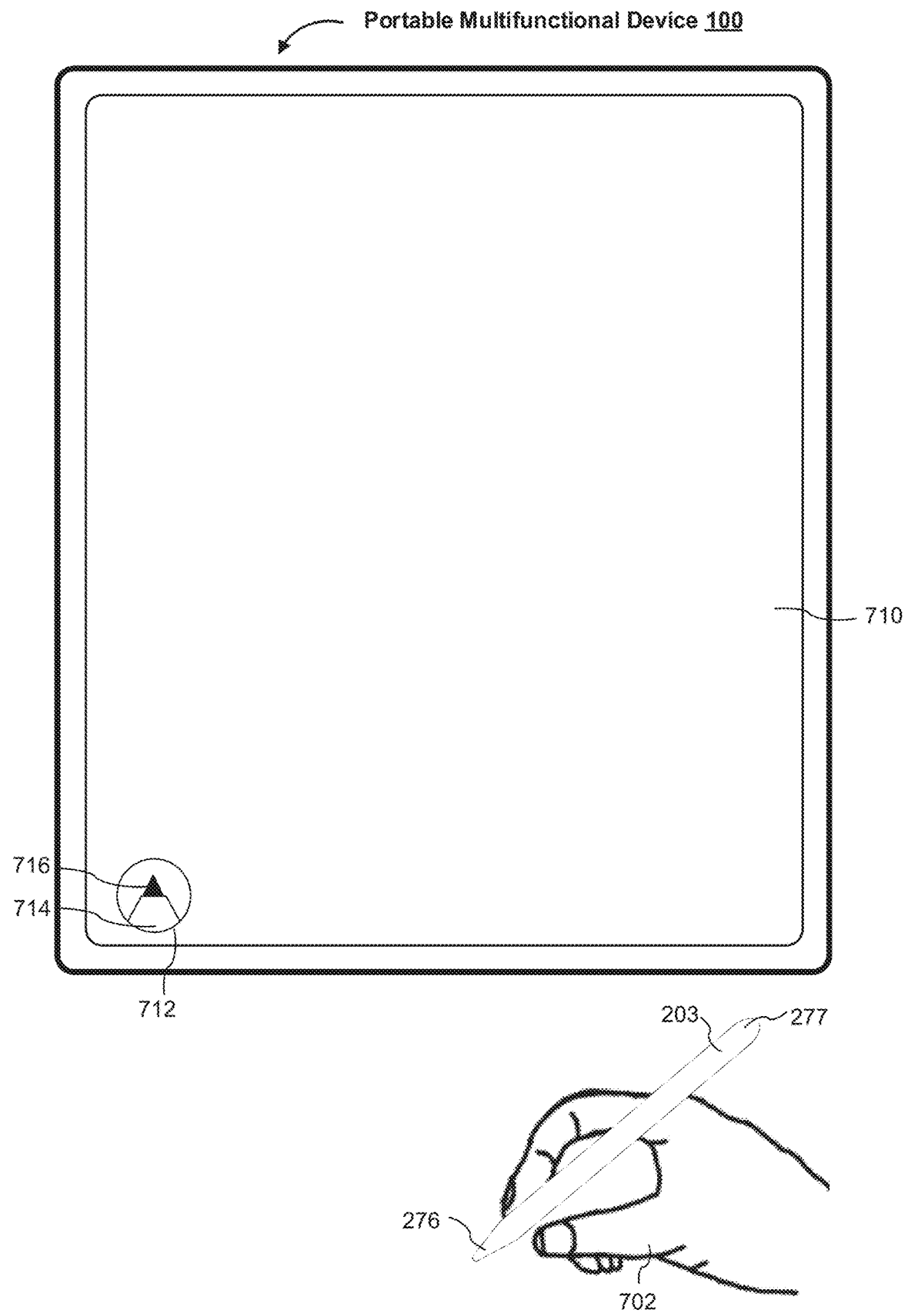

FIGS. 7K-7M show another sequence in which the electronic device transitions from a first state to a second state according to a determination that stylus 203 is being held by a user and displays a visual indication associated with the second state. FIG. 7K illustrates the electronic device 100 in a first state in which the stylus 203 is not being held by the hand of the user 702. As illustrated in FIG. 7K, the electronic device 100 displays a lock screen 736.

As illustrated in FIG. 7L, the stylus 203 detects that it is being held by the hand of the user 702. This can occur when the hand of the user 702 takes hold of the stylus 203. In response to receiving data from the stylus 203 indicating that it is being held by the hand of the user 702, the electronic device 100 transitions from the first state to the second state in which the electronic device 100 is not in a lock mode. As illustrated in FIG. 7M, in the second state, the electronic device 100 ceases to display the lock screen 736. The electronic device 100 displays the enlarged canvas region 710 and the visual indicator 712 similar to FIG. 7C. Although the visual indicator 712 corresponds to the marker icon 714 with the solid tip 716, one of ordinary skill in the art will appreciate that the visual indicator 712 may take a variety of forms.

Figure 7N:
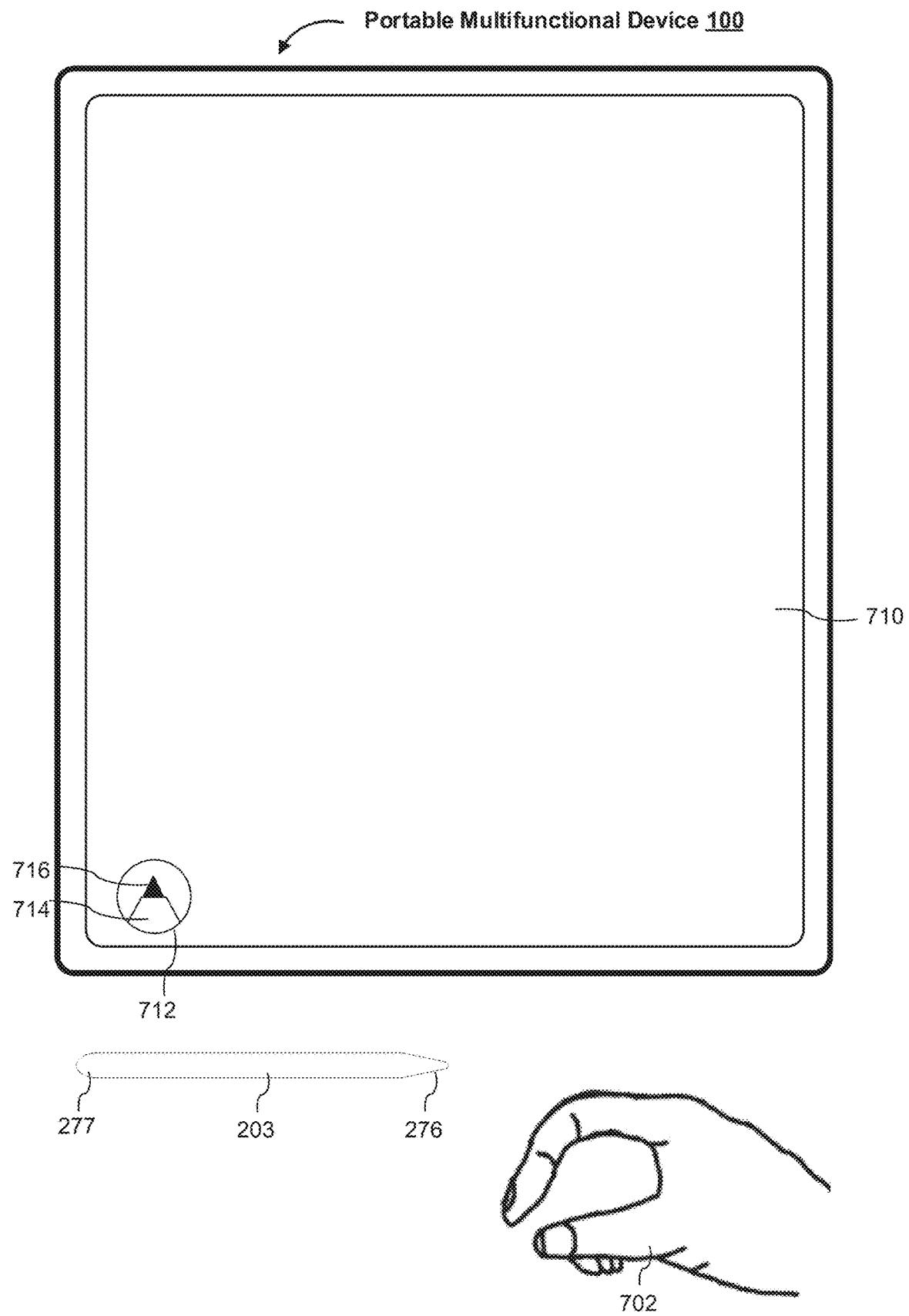
Figure 7O:
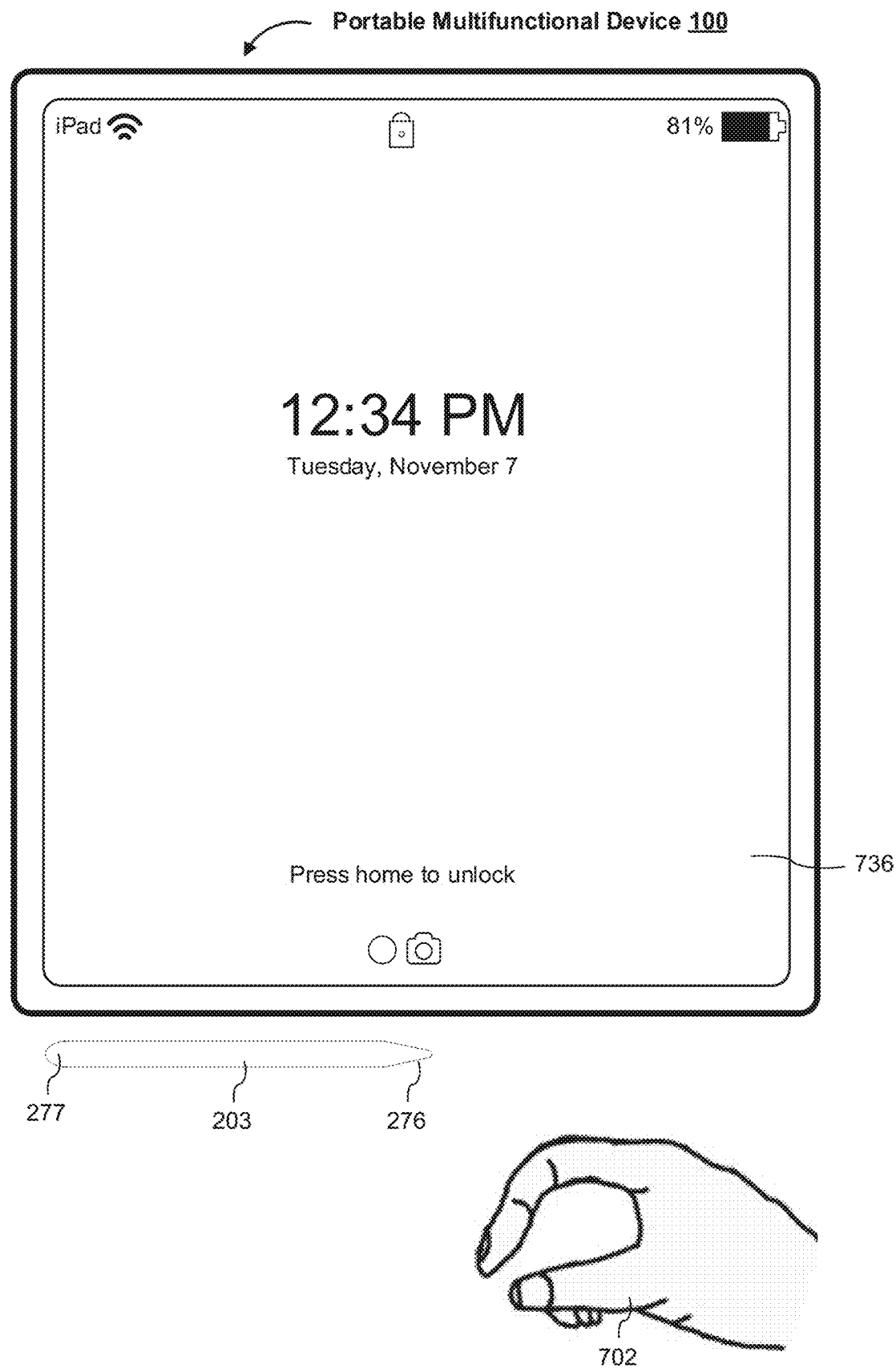

FIGS. 7M-7O show another sequence in which the electronic device transitions from the second state to the first state according to a determination that stylus 203 is no longer being held by the user and ceases to display the visual indicator. FIG. 7M illustrates the electronic device 100 in the second state in which the stylus 203 is being held by the hand of the user 702. As illustrated in FIG. 7M, the electronic device 100 displays the enlarged canvas region 710 associated with stylus-compatible application, such as a drawing application (e.g., Notes application), and the visual indicator 712 similar to FIGS. 7C and 7M.

As illustrated in FIG. 7N, the stylus 203 detects that it is not being held by the hand of the user 702. In response to receiving data from the stylus 203 indicating that it is not being held by the hand of the user 702, the electronic device 100 transitions from the second state to the first state in which the electronic device 100 is in a lock mode. As illustrated in FIG. 7O, in the first state, the electronic device 100 ceases to display the enlarged canvas region 710 and the visual indicator 712. The electronic device 100 displays the lock screen 736.

Figure 7P:
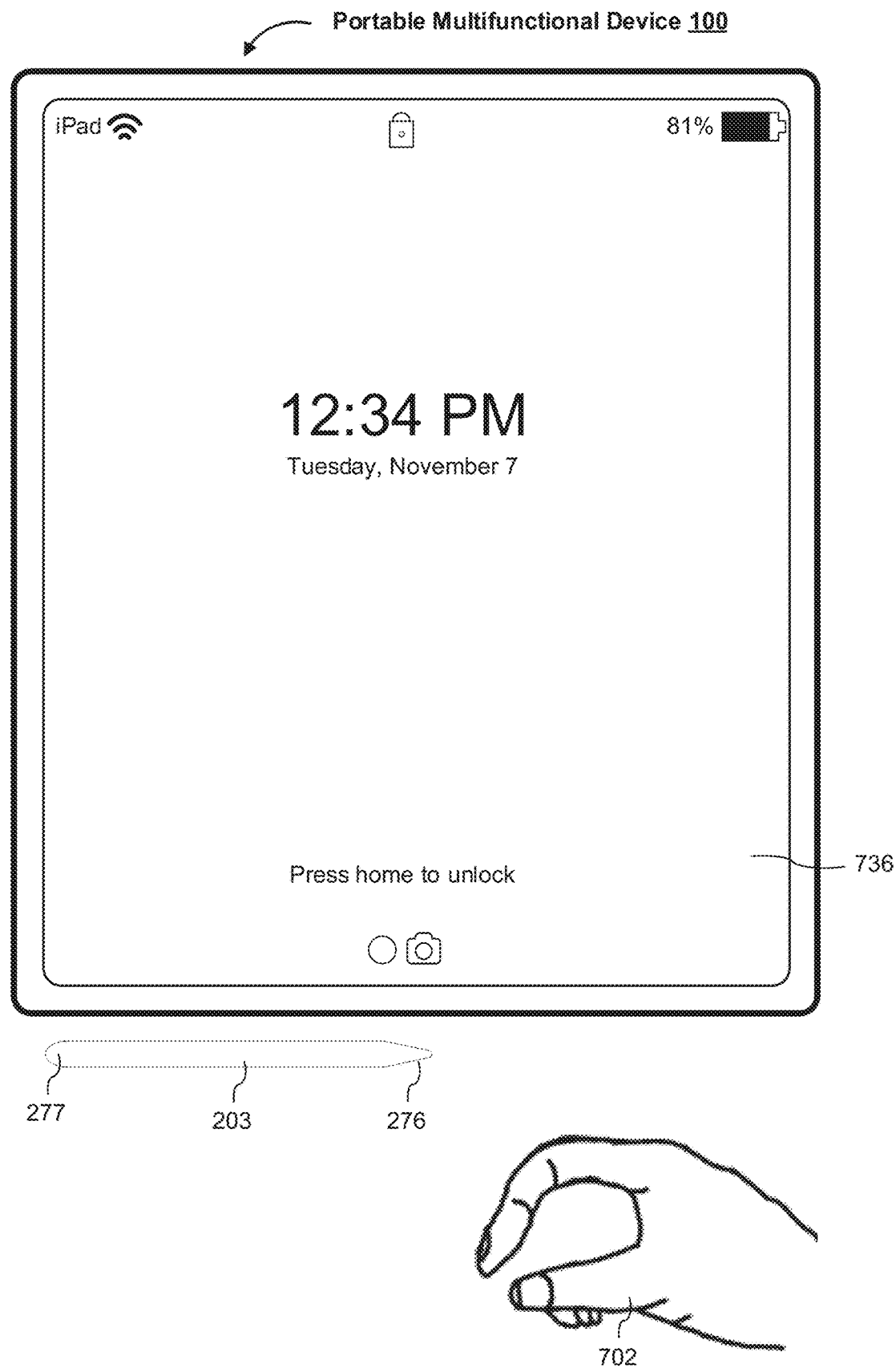
Figure 7Q:
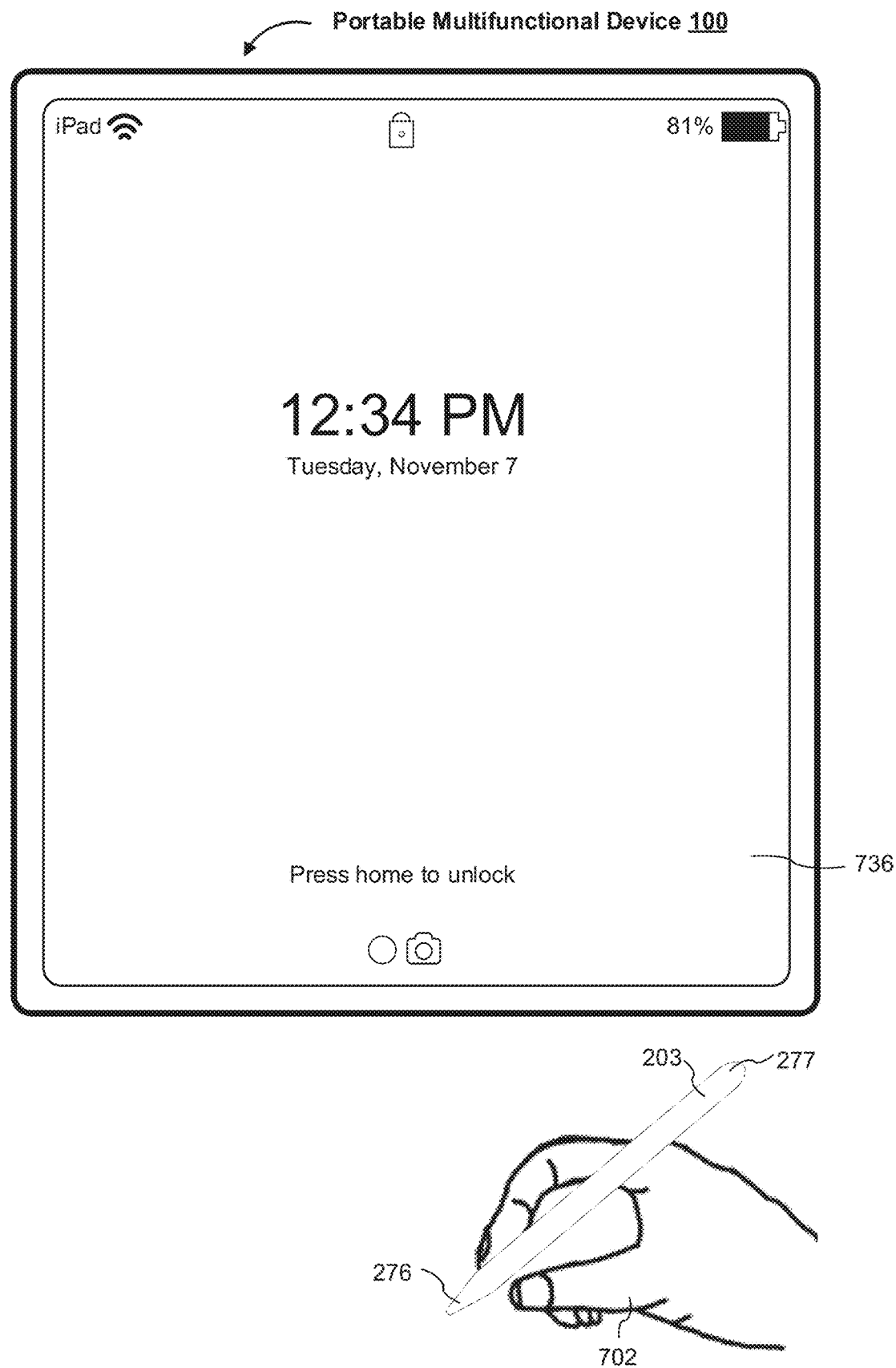
Figure 7R:
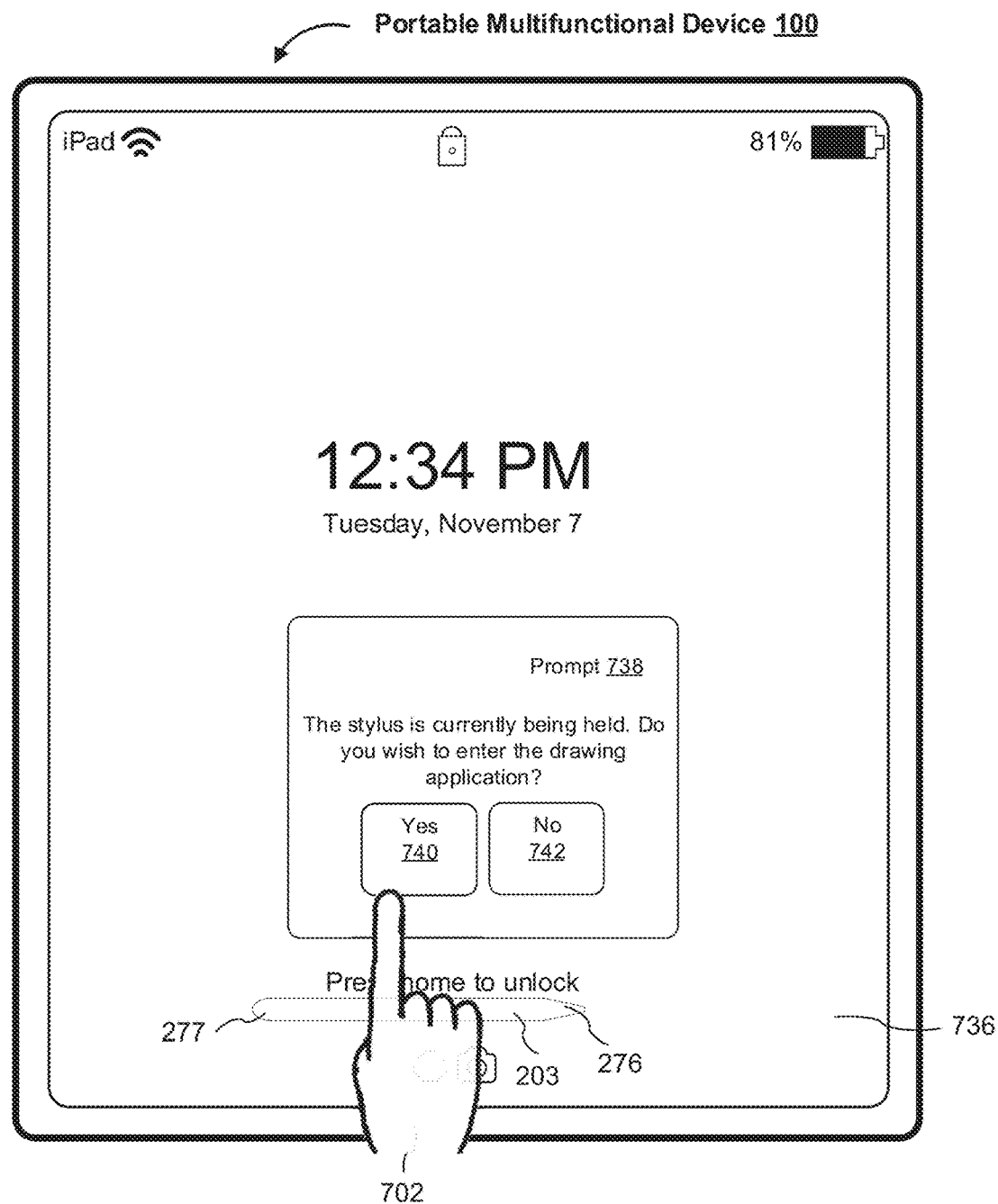

FIGS. 7P-7R show yet another sequence in which the electronic device transitions from a first state to a second state according to a determination that stylus 203 is being held by a user and displays a visual indication associated with the second state. FIG. 7P illustrates the electronic device 100 in the first state in which the stylus 203 is not being held by the hand of the user 702. As illustrated in FIG. 7P, the electronic device 100 displays the lock screen 736.

As illustrated in FIG. 7Q, the stylus 203 detects that it is being held by the hand of the user 702. In response to receiving data from the stylus 203 indicating that it is being held by the hand of the user 702, the electronic device 100 displays a prompt interface 738 superimposed on the lock screen 736 in FIG. 7R. The prompt interface 738 includes a "Yes" affordance 740 and a "No" affordance 742 in order to enable the user 702 to enter a drawing application or dismiss the prompt interface 738, respectively. A user can interact with the affordances 740 and 742 via touch inputs directed to the touch-sensitive surface of the electronic device 100 at locations corresponding to the affordances 740 and 742. These interactions are further detailed with respect to FIGS. 7R-7S, below. In some embodiments, the electronic device 100 ceases to display the prompt interface 738 in response to receiving data from the stylus 203 indicating that the stylus 203 is no longer being held by the hand of the user 702. In some embodiments, the electronic device 100 maintains display of the prompt interface 738 in response to receiving data from the stylus 203 indicating that the stylus 203 is no longer being held by the hand of the user 702.

Figure 7S:
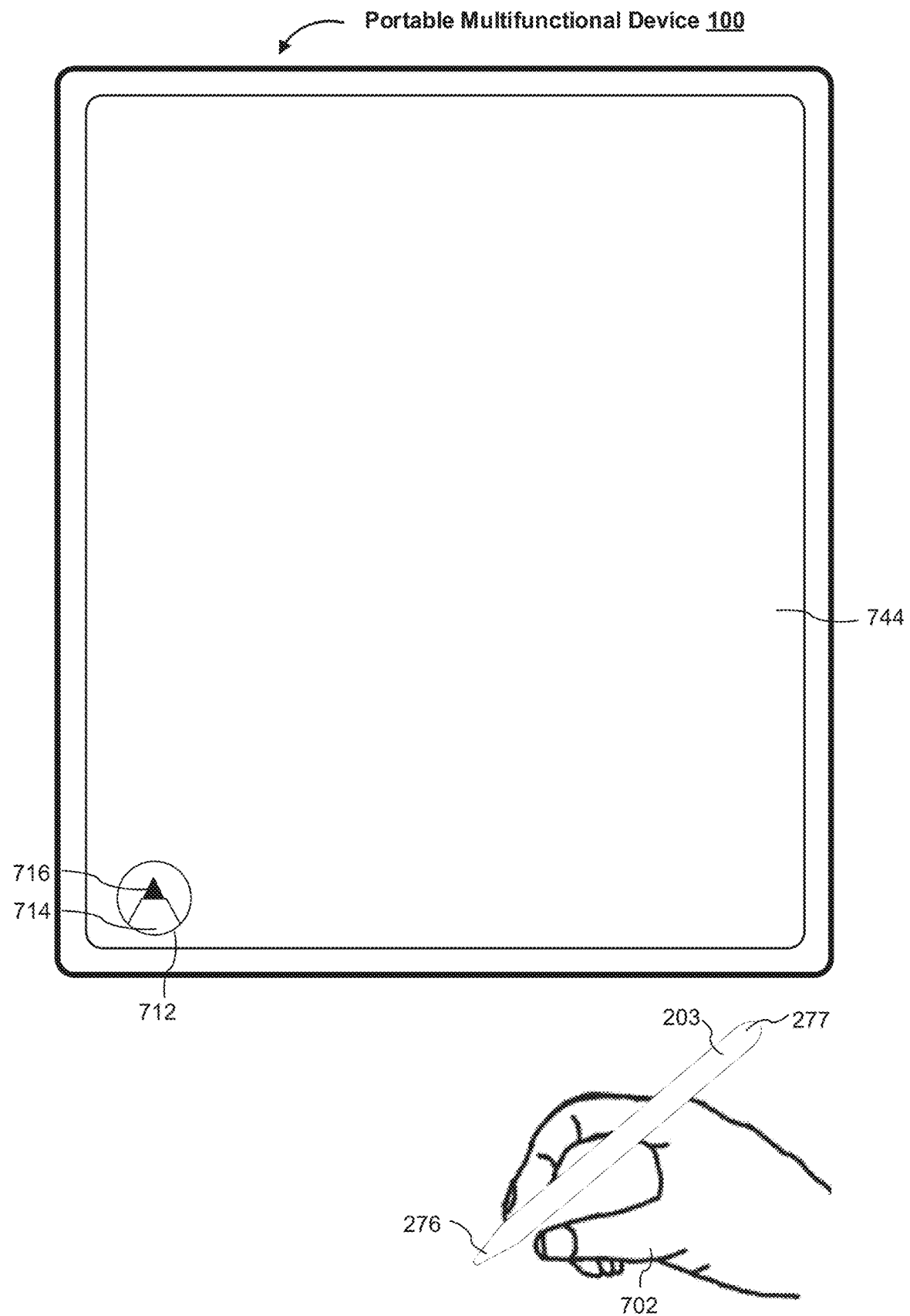

FIGS. 7R-7S show a transition from a lock screen to a restricted user interface associated with a drawing application. As illustrated in FIG. 7R, the electronic device 100 displays the prompt interface 738 superimposed on the lock screen 736. In response to detecting a touch input corresponding to the "Yes" affordance 740 in FIG. 7R, the electronic device 100 ceases to display the lock screen 736 and the prompt interface 738 and subsequently displays a restricted user interface 744 (e.g., associated with a drawing application) and the visual indicator 712 as shown in FIG. 7S. In response to detecting a touch input corresponding to the "No" affordance 742, the electronic device 100 ceases display of the prompt interface 738 and continues to display the lock screen 736 (not shown).

Figure 7T:
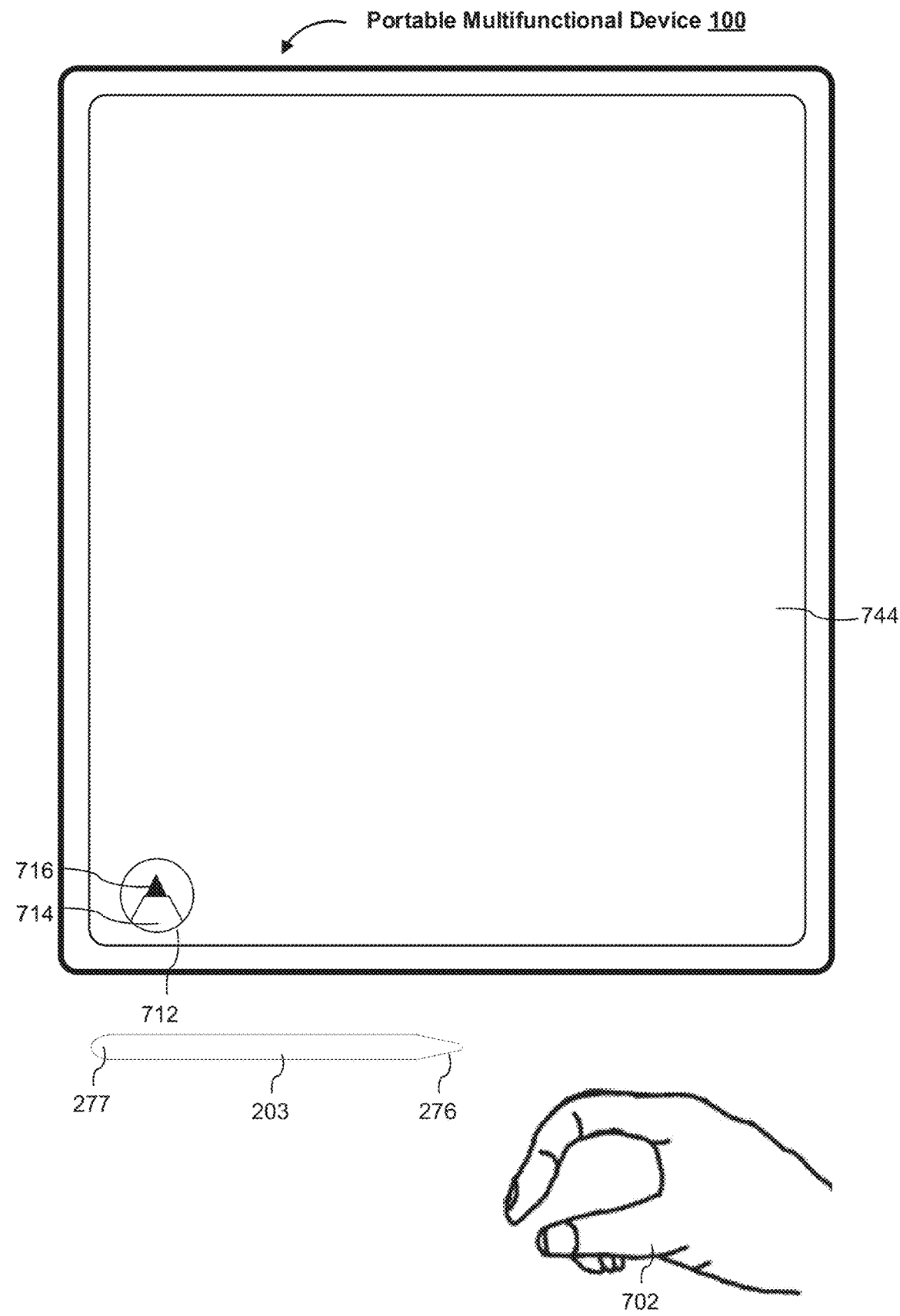
Figure 7U:
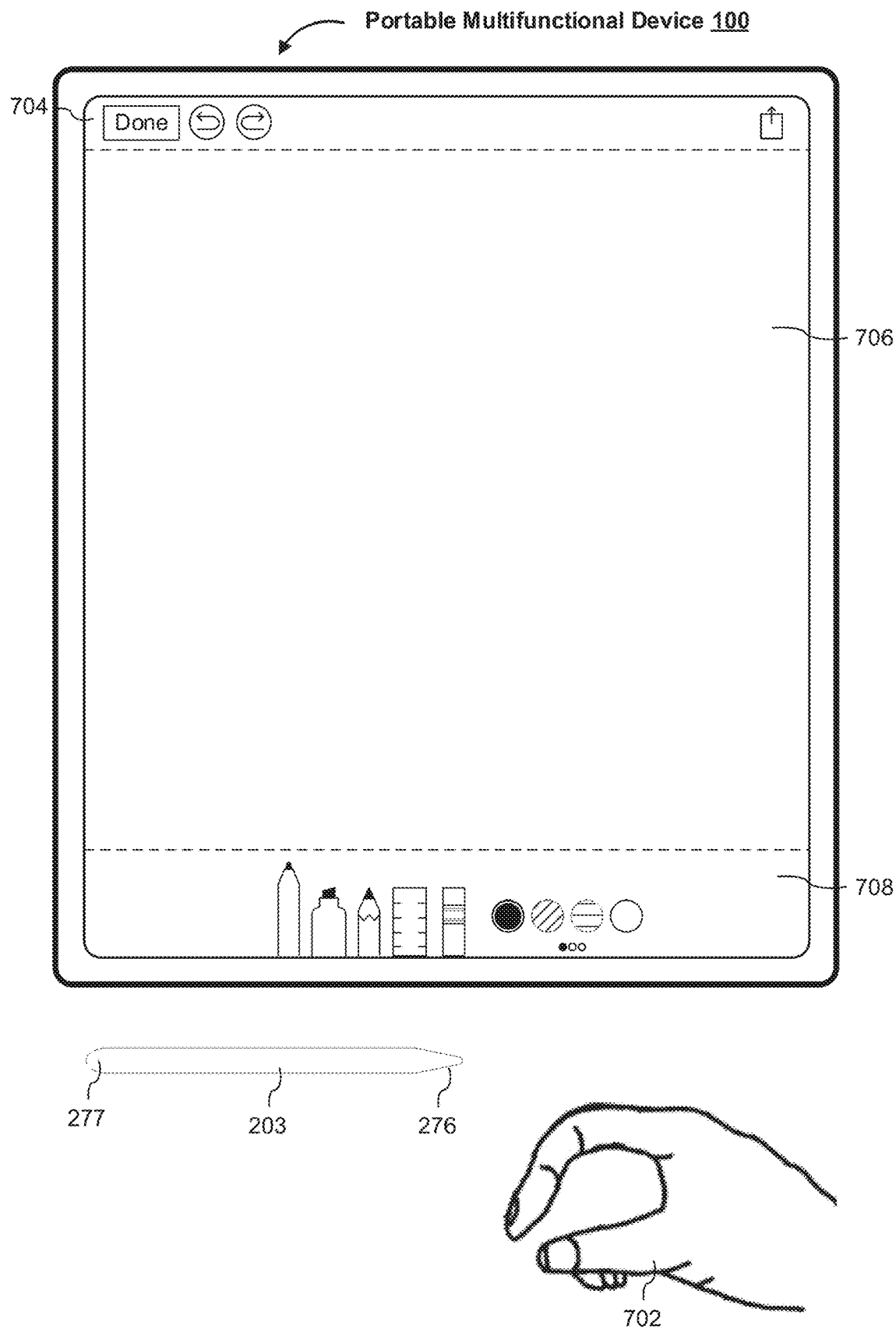

FIGS. 7S-7U show another sequence in which the electronic device transitions from the second state to the first state according to a determination that stylus 203 is no longer being held by the user and ceases display of the visual indication. FIG. 7S illustrates the electronic device 100 in a second state in which the stylus 203 is being held by the hand of the user 702.

As illustrated in FIG. 7T, the stylus 203 detects that it is not being held by the hand of the user 702. In response to receiving data from the stylus 203 indicating that it is not being held by the hand of the user 702, the electronic device 100 transitions from the second state to the first state. As illustrated in FIG. 7U, in the first state, the electronic device 100 ceases to display the visual indicator 712 and the restricted user interface 744. In turn, as shown in FIG. 7U, the electronic device 100 displays the navigation region 704, the canvas region 706, and the toolbar region 708 in the first state similar to FIG. 7J.

Figure 7V:
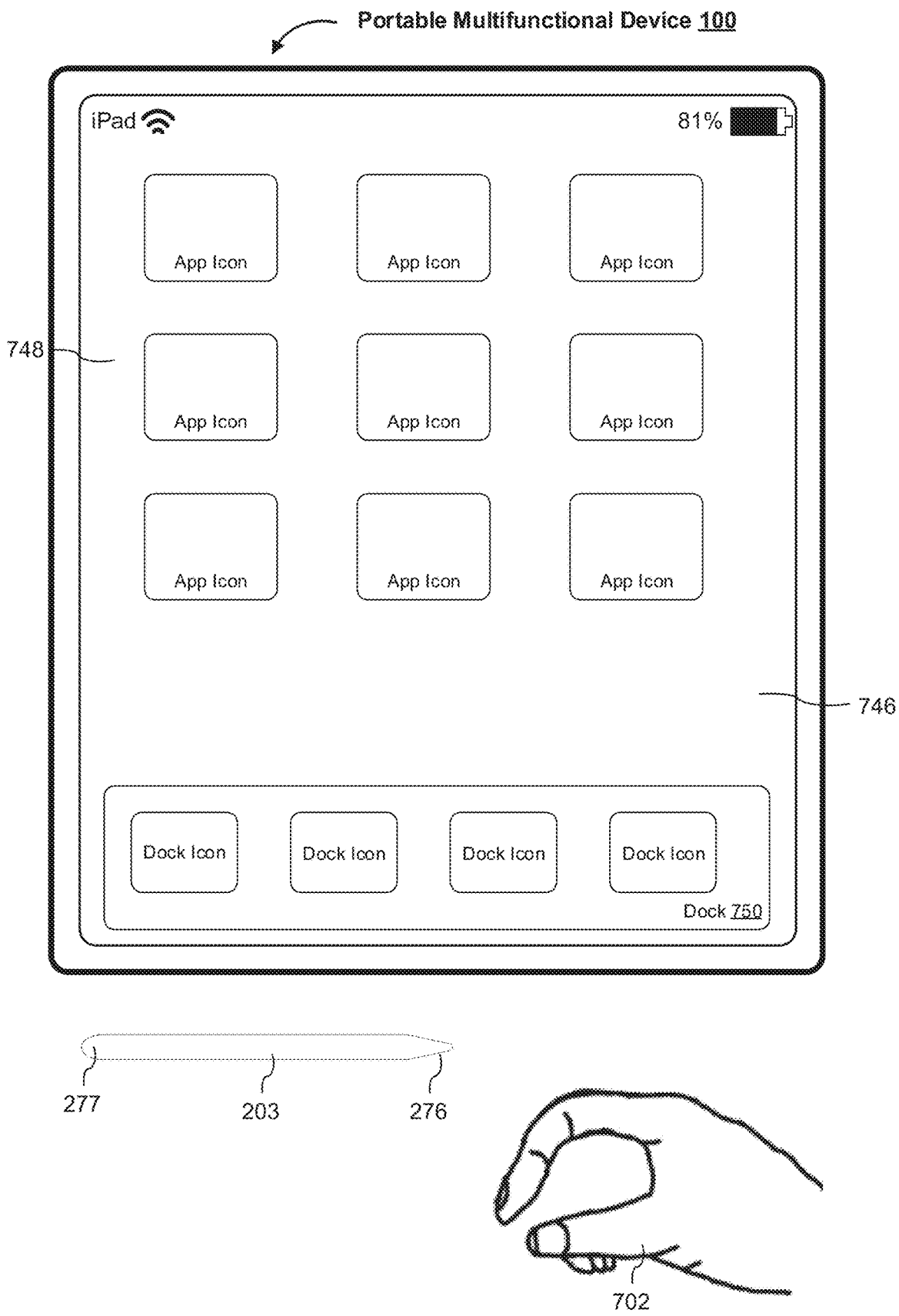
Figure 7W:
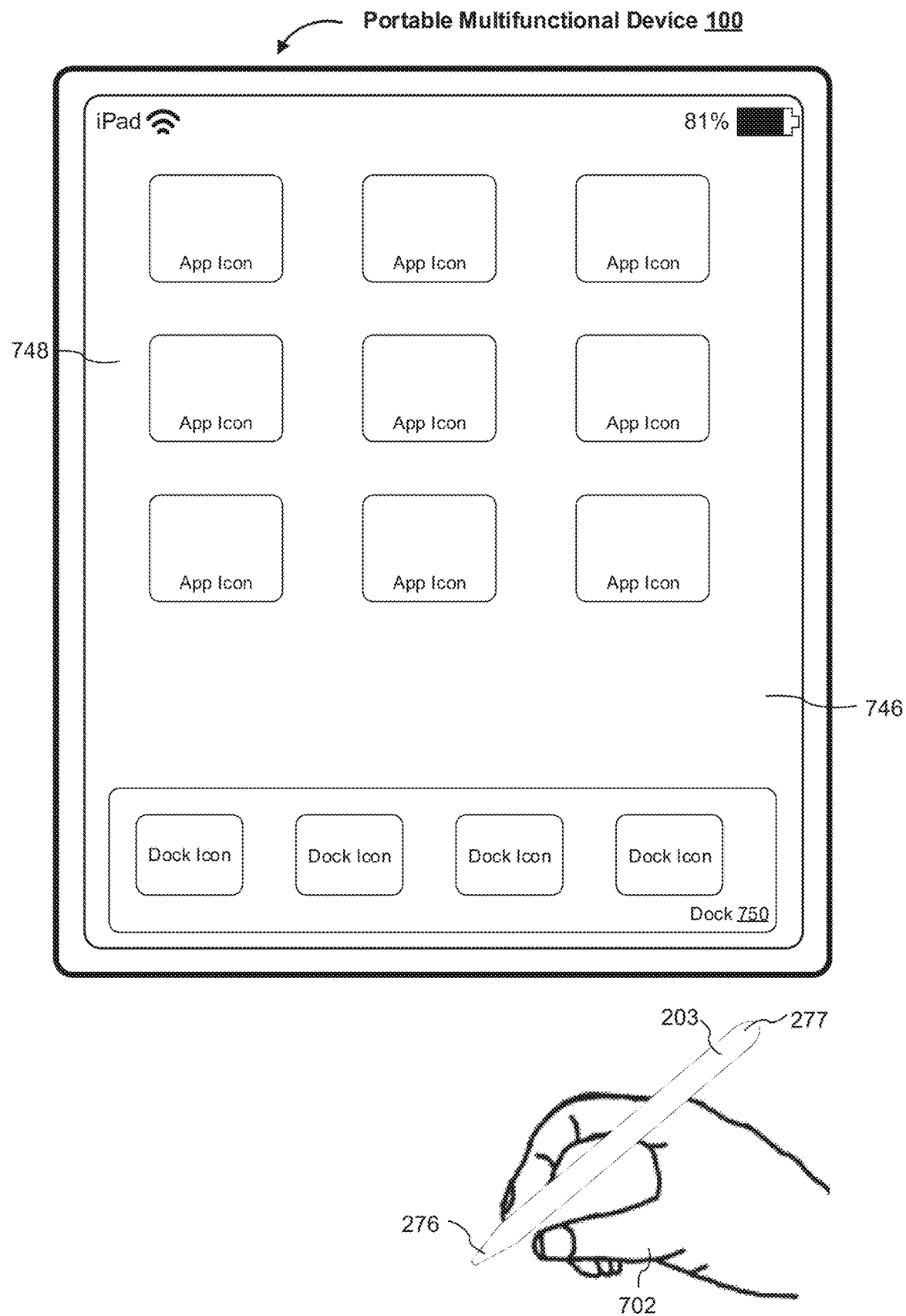
Figure 7X:
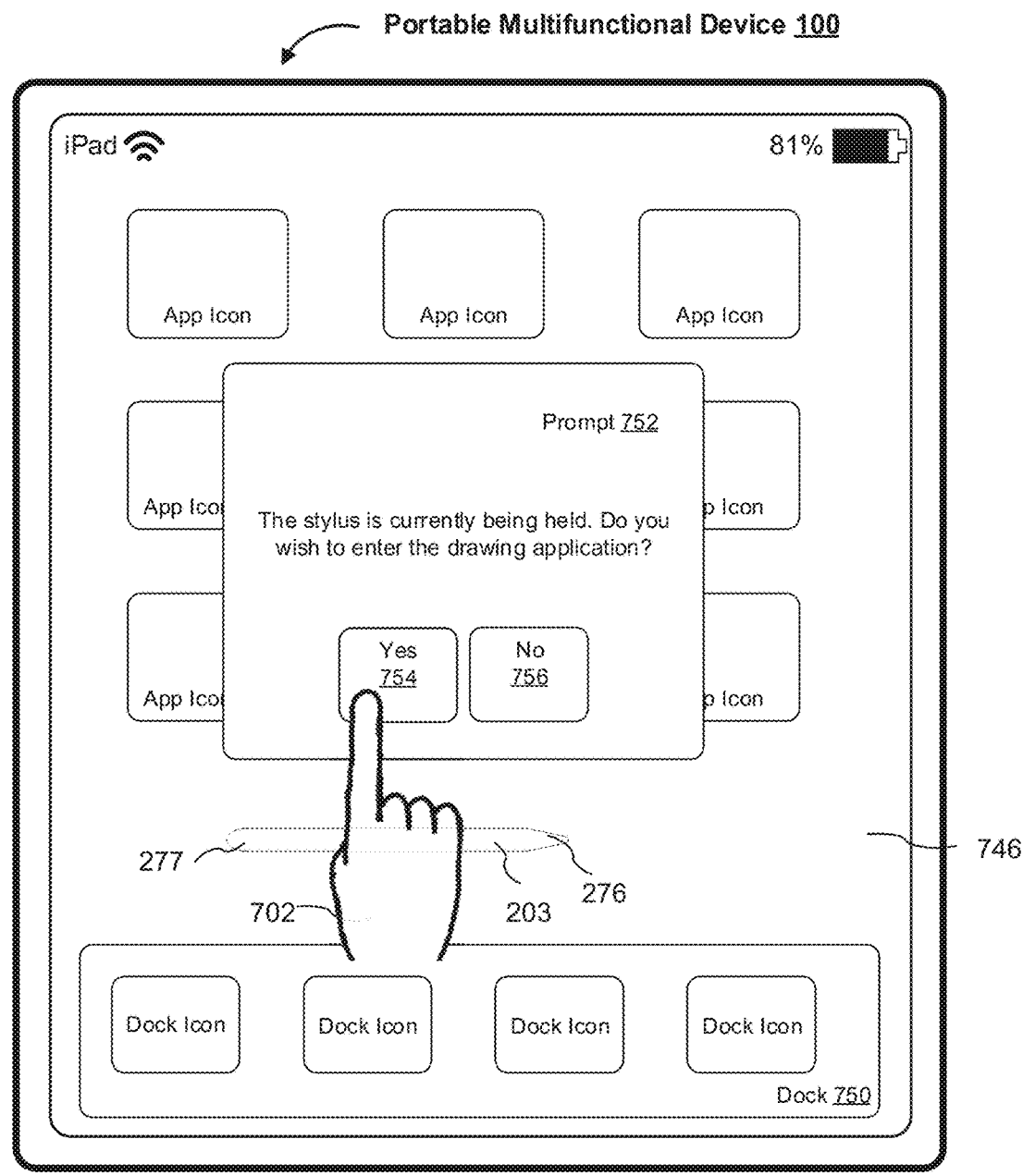
Figure 7Y:
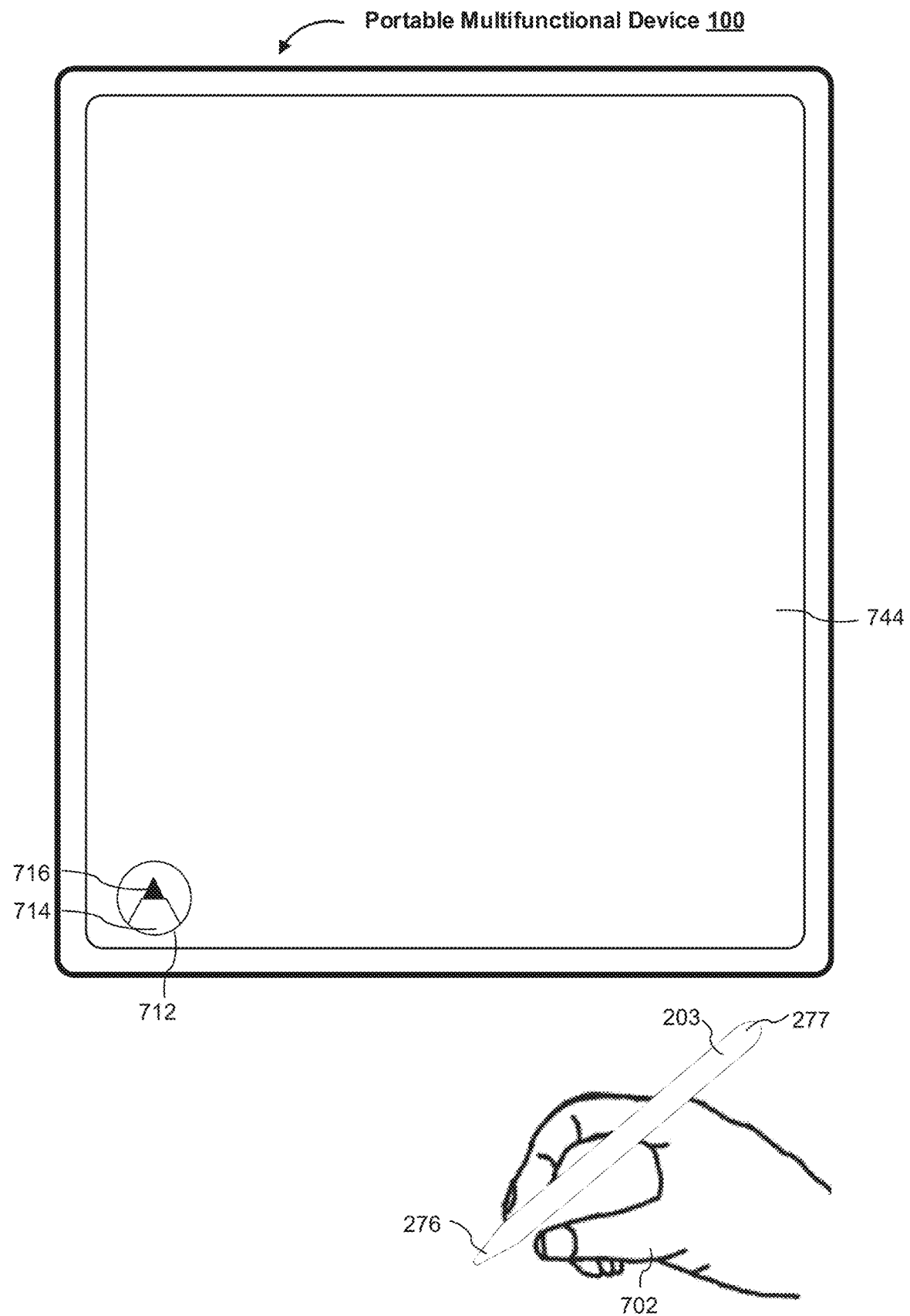

FIGS. 7V-7X show yet another sequence in which the electronic device transitions from a first state to a second state according to a determination that stylus 203 is being held by a user and displays a visual indication associated with the second state. FIG. 7V illustrates the electronic device 100 in a first state in which the stylus 203 is not being held by the hand of the user 702. As illustrated in FIG. 7V, the electronic device 100 displays a home screen 746. The home screen 746 includes a matrix of application icons (e.g., Apps) arranged in a main area 748 of the display. The home screen 746 includes a dock 750 that includes a row of dock icons. One of ordinary skill in the art will appreciate that the number and arrangement of application icons and/or dock icons can differ.

As illustrated in FIG. 7W, the stylus 203 detects that it is being held by the hand of the user 702. In response to receiving data from the stylus 203 indicating that it is being held by the hand of the user 702, the electronic device 100 transitions from the first state to the second state. As illustrated in FIG. 7X, in the second state, the electronic device 100 displays a prompt interface 752 superimposed on the home screen 746. The prompt interface 752 includes a "Yes" affordance 754 and a "No" affordance 756 to enable the user to enter a drawing application or dismiss the prompt interface 752, respectively. A user can interact with the affordances 754 and 746 via touch inputs directed to the touch-sensitive surface of the electronic device 100 at locations corresponding to the affordances 754 and 756.

FIGS. 7X-7Y show a transition from a home screen to a user interface associated with a drawing application. As is illustrated in FIG. 7X, the electronic device 100 displays the prompt interface 752 superimposed on the home screen 746. In response to detecting a touch input corresponding to the "Yes" affordance 754 in FIG. 7X, the electronic device 100 ceases to display the home screen 746 and the prompt interface 752 and subsequently displays a restricted user interface 744 (e.g., associated with a drawing application) and the visual indicator 712 as shown in FIG. 7Y. In response to detecting a touch input corresponding to the "No" affordance 756, the electronic device 100 ceases display of the prompt interface 752 and continues to display the home screen 746 (not shown).

FIGS. 8A-8H illustrate example user interfaces for changing stylus 203 functionality in accordance with some embodiments. The user interfaces in these figures are used to illustrate the processes described below, including the processes in FIGS. 15A-15B. Although some of the examples which follow will be given with reference to inputs on a touch-screen display (where the touch-sensitive surface and the display are combined, for example on touch screen 112), in some embodiments, the electronic device 100 detects inputs on touch-sensitive surface 651 that is separate from display 650, as shown in FIG. 6B. In various embodiments, the electronic device 100 changes functionality of the stylus 203 based on data received from a stylus 203.

In various embodiments, the touch-sensitive surface (e.g., the touch-sensitive surface 275 in FIG. 2 and FIGS. 5A-5B) of the stylus 203 detects touch inputs and gesture inputs, or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, a flick, a swipe, a tap, a double tap, and/or the like.

In various embodiments, the orientation and/or movement sensors (e.g., accelerometer, magnetometer, gyroscope) of the stylus 203 detect orientation/movement inputs or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, barrel rotation and/or direction thereof, twirl and/or direction thereof, orientation (e.g., position) of the tip 276 and/or the end 277 of the stylus 203 relative to a reference plane, and/or the like.

Figure 8A:
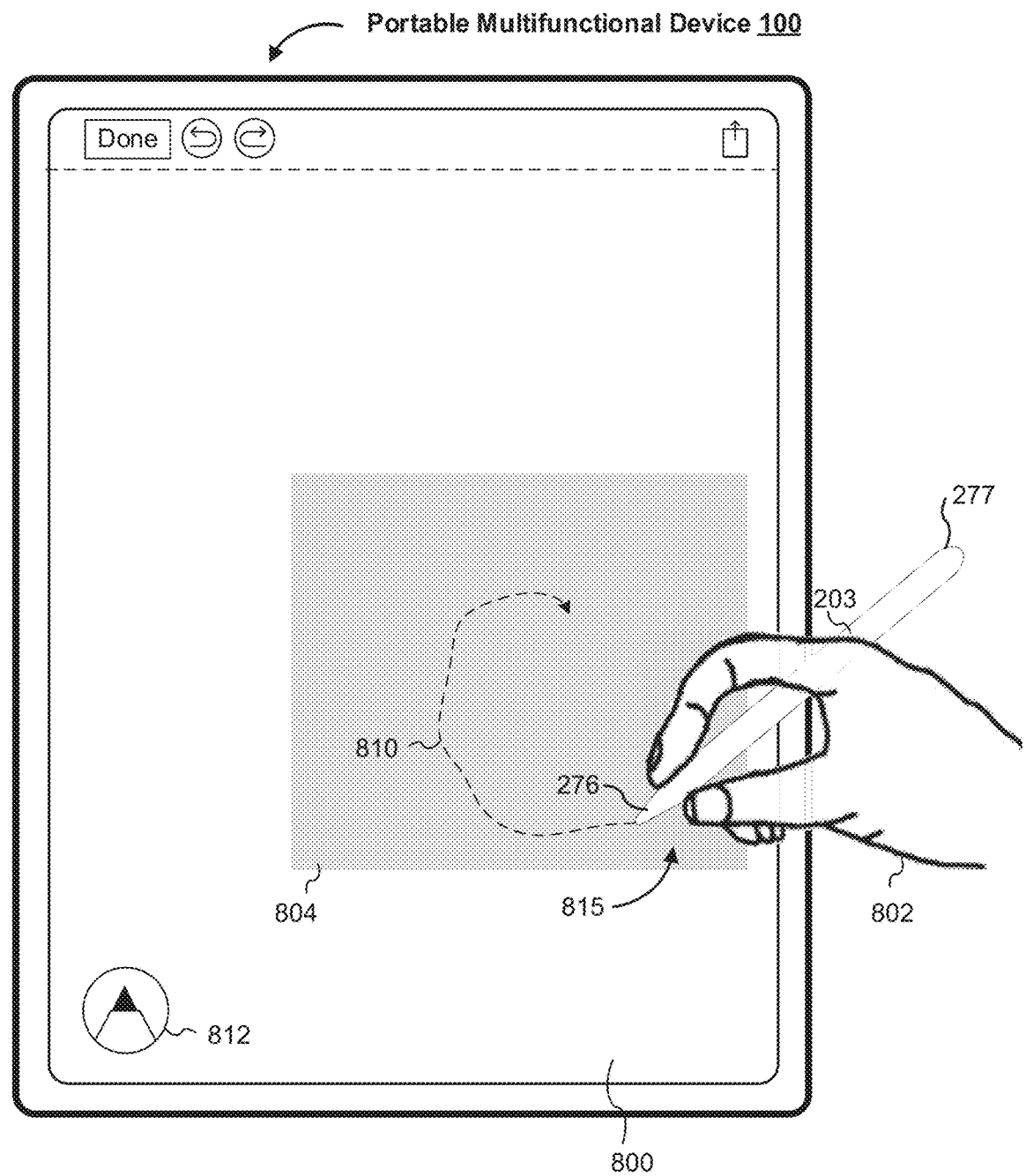
FIGS. 8A-8H illustrate example user interfaces for changing stylus functionality in accordance with some embodiments.
Figure 8B:
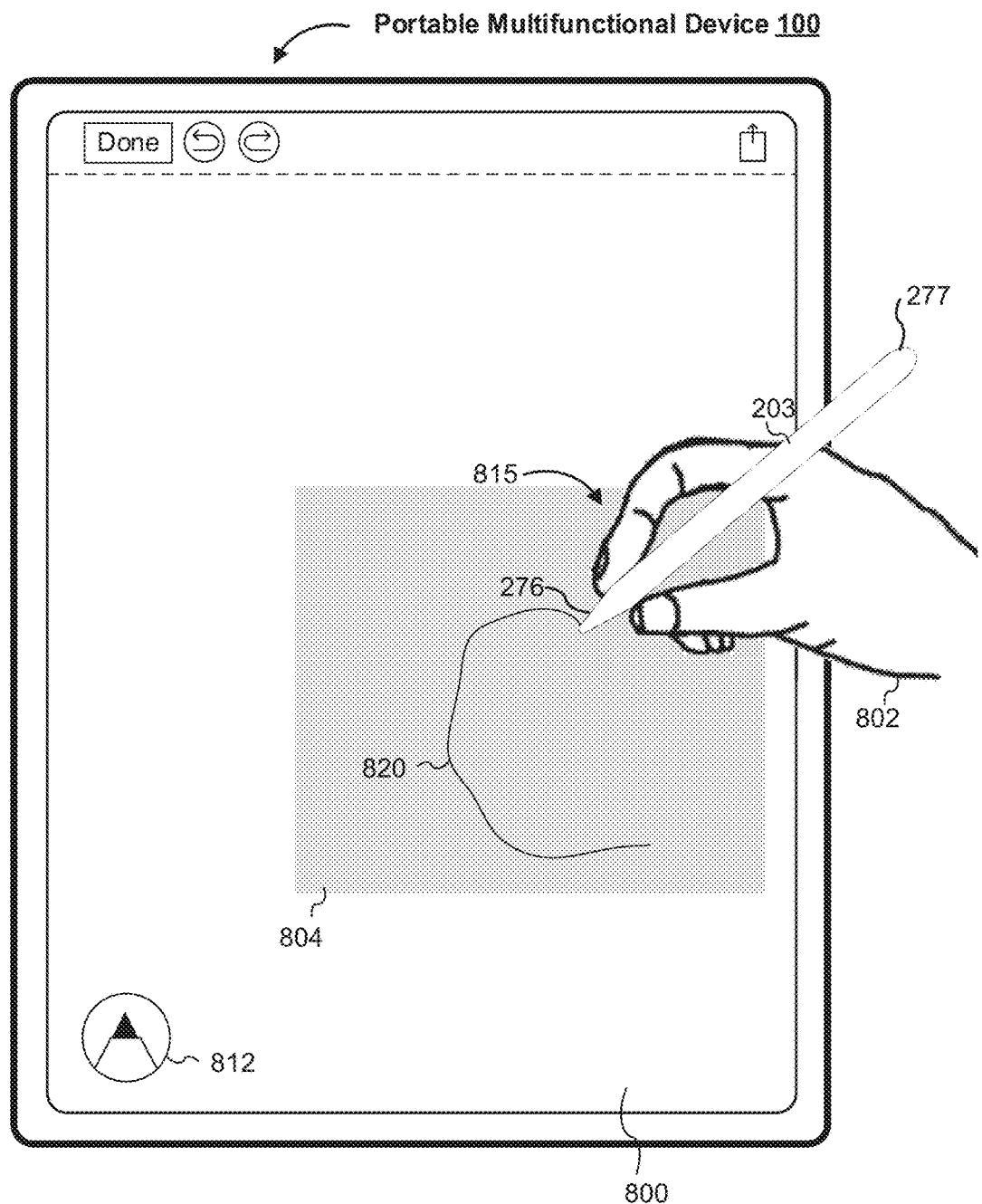
Figure 9A:
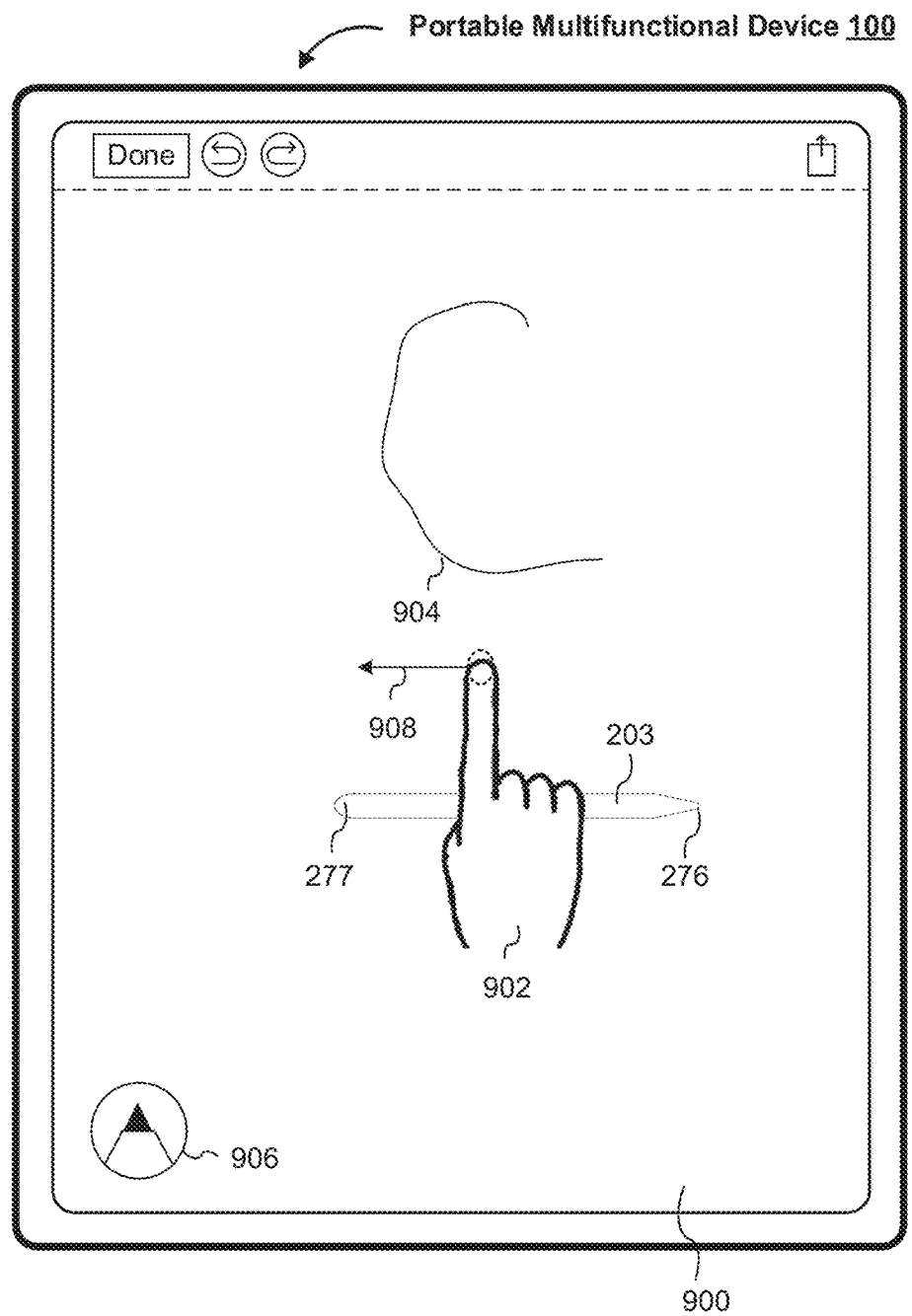
FIGS. 9A-9P illustrate example user interfaces of modifying touch input functionality in accordance with some embodiments.

FIGS. 8A-8B illustrate a first sequence where a first change is made to displayed content according to a determination that the stylus is being held according to a first grip arrangement. As shown in FIG. 8A, the electronic device 100 displays a user interface 800 associated with a drawing or notes application that includes content 804 (e.g., a gray colored rectangle). In FIG. 8A, the electronic device 100 detects an input 810 (e.g., a drawing stroke or mark) from the stylus 203 while a user is holding the stylus 203 in his/her hand 802 according to a first grip arrangement 815. The first grip arrangement 815 corresponds to holding the stylus 203 in a right-side-up orientation (e.g., the tip 276 of the stylus 203 pointed towards the electronic device 100) with the fingers of the hand 802 near the tip 276 of the stylus 203.

In response to detecting that the stylus 203 is held according to the first grip arrangement 815, in FIGS. 8A-8B, the electronic device 100 displays the indicator 812 associated with a first markup tool (e.g., a felt-tip marker) within the user interface 800. As shown in FIG. 8B, the electronic device 100 displays a first change 820 to the user interface 800 (e.g., a stroke or mark) based on the input 810 in FIG. 8A and the first markup tool associated with the first grip arrangement 815 (e.g., the felt-tip marker).

Figure 8C:
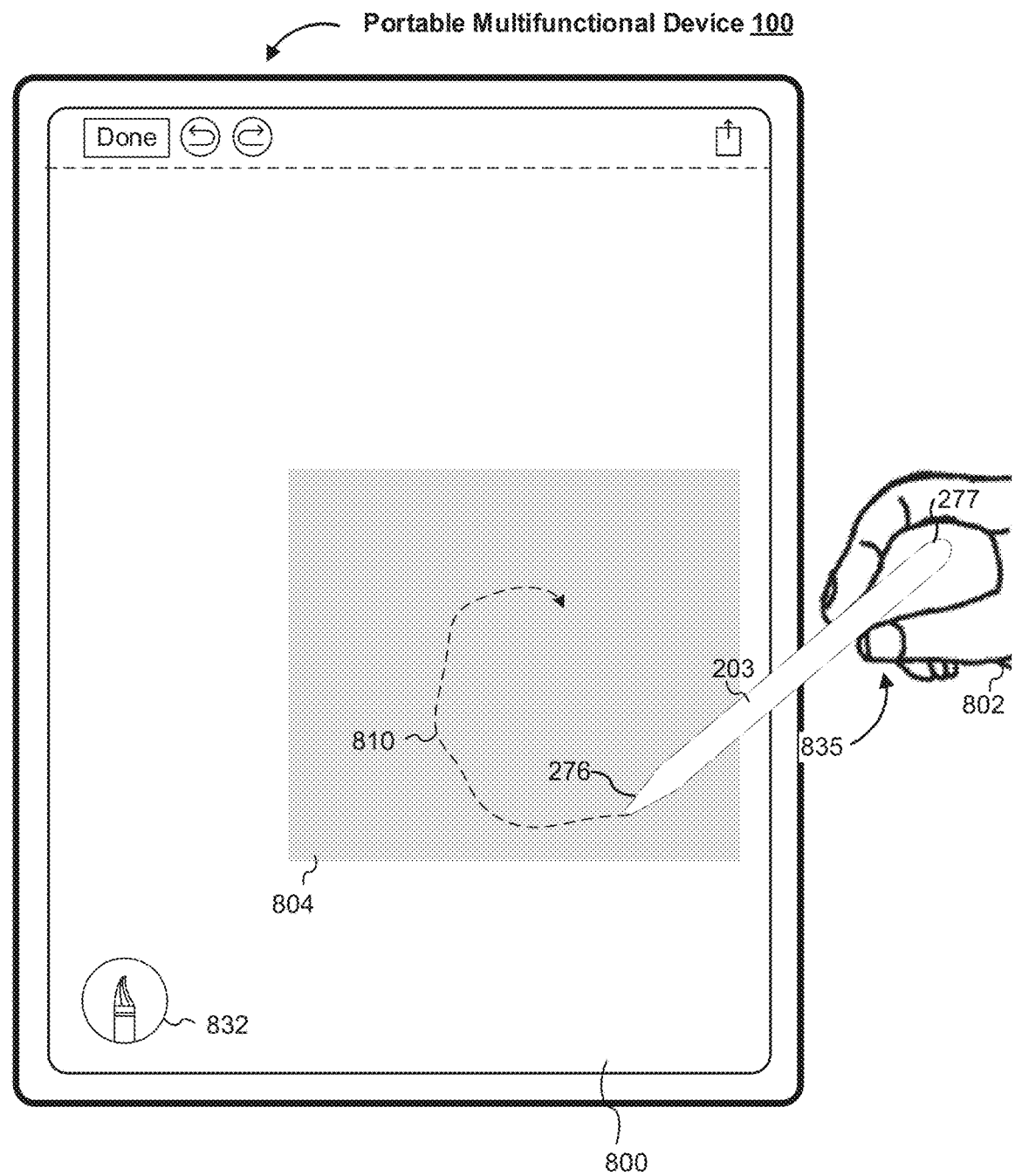
Figure 8D:
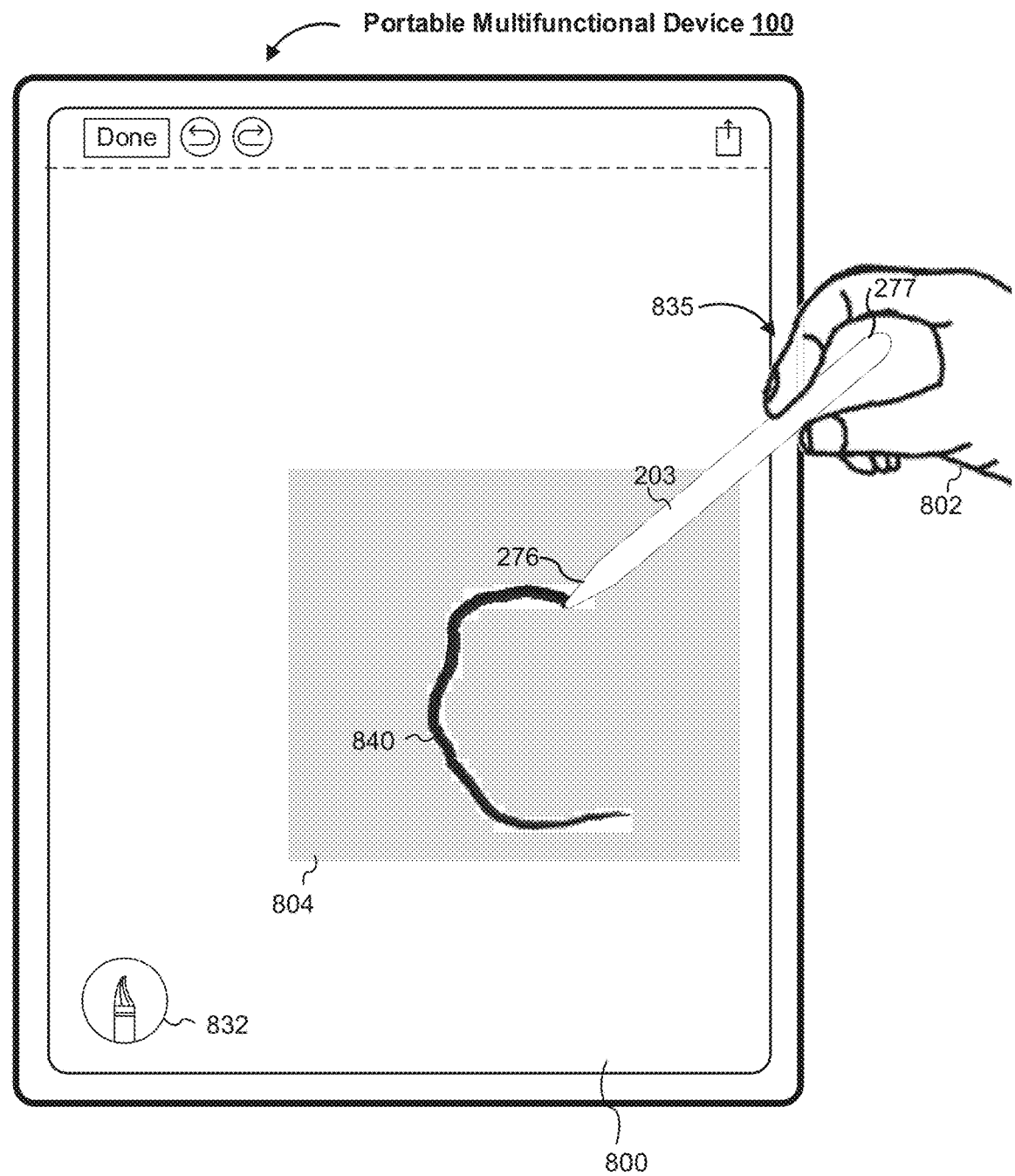

FIGS. 8C-8D illustrate a second sequence where a second mark change is made to displayed content according to a determination that the stylus is being held according to a second grip arrangement. As shown in FIG. 8C, the electronic device 100 displays the user interface 800 associated with the drawing or notes application that includes the content 804 (e.g., a gray colored rectangle). In FIG. 8C, the electronic device 100 detects the input 810 (e.g., a drawing stroke or mark) from the stylus 203 while a user is holding the stylus 203 in his/her hand 802 according to a second grip arrangement 835. The second grip arrangement 835 corresponds to holding the stylus 203 in a right-side-up orientation (e.g., the tip 276 of the stylus 203 pointed towards electronic device 100) with the fingers of the hand 802 near the end 277 of the stylus 203 opposite the tip 276 of the stylus 203.

In response to detecting that the stylus 203 is held according to the second grip arrangement 835, in FIGS. 8C-8D, the electronic device 100 displays the indicator 832 associated with a second markup tool (e.g., a watercolor paint brush) within the user interface 800. As shown in FIG. 8D, the electronic device 100 displays a second change 840 to the user interface 800 (e.g., a stroke or mark) based on the input 810 in FIG. 8C and the second markup tool associated with the second grip arrangement 835 (e.g., the watercolor paint brush).

Figure 8E:
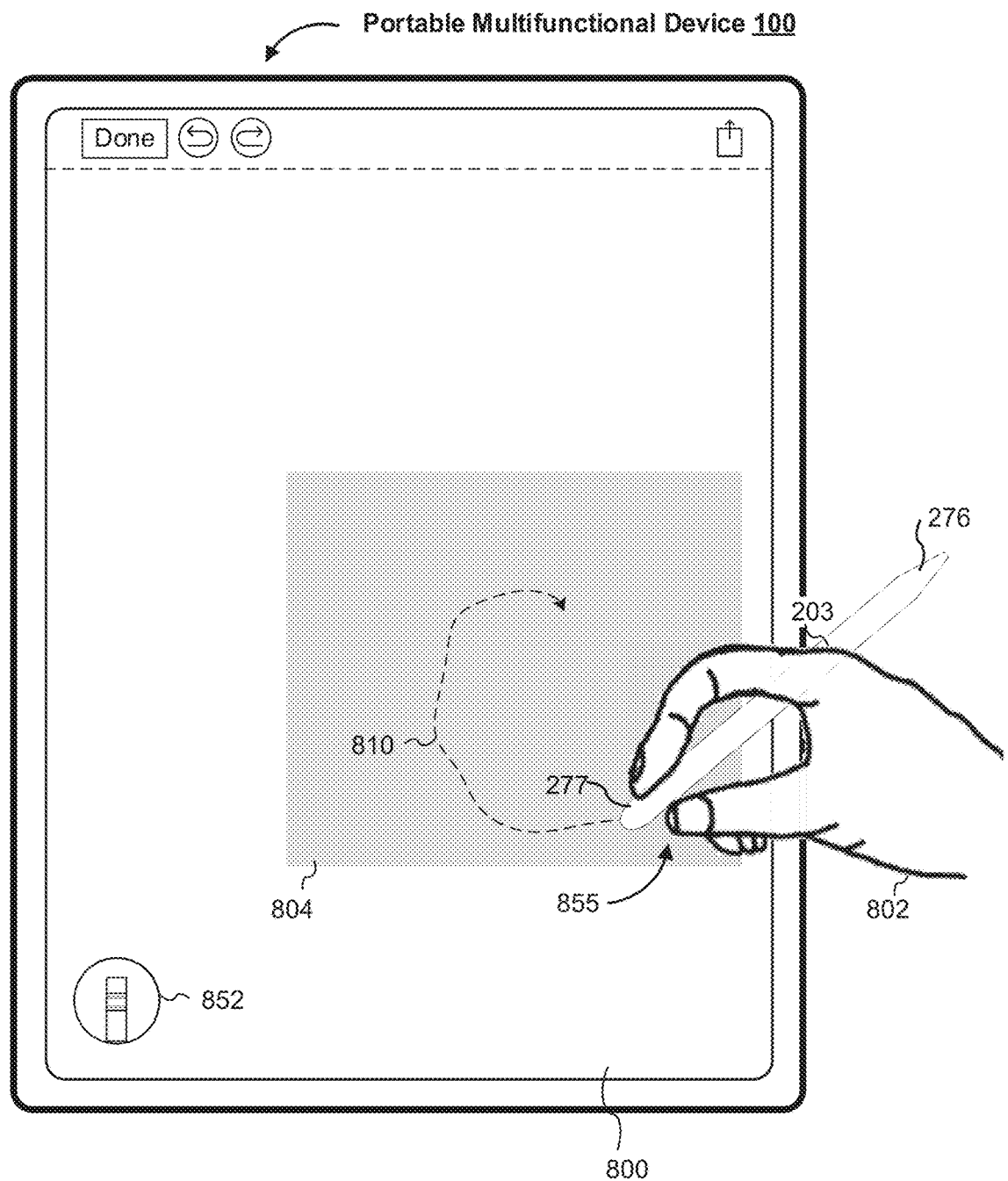
Figure 8F:
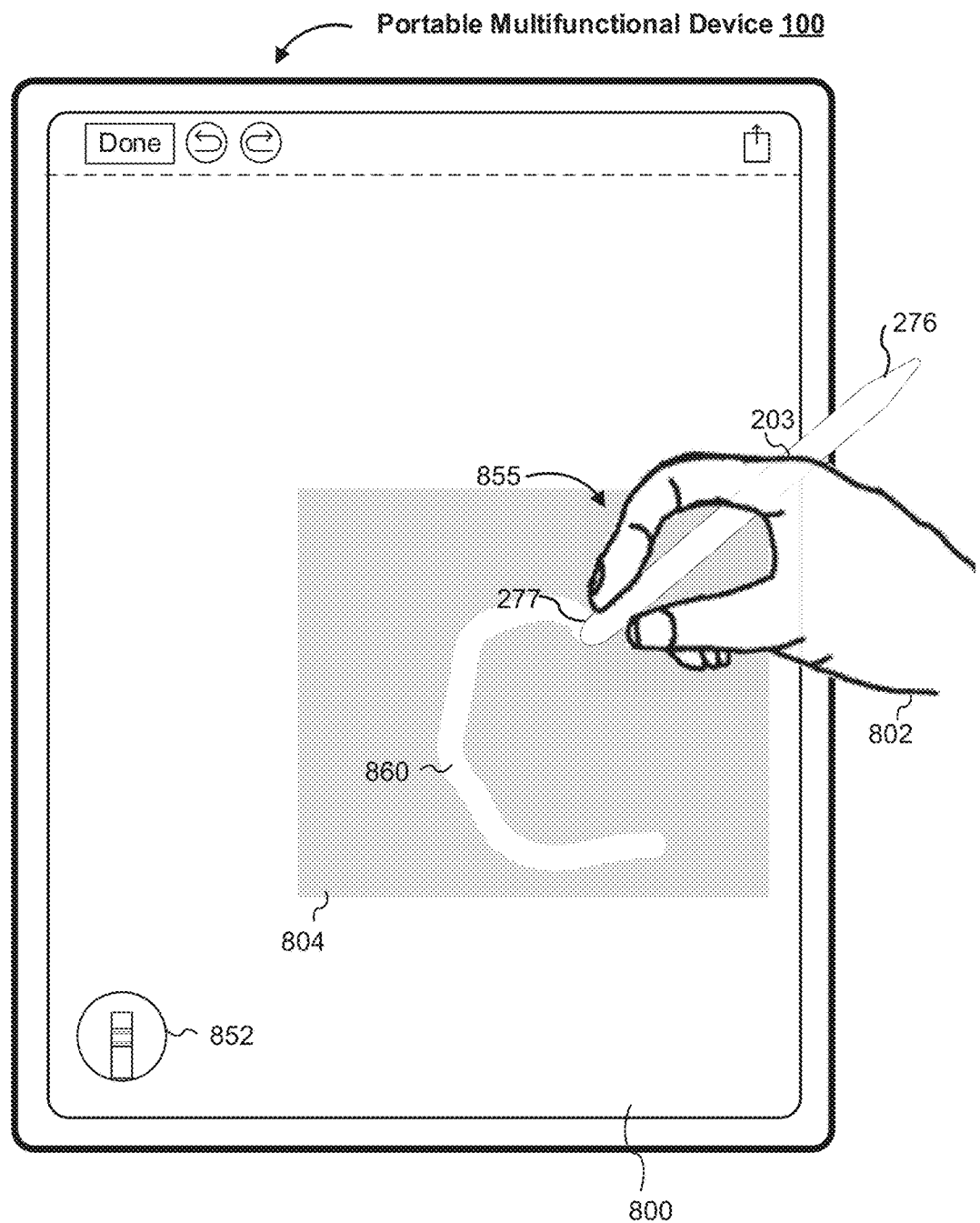

FIGS. 8E-8F illustrate a third sequence where a third change is made to displayed content according to a determination that the stylus is being held according to a third grip arrangement. As shown in FIG. 8E, the electronic device 100 displays a user interface 800 associated with the drawing or notes application that includes the content 804 (e.g., a gray colored rectangle). In FIG. 8E, the electronic device 100 detects the input 810 (e.g., a drawing stroke or mark) from the stylus 203 while a user is holding the stylus 203 in his/her hand 802 according to a third grip arrangement 855. The third grip arrangement 855 corresponds to holding the stylus 203 in an upside-down orientation (e.g., the tip 276 of the stylus 203 pointed away from the electronic device 100) near the end 277 of the stylus 203 opposite the tip 276 of the stylus 203.

In response to detecting that the stylus 203 is held according to the third grip arrangement 855, in FIGS. 8E-8F, the electronic device 100 displays the indicator 852 associated with a third markup tool (e.g., an eraser) within the user interface 800. As shown in FIG. 8F, the electronic device 100 displays a third change 860 to the user interface 800 (e.g., a stroke or mark) based on the input 810 in FIG. 8E and the third markup tool associated with the third grip arrangement 855 (e.g., the eraser).

Figure 8G:
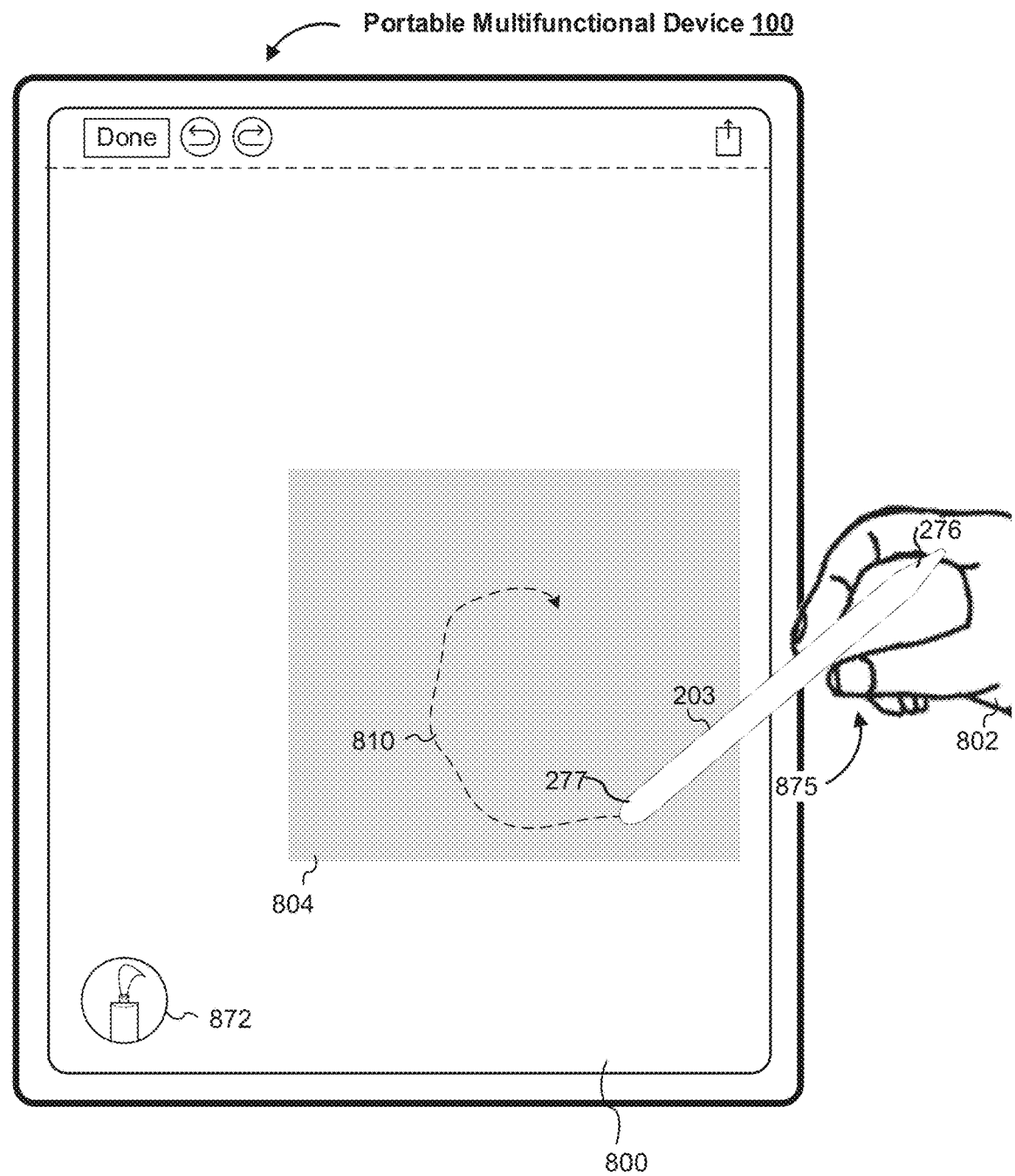
Figure 8H:
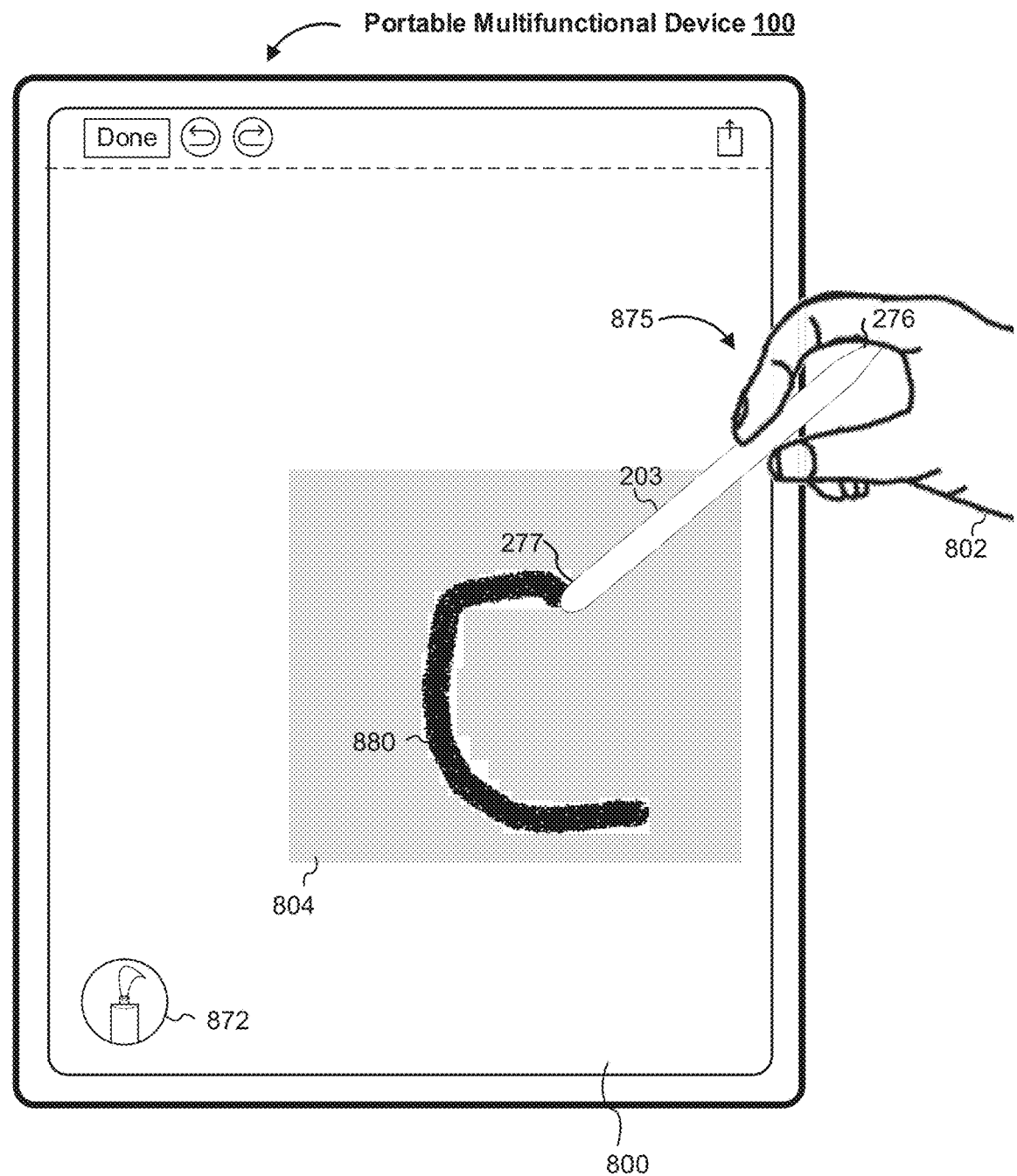

FIGS. 8G-8H illustrate a fourth sequence where a fourth change is made to displayed content according to a determination that the stylus is being held according to a fourth grip arrangement. As shown in FIG. 8G, the electronic device 100 displays the user interface 800 associated with the drawing or notes application that includes the content 804 (e.g., a gray colored rectangle). In FIG. 8G, the electronic device 100 detects the input 810 (e.g., a drawing stroke or mark) from the stylus 203 while a user is holding the stylus 203 in his/her hand 802 according to a fourth grip arrangement 875. The fourth grip arrangement 875 corresponds to holding the stylus 203 in an upside-down orientation (e.g., the tip 276 of the stylus 203 pointed away from the electronic device 100) near the tip 276 of the stylus 203.

In response to detecting that the stylus 203 is held according to the fourth grip arrangement 875, in FIGS. 8G-8H, the electronic device 100 displays the indicator 872 associated with a fourth markup tool (e.g., a spray paint can) within the user interface 800. As shown in FIG. 8H, the electronic device 100 displays a fourth change 880 to the user interface 800 (e.g., a stroke or mark) based on the input 810 in FIG. 8G and the fourth markup tool associated with the fourth grip arrangement 875 (e.g., the spray paint can).

One of ordinary skill in the art will appreciate that the particular mapping of grip arrangements to mark types in the sequences described with reference to FIGS. 8A-8H is arbitrary and may be changed. One of ordinary skill in the art will appreciate that although the same input 810 is shown in the sequences described with reference to FIGS. 8A-8H other input vectors may be detected while the stylus is held according to the grip arrangement in various other embodiments.

FIGS. 9A-9P illustrate example user interfaces for modifying touch input functionality in accordance with some embodiments. The user interfaces in these figures are used to illustrate the processes described below, including the processes in FIGS. 16A-16B. Although some of the examples which follow will be given with reference to inputs on a touch-screen display (where the touch-sensitive surface and the display are combined, for example on touch screen 112), in some embodiments, the electronic device 100 detects inputs on touch-sensitive surface 651 that is separate from display 650, as shown in FIG. 6B. In various embodiments, the electronic device 100 modifies touch input functionality based on data received from a stylus 203.

In various embodiments, the touch-sensitive surface (e.g., the touch-sensitive surface 275 in FIG. 2 and FIGS. 5A-5B) of the stylus 203 detects touch inputs and gesture inputs, or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, a flick, a swipe, a tap, a double tap, and/or the like.

In various embodiments, the orientation and/or movement sensors (e.g., accelerometer, magnetometer, gyroscope) of the stylus 203 detect orientation/movement inputs or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, barrel rotation and/or direction thereof, twirl and/or direction thereof, orientation (e.g., position) of the tip 276 and/or the end 277 of the stylus 203 relative to a reference plane, and/or the like.

Figure 9B:
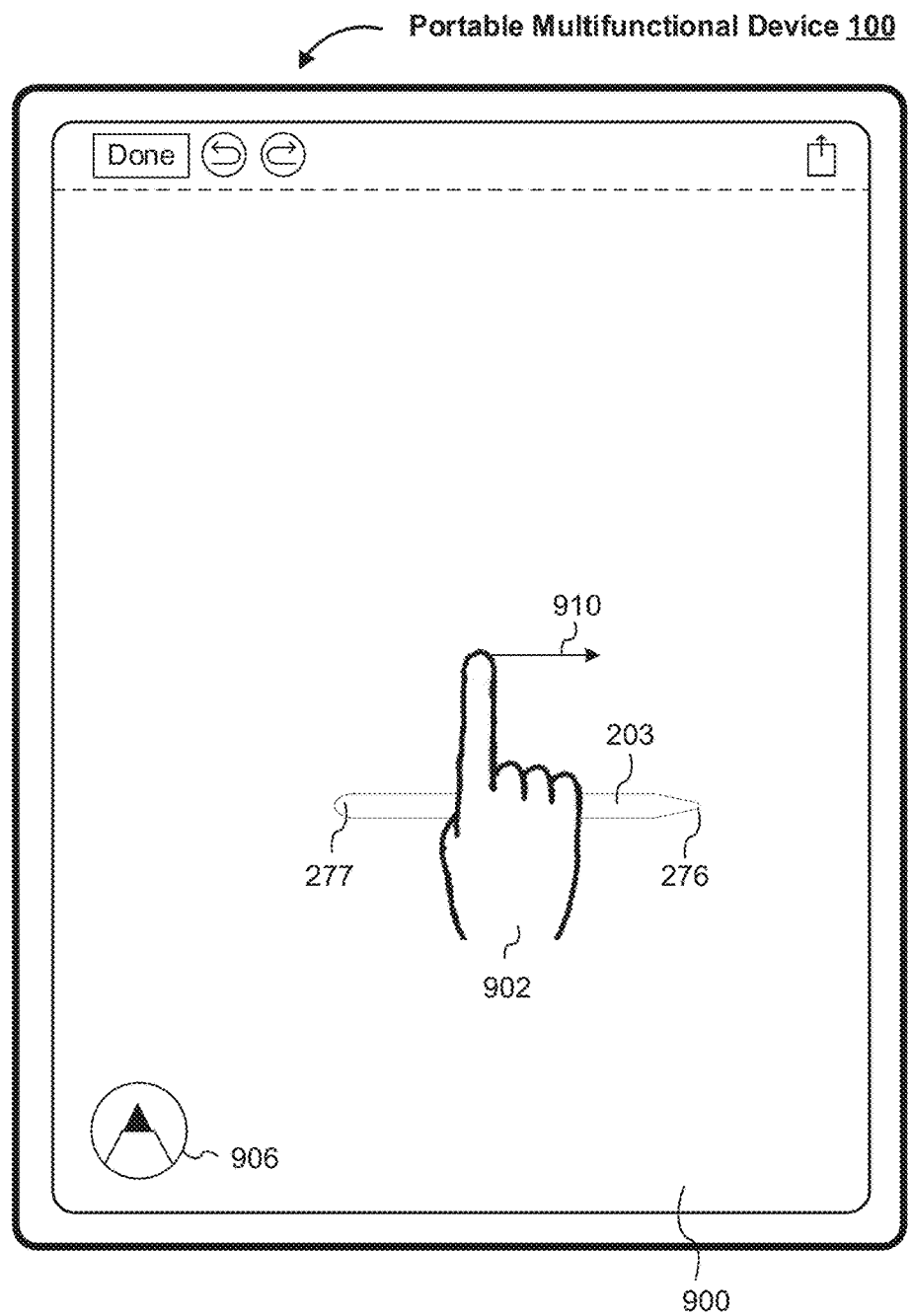
Figure 9C:
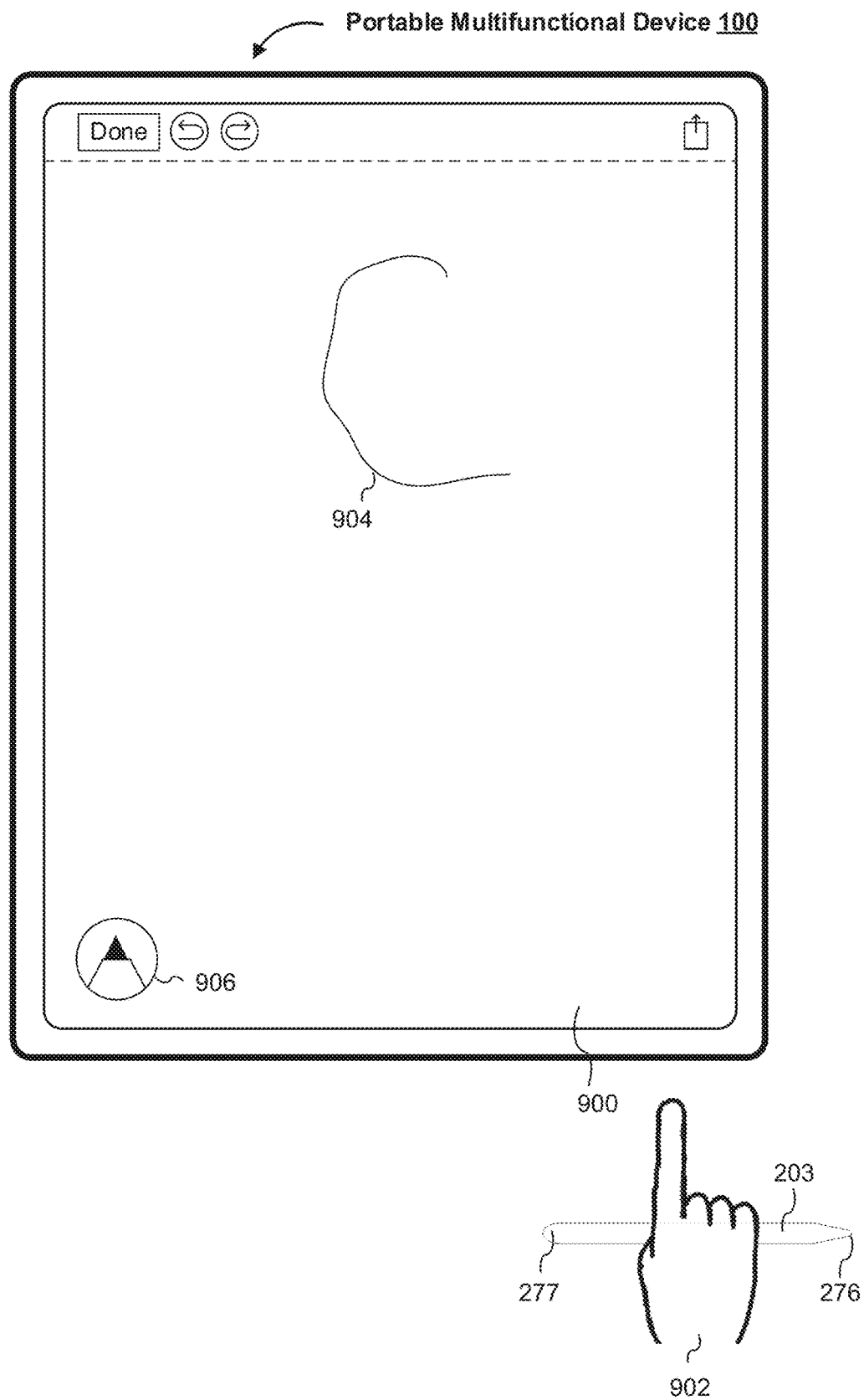

FIGS. 9A-9C illustrate an example of performing a first operation according to a determination that the stylus is being held. As illustrated in FIG. 9A, the electronic device 100 displays a user interface 900 associated with a drawing or notes application that includes content 904 (e.g., a mark) and a visual indicator 906 indicating that the stylus 203 is being held by the hand of the user 902. The visual indicator 906 corresponds to a solid-tip marker icon in order to indicate that the stylus 203 would make solid marker marks on the user interface 900. One of ordinary skill in the art will appreciate that the content 904 and/or the visual indicator 906 may take a variety of forms.

As illustrated in FIG. 9A, the electronic device 100 detects a leftward swipe gesture 908 on the touch-sensitive surface of the electronic device 100. Responsive to detecting the leftward swipe gesture 908 and according to a determination, based on data received from the stylus 203, that the stylus 203 is being held by the hand of the user 902, the electronic device 100 performs an erasing or undo operation with respect to the content 904. Accordingly, the electronic device 100 ceases to display the content 904 on the user interface 900 as is illustrated in FIG. 9B and maintains display of the visual indicator 906.

As illustrated in FIG. 9B, the electronic device 100 detects a rightward swipe gesture 910 on the touch-sensitive surface of the electronic device 100. Responsive to detecting the rightward swipe gesture 910 and according to a determination, based on data received from the stylus 203, that the stylus 203 is being held by the hand of the user 902, the electronic device 100 performs a redo operation with respect to the content 904. Accordingly, the electronic device 100 redisplays the content 904 on the user interface 900 as is illustrated in FIG. 9C and maintains display of the visual indicator 906.

Figure 9D:
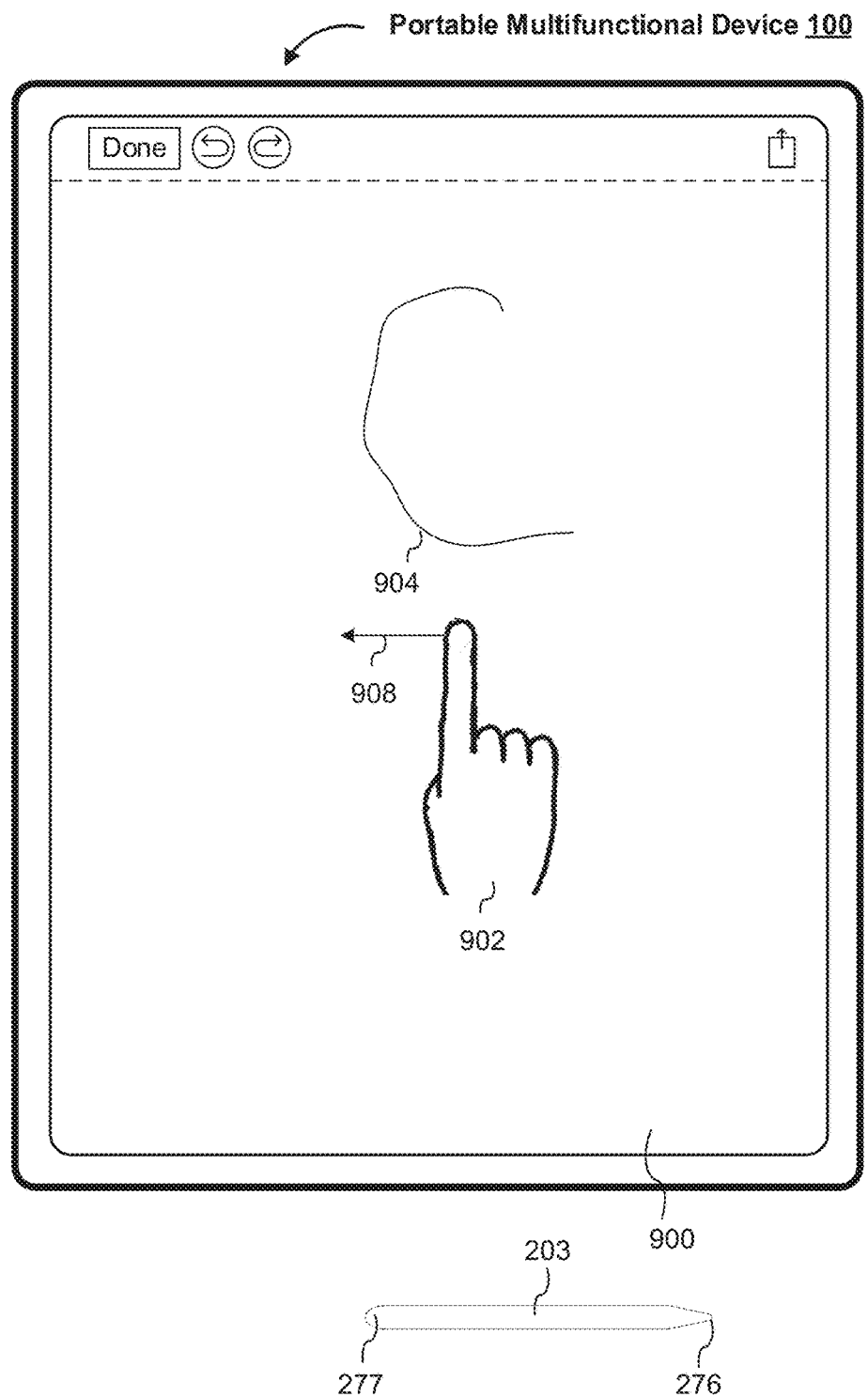
Figure 9E:
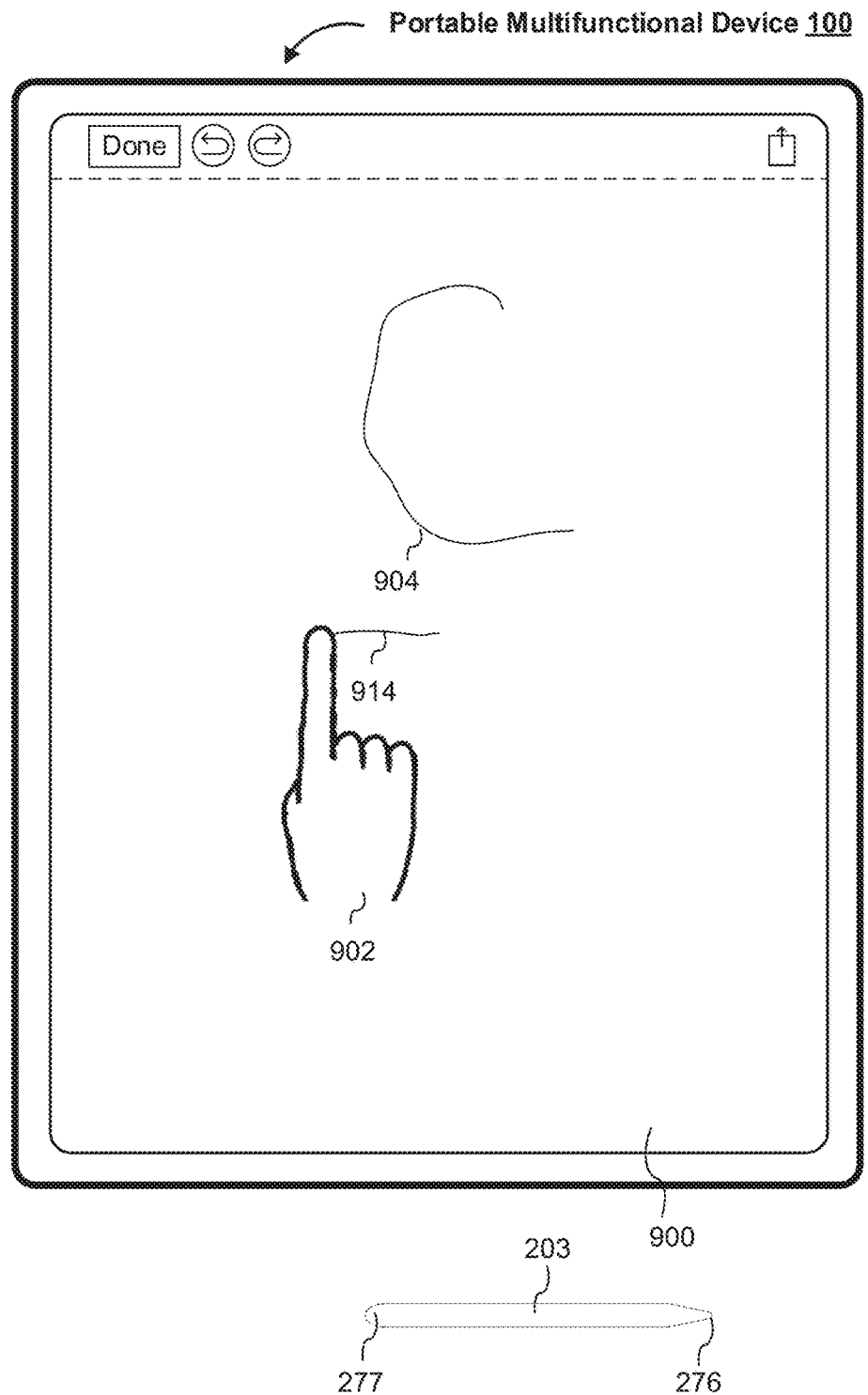

FIGS. 9D-9E illustrate an example of performing a second operation according to a determination that the stylus is not being held. The electronic device 100 displays the content 904 on the user interface 900 in FIG. 9D. The electronic device 100 determines that the stylus 203 is not being held by the hand of the user 902 based on: data received from the stylus 203 and/or a lack (e.g., absence) of data being received from the stylus 203. Accordingly, as illustrated in FIGS. 9D-9E, the electronic device 100 does not display of the visual indicator 906 shown in FIGS. 9A-9C.

As illustrated in FIG. 9D, the electronic device 100 detects the leftward swipe gesture 908 (e.g., stroke) on the touch-sensitive surface of the electronic device 100. Responsive to detecting the leftward swipe gesture 908 (e.g., similar to the leftward swipe gesture 908 in FIG. 9A) and according to a determination that the stylus 203 is not being held by the hand of the user 902, the electronic device 100 performs a drawing operation on the user interface 900 in FIG. 9E. Namely, as illustrated in FIG. 9E, the electronic device 100 displays a mark 914 corresponding to the leftward swipe gesture 908 in FIG. 9D and maintains display of the content 904. This draw operation is different from the erase/undo operation performed in response to the leftward swipe gesture 908 made while the stylus 203 was held, which is illustrated in FIGS. 7A-7B.

Figure 9F:
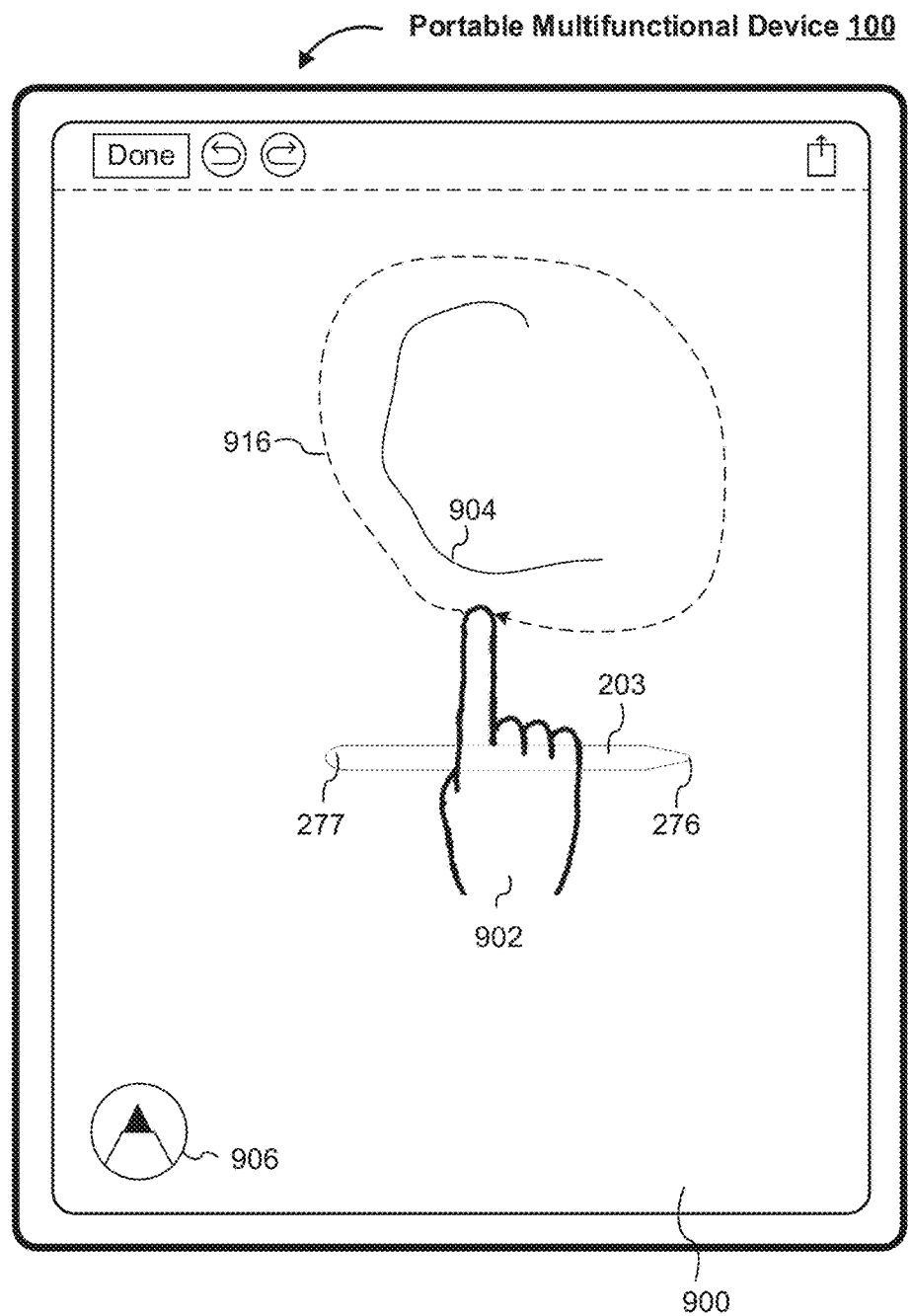
Figure 9G:
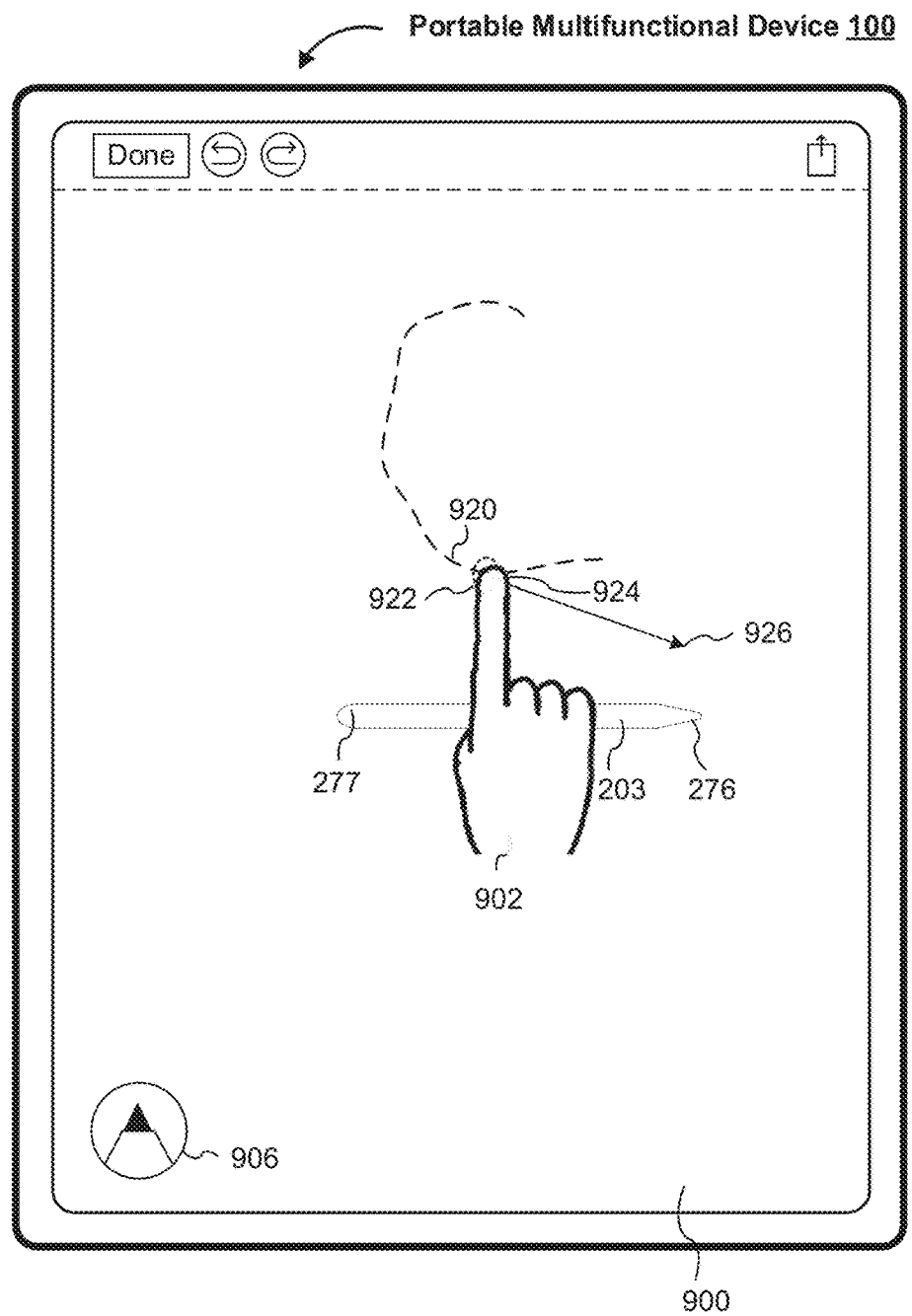
Figure 9H:
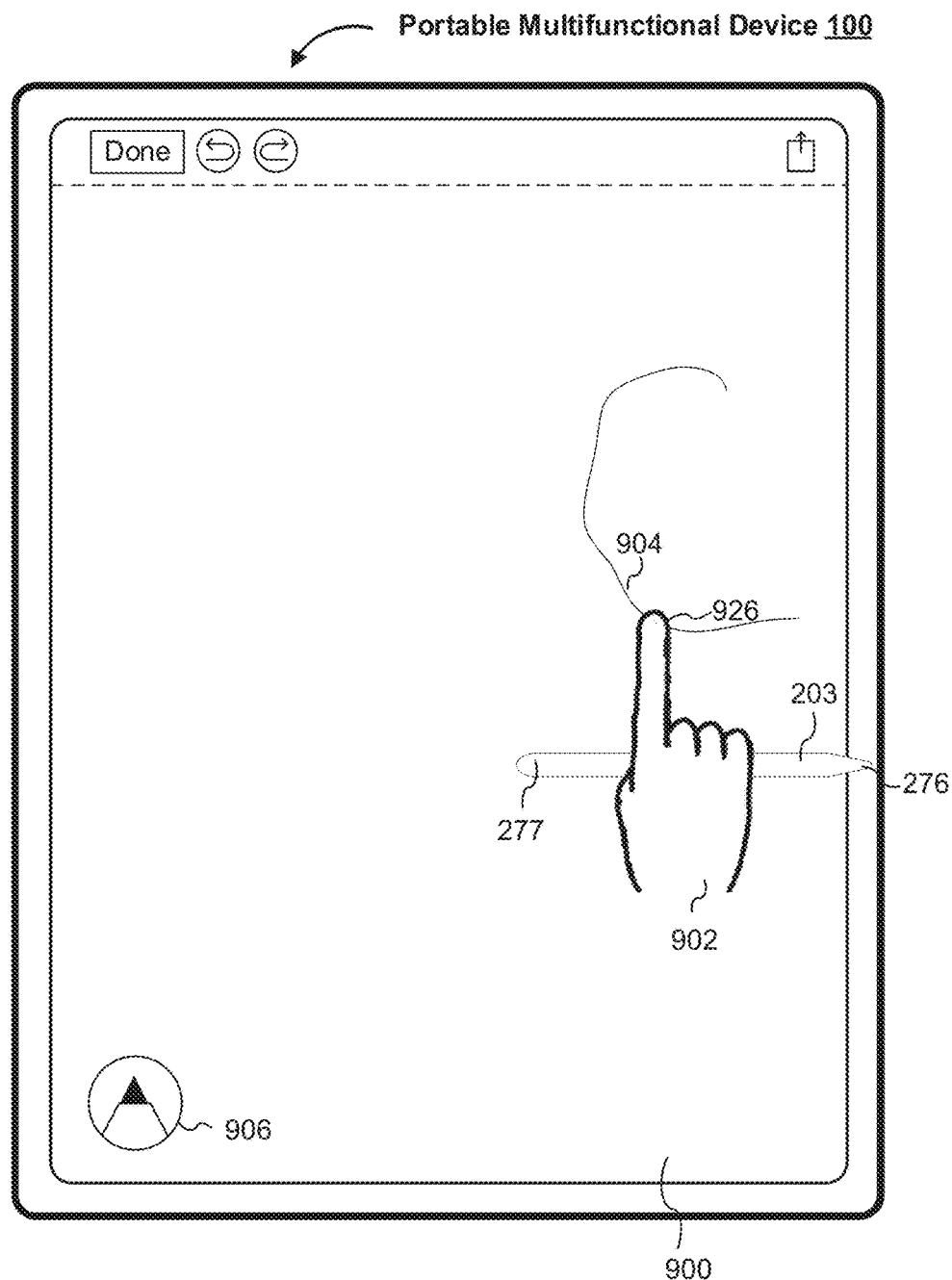

FIGS. 9F-9H illustrate another example of performing a first operation according to a determination that the stylus is being held. As illustrated in FIG. 9F, the electronic device 100 displays a user interface 900 that includes content 904 (e.g., a mark) and the visual indicator 906 indicating the stylus 203 is being held by the hand of the user 902.

As illustrated in FIG. 9F, the electronic device 100 detects a loop gesture 916 (e.g., a lasso gesture) on the touch-sensitive surface of the electronic device 100. The loop gesture 916 corresponds to enclosing (e.g., substantially enclosing) the content 904. In other words, the loop gesture 916 corresponds to encircling and/or encompassing displayed content, including a portion of displayed content (e.g., the top half of a circle, a segment of a line, a sliver of an image, half of a stanza, etc.). One of ordinary skill in the art will appreciate that the loop gesture 916 may include a variety of lines (e.g., regular polygon lines, irregular polygon lines, circular lines, ovular lines, lines having various curvatures, or a combination thereof) and/or may enclose a variety of one or more types of displayed content (e.g., line, polygon, mark, image, text, etc.).

Responsive to detecting the loop gesture 916 in FIG. 9F and according to a determination, based on the data received from the stylus 203, that the stylus 203 is being held by the hand of the user 902, the electronic device 100 changes the content 904 enclosed by the loop gesture 916 in order to indicate that the content 904 has been selected in FIG. 9G. Namely, as illustrated in FIGS. 9F-9G, the electronic device 100 changes the content 904 from a solid line mark to a content 920 of a dotted-line mark. One of ordinary skill in the art will appreciate that the electronic device 100 may change the content 904 in a variety of ways in order to indicate detection of the loop gesture 916.

As illustrated in FIG. 9G, the electronic device 100 detects a dragging gesture 922 that includes a starting point 924 and an endpoint 926. Responsive to detecting the dragging gesture 922 and according to a determination, based on the data received from the stylus 203, that the stylus 203 is being held by the hand of the user 902, the electronic device 100 moves the content 920 in accordance with the dragging gesture 922, as is illustrated in FIG. 9H. Namely, as illustrated in FIG. 9H, the electronic device 100 moves (e.g., changes display location of) the content 920 to the endpoint 926 of the dragging gesture 922, and restores display of the content 904 as a solid-line mark.

Figure 9I:
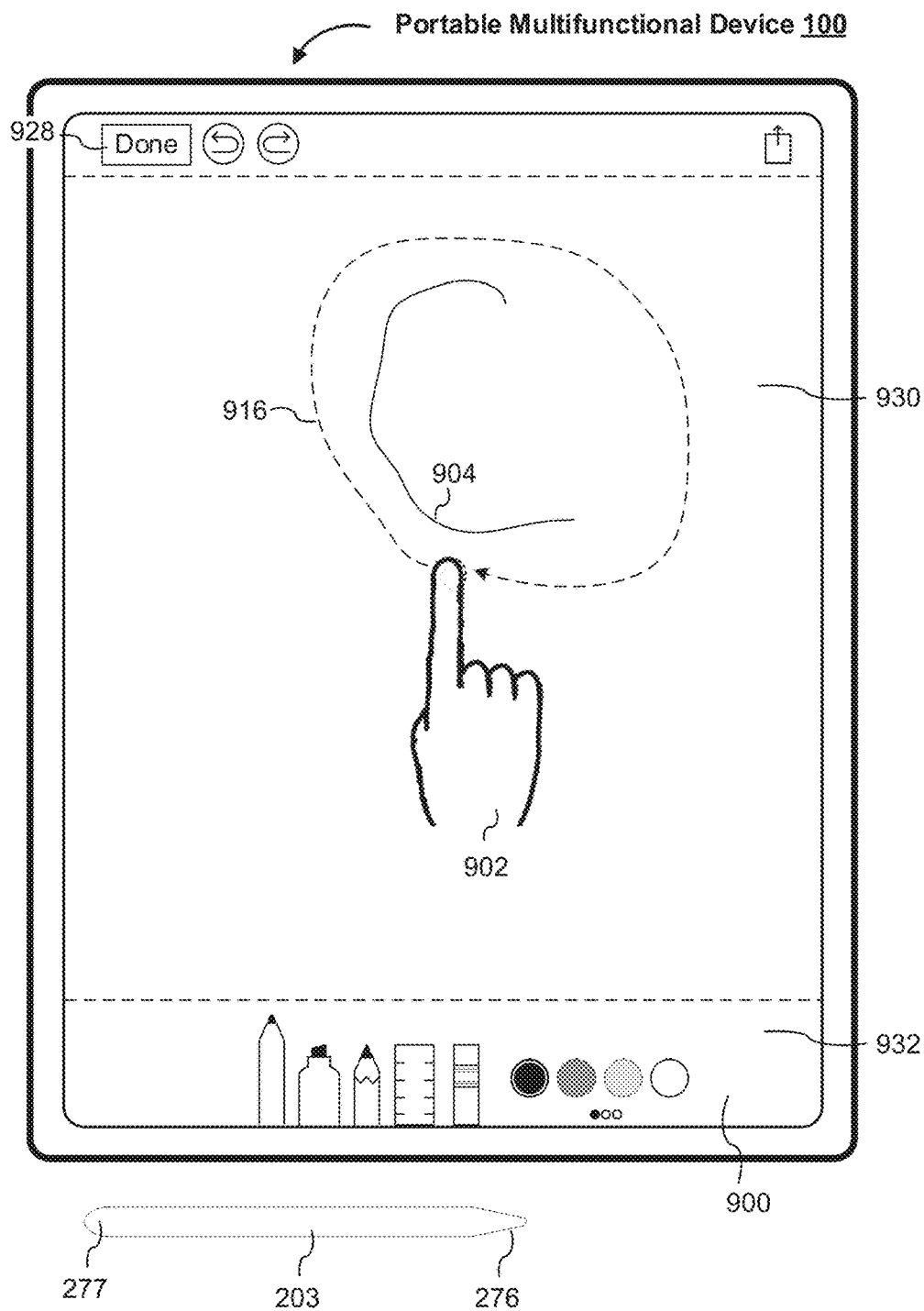
Figure 9J:
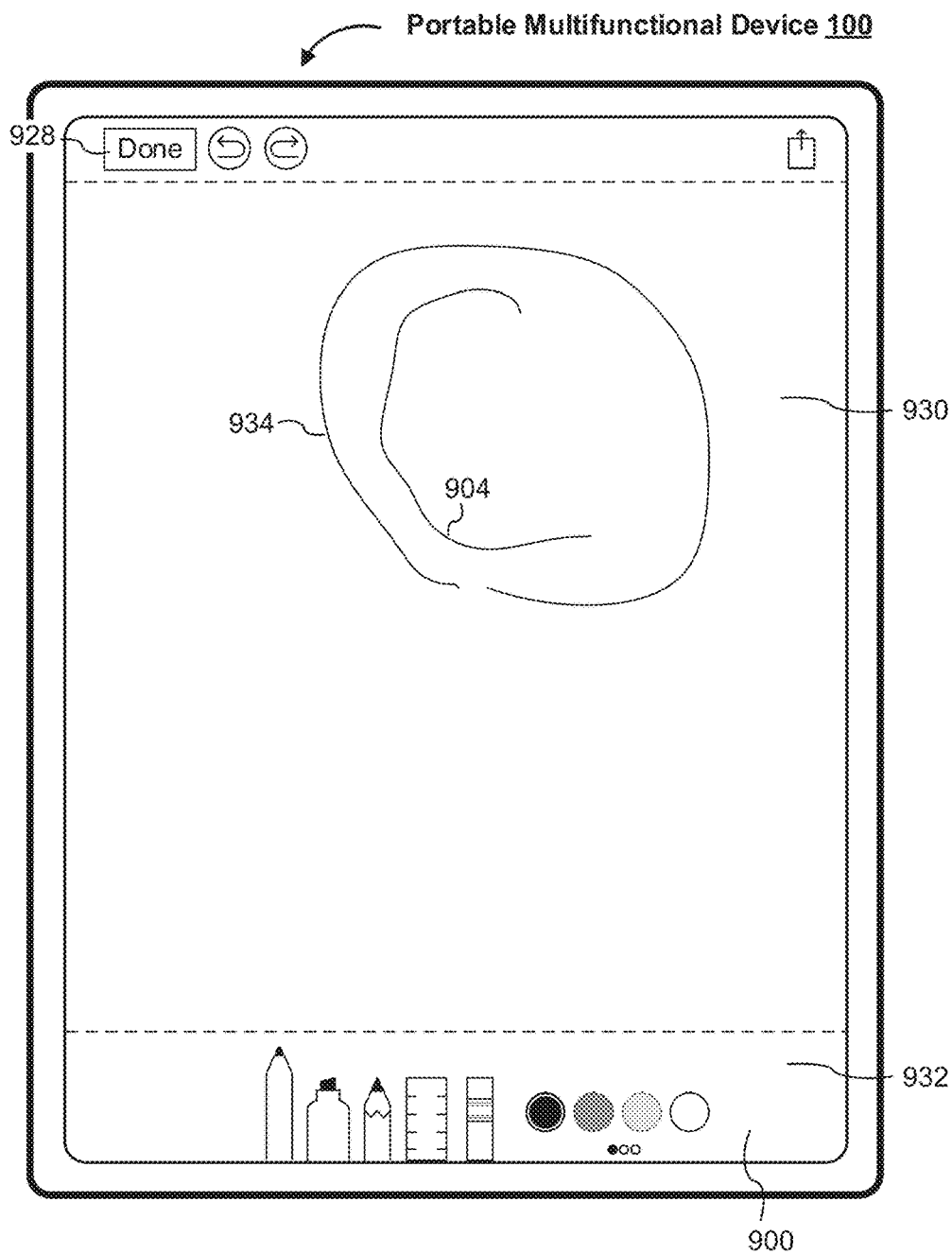

FIGS. 9I-9J illustrate another example of performing a second operation according to a determination that the stylus is not being held. The electronic device 100 determines that the stylus 203 is not being held by the hand of the user 902 based on: data received from the stylus 203 and/or a lack (e.g., absence) of data being received from the stylus 203. As illustrated in FIG. 9I, in response to determining that the stylus 203 is not being held by the hand of the user 902, the electronic device 100 does not display the visual indicator 906 shown in FIGS. 9F-9H. The electronic device 100 displays a navigation region 928, a canvas region 930, and a toolbar region 932 on the user interface 900 in FIG. 9I. The navigation region 928, the canvas region 930, and the toolbar region 932 are associated with a stylus-compatible application, such as a drawing application (e.g., a Notes or Drawing application).

As illustrated in FIG. 9I, the electronic device 100 detects the loop gesture 916 enclosing the content 904 (e.g., similar to the loop gesture 916 in FIG. 9F). However, because the stylus 203 is not being held by the hand of the user 902, the electronic device 100 performs a second operation different from the first operation described with respect to FIGS. 9F-9H. Namely, as illustrated in FIG. 9J, responsive to detecting the loop gesture 916 and according to a determination, based on data received from the stylus 203 and/or a lack thereof, that the stylus 203 is not being held by the hand of the user 902, the electronic device 100 displays a mark 934 corresponding to the loop gesture 916.

Figure 9K:
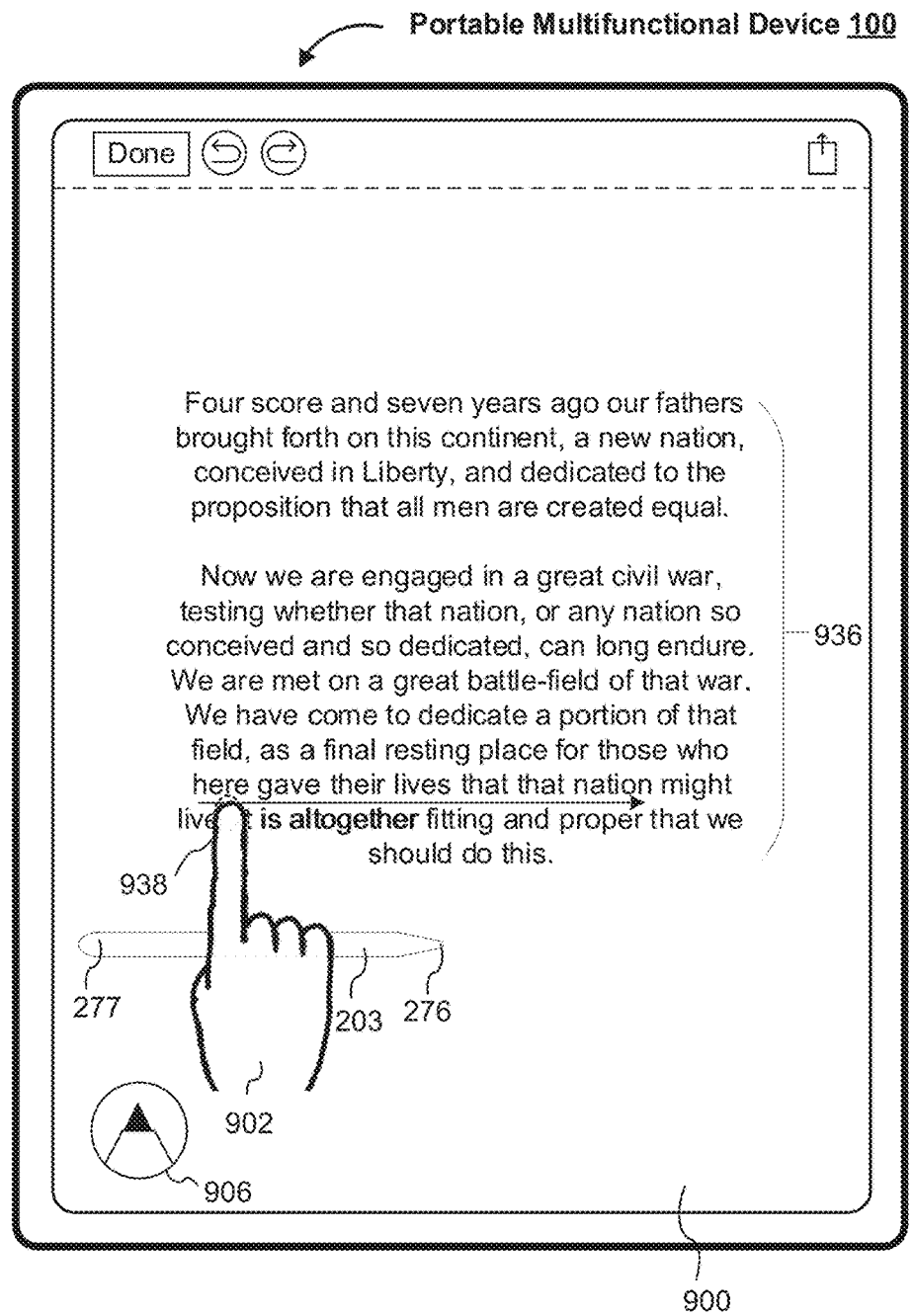
Figure 9L:
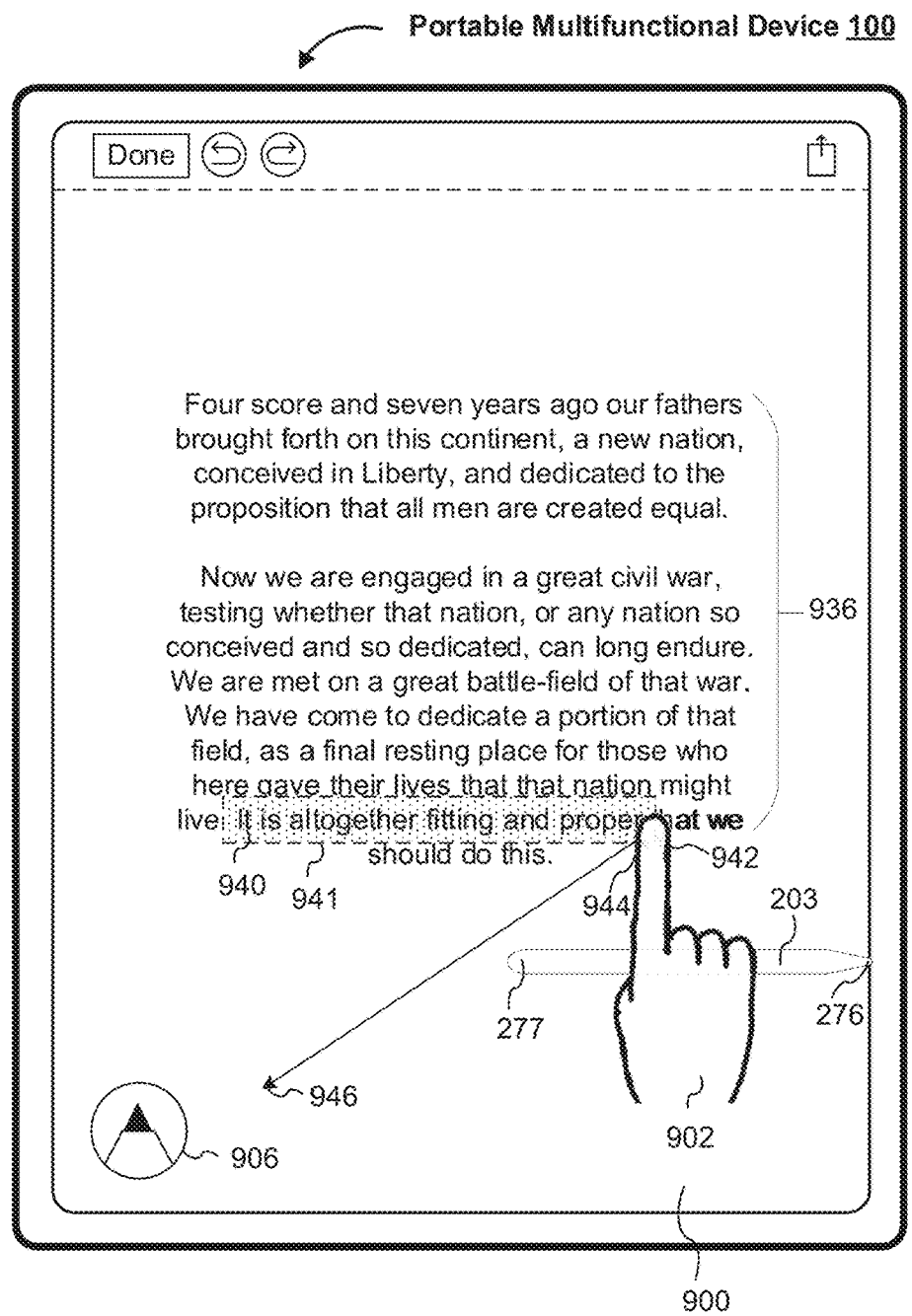
Figure 9M:
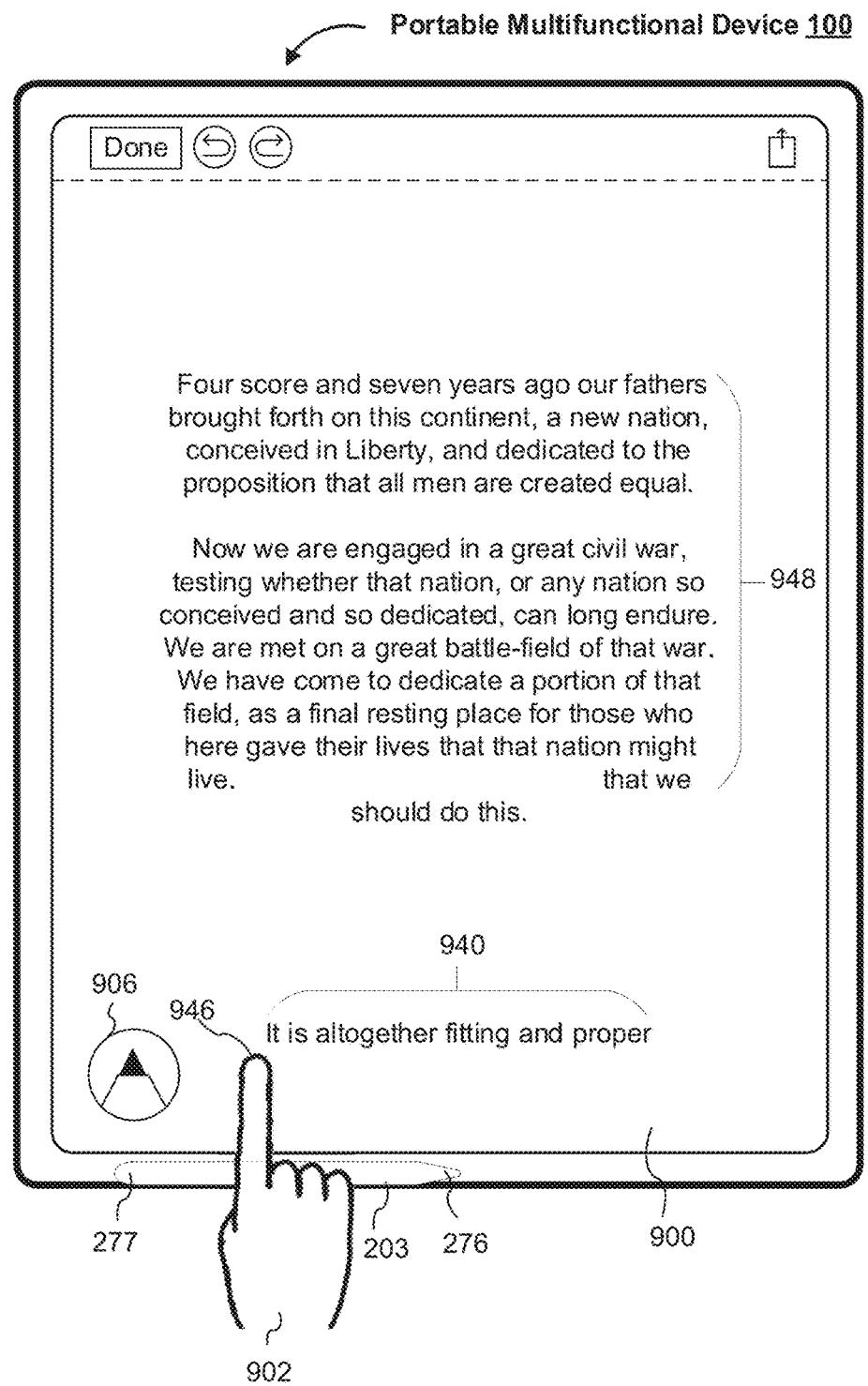
Figure 9P:
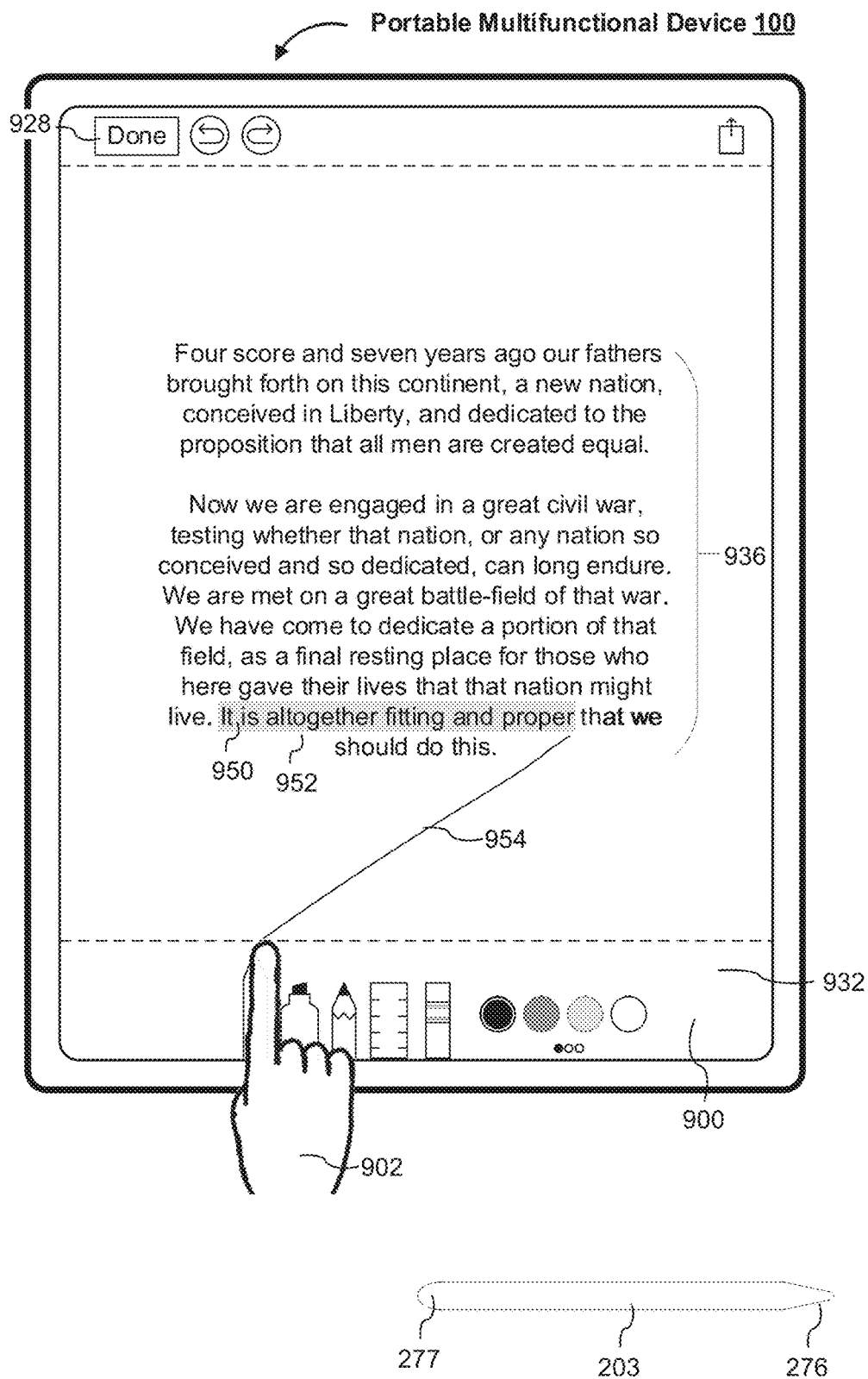

FIGS. 9K-9M illustrate another example of performing a first operation according to a determination that the stylus is being held. As illustrated in FIG. 9K, the electronic device 100 displays a user interface 900 that includes text 936 and the visual indicator 906 indicating the stylus 203 is being held by the hand of the user 902.

As further illustrated in FIG. 9K, the electronic device 100 detects a rightward swipe gesture 938 on the touch-sensitive surface of the electronic device 100. Responsive to detecting the rightward swipe gesture 938 in FIG. 9K and according to a determination, based on data received from the stylus 203, that the stylus 203 is being held by the hand of the user 902, the electronic device 100 selects a portion of the text 936, as is illustrated in FIG. 9L. Namely, as illustrated in FIG. 9L, the electronic device displays the selected text 940 with a selection indicator 941 indicating the selection.

As FIG. 9L further illustrates, the electronic device 100 detects a dragging gesture 942 that includes a starting point 944 and an endpoint 946. Responsive to detecting the dragging gesture 942 in FIG. 9L and according to a determination, based on the data received from the stylus 203, that the stylus 203 is being held by the hand of the user 902, the electronic device 100 moves the selected text 940 in accordance with the dragging gesture 942, as is illustrated in FIG. 9M. Namely, as illustrated in FIG. 9M, the electronic device 100 moves (e.g., changes display location of) the selected text 940 to the endpoint 946 of the dragging gesture 942. As a result, as illustrated in FIG. 9M, the electronic device 100 displays a modified text 948 that corresponds to the text 936 without the moved selected text 940.

FIGS. 9N-9P illustrate another example of performing a second operation according to a determination that the stylus is not being held. As illustrated in FIG. 9N, the electronic device 100 displays a user interface 900 that includes text 936. The electronic device 100 displays a navigation region 928, a canvas region 930, and a toolbar region 932 on the user interface 900. The navigation region 928, the canvas region 930, and the toolbar region 932 are associated with a stylus-compatible application, such as a drawing application (e.g., a Notes or Drawing application). In response to data received from the stylus 203 and/or a lack thereof indicating that the stylus 203 is not being held by the hand of the user 902, the electronic device 100 does not display the visual indicator 906 in FIG. 9N as opposed to FIGS. 9K-9M.

As further illustrated in FIG. 9N, the electronic device 100 detects the rightward swipe gesture 938 on the touch-sensitive surface of the electronic device 100. Responsive to detecting the rightward swipe gesture 938 and according to a determination, based on data received from the stylus 203 and/or a lack thereof, that the stylus 203 is not being held by the hand of the user 902, the electronic device 100 highlights a portion of the text 936, as is illustrated in FIG. 9O. Namely as illustrated in FIG. 9O, the electronic device 100 displays highlighted text 950 with a highlight indicator 952 indicating the highlight. This highlight operation is different from the selection operation that occurred with respect to FIGS. 9K-9L when the stylus 203 was being held by the hand of the user 902.

As FIG. 9O further illustrates, the electronic device 100 detects the dragging gesture 942 that includes the starting point 944 and the endpoint 946. Responsive to detecting the dragging gesture 942 in FIG. 9O and according to a determination, based on the data received from the stylus 203 and/or lack thereof, that the stylus 203 is not being held by the hand of the user 902, the electronic device 100 displays, in FIG. 9P, a mark 954 corresponding to the dragging gesture 942. This mark display operation is different from the move operation that occurs with respect to FIGS. 9L-9M when the stylus 203 is being held by the hand of the user 902. As is further illustrated in FIG. 9P, the electronic device 100 maintains display of the text 936, the highlighted text 950, and the highlight indicator 952.

FIGS. 10A-10I illustrate example user interfaces for performing operations on existing marks based on finger manipulation inputs in accordance with some embodiments. The user interfaces in these figures are used to illustrate the processes described below, including the processes in FIGS. 17A-17C. Although some of the examples which follow will be given with reference to inputs on a touch-screen display (where the touch-sensitive surface and the display are combined, for example on touch screen 112), in some embodiments, the electronic device 100 detects inputs on touch-sensitive surface 651 that is separate from display 650, as shown in FIG. 6B. In various embodiments, the electronic device 100 performs operations on existing marks based on data received from a stylus 203.

In various embodiments, the touch-sensitive surface (e.g., the touch-sensitive surface 275 in FIG. 2 and FIGS. 5A-5B) of the stylus 203 detects touch inputs and gesture inputs, or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, a flick, a swipe, a tap, a double tap, and/or the like.

In various embodiments, the orientation and/or movement sensors (e.g., accelerometer, magnetometer, gyroscope) of the stylus 203 detect orientation/movement inputs or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, barrel rotation and/or direction thereof, twirl and/or direction thereof, orientation (e.g., position) of the tip 276 and/or the end 277 of the stylus 203 relative to a reference plane, and/or the like.

Figure 10A:
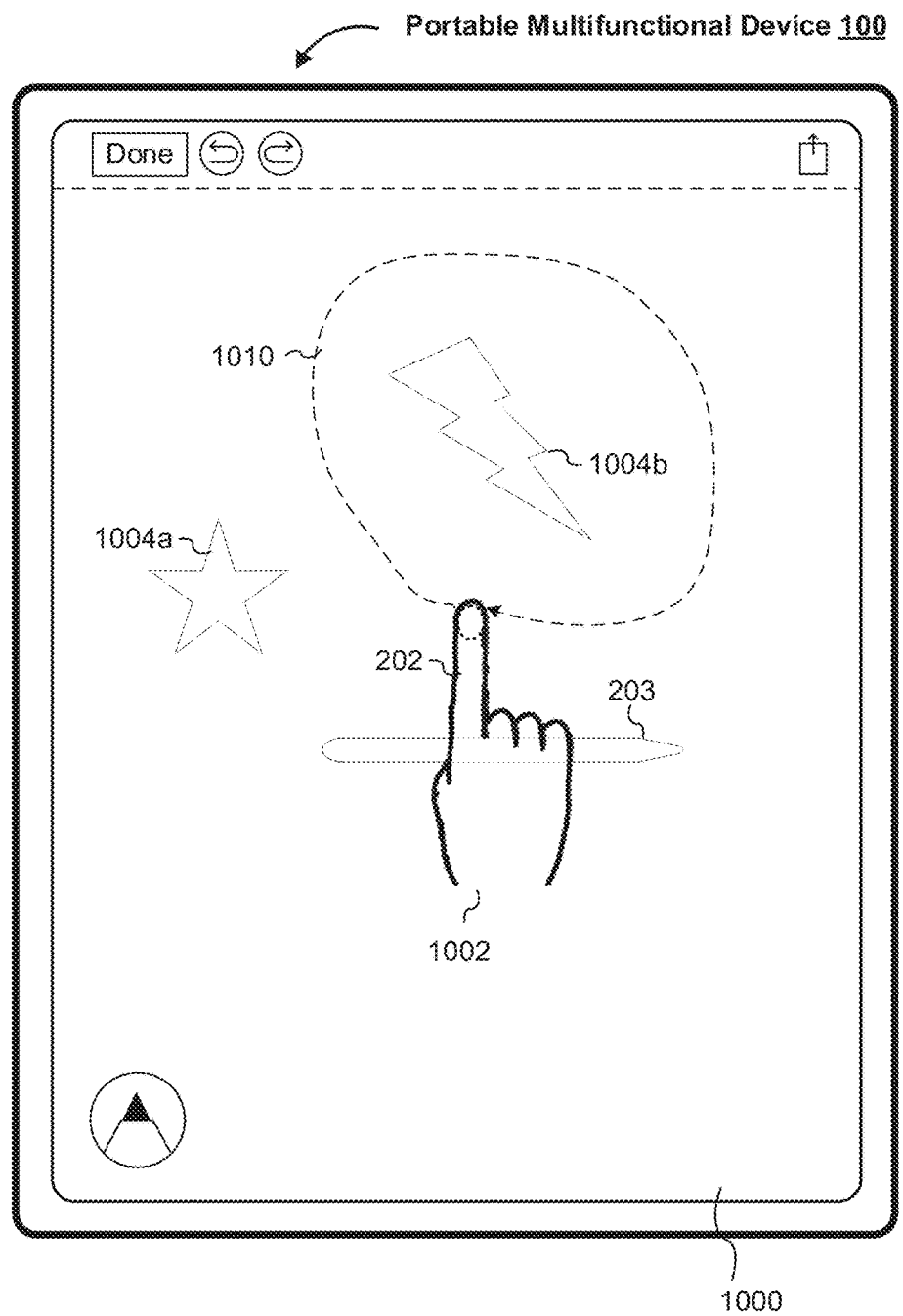
FIGS. 10A-10I illustrate example user interfaces for performing operations on existing marks based on finger manipulation inputs in accordance with some embodiments.
Figure 10B:
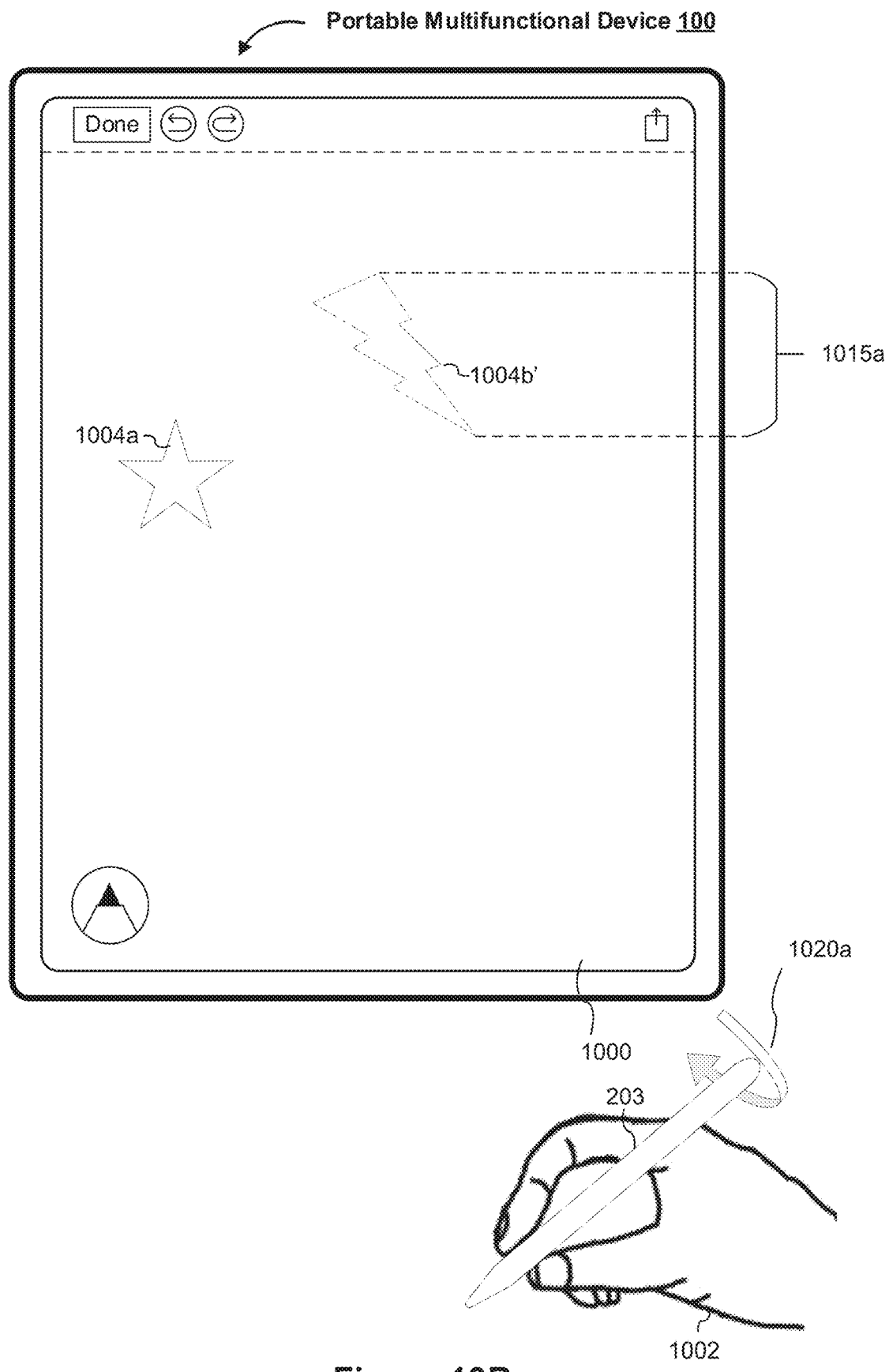

FIGS. 10A-10B show a sequence in which a user interface element is selected within a user interface. As shown in FIG. 10A, the electronic device 100 displays a user interface 1000 associated with a drawing or notes application that includes preexisting content: a star 1004a and a lightning bolt 1004b. In FIG. 10A, the electronic device 100 detects an input 1010 of a substantially circular mark (e.g., a drawing stroke or mark) around the lightning bolt 1004b from the one or more fingers 202 while a user is holding the stylus 203 in his/her hand 1002 in a closed first with the one or more fingers 202 of the hand 1002 clasped around the stylus 203.

In response to detecting the input 1010 selecting the lightning bolt 1004b in FIG. 10A, the electronic device 100 displays the lightning bolt 1004b' in a selected state in FIG. 10B with a dotted outline to indicate that the lightning bolt 1004b' is currently selected. In FIG. 10B, the star 1004a remains illustrated with a solid outline corresponding to a user not selecting the star 1004a.

Figure 10C:
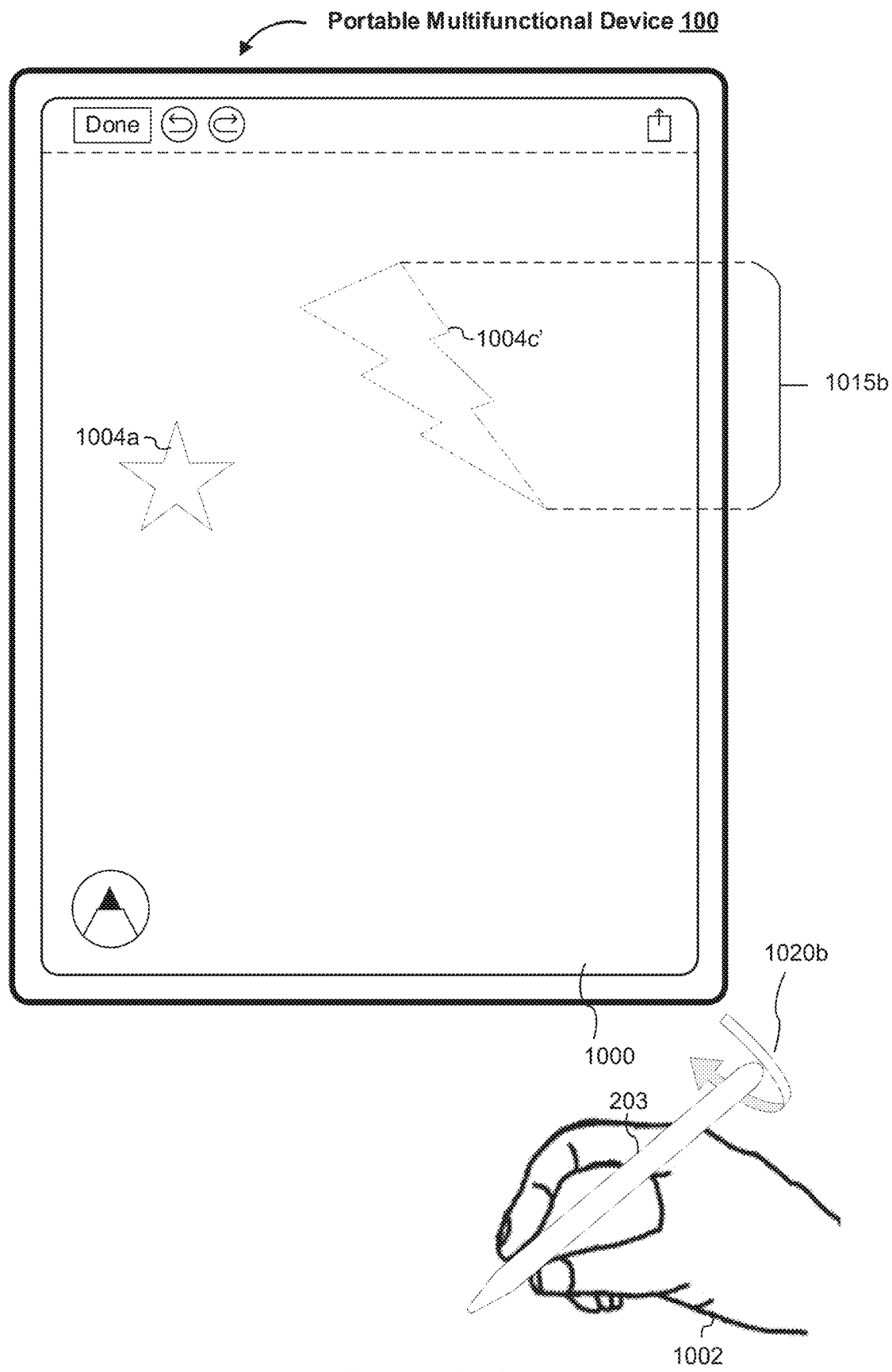

FIGS. 10B-10C show a sequence in which a first operation is performed on the user interface element (e.g., an increase in size) according to a determination that finger manipulation data from the stylus indicates a first finger manipulation input on the stylus (e.g., a counter-clockwise roll of the stylus). In FIG. 10B, the electronic device 100 displays the lightning bolt 1004b' in the first size 1015a. As shown in FIG. 10B, the stylus 203 detects an input 1020a (e.g., a counter-clockwise roll of the stylus 203) while a user is holding the stylus 203 in his/her hand 1002 and rolling the stylus 203 in a counter-clockwise direction.

In response to obtaining finger manipulation data indicating the input 1020a in FIG. 10B, the electronic device 100 displays, in FIG. 10C, the lightning bolt 1004b' increasing from the first size 1015a to a lightning bolt 1004c' at a second size 1015b within the user interface 1000.

Figure 10D:
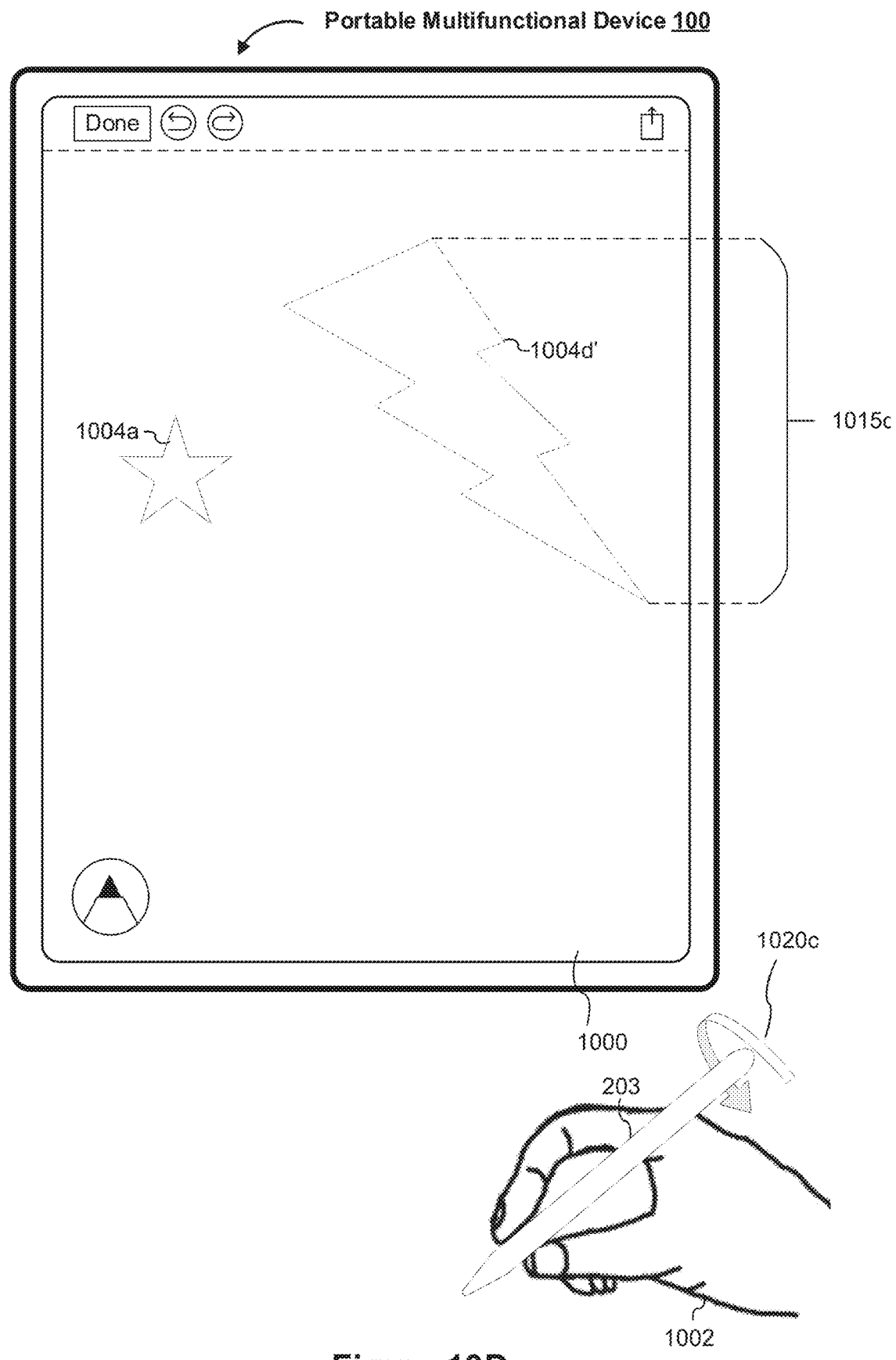

FIGS. 10C-10D show a sequence in which the first operation is again performed on the user interface element (e.g., an increase in size) according to a determination that finger manipulation data from the stylus indicates the first finger manipulation input on the stylus (e.g., a counter-clockwise roll of the stylus). As shown in FIG. 10C, the stylus 203 detects the input 1020b (e.g., a counter-clockwise roll of the stylus 203) while a user is holding the stylus 203 in his/her hand 1002 and rolling the stylus 203 in a counter-clockwise direction. In response to obtaining finger manipulation data indicating the input 1020b in FIG. 10C, the electronic device 100, in FIG. 10D, displays the lightning bolt 1004c' further increasing from the second size 1015b to a lightning bolt 1004d' at a third size 1015c within the user interface 1000.

Figure 10E:
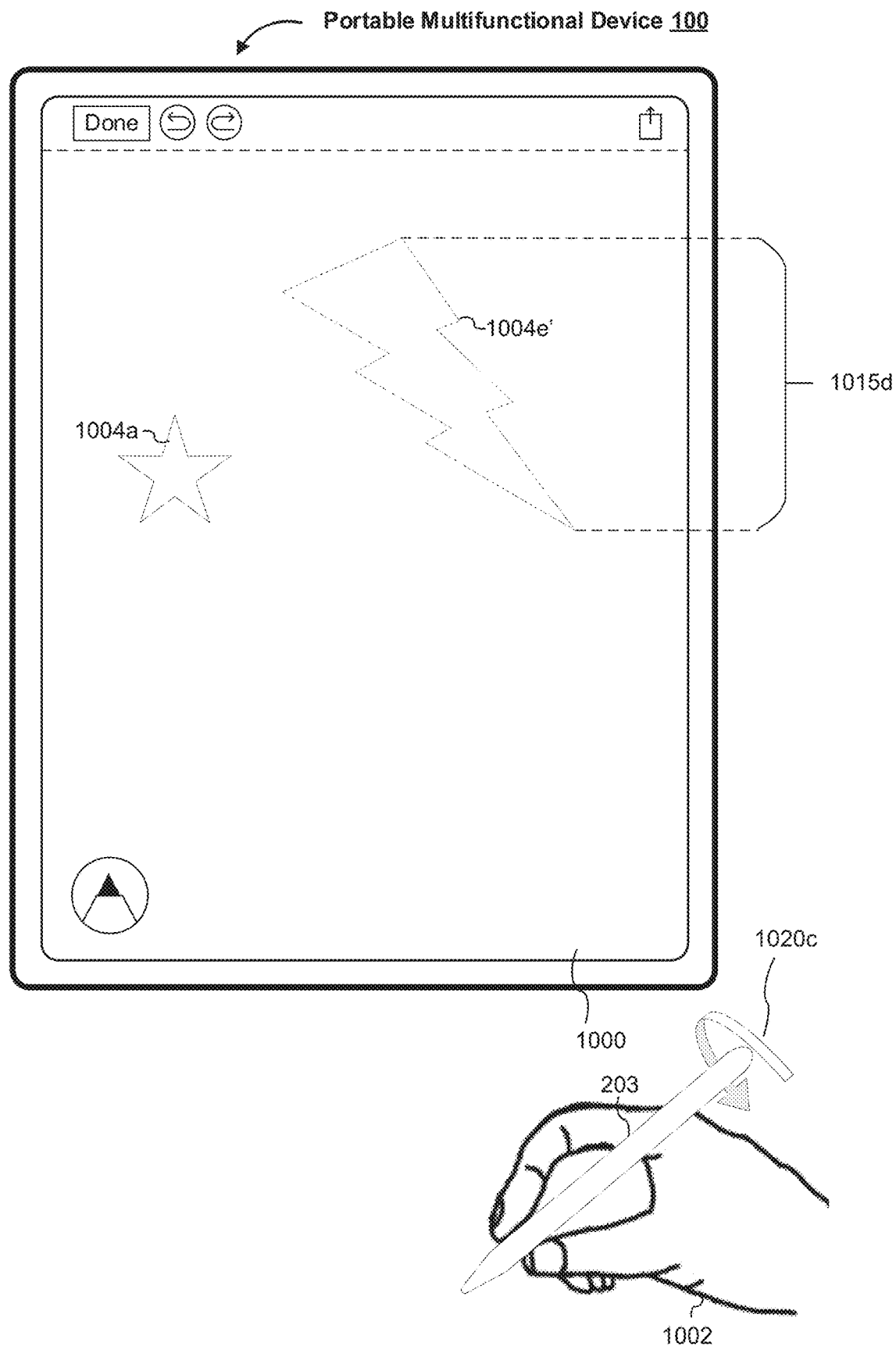

FIGS. 10D-10E show a sequence in which a second operation is performed on the user interface element (e.g., a decrease in size) according to a determination that finger manipulation data from the stylus indicates a second finger manipulation input on the stylus (e.g., a clockwise roll of the stylus). As shown in FIG. 10D, the stylus 203 detects the input 1020c (e.g., a clockwise roll of the stylus 203) while a user is holding the stylus 203 in his/her hand 1002 and rolling the stylus 203 in a clockwise direction. In response to obtaining finger manipulation data indicating the input 1020c in FIG. 10D, the electronic device 100, in FIG. 10E, displays the lightning bolt 1004d' decreasing in size from the third size 1015c to a lightning bolt 1004e' at a fourth size 1015d within the user interface 1000.

Figure 10F:
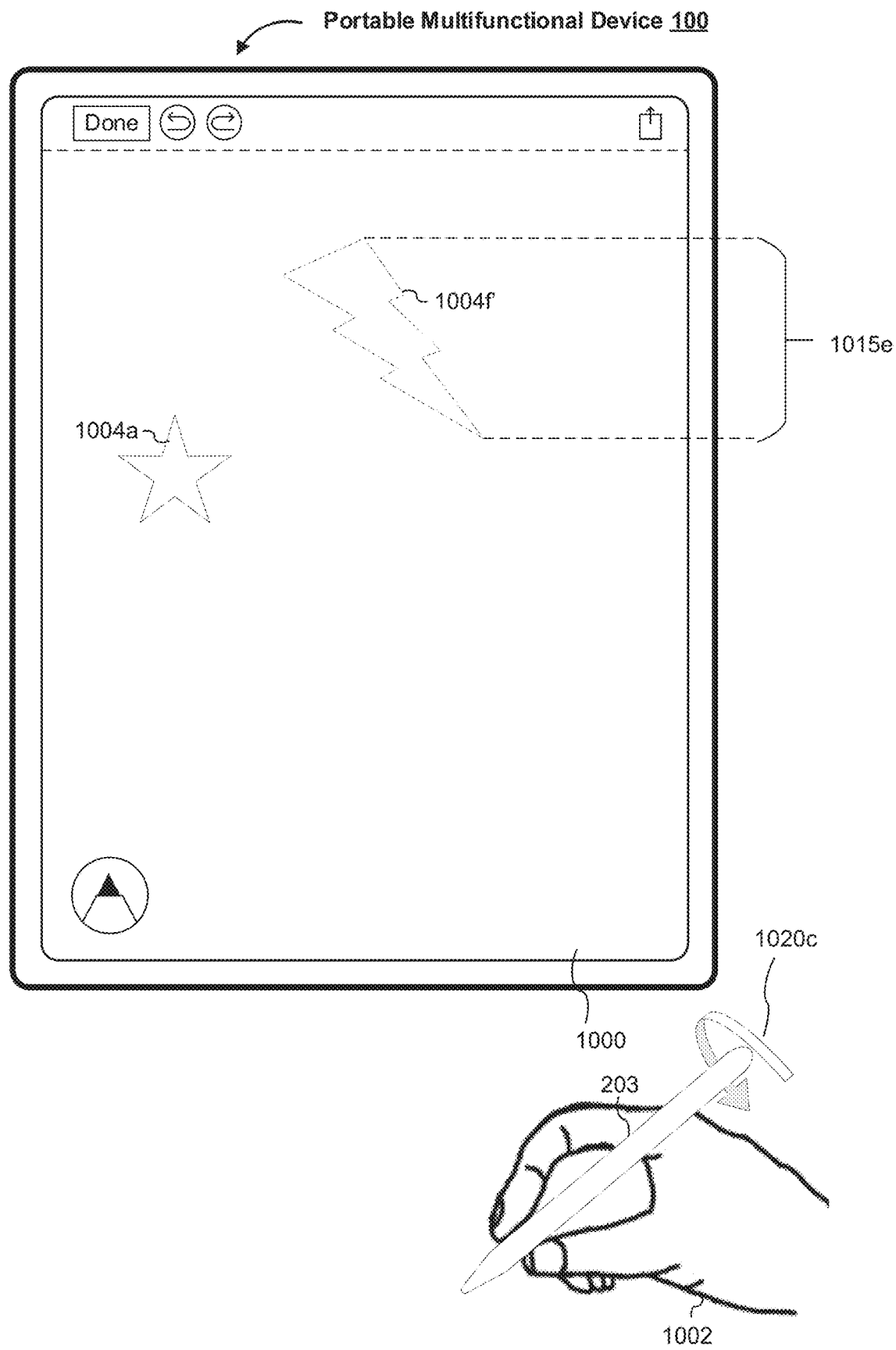

FIGS. 10E-10F show a sequence in which the second operation is again performed on the user interface element (e.g., a decrease in size) according to a determination that finger manipulation data from the stylus the second finger manipulation input on the stylus (e.g., a clockwise roll of the stylus). As shown in FIG. 10E, the stylus 203 detects the input 1020d (e.g., a clockwise roll of the stylus 203) while a user is holding the stylus 203 in his/her hand 1002 and rolling the stylus 203 in a clockwise direction. In response to obtaining finger manipulation data indicating the input 1020d in FIG. 10E, the electronic device 100, in FIG. 10F, displays the lightning bolt 1004e' further decreasing in size from the fourth size 1015d to a lightning bolt 1004e' at a fifth size 1015e within the user interface 1000.

Figure 10G:
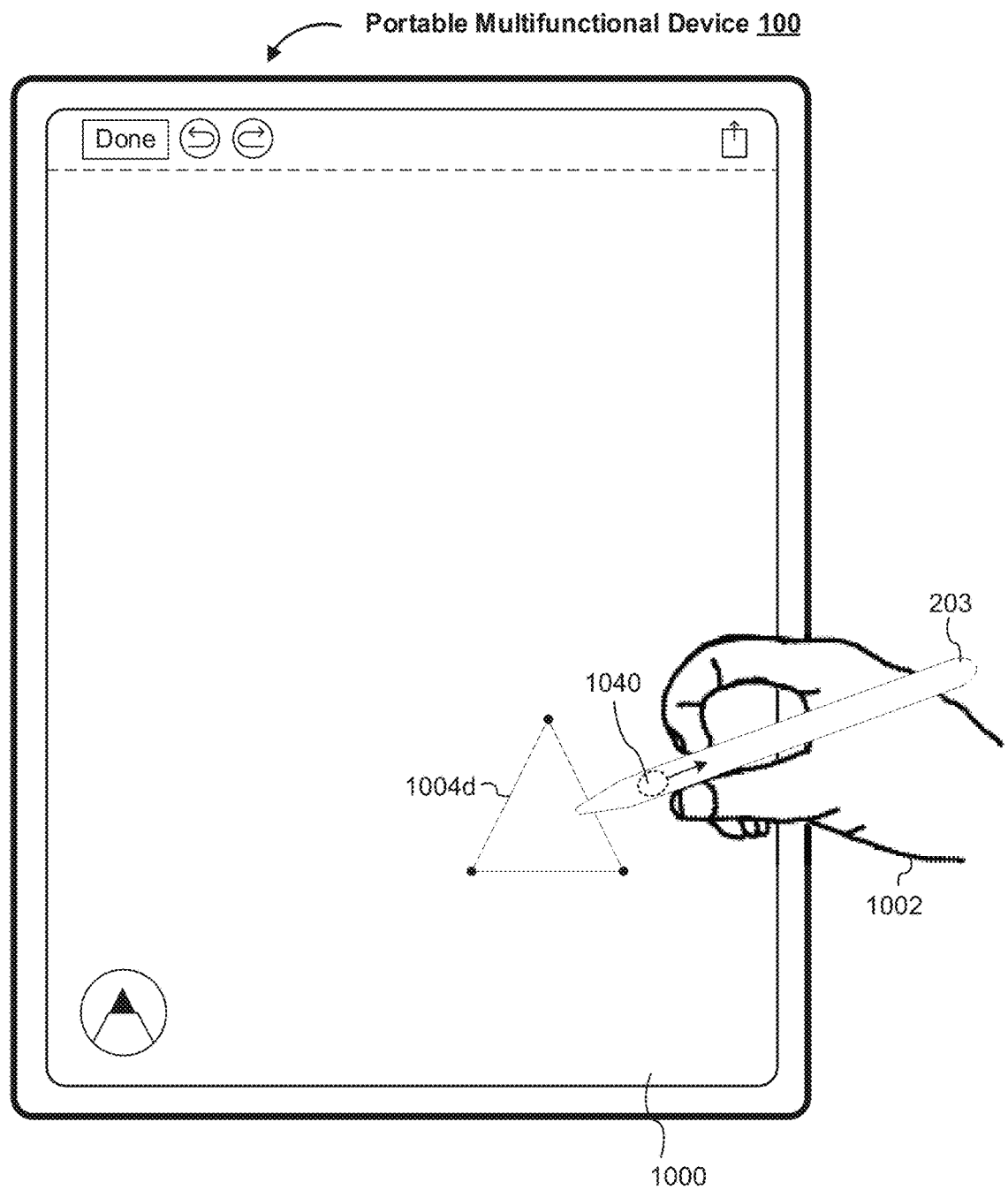
Figure 10H:
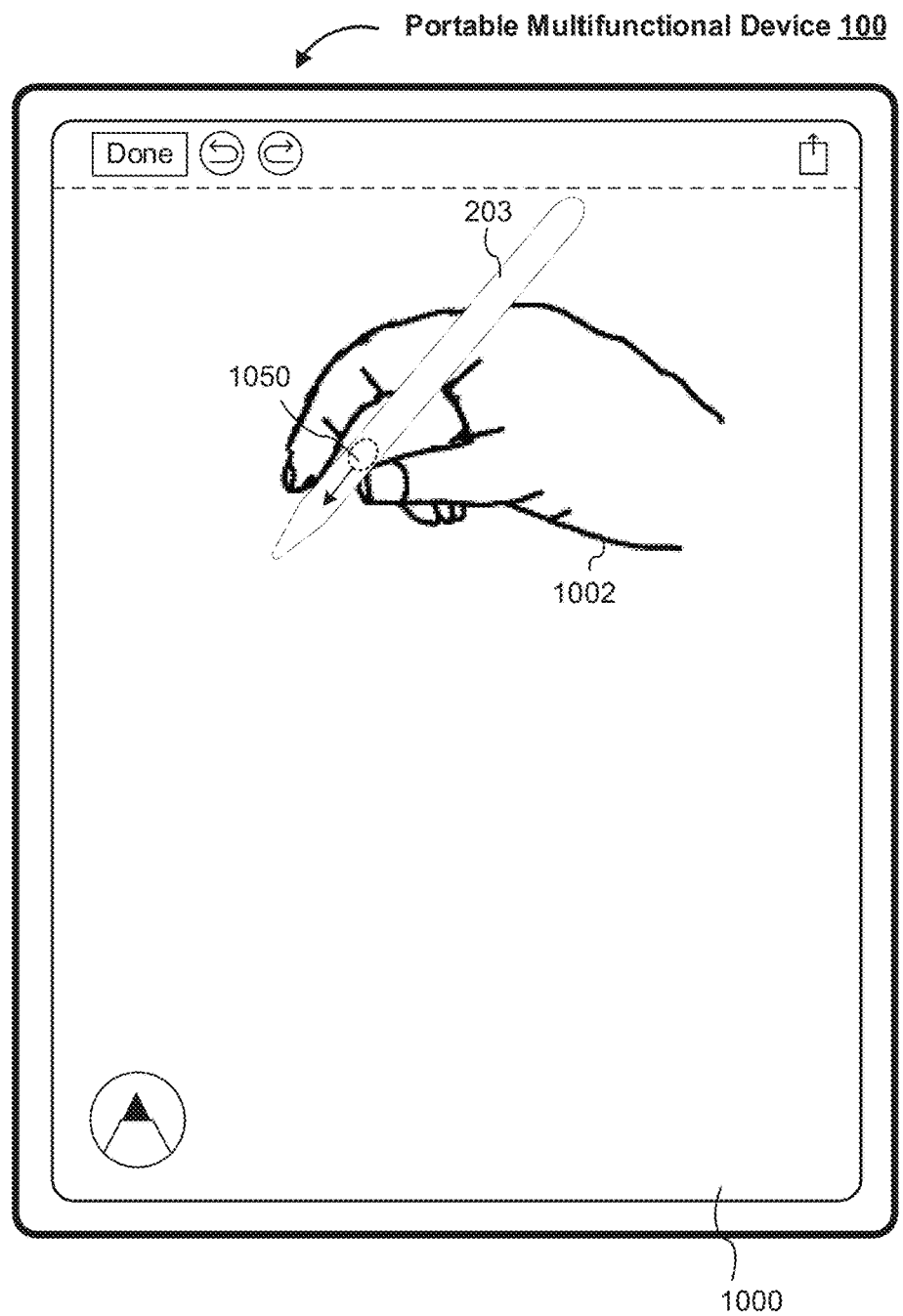

FIGS. 10G-10H show another sequence in which a first operation is performed on the user interface element (e.g., a cut operation) according to a determination that finger manipulation data from the stylus indicates a third finger manipulation input on the stylus (e.g., an upward swipe on the stylus). As shown in FIG. 10G, the electronic device 100 displays a user interface 1000 associated with a drawing or notes application that includes preexisting content: a triangle 1004d. As shown in FIG. 10G, the stylus 203 detects an input 1040 (e.g., the upward swipe on the stylus 203) at a location of the stylus 203 relative to the electronic device 100 while a user is holding the stylus 203 in his/her hand 1002, indicative of the user selecting to cut the triangle 1004d from the user interface 1000.

In response to obtaining finger manipulation data indicating the input 1040 in FIG. 10G, the electronic device 100, in FIG. 10H, performs a first operation (e.g., a cut operation) on the triangle 1004d within the user interface 1000. In some embodiments, the first operation corresponds to a copy operation. As shown in FIG. 10H, the electronic device 100 no longer displays the triangle 1004d on the user interface 1000 in response to detecting the upward swipe on the stylus 203 corresponding to the user cutting (or, in some embodiments, copying) the triangle 1004d.

Figure 10I:
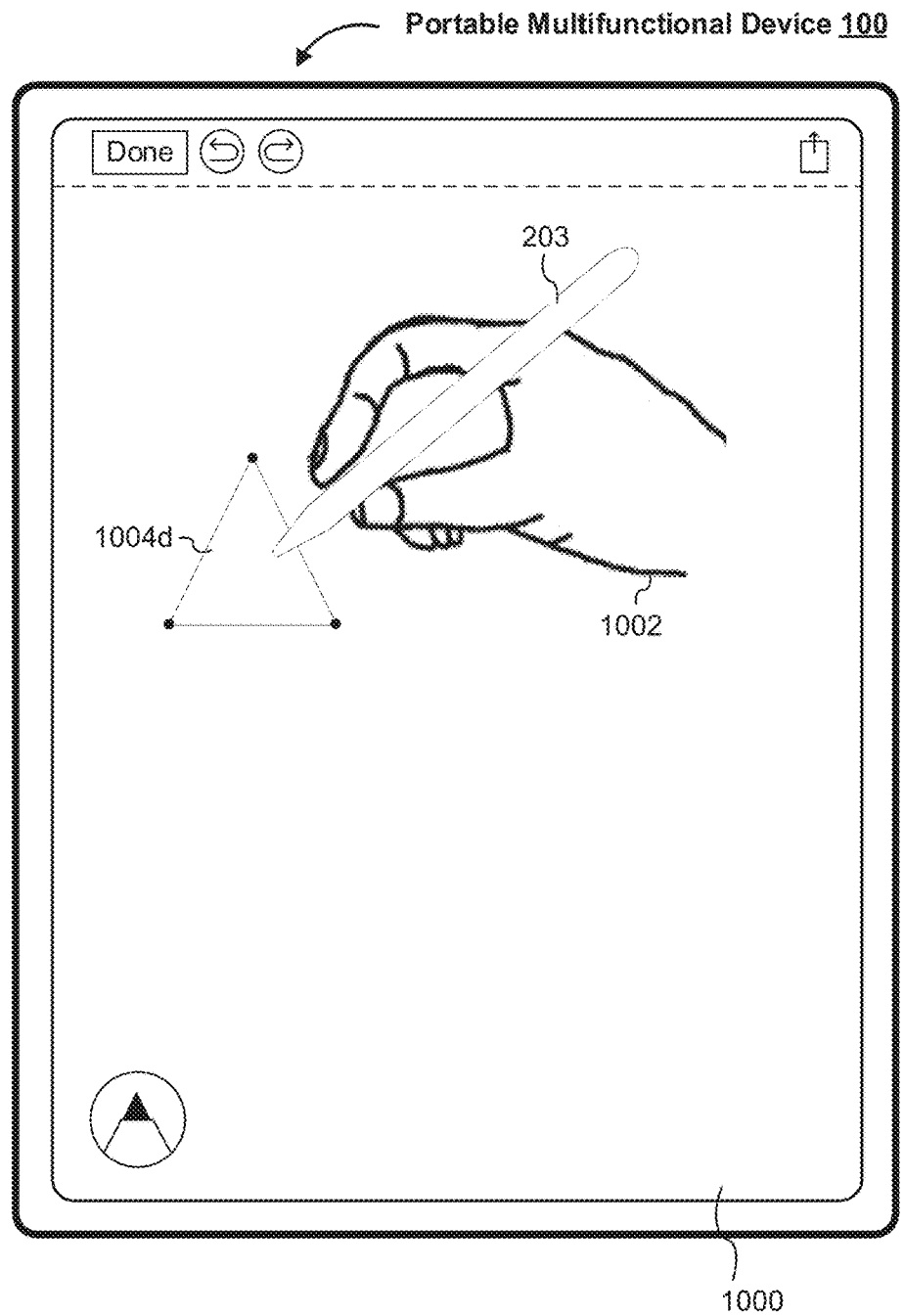

FIGS. 10H-10I show a sequence in which a second operation is performed on the user interface element (e.g., a paste operation) according to a determination that finger manipulation data from the stylus indicates a fourth finger manipulation input on the stylus (e.g., a downward swipe gesture on the stylus). As shown in FIG. 10H, the stylus 203 detects an input 1050 (e.g., the downward swipe on the stylus 203) at a location of the stylus 203 relative to the electronic device 100 while a user is holding the stylus 203 in his/her hand 1002.

In response to obtaining finger manipulation data indicating the input 1050 in FIG. 10H, the electronic device 100, in FIG. 10I, performs a second operation (e.g., a paste operation) on the triangle 1004d within the user interface 1000. As shown in FIG. 10I, the electronic device displays the triangle 1004d on the user interface 1000 at a location of the stylus 203 relative to the electronic device 100 in response to detecting the downward swipe on the stylus 203 corresponding to the user pasting the triangle 1004d to the user interface 1000.

FIGS. 11A-11O illustrate example user interfaces for performing finger manipulations to a stylus 203 in order to navigate within a menu in accordance with some embodiments. The user interfaces in these figures are used to illustrate the processes described below, including the processes in FIGS. 18A-18B. Although some of the examples which follow will be given with reference to inputs on a touch-screen display (where the touch-sensitive surface and the display are combined, for example on touch screen 112), in some embodiments, the electronic device 100 detects inputs on touch-sensitive surface 651 that is separate from display 650, as shown in FIG. 6B. In various embodiments, the electronic device 100 navigates within the menu based on data received from a stylus 203.

In various embodiments, the touch-sensitive surface (e.g., the touch-sensitive surface 275 in FIG. 2 and FIGS. 5A-5B) of the stylus 203 detects touch inputs and gesture inputs, or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, a flick, a swipe, a tap, a double tap, and/or the like.

In various embodiments, the orientation and/or movement sensors (e.g., accelerometer, magnetometer, gyroscope) of the stylus 203 detect orientation/movement inputs or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, barrel rotation and/or direction thereof, twirl and/or direction thereof, orientation (e.g., position) of the tip 276 and/or the end 277 of the stylus 203 relative to a reference plane, and/or the like.

Figure 11B:
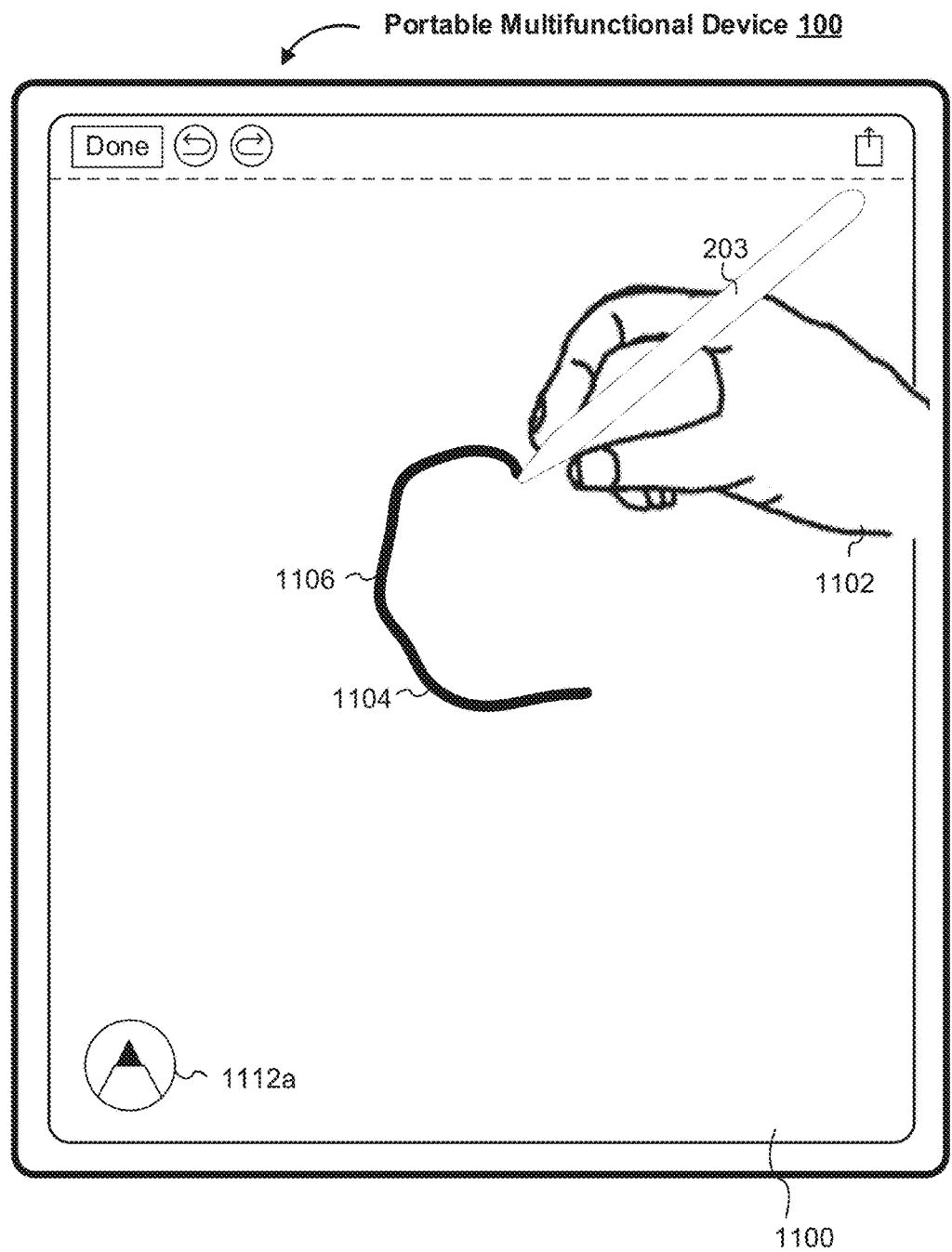

FIGS. 11A-11B illustrate a first sequence where a first change is made to displayed content. As shown in FIG. 11A, the electronic device 100 displays a user interface 1100 associated with a drawing or notes application. In FIG. 11A, the electronic device 100 detects an input 1110 (e.g., a drawing stroke or mark) from the stylus 203 while a user is holding the stylus 203 in his/her hand 1102. In response to the electronic device 100 detecting the input 1110, in FIG. 11B, the electronic device 100 displays a first change 1106 to the user interface 1100 (e.g., a stroke or mark) to display a user interface element 1104 based on the input 1110 in FIG. 11A.

Figure 11C:
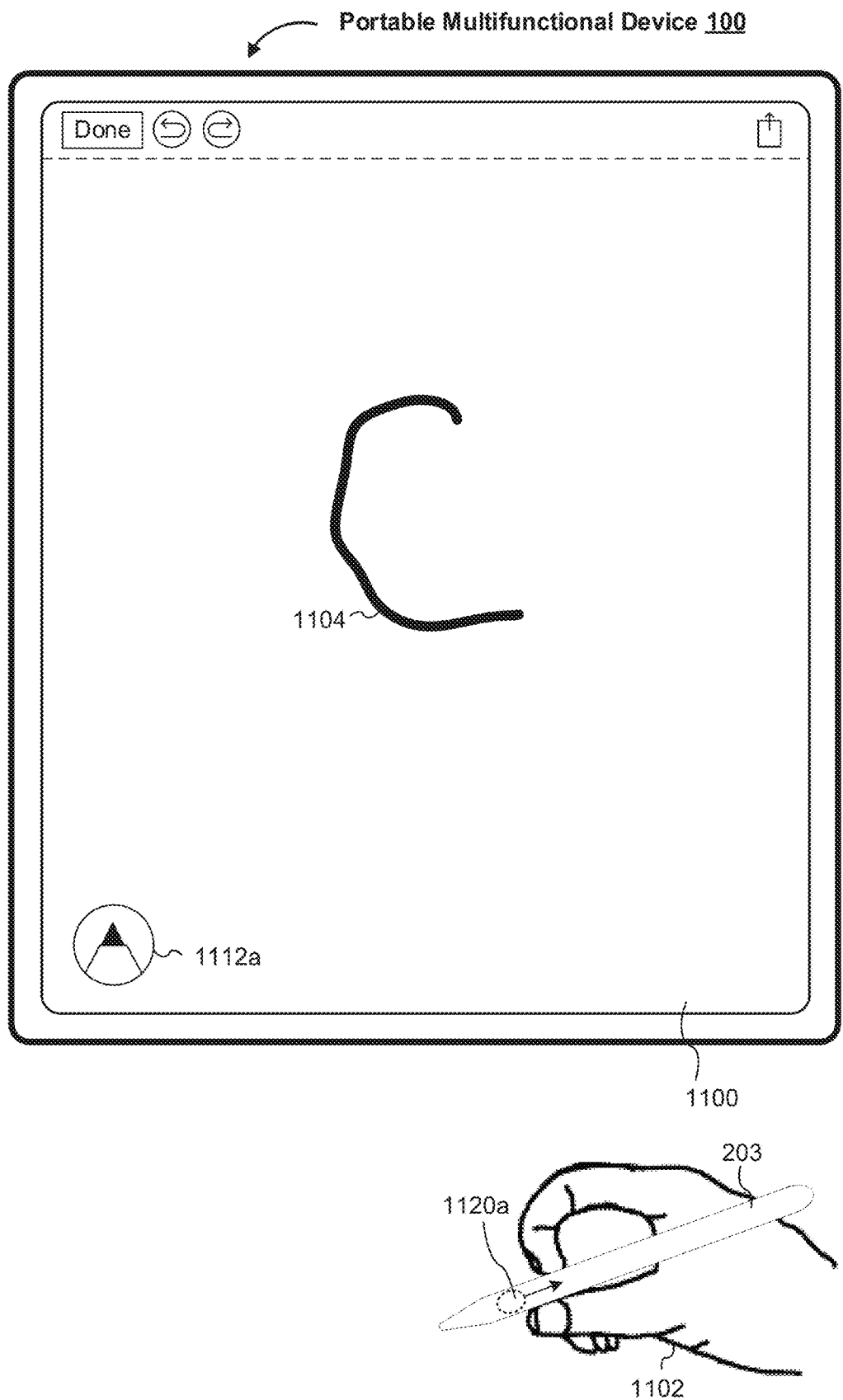
Figure 11D:
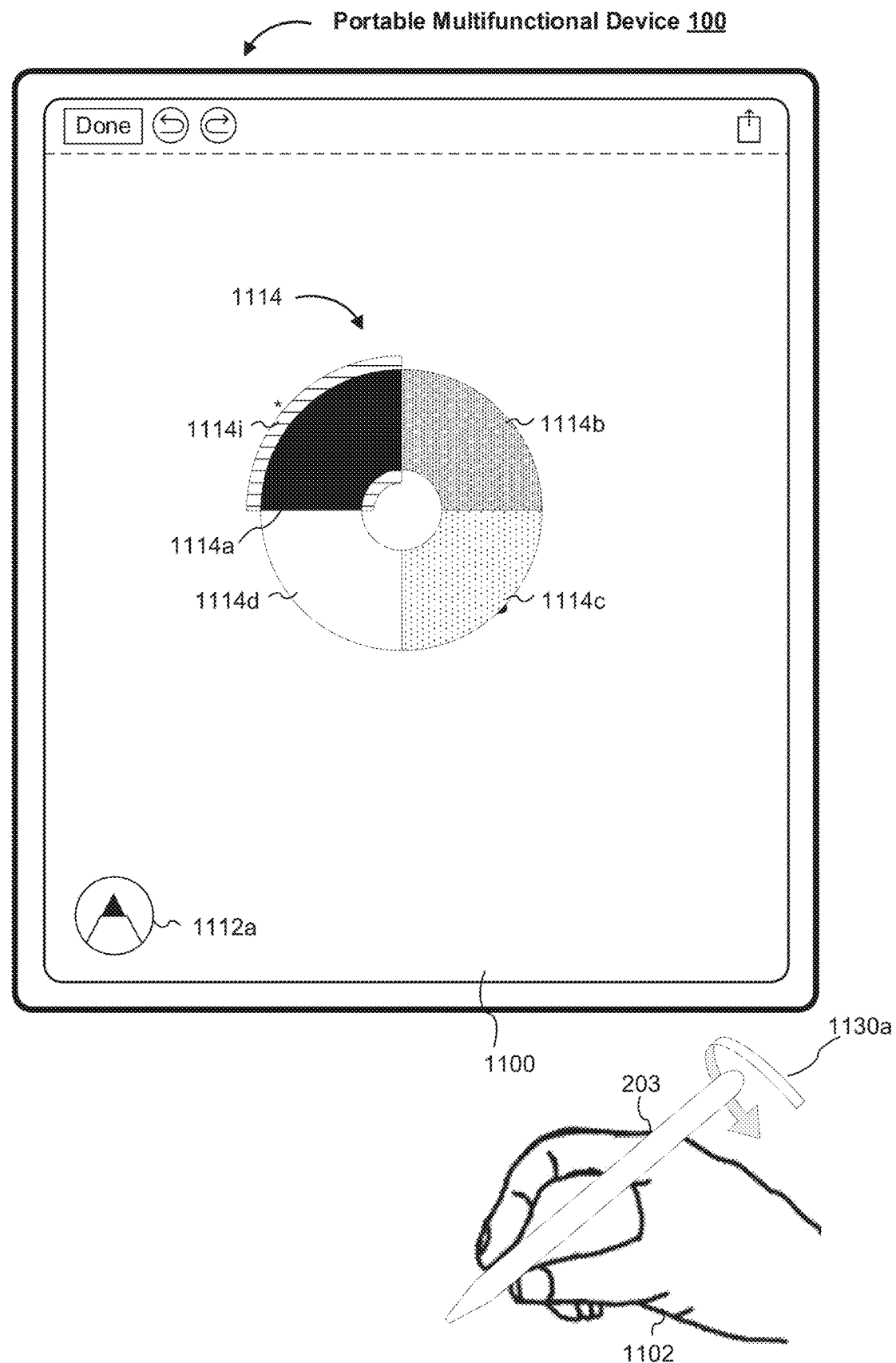

FIGS. 11C-11D show another sequence in which a first operation is performed on the user interface element (e.g., an operation to open a menu) according to a determination that finger manipulation data from the stylus indicates a first finger manipulation input on the stylus (e.g., an upward swipe on the stylus). As shown in FIG. 11C, the stylus 203 detects an input 1120a (e.g., the upward swipe on the stylus 203) at a location of the stylus 203 relative to the electronic device 100 while a user is holding the stylus 203 in his/her hand 1102.

In response to obtaining finger manipulation data indicating the input 1120a in FIG. 11C, the electronic device 100, in FIG. 11D, displays a menu 1114 on the user interface 1100. The menu 1114 includes four visual indicators, a solid indicator 1114a, a striped indicator 1114b, a dotted indicator 1114c, and a blank indicator 1114d, with the solid indicator 1114a having focus (as illustrated by a focus indicator 1114i) by default. As illustrated in FIG. 11D, the menu 1114 is a radial menu with the four visual indicators arranged in a circle. Additionally, the focus indicator 1114i corresponds to a star or other icon nearby the selectable item that has focus, a ring around the selectable item that has focus, enlarging the selectable item in focus, changing the color or appearance of the selectable item that has focus, and/or the like. One of ordinary skill in the art will appreciate that the menu 1114 may include any number of visual indicator types having a variety of characteristics, with any of the visual indicators having focus by default.

Figure 11E:
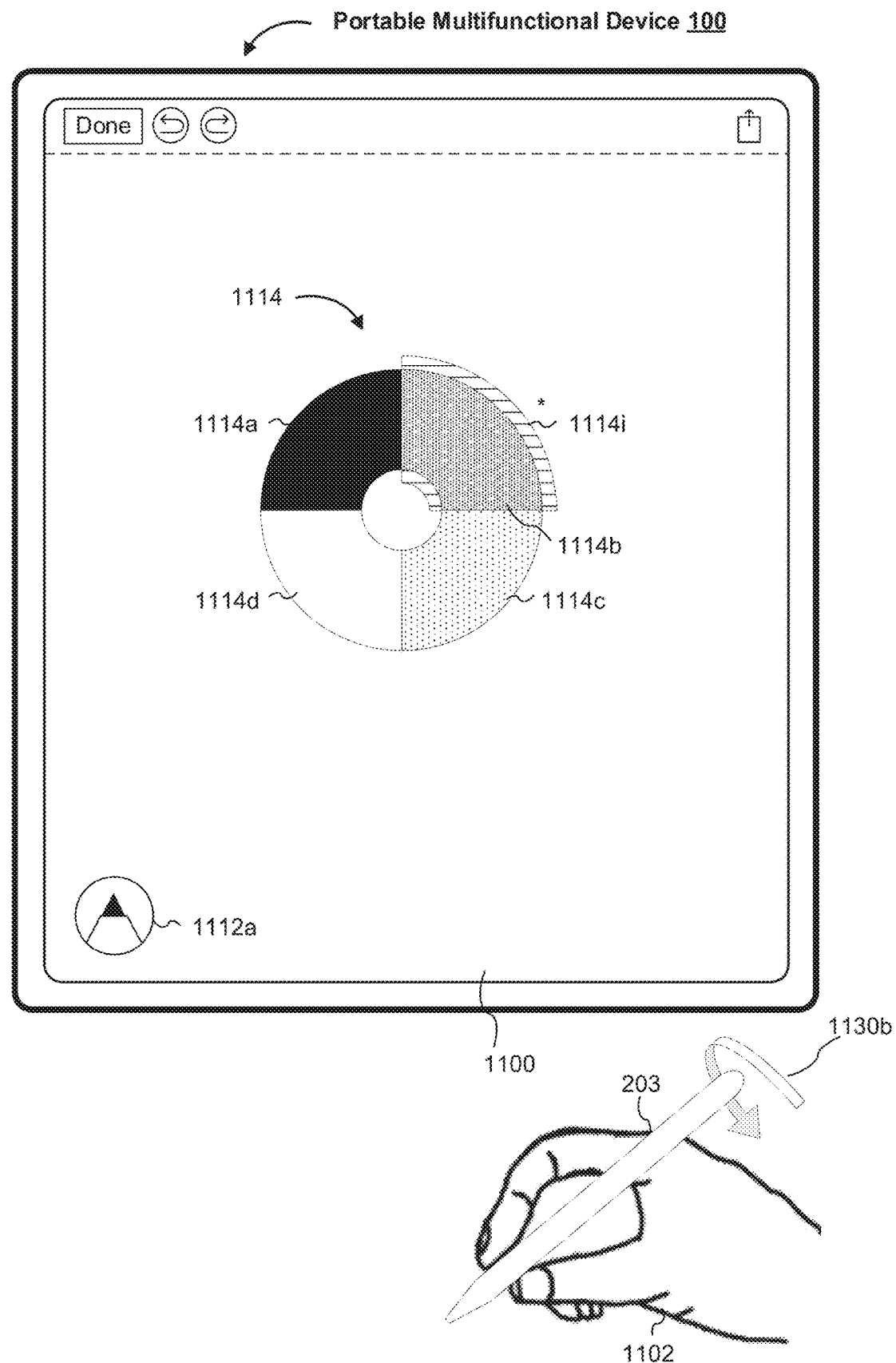

FIGS. 11D-11E show another sequence in which a second operation is performed according to a determination that finger manipulation data from the stylus indicates a second finger manipulation input on the stylus (e.g., a clockwise roll of the stylus). In some embodiments, the electronic device 100 may change which indicator has focus in response to the stylus 203 being manipulated by the hand 1102 of the user. For example, in response to obtaining the finger manipulation data from the stylus 203 indicating a clockwise rotation 1130a of the stylus 203, the electronic device 100 moves (e.g., changes display) clockwise through the menu 1114 such that focus changes from the solid indicator 1114a to the striped indicator 1114b.

Figure 11F:
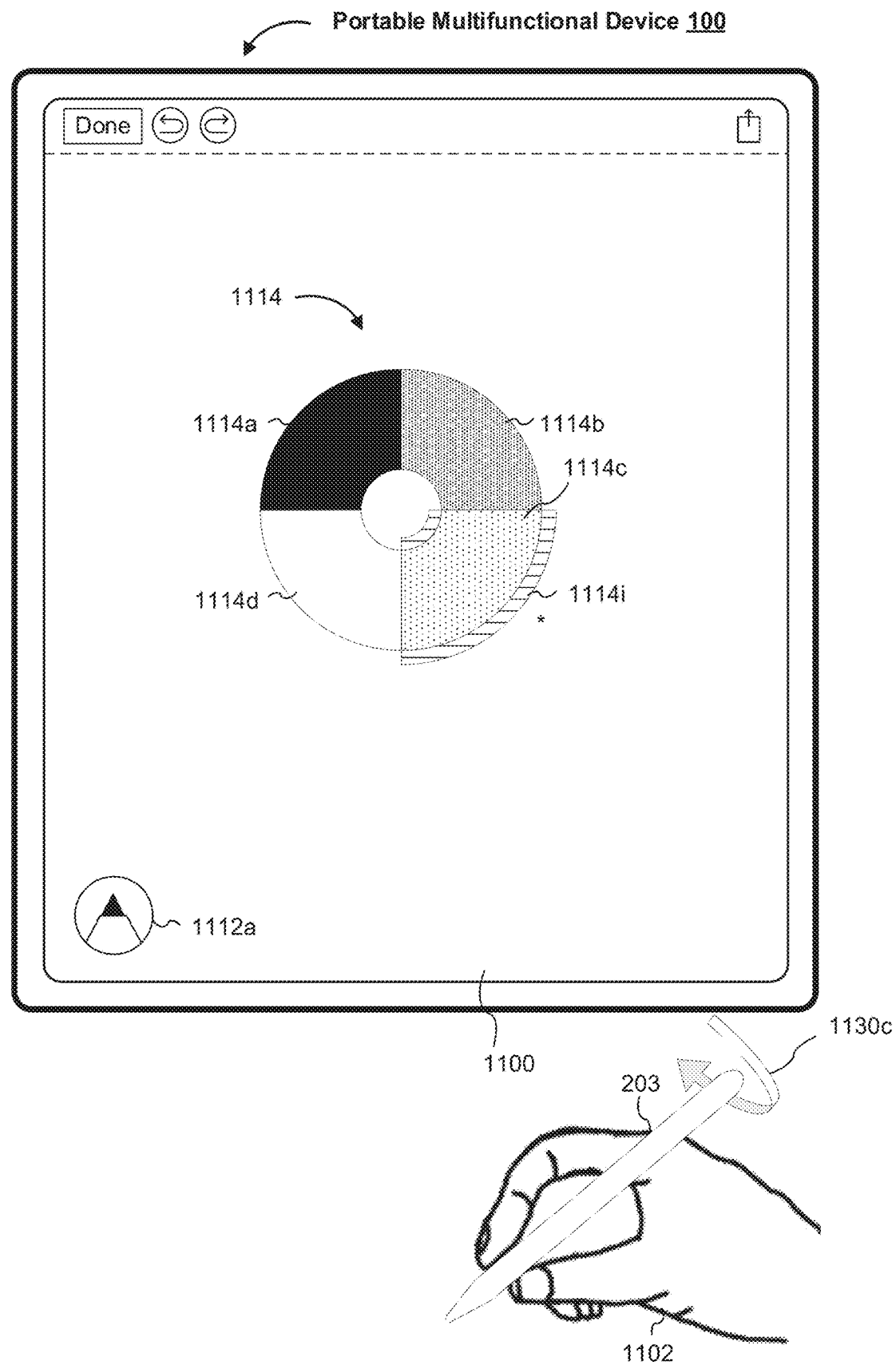

FIGS. 11E-11F show a sequence in which the second operation is again performed according to a determination that finger manipulation data from the stylus indicates a second finger manipulation input on the stylus (e.g., a clockwise roll of the stylus). For example, in response to obtaining the finger manipulation data from the stylus 203 indicating a clockwise rotation 1130b of the stylus 203, the electronic device 100 further moves (e.g., changes display) clockwise through the menu 1114 such that focus changes from the striped indicator 1114b to the dotted indicator 1114c.

Figure 11G:
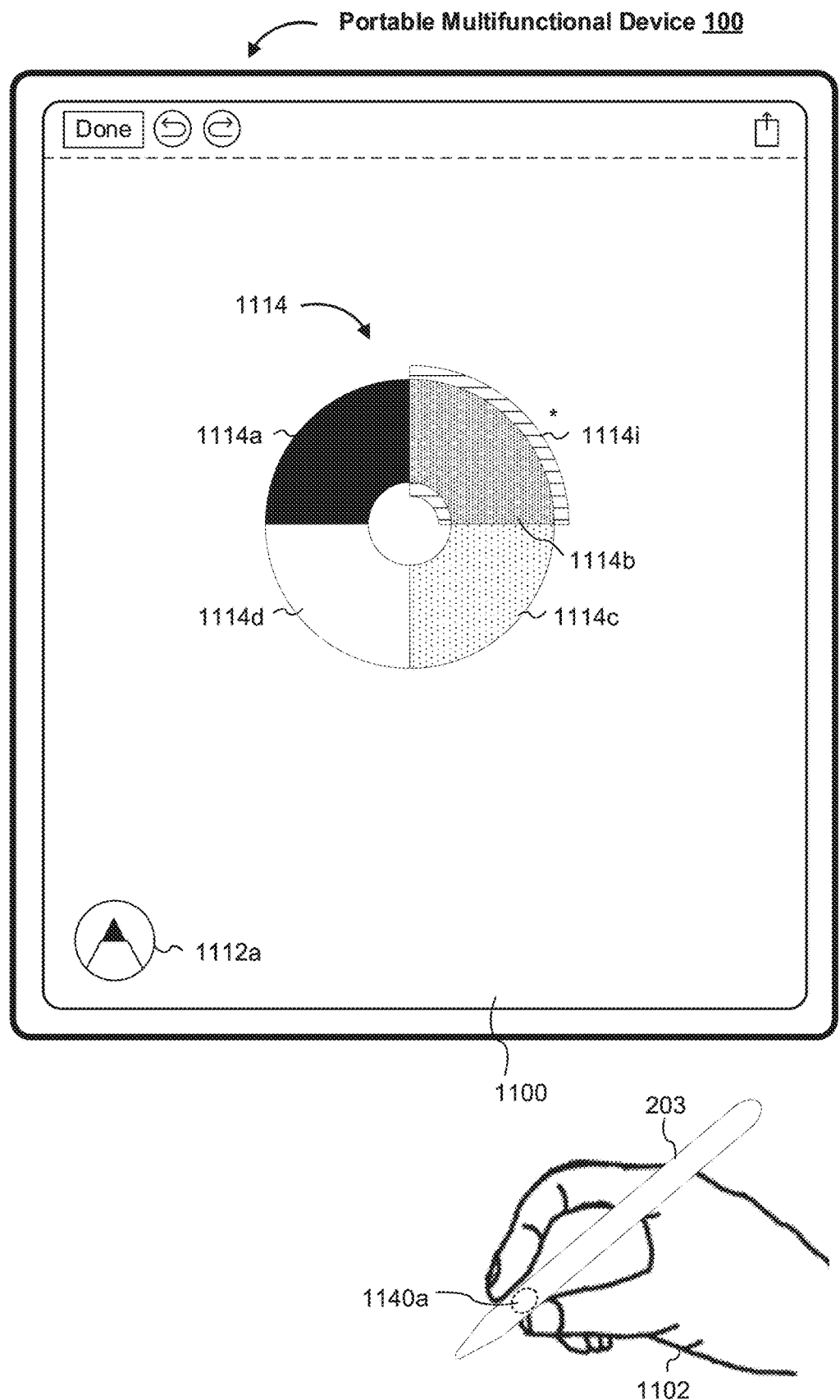

FIGS. 11F-11G show another sequence in which a third operation is performed according to a determination that finger manipulation data from the stylus indicates a third finger manipulation input on the stylus (e.g., a counter-clockwise roll of the stylus). For example, in response to obtaining the finger manipulation data from the stylus 203 indicating a counter-clockwise rotation 1130c of the stylus 203, the electronic device 100 moves (e.g., changes display) counter-clockwise through the menu 1114 such that focus changes from the dotted indicator 1114c back to the striped indicator 1114b.

Figure 11H:
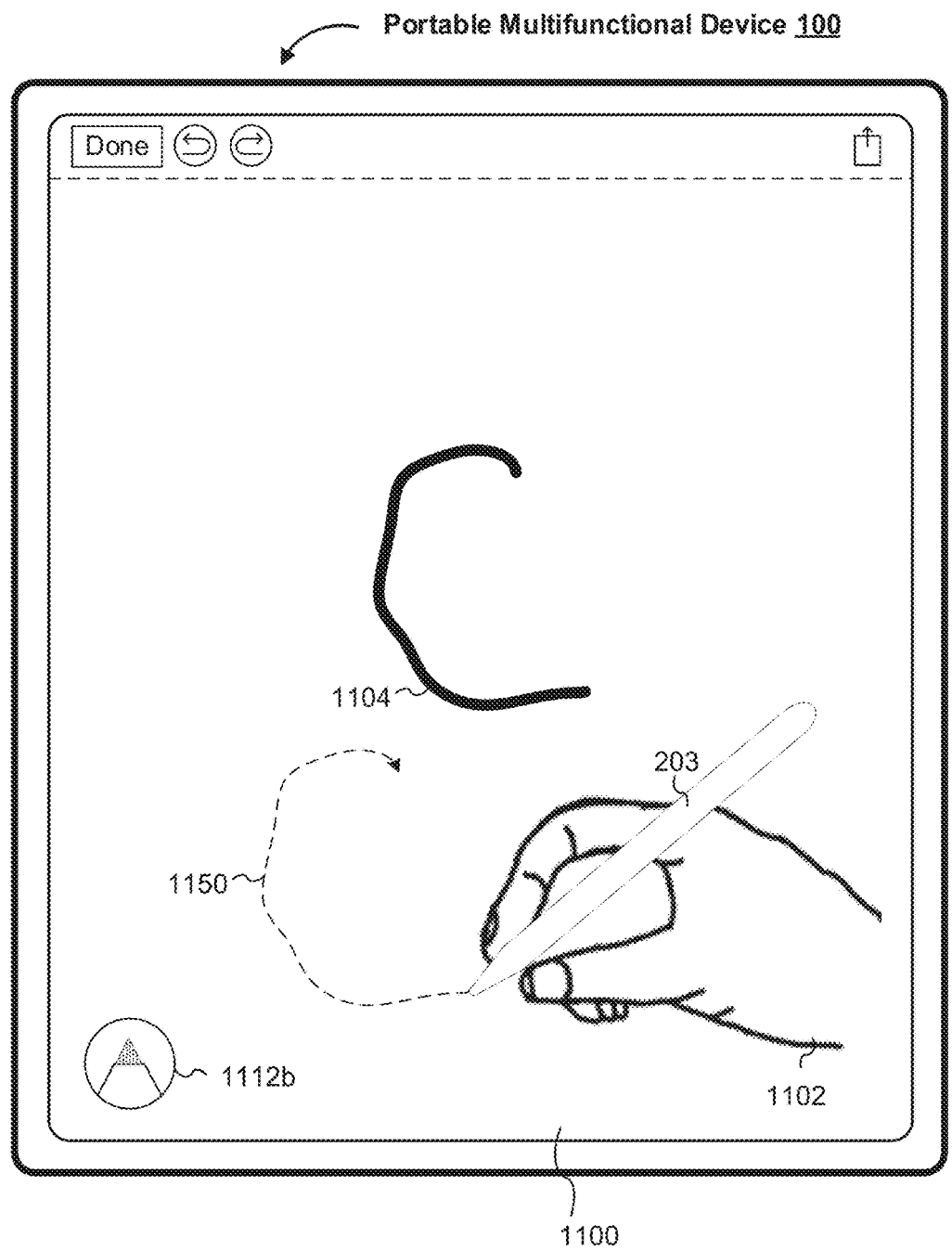

FIGS. 11G-11H show another sequence in which an operation (e.g., a select operation) is performed on the user interface element according to a determination that finger manipulation data from the stylus indicates a manipulation input on the stylus (e.g., a tap on the stylus). As shown in FIG. 11G, the stylus 203 detects an input 1140a (e.g., the tap on the stylus 203) at a location of the stylus 203 relative to the electronic device 100 while a user is holding the stylus 203 in his/her hand 1102. In response to obtaining finger manipulation data indicating the input 1140a in FIG. 11G, the electronic device 100, in FIG. 11H, removes from display the menu 1114 on the user interface 1110. Additionally, an indicator 1112a, in FIG. 11G, associated with a first markup tool (e.g., a felt-tip marker) in a solid line changes to an indicator 1112b, in FIG. 11H, associated with the first markup tool in a striped line.

Figure 11I:
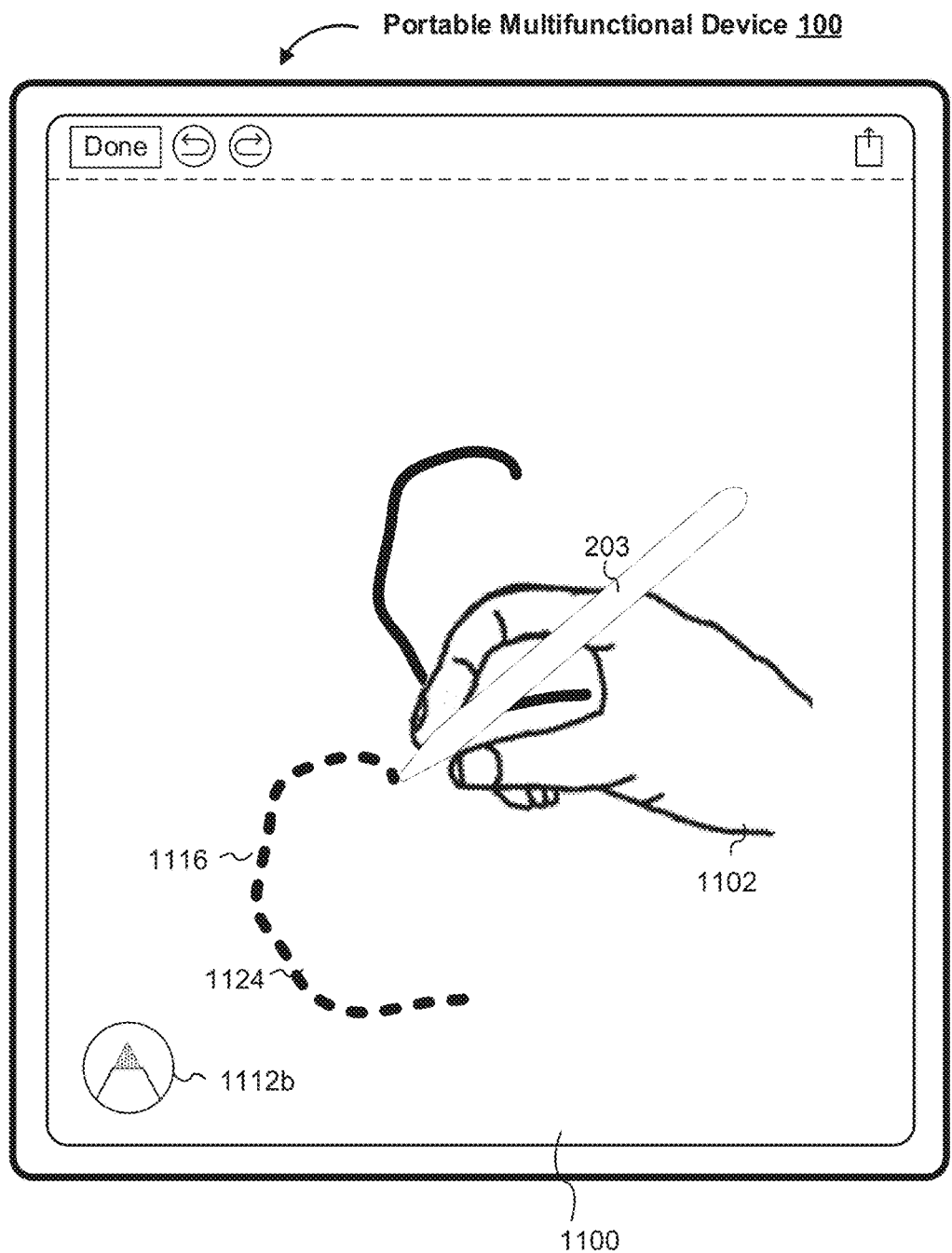

FIGS. 11H-11I illustrate another sequence where a second change is made to displayed content. In FIG. 11H, the electronic device 100 detects an input 1150 (e.g., a drawing stroke or mark) from the stylus 203 while a user is holding the stylus 203 in his/her hand 1102. In response to the electronic device 100 detecting the input 1150, in FIG. 11I, the electronic device 100 displays a second change 1116 to the user interface 1100 (e.g., a stroke or mark) to display a user interface element 1124 based on the input 1150 in FIG. 11H. As shown in FIG. 11I, the user interface element 1124 is a striped line corresponding to tool 1112b.

Figure 11J:
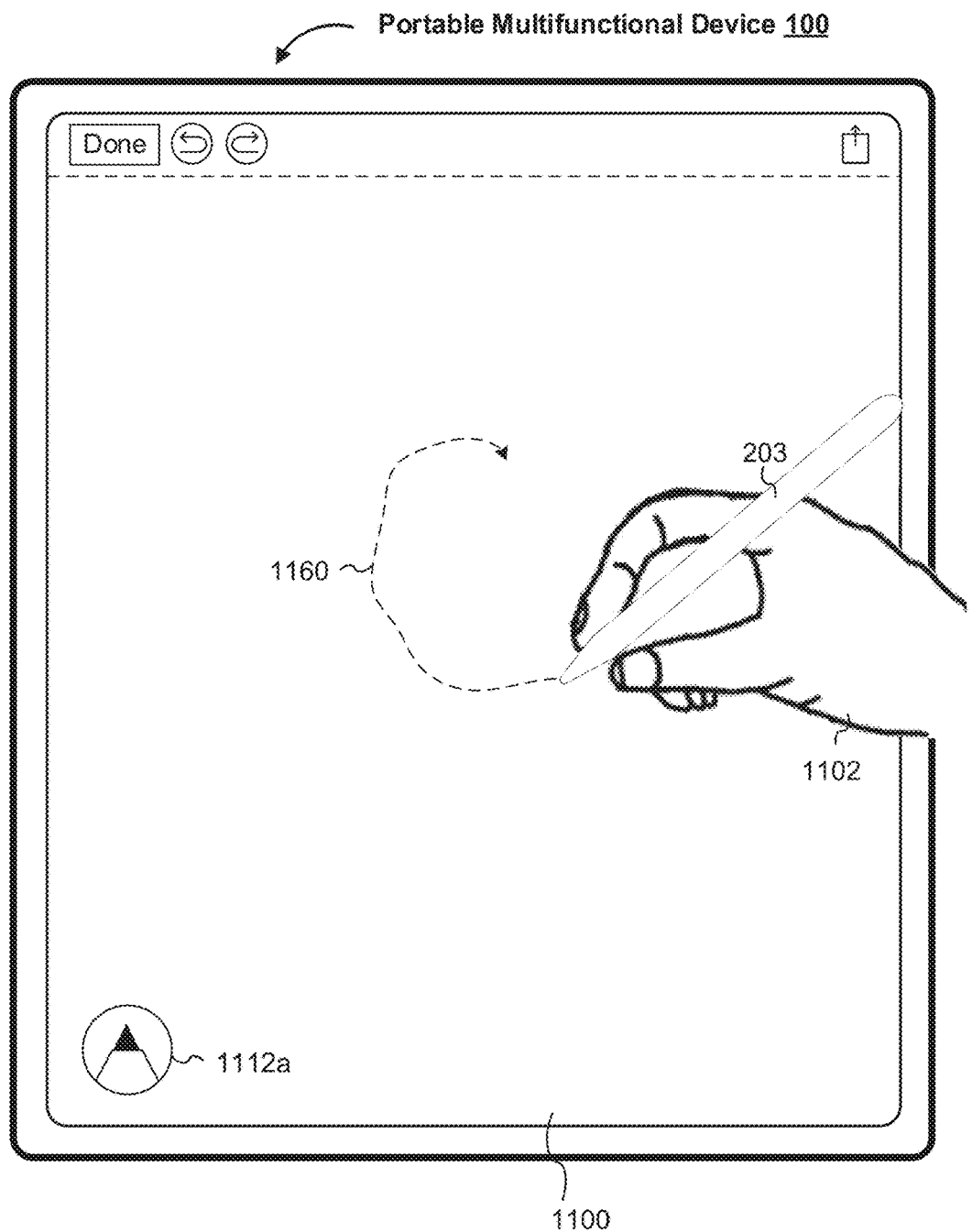
Figure 11K:
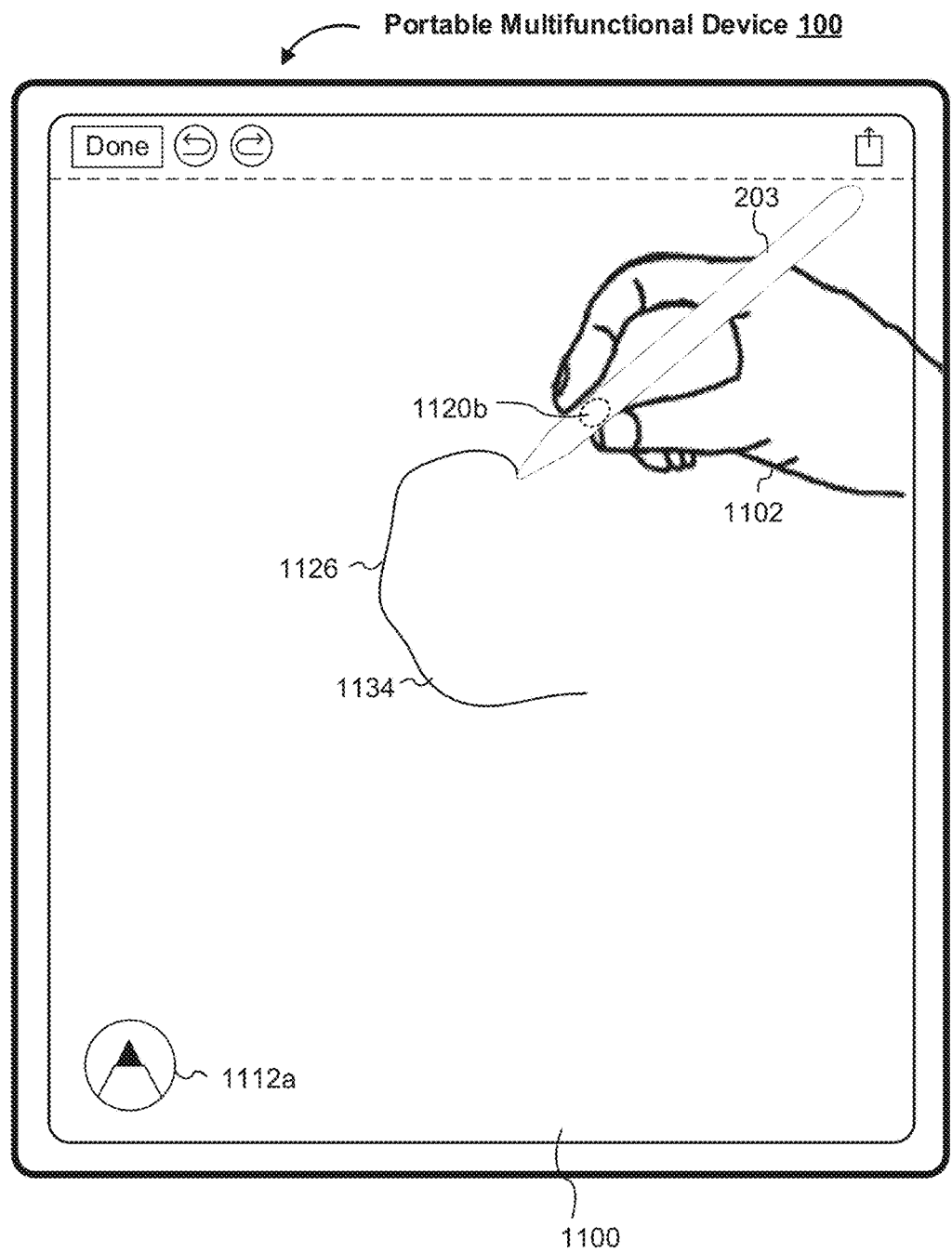

FIGS. 11J-11K illustrate another sequence where a third change is made to displayed content. In FIG. 11J, the electronic device 100 detects an input 1160 (e.g., a drawing stroke or mark) from the stylus 203 while a user is holding the stylus 203 in his/her hand 1102. In response to the electronic device 100 detecting the input 1160, in FIG. 11K, the electronic device 100 displays a third change 1126 to the user interface 1100 (e.g., a stroke or mark) to display a user interface element 1134 based on the input 1160 in FIG. 11J.

As shown in FIG. 11J, the user interface element 1134 is a solid line corresponding to tool 1112a.

Figure 11L:
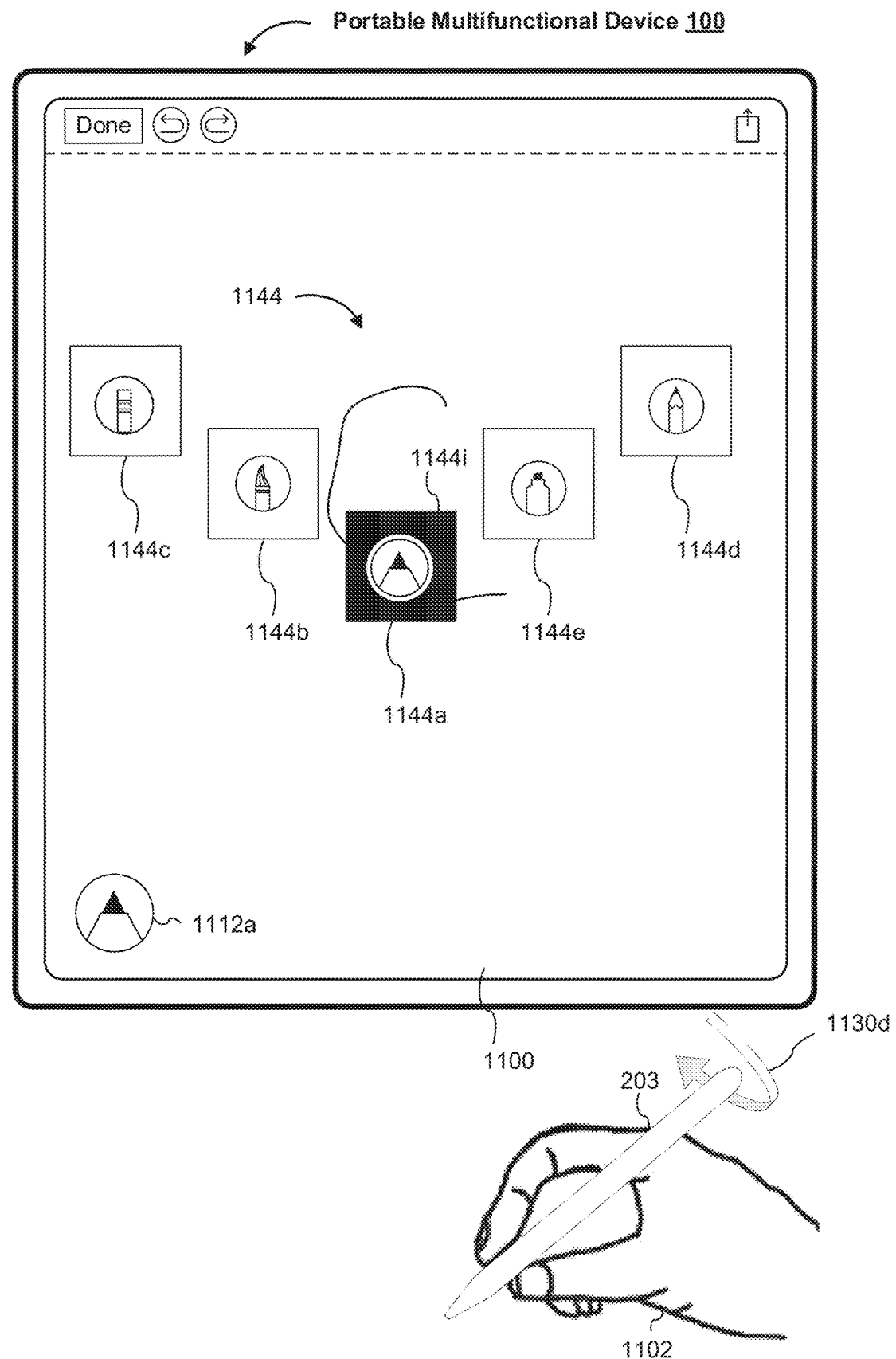

FIGS. 11K-11L illustrate another sequence in which an operation (e.g., a operation to open a menu) is performed on the user interface element according to a determination that finger manipulation data from the stylus indicates a finger manipulation input on the stylus (e.g., a tap on the stylus). As shown in FIG. 11K, the stylus 203 detects an input 1120b (e.g., the tap on the stylus 203) at a location of the stylus 203 relative to the electronic device 100 while a user is holding the stylus 203 in his/her hand 1102.

In response to obtaining finger manipulation data indicating the input 1120b in FIG. 11K, the electronic device 100, in FIG. 11L, displays a menu 1144 on the user interface 1110. The menu 1144 includes five tool indicators, a felt-tip marker tool indicator 1144a, a brush tool indicator 1144b, an eraser tool indicator 1144c, a pencil tool indicator 1144d, and a chiseled marker tool indicator 1144e, with the felt-tip marker tool indicator 1144a having focus (as illustrated by a focus indicator 1144i) by default. One of ordinary skill in the art will appreciate that the menu 1144 may include any number of tool indicator types having a variety of characteristics, with any of the tool indicators having focus by default.

Figure 11M:
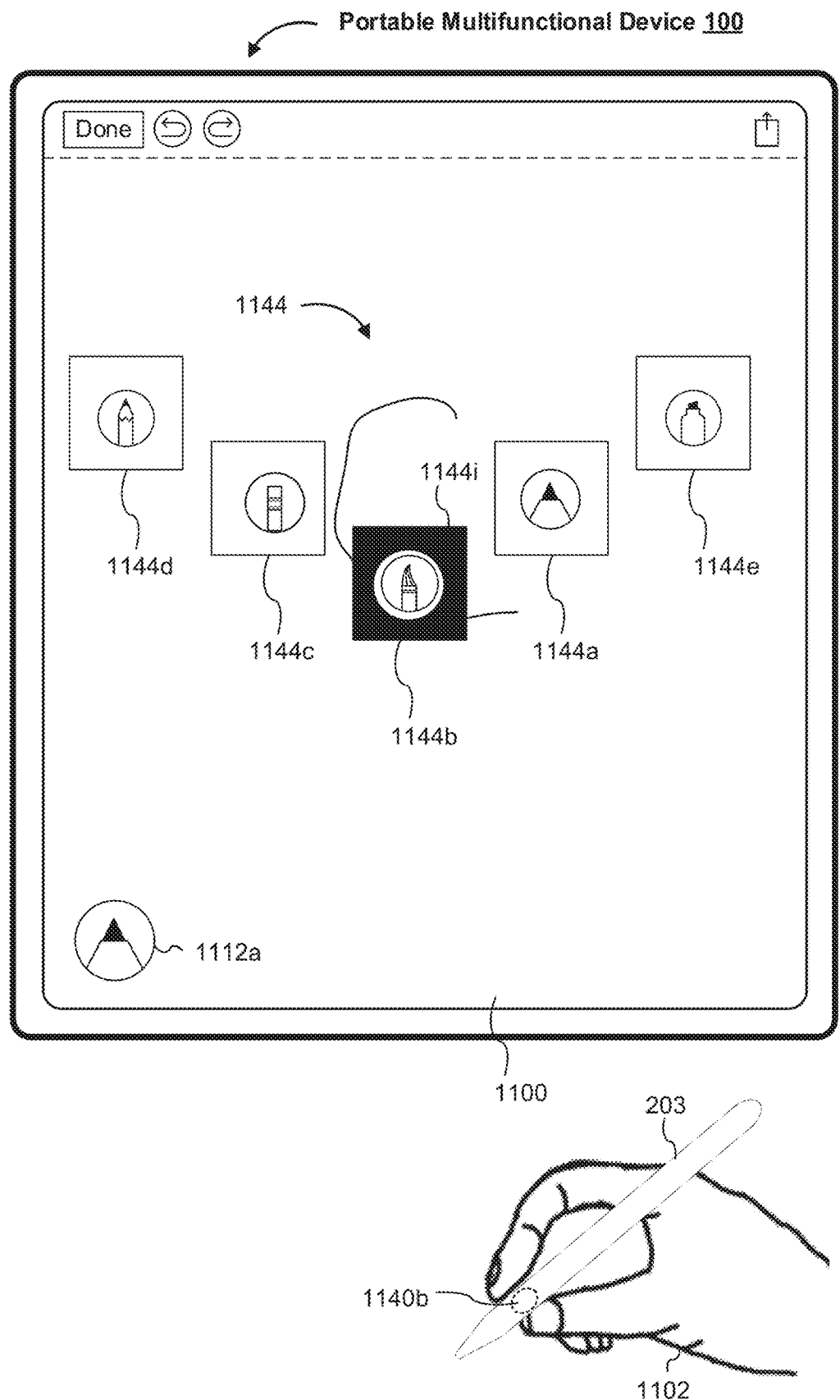

FIGS. 11L-11M show another sequence in which an operation is performed according to a determination that finger manipulation data from the stylus indicates a finger manipulation input on the stylus (e.g., a counter-clockwise roll of the stylus). For example, in response to obtaining the finger manipulation data from the stylus 203 indicating a counter-clockwise rotation 1130d of the stylus 203, the electronic device 100 moves (e.g., changes display) counter-clockwise through the menu 1144 such that focus changes from the felt-tip marker tool indicator 1144a to the brush tool indicator 1144b.

Figure 11N:
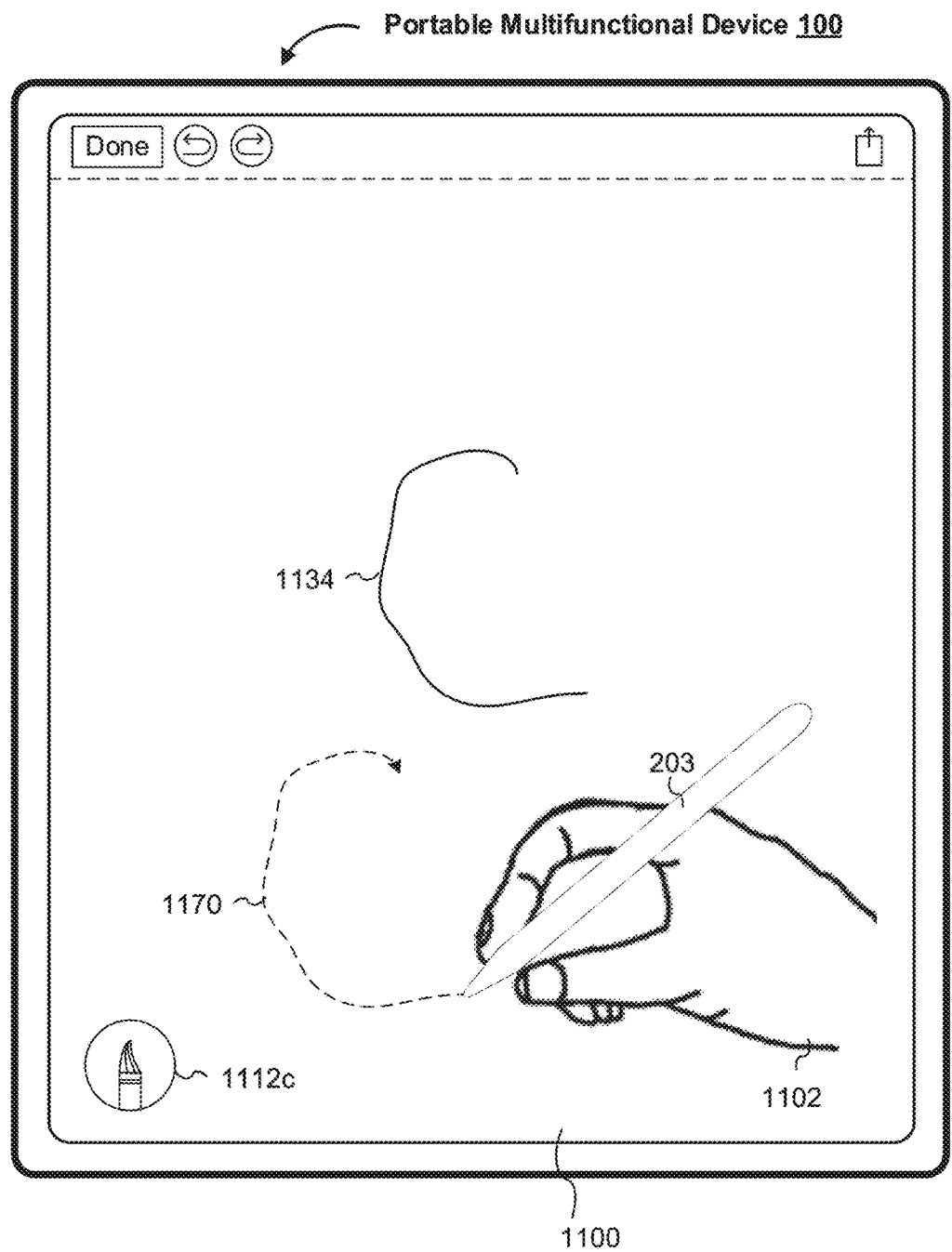

FIGS. 11M-11N show another sequence in which an operation (e.g., a select operation) is performed on the user interface element according to a that finger manipulation data from the stylus indicates a manipulation input on the stylus (e.g., a tap on the stylus). As shown in FIG. 11M, the stylus 203 detects an input 1140b (e.g., the tap on the stylus 203) at a location of the stylus 203 relative to the electronic device 100 while a user is holding the stylus 203 in his/her hand 1102. In response to obtaining finger manipulation data indicating the input 1140b and selecting the brush tool indicator 1144b in FIG. 11M, the electronic device 100, in FIG. 11N, removes from display the menu 1144 on the user interface 1110. Additionally, an indicator 1112a, in FIG. 11M, associated with a first markup tool (e.g., a felt-tip marker) changes to an indicator 1112b, in FIG. 11N, associated with a second markup tool (e.g., a brush).

FIGS. 11N-11O illustrate another sequence where a fourth change is made to displayed content. In FIG. 11N, the electronic device 100 detects an input 1170 (e.g., a drawing stroke or mark) from the stylus 203 while a user is holding the stylus 203 in his/her hand 1102. In response to the electronic device 100 detecting the input 1170, in FIG. 11O, the electronic device 100 displays a fourth change 1136 to the user interface 1100 (e.g., a stroke or mark) to display a user interface element 1154 based on the input 1170 in FIG. 11N. As shown in FIG. 11O, the user interface element 1154 is a drawing stroke corresponding to tool 1112c.

FIGS. 12A-12O illustrate example user interfaces for displaying user interface elements based on hover distance of the stylus 203 in accordance with some embodiments. The user interfaces in these figures are used to illustrate the processes described below, including the processes in FIGS. 19A-19C. Although some of the examples which follow will be given with reference to inputs on a touch-screen display (where the touch-sensitive surface and the display are combined, for example on touch screen 112), in some embodiments, the electronic device 100 detects inputs on touch-sensitive surface 651 that is separate from display 650, as shown in FIG. 6B. In various embodiments, the electronic device 100 displays user interface elements based on hover distance of the stylus 203 based on data received from the stylus 203.

In various embodiments, the touch-sensitive surface (e.g., the touch-sensitive surface 275 in FIG. 2 and FIGS. 5A-5B) of the stylus 203 detects touch inputs and gesture inputs, or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, a flick, a swipe, a tap, a double tap, and/or the like.

In various embodiments, the orientation and/or movement sensors (e.g., accelerometer, magnetometer, gyroscope) of the stylus 203 detect orientation/movement inputs or a lack thereof. Based on these detected inputs, the stylus 203 provides corresponding data to the electronic device 100. For example, in some embodiments, the stylus 203 provides data to the electronic device 100 indicative of one or more of the following: whether the stylus is being held, barrel rotation and/or direction thereof, twirl and/or direction thereof, orientation (e.g., position) of the tip 276 and/or the end 277 of the stylus 203 relative to a reference plane, and/or the like.

Figure 12B:
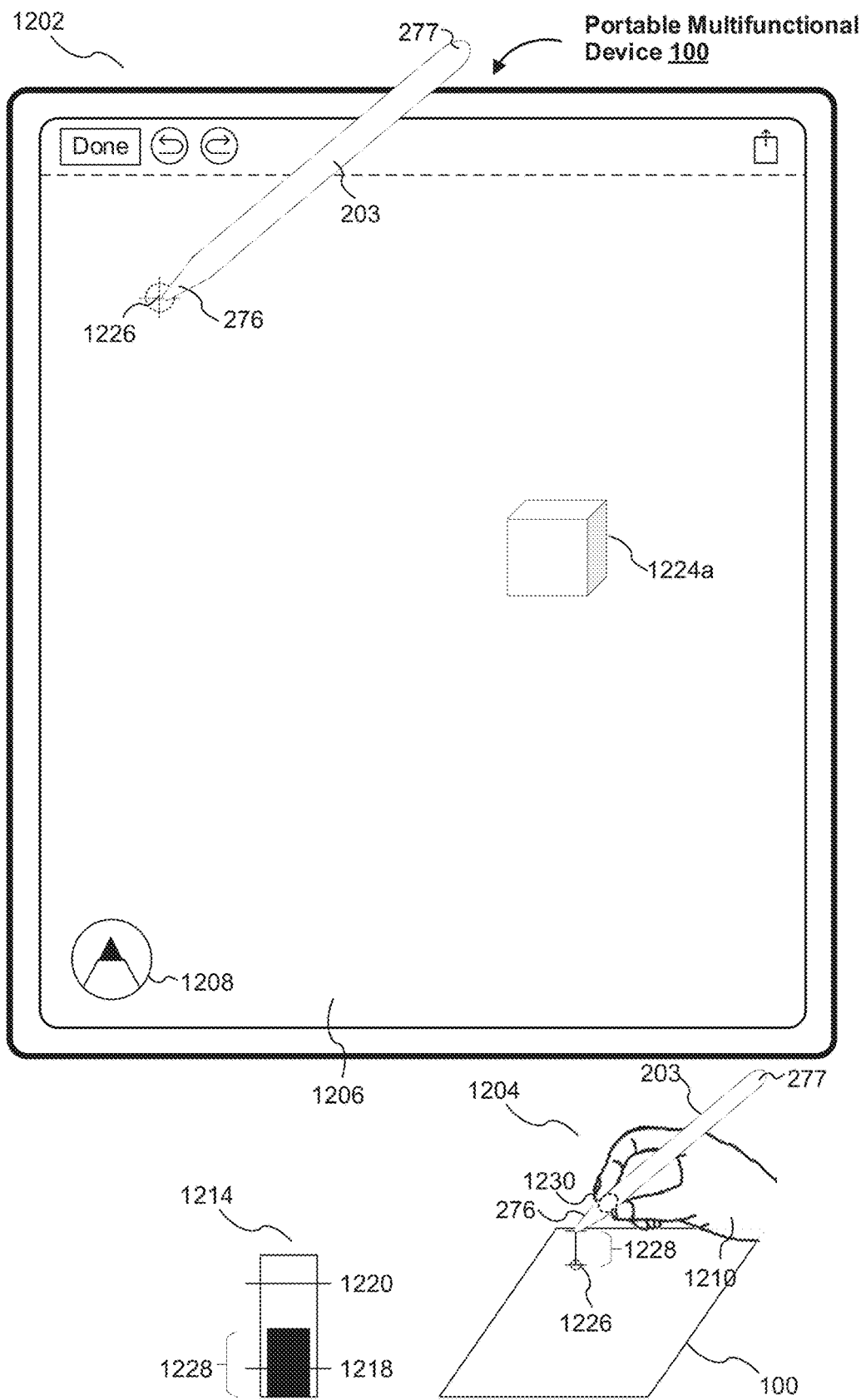
Figure 12C:
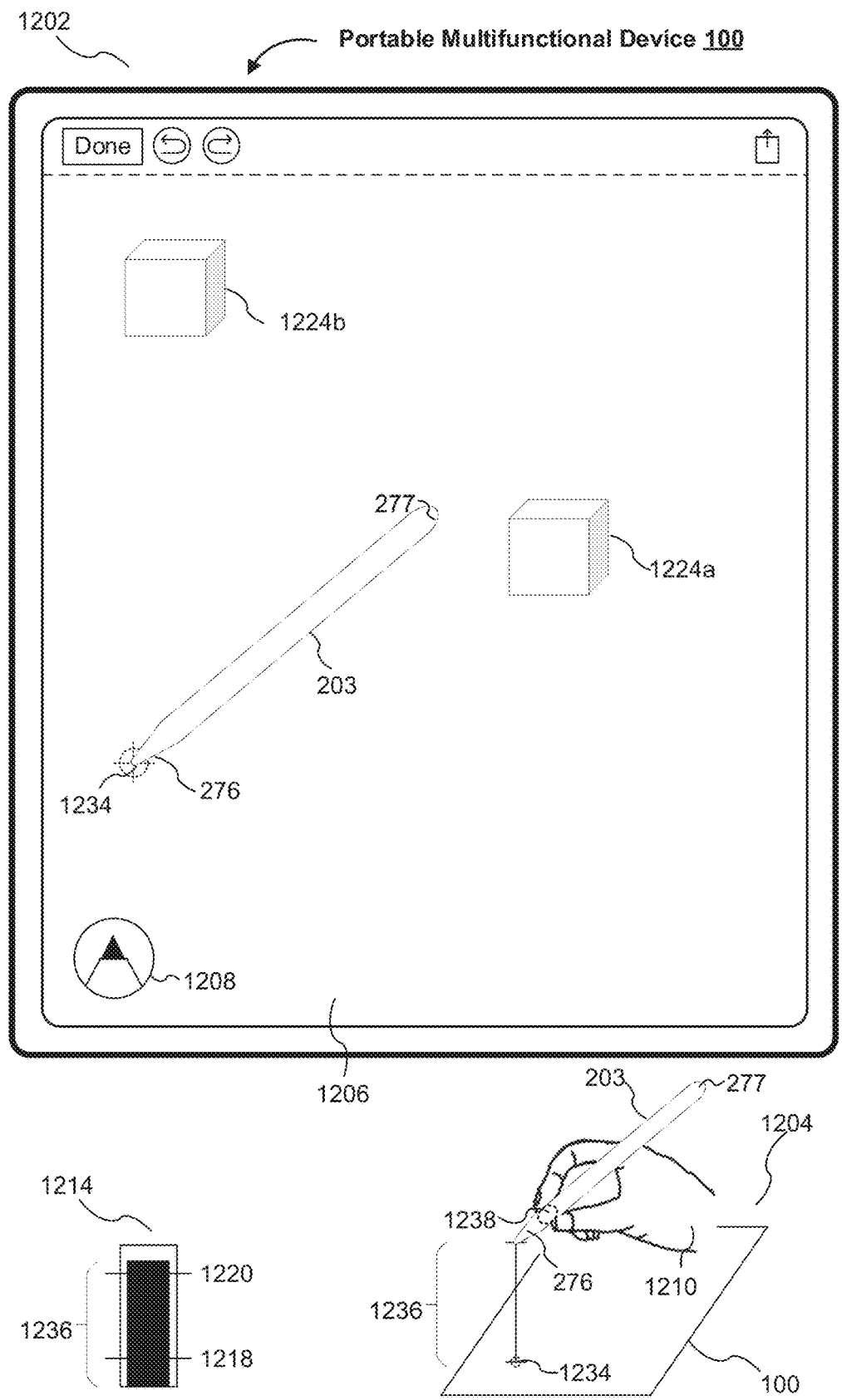

FIGS. 12A-12C illustrate an example of displaying marks according to the hover distance of the stylus satisfying a first distance threshold. FIG. 12A includes a bird's eye view 1202 of the electronic device 100 and a side view 1204 of the electronic device 100. As illustrated in the bird's eye view 1202, the electronic device 100 displays a user interface 1206 (e.g., associated with a drawing or notes application) that includes a visual indicator 1208 indicating that the stylus 203 is being held by the hand of the user 1210. The visual indicator 1208 corresponds to a solid-tip marker icon in order to indicate that the stylus 203 would make solid marker marks on the user interface 1206. One of ordinary skill in the art will appreciate that the visual indicator 1208 may take a variety of forms.

The bird's eye view 1202 and the side view 1204 include a first location 1212 on the touch-sensitive surface of the electronic device 100 that is below the tip 276 of the stylus 203. In some embodiments, the first location 1212 corresponds to the end of a straight, vertical line that starts at the tip 276 of the stylus 203. One of ordinary skill in the art will appreciate that the first location 1212 may vertically correspond to various points on the stylus 203, such as the end 277 of the stylus 203, the midpoint of the stylus 203, etc.

FIG. 12A further includes a distance meter 1214. The distance meter 1214 indicates a first hover distance 1216. The first hover distance 1216 corresponds to the distance between the stylus 203 and the touch-sensitive surface of the electronic device 100 while the stylus 203 is held over the first location 1212 on the touch-sensitive surface of the electronic device 100. The electronic device 100 determines the first hover distance 1216 based on data from the stylus 203 (e.g., data indicating inputs detected at the stylus), data generated at the electronic device 100 (e.g., sensor information at the electronic device 100), or a combination thereof. The distance meter 1214 further indicates a first distance threshold 1218 and a second distance threshold 1220.

As illustrated in FIG. 12A, the electronic device 100 obtains data from the stylus 203 indicating that the stylus 203 detects a tap gesture 1222. Responsive to detecting the tap gesture 1222, and according to a determination that the first hover distance 1216 satisfies (e.g., meets or exceeds) the first distance threshold 1218, the electronic device 100 displays a first cube 1224a associated with the first location 1212. Accordingly, in FIG. 12B the electronic device 100 displays the first cube 1224a and maintains display of the visual indicator 1208. For example, in FIG. 12B, the first cube 1224a is displayed at a location within the user interface 1206 that corresponds to the first location 1212 (e.g., the first cube 1224a is centered about the first location 1212). Although the electronic device 100 displays a cube, one of ordinary skill in the art will appreciate that the electronic device 100 may display one or more of a variety of user interface elements, such as marks, text, menus, bullet-points, objects, etc.

As illustrated in FIGS. 12A-12B, the stylus 203 is moved. Accordingly, as illustrated in FIG. 12B, the bird's eye view 1202 and the side view 1204 illustrate a second location 1226 on the electronic device 100. A second hover distance 1228 corresponds to the distance between the stylus 203 and the touch-sensitive surface of the electronic device 100 while the stylus 203 is held over the second location 1226 on the electronic device 100.

As illustrated in FIG. 12B, the electronic device 100 obtains data from the stylus 203 indicating that the stylus 203 detects a tap gesture 1230. Responsive to detecting the tap gesture 1230, and according to a determination that the second hover distance 1228 satisfies (e.g., meets or exceeds) the first distance threshold 1218, the electronic device 100 displays a second cube 1224b associated with to the second location 1226. Accordingly, in FIG. 12C the electronic device 100 displays the second cube 1224b and maintains display of the first cube 1224a and the visual indicator 1208. For example, in FIG. 12C, the second cube 1224b is displayed at a location within the user interface 1206 that corresponds to the second location 1226 (e.g., the second cube 1224b is centered about the second location 1226). As illustrated in FIG. 12C, because the first hover distance 1216 and the second hover distance 1228 satisfy the first distance threshold 1218, the resultant displayed first cube 1224a and the second cube 1224b share the same attributes (e.g., are the same cube).

Figure 12D:
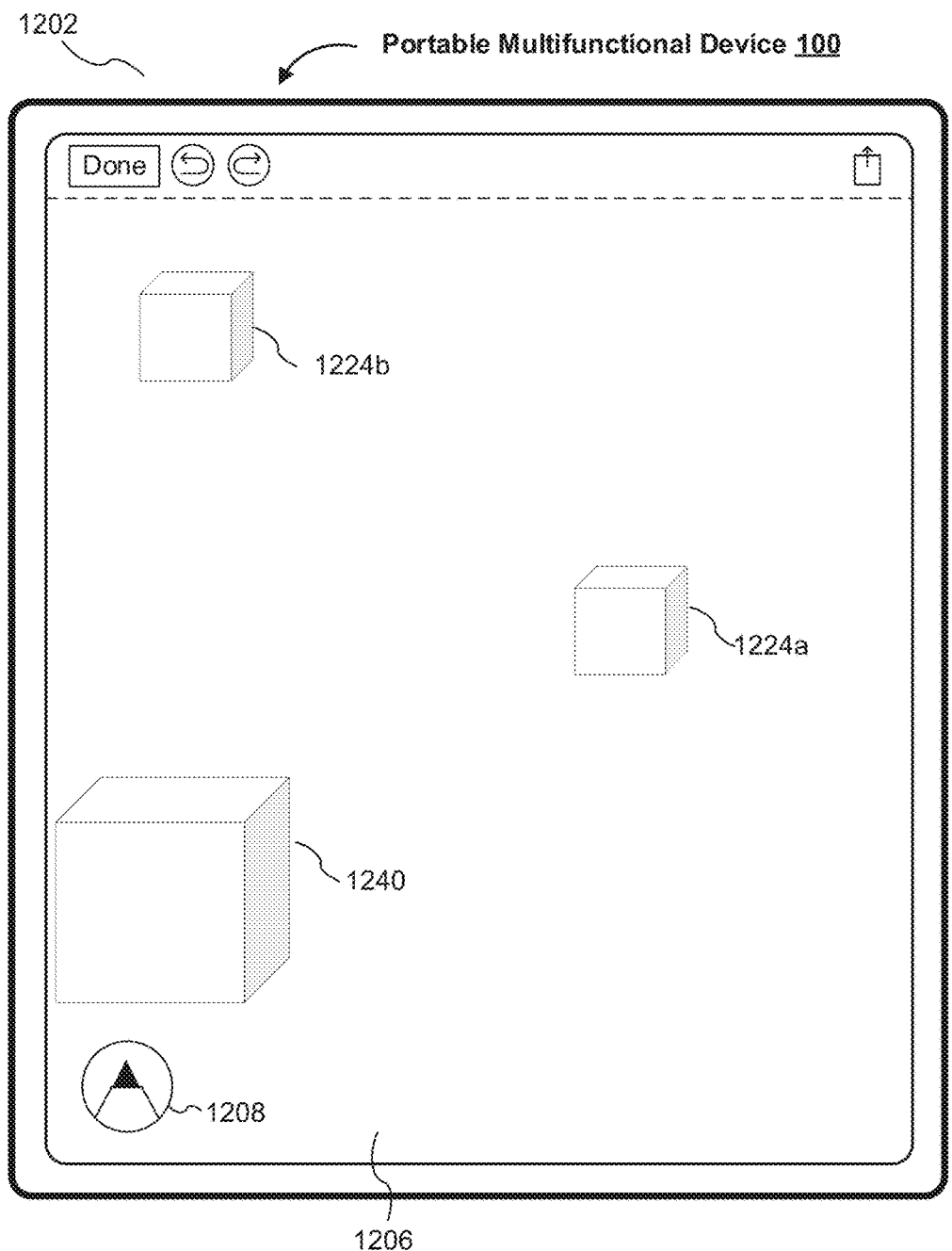

FIGS. 12C-12D illustrate an example of displaying a mark according to the hover distance of the stylus satisfying a second distance threshold. As illustrated in FIGS. 12B-12C, the stylus 203 is moved to a location over a third location 1234. As is illustrated in FIG. 12C, the bird's eye view 1202 and the side view 1204 indicate the third location 1234 on the electronic device 100. A third hover distance 1236 corresponds to the distance between the stylus 203 and the touch-sensitive surface of the electronic device 100 while the stylus 203 is held over the third location 1234 on the electronic device 100.

As illustrated in FIG. 12C, the electronic device 100 obtains data from the stylus 203 indicating that the stylus 203 detects a tap gesture 1238. Responsive to detecting the tap gesture 1238, and according to a determination that the third hover distance 1236 satisfies (e.g., meets or exceeds) the second distance threshold 1220 (e.g., exceeds), the electronic device 100 displays a third cube 1240 associated with the third location 1234. Accordingly, in FIG. 12D the electronic device 100 displays the third cube 1240 and maintains display of the first cube 1224a, the second cube 1224b, and the visual indicator 1208. For example, in FIG. 12D, the third cube 1224c is displayed at a location within the user interface 1206 that corresponds to the third location 1234 (e.g., the third cube 1224c is centered about the third location 1234).

Notably, the electronic device 100 behaves differently according to the hover distance of the stylus satisfying the first distance threshold 1218 versus the second distance threshold 1220. Namely, according to satisfaction of the first threshold 1218, the electronic device 100 displays the first cube 1224a and the second cube 1224b in FIGS. 12B-12C; and according to satisfaction of the second distance threshold 1220, the electronic device displays the third cube 1240 at a larger size in FIG. 12D. One of ordinary skill in the art will appreciate that a user interface element corresponding to satisfaction of the first distance threshold 1218 may differ in a variety of ways from a user interface element corresponding to satisfaction of the second distance threshold 1220.

Figure 12E:
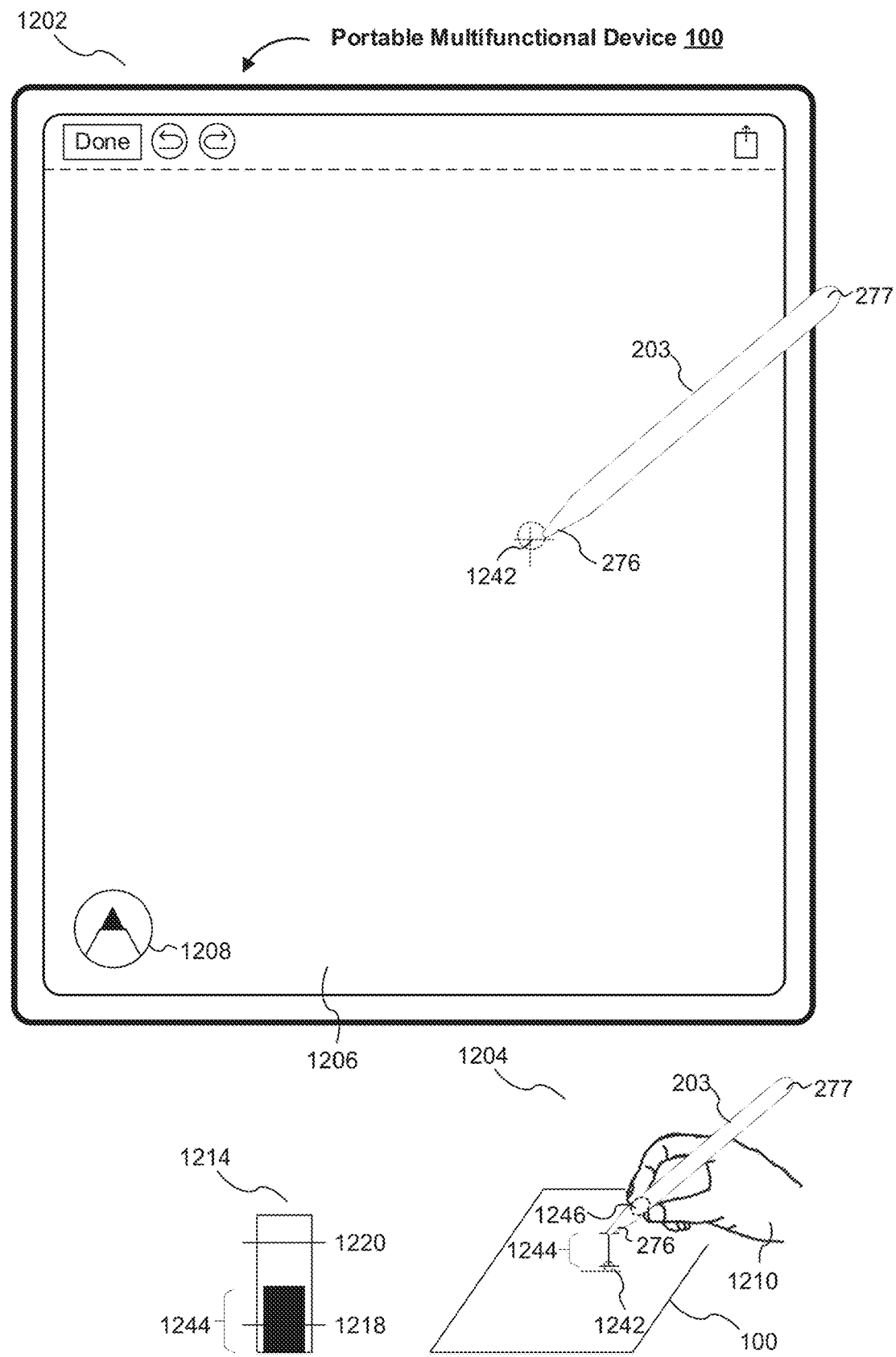
Figure 12F:
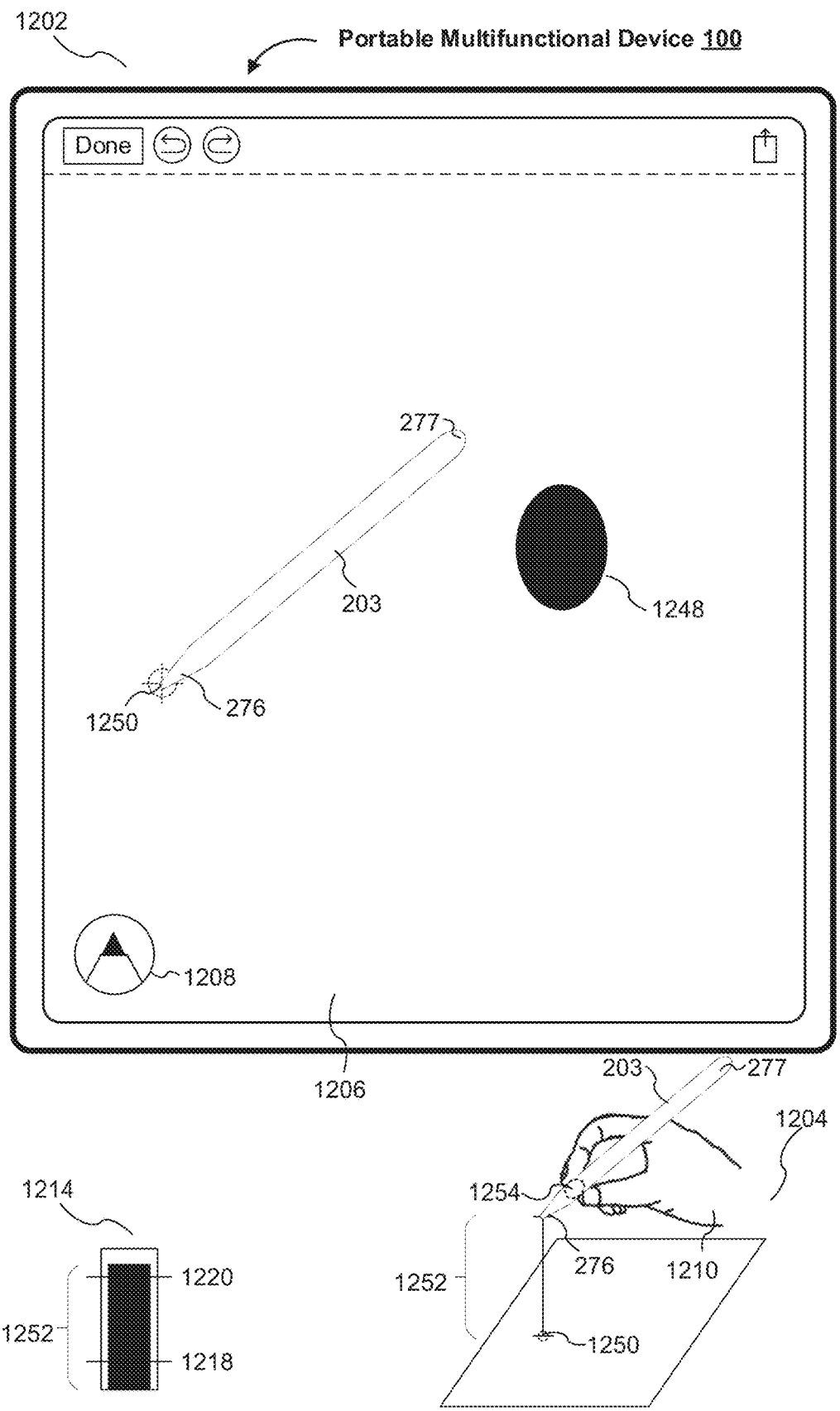

FIGS. 12E-12F illustrate another example of displaying marks according to the hover distance of the stylus satisfying a first distance threshold. As indicated in the bird's eye view 1202 in FIG. 12E, the electronic device 100 displays the user interface 1206 (e.g., associated with a drawing or notes application) that includes a visual indicator 1208 indicating that the stylus 203 is being held by the hand of the user 1210. As further illustrated in FIG. 12D, the bird's eye view 1202 and the side view 1204 indicate a fourth location 1242 on the touch-sensitive surface of the electronic device 100 that is below the tip 276 of the stylus 203. A fourth hover distance 1244 corresponds to the distance between the stylus 203 and the touch-sensitive surface of the electronic device 100 while the stylus 203 is held over the fourth location 1242 on the electronic device 100.

As illustrated in FIG. 12E, the electronic device 100 obtains data from the stylus 203 indicating that the stylus 203 detects a tap gesture 1246. Responsive to detecting the tap gesture 1246, and according to a determination that the fourth hover distance 1244 satisfies (e.g., meets or exceeds) the first distance threshold 1218, the electronic device 100 displays a solid oval 1248 associated with the fourth location 1242. Accordingly, in FIG. 12F the electronic device 100 displays the solid oval 1248 and maintains display of the visual indicator 1208. For example, in FIG. 12F, the solid oval 1248 is displayed at a location within the user interface 1206 that corresponds to the fourth location 1242 (e.g., the solid oval 1248 is centered about the fourth location 1242). Although the electronic device 100 displays a solid oval 1248, one of ordinary skill in the art will appreciate that the electronic device 100 may display one or more of a variety of user interface elements, such as marks, menus, bullet-points, objects, etc.

Figure 12G:
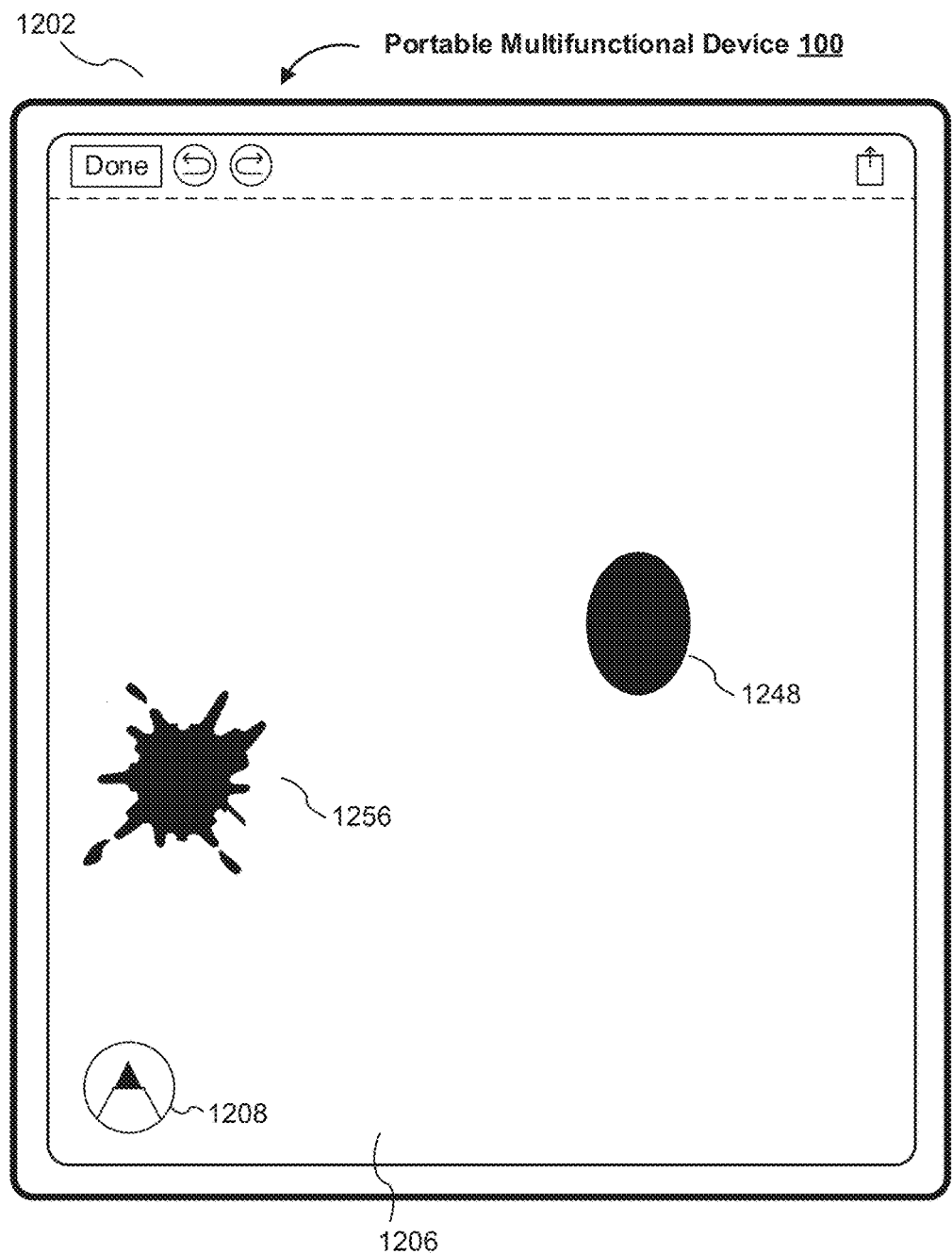

FIGS. 12F-12G illustrate another example of displaying a mark according to the hover distance of the stylus satisfying a second distance threshold. As illustrated in FIGS. 12E-12F, the stylus 203 is moved to a location over a fifth location 1250. The bird's eye view 1202 and the side view 1204 indicate the fifth location 1250 on the electronic device 100 in FIG. 12F. A fifth hover distance 1252 corresponds to the distance between the stylus 203 and the touch-sensitive surface of the electronic device 100 while the stylus 203 is held over the fifth location 1250 on the electronic device 100.

As illustrated in FIG. 12F, the electronic device 100 obtains data from the stylus 203 indicating that the stylus 203 detects a tap gesture 1254. Responsive to detecting the tap gesture 1254, and according to a determination that the fifth hover distance 1252 satisfies (e.g., meets or exceeds) the second distance threshold 1220, the electronic device 100 displays a splatter mark 1256 associated with the fifth location 1250. Accordingly, in FIG. 12G, the electronic device 100 displays the splatter mark 1256 and maintains display of the solid oval 1248 and the visual indicator 1208. For example, in FIG. 12G, the splatter mark 1256 is displayed at a location within the user interface 1206 that corresponds to the fifth location 1250 (e.g., the splatter mark 1256 is centered about the fifth location 1250).

Notably, the electronic device 100 behaves differently according to the hover distance of the stylus satisfying the first distance threshold 1218 versus the second distance threshold 1220. Namely, according to satisfaction of the first threshold 1218, the electronic device 100 displays the solid oval 1248 in FIG. 12F; and according to satisfaction of the second distance threshold 1220, the electronic device 100 displays the splatter mark 1256 in FIG. 12G.

Figure 12H:
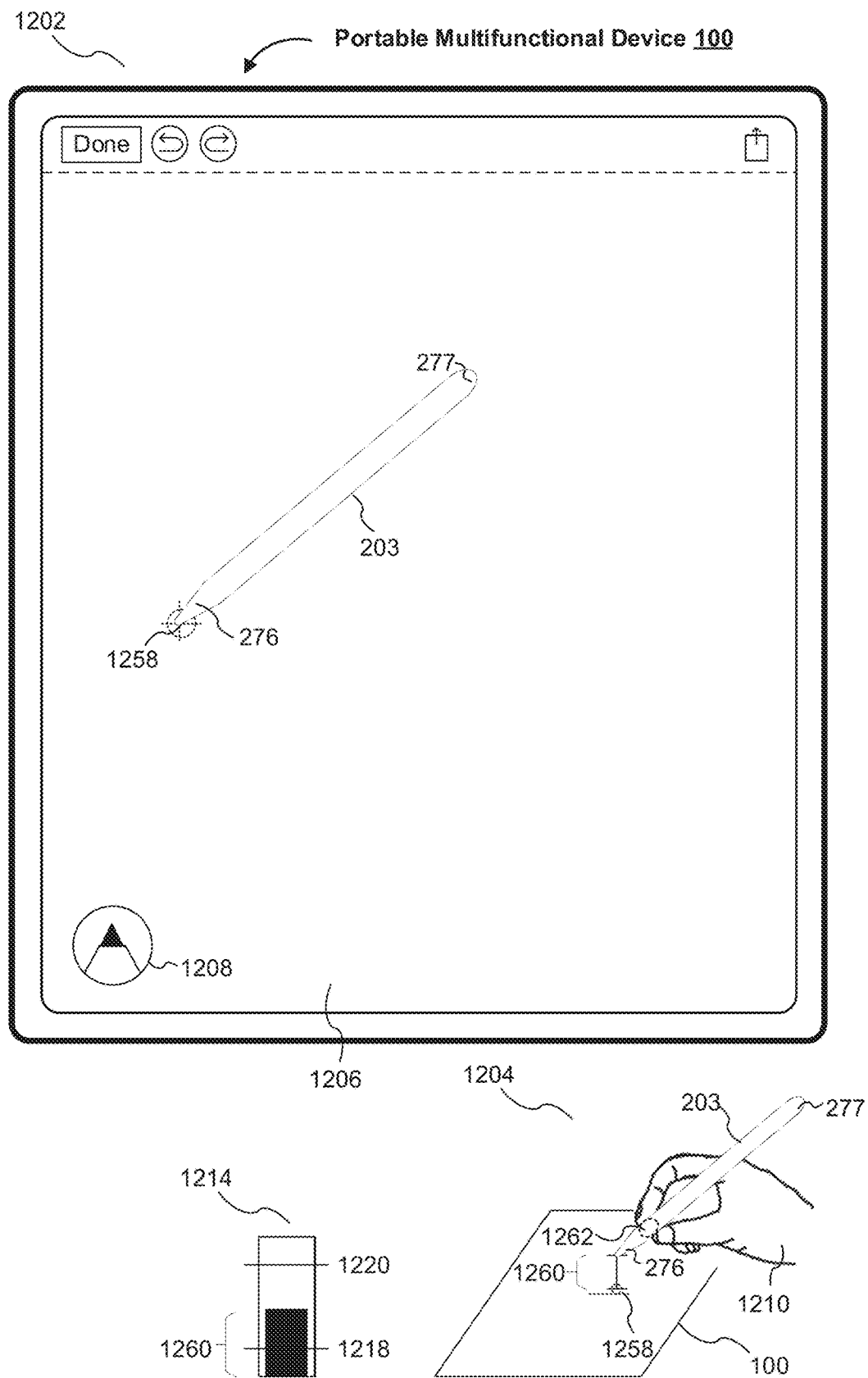
Figure 12I:
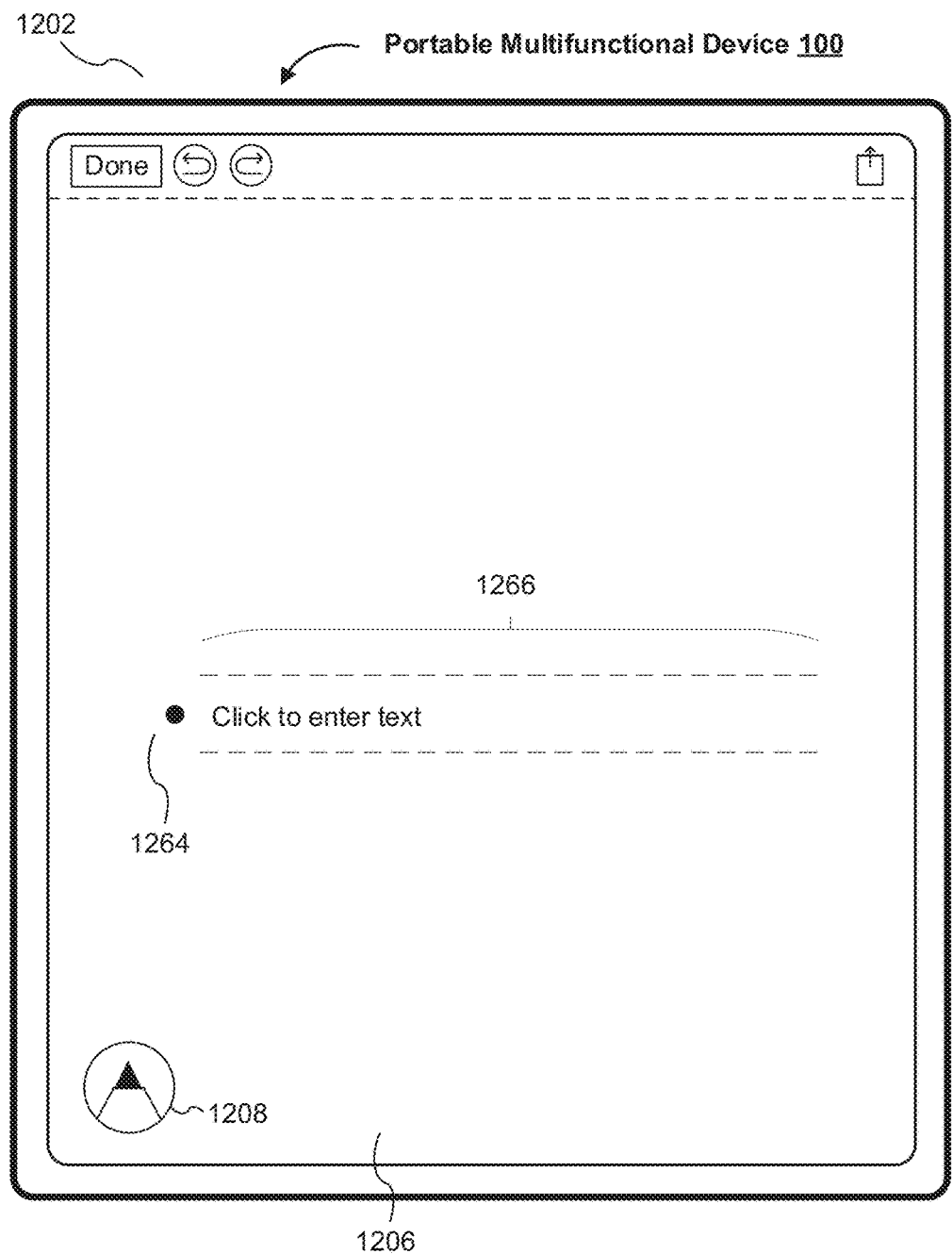

FIGS. 12H-12I illustrate another example of displaying a bullet point according to the hover distance of the stylus satisfying a first distance threshold. As illustrated in FIG. 12H, the bird's eye view 1202 and the side view 1204 illustrate a sixth location 1258 on the touch-sensitive surface of the electronic device 100 that is below the tip 276 of the stylus 203. A sixth hover distance 1260 corresponds to the distance between the stylus 203 and the touch-sensitive surface of the electronic device 100 while the stylus 203 is held over the sixth location 1258 on the electronic device 100.

As illustrated in FIG. 12H, the electronic device 100 obtains data from the stylus 203 indicating that the stylus 203 detects a tap gesture 1262. Responsive to detecting the tap gesture 1262, and according to a determination that the sixth hover distance 1260 satisfies (e.g., meets or exceeds) the first distance threshold 1218, the electronic device 100 displays a bullet point 1264 adjacent to a text box 1266 associated with the sixth location 1258. Accordingly, in FIG. 12I the electronic device 100 displays the bullet point 1264 adjacent to the text box 1266 and maintains display of the visual indicator 1208. For example, in FIG. 12I, the bullet point 1264 and the text box 1266 are displayed at a location within the user interface 1206 that corresponds to the sixth location 1258 (e.g., the bullet point 1264 and the text box 1266 are centered about the sixth location 1258).

In some embodiments, while displaying the text box 1266 the electronic device 100 displays the bullet point 1266. In some embodiments, the electronic device 100 concurrently displays the bullet point 1264 and the text box 1266. One of ordinary skill in the art will appreciate that the electronic device 100 may display one or more of a variety of user interface elements, such as marks, menus, bullet-points, objects, etc.

Figure 12J:
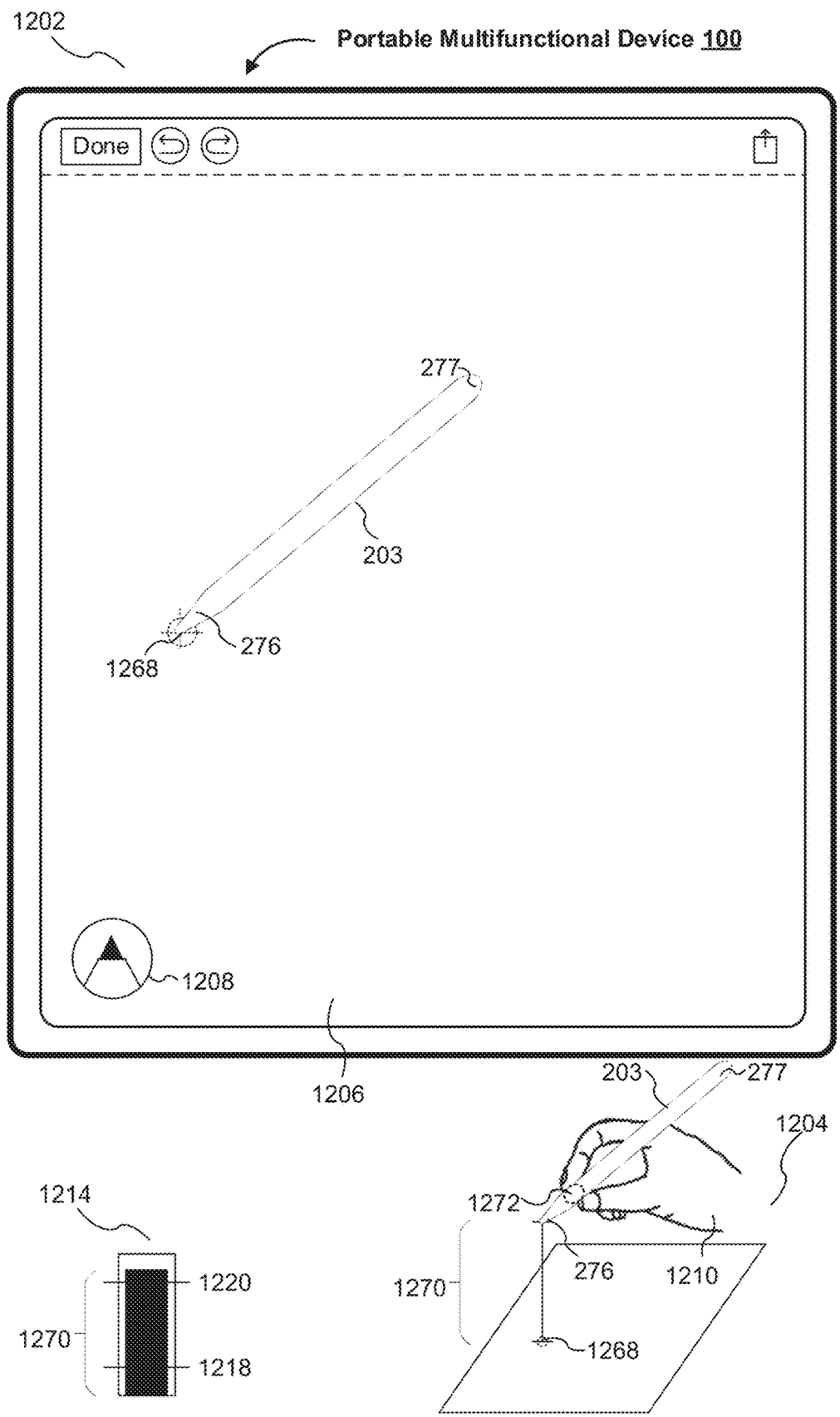
Figure 12K:
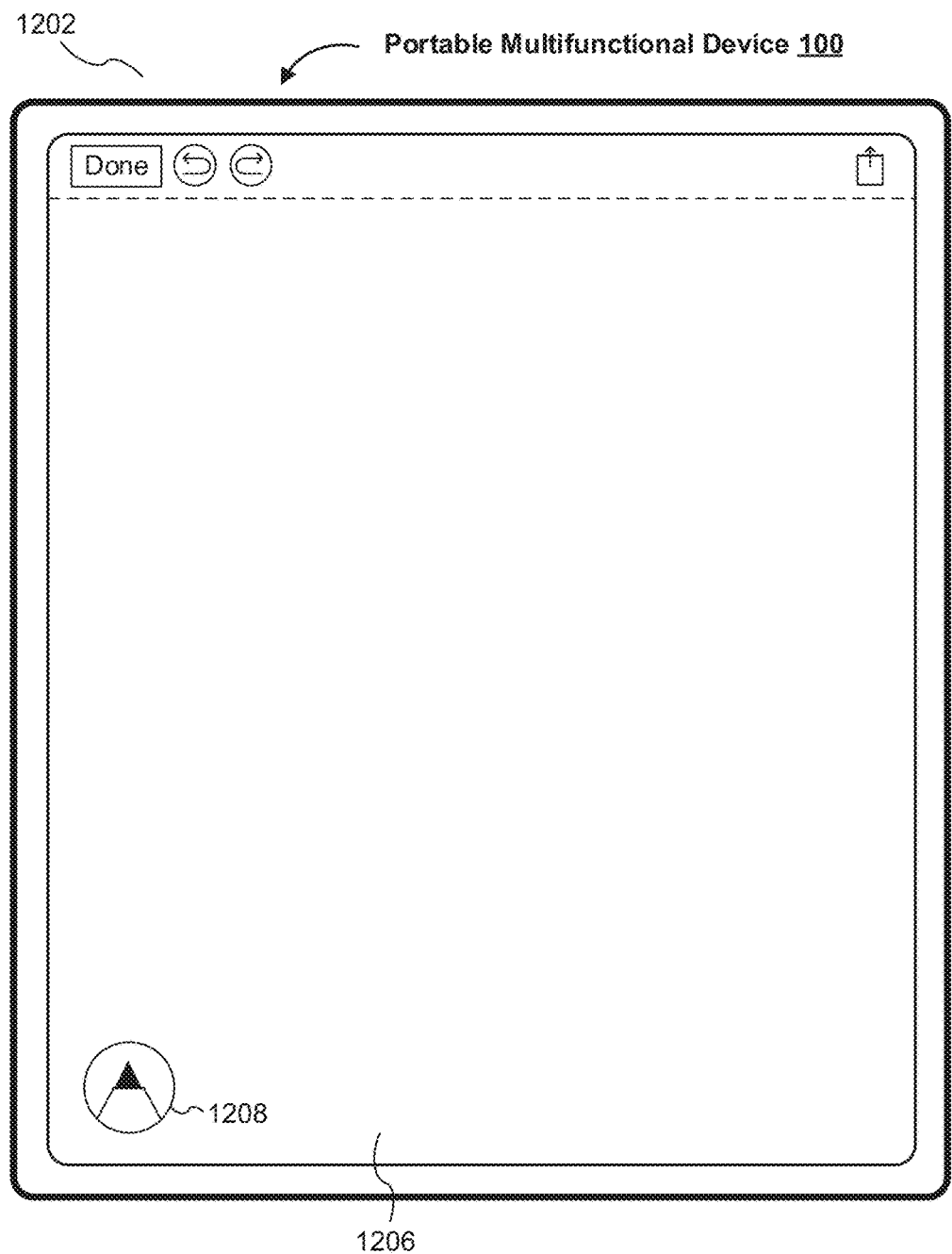

FIGS. 12J-12K illustrate an example of not displaying a bullet point according to the hover distance of the stylus satisfying a second distance threshold. As indicated in the bird's eye view 1202 in FIG. 12J, the electronic device 100 displays a user interface 1206 and a visual indicator 1208 indicating that the stylus 203 is being held by the hand of the user 1210. As further illustrated in FIG. 12J, the bird's eye view 1202 and the side view 1204 indicate a seventh location 1268 on the touch-sensitive surface of the electronic device 100 that is below the tip 276 of the stylus 203. A seventh hover distance 1270 corresponds to the distance between the stylus 203 and the touch-sensitive surface of the electronic device 100 while the stylus 203 is held over the seventh location 1268 on the electronic device 100.

As illustrated in FIG. 12J, the electronic device 100 obtains data from the stylus 203 indicating that the stylus 203 detects a tap gesture 1272. Responsive to detecting the tap gesture 1272, and according to a determination that the seventh hover distance 1270 satisfies (e.g., meets or exceeds) the second distance threshold 1220, the electronic device 100 does not display a bullet point or a text box. Accordingly, in FIG. 12K the electronic device 100 does not display a bullet point or a text box and maintains display the visual indicator 1208.

Notably, the electronic device 100 behaves differently according to the hover distance of the stylus satisfying the first distance threshold 1218 versus the second distance threshold 1220. Namely, according to satisfaction of the first threshold 1218, in FIG. 12I the electronic device 100 displays the bullet point 1264 adjacent to the text box 1266; and according to satisfaction of the second distance threshold 1220, in FIG. 12K the electronic device 100 displays neither.

Figure 12L:
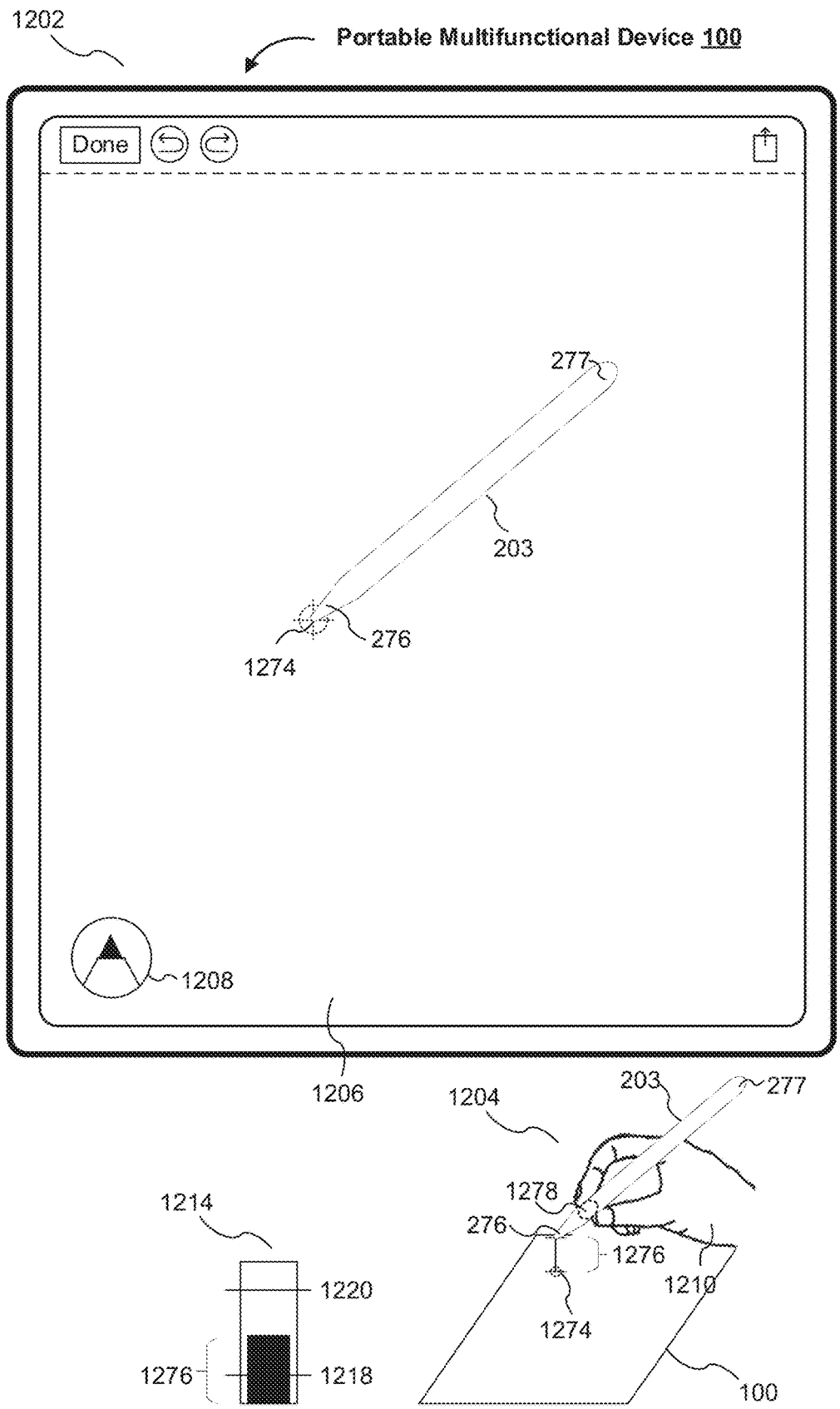
Figure 12M:
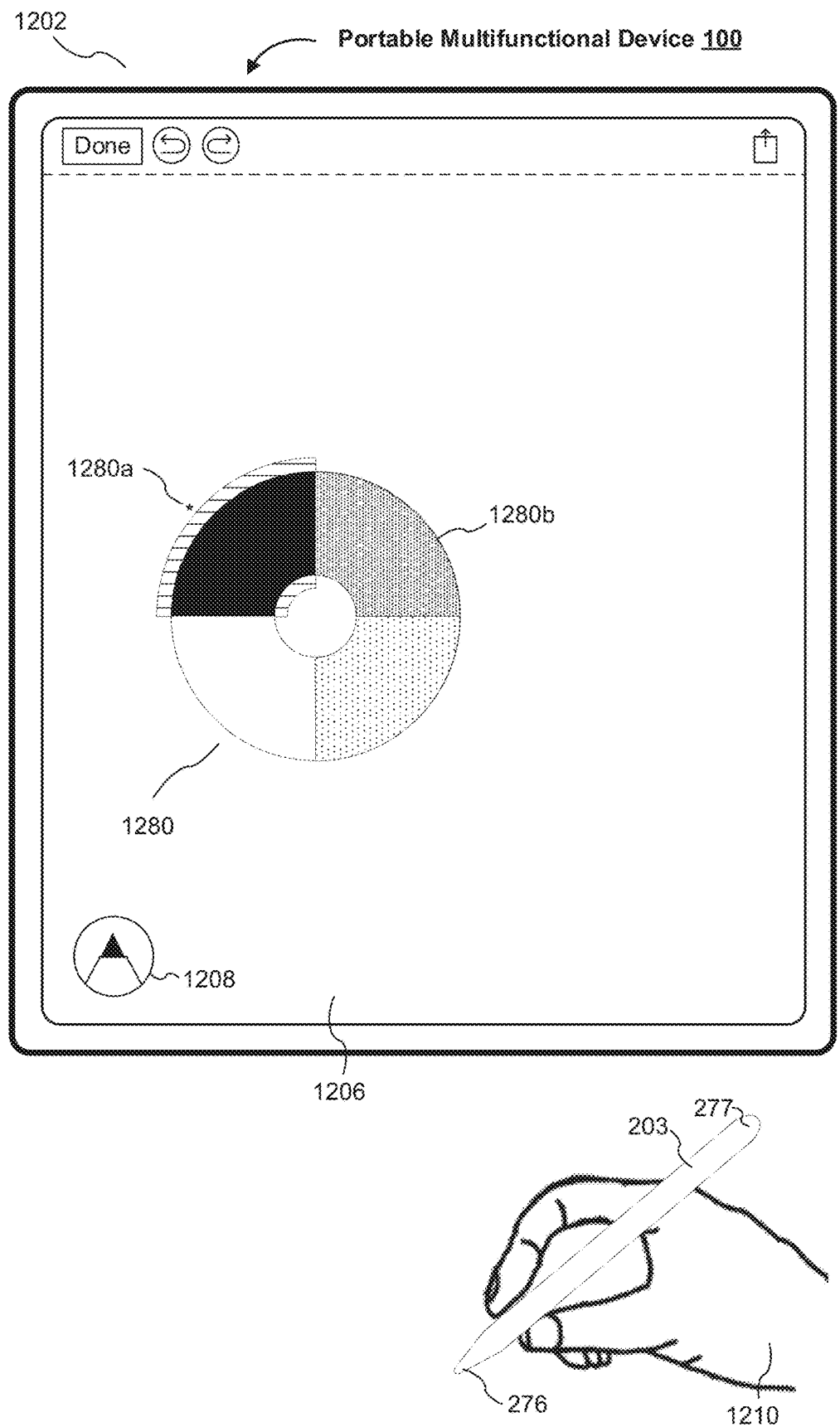

FIGS. 12L-12M illustrate an example of displaying a menu based on the hover distance of the stylus satisfying a first distance threshold. As indicated in the bird's eye view 1202 in FIG. 12L, the electronic device 100 displays a user interface 1206 and a visual indicator 1208 indicating that the stylus 203 is being held by the hand of the user 1210. As further illustrated in FIG. 12L, the bird's eye view 1202 and the side view 1204 indicate an eighth location 1274 on the touch-sensitive surface of the electronic device 100 that is below the tip 276 of the stylus 203. An eighth hover distance 1276 corresponds to the distance between the stylus 203 and the touch-sensitive surface of the electronic device 100 while the stylus 203 is held over the eighth location 1274 on the electronic device 100.

As illustrated in FIG. 12L, the electronic device 100 obtains data from the stylus 203 indicating that the stylus 203 detects a tap gesture 1278. Responsive to detecting the tap gesture 1278, and according to a determination that the eighth hover distance 1276 satisfies (e.g., meets or exceeds) the first distance threshold 1218, the electronic device 100 displays a menu 1280 associated with the eighth location 1274. Accordingly, in FIG. 12M the electronic device 100 displays the menu 1280 and maintains display of the visual indicator 1208. For example, in FIG. 12M, the menu 1280 is displayed at a location within the user interface 1206 that corresponds to the eighth location 1274 (e.g., the menu 1280 is centered about the eighth location 1274). The menu 1280 includes four visual indicators, with a solid indicator 1280a having focus by default. One of ordinary skill in the art will appreciate that the menu 1280 may include any number of visual indicators types having a variety of characteristics, with any of the indicators having focus by default.

In some embodiments, the electronic device 100 may change which indicator has focus in response to the stylus 203 being manipulated by the hand of the user 1210 (not shown). For example, in response to obtaining data from the stylus 203 indicating a clockwise-rotation of the stylus 203, the electronic device 100 moves (e.g., changes display) clockwise through the menu 1280 such that focus changes from the solid indicator 1280a to the dotted-line indicator 1280b (not shown).

Figure 12N:
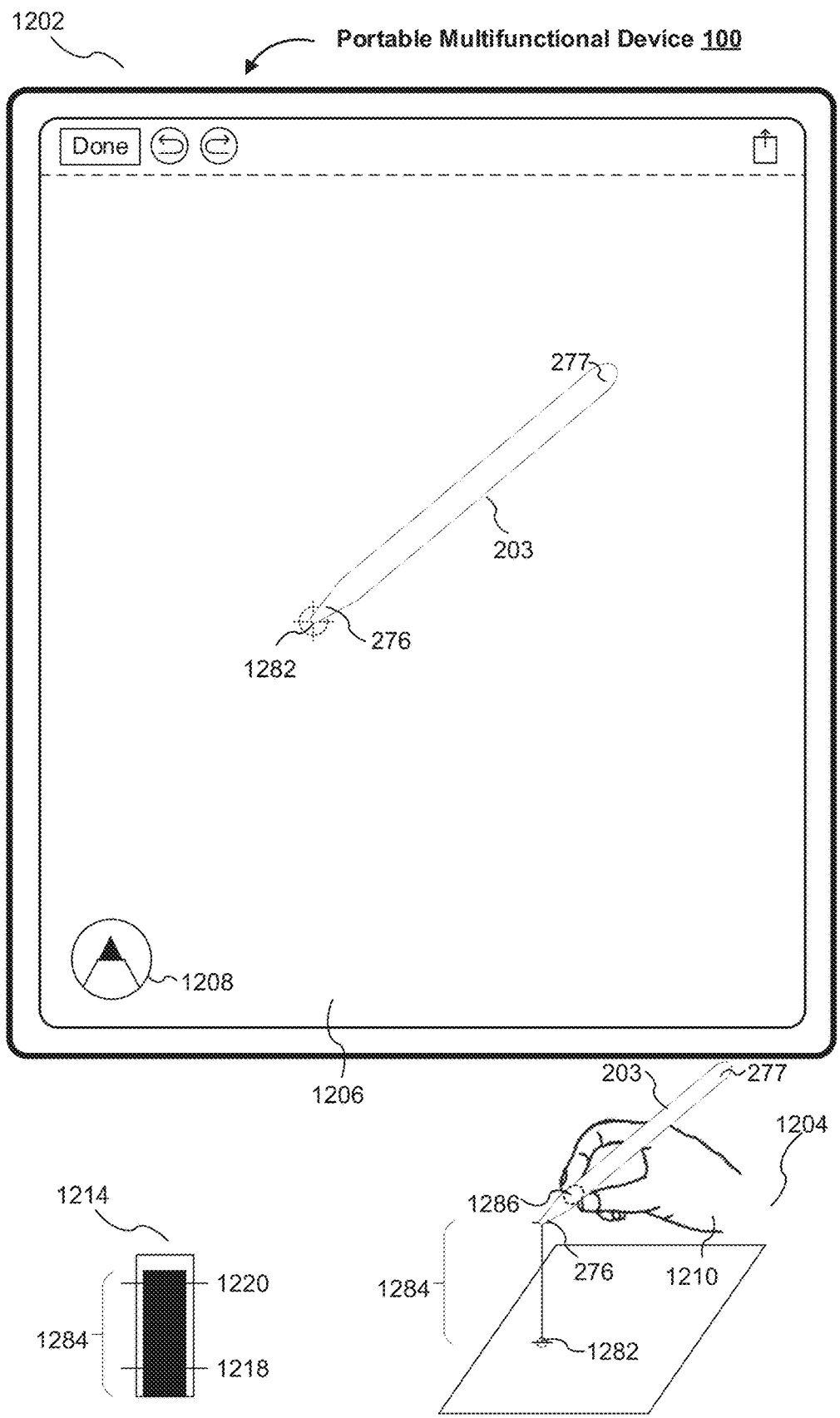
Figure 12O:
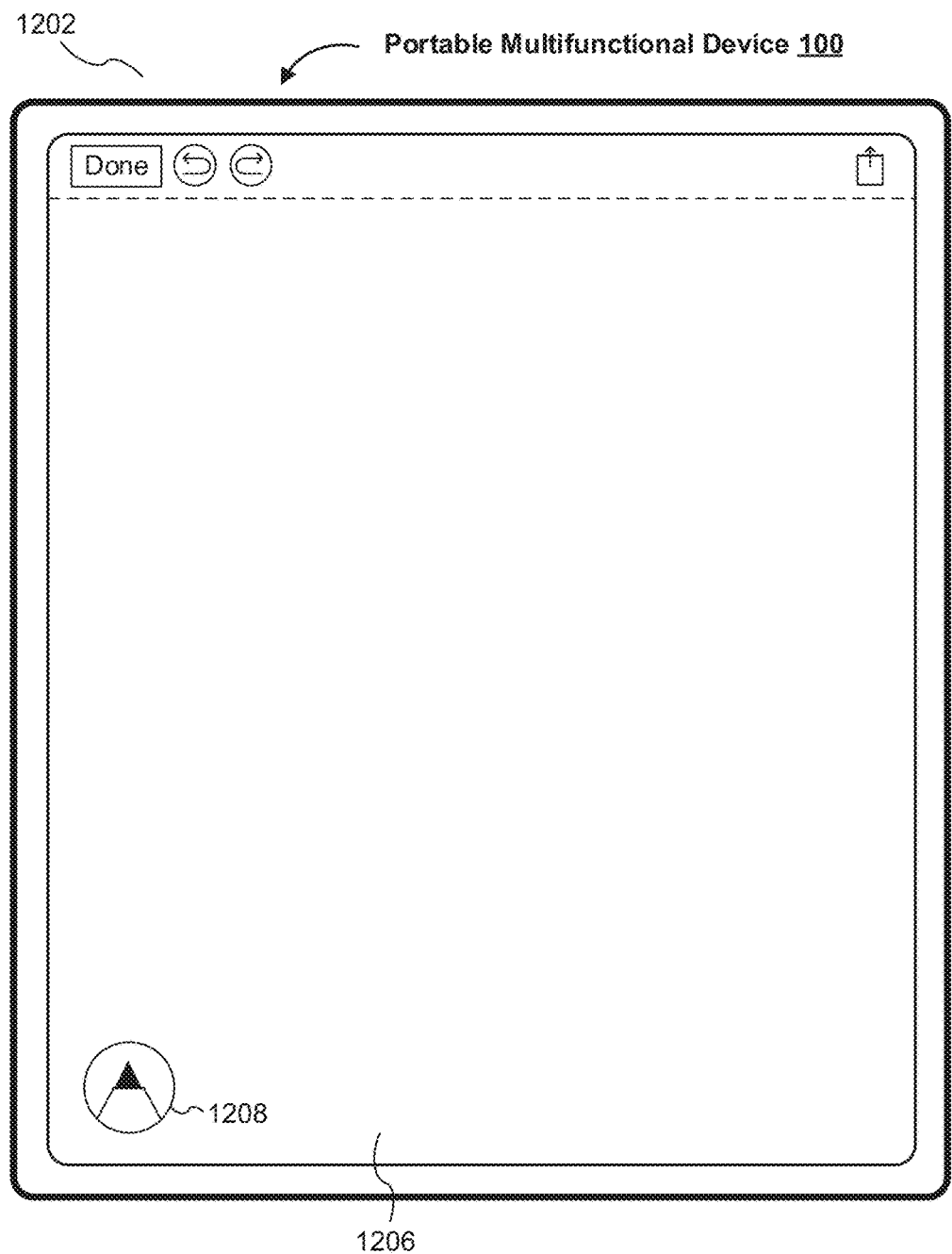

FIGS. 12N-12O illustrate an example of not displaying a menu according to the hover distance of the stylus satisfying a second distance threshold. As indicated in the bird's eye view 1202 in FIG. 12N, the electronic device 100 displays a user interface 1206 and a visual indicator 1208 indicating that the stylus 203 is being held by the hand of the user 1210. As illustrated in FIG. 12N, the bird's eye view 1202 and the side view 1204 indicate a ninth location 1282 on the touch-sensitive surface of the electronic device 100 that is below the tip 276 of the stylus 203. A ninth hover distance 1284 corresponds to the distance between the stylus 203 and the touch-sensitive surface of the electronic device 100 while the stylus 203 is held over the ninth location 1282 on the electronic device 100.

As illustrated in FIG. 12N, the electronic device 100 obtains data from the stylus 203 indicating that the stylus 203 detects a tap gesture 1286. Responsive to detecting the tap gesture 1286, and according to a determination that the ninth hover distance 1284 satisfies (e.g., meets or exceeds) the second distance threshold 1220, the electronic device 100 does not display a menu. Accordingly, in FIG. 12O the electronic device 100 does not display a menu and maintains display the visual indicator 1208.

Notably, the electronic device 100 behaves differently according to the hover distance of the stylus satisfying the first distance threshold 1218 versus the second distance threshold 1220. Namely, according to satisfaction of the first threshold 1218, in FIG. 12M the electronic device 100 displays the menu 1280; and according to satisfaction of the second distance threshold 1220, in FIG. 12O the electronic device 100 does not display a menu.

Figure 13A:
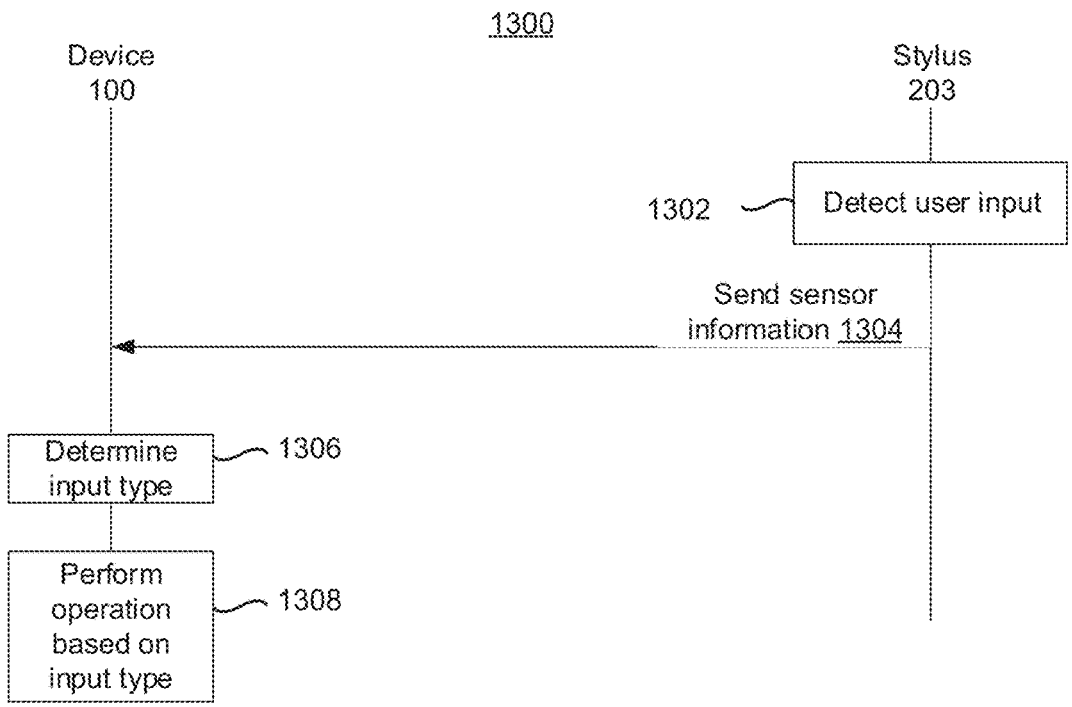
FIG. 13A is a flow diagram illustrating a method of processing sensor data collected at a stylus in accordance with some embodiments.

FIG. 13A is a flow diagram illustrating a method 1300 of processing sensor data collected at a stylus in accordance with some embodiments. The method 1300 contemplates that the electronic device 100 processes sensor data obtained from the stylus 203. As represented by block 1302, the stylus 203 detects a user input. The user input corresponds to one of the various user inputs described in the present disclosure. As represented by step 1304, the stylus 203 provides sensor information to the electronic device 100. The sensor information is indicative of the stylus-detected user input or an absence thereof (e.g., when the stylus 203 is not being held). As represented by block 1306, based on the sensor information, the electronic device 100 determines (e.g., processes, interprets, translates, decodes, etc.) the input type. The input type corresponds to one of the various input types described in the present disclosure. As represented by block 1308, the electronic device 100 performs an operation based on input type. The operation corresponds to one of the various operations described in the present disclosure.

Figure 13B:
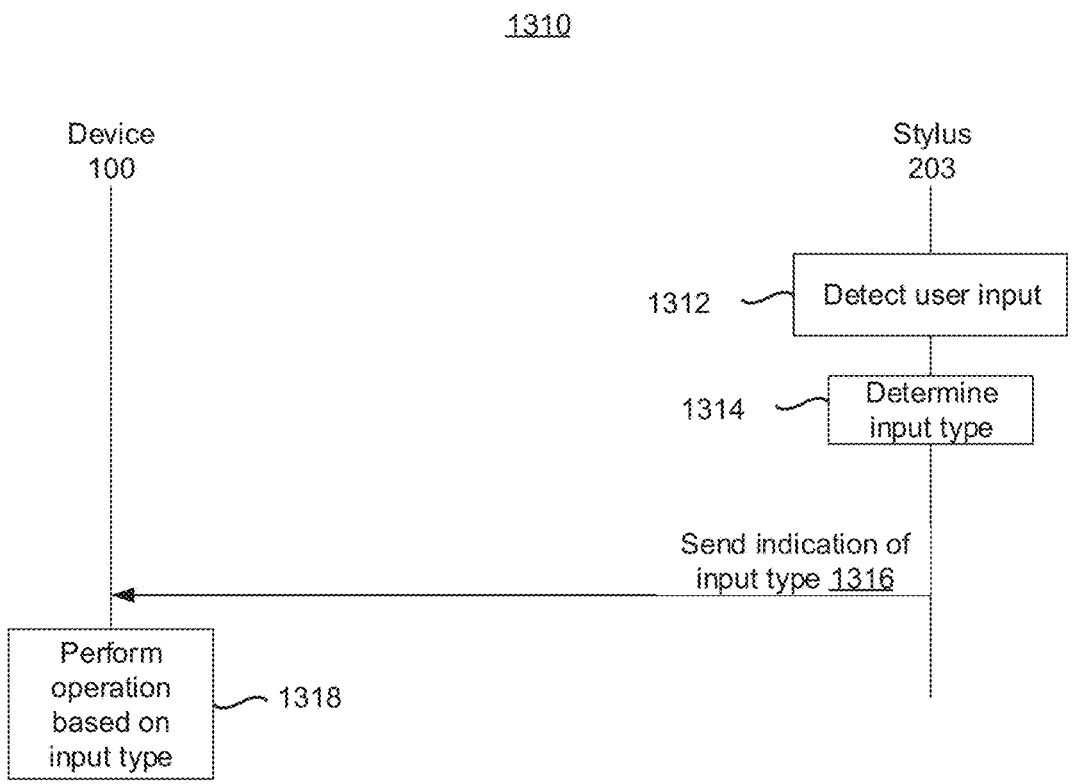
FIG. 13B is a flow diagram illustrating another method of processing sensor data collected at a stylus in accordance with some embodiments.

FIG. 13B is a flow diagram illustrating another method 1310 of processing sensor data collected at a stylus in accordance with some embodiments. As represented by block 1312, the stylus 203 detects a user input. The user input corresponds to one of the various user inputs described in the present disclosure. As represented by block 1314, the stylus 203 determines an input type based on the detected user input. In various embodiments, the stylus 203 determines (e.g., processes, interprets, translates, decodes, etc.) the input type. In some embodiments, the touch interpretation module 477 of the stylus 203 determines the input type. Although not shown, in various embodiments, the stylus 203 and the electronic device 100 jointly (e.g., in concert) determine the input type. In other words, the stylus 203 and the electronic device 100 share the processing corresponding to determining the input type. The input type corresponds to one of the various input types described in the present disclosure. As represented by step 1316, the stylus 203 provides information indicative of the input type to the electronic device 100. In various embodiments, the stylus 203 and the electronic device 100 jointly determine the input type, the stylus 203 does not provide information indicative of the input type. In other words, the method 1310 does not perform block 1316. As represented by block 1318, the electronic device 100 performs an operation based on input type. The operation corresponds to one of the various operations described in the present disclosure.

FIGS. 14A-14C is a flow diagram illustrating a method 1400 of changing application states in accordance with some embodiments. The method 1400 is performed at an electronic device (e.g., the electronic device 300 in FIG. 3, or the portable multifunction device 100 in FIG. 1A) with a touch-sensitive surface, a display, and a communication interface provided to communicate with a stylus (e.g., a BLUETOOTH interface). In some embodiments, the touch-sensitive surface and display are combined into a touch screen display (e.g., a mobile phone or tablet). In some embodiments, the touch-sensitive surface and display are separate (e.g., a laptop or desktop computer with a separate touchpad and display). Some operations in the method 1400 are, optionally, combined and/or the order of some operations is, optionally, changed.

Transitioning the electronic device from a first application state to a second application state based on sensor data from the stylus reduces the number of inputs needed to perform the transition. This reduction in inputs enhances the operability of the electronic device and makes the electronic device interface more efficient (e.g., by helping the user to provide proper inputs and reducing user mistakes when operating/interacting with the electronic device) which, additionally, reduces power usage and wear-and-tear of the electronic device.

The method 1400 contemplates the electronic device utilizing data received from a stylus in order to exploit the myriad of detectable input types at the stylus. The stylus detects inputs from the hand of the user while the user is holding the stylus and detects inputs while the user is not holding the stylus. Because of the intricate varied hand-manipulation capabilities of the user, the stylus can detect many types of user inputs. The stylus provides data to the electronic device indicative of these user inputs. Accordingly, the method 1400 contemplates the electronic device receiving various of types of data from the stylus indicative of the various user inputs detected at the stylus.

This enhances the operability of the electronic device and makes the electronic device interface more efficient and robust. As noted above, the user can provide a variety of input types to the stylus (e.g., finger manipulations on the stylus, gestured on the stylus, rotational movements of the stylus, etc.). On the other hand, the touch-sensitive surface of the electronic device can receive a single input type (e.g., a touch input). A single input type limits a user's ability to interact with the electronic device and can lead to erroneous user inputs. Accordingly, a shift in at least some of the user inputs from the touch-sensitive surface of the electronic device to the stylus provides a more efficient user interface with the electronic device and can reduce the number of mistaken inputs registered at the electronic device. Additionally, this shift to fewer touch inputs at the touch-sensitive surface of the electronic device reduces wear-and-tear of and power usage of the electronic device. This improves battery life of the electronic device by enabling the user to use the electronic device more quickly and efficiently. For battery-operated electronic devices, enabling a user to enter fewer inputs on the touch-sensitive surface of the electronic device conserves power and increases the time between battery charges of the electronic device.

With respect to FIG. 14A, while the electronic device is in a first state, the electronic device obtains (1402) information about a current state of the stylus via the communication interface. As one example, the information corresponds to sensor data collected by a magnetometer of the stylus, an accelerometer of the stylus, a capacitive touch element or touch-sensitive surface on the barrel of the stylus, and/or the like. For example, the sensor data is transmitted/received via BLUETOOTH connection, IEEE 802.11x connection, etc.

As one example, with reference to FIG. 7B, the electronic device 100 receives data from the stylus 203 indicating that it is being held by the hand of the user 702. As another example, the electronic device 100 receives data from the stylus 203 indicating that it is not being held by the hand of the user 702 in FIG. 7I. As yet another example, in FIG. 7D device 100 receives data from the stylus 203 indicating that the stylus 203 is experiencing a rotational movement 722 by the hand of the user 702. As yet another example, with reference to FIG. 7F, the electronic device 100 receives data from the stylus 203 indicating that the stylus 203 is detecting a tap gesture 728 from the hand of the user 702.

In some embodiments, the electronic device operates (1404) in an inactive mode while the electronic device is in the first state. Operating the electronic device in an inactive mode while in the first state enhances the operability of the electronic device and makes the electronic device more efficient, which extends the battery life of the electronic device. For example, the display of the electronic device is OFF in the first state and does not display a user interface. As one example, as illustrated in FIG. 7K, the electronic device 100 displays a lock screen 736 and provides limited functionalities, resulting in less power consumption. As another example, as illustrated in FIG. 7V, the electronic device 100 displays a home screen 746 and has no active foreground applications running, resulting in less power consumption.

In some embodiments, while the electronic device is in the first state, the electronic device displays (1406), on the display, a first interface. For example, the first interface corresponds to a lock screen. As one example, as illustrated in FIG. 7K, the electronic device 100 displays a lock screen 736 (e.g., the first interface) while operating in the first state when the stylus 203 is not held by the user. As another example, the first interface corresponds to a home screen 746, as illustrated in FIG. 7V. As yet another example, the first interface corresponds to a drawing interface 706, as illustrated in FIG. 7A.

In some embodiments, at least a portion of the information about the current state of the stylus corresponds (1408) to touch sensor data from one or more touch sensors on the stylus. Having some of the information about the current state of the stylus correspond to stylus touch-sensor data enhances the operability of the electronic device and reduces the number of inputs to the electronic device. Reducing the number of inputs makes the electronic device more efficient, which extends the battery life and reduces wear-and-tear of the electronic device. As one example, as illustrated in FIG. 7A, the electronic device 100 receives data (e.g., information) from the stylus 203 indicating that the user is not holding the stylus 203.

In accordance with a determination, based on the information about the current state of the stylus, that a user is holding the stylus, the electronic device displays (1410), on the display, a visual indication that the electronic device is in a second state that is different from the first state. For example, one or more sensors on the stylus, such as a magnetometer, an accelerometer, and a capacitive touch element or touch-sensitive surface on the barrel of the stylus, are used to make the determination. As another example, in some embodiments, in order to avoid false positives, the sensor data indicates that a user is holding the stylus based on two or more inputs (e.g., accelerometer, capacitive touch) indicating that the user is holding the stylus. As yet another example, the visual indication is a representation of a stylus, such as an icon, pencil tip, picture of an icon, etc.

As one example, as illustrated in FIGS. 7A-7C, the electronic device 100 transitions from the first state displayed in FIG. 7A to the second state displayed in FIG. 7C. In accordance with the determination that the user is holding the stylus 203 in FIG. 7B, the electronic device 100 displays the visual indicator 712 in FIG. 7C (not displayed in FIG. 7A) in order to indicate that the electronic device is in the second state.

As one example, as illustrated in FIGS. 7K-7M, the electronic device 100 transitions from the first state displayed in FIG. 7K to the second state displayed in FIG. 7M. In accordance with the determination that the user is holding the stylus 203 in FIG. 7L, the electronic device 100 displays the visual indicator 712 in FIG. 7M (not displayed in FIG. 7K) in order to indicate that the electronic device 100 is in the second state.

In some embodiments, the electronic device operates (1412) in an active mode while the electronic device is in the second state. For example, in the second state the display of the electronic device is ON and displays an interface. As one example, as illustrated in FIG. 7C, the electronic device 100 displays an enlarged canvas 710 and a visual indicator 712 while operating in the second state when the stylus 203 is held by the user.

In some embodiments, while the electronic device is in the second state, the electronic device displays (1414), on the display, a second interface different from the first interface and the visual indication that the electronic device is in the second state. Displaying a different interface based on data from the stylus enhances the operability of the electronic device and reduces the number of inputs to the electronic device. Reducing the number of inputs makes the electronic device more efficient, which extends the battery life and reduces wear-and-tear of the electronic device. For example, the second interface corresponds to a home screen or application interface. As one example, as illustrated in FIGS. 7K-7M, the electronic device 100 transitions from the first state to the second state and displays an application interface including an enlarged canvas 710 and a visual indicator 712 in FIG. 7M.

In some embodiments, the visual indication corresponds (1416) to a drawing canvas associated with a drawing application. Displaying a visual indication indicating the electronic device is in the second state based on data received from the stylus enhances the operability of the electronic device and reduces the number of inputs to the electronic device. Reducing the number of inputs makes the electronic device more efficient, which extends the battery life and reduces wear-and-tear of the electronic device. For example, as illustrated in FIG. 7M, the electronic device 100 displays an application interface including an enlarged canvas 710 and a visual indicator 712 while operating in the second state.

In some embodiments, the visual indication corresponds (1418) to an application icon associated with a drawing application. Displaying a visual indication indicating the electronic device is in the second state based on data from the stylus enhances the operability of the electronic device and reduces the number of inputs to the electronic device. Reducing the number of inputs makes the electronic device more efficient, which extends the battery life and reduces wear-and-tear of the electronic device. For example, when the application icon is selected, the electronic devices runs (e.g., executes) and displays the drawing application in the foreground. As yet another example, the electronic device ceases displaying the application icon when the stylus is no longer being held.

In some embodiments, the electronic device (1420): displays, on the display, a drawing application interface and ceases to display, on the display, one or more user interface elements associated with the drawing application interface. Ceasing to display user interface elements based on data from the stylus enhances the operability of the electronic device and reduces the number of inputs to the electronic device. Reducing the number of inputs makes the electronic device more efficient, which extends the battery life and reduces wear-and-tear of the electronic device. For example, ceasing to display the one or more user interfaces corresponds to removing a displayed toolset, such as a set of markup tools or a color palette. As one example, in response to detecting the stylus 203 being held in FIG. 7B, the electronic device 100 ceases to display the navigation region 704, the canvas region 706, and the toolbar region 708 in FIG. 7C.

In some embodiments, the visual indication corresponds (1422) to a first markup tool, wherein the first markup tool is the current active markup tool. For example, the visual indication corresponds to an image, icon, text, and the like of the current markup tool. Displaying a visual indication indicating the electronic device is in the second state based on data from the stylus enhances the operability of the electronic device and reduces the number of inputs to the electronic device. Reducing the number of inputs makes the electronic device more efficient, which extends the battery life and reduces wear-and-tear of the electronic device. As one example, as illustrated in FIG. 7C, the electronic device 100 displays a visual indicator 712 including a marker icon 716 that corresponds to the markup tool. Continuing with this example, the visual indicator 712 illustrated in FIG. 7C corresponds to a color (e.g., hue, shading, etc.) in order to indicate that marks made to the enlarged canvas 710 would be of that color. One or ordinary skill in the art will appreciate that the visual indicator 712 may include any form of indicator.

With respect to FIG. 14B: in accordance with a determination that the user is not holding the stylus, the electronic device maintains (1424) the electronic device in the first state. For example, the electronic device receiving an absence or lack of (e.g., below a threshold) data from the stylus indicates that the user is not holding the stylus. As another example, in order to conserve battery life of the stylus and/or device, the stylus provides data to the electronic device in response to the stylus detecting a particular (e.g., significant) touch input, such as a gesture input to the stylus (e.g., a tap, swipe, etc.), a manipulation of the stylus itself (e.g., roll, twirl, etc.), and the like.

As yet another example, the electronic device maintains the electronic device in the first state without displaying the visual indication indicating that the electronic device is in the second state. For example, as illustrated in FIGS. 7A-7B, the electronic device 100 maintains itself in the first state and does not display the visual indicator 712 in FIG. 7C that indicates the electronic device 100 is in the second state.

In some embodiments, the electronic device (1426): displays, on the display, a drawing application interface and displays, on the display, one or more user interface elements associated with the drawing application interface. For example, the one or more user interface elements correspond to a toolset including drawing implementations, drawing tools, a color palette, and/or the like. As another example, as illustrated in FIG. 7A, the electronic device 100 displays in the toolbar region 708 user interface elements, including drawing tools (e.g. marker, pencil, ruler) and a color palette.

In some embodiments, while the electronic device is in the second state, the electronic device (1428): obtains updated information about the current state of the stylus via the communication interface, wherein the updated information indicates that the user is no longer holding the stylus; in response to obtaining the updated information, the electronic device ceases to display, on the display, the second interface and the visual indication; and redisplays, on the display, the first interface. Ceasing to display and redisplaying interfaces based on data from the stylus enhances the operability of the electronic device and reduces the number of inputs to the electronic device. Reducing the number of inputs makes the electronic device more efficient, which extends the battery life and reduces wear-and-tear of the electronic device. For example, the first interface corresponds to a lock screen, and the second interface corresponds to drawing interface as shown in FIGS. 7M-7O. In this example, in response to detecting the stylus 203 no longer being held, the electronic device 100 ceases display of the enlarged canvas 710 and the visual indicator 712 in FIGS. 7M-7N and redisplays the lock screen in FIG. 7O displayed in FIG. 7K. As yet another example, the first interface corresponds to a first drawing interface as illustrated in FIG. 7J, and the second interface corresponds to a second drawing interface as illustrated in FIG. 7H.

In some embodiments, while the electronic device is in the second state, the electronic device (1430): obtains first finger manipulation data from the stylus via the communication interface, wherein the first finger manipulation data characterizes one or more finger manipulation inputs received at the stylus; and in response to obtaining the first finger manipulation data: changes the current active markup tool to a second markup tool; and updates the visual indication to correspond to the second markup tool. Changing the active markup tool and updating a visual indicator based on data received from the stylus enhances the operability of the electronic device and reduces the number of inputs to the electronic device. Reducing the number of inputs makes the electronic device more efficient, which extends the battery life and reduces wear-and-tear of the electronic device. For example, the one or more finger manipulation inputs correspond to a gesture made on the touch-sensitive surface of the stylus, such as a downward swipe, an upward swipe, a tap, and the like. As another example, the one or more finger manipulation inputs correspond to manipulating the stylus, such as rolling the barrel of the stylus in a clockwise or counter-clockwise manner, twirling the stylus in a clockwise or counter-clockwise manner, and the like. As yet another example, the finger manipulation data corresponds to data collected by a magnetometer of the stylus, an accelerometer of the stylus, and/or a capacitive touch element or touch-sensitive surface on the barrel of the stylus.

For example, the finger manipulation data is transmitted/received via BLUETOOTH connection, IEEE 802.11x connection, etc. In some embodiments, the finger manipulation data includes information about the movement of fingers on the stylus or movement of the stylus relative to the fingers of a user (e.g., data indicating how the fingers and/or stylus moved). In some embodiments, the finger manipulation data includes a processed representation of the movement of fingers on the stylus or movement of the stylus relative to the fingers of a user. The processed representation can indicate a gesture or manipulation performed at the stylus such as a swipe or rotation gesture, optionally including information indicating a direction and/or magnitude of the gesture or movement.

As one example, in response to receiving data indicative of a tap gesture at the stylus 203 in FIG. 7F, the electronic device 100 updates the visual indicator 712 from a marker 714 in FIG. 7F to a pencil 730 in FIG. 7G. As another example, the user can scan through a list of markup tools by rolling the stylus. For example, the list of markup tools corresponds to a custom list of tools, default list of tools, most recently and/or frequently used tools, etc.

With reference to FIG. 14C, in some embodiments, while the electronic device is in the second state, the electronic device (1432): obtains first finger manipulation data from the stylus via the communication interface, wherein the first finger manipulation data characterizes an upward swipe gesture received on the stylus; and in response to obtaining the first finger manipulation data, display, on the display, a color palette adjacent to the visual indication. Displaying a color palette based on data from the stylus enhances the operability of the electronic device and reduces the number of inputs to the electronic device. Reducing the number of inputs makes the electronic device more efficient, which extends the battery life and reduces wear-and-tear of the electronic device. For example, the color palette corresponds to a user interface region with a plurality of different colors that are available for selection, such as a color wheel, a grid with different color regions, list of colors, or the like. As one example, in FIG. 7C the electronic device 100 receives data from the stylus 203 indicative of a detected downward swipe gesture 718, and the electronic device 100 displays a color palette 720 adjacent to the visual indicator 712 in FIG. 7D. Continuing with this example, in response to receiving data indicative of a rotational manipulation (e.g., roll) of the stylus 203 in FIG. 7D, the electronic device 100 updates the visual indicator 712 from a marker 714 with a solid tip 716 in FIG. 7D to a marker 714 with a striped tip 724 in FIG. 7E.

In some embodiments, while the electronic device is in the second state, the electronic device (1434): obtains second finger manipulation data from the stylus via the communication interface, wherein the second finger manipulation data characterizes a rotational gesture received at the stylus; and in response to obtaining the second finger manipulation data: changes a color associated with the current active markup tool; and updates the visual indication to correspond to the color. Updating the color associated with the active markup tool and the visual indication based on data from the stylus enhances the operability of the electronic device and reduces the number of inputs to the electronic device. Reducing the number of inputs makes the electronic device more efficient, which extends the battery life and reduces wear-and-tear of the electronic device. For example, in order to change the color and update the visual indication at the electronic device, the rotation of the stylus is more than a threshold angular distance and/or by more than a threshold angular velocity. For example, the electronic device displays a first indicator (e.g., a star) next to a selected color and/or a second indicator (e.g., a ring) around the selected color. For example, the electronic device displays a color icon that changes color. In this example, the electronic device increases the size of icon that corresponds to the currently selected color.

As one example, in response to receiving data indicative of a rotational manipulation 722 (e.g., roll) of the stylus 203 in FIG. 7D, the electronic device 100 ceases to display the solid fill indicator 720a having focus and displays the diagonal fill indicator 720b having focus in FIG. 7E. As another example, rolling the stylus 203 in one direction (e.g., clockwise) moves the focus downward (e.g., from 720a to 720b), while rolling the stylus 203 in the other direction (e.g., counter-clockwise) moves the focus downward (e.g., from 720b to 720a). One or ordinary skill in the art will appreciate that how the nature (e.g., direction) of rotation of the stylus affects the user interface may vary.

In some embodiments, while the electronic device is in the second state, the electronic device (1436): obtains third finger manipulation data from the stylus via the communication interface, wherein the third finger manipulation data characterizes a downward swipe gesture received at the stylus; and in response to obtaining the third finger manipulation data, removes display of the color palette on the display. Removing the color palette based on data from the stylus enhances the operability of the electronic device and reduces the number of inputs to the electronic device. Reducing the number of inputs makes the electronic device more efficient, which extends the battery life and reduces wear-and-tear of the electronic device. As one example, in response to receiving data indicative of an upward swipe gesture 726 at the stylus 203 in FIG. 7E, the electronic device 100 ceases to display the color palette 720 in FIG. 7F.

It should be understood that the particular order in which the operations in FIGS. 14A-14C have been described is merely an example and is not intended to indicate that the described order is the only order in which the operations could be performed. One of ordinary skill in the art would recognize various ways to reorder the operations described herein.

The operations described above with reference to FIGS. 14A-14C are, optionally, implemented by components depicted in FIGS. 1A-1B. For example, obtaining operation 1402, determining operations 1410 and 1424, and displaying operations 1406, 1414, 1420, and 1426, are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186 and determines whether a first contact (or near contact) at a first location on the touch-sensitive surface (or whether rotation of the electronic device) corresponds to a predefined event or sub-event, such as selection of an object on a user interface, or rotation of the electronic device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Note that details of the processes described above with respect to method 1400 are also applicable in an analogous manner to other methods described herein (e.g., 1500, 1600, 1700, 1800, 1900, 2400, 2500, 2600, 2700). For example, the stylus, stylus states, touch-sensitive surface, display, and communications interface described above with reference to method 1400 optionally have one or more of the properties of the stylus, stylus states, touch-sensitive surface, display, and communications interface described herein with reference to other methods described herein (e.g., 1500, 1600, 1700, 1800, 1900, 2400, 2500, 2600, 2700).

FIGS. 15A-15B is a flow diagram illustrating a method 1500 of changing stylus functionality in accordance with some embodiments. The method 1500 is performed at an electronic device (e.g., the electronic device 300 in FIG. 3, or the portable multifunction device 100 in FIG. 1A) with a touch-sensitive surface, a display, and a communication interface provided to communicate with a stylus (e.g., a BLUETOOTH interface). In some embodiments, the touch-sensitive surface and display are combined into a touch screen display (e.g., a mobile phone or tablet). In some embodiments, the touch-sensitive surface and display are separate (e.g., a laptop or desktop computer with a separate touchpad and display). Some operations in the method 1500 are, optionally, combined and/or the order of some operations is, optionally, changed.

Changing stylus functionality based on sensor data from the stylus reduces the number of inputs needed to perform the change in stylus functionality. This reduction in inputs enhances the operability of the electronic device and makes the electronic device interface more efficient (e.g., by helping the user to provide proper inputs and reducing user mistakes when operating/interacting with the electronic device) which, additionally, reduces power usage and wear-and-tear of the electronic device.

The method 1500 contemplates the electronic device utilizing data received from a stylus in order to exploit the myriad of detectable input types at the stylus as well as the orientation of the stylus relative to the electronic device. For example, the electronic device receives data from the stylus indicative of the manner in which the stylus is being held (e.g., the grip arrangement). Because of the intricate varied hand-manipulation capabilities of the user, the stylus can detect many types of user inputs. The stylus provides data to the electronic device indicative of these user inputs. Accordingly, the method 1500 contemplates the electronic device receiving various of types of data from the stylus indicative of the various user inputs detected at the stylus. Additionally, the method 1500 contemplates that the data received includes information about the orientation of the stylus relative to the electronic device.

This enhances the operability of the electronic device and makes the electronic device interface more efficient and robust. As noted above, the user can provide a variety of input types to the stylus (e.g., grip arrangement) and can change the orientation of the stylus (e.g., which end of the stylus is making contact with the electronic device). Current systems, on the other hand, contemplate that the touch-sensitive surface of the electronic device receives a single type of input: touch inputs from the finger(s) of a user. A single input type limits a user's ability to interact with the electronic device and can lead to erroneous user inputs. Accordingly, a shift in at least some of the inputs from finger-touch inputs to the aforementioned stylus inputs provides a more efficient user interface with the electronic device and can reduce the number of mistaken inputs registered at the electronic device. Additionally, this shift to fewer finger-touch inputs at the touch-sensitive surface of the electronic device reduces wear-and-tear of and power usage of the electronic device. This improves battery life of the electronic device by enabling the user to use the electronic device more quickly and efficiently. For battery-operated electronic devices, enabling a user to enter fewer inputs on the touch-sensitive surface of the electronic device conserves power and increases the time between battery charges of the electronic device.

With reference to FIG. 15A, the electronic device 100 detects (1502) an input, from the stylus, on the touch-sensitive surface of the electronic device. As one example, with reference to FIGS. 8A-8B, the electronic device 100 detects an input 810 that corresponds to a contact vector between the stylus 203 and the touch-sensitive surface of the electronic device 100 (e.g., a drawing stroke or mark).

In some embodiments, the electronic device (1504): obtains sensor data from the stylus; and determines, based on the sensor data from the stylus, a grip arrangement characterizing a manipulation of the stylus by a user, wherein the grip arrangement is determined during detection of the input. Obtaining grip arrangement data in order to affect operations performed by the electronic device enhances the operability of the electronic device and reduces the number of inputs to the electronic device. Reducing the number of inputs makes the electronic device more efficient, which extends the battery life and reduces wear-and-tear of the electronic device. For example, the sensor data corresponds to data collected by a magnetometer of the stylus 203, an accelerometer of the stylus 203, a capacitive touch element or touch-sensitive surface on the barrel of the stylus 203 (e.g., the touch-sensitive surface 275 of the stylus 203 as shown in FIGS. 2 and 5A-5B), and/or the like. In some embodiments, the sensor data is transmitted from the stylus 203 to the electronic device 100 via a BLUETOOTH connection, IEEE 802.11x connection, and/or the like.

As one example, the user holds the stylus 203 near the tip 276 with the tip 276 pointed toward the electronic device 100 to make marks associated with a pen markup tool (e.g., as shown in FIGS. 8A-8B). As another example, the user holds the stylus 203 near the end 277 opposite the tip 276 with the tip 276 pointed toward the electronic device 100 to make marks associated with a paintbrush markup tool (e.g., as shown in FIGS. 8C-8D). As yet another example, the user holds the stylus 203 near the end 277 opposite the tip 276 with the tip 276 pointed away from the electronic device 100 to make marks associated with an eraser markup tool (e.g., as shown in FIGS. 8E-8F). As yet another example, the user holds the stylus 203 near the tip 276 with the tip 276 pointed away from the electronic device 100 to make marks associated with a smudge or spray paint markup tool (e.g., as shown in FIGS. 8G-8H).

As one example, with reference to FIGS. 8A-8B, the electronic device 100 determines, based on sensor data from the stylus 203, that the user is holding the stylus 203 in his/her hand 802 according to a first grip arrangement 815 that corresponds to holding the stylus 203 in a right-side-up orientation (e.g., the tip 276 of the stylus 203 pointed towards the electronic device 100) with the fingers of the hand 802 near the tip of the stylus 203. In this example, with references to FIGS. 8A-8B, the electronic device 100 determines that the user is holding the stylus 203 in his/her hand 802 according to a first grip arrangement 815 while the input 810 is detected via the touch-sensitive surface of the electronic device 100 (e.g., a drawing stroke or mark). As another example, with reference to FIGS. 8C-8D, the electronic device 100 determines, based on sensor data from the stylus 203, that the user is holding the stylus 203 in his/her hand 802 according to a second grip arrangement 835 that corresponds to holding the stylus 203 in a right-side-up orientation (e.g., the tip 276 of the stylus 203 pointed towards the electronic device 100) with the fingers of the hand 802 near the end 277 of the stylus 203 opposite the tip 276 of the stylus 203.

In some embodiments, the grip arrangement is determined (1506) based on at least one of a grip style, a grip location, or orientation of the stylus relative to a frame of reference. Obtaining grip arrangement data in order to affect operations performed by the electronic device enhances the operability of the electronic device and reduces the number of inputs to the electronic device. Reducing the number of inputs makes the electronic device more efficient, which extends the battery life and reduces wear-and-tear of the electronic device. For example, the grip style corresponds to locations of points of contact on the stylus (e.g., location of different fingers) relative to each other. For example, the grip location corresponds to locations of points of contact on the stylus relative to the stylus (e.g., fingers are near the end of the stylus). For example, the orientation of the stylus corresponds to the position of the stylus relative to the electronic device, gravity, and/or the Earth's magnetic field.

In some embodiments, the grip style is determined at least in part based on the touch inputs making contact with the stylus, such as how many fingers are on the stylus, which fingers are on the stylus, the pinch grip or first grip, etc. In some embodiments, the grip location is determined at least in part based on the location of the grip (e.g., the touch inputs) relative to the stylus. For example, the grip location includes the location of the touch inputs on the stylus (e.g., near tip of stylus or near base of stylus). In some embodiments, the grip style is determined at least in part based on the orientation of the stylus relative to the electronic device (e.g., right-side up or upside-down).

As one example, with reference to FIGS. 8A-8B, the electronic device 100 determines a first grip arrangement 815. The first grip arrangement 815 corresponds to holding the stylus 203 in a right-side-up orientation (e.g., the tip 276 of the stylus 203 pointed towards the electronic device 100) with the fingers of the hand 802 near the tip 276 of the stylus 203. As another example, with reference to FIGS. 8E-8F, the electronic device 100 determines a third grip arrangement 855. The third grip arrangement 855 corresponds to holding the stylus 203 in an upside-down orientation (e.g., the tip 276 of the stylus 203 pointed away from the electronic device 100) near the end 277 of the stylus 203 opposite the tip 276 of the stylus 203. As yet another example, with reference to FIGS. 8G-8H, the electronic device 100 determines a fourth grip arrangement 875 corresponds to holding the stylus 203 in an upside-down orientation (e.g., the tip 276 of the stylus 203 pointed away from the electronic device 100) near the tip 276 of the stylus 203.

In some embodiments, at least a portion of the sensor data corresponds (1508) to touch sensor data obtained from one or more touch sensors on the stylus. Obtaining sensor data from the stylus in order to affect operations performed by the electronic device enhances the operability of the electronic device and reduces the number of inputs to the electronic device. Reducing the number of inputs makes the electronic device more efficient, which extends the battery life and reduces wear-and-tear of the electronic device. For example, the grip style and/or grip location are determined based on the portion of the sensor data indicative of a location of touches detected on a touch-sensitive surface of the stylus. As one example, with reference to FIGS. 8A-8B, the electronic device 100 determines the first grip arrangement 815 based sensor data received from the stylus 203 indicating that the stylus 203 is being held in a right-side-up orientation (e.g., the tip 276 of the stylus 203 pointed towards the electronic device 100), with the fingers of the hand 802 holding the stylus 203 near the tip 276 of the stylus 203.

In response to detecting the input, and in accordance with a determination that the stylus is being held according to a first grip arrangement, where the first grip arrangement of the stylus is determined based at least in part on sensor data detected by the stylus, the electronic device makes (1510) a first change to content displayed on the display. For example, sensors at the stylus (e.g., capacitive-touch sensor, accelerometer, magnetometer, or gyroscope) detect the first grip arrangement. For example, the first change corresponds to drawing a line with paintbrush/pencil/spray-paint/etc., squirting, erasing, etc. For example, the first change is associated with a first markup tool corresponding to the first grip arrangement.

As one example, with reference to FIGS. 8A-8B, the electronic device 100 detects an input 810 and determines a first grip arrangement 815 based at least in part on sensor data detected by the stylus 203. As a result, in FIG. 8B the electronic device 100 makes a first change 820 to the user interface 800 (e.g., a stroke or mark) based on the input 810.

In some embodiments, making the first change includes (1512) displaying a first user element based on a first markup tool that corresponds to the first grip arrangement. Displaying a user element based on grip arrangement data from the stylus enhances the operability of the electronic device and reduces the number of inputs to the electronic device. Reducing the number of inputs makes the electronic device more efficient, which extends the battery life and reduces wear-and-tear of the electronic device. For example, the first grip arrangement (e.g., right-side up stylus orientation, grip location near the end of the stylus relative to the electronic device) invokes a writing markup tool (e.g., a pencil, marker, etc.). As one example, with reference to FIGS. 8A-8B, the electronic device 100 makes the first change 820 based on a first markup tool that corresponds to the first grip arrangement 815 (e.g., the felt-tip marker).

In some embodiments, making the first change includes (1514) changing an existing mark displayed on the display based on a first markup tool that corresponds to the first grip arrangement. Changing an existing mark based on grip arrangement data from the stylus enhances the operability of the electronic device and reduces the number of inputs to the electronic device. Reducing the number of inputs makes the electronic device more efficient, which extends the battery life and reduces wear-and-tear of the electronic device. For example, the first grip arrangement (e.g., upside-down stylus orientation, grip location near bottom of stylus relative to the electronic device) invokes an eraser markup tool.

As one example, with reference to FIGS. 8E-8F, the electronic device 100 detects an input 810 and determines a third grip arrangement 855 based at least in part on sensor data detected by the stylus 203. The third grip arrangement 855 corresponds to a third markup tool (e.g., the eraser), as indicated by the eraser indicator 852. As a result, in FIG. 8F the electronic device 100 makes a change to the existing mark 804 by displaying a white stroke/mark 860 (e.g., erasing) corresponding to the input 810 in place a portion the existing mark 804.

In some embodiments, the first grip arrangement is detected (1516) based on the stylus being detected in a right-side-up orientation of the stylus and touch inputs being detected near a first end of the stylus and making the first change includes displaying a stroke on the display based on a writing tool that corresponds to the first grip arrangement. Making a change to displayed content based on grip arrangement data from the stylus enhances the operability of the electronic device and reduces the number of inputs to the electronic device. Reducing the number of inputs makes the electronic device more efficient, which extends the battery life and reduces wear-and-tear of the electronic device. For example, the right-side up orientation is based on a physical property of the stylus, such as the tip of the stylus being pointed upward. For example, the first end of the stylus corresponds to the writing tip of the stylus. For example, the first grip arrangement corresponds to a pencil, pen, marker, etc.

As one example, with reference to FIGS. 8A-8B, the electronic device 100 determines, based on sensor data from the stylus 203, that the user is holding the stylus 203 in a right-side-up orientation (e.g., the tip of the stylus 203 pointed towards the electronic device 100) with the fingers of the hand 802 near the tip of the stylus 203. Accordingly, in response to the input 810, in FIG. 8B the electronic device 100 makes a first change 820 that corresponds to displaying a stroke on the display according to the mark-up tool (e.g., felt-tip marker) indicated by indicator 812.

With reference to FIG. 15B, in response to detecting the input, and in accordance with a determination that the stylus is being held according to a second grip arrangement different from the first grip arrangement, where the second grip arrangement of the stylus is determined based at least in part on sensor data detected by the stylus, the electronic device makes (1518) a second change to the content displayed on the display, where the second change to the content displayed on the display is different from the first change to the content displayed on the display. This can reduce wear-and-tear and battery consumption of the electronic device because a change to the user interface is made without an additional touch to the touch-sensitive surface of the electronic device. For example, sensors at the stylus (e.g., capacitive-touch sensor, accelerometer, magnetometer, or gyroscope) detect the second grip arrangement. For example, the second change corresponds to drawing a line with paintbrush/pencil/spray-paint/etc., squirting, erasing, etc. For example, the first second is associated with a second markup tool corresponding to the second grip arrangement.

As one example, with reference to FIGS. 8C-8D, based at least in part on sensor data received from the stylus 203, the electronic device 100 determines that the stylus is held according to a second grip arrangement 835. The second grip arrangement 835 is different than the first grip arrangement 815 in FIG. 8B. Accordingly, in response to detecting the input 810, in FIG. 8D the electronic device 100 makes a second change 840 to the user interface 800 (e.g., a stroke or mark). The second change 840 is different than the first change 830 in FIG. 8B.

In some embodiments, making the second change includes (1520) displaying a second user element based on a second markup tool that corresponds to the second grip arrangement. Changing displayed content based on grip arrangement data from the stylus enhances the operability of the electronic device and reduces the number of inputs to the electronic device. Reducing the number of inputs makes the electronic device more efficient, which extends the battery life and reduces wear-and-tear of the electronic device. For example, the second grip arrangement (e.g., right-side up stylus orientation, grip location near top of stylus relative to the electronic device) invokes a painting markup tool (e.g., paint brush, etc.). As an example, with reference to FIGS. 8A-8B, the electronic device 100 determines a first grip arrangement 815. The electronic device 100 determines that the first grip arrangement 815 corresponds to a felt-tip marker markup tool and displays an indicator 812 indicating the same. As a result, in response to detecting the input 810, the electronic device 100 makes a first change 820 that corresponds to a felt-tip marker stroke. As another example, with reference to FIGS. 8C-8D, the electronic device 100 determines a second grip arrangement 835. The electronic device 100 determines that the second grip arrangement 835 corresponds to a paintbrush markup tool and displays an indicator 832 indicating the same. As a result, in response to detecting the input 810, the electronic device 100 makes a second change 840 that corresponds to a paintbrush stroke.

In some embodiments, making the second change includes (1522) changing the existing mark displayed on the display based on a second markup tool that corresponds to the second grip arrangement. Changing an existing mark based on grip arrangement data from the stylus enhances the operability of the electronic device and reduces the number of inputs to the electronic device. Reducing the number of inputs makes the electronic device more efficient, which extends the battery life and reduces wear-and-tear of the electronic device. For example, the second grip arrangement (e.g., upside-down stylus orientation, grip location near top of stylus relative to the electronic device) invokes a smudge markup tool.

As an example, with reference to FIGS. 8E-8F, the electronic device 100 determines a third grip arrangement 855. The electronic device 100 determines that the third grip arrangement 855 corresponds to an eraser markup tool and displays an indicator 852 indicating the same. As a result, in response to detecting the input 810, the electronic device 100 changes the existing mark 804 by displaying a white stroke 860 over (e.g., erasing) the existing mark 804.

In some embodiments, the second grip arrangement is detected (1524) based on the stylus being detected in an upside-down orientation of the stylus and touch inputs being detected near a second end of the stylus different from the first end of the stylus and making the second change includes removing an existing mark displayed on the display based on an erasing tool that corresponds to the second grip arrangement. Changing displayed content based on grip arrangement data from the stylus enhances the operability of the electronic device and reduces the number of inputs to the electronic device. Reducing the number of inputs makes the electronic device more efficient, which extends the battery life and reduces wear-and-tear of the electronic device. For example, the upside-down orientation is based on a physical property of the stylus, such as the tip of the stylus being pointed downward towards the electronic device. For example, the second end corresponds to the eraser tip of the stylus, or the end opposite the writing tip of the stylus.

As one example, with reference to FIGS. 8E-8F, the electronic device 100, based at least in part on data received from the stylus 203, determines that the stylus 203 is being held according to a third grip arrangement 855. The third grip arrangement 855 corresponds to the stylus 203 being held in an upside-down orientation (e.g., the tip 276 of the stylus 203 pointed away from the electronic device 100), near the end 277 of the stylus 203 opposite the tip 276 of the stylus 203. The electronic device 100 determines that the third grip arrangement 855 corresponds to an eraser markup tool and displays an indicator 852 indicating the same. As a result, in response to detecting the input 810, the electronic device 100 changes the existing mark 804 by displaying a white stroke 860 over (e.g., erasing) the existing mark 804.

In some embodiments, the second grip arrangement is detected (1526) based on the stylus being detected in a right-side up orientation of the stylus and touch inputs being detected near a second end of the stylus, and making the second change includes displaying a stroke based on a painting tool that corresponds to the first grip arrangement.

Changing displayed content based on grip arrangement data from the stylus enhances the operability of the electronic device and reduces the number of inputs to the electronic device. Reducing the number of inputs makes the electronic device more efficient, which extends the battery life and reduces wear-and-tear of the electronic device. For example, the second end of the stylus corresponds to the eraser tip of the stylus or the end opposite the writing tip of the stylus. For example, the painting tool corresponds to a pencil, pen, marker, etc.

As an example, with reference to FIGS. 8C-8D, the electronic device 100 determines a second grip arrangement 835. The second grip arrangement 835 corresponds to holding the stylus 203 in a right-side-up orientation (e.g., the tip 276 of the stylus 203 pointed towards the electronic device 100) with the fingers of the hand 802 near the end 277 of the stylus 203 opposite the tip 276 of the stylus 203. The electronic device 100 determines that the second grip arrangement 835 corresponds to a paintbrush, as indicated by the indicator 832. As a result, in response to detecting the input 810, the electronic device 100 makes a second change 840 that corresponds to displaying a paintbrush stroke 840.

In some embodiments, the second grip arrangement is detected (1528) based on the stylus being detected in an upside-down orientation of the stylus and touch inputs being detected near the first end of the stylus, and making the second change includes changing an existing mark displayed on the display based on a smudge tool that corresponds to the second grip arrangement. Changing displayed content based on grip arrangement data from the stylus enhances the operability of the electronic device and reduces the number of inputs to the electronic device. Reducing the number of inputs makes the electronic device more efficient, which extends the battery life and reduces wear-and-tear of the electronic device. For example, the first end of the stylus corresponds to the writing tip of the stylus.

It should be understood that the particular order in which the operations in FIGS. 15A-15B have been described is merely an example and is not intended to indicate that the described order is the only order in which the operations could be performed. One of ordinary skill in the art would recognize various ways to reorder the operations described herein.

The operations described above with reference to FIGS. 15A-15B are, optionally, implemented by components depicted in FIGS. 1A-1B. For example, detecting operation 1502, obtaining and determining operations 1504, and making operations 1510 and 1518 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186 and determines whether a first contact (or near contact) at a first location on the touch-sensitive surface (or whether rotation of the electronic device) corresponds to a predefined event or sub-event, such as selection of an object on a user interface, or rotation of the electronic device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Note that details of the processes described above with respect to method 1500 are also applicable in an analogous manner to other methods described herein (e.g., 1400, 1600, 1700, 1800, 1900, 2400, 2500, 2600, 2700). For example, the stylus, grip arrangements, display, touch-sensitive surface, and communication interface described above with reference to method 1500 optionally have one or more of the properties of the stylus, grip arrangements, display, touch-sensitive surface, and communication interface described herein with reference to other methods described herein (e.g., 1400, 1600, 1700, 1800, 1900, 2400, 2500, 2600, 2700).

Figure 16B:
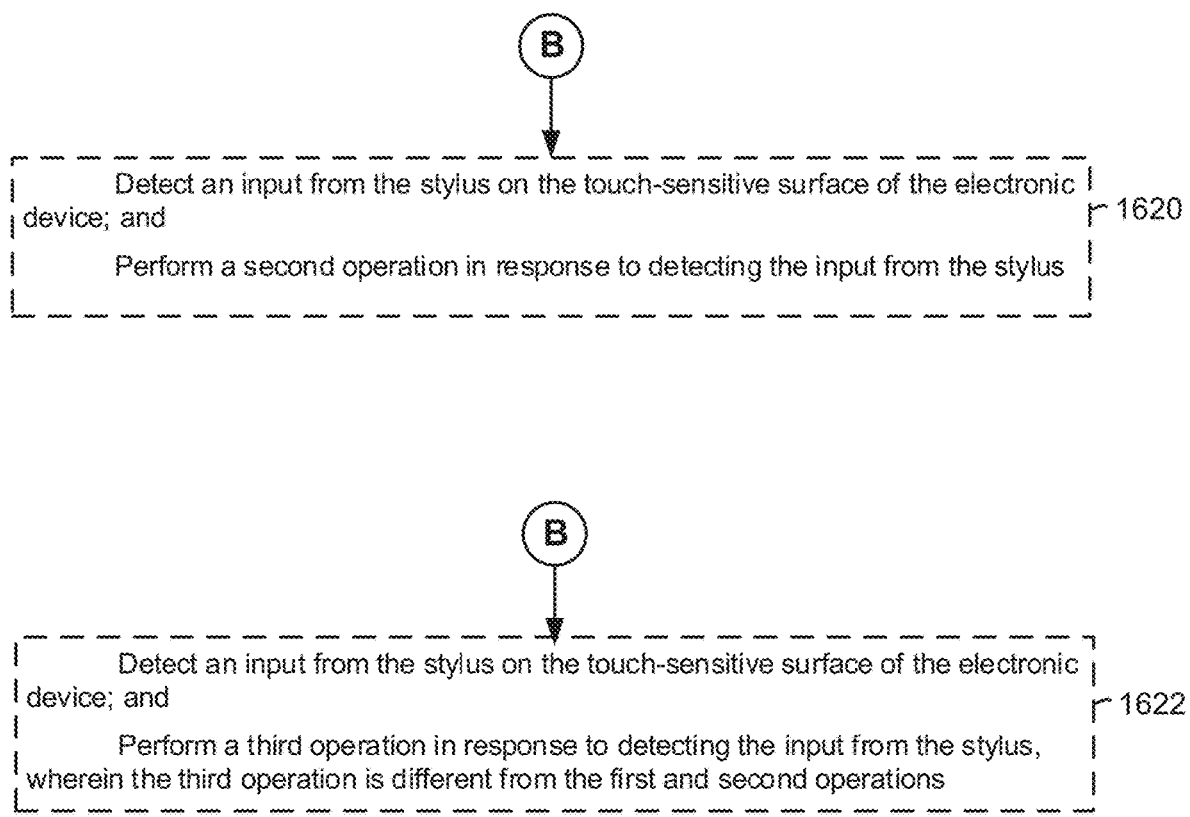

FIGS. 16A-16B is a flow diagram illustrating a method 1600 of modifying touch input functionality in accordance with some embodiments in accordance with some embodiments. The method 1600 is performed at an electronic device (e.g., the electronic device 300 in FIG. 3, or the portable multifunction device 100 in FIG. 1A) with a touch-sensitive surface, a display, and a communication interface provided to communicate with a stylus (e.g., a BLUETOOTH interface). In some embodiments, the touch-sensitive surface and display are combined into a touch screen display (e.g., a mobile phone or tablet). In some embodiments, the touch-sensitive surface and display are separate (e.g., a laptop or desktop computer with a separate touchpad and display). Some operations in the method 1600 are, optionally, combined and/or the order of some operations is, optionally, changed.

Modifying touch input functionality based on sensor data from the stylus reduces the number of inputs needed to perform the change in stylus functionality. This reduction in inputs enhances the operability of the electronic device and makes the electronic device interface more efficient (e.g., by helping the user to provide proper inputs and reducing user mistakes when operating/interacting with the electronic device) which, additionally, reduces power usage and wear-and-tear of the electronic device.

The method 1600 contemplates the electronic device utilizing data received from a stylus and/or a lack of data received from the stylus. The stylus detects inputs from the hand of the user while the user is holding the stylus and detects inputs while the user is not holding the stylus. This enhances the operability of the electronic device and makes the electronic device interface more efficient and robust. Namely, the functionality of a touch input to the electronic device depends on whether the stylus is being held by the user, as indicated by data received from the stylus and/or lack thereof. In other words, the electronic device can perform multiple functions in response to detecting a particular touch input to touch-sensitive surface of the electronic device.

Accordingly, the method 1600 realizes a richer set of functionalities as compared with current systems in which the electronic device performs a single operation in response to detecting a particular touch input to touch-sensitive surface of the electronic device. The single operation contemplated in current systems limits a user's ability to interact with the electronic device and can lead to erroneous user inputs. Accordingly, expanding the functionality resulting from a particular touch input based on the whether the stylus is being held provides a more efficient user interface with the electronic device, and can reduce the number of mistaken inputs registered at the electronic device. Additionally, this reduces wear-and-tear of and power usage of the electronic device. This improves battery life of the electronic device by enabling the user to use the electronic device more quickly and efficiently. For battery-operated electronic devices, enabling a user to enter fewer inputs on the touch-sensitive surface of the electronic device conserves power and increases the time between battery charges of the electronic device.

With reference to FIG. 16A, the electronic device 100 detects (1602) a touch input on the touch-sensitive surface. For example, the touch input corresponds to a finger touch input, such as a tap, swipe, gesture, etc. As one example, with reference to FIG. 9A, the electronic device 100 detects a leftward swipe gesture 908 made by a finger of the hand of the user 902. As another example, with reference to FIG. 9I, the electronic device 100 detects a loop gesture 916 (e.g., lasso gesture) that encloses the content 904.

In some embodiments, the electronic device obtains (1604) sensor data from the stylus via the communication interface, and at least a portion of the sensor data corresponds to touch sensor data from one or more touch sensors on the stylus. Obtaining sensor data from the stylus in order to affect touch input functionality enhances the operability of the electronic device and reduces the number of inputs to the electronic device. Reducing the number of inputs makes the electronic device more efficient, which extends the battery life and reduces wear-and-tear of the electronic device. For example, the sensor data corresponds to a capacitive touch element or touch-sensitive surface on the barrel of the stylus. For example, the sensor data is transmitted/received via BLUETOOTH connection, IEEE 802.11x connection, etc. As one example, with reference to FIG. 9H, the electronic device 100 obtains sensor data from the stylus 203 indicating that the stylus 203 is not being held by the hand of the user 902. As another example, with reference to FIG. 9A, the electronic device 100 obtains sensor data from the stylus 203 indicating that the stylus 203 is being held by the hand of the user 902.

In response to detecting the touch input on the touch-sensitive surface, and in accordance with a determination that sensor data obtained from the stylus via the communication interface indicates that the stylus is being held by a user, the electronic device performs (1606) a first operation in response to the touch input. For example, the electronic device determines that the stylus is being held based on data obtained from the stylus indicating that the stylus is detecting that one or more fingers are making contact with the stylus. For example, the first operation is performed based on the directionality, speed, acceleration, displacement, etc. of the touch input.

As one example, with reference to FIGS. 9A-9B, the electronic device 100 performs an undo/erase operation of content 904 responsive to detecting a leftward swipe gesture 908, and according to a determination, based on data obtained from the stylus 203, that the stylus 203 is being held by the hand of the user 902. As another example, with reference to FIGS. 9F-9H, the electronic device 100 performs selection and move operations of content 904. In this example, responsive to detecting a loop gesture 916 and a subsequent dragging gesture 922 with respect to the content 904, and according to a determination, based on data obtained from the stylus 203, that the stylus 203 is being held by the hand of the user 902, the electronic device 100 selects and moves the content 904 according to the dragging gesture 922.

In some embodiments, the electronic device performs (1608) the first operation that includes modifying one or more preexisting user interface elements displayed on the display. Modifying preexisting user interface elements based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, modifying the user elements includes copying and pasting marks/objects/text, cutting and pasting marks/objects/text, undoing and redoing marks/objects/text, erasing marks/objects/text, or a combination thereof. For example, the first operation corresponds to lassoing/selecting a mark/object/text in order to move them to a different location (e.g., the first operation corresponds to a cut and paste operation or a copy and paste operation) and/or in order to change their appearance.

As one example, with reference to FIGS. 9A-9C, the first operation corresponds to the electronic device 100 performing an erase/undo operation with respect to content 904 in response to detecting the leftward swipe gesture 908. Continuing with this example, the first operation corresponds to the electronic device 100 performing a redo operation with respect to the content 904 in response to detecting the rightward swipe gesture 910. As another example, with reference to FIGS. 9F-9G, the first operation corresponds to the electronic device 100 performing a selection operation with respect to content 904 in response to detecting the loop gesture 916. As yet another example, with reference to FIGS. 9K-9L, the first operation corresponds to the electronic device 100 performing, as is illustrated in FIG. 9L, a selection operation with respect to the selected text 940 in response to detecting a rightward swipe gesture 938 in FIG. 9K.

In some embodiments, in accordance with a determination that sensor data obtained from the stylus via the communication interface indicates that the stylus is being held by the user with a different hand than the one that corresponds to the touch input, the electronic device performs (1610) the second operation in response to the touch input. Performing the second operation based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, the second operation corresponds to a spray-can operation, ink blot operation, grid-line placement operation, ruler operation, etc. In some embodiments, the electronic device distinguishes between the hand holding the stylus and the hand making the touch input based on a proximity (e.g., nearness) determination. For example, the electronic device determines the stylus is being held by the user with a different hand than the one that corresponds to the touch input based on a determination that the stylus is at least a threshold distance from the electronic device. For example, the electronic device determines the proximity of the stylus to the electronic device based on data received from the stylus, sensor data generated at the electronic device, or a combination thereof.

In response to detecting the touch input on the touch-sensitive surface, and in accordance with a determination that the stylus is not being held by the user, the electronic device performs (1612) a second operation in response to the touch input, and the second operation is different from the first operation. This can reduce wear-and-tear and extend battery life because the electronic device need not detect first and second touch inputs in order to perform the first and second operations. For example, the second operation is performed based on the directionality, speed, acceleration, displacement, etc. of the touch input.

In some embodiments, the electronic device determines that the stylus is not being held based on the absence of sensor data, such as the stylus not having been paired with the electronic device. In some embodiments, in order to save battery life and reduce processing, the stylus provides sensor data when it undergoes changes/events rather than providing sensor data constantly. In some embodiments, the electronic device determines that the stylus is not being held based on the data received from the stylus. For example, the electronic device receives data from the stylus indicating that the stylus is not being held based on the stylus detecting lift-off of contacts from the stylus.

As one example, with reference to FIGS. 9D-9E, the second operation corresponds to the electronic device 100 performing a display operation. Namely, the electronic device 100 displays mark 914 in response to detecting the leftward swipe gesture 908. As another example, with reference to FIGS. 9N-9P, the second operation corresponds to the electronic device 100 performing a highlight operation with respect to the highlighted text 950 responsive to detecting the rightward swipe gesture 938. Continuing with this example, the second operation corresponds to the electronic device 100 performing a display operation of mark 954 responsive to detecting the dragging gesture 942.

In some embodiments, determining that the stylus is not being held by the user includes (1614) detecting an absence of sensor data from the stylus. Performing a second operation based on an absence of sensor data from the stylus enhances the operability of the electronic device and reduces the number of inputs to the electronic device. Reducing the number of inputs makes the electronic device more efficient, which extends the battery life and reduces wear-and-tear of the electronic device.

In some embodiments, performing the second operation includes (1616) displaying one or more user interface elements on the display. Displaying user interface elements based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, the second operation includes displaying new marks/objects/text, highlighting existing marks/objects/text, marking-up existing mark/objects/text, etc. As one example, with reference to FIGS. 9D-9E, the electronic device 100 performs a second operation that includes displaying, in FIG. 9E, a mark 914 in response to detecting a corresponding leftward swipe gesture 908 in FIG. 9D. As another example, with reference to FIGS. 9I-9J, the electronic device 100 performs a second operation that includes displaying, in FIG. 9J, a mark 934 in response to detecting the loop gesture 916 detected in FIG. 9I. As yet another example, with reference to FIGS. 9N-9O, the electronic device 100 performs a second operation that includes highlighting, in FIG. 9O, the highlighted text 950 in response to detecting a rightward swipe gesture 938 corresponding to the highlighted text 950 in FIG. 9N.

In some embodiments, performing the second operation includes (1618) navigating within a user interface displayed on the display. For example, the second operation includes panning and/or zooming a canvas. Navigating within the user interface based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, the second operation corresponds to navigating through user interface elements, such as markup tools (e.g., pen, marker, pencil, ruler, etc.). As one example, with reference to FIG. 9O, the electronic device 100 performs a second operation that includes zooming into the highlighted text 950 or re-centering the text 936 (not shown).

With reference to FIG. 16B, in some embodiments, the electronic device (1620): detects an input from the stylus on the touch-sensitive surface of the electronic device and performs the second operation in response to detecting the input from the stylus. Performing the second operation based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, the second operation corresponds to drawing a line. As one example, with reference to FIGS. 9I-9J, the electronic device 100 performs a second operation of displaying, in FIG. 9J, a mark 904 in response to detecting loop input 916 in FIG. 9I. Continuing with this example, unlike as is illustrated in FIG. 9I, the stylus 203 (and not the hand of the user 902) makes the loop input 916 on the touch-sensitive surface of the electronic device 100.

In some embodiments, the electronic device (1622): detects an input from the stylus on the touch-sensitive surface of the electronic device and performs a third operation in response to detecting the input from the stylus, and the third operation is different from the first and second operations. Performing the third operation based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, the third operation corresponds to the electronic device displaying a paintbrush mark, stroke, spray-paint, ink-blot, gridlines, etc. on the user interface (not shown).

It should be understood that the particular order in which the operations in FIGS. 16A-16B have been described is merely an example and is not intended to indicate that the described order is the only order in which the operations could be performed. One of ordinary skill in the art would recognize various ways to reorder the operations described herein.

The operations described above with reference to FIGS. 16A-16B are, optionally, implemented by components depicted in FIGS. 1A-1B. For example, detect operation 1602, 1620, and 1622, determine operations 1606 and 1612, and performing operations 1616 and 1618 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186 and determines whether a first contact (or near contact) at a first location on the touch-sensitive surface (or whether rotation of the electronic device) corresponds to a predefined event or sub-event, such as selection of an object on a user interface, or rotation of the electronic device from one orientation to another. When a respective predefined event or sub-event is detected, event recognizer 180 activates an event handler 190 associated with the detection of the event or sub-event.

Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Note that details of the processes described above with respect to method 1600 are also applicable in an analogous manner to other methods described herein (e.g., 1400, 1500, 1700, 1800, 1900, 2400, 2500, 2600, 2700). For example, the stylus, sensor data, display, touch-sensitive surface, inputs, and communication interface described above with reference to method 1600 optionally have one or more of the properties of the stylus, sensor data, display, touch-sensitive surface, inputs, and communication interface described herein with reference to other methods described herein (e.g., 1400, 1500, 1700, 1800, 1900, 2400, 2500, 2600, 2700).

Figure 17C:
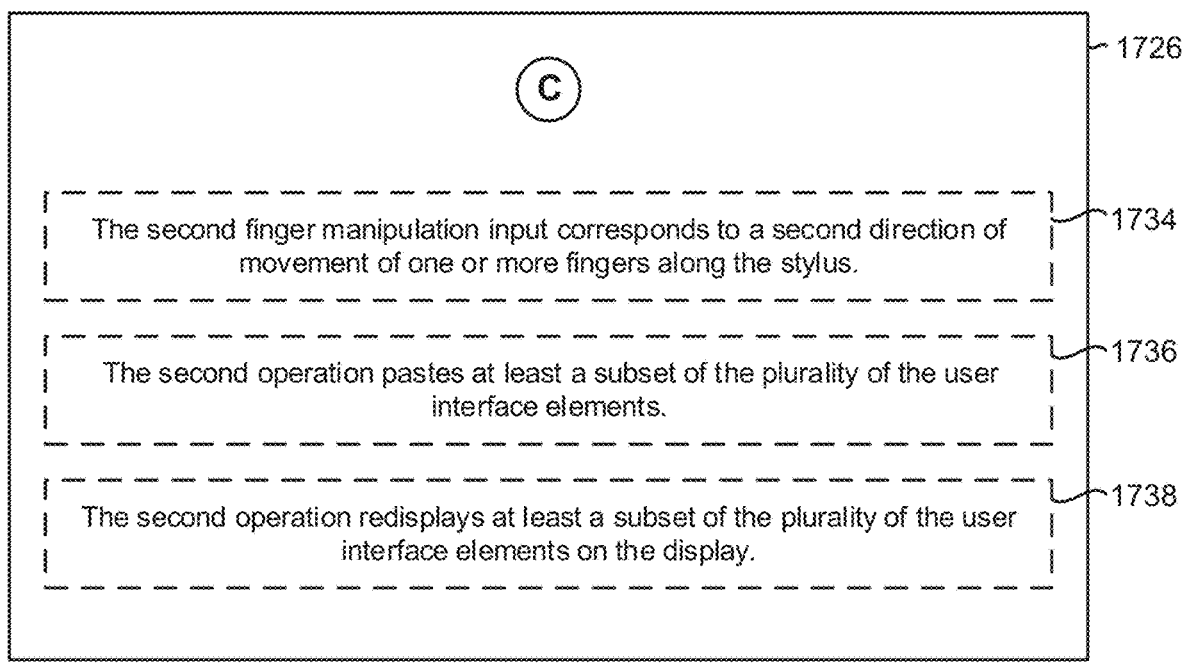

FIGS. 17A-17C is a flow diagram illustrating a method 1700 of performing operations on existing marks displayed on an interface based on finger manipulation inputs in accordance with some embodiments. The method 1700 is performed at an electronic device (e.g., the electronic device 300 in FIG. 3, or the portable multifunction device 100 in FIG. 1A) with a touch-sensitive surface, a display, and a communication interface provided to communicate with a stylus (e.g., a BLUETOOTH interface). In some embodiments, the touch-sensitive surface and display are combined into a touch screen display (e.g., a mobile phone or tablet). In some embodiments, the touch-sensitive surface and display are separate (e.g., a laptop or desktop computer with a separate touchpad and display). Some operations in the method 1700 are, optionally, combined and/or the order of some operations is, optionally, changed.

Performing operations on existing marks displayed on an interface based on finger manipulation input data from the stylus reduces the number of inputs needed to perform the change in stylus functionality. This reduction in inputs enhances the operability of the electronic device and makes the electronic device interface more efficient (e.g., by helping the user to provide proper inputs and reducing user mistakes when operating/interacting with the electronic device) which, additionally, reduces power usage and wear-and-tear of the electronic device.

The method 1700 contemplates the electronic device utilizing data received from a stylus to perform operations on existing marks displayed on a tablet based on finger manipulation inputs received by the stylus. The operations include a cut/paste operation, a copy/paste operation, an increase/decrease size operation, an increase/decrease thickness operation, and/or the like. With the many different types of operations, many different types of finger manipulation inputs can be exploited. For example, the finger manipulation inputs received by the stylus includes tapping, flicking, swiping, rolling, twirling, and/or the like.

This enhances the operability of the electronic device and makes the electronic device interface more efficient and robust. As noted above, the user can interact with the stylus in many different ways, while, on the other hand, the touch-sensitive surface of the electronic device can receive a single input type, a touch input. Additionally, a shift to fewer touch inputs at the touch-sensitive surface of the electronic device reduces wear-and-tear of and power usage of the electronic device. This improves battery life of the electronic device by enabling the user to use the electronic device more quickly and efficiently. For battery-operated electronic devices, enabling a user to enter fewer inputs to the touch-sensitive surface of the electronic device conserves power and increases the time between battery charges of the electronic device.

With respect to FIG. 17A, the electronic device, while displaying a plurality of user interface elements on the display, obtains (1702) finger manipulation data from the stylus via the communication interface, wherein the finger manipulation data includes information about one or more finger manipulation inputs received by the stylus. For example, the plurality of the user interface elements corresponds to marks, objects, vector drawings and/or objects, and/or the like. As one example, with reference to FIGS. 10G-10I, the one or more finger manipulation inputs received by the stylus 203 includes a swipe-up gesture or swipe-down gesture (e.g., the inputs 1040 and 1050) relative to the electronic device 100 on the barrel of the stylus 203. In another example, with reference to FIGS. 10B-10F, the one or more finger manipulation inputs received by the stylus 203 includes rolling the barrel of the stylus 203 in a counter-clockwise or clockwise manner (e.g., the inputs 1020a-1020d). In some embodiments, the finger manipulation data corresponds to data collected by a magnetometer of the stylus, an accelerometer of the stylus, and a capacitive touch element or touch-sensitive surface on the barrel of the stylus. In some embodiments, the finger manipulation data is transmitted/received via BLUETOOTH connection, IEEE 802.11x connection, and/or the like.

In some embodiments, the finger manipulation data includes information about the movement of fingers on the stylus or movement of the stylus relative to the fingers of a user (e.g., data indicating how the fingers and/or stylus moved). In some embodiments, the finger manipulation data includes a processed representation of the movement of fingers on the stylus or movement of the stylus relative to the fingers of a user (e.g., data indicating a gesture or manipulation that was performed at the stylus such as a swipe or rotation gesture optionally including information indicating a direction and/or magnitude of the gesture or movement). In one example, the finger manipulation data indicates a gesture or manipulation that was performed at the stylus, such as a swipe or rotation gesture optionally including information indicating a direction and/or magnitude of the gesture of movement.

In some embodiments, at least a portion of the finger manipulation data corresponds (1704) to touch sensor data from one or more touch sensors on the stylus. Obtaining finger manipulation data from the stylus in order to affect operations at the electronic device enhances the operability of the electronic device and reduces the number of inputs to the electronic device. Reducing the number of inputs makes the electronic device more efficient, which extends the battery life and reduces wear-and-tear of the electronic device. For example, the sensor data corresponds to data collected by a magnetometer of the stylus, an accelerometer of the stylus, and a capacitive touch element or touch-sensitive surface on the barrel of the stylus (e.g., the sensor data is transmitted and/or received via BLUETOOTH connection, IEEE 802.11x connection, etc.). For example, as shown in FIG. 10G, the stylus 203 detects the input 1040 (e.g., the upward swipe on the stylus 203). In another example, as shown in FIG. 10H, the stylus 203 detects the input 1050 (e.g., the downward swipe on the stylus 203).

In some embodiments, while displaying a plurality of user interface elements on the display, the electronic device displays (1706) a drawing application interface that includes a canvas with a plurality of preexisting marks displayed in response to previous inputs, from the stylus, detected on the touch-sensitive surface of the electronic device. Displaying a canvas based on sensor data from the stylus enhances the operability of the electronic device and reduces the number of inputs to the electronic device. Reducing the number of inputs makes the electronic device more efficient, which extends the battery life and reduces wear-and-tear of the electronic device. In some embodiments, the plurality of preexisting marks is generated by writing or drawing strokes from the stylus. In some embodiments, the plurality of preexisting marks is generated by one or more vector drawing operations. The vector drawings include, for example, a closed object, such as a triangle, square, or any polygon. For example, with reference to FIG. 10A, the user interface 1000 associated with a drawing or notes application includes preexisting content: a star 1004a and a lightning bolt 1004b. In another example, with reference to FIG. 10G, the user interface 1000 associated with a drawing or notes application includes preexisting content: a triangle 1004d.

In some embodiments, the plurality of the user interface elements corresponds (1708) to a subset of the plurality of preexisting marks selected by the user. Utilizing data from the stylus enhances the operability of the electronic device and reduces the number of inputs to the electronic device. Reducing the number of inputs makes the electronic device more efficient, which extends the battery life and reduces wear-and-tear of the electronic device. As one example, in FIG. 10A, the preexisting marks (e.g., the star 1004a and the lightning bolt 1004b) appear on the user interface 1000 and the lightning bolt 1004b is selected, as illustrated in FIG. 10B. In another example, the user selects the preexisting mark (e.g. the triangle 1004d) to perform a cut operation.

In some embodiments, the plurality of the user interface elements corresponds (1710) to a subset of the plurality of the preexisting marks selected based on a location of the stylus relative to the electronic device during detection of the one or more finger manipulation inputs. Utilizing finger manipulation data from the stylus enhances the operability of the electronic device and reduces the number of inputs to the electronic device. Reducing the number of inputs makes the electronic device more efficient, which extends the battery life and reduces wear-and-tear of the electronic device. As one example, with reference to FIG. 10A, the preexisting marks (e.g., the star 1004a and the lightning bolt 1004b) appear on the user interface. In response to the user selecting the lightning bolt 1004b, a subset of the plurality of the preexisting marks, the electronic device 100 displays the lightning bolt 1004b' in a selected state with a dotted outline to indicate that the lightning bolt 1004b' is currently selected, while the star 1004a remains unchanged.

In some embodiments, in response to detecting the finger manipulation data and in accordance with a determination that the finger manipulation data indicates a first finger manipulation input on the stylus, the electronic device performs (1712) a first operation on at least a subset of the plurality of the user interface elements. In one example, in response to detecting a counter-clockwise roll of the stylus 203 in FIG. 10B, the electronic device 100 increases a subset of the user interface elements (e.g., the lightning bolt 1004b' increasing from the first size 1015a to a lightning bolt 1004c' at a second size 1015b in FIGS. 10B-10C). In another example, a cut operation is performed on a subset of the user interface elements (e.g., the triangle 1004d in FIG. 10G) in response to detecting the upward swipe on the stylus 203. In yet another example, a subset of the user interface elements comprises an object, a vector drawing or object, and/or the like.

In some embodiments, the first finger manipulation input corresponds (1714) to a first gesture type detected on the stylus. Obtaining finger manipulation data from the stylus in order to affect performance of operations enhances the operability of the electronic device and reduces the number of inputs to the electronic device. Reducing the number of inputs makes the electronic device more efficient, which extends the battery life and reduces wear-and-tear of the electronic device. For example, the first gesture type corresponds to a particular direction of an input gesture (e.g., a counter-clockwise roll gesture versus a clockwise roll gesture of the stylus 203, or an upward swipe gesture versus a downward swipe gesture on the stylus 203). As one example, the first gesture type corresponds to a counter-clockwise roll gesture of the stylus 203 (e.g., the inputs 1020a and 1020b in FIGS. 10B-10C), and the second gesture type corresponds to a clockwise roll gesture of the stylus 203 (e.g., the inputs 1020c and 1020d in FIGS. 10D-10E). As another example, the first gesture type corresponds to an upward swipe on the stylus 203 (e.g., the input 1040 in FIG. 10G), and the second gesture type corresponds to a downward swipe on the stylus 203 (e.g., the input 1050 in FIG. 10H). For example, the first gesture type corresponds to a particular manner of input gesture (e.g., a roll gesture of the stylus 203 versus a swipe gesture on the stylus 203 versus a tap gesture on the stylus 203).

In some embodiments, the first finger manipulation input corresponds (1716) to a first direction of movement of one or more fingers relative to a touch-sensitive surface of the stylus. Obtaining finger manipulation data from the stylus in order to affect performance of operations enhances the operability of the electronic device and reduces the number of inputs to the electronic device. Reducing the number of inputs makes the electronic device more efficient, which extends the battery life and reduces wear-and-tear of the electronic device. For example, with reference to FIG. 10B, the first direction of movement includes a counter-clockwise roll (e.g., the input 1020a) of the stylus 203 while a user is holding the stylus 203 in his/her hand 1002. As one example, a counter-clockwise roll of the stylus 203 increases the size or thickness of the plurality of the user interface elements. In such an example, with reference to FIGS. 10B-10C, the lightning bolt 1004b' increases in size from a first size 1015a to the lightning bolt 1004c' at the second size 1015b. As another example, with reference to a counter-clockwise rotation of the stylus 203 rotates the plurality of the user interface elements counter-clockwise. As yet another example, a counter-clockwise rotation navigates through objects at different layers in a downward direction (e.g., an object is hidden under another object and a counter-clockwise roll can be used to navigate down through layers of the objects.)

With reference to FIG. 17B, in some embodiments, the first operation increases (1718) the size of at least a subset of the plurality of the user interface elements. Increasing the size of user interface elements based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, as shown in FIGS. 10C-10D, the electronic device 100 displays the lightning bolt 1004c' increasing from the second size

1015b to the lightning bolt 1004d' at the third size 1015c in response to detecting the input 1020b in FIG. 10C.

In some embodiments, the first finger manipulation input corresponds (1720) to a first direction of movement of one or more fingers along the stylus. Obtaining finger manipulation data from the stylus in order to affect performance of operations enhances the operability of the electronic device and reduces the number of inputs to the electronic device. Reducing the number of inputs makes the electronic device more efficient, which extends the battery life and reduces wear-and-tear of the electronic device. For example, the first finger manipulation input corresponds to a counter-clockwise rotation of the stylus (e.g., the input 1020a in FIG. 10B), an upward swipe on the stylus (e.g., the input 1040 in FIG. 10G), and/or the like. As another example, an upward swipe gesture on the stylus copies the plurality of the user interface elements. As another example, the upward swipe gesture on the stylus cuts or picks-up the plurality of the user interface elements. As yet another example, the upward swipe gesture on the stylus removes the plurality of the user interface elements or undoes the operations on the plurality of the user interface elements.

In some embodiments, the first operation copies (1722) at least a subset of the plurality of the user interface elements. Copying user interface elements based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, as shown in FIG. 10G, the electronic device 100 detects an input 1040 (e.g., the upward swipe on the stylus 203) at a location of the stylus 203 relative to the electronic device 100, indicative of the user selecting to copy (or, in some embodiments, cut) the triangle 1004d from the user interface 1000.

In some embodiments, the first operation removes (1724) display of at least a subset of the plurality of the user interface elements on the display. Displaying user interface elements based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, as shown in FIG. 10H, the electronic device 100 no longer displays the triangle 1004d on the user interface 1000 in response to detecting the upward swipe on the stylus 203 corresponding to the user copying (or cutting) the triangle 1004d.

In some embodiments, in response to detecting the finger manipulation data and in accordance with a determination that the finger manipulation data indicates a second finger manipulation input on the stylus that is different from the first finger manipulation input, the electronic device performs (1726) a second operation on at least a subset of the plurality of the user interface elements, wherein the second operation is different from the first operation. In one example, in response to detecting a clockwise roll of the stylus 203 in FIG. 10D, the electronic device 100 decreases a subset of the user interface elements (e.g., the lightning bolt 1004d' decreasing from the third size 1015c to a lightning bolt 104e' at the fourth size 1015d in FIGS. 10D-10E). In another example, in response to detecting a downward swipe on the stylus 203, as shown in FIG. 10I, a paste operation is performed on a subset of the user interface elements (e.g., the triangle 1004d in FIGS. 10G and 10I). In yet another example, a second operation includes maintaining display of the plurality of the user interface elements (e.g., do nothing), resizing an object, changing color or hues (e.g., filling an object or the color of a line), changing property of an object (e.g., change shape), copy/paste, cut/paste, undo/redo, change thickness of lines, and/or the like.

In some embodiments, determining whether the first or second operation is performed further depends on whether depends on whether stylus is making contact with the touch-sensitive surface of the electronic device. For example, if the stylus is not making contact with the touch-sensitive surface, neither the first nor the second operation is performed.

In some embodiments, the second finger manipulation input corresponds (1728) to a second gesture type detected on the stylus. Obtaining finger manipulation data from the stylus in order to affect performance of operations enhances the operability of the electronic device and reduces the number of inputs to the electronic device. Reducing the number of inputs makes the electronic device more efficient, which extends the battery life and reduces wear-and-tear of the electronic device. For example, the second gesture type includes a rotational gesture, such as a counter-clockwise roll (e.g., input 1020a in FIG. 10B) of the stylus 203, a clockwise roll (e.g., input 1020c in FIG. 10D) of the stylus 203, and/or the like. Additionally, in some embodiments, the gesture types include swipe gestures on the stylus (e.g., at least a threshold magnitude for the swipe gesture), a rotation of the stylus (e.g., at least X angular degrees for the rotation), and/or the like.

In some embodiments, the second finger manipulation input corresponds (1730) to a second direction of movement of one or more fingers relative to the touch-sensitive surface of the stylus. Obtaining finger manipulation data from the stylus in order to affect performance of operations enhances the operability of the electronic device and reduces the number of inputs to the electronic device. Reducing the number of inputs makes the electronic device more efficient, which extends the battery life and reduces wear-and-tear of the electronic device. For example, the second direction of movement includes a clockwise roll of the stylus 203 while a user is holding the stylus 203 in his/her hand 1002. As one example, a clockwise roll of the stylus 203 decreases the size or thickness of the plurality of the user interface elements. As another example, a clockwise rotation of the stylus 203 rotates the plurality of the user interface elements clockwise. As yet another example, a clockwise rotation navigates through objects at different layers in an upward direction (e.g., an object is hidden under another object, and a clockwise roll can be used to navigate up through layers of the objects).

In some embodiments, the second operation decreases (1732) the size of at least a subset of the plurality of the user interface elements. Decreasing the size of user interface elements based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, as shown in FIGS. 10D-10E, the electronic device 100 displays the lightning bolt 1004d' decreasing from the third size 1015c to the lightning bolt 1004e' at the fourth size 1015d in response to obtaining finger manipulation data indicating the input 1020c in FIG. 10D.

With reference to FIG. 17C, in some embodiments, the second finger manipulation input corresponds (1734) to a second direction of movement of one or more fingers along the stylus. Obtaining finger manipulation data from the stylus in order to affect performance of operations enhances the operability of the electronic device and reduces the number of inputs to the electronic device. Reducing the number of inputs makes the electronic device more efficient, which extends the battery life and reduces wear-and-tear of the electronic device. For example, the second finger manipulation input corresponds to a clockwise rotation of the stylus (e.g., the input 1020*d* in FIG. 10D), a downward swipe on the stylus (e.g., the input 1050 in FIG. 10H), and/or the like. As another example, a downward swipe gesture on the stylus pastes the plurality of the user interface elements. As another example, the downward swipe gesture on the stylus pastes or places down the plurality of the user interface elements. As yet another example, the downward swipe gesture on the stylus redisplays the plurality of the user interface elements or redoes the operations on the plurality of the user interface elements.

In some embodiments, the second operation pastes (1736) at least a subset of the plurality of the user interface elements. Pasting user interface elements based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, as shown in FIG. 10I, the electronic device 100 detects an input 1050 (e.g., the downward swipe on the stylus 203) at a location of the stylus 203 relative to the electronic device 100, corresponding to the user pasting the triangle 1004*d* to the user interface 1000.

In some embodiments, the second operation redisplays (1738) at least a subset of the plurality of the user interface elements on the display. Redisplaying user interface elements based on sensor data from the stylus enhances the operability of the electronic device and reduces the number of inputs to the electronic device. Reducing the number of inputs makes the electronic device more efficient, which extends the battery life and reduces wear-and-tear of the electronic device. For example, as shown in FIG. 10I, the electronic device 100 redisplays the triangle 1004*d* on the user interface 1000 in response to detecting the downward swipe on the stylus 203 corresponding to the user pasting the triangle 1004*d* to the user interface 1000.

It should be understood that the particular order in which the operations in FIGS. 17A-17C have been described is merely an example and is not intended to indicate that the described order is the only order in which the operations could be performed. One of ordinary skill in the art would recognize various ways to reorder the operations described herein.

The operations described above with reference to FIGS. 17A-17C are, optionally, implemented by components depicted in FIGS. 1A-1B. For example, obtaining operation 1702, determining and performing operation 1712, and determining and performing operation 1726 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186 and determines whether a first contact (or near contact) at a first location on the touch-sensitive surface (or whether rotation of the electronic device) corresponds to a predefined event or sub-event, such as selection of an object on a user interface, or rotation of the electronic device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Note that details of the processes described above with respect to method 1700 are also applicable in an analogous manner to other methods described herein (e.g., 1400, 1500, 1600, 1800, 1900, 2400, 2500, 2600, 2700). For example, the stylus, finger manipulation data, display, user interface elements, touch-sensitive surface, and communication interface described above with reference to method 1700 optionally have one or more of the properties of the stylus, finger manipulation data, display, user interface elements, touch-sensitive surface, and communication interface described herein with reference to other methods described herein (e.g., 1400, 1500, 1600, 1800, 1900, 2400, 2500, 2600, 2700).

FIGS. 18A-18B is a flow diagram illustrating a method 1800 of performing finger manipulations to a stylus in order to navigate within a menu displayed by an electronic device in accordance with some embodiments. The method 1800 is performed at an electronic device (e.g., the electronic device 300 in FIG. 3, or the portable multifunction device 100 in FIG. 1A) with a touch-sensitive surface, a display, and a communication interface provided to communicate with a stylus (e.g., a BLUETOOTH interface). In some embodiments, the touch-sensitive surface and display are combined into a touch screen display (e.g., a mobile phone or tablet). In some embodiments, the touch-sensitive surface and display are separate (e.g., a laptop or desktop computer with a separate touchpad and display). Some operations in the method 1800 are, optionally, combined and/or the order of some operations is, optionally, changed.

Navigating within a menu based on finger manipulation data from the stylus reduces the number of inputs needed to perform the change in stylus functionality. This reduction in inputs enhances the operability of the electronic device and makes the electronic device interface more efficient (e.g., by helping the user to provide proper inputs and reducing user mistakes when operating/interacting with the electronic device) which, additionally, reduces power usage and wear-and-tear of the electronic device.

The method 1800 contemplates the electronic device utilizing finger manipulation data received from a stylus to navigate within a menu displayed by an electronic device. For example, the finger manipulation data includes tapping, flicking, swiping, twirling, and/or the like. In response to detecting the finger manipulation data, the electronic device can exploit different ways to navigate within a menu. For example, detecting finger manipulation finger data indicates a gesture or manipulation that was performed at the stylus such as a swipe or rotation gesture optionally including information indicating a direction and/or magnitude of the gesture or movement.

This enhances the operability of the electronic device and makes the electronic device interface more efficient and robust. As noted above, the user can interact with the stylus in many different ways, while, on the other hand, the touch-sensitive surface of the electronic device can receive a single input type (e.g., a touch input). Additionally, a shift to fewer touch inputs at the touch-sensitive surface of the electronic device reduces wear-and-tear of and power usage of the electronic device. This improves battery life of the electronic device by enabling the user to use the electronic device more quickly and efficiently. For battery-operated electronic devices, enabling a user to enter fewer inputs on the touch-sensitive surface of the electronic device conserves power and increases the time between battery charges of the electronic device.

With respect to FIG. 18A, the electronic device displays (1802), on the display, a selection user interface including a plurality of selectable items, wherein a first item among the plurality of selectable items is currently selected within the selection user interface. In some embodiments, the first item among the plurality of selectable items are selected via a command to invoke a menu. In another example, with reference to FIGS. 11C-11D, the command to invoke the menu includes a tap gesture or an upward swipe gesture (e.g., the input 1120a) on the barrel of a stylus 203 at a location of the stylus 203 relative to the electronic device 100 while a user is holding the stylus 203 in his/her hand 1102. In another example, the command to invoke the menu corresponds to a tap gesture on a menu affordance displayed by the table. In yet another example, the command to invoke the menu corresponds to a voice command obtained by the tablet. In some embodiments, the menu corresponds to a file browser navigation menu, a tool/markup tool selection menu (e.g., the menu 1144 in FIG. 11L), a color selection menu (e.g., the menu 1114 in FIG. 11D), and/or the like.

In some embodiments, the selection user interface includes (1804) a radial menu. As one example, with reference to FIGS. 11D-11G, the menu 1114 is arranged in a radial fashion (i.e., arranged in a circle).

In some embodiments, the plurality of selectable items in the selection user interface includes (1806) one or more representations of markup tools. As one example, with reference to FIGS. 11L-11M, the menu 1144 includes a plurality of selectable items as five representations of markup tools: a felt-tip marker tool indicator 1144a, a brush tool indicator 1144b, an eraser tool indicator 1144c, a pencil tool indicator 1144d, and a chiseled marker tool indicator 1144e.

In some embodiments, the plurality of selectable items in the selection user interface include (1808) a plurality of colors. As one example, with reference to FIGS. 11D-11G, the menu 1114 includes four visual indicators: a solid indicator 1114a, a striped indicator 1114b, a dotted indicator 1114c, and a blank indicator 1114d. In this example, in response to obtaining the finger manipulation data from the stylus 203 indicating a clockwise rotation 1130a of the stylus 203, the electronic device 100 moves (e.g., changes display) clockwise through the menu 1114 such that focus changes from the solid indicator 1114a to the striped indicator 1114b. In another example, the plurality of selectable items includes indicators to select a fill or line color for an object.

In some embodiments, the plurality of selectable items in the selection user interface includes (1810) a menu of representations of content. As one example, the menu of the representations of content includes representations of documents, pictures, media, and/or the like. In another example, a menu of representations of content allows the user to navigate through a file structure.

In some embodiments, the electronic device obtains (1812) finger manipulation data from the stylus via the communication interface, wherein the finger manipulation data includes information about one or more finger manipulation inputs received at the stylus. In some embodiments, the finger manipulation data includes information about the movement of fingers on the stylus or movement of the stylus relative to the fingers of a user. As one example, the finger manipulation data indicates how fingers and/or a stylus is moved.

In some embodiments, the finger manipulation data includes a processed representation of the movement of fingers on the stylus or movement of the stylus relatives to the fingers of a user. In one example, the finger manipulation data indicates a gesture or manipulation that was performed at the stylus such as a swipe or rotation gesture optionally including information indicating a direction and/or magnitude of the gesture or movement. For example, with reference to FIGS. 11C-11D, the electronic device 100, in response to obtaining finger manipulation data indicating the input 1120a (e.g., an upward swipe on the stylus 203), displays the menu 1114. In another example, with reference to FIGS. 11D-11F, the electronic device 100 may change which indicator has focus in response to the stylus 203 being manipulated by the hand 1102 of the user. In response to obtaining the finger manipulation data from the stylus 203 indicating a clockwise rotation 1130a of the stylus 203, in FIG. 11D, the electronic device 100 moves clockwise through the menu 1114.

In yet another example, the finger manipulation data corresponds to data collected by a magnetometer of the stylus, an accelerometer of the stylus, and a capacitive touch element or touch-sensitive surface on the barrel of the stylus. In yet another example, the finger manipulation data is transmitted/received via BLUETOOTH connection, IEEE 802.11x connection, and/or the like.

In some embodiments, at least a portion of the finger manipulation data corresponds (1814) to touch sensor data from one or more touch sensors on the stylus. Obtaining data received from the stylus corresponding to touch sensor data in order to affect performance of operation at the electronic device enhances the operability of the electronic device and reduces the number of inputs to the electronic device. Reducing the number of inputs makes the electronic device more efficient, which extends the battery life and reduces wear-and-tear of the electronic device. As one example, the sensor data corresponds to data collected by a capacitive touch element or touch-sensitive surface on the barrel of the stylus. In another example, the sensor data is transmitted/received via BLUETOOTH connection, IEEE 802.11x connection, and/or the like.

In some embodiments, the touch sensor data indicates (1816) movement of one or more fingers along a touch-sensitive surface of the stylus. Obtaining finger manipulation data from the stylus that corresponds to touch sensor data in order to affect navigation within a menu enhances the operability of the electronic device and reduces the number of inputs to the electronic device. Reducing the number of inputs makes the electronic device more efficient, which extends the battery life and reduces wear-and-tear of the electronic device. As one example, a rotational movement of the stylus perpendicular to the longitudinal axis defined by the barrel of the stylus.

With reference to FIG. 18B: In some embodiments, in response to obtaining the finger manipulation data and in accordance with a determination that the finger manipulation data satisfies a navigation criterion, the electronic device changes (1818) display of the selection user interface in order to indicate movement of focus to a second item among the plurality of selectable items. As one example, with reference to FIG. 11D, in response to obtaining the finger manipulation data from the stylus 203 indicating a clockwise rotation (e.g., the input 1130a) of the stylus 203, the electronic device 100 moves clockwise through the menu 1114. In another example, with reference to FIG. 11F, in response to obtaining the finger manipulation data from the stylus 203 indicating a counter-clockwise rotation (e.g., the input 1130c) of the stylus 203, the electronic device 100 moves counter-clockwise through the menu 1114.

In some embodiments, the selection user interface corresponds to a file list, color list, list of tool types (e.g., pencil, smudge, eraser, etc.). In some embodiments, the selection user interface corresponds to is a parade menu, radial menu, straight line (e.g., horizontal or vertical oriented) menu, z-order menu, and/or the like. In some embodiments, the navigation criterion corresponds to an amount of angular roll, amount of time of roll, and/or the like.

In some embodiments, the movement of focus corresponds (1820) to a direction of the movement of the one or more fingers along the touch-sensitive surface of the stylus. Moving focus on the display based on finger manipulation data from the stylus enhances the operability of the electronic device and reduces the number of inputs to the electronic device. Reducing the number of inputs makes the electronic device more efficient, which extends the battery life and reduces wear-and-tear of the electronic device. As one example, a clockwise movement of the stylus relative to the user's fingers changes focus clockwise through a radial menu, and a counter-clockwise movement of the stylus relative to the user's fingers changes focus counter-clockwise through the radial menu. For example, with reference to FIGS. 11C-11E, a clockwise movement (e.g., the inputs 1130a and 1130b) of the stylus 203, the electronic device 100 moves clockwise through the menu 1114. In another example, with reference to FIG. 11F, in response to obtaining the finger manipulation data from the stylus 203 indicating a counter-clockwise rotation (e.g., the input 1130c) of the stylus 203, the electronic device 100 moves counter-clockwise through the menu 1114. In another example, with reference to FIG. 11L, in response to obtaining the finger manipulation data from the stylus 203 indicating a counter-clockwise rotation (e.g., the input 1130d) of the stylus 203, the electronic device 100 moves counter clockwise through the menu 1144.

In some embodiments, the second item is selected (1822) from the selection user interface in response to pausing movement of the one or more fingers along the touch-sensitive surface of the stylus for a predetermined duration while the second item has focus. Selecting an item based on finger manipulation data from the stylus indicating paused movement enhances the operability of the electronic device and reduces the number of inputs to the electronic device. Reducing the number of inputs makes the electronic device more efficient, which extends the battery life and reduces wear-and-tear of the electronic device. In some embodiments, after selection of the second selectable item, the selection user interface is replaced with a submenu with finer grain selectable items associated with the second selectable item.

In some embodiments, the second item is selected (1824) from the selection user interface in response to obtaining second finger manipulation data indicating a tap input on the stylus while the second item has focus. Selecting an item based on finger manipulation data from the stylus indicating a tap input enhances the operability of the electronic device and reduces the number of inputs to the electronic device. Reducing the number of inputs makes the electronic device more efficient, which extends the battery life and reduces wear-and-tear of the electronic device. As one example, with reference to FIG. 11G, a tap input (e.g., the input 1140a) is detected indicating the selection of the striped indicator 1114b based on touch information from a touch-sensitive surface of the stylus 203 or one or more motion sensors such as an accelerometer and/or magnetometer). In another example, with reference to FIG. 11M, a tap input (e.g., the input 1140b) is detected indicating the selection of the brush tool indicator 1144b.

In some embodiments, in response to obtaining the finger manipulation data and in accordance with a determination that the finger manipulation data does not satisfy the navigation criterion, the electronic device maintains (1826) display of the selection user interface, wherein the first item among the plurality of selectable items currently has focus within the selection user interface. As one example, with reference to FIGS. 11D-11F, the electronic device 100 maintains display of the menu 1114 as the user has not indicated selection of an indicator within the menu 1114.

It should be understood that the particular order in which the operations in FIGS. 18A-18B have been described is merely an example and is not intended to indicate that the described order is the only order in which the operations could be performed. One of ordinary skill in the art would recognize various ways to reorder the operations described herein.

The operations described above with reference to FIGS. 18A-18B are, optionally, implemented by components depicted in FIGS. 1A-1B. For example, display operation 1802, obtaining operation 1812, response and changing display operation 1818, and response and maintaining operation 1826 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186 and determines whether a first contact (or near contact) at a first location on the touch-sensitive surface (or whether rotation of the electronic device) corresponds to a predefined event or sub-event, such as selection of an object on a user interface, or rotation of the electronic device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Note that details of the processes described above with respect to method 1800 are also applicable in an analogous manner to other methods described herein (e.g., 1400, 1500, 1600, 1700, 1900, 2400, 2500, 2600, 2700). For example, the stylus, finger manipulation data, display, user interfaces, touch-sensitive surface, and communication interface described above with reference to method 1800 optionally have one or more of the properties of the stylus, finger manipulation data, display, user interfaces, touch-sensitive surface, and communication interface described herein with reference to other methods described herein (e.g., 1400, 1500, 1600, 1700, 1900, 2400, 2500, 2600, 2700).

FIGS. 19A-19C is a flow diagram illustrating a method 1900 of displaying user interface elements based on hover distance of the stylus in accordance with some embodiments. The method 1900 is performed at an electronic device (e.g., the electronic device 300 in FIG. 3, or the portable multifunction device 100 in FIG. 1A) with a touch-sensitive surface, a display, and a communication interface provided to communicate with a stylus (e.g., a BLUETOOTH interface). In some embodiments, the touch-sensitive surface and display are combined into a touch screen display (e.g., a mobile phone or tablet). In some embodiments, the touch-sensitive surface and display are separate (e.g., a laptop or desktop computer with a separate touchpad and display). Some operations in the method 1900 are, optionally, combined and/or the order of some operations is, optionally, changed.

Displaying user interface elements based on the hover distance of the stylus reduces the number of inputs needed to perform the change in stylus functionality. This reduction in inputs enhances the operability of the electronic device and makes the electronic device interface more efficient (e.g., by helping the user to provide proper inputs and reducing user mistakes when operating/interacting with the electronic device) which, additionally, reduces power usage and wear-and-tear of the electronic device.

The method 1900 contemplates the electronic device utilizing a hover distance in order to affect what the electronic device displays. The hover distance is the distance between the stylus and the touch-sensitive surface of the electronic device. The electronic device determines the hover distance based on data received from the stylus and/or sensor data generated at the electronic device. Using the hover distance to influence the behavior of the electronic device enhances the operability of the electronic device and makes the electronic device interface more efficient and robust. Namely, the electronic device can perform multiple operations (e.g., display operations, navigation operations, etc.) in response to detecting a single input at the stylus, based on the hover distance.

Accordingly, the functionality of the electronic device is expanded and the number of inputs a user provides to the touch-sensitive surface of the electronic device is reduced. As a result, the user enjoys a more pleasant experience, and the number of mistaken inputs registered at the electronic device is reduced. Additionally, this reduces wear-and-tear of and power usage of the electronic device is reduced. This improves battery life of the electronic device by enabling the user to use the electronic device more quickly and efficiently. For battery-operated electronic devices, enabling a user to enter fewer inputs on the touch-sensitive surface of the electronic device conserves power and increases the time between battery charges of the electronic device.

With reference to FIG. 19A, the electronic device obtains (1902) input data from the stylus via the communication interface corresponding to an input detected at the stylus. For example, the input corresponds to a gesture on the stylus (e.g., a tap or swipe), a voice command, a tap on canvas or affordance displayed on electronic device (e.g., the iPad® device from Apple Inc. of Cupertino, Calif.), etc.

In some embodiments, the input corresponds (1904) to a tap input detected via one or more touch sensors on the stylus. For example, the one or more touch sensors correspond to a capacitive touch element or touch-sensitive surface on the barrel of the stylus. For example, the electronic device obtains data indicative of the tap input via a BLUETOOTH connection, IEEE 802.11x connection, etc. Obtaining data received from the stylus indicative of a tap input in order to affect performance of operations at the electronic device enhances the operability of the electronic device and reduces the number of inputs to the electronic device. Reducing the number of inputs makes the electronic device more efficient, which extends the battery life and reduces wear-and-tear of the electronic device. As one example, with reference to FIG. 12B, the electronic device 100 obtains input data from the stylus 230 indicative of the tap gesture 1230 at the stylus 230.

In some embodiments, the input corresponds (1906) to a shake input detected via one or more accelerometers in the stylus. Obtaining data received from the stylus indicative of a shake input in order to affect performance of operations at the electronic device enhances the operability of the electronic device and reduces the number of inputs to the electronic device. Reducing the number of inputs makes the electronic device more efficient, which extends the battery life and reduces wear-and-tear of the electronic device. For example, the one or more touch sensors correspond to a magnetometer, an accelerometer of the stylus, a combination thereof, or the like. For example, the electronic device obtains data indicative of the shake input via a BLUETOOTH connection, IEEE 802.11x connection, etc.

In some embodiments, obtaining the input data occurs (1908) while the stylus is over a first portion of the touch-sensitive display. Accordingly, the amount of erroneous data sent to the electronic device is reduced, such as when the stylus is idle (e.g., the stylus is sitting on the table next to the electronic device). This creates a more efficient user interface with the electronic device and also reduces the number of inputs to the touch-sensitive surface of the electronic device, reducing wear-and-tear and battery consumption at the electronic device. For example, the electronic device obtains the touch input data from the stylus when the tip of the stylus is over any portion of the touch-sensitive display. For example, the electronic device obtains the touch input data from the stylus when any portion of the stylus is over any portion of the touch-sensitive display. For example, the electronic device does not obtain touch input data from the stylus when the entire stylus or portions thereof are not over the electronic device. For example, the electronic device obtains the touch input data from the stylus according to a combination of the previous examples.

In response to obtaining the input data from the stylus: In accordance with a determination that a distance between the stylus and the touch-sensitive display satisfies a first distance threshold when the input was detected at the stylus, the electronic device displays (1910) a first user interface element that corresponds to the input. For example, the first distance threshold is satisfied when it is equaled and/or exceeded—e.g., the first distanced threshold is 2 inches and the distance between the stylus and the touch-sensitive display is greater than or equal to 2 inches. For example, the first distance threshold corresponds to a value that is preset at the electronic device. For example, the first user interface element corresponds to a mark, shape, line, ink blot, splatter, object, bullet point, text box, menu, etc. For example, the electronic device displays the first user interface element with animation.

As an example, with reference to FIGS. 12A-12B, in response to determining that the first hover distance 1216 satisfies the first distance threshold 1218, the electronic device 100 displays the first cube 1224a in FIG. 12B. As another example, with reference to FIGS. 12E-12F, in response to determining that the fourth hover distance 1244 satisfies the first distance threshold 1218, the electronic device 100 displays the solid oval 1248 in FIG. 12F. As yet another example, with reference to FIGS. 12H-12I, in response to detecting that the sixth hover distance 1260 satisfies the first distance threshold 1218, the electronic device 100 displays the bullet point 1264 adjacent to the text box 1266 in FIG. 12I. As yet another example, with reference to FIGS. 12L-12M, in response to determining that the eighth hover distance 1276 satisfies the first distance threshold 1218, the electronic device 100 displays the menu 1280 in FIG. 12M.

In some embodiments, a dispersion pattern of the first user interface element is (1912) based on the distance between the stylus and the touch-sensitive display. Displaying a dispersion pattern based at least in part on data received from the stylus enhances the operability of the electronic device and reduces the number of inputs to the electronic device. Reducing the number of inputs makes the electronic device more efficient, which extends the battery life and reduces wear-and-tear of the electronic device. For example, the first user interface corresponds to a spray paint tool, and the electronic device displays an increasingly dispersed pattern as the hover distance increases and vice versa as the hover distance decreases.

In some embodiments, one or more physical properties of the first user interface element are based (1914) on the distance between the stylus and the touch-sensitive display. Accordingly, wear-and-tear is reduced and battery life is extended because the determined distance, rather than inputs to the touch-sensitive surface of the electronic device, determine the physical properties of the first user interface element. Current systems require an input to the touch-sensitive surface of the electronic device for the electronic device to display a new element or change the appearance of an existing element. The method 1900, on the other hand, allows the electronic device to change what is displayed based on the hover distance, irrespective of a detected input to the touch-sensitive surface of the electronic device. For example, the first user interface element corresponds to a paint blob that splatters in a manner that simulates gravity. For example, the area of the first user element is proportional to the hover distance. As one example, with reference to FIG. 12F-12G, the electronic device 100 displays a splatter mark 1256 in FIG. 12G, the size of which depends on the hover distance.

In some embodiments, the first user interface element corresponds (1916) to a bullet point displayed within an application interface. Displaying a bullet point based at least in part on data received from the stylus enhances the operability of the electronic device and reduces the number of inputs to the electronic device. Reducing the number of inputs makes the electronic device more efficient, which extends the battery life and reduces wear-and-tear of the electronic device. For example, the bullet point is displayed at the location below the stylus at or near the time the electronic device obtains input data indicating an input detected at the stylus. For example, the bullet point is displayed adjacent to (e.g., in front of) a line of text nearest to the location where the stylus was located over the touch-sensitive display at or near the time the electronic device obtains input data indicating an input detected at the stylus. For example, the size (e.g., radius) of the bullet point depends on the hover distance.

As one example, with reference to FIGS. 12H-12I, in response to determining that the sixth hover distance 1260 satisfies the first distance threshold 1218, the electronic device 100 displays the bullet point 1264 adjacent to the text box 1266 in FIG. 12I. In some embodiments, the radius of the bullet point 1264 depends on the sixth hover distance 1260.

In some embodiments, the first user interface element corresponds (1918) to a paint blob displayed within an application interface. Displaying a paint blob based at least in part on data received from the stylus enhances the operability of the electronic device and reduces the number of inputs to the electronic device. Reducing the number of inputs makes the electronic device more efficient, which extends the battery life and reduces wear-and-tear of the electronic device. For example, the application interface corresponds to a notes or drawing application. For example, the paint blob (e.g., the paint/ink blob) is displayed at the location where the stylus was located over the touch-sensitive display at or near the time the electronic device obtains input data indicating an input detected at the stylus. For example, the size (e.g., radius) of the paint/ink blob depends on the hover distance. For example, the splatter pattern (e.g., amount of dispersion) of the paint/ink blob depends on the hover distance.

In some embodiments, the first user interface element corresponds to ink drops, spray paint, throwing paint, pencil marks with varying dispersion pattern, line thicknesses, color, tool type, or the like based on the hover distance. In some embodiments, the electronic device obtains data from the stylus indicating an input detected at the stylus that corresponds to a tap-and-hold gesture and movement of the stylus. For example, the electronic device obtains data from the stylus indicating movement of the stylus, and the electronic device continuously updates the first user interface element as the stylus moves (e.g., spray paint fans across the canvas, line grows in length, etc.).

In some embodiments, in addition to the hover distance, the appearance and/or physical properties of the first user interface element depends on other factors. One factor is accelerometer data associated with the stylus at or near the time the electronic device obtains input data indicating an input detected at the stylus. One factor is force input data associated with the stylus at or near the time the electronic device obtains input data indicating an input detected at the stylus. For example, acceleration and/or force of movement of the stylus when the input on the stylus is detected determines how the user interface element is rendered. One factor is the orientation of stylus at or near the time the electronic device obtains input data indicating an input detected at the stylus. For example, angle of stylus relative to the electronic device affects the first user interface element. One factor is grip type of fingers on stylus at or near the time the electronic device obtains input data indicating an input detected at the stylus. For example, the grip type affects the color of the first user interface element.

In some embodiments, the size of the splatter mark 1256 depends on the hover distance. For example, in FIG. 12F the electronic device 100 displays a splatter mark 1248 when dropping ink from a lower height (e.g., satisfying first distance threshold 1218) and in FIG. 12G displays a splatter mark 1256 when dropping ink from a higher height (e.g., satisfying second distance threshold 1220). Although not depicted, in some embodiments, the electronic device 100 continuously renders (e.g., expands) the splatter mark 1256 as the location of the stylus 203 hovers over different locations of the touch-sensitive surface of the electronic device 100.

In response to obtaining the input data from the stylus: In accordance with a determination that the distance between the stylus and the touch-sensitive display satisfies a second distance threshold when the input was detected at the stylus, the electronic device forgoes (1920) displaying the first user interface element that corresponds to the input. The second distance threshold is different from the first distance threshold.

As one example, with reference to FIGS. 12C-12D, in response to determining that the third hover distance 1236 satisfies the second distance threshold 1220, the electronic device 100 does not display the cube 1224 that was displayed according to satisfaction of the first distance threshold 1218. Rather, as illustrated in FIG. 12D the electronic device 100 displays a third cube 1240 at a larger size. As another example, with reference to FIGS. 12J-12K, in response to determining that the seventh hover distance 1270 satisfies the second distance threshold 1220, the electronic device 100 does not display the bullet 1264 and the associated text 1266 that was displayed according to satisfaction of the first distance threshold 1218. As yet another example, with reference to FIGS. 12N-12O, in response to determining that the ninth hover distance 1284 satisfies the second distance threshold 1220, the electronic device 100 does not display the menu 1280 that was displayed according to satisfaction of the first distance threshold 1218.

With reference to FIG. 19B: In some embodiments the electronic device determines (1922) the distance between the stylus and the touch-sensitive display. In some embodiments, the hover distance is determined based on data from the electronic device, stylus, or a combination thereof. Determining the hover distance based at least in part on data received from the stylus enhances the operability of the electronic device and reduces the number of inputs to the electronic device. Reducing the number of inputs makes the electronic device more efficient, which extends the battery life and reduces wear-and-tear of the electronic device. For example, the electronic device determines the distance by utilizing capacitive sensing, IR, camera, ultrasonic, beacon, etc. As reference, U.S. patent application Ser. No. 14/396,599, filed Oct. 24, 2014 provides additional details regarding determining hover distance, which is incorporated herein by reference in its entirety.

In some embodiments, the electronic device determines (1924) the distance between the stylus and the touch-sensitive display based on data obtained from one or more sensors of the electronic device. Wear-and-tear is reduced and battery life is extended because the electronic device uses the determined distance to decide whether or not to perform certain operations. Consequently, the electronic device receives fewer or no inputs to the touch-sensitive surface of the electronic device in connection with deciding whether or not to perform the operations. For example, the electronic device determines the distance by utilizing its sensors, such as capacitive sensors, IR, camera, ultrasonic, beacon, etc.

In some embodiments, the electronic device determines (1926) the distance between the stylus and the touch-sensitive display based at least in part on data obtained from the stylus. Determining the hover distance based at least in part on data received from the stylus enhances the operability of the electronic device and reduces the number of inputs to the electronic device. Reducing the number of inputs makes the electronic device more efficient, which extends the battery life and reduces wear-and-tear of the electronic device. For example, the electronic device obtains data from the stylus indicating that a location of the stylus relative to the electronic device. For example, the electronic device obtains data from the stylus indicating an input detected at the stylus, such as a gesture (e.g., swipe, tap, flick, etc.). As one example, with reference to FIGS. 12A-12D, the electronic device 100 obtains data from the stylus 203 indicating that the stylus 203 corresponds to three locations above the electronic device 100: a first location 1212, a second location 1226, and a third location 1234. Accordingly, the electronic device 100 displays the first cube 1224a, the second cube 1224b, and the third cube 1240 at respective locations.

In some embodiments, the first user interface element corresponds (1928) to a selection user interface overlaid on an interface, the selection user interface including a plurality of selectable items, wherein a first item among the plurality of selectable items is currently selected within the selection user interface. Displaying a selection user interface based at least in part on data received from the stylus enhances the operability of the electronic device and reduces the number of inputs to the electronic device. Reducing the number of inputs makes the electronic device more efficient, which extends the battery life and reduces wear-and-tear of the electronic device. For example, the selection user interface corresponds to a drawing user interface, such as a drawing canvas optionally including one or more drawn objects. For example, the selection user interface corresponds to a home screen interface, notes application interface, drawing application interface, or the like. For example, the plurality of selectable items corresponds to a plurality of affordances (e.g., menu affordances).

In one example, with reference to FIGS. 12L-12M, in response to determining that the eighth hover distance 1276 satisfies the first distance threshold 1218, the electronic device 100 displays the menu 1280 in FIG. 12M. The menu 1280 includes four visual indicators, with the solid indicator 1280a having focus by default. Each indicator indicates that a corresponding mark would be displayed on the user interface 1206.

In some embodiments, the electronic device (1930): obtains finger manipulation data received from the stylus, wherein the finger manipulation data characterizes one or more finger manipulation inputs received at the stylus; in response to obtaining the finger manipulation data: in accordance with a determination that the finger manipulation data satisfies a navigation criterion, the changes display of the selection user interface in order to indicate movement of focus to a second item among the plurality of selectable items; in accordance with a determination that the finger manipulation data does not satisfy the navigation criterion, the maintains display of the selection user interface, wherein the first item among the plurality of selectable items currently has focus within the selection user interface. Moving focus on the display based on finger manipulation data received from the stylus enhances the operability of the electronic device and reduces the number of inputs to the electronic device. Reducing the number of inputs makes the electronic device more efficient, which extends the battery life and reduces wear-and-tear of the electronic device. For example, the finger manipulation data corresponds to a gesture detected at the stylus (e.g., a swipe to scroll through menu items). For example, the finger manipulation data corresponds to a manipulation of the stylus detected at the stylus, such as rolling the barrel of the stylus (e.g., clockwise or counterclockwise) and twirling the stylus.

In response to obtaining finger manipulation data from the stylus 203, the electronic device 100 changes which selectable item in the menu 1280 has focus. For example, in response to obtaining finger manipulation data from the stylus 203 indicating that the barrel of the stylus 203 has been sufficiently rolled (e.g., rolled at least 15 degrees clockwise or counter/clockwise), the electronic device 100 changes the selectable item having focus. As another example, the electronic device 100 moves focus in a clockwise manner when the stylus is being rolled clockwise (e.g., from solid indicator 1280*a* to the dotted-line indicator type 1280*b*) and in a counter-clockwise manner when the stylus is being rolled counter-clockwise (e.g., from the dotted-line indicator 1280*b* to the solid indicator 1280*a*). In one example, with reference to FIGS. 12L-12M, in response to determining that the eighth hover distance 1276 satisfies the first distance threshold 1218, the electronic device 100 displays the menu 1280 in FIG. 12M.

In some embodiments, a visual indicator indicates which selectable item has focus. For example, the visual indicator corresponds to a star or other icon nearby the selectable item in focus, a ring around the selectable item that has focus, enlarging the selectable item in focus, changing the color or appearance of the selectable item that has focus, etc. In some embodiments, the selection user interface corresponds to a file list, color list, list of tool types (e.g., pencil, smudge, eraser, etc.). In some embodiments, the selection user interface corresponds to is a parade menu, carousel menu, radial menu, straight line (horizontal or vertical oriented) menu, z-order menu, etc. In some embodiments, the navigation criterion corresponds to an amount of angular roll, amount of time of roll, extent of angular manipulation of the stylus, etc.

In some embodiments, the electronic device selects (1932) the second item from the selection user interface in response to pausing movement of the stylus relative to the user's fingers for a predetermined duration while the second item is in focus. Selecting an item based on data received from the stylus indicating paused movement at the stylus enhances the operability of the electronic device and reduces the number of inputs to the electronic device. Reducing the number of inputs makes the electronic device more efficient, which extends the battery life and reduces wear-and-tear of the electronic device. In some embodiments, after selection of the second selectable item, the selection user interface is replaced with a submenu including additional selectable items associated with the second selectable item.

In one example, with reference to FIGS. 12L-12M, in response to determining that the eighth hover distance 1276 satisfies the first distance threshold 1218, the electronic device 100 displays the menu 1280 in FIG. 12M. In response to obtaining manipulation data from the stylus 203 indicating a swipe at the stylus 203, the electronic device 100 changes focus from the solid indicator 1280*a* to the dotted-line indicator 1280*b*. In response to obtaining manipulation data from the stylus 203 or a lack thereof indicating that the movement of the fingers on the stylus 203 has stopped for a sufficiently long amount of time (e.g., two seconds), the electronic device 100 maintains focus on the dotted-line indicator 1280*b*.

In some embodiments, the electronic device selects (1934) the second item from the selection user interface in response to obtaining second finger manipulation data indicating a tap input on the stylus while the second item is in focus. Selecting an item based on finger manipulation data received from the stylus indicating a tap input at the stylus enhances the operability of the electronic device and reduces the number of inputs to the electronic device. Reducing the number of inputs makes the electronic device more efficient, which extends the battery life and reduces wear-and-tear of the electronic device. For example, the tap input is detected based on touch information from a touch-sensitive surface of the stylus or one or more motion sensors such as an accelerometer and/or magnetometer. As one example, with reference to FIGS. 12L-12M, in response to determining that the eighth hover distance 1276 satisfies the first distance threshold 1218, the electronic device 100 displays the menu 1280 in FIG. 12M. Continuing with this example, the electronic device 100 obtains data from the stylus indicating a tap input, and in response moves focus from the solid mark indicator 1280*a* to the dotted-line indicator 1280*b* (not shown).

With reference to FIG. 19C: In some embodiments, while displaying the first user interface element that corresponds to the input at a first location that corresponds to the first portion of the touch-sensitive display the electronic device (1936): obtains second input data from the stylus via the communication interface corresponding to a second input detected at the stylus while the stylus was over a second portion of the touch-sensitive display; in response to obtaining the second input data: in accordance with the determination that the distance between the stylus and the touch-sensitive display satisfies the first distance threshold when the input was detected at the stylus, displays the first user interface element that corresponds to the second input at a second location that corresponds to the second portion of the touch-sensitive display that the stylus was over when the second input was detected at the stylus; and in accordance with the determination that the distance between the stylus and the touch-sensitive display satisfies the second distance threshold when the input was detected at the stylus, forgoes displaying the first user interface element that corresponds to the second input. Displaying a user element based at least in part on data received from the stylus indicative of hover distance of the stylus enhances the operability of the electronic device and reduces the number of inputs to the electronic device. Reducing the number of inputs makes the electronic device more efficient, which extends the battery life and reduces wear-and-tear of the electronic device. For example, the second input data corresponds to a tap on stylus, voice command, tap on canvas or affordance displayed on electronic device (e.g., the iPad® device from Apple Inc. of Cupertino, Calif.), etc. For example, displaying the first user element corresponds to displaying the same mark, menu, bullet point, etc. at a new location while maintaining the previous mark, menu, bullet point, etc. at the first location. As one example, with reference to FIGS. 12A-12C, in response to determining that the first hover distance 1216 satisfies the first distance threshold 1218, in FIG. 12B the electronic device 100 displays the first cube 1224*a* corresponding to the first location 1212. Continuing with this example, in response to determining that the second hover distance 1228 satisfies the first distance threshold 1218, in FIG. 12C the electronic device 100 displays the second cube 1224*b* corresponding to the second location 1226; wherein the first cube 1224*a* and the second cube 1224*b* correspond to the same user interface element (e.g., the same cube).

In some embodiments, in accordance with the determination that the distance between the stylus and the touch-sensitive display satisfies the second distance threshold when the input was detected at the stylus, the electronic device displays (1938) a second user interface element that corresponds to the input, wherein the second user interface element is different from the first user interface element. Displaying a user element based at least in part on data received from the stylus indicative of hover distance of the stylus enhances the operability of the electronic device and reduces the number of inputs to the electronic device. Reducing the number of inputs makes the electronic device more efficient, which extends the battery life and reduces wear-and-tear of the electronic device. For example, the second user interface element corresponds to a variation of the first user interface element such as a different sized bullet point, shape, figure, object, line, paint/ink blob, etc. As one example, with respect to FIGS. 12A-12C, according to satisfaction of the second distance threshold 1220 the electronic device 100 displays a third cube 1240 that is larger than cubes 1224a and 1224b that the electronic device 100 displays according to satisfaction of the first distance threshold 1218. As another example, with respect to FIGS. 12E-12G, according to satisfaction of the second distance threshold 1220 the electronic device 100 displays a splatter mark 1256 that is different from the solid oval 1248 that the electronic device 100 displays according to satisfaction of the first distance threshold 1218.

It should be understood that the particular order in which the operations in FIGS. 19A-19C have been described is merely an example and is not intended to indicate that the described order is the only order in which the operations could be performed. One of ordinary skill in the art would recognize various ways to reorder the operations described herein.

The operations described above with reference to FIGS. 19A-19CF are, optionally, implemented by components depicted in FIGS. 1A-1B. For example, obtain operations 1902 and 1930, determination operations 1910 and 1920, and response operation 1936 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186 and determines whether a first contact (or near contact) at a first location on the touch-sensitive surface (or whether rotation of the electronic device) corresponds to a predefined event or sub-event, such as selection of an object on a user interface, or rotation of the electronic device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Note that details of the processes described above with respect to method 1900 are also applicable in an analogous manner to other methods described herein (e.g., 1400, 1500, 1600, 1700, 1800, 2400, 2500, 2600, 2700). For example, the stylus, input data, display, and communication interface described above with reference to method 1900 optionally have one or more of the properties of the stylus, input data, display, and communication interface described herein with reference to other methods described herein (e.g., 1400, 1500, 1600, 1700, 1800, 2400, 2500, 2600, 2700).

FIGS. 20A-20W are illustrations of example user interfaces providing an interactive stylus tutorial in accordance with some embodiments. The user interfaces in these figures are used to illustrate the processes described below, including portions of the processes in FIGS. 24A-24C. Although some of the examples which follow will be given with reference to inputs on a touch-screen display (where the touch-sensitive surface and the display are combined, for example on touch screen 112), in some embodiments, an electronic device 100a detects inputs on touch-sensitive surface 651 that is separate from display 650, as shown in FIG. 6B.

As will be described below, in various embodiments, the electronic device 100a includes a first sensor 2006 and the stylus 203 includes a second sensor 2008. The first sensor 2006 and the second sensor 2008 collectively enable the electronic device 100a to detect that the electronic device 100a is proximate to the stylus 203. In some embodiments, the first sensor 2006 corresponds to the proximity sensor 166 in FIG. 1A. In some embodiments, the second sensor 2008 corresponds to the proximity sensor 466 in FIG. 4.

In various embodiments, the touch-sensitive surface (e.g., the touch-sensitive surface 275 in FIG. 2 and FIGS. 5A-5B) of the stylus 203 detects touch inputs and gesture inputs, or a lack thereof. Based on these detected inputs, the stylus 203 provides corresponding data to the electronic device 100a. For example, in some embodiments, the stylus 203 provides data to the electronic device 100a indicative of one or more of the following: whether the stylus is being held, a flick gesture, a swipe gesture, a tap gesture, a double tap gesture, and/or the like.

In various embodiments, the orientation and/or movement sensors (e.g., accelerometer, magnetometer, and gyroscope) of the stylus 203 detect orientation/movement inputs or a lack thereof. Based on these detected inputs, the stylus 203 provides corresponding data to the electronic device 100a. For example, in some embodiments, the stylus 203 provides data to the electronic device 100a indicative of one or more of the following: whether the stylus is being held, barrel rotation and/or direction thereof, twirl and/or direction thereof, orientation (e.g., position) of the tip 276 and/or the end 277 of the stylus 203 relative to a reference plane, and/or the like.

FIGS. 20A-20D are examples of the electronic device 100a displaying a stylus tutorial interface based on proximity between the electronic device 100a and the stylus 203. As illustrated in FIG. 20A, the electronic device 100a displays a user interface 2002 corresponding to a home screen. The user interface 2002 includes a matrix of application icons (e.g., Apps) arranged in a main area 2004 of the display. The user interface 2002 further includes a dock 2010 that includes a row of dock icons. One of ordinary skill in the art will appreciate that the number and arrangement of application icons and/or dock icons can differ. One of ordinary skill in the art will further appreciate that the user interface 2002 may include any number of a variety of user interface elements.

As illustrated in FIG. 20A, the stylus 203 moves within the proximity of the first sensor 2006 at the electronic device 100a. In response to detecting that the stylus is proximate to the electronic device 100a, the electronic device 100a pairs the electronic device 100a with the stylus 203. In various embodiments, the electronic device 100a detects that the stylus 203 is proximate to the electronic device 100a when the stylus 203 is sufficiently close to (e.g., 1 cm away from) the first sensor 2006 of the electronic device 100a yet not contacting the electronic device 100a. For example, in some embodiments, radio frequency (RF) communications (e.g., 802.11x, peer-to-peer WiFi, BLUETOOTH, etc.) between the electronic device 100a and the stylus 203 inform the electronic device 100a that the stylus 203 is proximate to the electronic device 100a. In various embodiments, the electronic device 100a detects that the stylus 203 is proximate to the electronic device 100a when the stylus 203 is contacting the electronic device 100a at a connection point on the electronic device 100a. For example, in some embodiments, the electronic device 100a detects that the stylus is proximate to the electronic device 100a when the stylus 203 is contacting a side of the electronic device 100a at which the first sensor 2006 of the electronic device 100a resides, as illustrated in FIG. 20B.

Figure 20B:
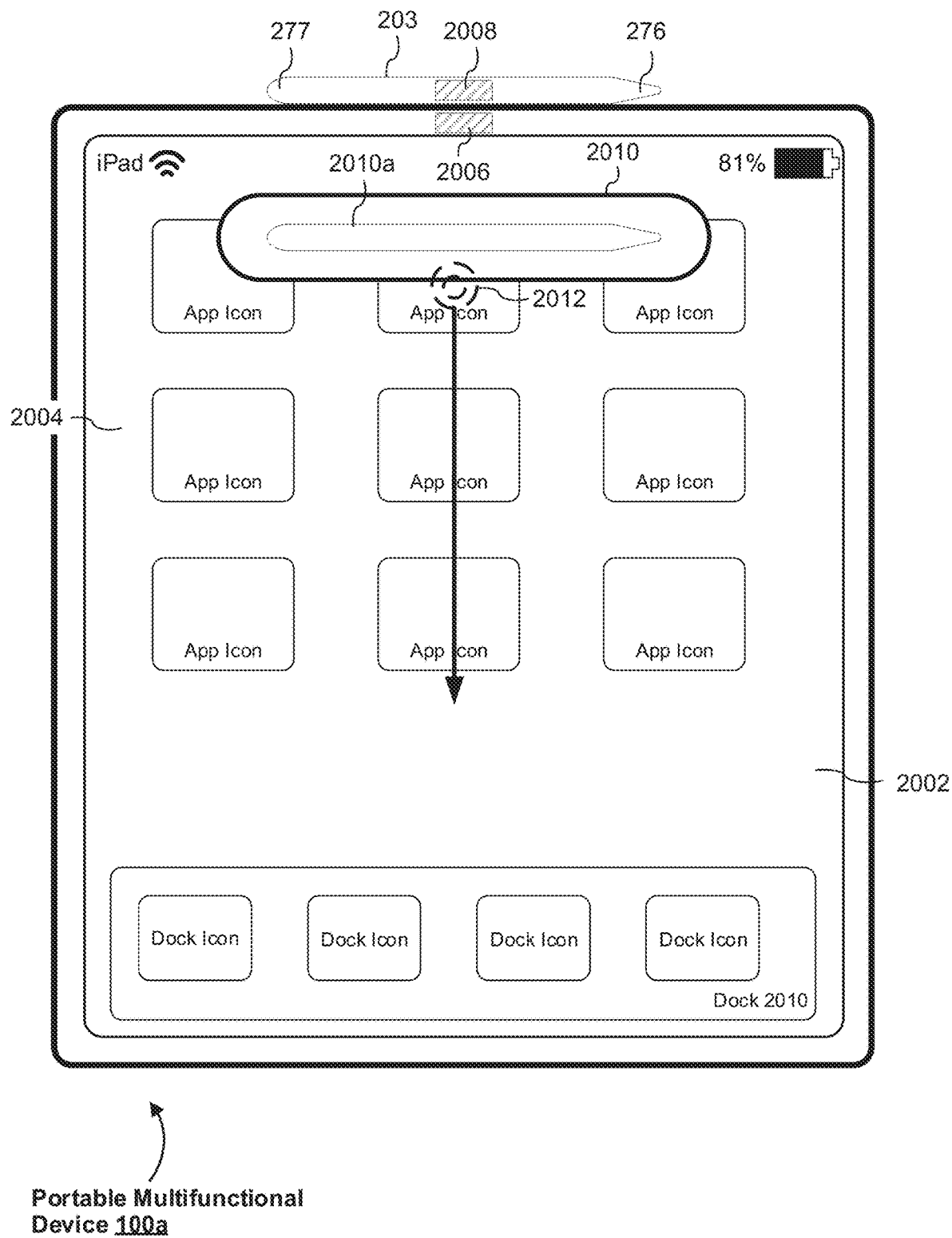
Figure 20C:
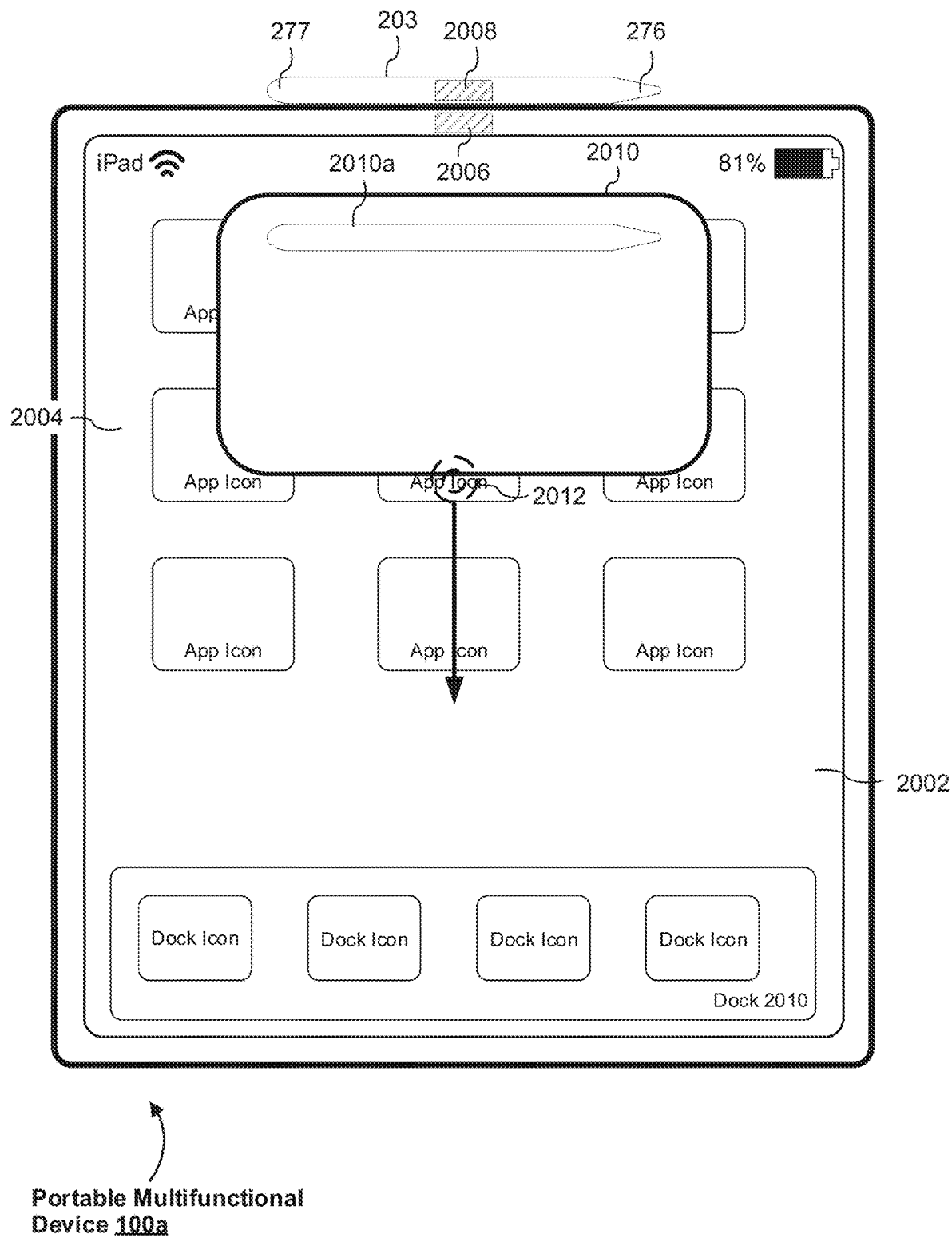
Figure 20D:
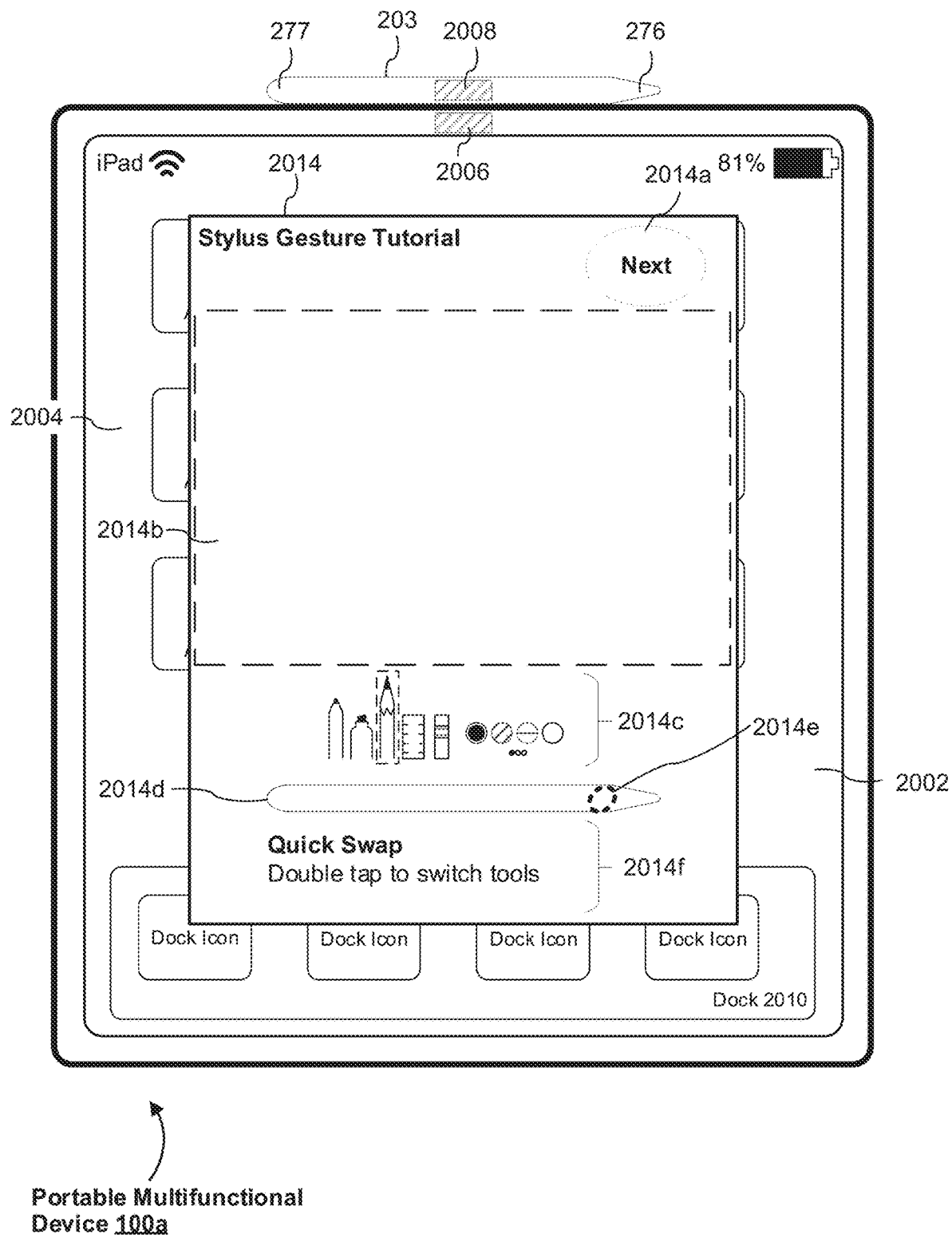
Figure 21A:
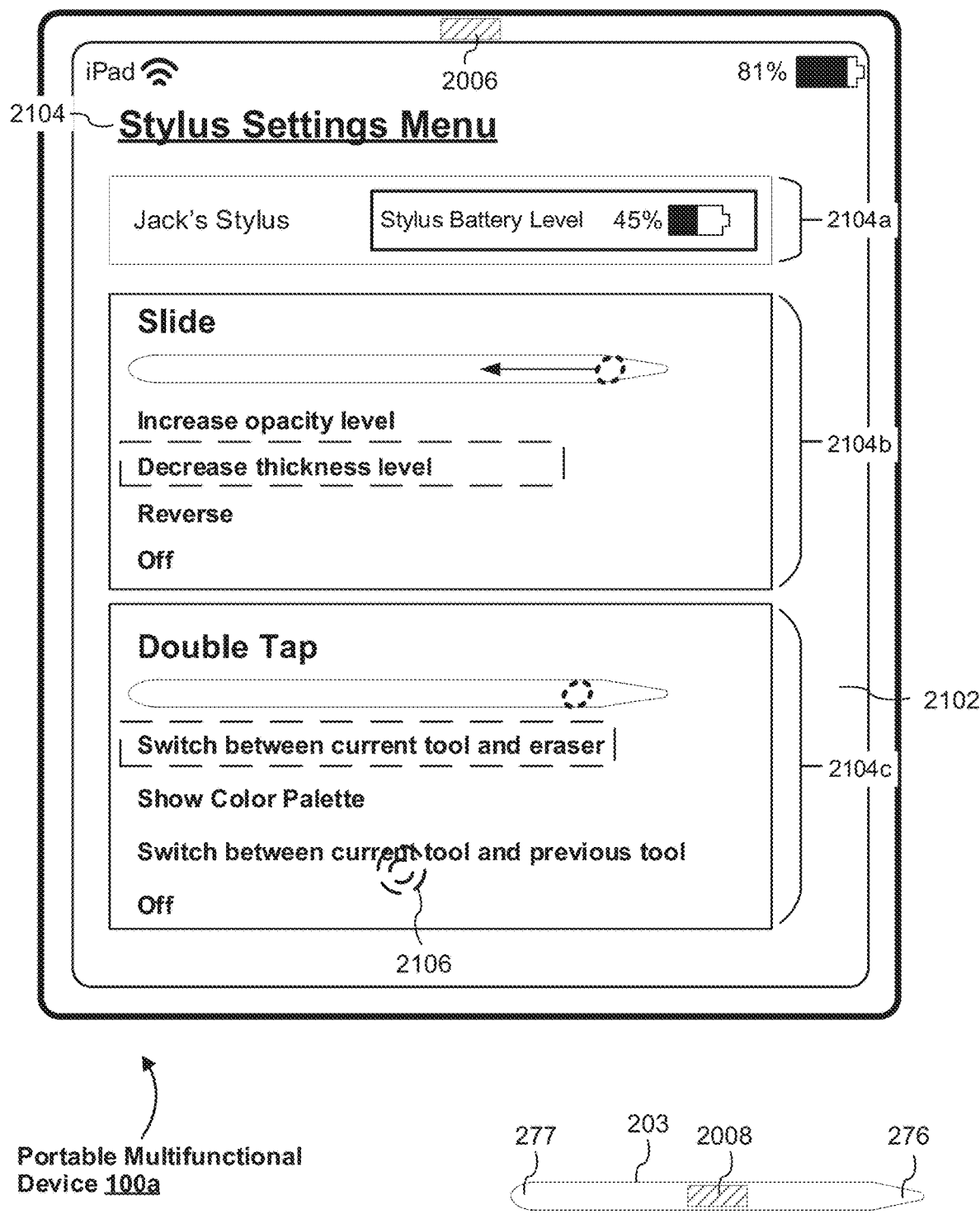
FIGS. 21A-21AB are illustrations of example user interfaces for selecting stylus settings and drawing marks based on the stylus settings in accordance with some embodiments.

As illustrated in FIG. 20B, in response to detecting that the stylus 203 is proximate to (e.g., in contact with) the electronic device 100a, the electronic device 100a displays a stylus paired indicator 2010. The stylus paired indicator 2010 includes a representation of the stylus 2010a. The electronic device 100a detects a drag down input 2012 corresponding to the stylus paired indicator 2010 in FIG. 20B. In response to detecting the drag down input 2012 in FIG. 20B, the electronic device 100a expands the stylus paired indicator 2010 downwards according to the drag down input 2012, as illustrated in FIG. 20C. As illustrated in FIG. 20D, in response to completion of the drag down input 2012, the electronic device 100a ceases display of the stylus paired indicator 2010 and displays a stylus tutorial interface 2014. In some embodiments, the electronic device 100a displays the stylus tutorial interface 2014 in response to detecting proximity to the stylus 203 without user intervention. For example, in some embodiments, the electronic device 100a displays the stylus tutorial interface 2014 irrespective of detecting the drag down input 2012.

The stylus tutorial interface 2014 includes a number of features for facilitating an interactive stylus tutorial. The stylus tutorial interface 2014 includes a "next" affordance 2014a for switching between stylus tutorials. The stylus tutorial interface 2014 also includes a canvas 2014b, such as a scratchpad, on which a user may perform drawing operations. The stylus tutorial interface 2014 also includes a set of drawing affordances 2014c, including a set of drawing tools and selectable colors and/or patterns. As illustrated in FIG. 20D, the currently active drawing tool is a pencil. The stylus tutorial interface 2014 also includes a stylus representation 2014d and thereon a gesture animation 2014e (e.g., tap, double tap, slide up, slide down, etc.). As illustrated in FIG. 20D, the electronic device 100a displays a double-tap gesture animation 2014e. The stylus tutorial interface 2014 also includes a gesture indicator 2014f The gesture indicator 2014f indicates the currently displayed gesture animation; as illustrated in FIG. 20D, a double tap. The gesture indicator 2014f also indicates a resulting operation performed by the electronic device 100a in response to obtaining data from the stylus 203 indicative of the gesture (e.g., a double tap) performed at the stylus 203.

Figure 20E:
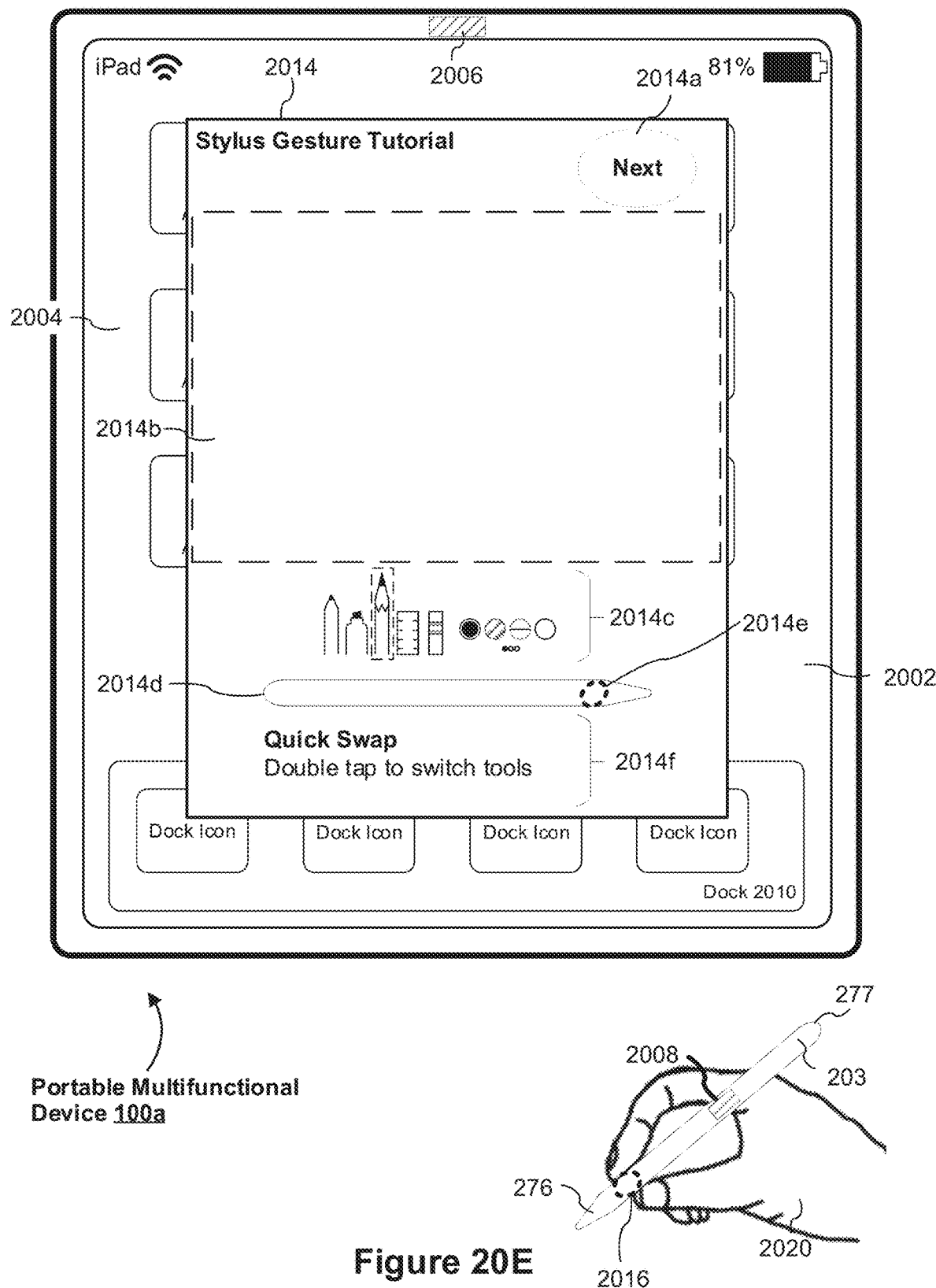
Figure 20G:
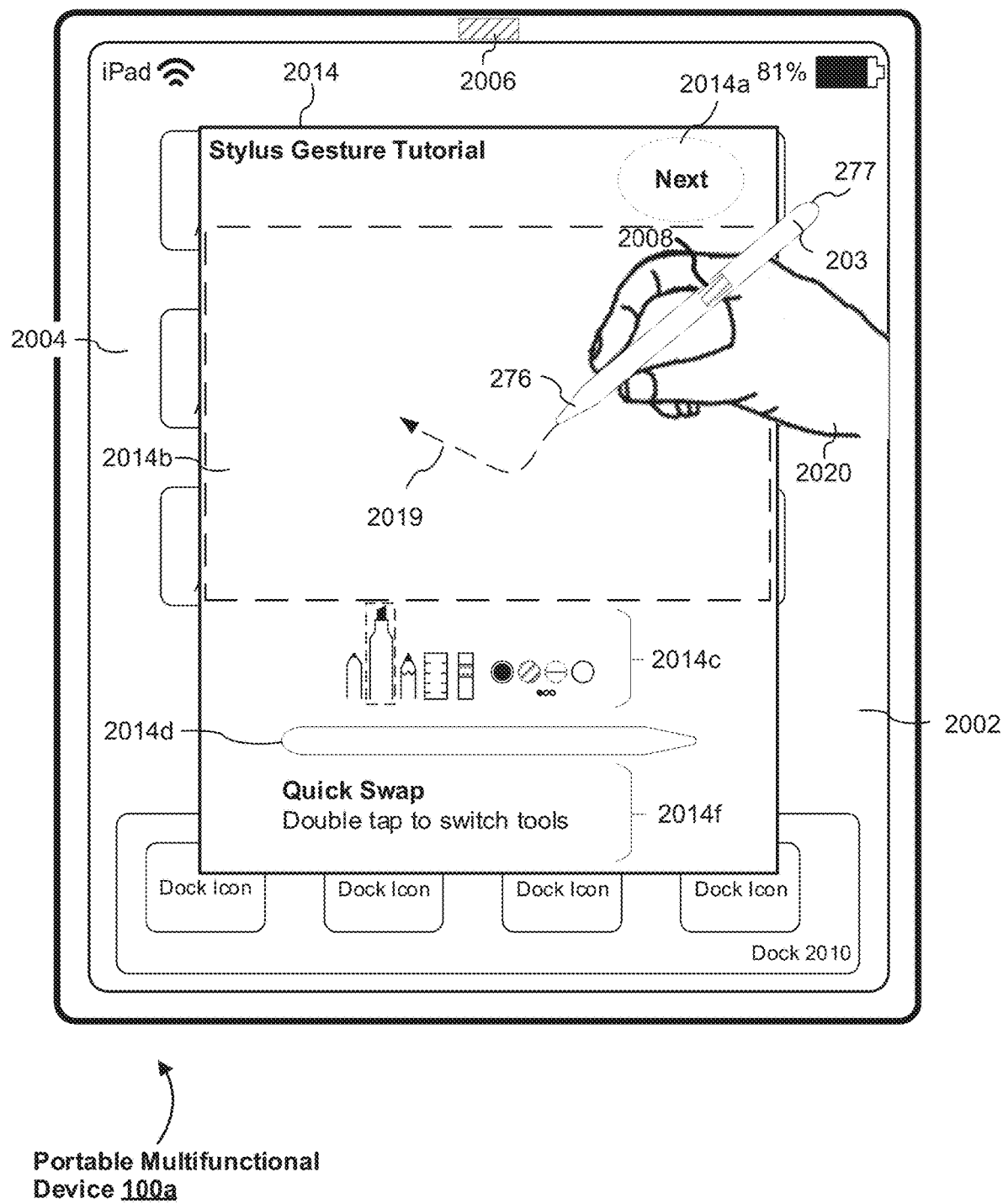
Figure 20H:
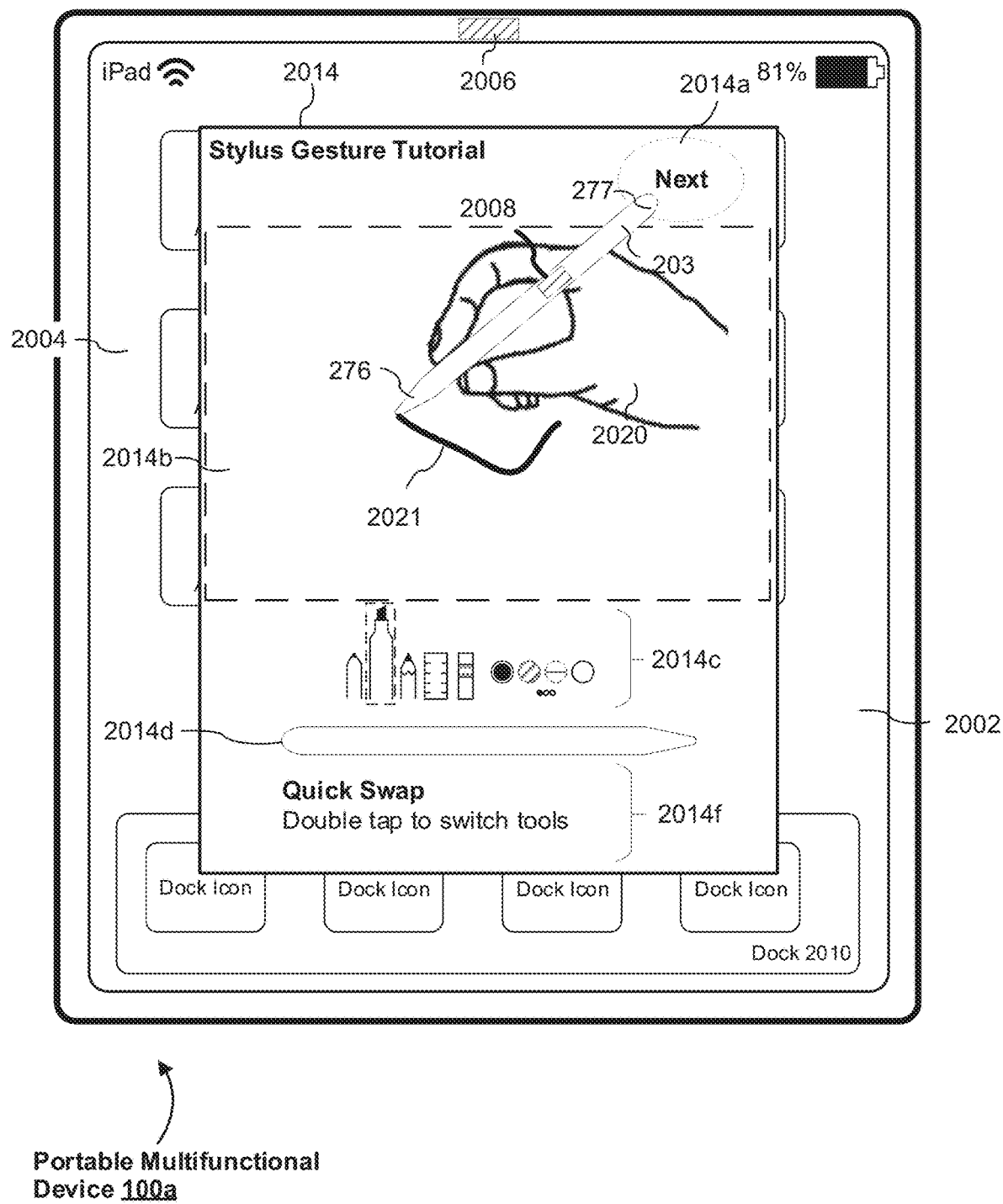
Figure 20I:
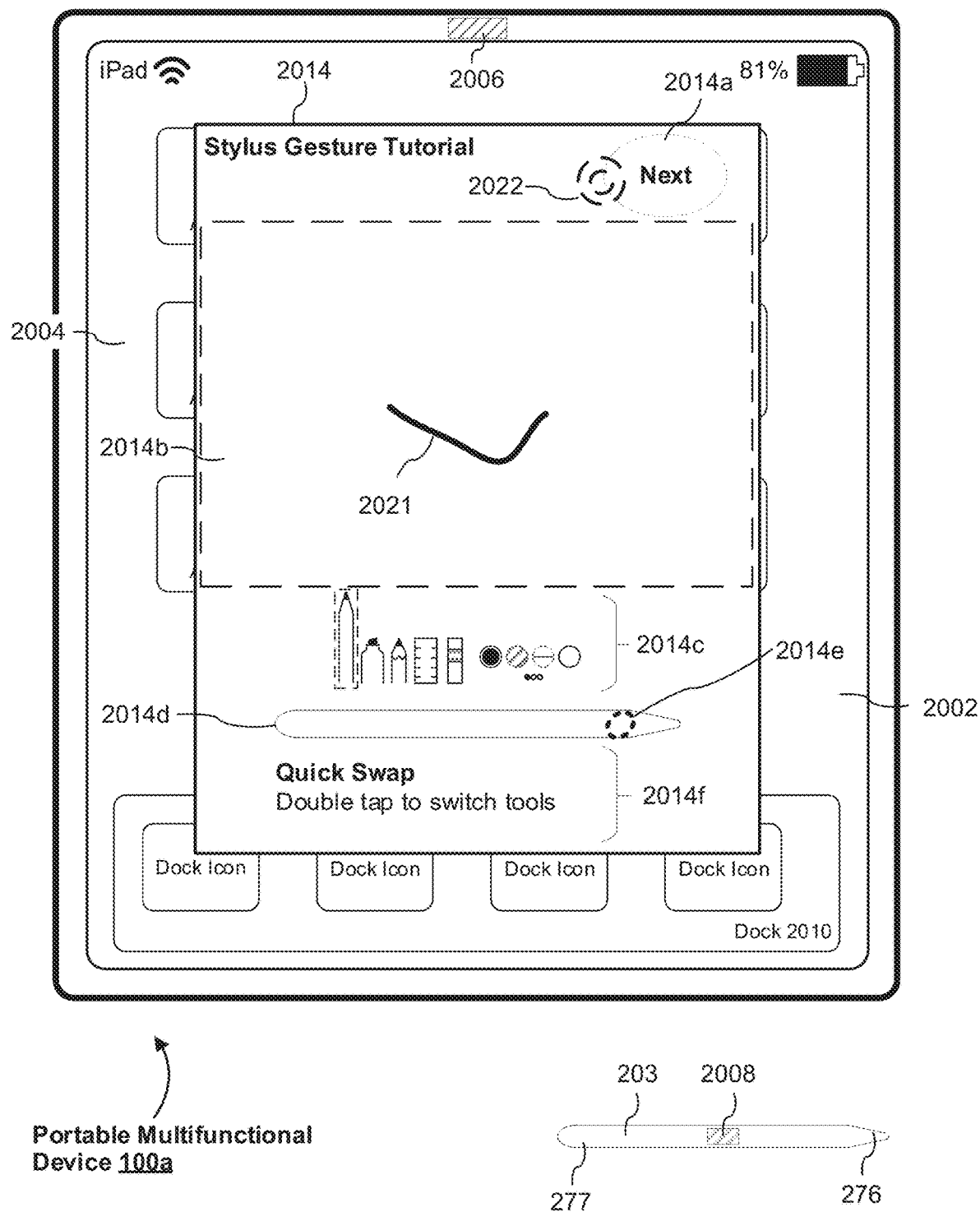
Figure 20J:
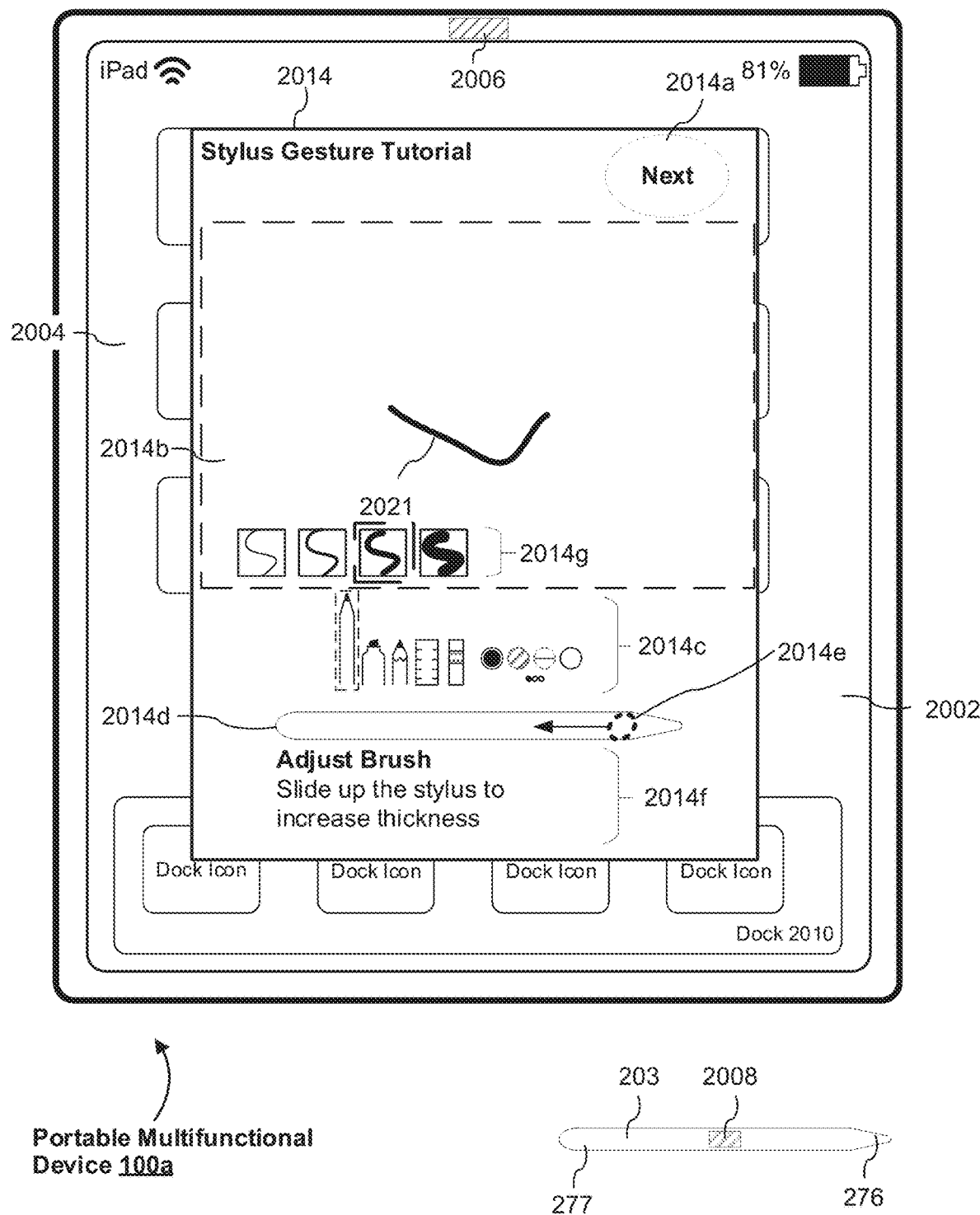
Figure 20M:
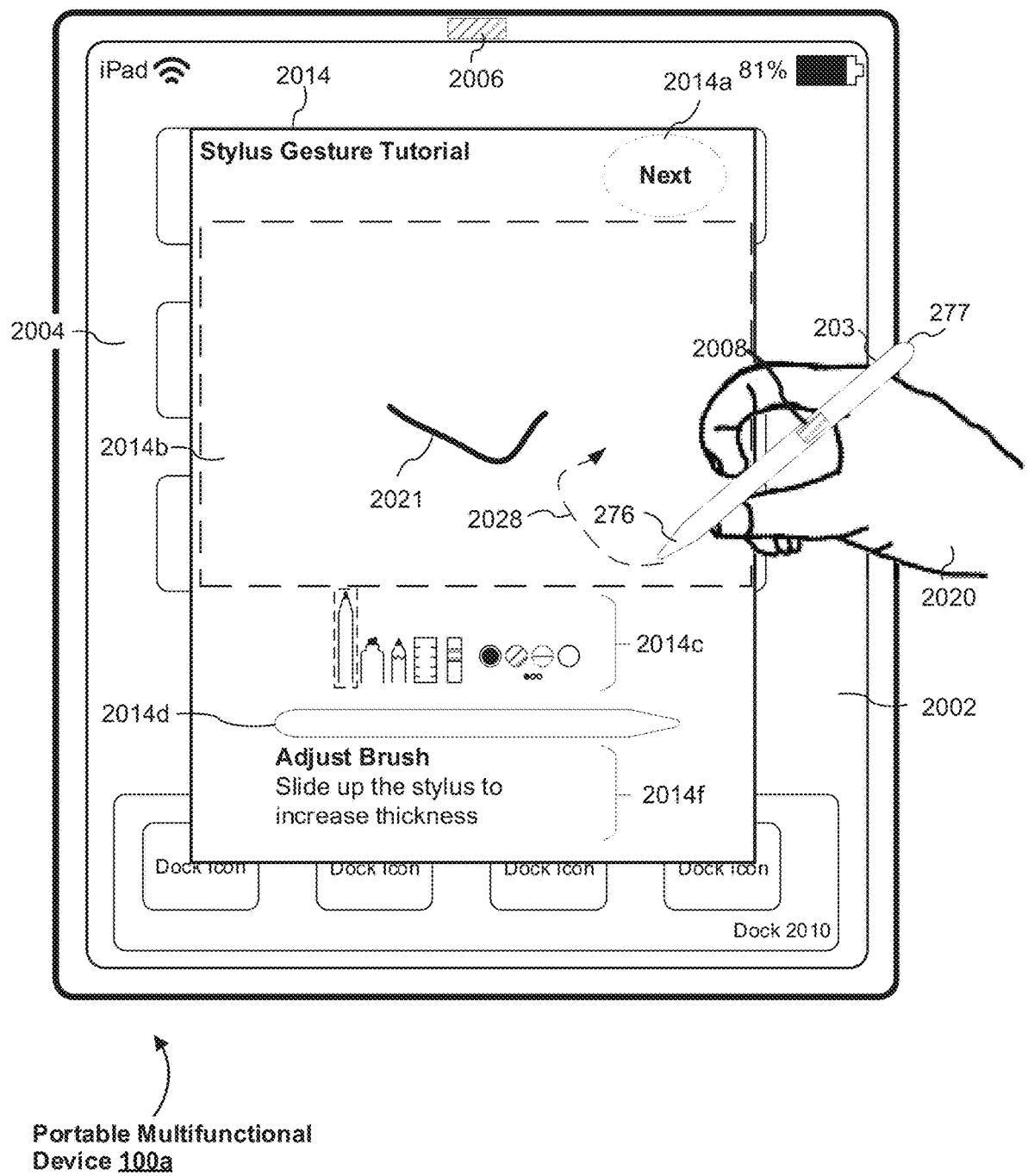
Figure 20N:
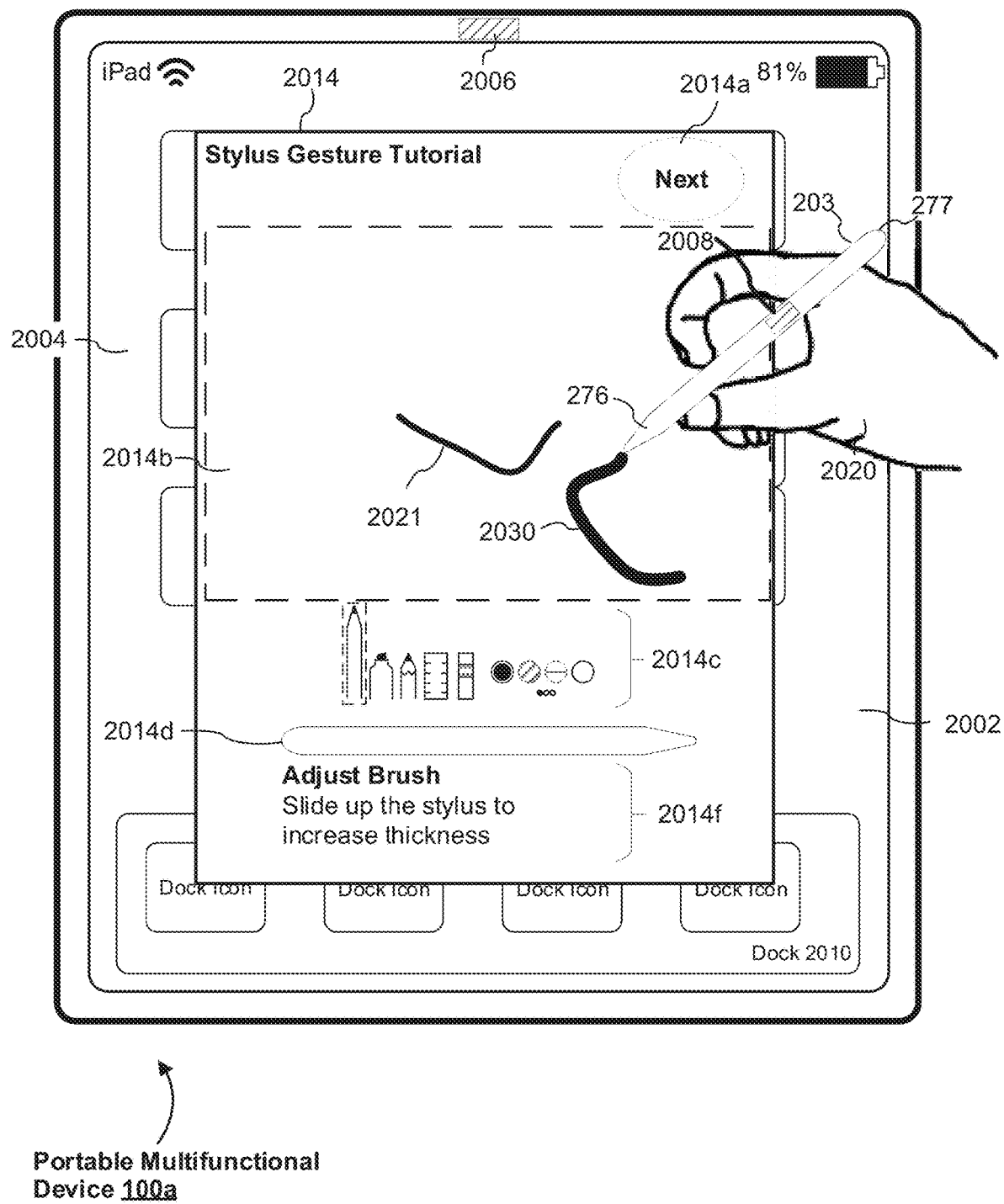
Figure 20P:
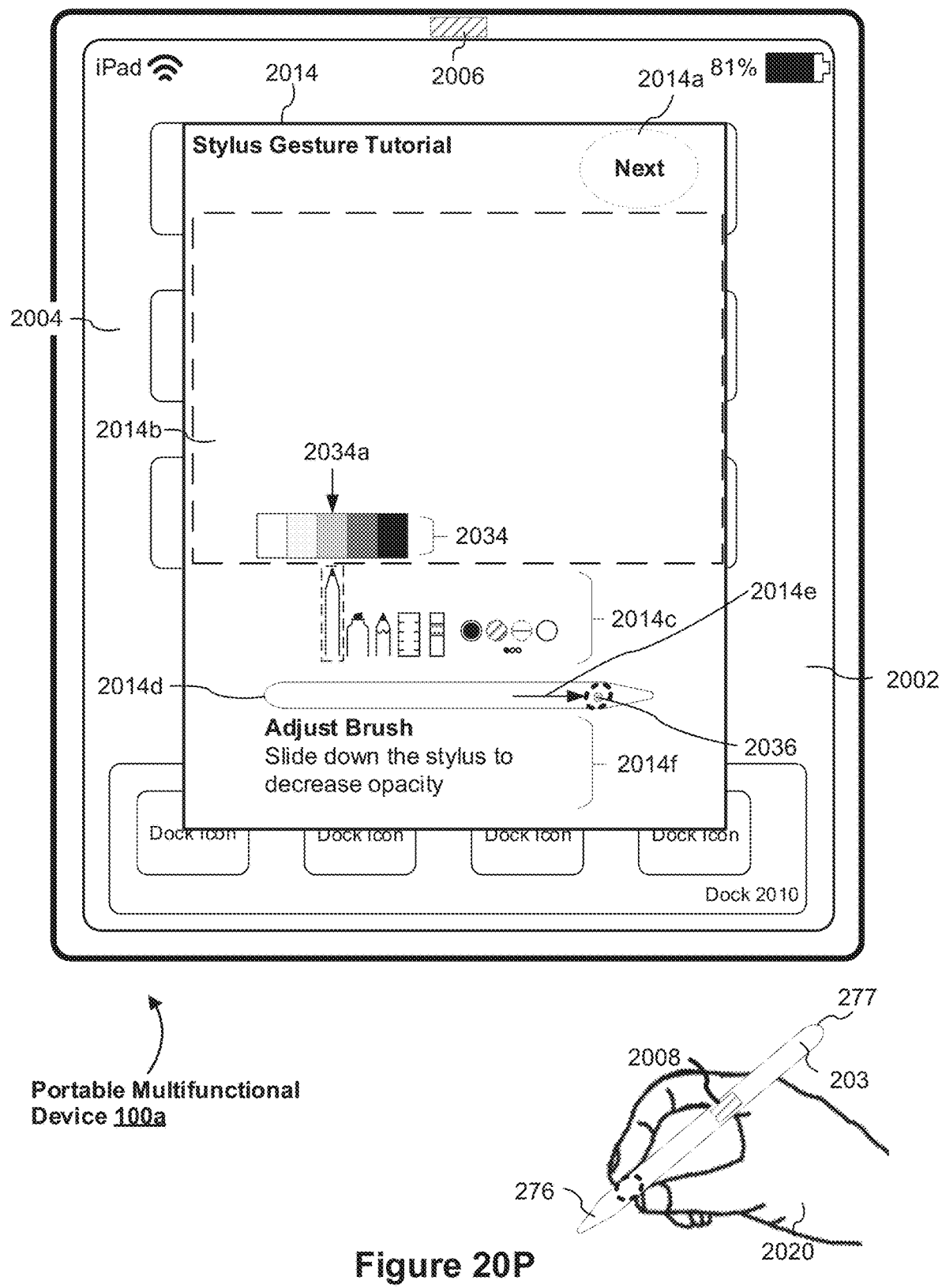
Figure 20Q:
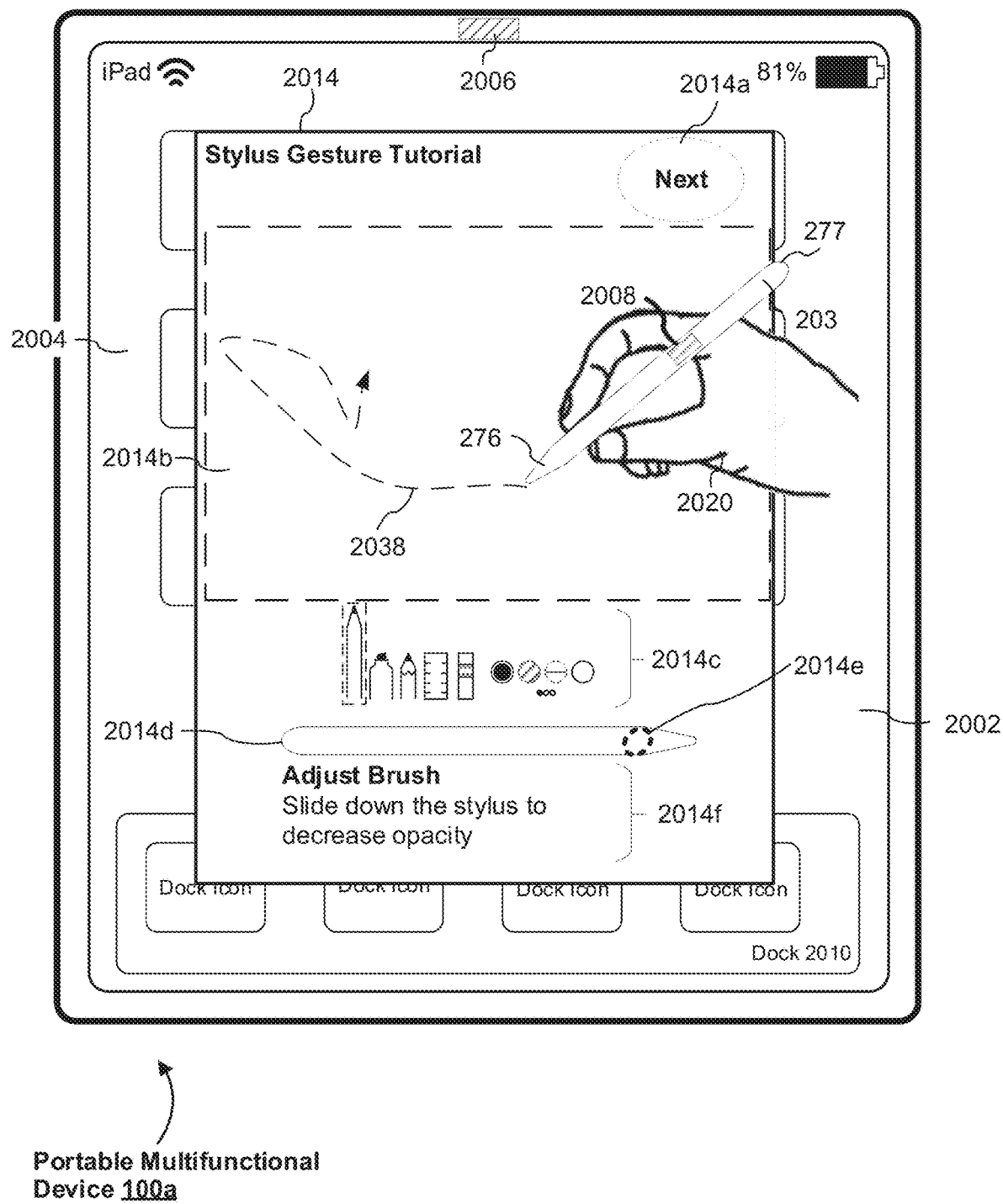
Figure 20R:
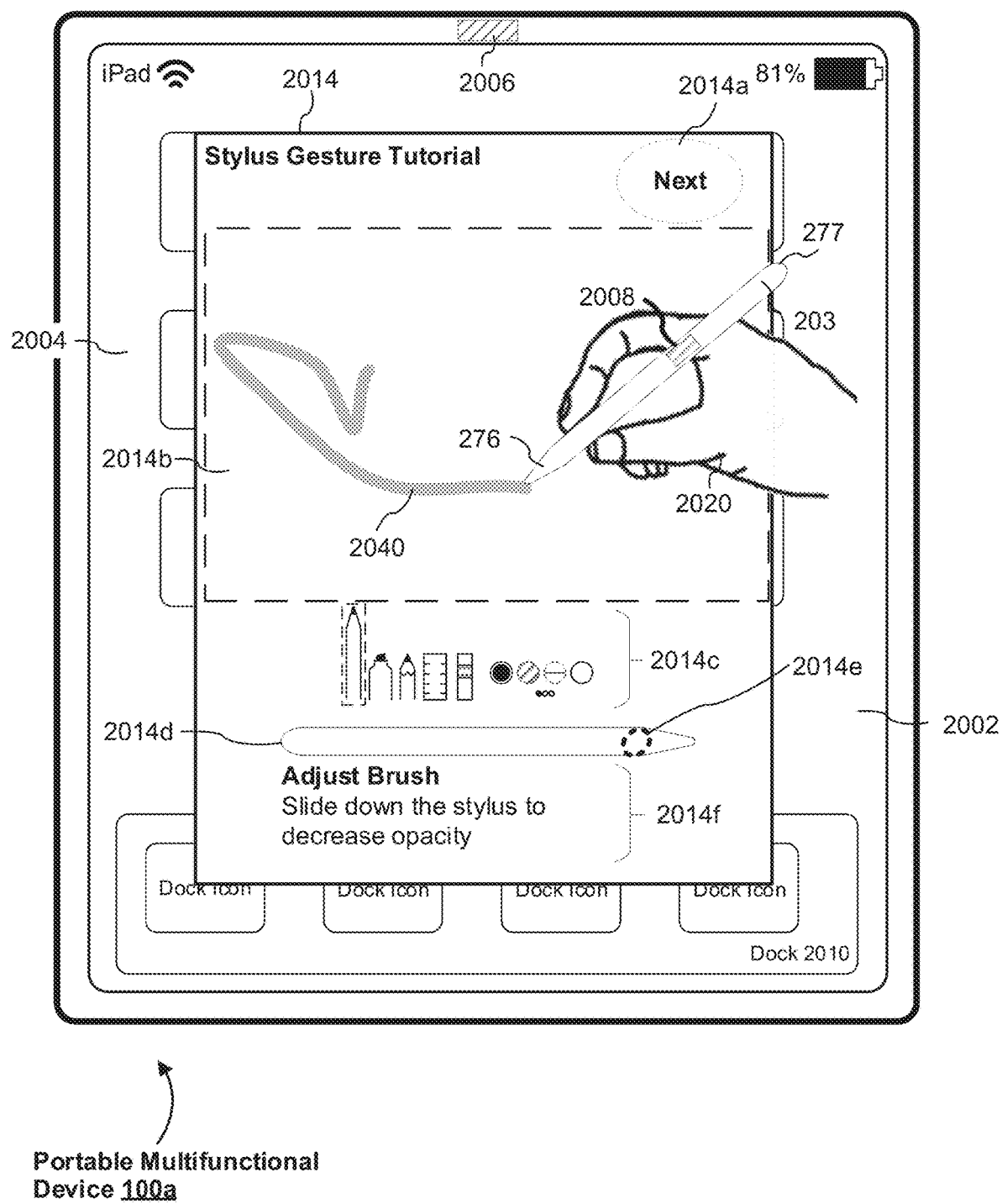

FIGS. 20E-20R are examples of the electronic device 100a displaying a stylus tutorial and performing various operations within the stylus tutorial in response to obtaining finger manipulation data from the stylus 203. As illustrated in FIG. 20E, the stylus 203 is being held by a hand 2020 (e.g., the right hand) of a user. The electronic device 100a obtains finger manipulation data from the stylus 203 via a communication interface. The finger manipulation data indicates a finger manipulation input received by the stylus 203. As illustrated in FIG. 20E, the finger manipulation input received by the stylus 203 corresponds to a first tap 2016 of a double tap gesture. As illustrated in FIG. 20F, the finger manipulation input received by the stylus 203 corresponds to a second tap 2017 of the double tap gesture.

Because the double tap gesture at the stylus 203 corresponds to the running double tap stylus tutorial, the electronic device 100a performs the corresponding tool change operation. Namely, as illustrated in FIG. 20F, the electronic device 100a switches the active drawing tool, moving focus from the pencil to a marker within the set of drawing affordances 2014c. Moreover, the electronic device 100a displays a double tap gesture indicator 2018 within the stylus representation 2014d in order to indicate that the electronic device 100a detects the double tap gesture 2016 and 2017 at the stylus 203.

As illustrated in FIG. 20G, the electronic device 100a detects a drawing operation 2019 on the canvas 2014b by the stylus 203. In response to detecting the drawing operation 2019 in FIG. 20G, the electronic device 100a displays, as illustrated in FIG. 20H, a corresponding mark 2021 having characteristics of the currently active marker tool (e.g., the marker tool).

As illustrated in FIG. 20I, the stylus 203 is no longer being held by the user. Nevertheless, the electronic device 100a continues with the stylus tutorial and continues to display the double tap gesture animation 2014e, including moving focus from the marker tool to a pen tool. Moreover, the electronic device 100a detects an input 2022 corresponding to the "next" affordance 2014a.

In response to detecting the input 2022 of FIG. 20I, the electronic device 100a changes from the double tap gesture tutorial to a slide up gesture tutorial as illustrated in FIG. 20J. As indicated by the gesture indicator 2014f, a slide up gesture at the stylus 203 results in an increase in the thickness of subsequently generated marks. One of ordinary skill in the art will appreciate that other embodiments include a different combination of slide direction and/or resulting operation. Moreover, the electronic device 100a displays a corresponding slide up animation 2014e and a thickness indicator 2014g within the canvas 2014b in FIG. 20J.

As illustrated in FIG. 20K, the stylus 203 is being held by the hand 2020 of the user, and the electronic device 100a obtains finger manipulation data indicating a slide up gesture 2024 at the stylus 203.

Because the slide up gesture 2024 at the stylus 203 corresponds to the running slide up stylus tutorial, the electronic device 100a performs the corresponding thickness increase operation. Namely, the electronic device 100a increases the mark thickness, as indicated by moving focus to a thicker line within the thickness indicator 2014g between FIGS. 20K and 20L. As further illustrated in FIG. 20L, the electronic device 100a displays a slide up gesture indicator 2026 within the stylus representation 2014d in order to indicate that the electronic device 100a detects the slide up gesture 2024 at the stylus 203.

As illustrated in FIG. 20M, the electronic device 100a detects a drawing operation 2028 on the canvas 2014b by the stylus 203. As illustrated in FIG. 20N, in response to detecting the drawing operation 2028, the electronic device 100a ceases display of the thickness indicator 2014g and displays a mark 2030 corresponding to the drawing operation 2028. Notably, the mark 2030 is thicker than the mark 2021 due to the thickness increase operation in FIGS. 20K and 20L.

In some embodiments, as illustrated in FIG. 20O, the stylus gesture tutorial 2014 corresponds to a slide down gesture for changing mark opacity. Namely, the gesture indicator 2014f in FIG. 20O indicates that a sliding down gesture results in a decrease to mark opacity. One of ordinary skill in the art will appreciate that some embodiments include a different combination of slide direction and/or resulting operation. Moreover, the gesture animation 2014e corresponds to a slide down animation.

As further illustrated in FIG. 20O, the electronic device 100a obtains finger manipulation data indicating a slide down gesture 2032 at the stylus 203. In response to obtaining the finger manipulation data indicating a slide down gesture 2032, the electronic device 100a displays an opacity indicator 2034 within the canvas 2014b in FIG. 20O. The opacity indicator 2034 includes a current opacity indicator 2034a (e.g., an arrow) indicating that the highest opacity is currently selected.

Because the slide down gesture 2032 at the stylus 203 corresponds to the running slide down stylus tutorial, the electronic device 100a performs the corresponding opacity decrease operation. Namely, the electronic device 100a decreases the opacity level, as indicated by moving the current opacity indicator 2034a to a lower opacity level between FIGS. 20O and 20P. As illustrated in FIG. 20P, in response to obtaining the finger manipulation data indicating a slide down gesture 2032, the electronic device 100a displays a corresponding slide down animation 2014e. As further illustrated in FIG. 20P, the electronic device 100a displays a slide down animation 2036 within the stylus representation 2014d in order to indicate that the electronic device 100a detects the slide down gesture 2032 at the stylus 203 in FIG. 20O.

As illustrated in FIG. 20Q, the electronic device 100a detects a drawing operation 2038 on the canvas 2014b by the stylus 203. In response to detecting the drawing operation 2038, the electronic device 100a ceases display of the opacity indicator 2034, as illustrated in FIG. 20Q. As illustrated in FIG. 20R, the electronic device 100a displays a corresponding mark 2040 having characteristics of the opacity level resulting from the slide down stylus gesture 2032 in FIG. 20O.

FIGS. 20S-20W are examples of the electronic device 100a displaying various status indicators providing status information about the stylus 203. As illustrated in FIG. 20S, the stylus 203 again moves within the proximity of the first sensor 2006 at the electronic device 100a. In response to detecting that the stylus is proximate (e.g., based on the mechanisms described above with respect to FIGS. 20A and 20B) to the electronic device 100a, the electronic device 100a pairs the electronic device 100a with the stylus 203.

However, because the stylus 203 was previously paired with the electronic device 100a in FIG. 20B, the electronic device 100a foregoes displaying the stylus paired indicator 2010 that was displayed in FIG. 20B. Rather, as illustrated in FIG. 20T, in response to detecting that the stylus 203 is proximate to (e.g., in contact with) the electronic device 100a, the electronic device 100a displays a stylus status bar 2042. The stylus status bar 2042 includes a stylus battery level indicator 2042a providing the current stylus battery level and a stylus user identifier 2042b providing an identification of a user currently associated with the stylus 203. In some embodiments, as illustrated in FIG. 20T, the electronic device 100a displays the stylus status bar 2042 on the side of the electronic device 100a the stylus 203 is contacting (e.g., attached to).

In some embodiments, the electronic device 100a displays the status bar 2042 based on the orientation of the electronic device 100a. For example, in various embodiments, the electronic device 100a includes one or more accelerometers 167, gyroscopes 168, and/or magnetometers 169 in order to determine orientation of the electronic device 100a. Four orientations of the electronic device 100a displaying the status bar 2042 are illustrated in FIG. 20U. Annotations are omitted for the sake of clarity. When the electronic device 100a is vertically oriented, as in quadrants II and III, the electronic device 100a displays the status bar 2042 substantially parallel to the stylus 203. As further illustrated in FIG. 20U, when the electronic device 100a is horizontally oriented, as in quadrants I and IV, the electronic device 100a displays the status bar 2042 substantially perpendicular to the stylus 203. In various embodiments, no matter the orientation of the electronic device 100a, the electronic device 100a displays the stylus status bar 2042 on the side of the electronic device 100a the stylus 203 is contacting (e.g., attached to).

In some embodiments, the electronic device 100a displays a stylus low-battery alert indicator. As illustrated in FIG. 20V, the stylus 203 is physically separated from (e.g., not in contact with) the electronic device 100a. Nevertheless, the electronic device 100a obtains data from the stylus 203 via a wireless protocol. As illustrated in FIG. 20V, the electronic device 100a is paired to the stylus 203 via BLUETOOTH, as indicated by a BLUETOOTH indicator 2050. One of ordinary skill in the art will appreciate that wireless connectivity between the stylus 203 and the electronic device 100a may correspond to a variety of wireless protocols, such as peer-to-peer WiFi, 802.11x, etc. As illustrated in FIG. 20V, the stylus 203 has a low battery level, as indicated by a caution symbol 2051, which is shown for explanatory purposes. In response to obtaining data from the stylus 203 indicating that the current battery level of the stylus 203 is below a threshold (e.g., 10%), the electronic device 100a displays a stylus low-battery alert 2052. The stylus low-battery alert 2052 includes a stylus battery level indicator 2052a indicating the current stylus battery level and a recharge message 2052b displaying a recommendation to reconnect the stylus 203 to the electronic device 100a for recharging.

As illustrated in FIG. 20W, in response to detecting reconnection with (e.g., reattachment to) the stylus 203, the electronic device 100a ceases display of the stylus low-battery alert 2052 and displays a recharging indicator 2054. The recharging indicator 2054 includes a charging level indicator 2054a indicating the current battery level of the stylus 203 and that the stylus 203 is charging. The recharging indicator 2054 includes a recharging message 2054b textually indicating that the stylus 203 is charging.

FIGS. 21A-21AB are illustrations of example user interfaces for selecting stylus settings and drawing marks based on the stylus settings in accordance with some embodiments. The user interfaces in these figures are used to illustrate the processes described below, including portions of the processes in FIGS. 25A-25B. Although some of the examples which follow will be given with reference to inputs on a touch-screen display (where the touch-sensitive surface and the display are combined, for example on touch screen 112), in some embodiments, the electronic device 100a detects inputs on a touch-sensitive surface 651 that is separate from display 650, as shown in FIG. 6B.

In various embodiments, the touch-sensitive surface (e.g., the touch-sensitive surface 275 in FIG. 2 and FIGS. 5A-5B) of the stylus 203 detects touch inputs and gesture inputs, or a lack thereof. Based on these detected inputs, the stylus 203 provides corresponding data to the electronic device 100a. For example, in some embodiments, the stylus 203 provides data to the electronic device 100a indicative of one or more of the following: whether the stylus is being held, a flick, a swipe, a tap, a double tap, and/or the like.

In various embodiments, the orientation and/or movement sensors (e.g., accelerometer, magnetometer, gyroscope) of the stylus 203 detect orientation/movement inputs or a lack thereof. Based on these detected inputs, the stylus 203 provides corresponding data to the electronic device 100a. For example, in some embodiments, the stylus 203 provides data to the electronic device 100a indicative of one or more of the following: whether the stylus is being held, barrel rotation and/or direction thereof, twirl and/or direction thereof, orientation (e.g., position) of the tip 276 and/or the end 277 of the stylus 203 relative to a reference plane, and/or the like.

FIGS. 21A-21E are examples of the electronic device 100a displaying a stylus settings menu. As illustrated in FIG. 21A, the electronic device 100a displays a graphical user interface 2102 that includes a stylus settings menu 2104. One of ordinary skill in the art will appreciate that display of the stylus settings menu 2104 may occur in a variety of ways, including navigating through a general settings menu of the electronic device 100a, pairing with the stylus 203, etc. The stylus settings menu 2104 includes a stylus status bar 2104a, a slide gesture submenu 2104b, and a double tap gesture submenu 2104c. The stylus status bar 2104a provides identifying information of a user currently associated with the stylus 203 and current battery level of the stylus 203.

The slide gesture submenu 2104b enables one or more inputs for specifying how the electronic device 100a reacts to detecting a respective slide gesture at the stylus 203. The slide gesture submenu 2104b includes a corresponding stylus slide animation. As illustrated in FIG. 21A, the stylus slide animation shows an arrow pointing towards the end 277 of the stylus 203. This indicates that the electronic device 100a performs a corresponding operation in response to a slide up gesture (e.g., away from the tip 276 of the stylus 203) at the stylus 203. The slide gesture submenu 2104b includes four affordances corresponding to four operations: "Increase opacity level", "Decrease thickness level", "Reverse", and "Off". Because the "Decrease thickness level" affordance is currently selected in FIG. 21A, the electronic device 100a decreases the thickness level associated with drawing operations in response to obtaining finger manipulation data from the stylus 203 indicating a slide up gesture at the stylus 203. One of ordinary skill in the art that other embodiments include stylus settings menu 2104 including different gestures (e.g., tap, flick, etc.) and/or different operations (e.g., change color, change hue, etc.). Operation of the "Reverse" affordance is detailed with reference to FIGS. 21D and 21E, below. Selection of the "Off" affordance results in the electronic device 100a taking no action in response to a slide up gesture at the stylus 203.

The double tap gesture submenu 2104c enables one or more inputs for specifying how the electronic device 100a reacts to a double tap gesture at the stylus 203. As illustrated in FIG. 21A, the double tap gesture submenu 2104c includes a corresponding stylus double tap animation, as indicated by the dotted line near the tip of the stylus. The double tap gesture submenu 2104c further includes four affordances each corresponding to an operation: "Switch between current tool and eraser", "Show color palette", "Switch between current tool and previous tool", and "Off". Because "Switch between current tool and eraser" is currently selected in FIG. 21A, the electronic device 100a switches to the eraser tool in response to obtaining finger manipulation data from the stylus 203 indicating a double tap gesture at the stylus 203. Selection of the "Off" affordance results in the electronic device 100a taking no action in response to a double tap gesture at the stylus 203.

As further illustrated in FIG. 21A, the electronic device 100a detects an input 2106 corresponding to the "Switch between current tool and previous tool" affordance within the double tap gesture submenu 2104c. In response to detecting the input 2106 in FIG. 21A, the electronic device 100a moves focus to the "Switch between current tool and previous tool" affordance in FIG. 21B.

Figure 21C:
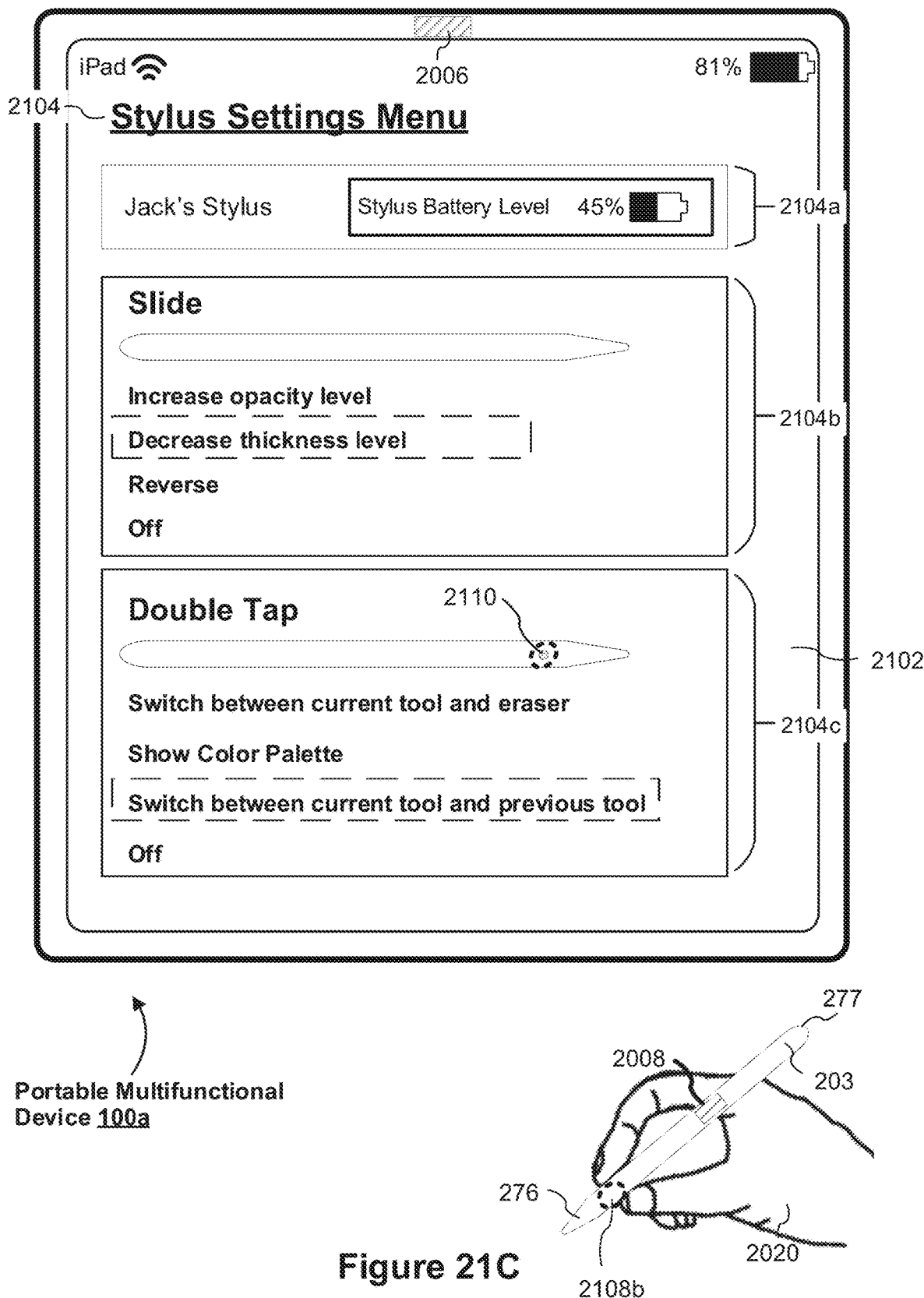

As illustrated in FIGS. 21B and 21C, the electronic device 100a responds to a double tap gesture performed by a hand 2020 of a user at the stylus 203. As illustrated in FIG. 21B, the electronic device 100a obtains finger manipulation data from the stylus 203 indicating the first tap 2108a of the double tap gesture.

As illustrated in FIG. 21C, the electronic device 100a obtains finger manipulation data from the stylus 203 indicating the second tap 2108b of the double tap gesture. In response to obtaining the finger manipulation data from the stylus 203, the electronic device 100a ceases display of the animation of the slide gesture within the slide gesture submenu 2104b and maintains display of the animation of the double tap gesture within the double tap gesture submenu 2104c. Moreover, the electronic device 100a displays a double tap indicator 2110 as part of the animation of the double tap gesture. The double tap indicator 2110 indicates that the electronic device 100a detects a double tap gesture at the stylus 203. In some embodiments, the electronic device 100a displays the double tap indicator 2110 as, or right after, the second tap 2108b occurs.

Figure 21D:
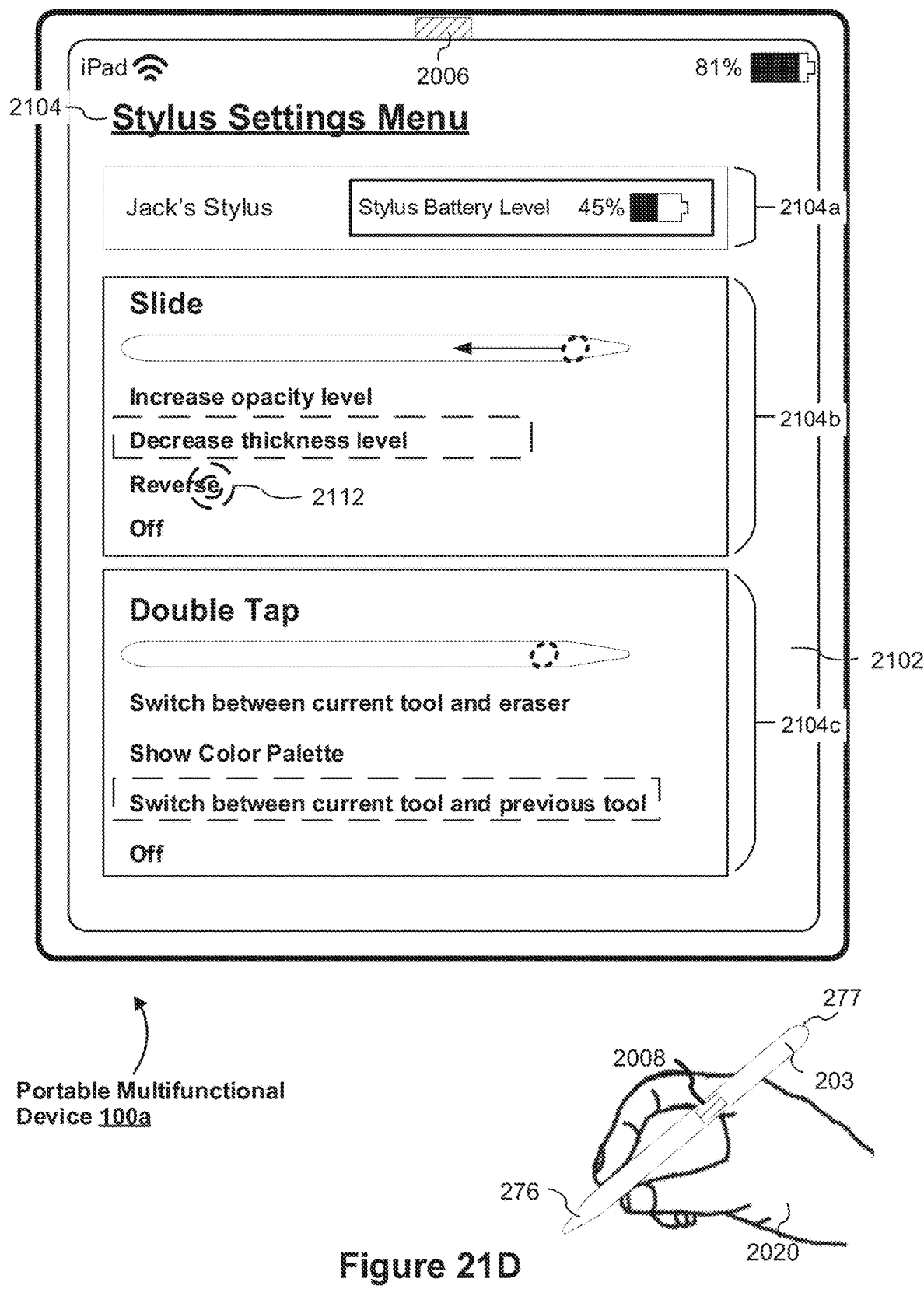

As illustrated in FIG. 21D, the electronic device 100a detects an input 2112 corresponding to the "Reverse" affordance within the slide gesture submenu 2104b. In response to detecting the input 2112 in FIG. 21D, the electronic device 100a, in FIG. 21E, reverses the direction of the animation of the slide gesture within the slide gesture 2104b towards the tip 276 of the stylus 203. Accordingly, the electronic device 100a performs a decrease thickness operation in response to a slide down gesture (e.g., towards the tip 276) performed at the stylus 203. Conversely, the electronic device 100a performs an increase thickness operation in response to a slide up gesture (e.g., away from tip) performed at the stylus 203.

Figure 21E:
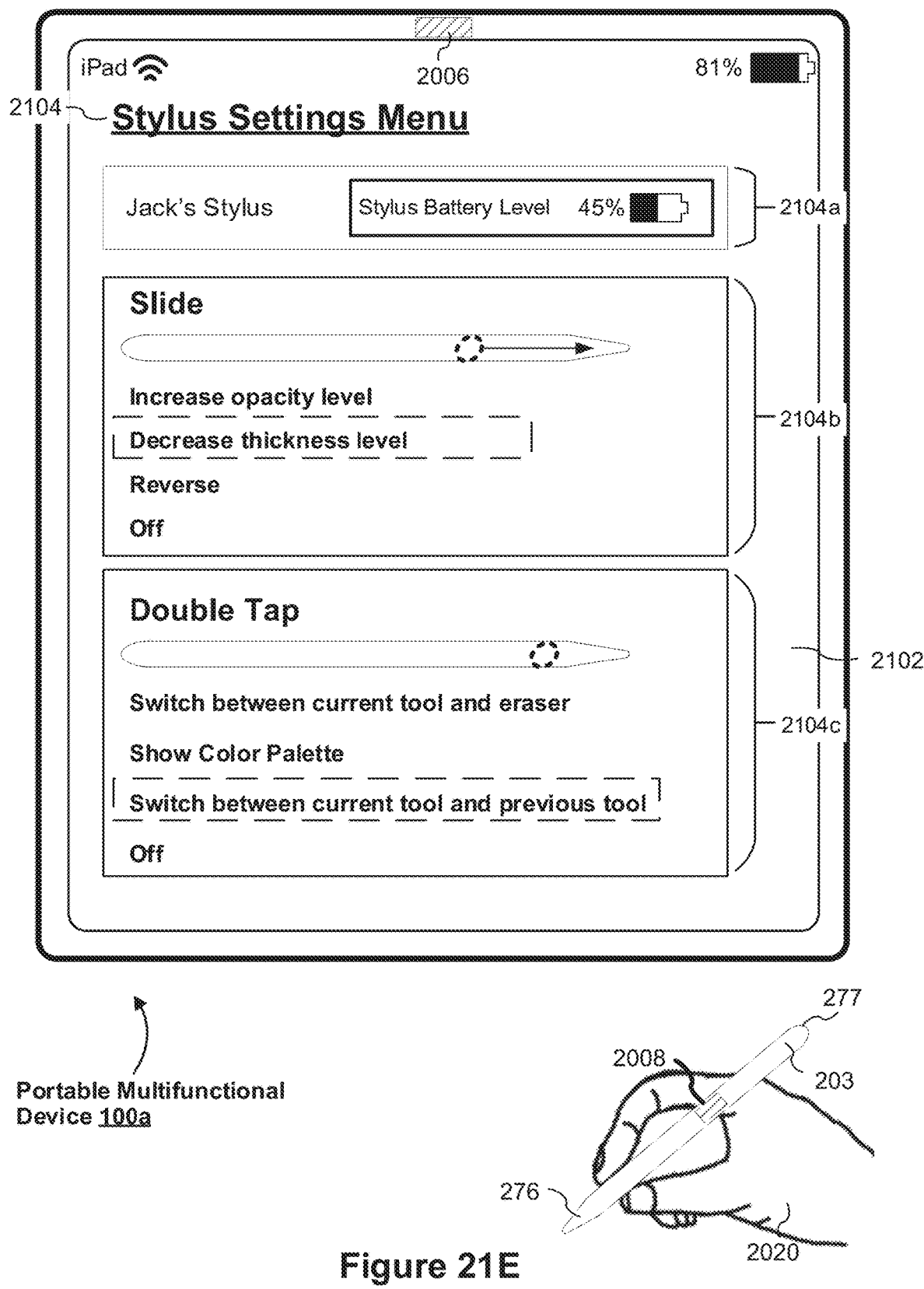
Figure 21F:
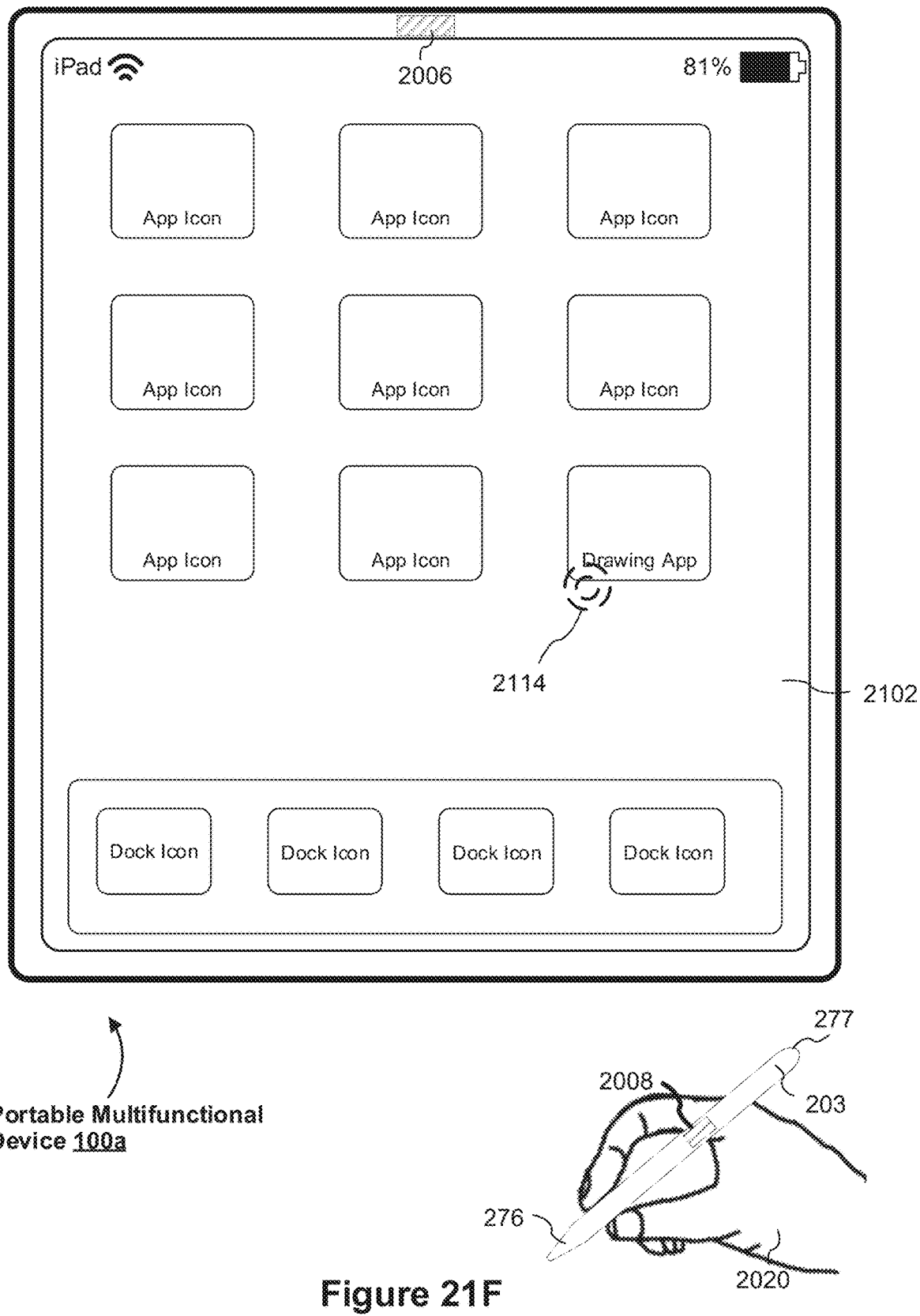
Figure 21G:
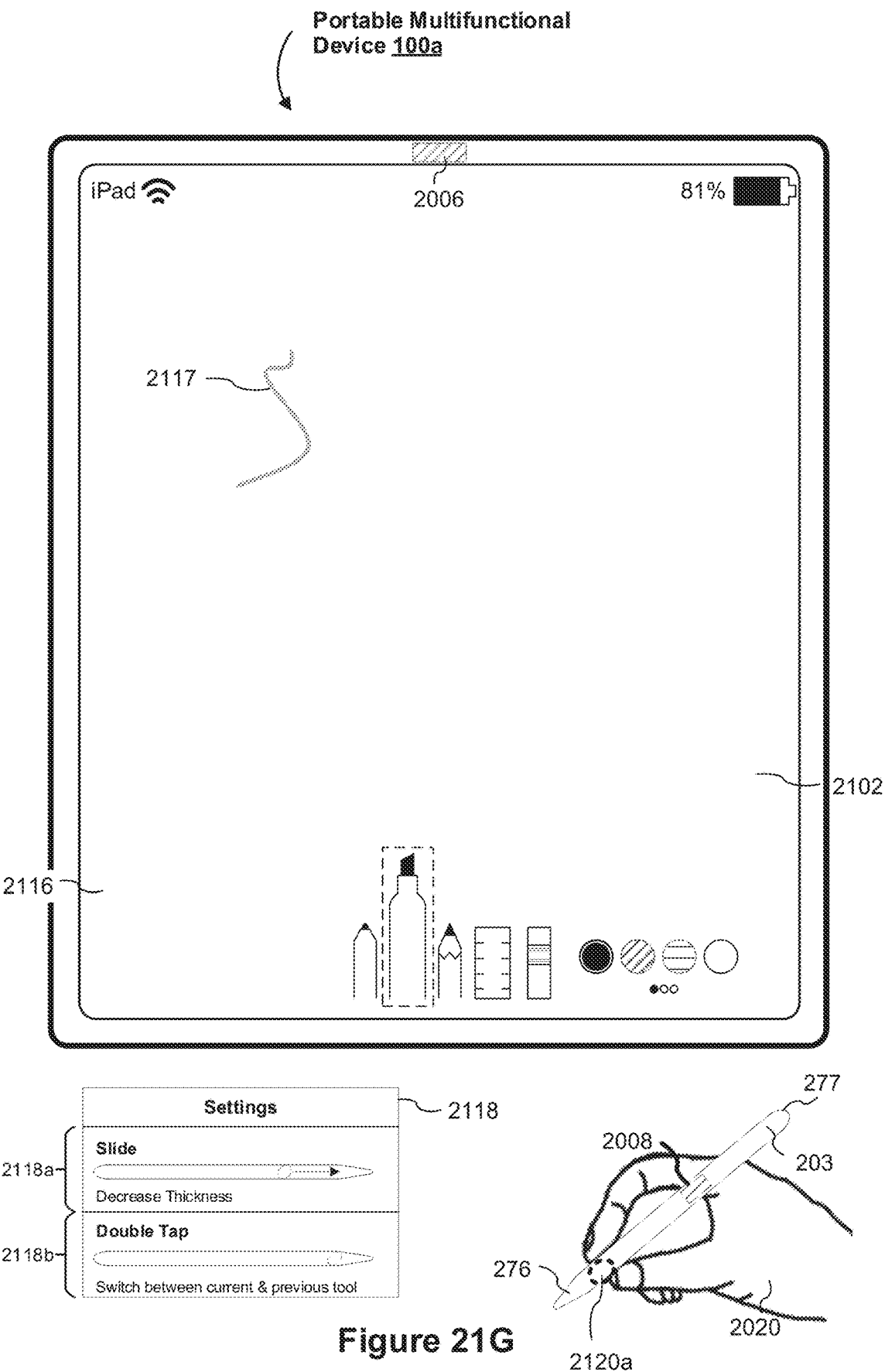

As illustrated in FIG. 21F, the electronic device 100a displays the graphical user interface 2102 corresponding to a home screen. The electronic device 100a detects an input 2114 corresponding to a drawing application icon in FIG. 21F. In response to detecting the input 2114 in FIG. 21F, the electronic device 100a displays, as illustrated in FIG. 21G, a canvas 2116 associated with the selected drawing application. The canvas 2116 includes an initial mark 2117 drawn while the marker tool was set as the current drawing tool.

As illustrated in FIGS. 21G-21AB, the electronic device 100a performs various operations based on the settings of the stylus and gestures being performed at the stylus 203. For explanatory purposes, FIGS. 21G-21AB include a stylus settings box 2118 indicating current stylus settings and gestures being performed at the stylus 203. The stylus settings box 2118 includes a slide settings portion 2118a and a double tap settings portion 2118b.

As illustrated in FIG. 21G, the stylus settings box 2118 reflects the values set via the stylus settings menu 2104 in FIGS. 21A-21E. Namely, a slide down gesture corresponds to a decrease thickness operation, whereas a double tap gesture corresponds to a switch between the current tool and previous tool. As further illustrated in FIG. 21G, the electronic device 100a obtains finger manipulation data from the stylus 203 indicating a first tap 2120a of a double tap gesture.

Figure 21H:
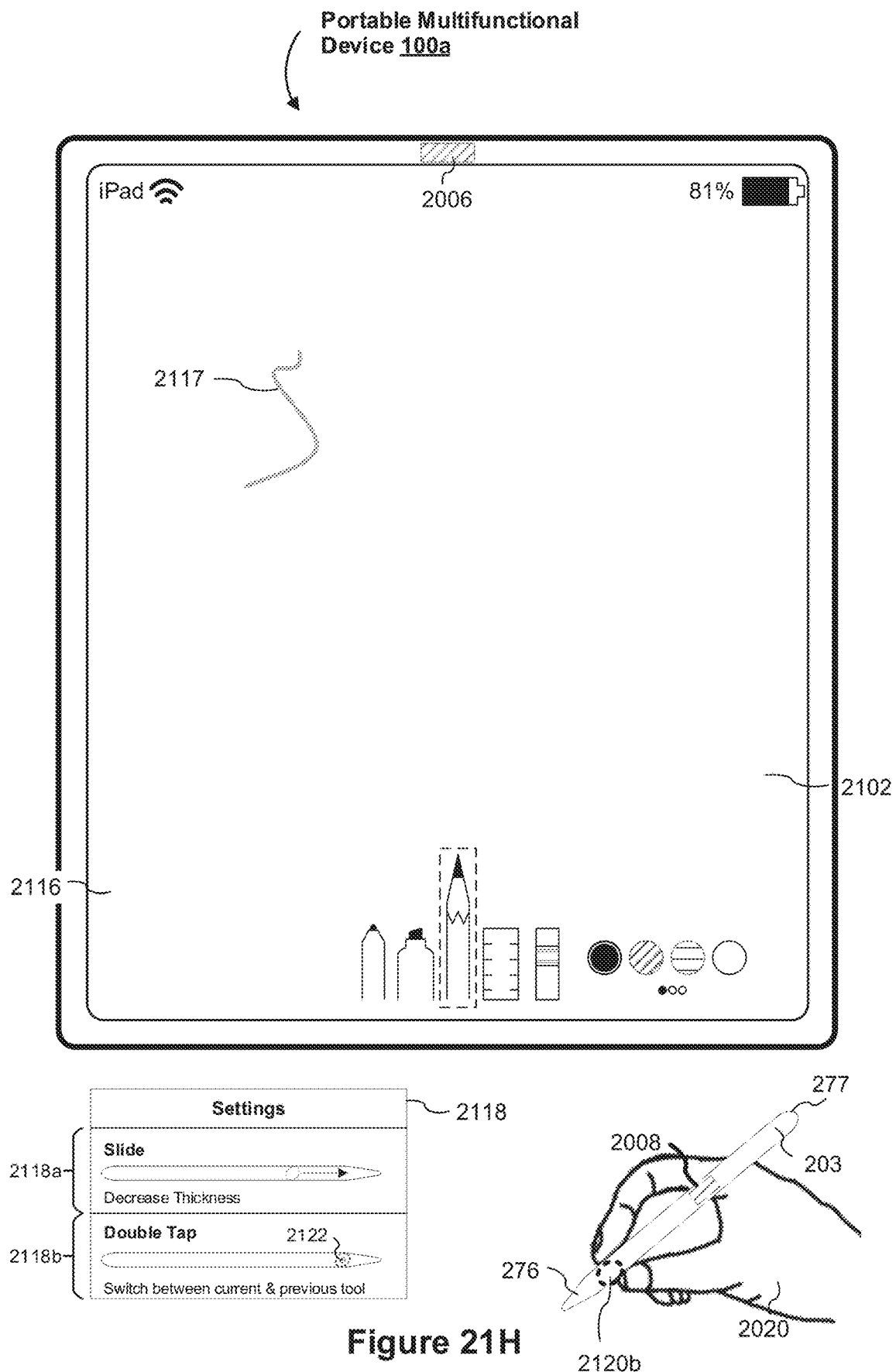

As illustrated in FIG. 21H, the electronic device 100a obtains finger manipulation data from the stylus 203 indicating a second tap 2120b of a double tap gesture. The second tap 2120b is indicated by the double tap indicator 2122 within the stylus double tap settings portion 2118b. In response to obtaining the finger manipulation data in FIG. 21H, the electronic device 100a switches between a current tool and a previous tool. Namely, in FIGS. 21G and 21H, the electronic device 100a moves focus from the marker tool to a pencil tool.

Figure 21I:
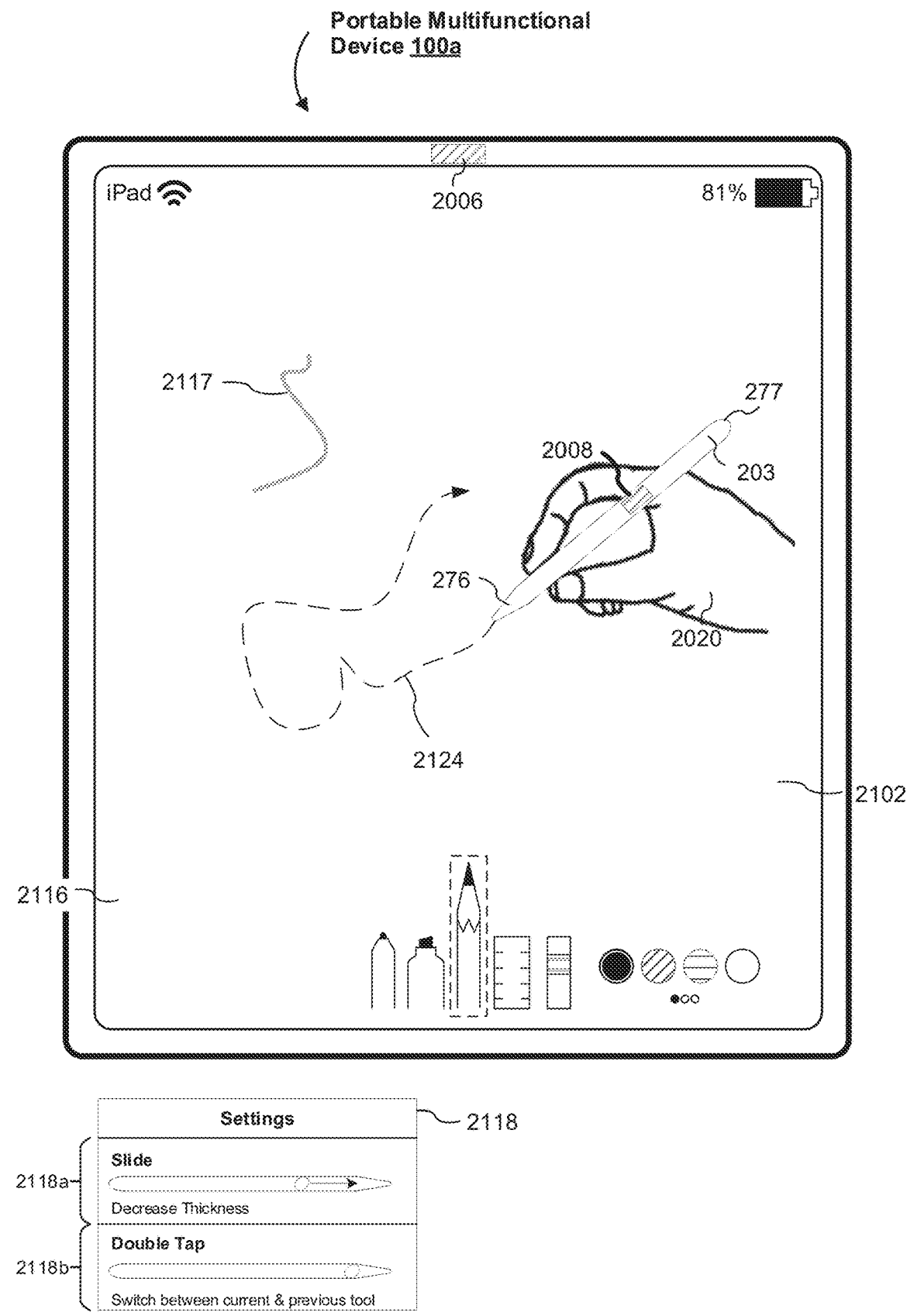
Figure 21J:
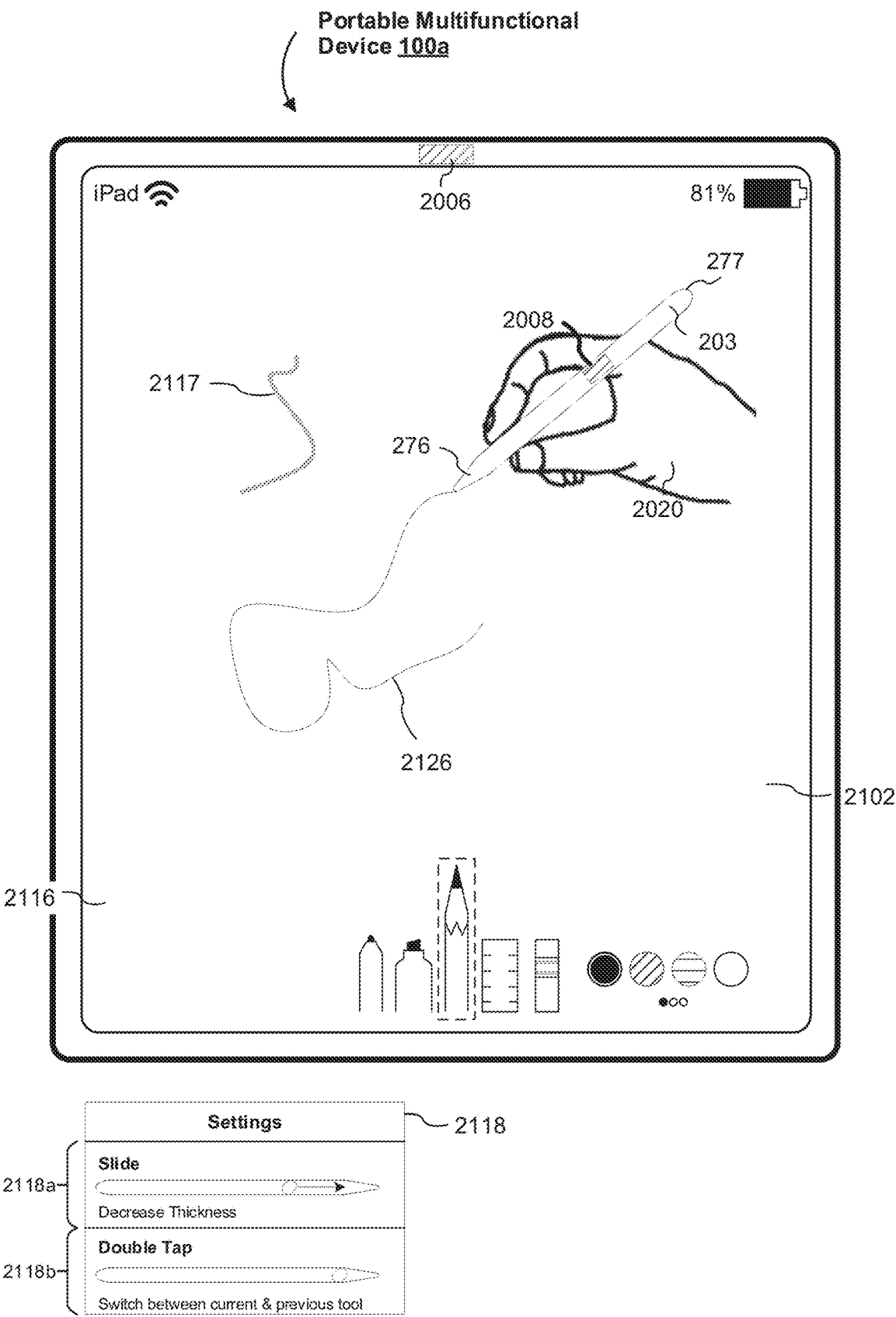

As illustrated in FIG. 21I, the electronic device 100a detects a draw input 2124 by the stylus 203. In response to detecting the draw input 2124 in FIG. 21I, the electronic device 100a draws a pencil mark 2126, as illustrated in FIG. 21J, because the pencil is the current drawing tool.

Figure 21K:
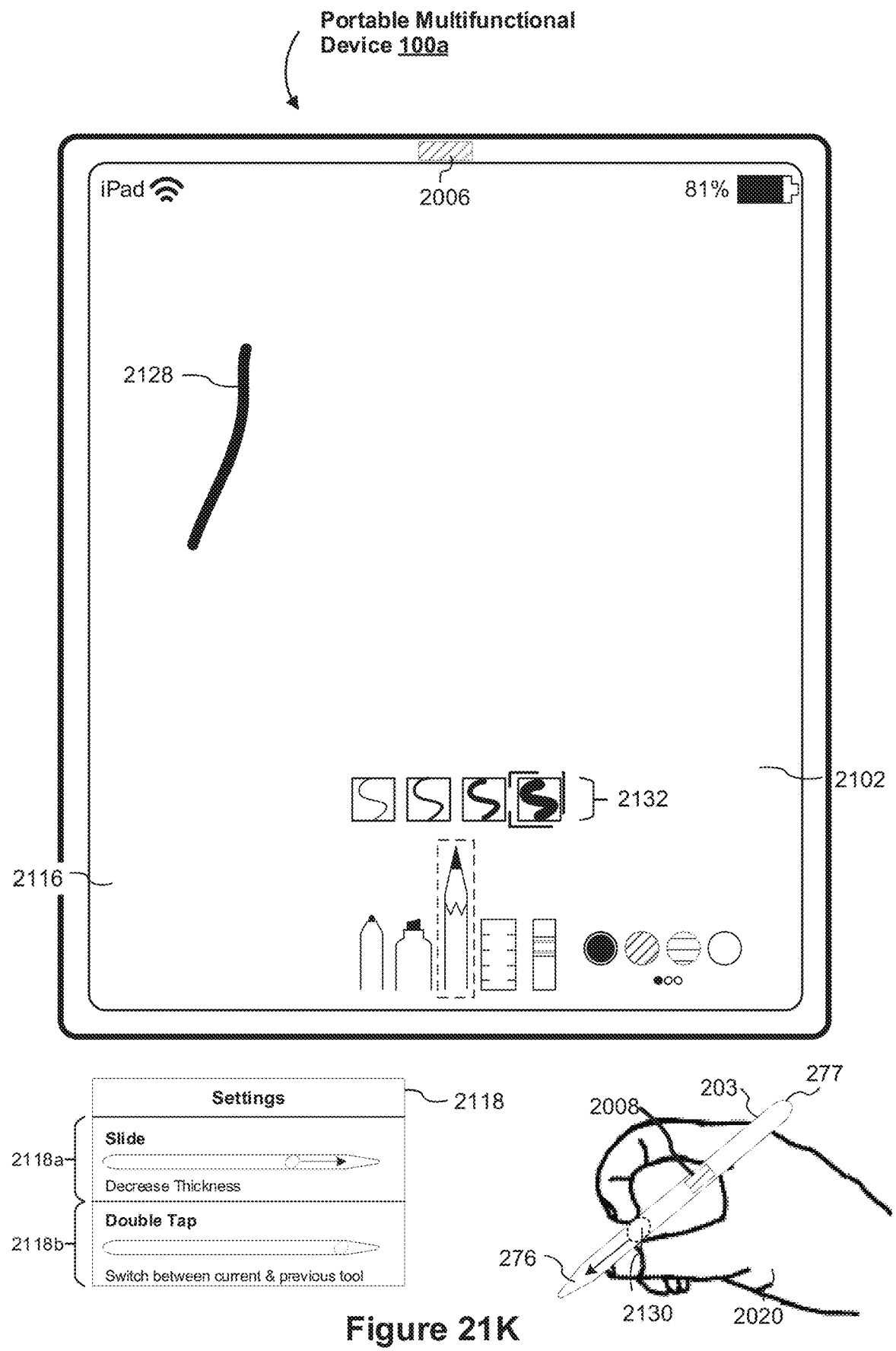

As illustrated in FIG. 21K, at another point in time, the canvas 2116 includes an initial mark 2128. As further illustrated in FIG. 21K, the electronic device 100a obtains finger manipulation data from the stylus 203 indicating a slide down gesture 2130 at the stylus 203. In response to obtaining the finger manipulation data, the electronic device 100a displays a thickness indicator 2132 because a slide gesture corresponds to a thickness change operation. The thickness indicator 2132 includes four thickness level boxes. The thickness levels corresponding to the respective thickness boxes increase from left to right. One of ordinary skill in the art will appreciate that any number of boxes and/or thickness levels may be displayed. As illustrated in FIG. 21K, the thickness indicator 2132 indicates that the highest thickness level is currently set because the rightmost, thickest thickness box has focus.

Figure 21L:
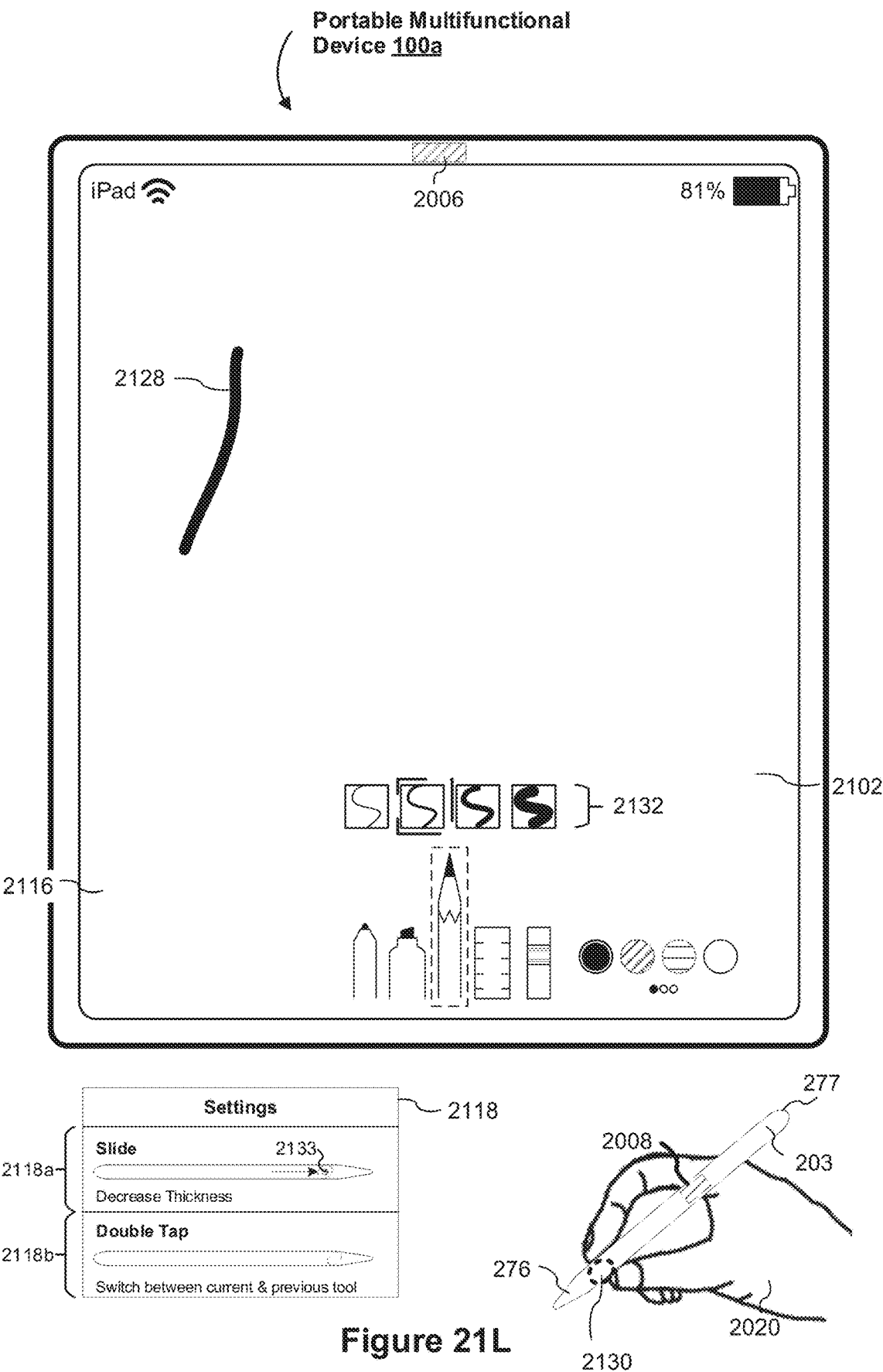

In response to obtaining the finger manipulation data in FIG. 21K, the electronic device 100a reduces the thickness level. As illustrated in FIG. 21L, the thickness reduction is indicated by the electronic device 100a moving focus leftwards to a thickness box associated with a thinner line than the line associated with the thickness box in FIG. 21K. As further illustrated in FIG. 21L, a slide down gesture indicator 2133 is shown in the stylus settings box 2118.

Figure 21M:
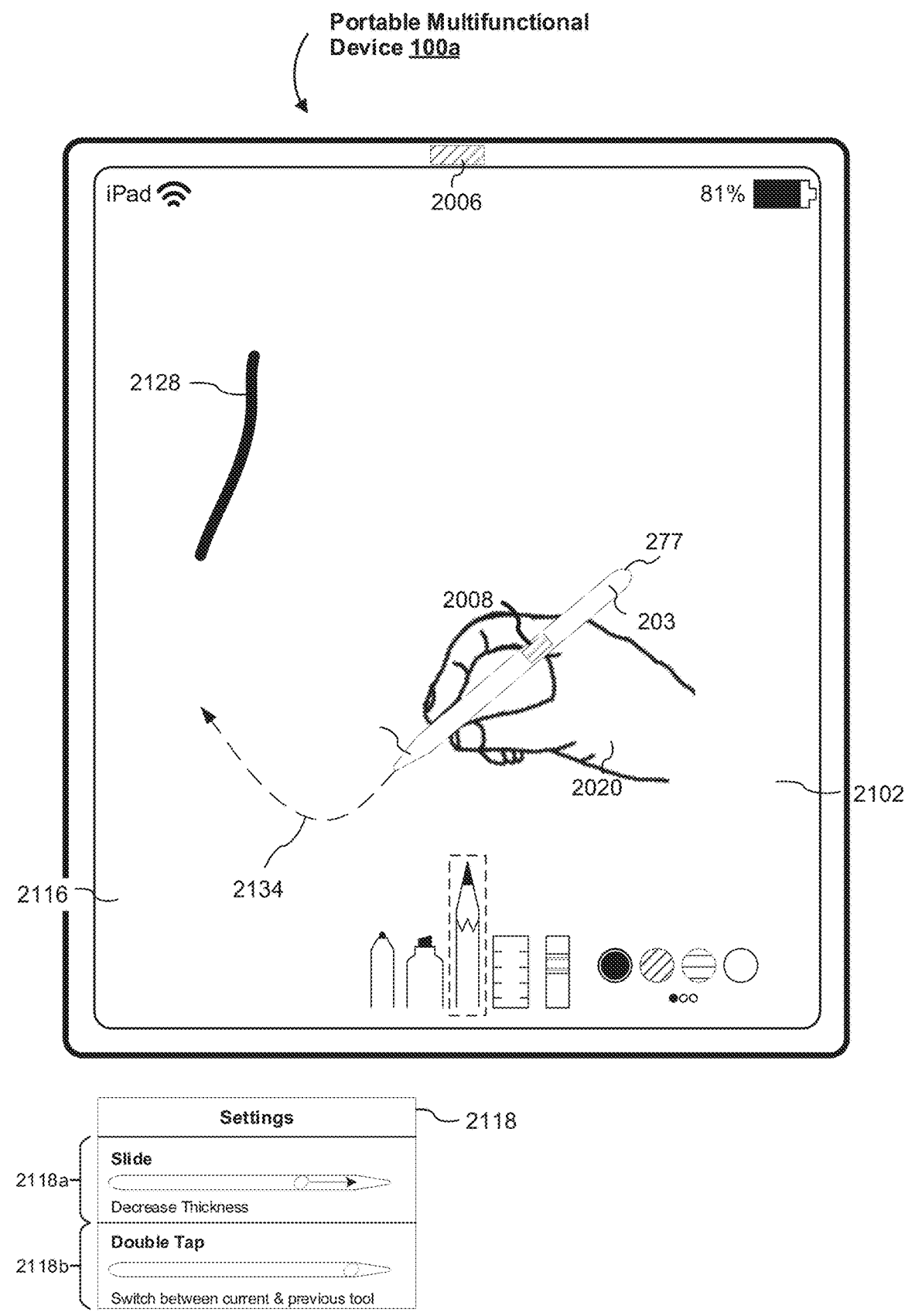
Figure 21N:
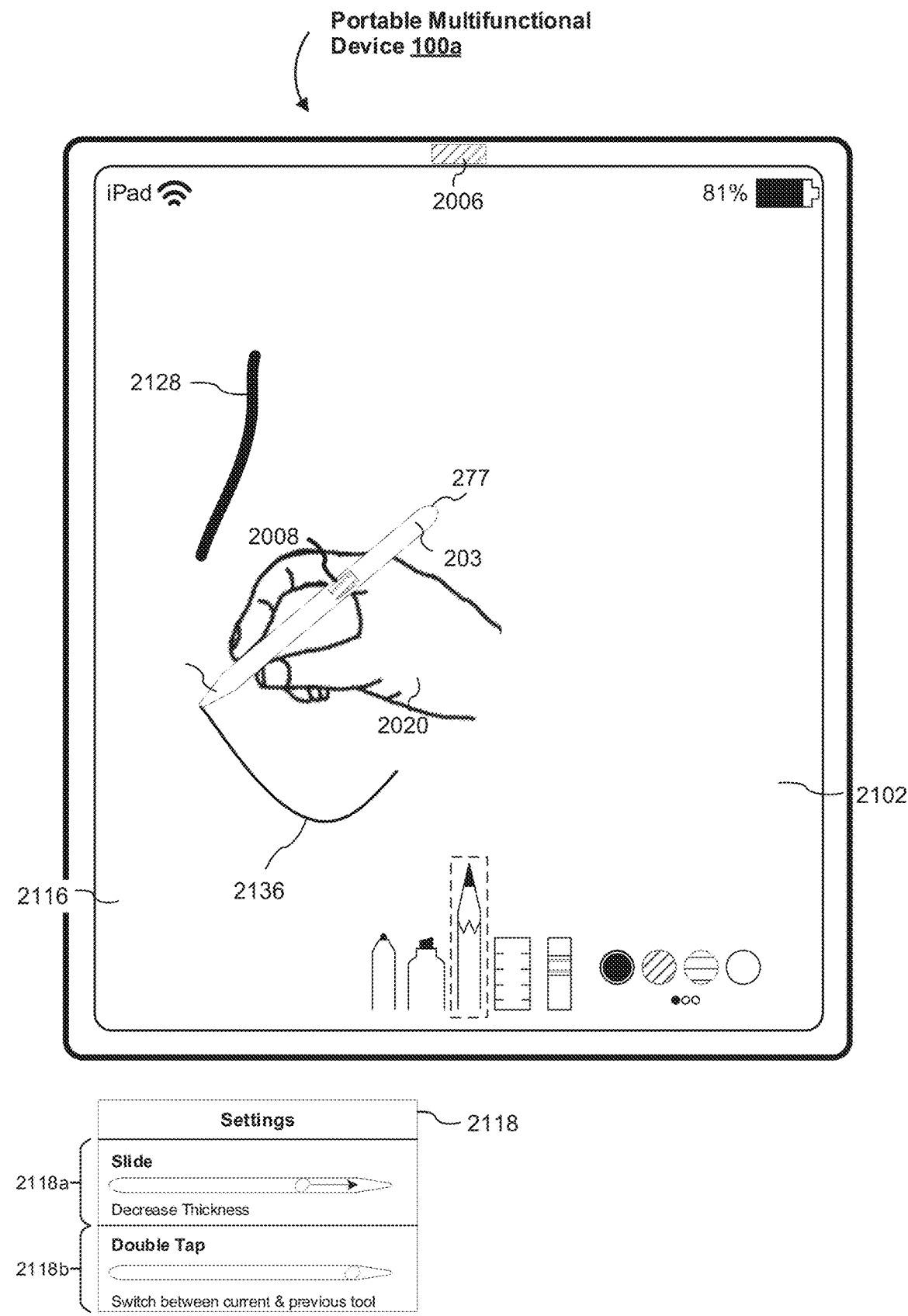

As illustrated in FIG. 21M, the electronic device 100a detects a draw input 2134 by the stylus 203. In response to detecting the draw input 2134 in FIG. 21M, the electronic device 100a ceases to display the thickness indicator 2132 in FIG. 21M. Further in response to detecting the draw input 2134 in FIG. 21M, the electronic device 100a displays a corresponding mark 2136, as illustrated in FIG. 21N, that is thinner than the initial mark 2128.

Figure 21O:
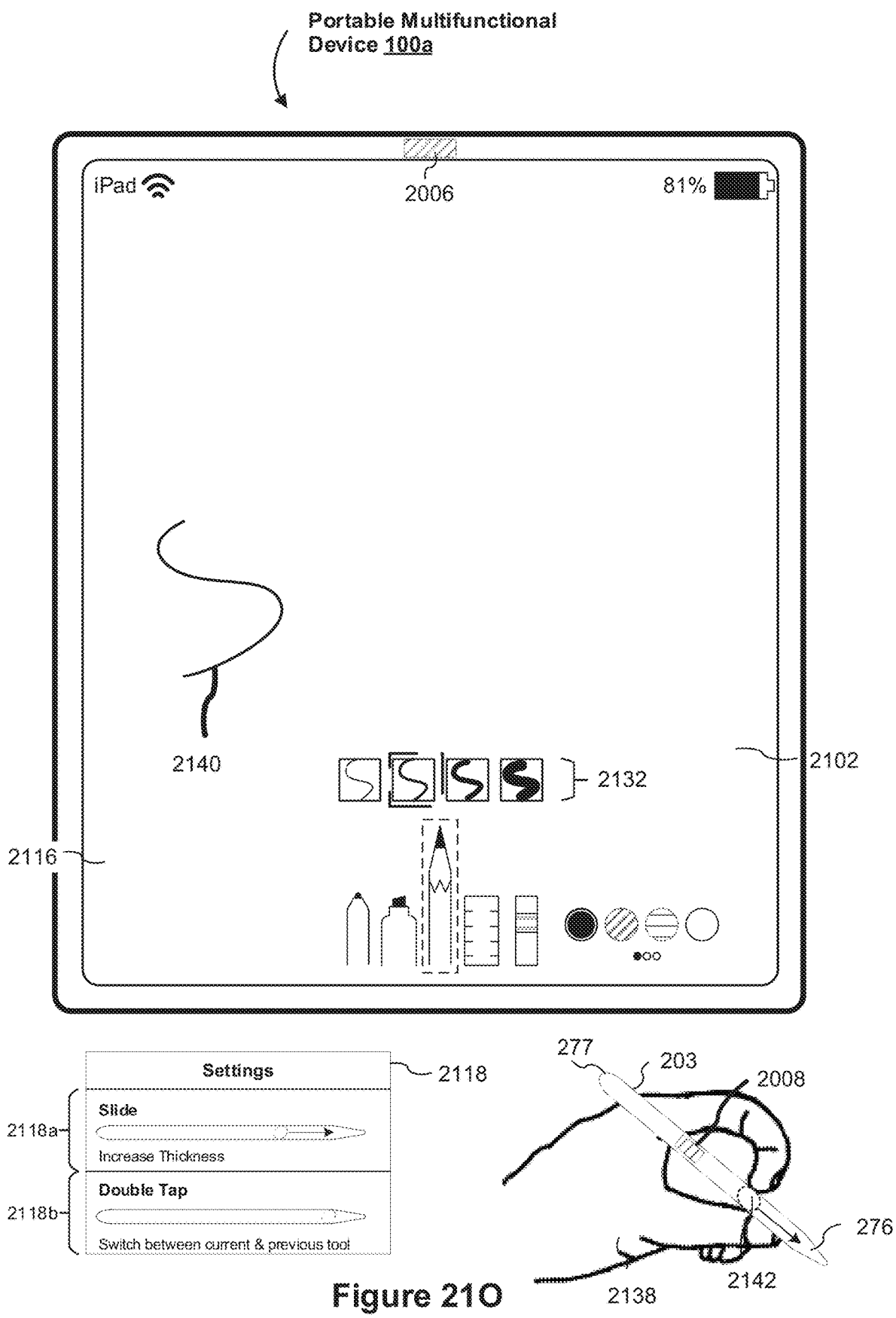

As illustrated in FIGS. 21O-21AB, the stylus 203 is being held by another hand 2138 (e.g., the left hand) of a user. The stylus 203 is held by the left hand 2138 in FIGS. 21A-21AB, and the resulting operation is reversed as compared with the case in which the stylus is held by the right hand 2020 (FIGS. 21A-21N). For example, the slide down gesture 2142 in FIG. 21O corresponds to an increase in line thickness when the stylus 203 is held by the left hand 2138. The thickness increase is indicated within the slide settings portion 2118a in FIG. 21O. In this way, the slide direction on the stylus 203 is consistent with the corresponding change in line thickness indicated by the thickness indicator 2132. For example, when the stylus 203 is being held by the left hand 2138, the positioning of the left hand 2138 relative to the electronic device 100a is such that a slide down on the stylus 203 is in a rightwards direction across the electronic device 100a. Accordingly, the corresponding change in the thickness indicator 2132 is also rightwards, which corresponds to an increase in thickness. On the other hand, when the stylus 203 is being held by the right hand 2020, a slide down on the stylus 203 in a direction that corresponds to leftwards across the electronic device 100a. Accordingly, the corresponding change in the thickness indicator 2132 is also leftwards, which corresponds to a decrease in thickness.

As further illustrated in FIG. 21O, the canvas 2116 includes an initial mark 2140. The electronic device 100a obtains finger manipulation data from the stylus 203 indicating the slide down gesture 2142 in FIG. 21O. In response to obtaining the finger manipulation data, the electronic device 100a displays the thickness indicator 2132, as illustrated in FIG. 21O.

Figure 21P:
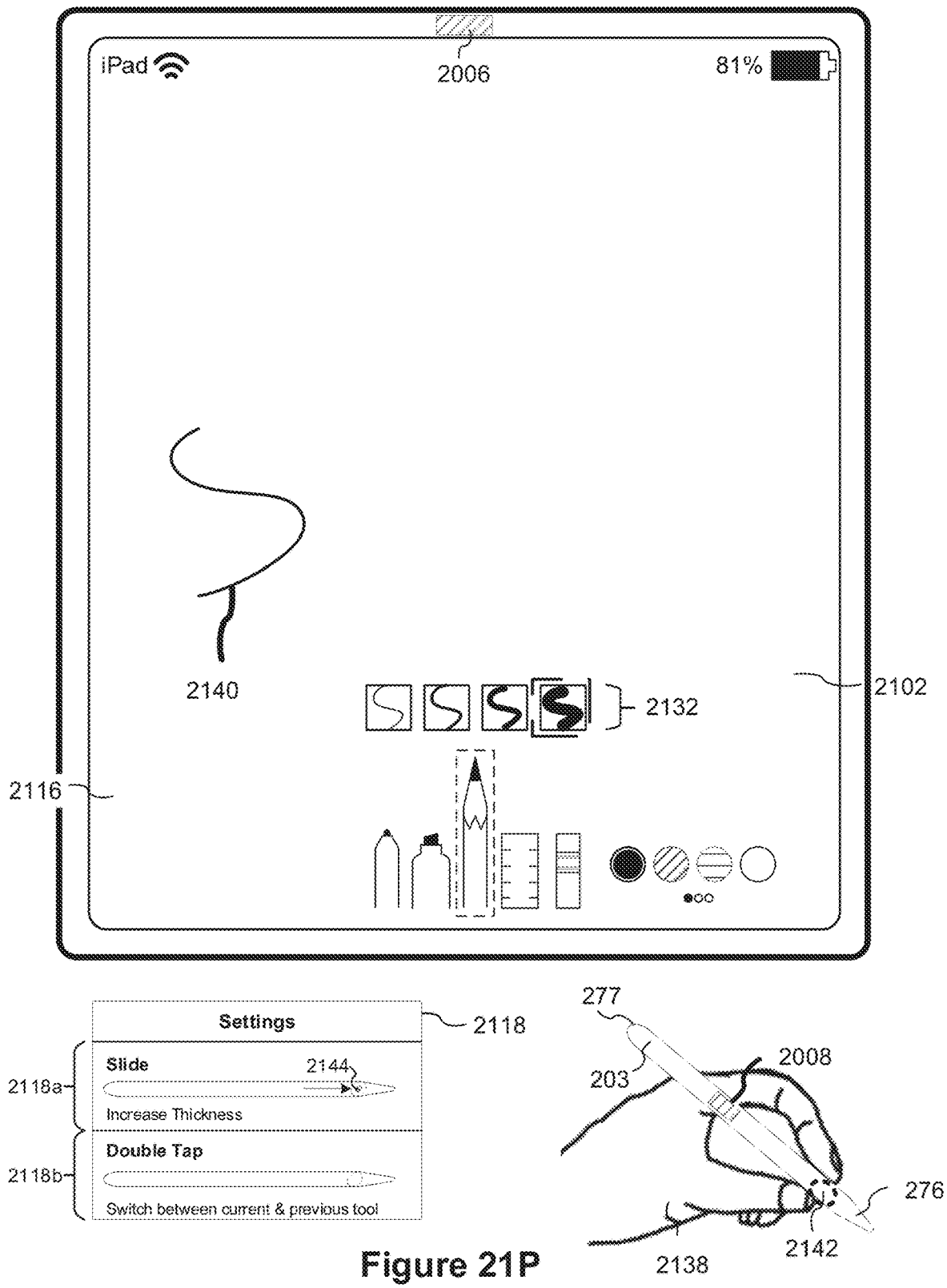

In response to obtaining the finger manipulation data in FIG. 21O, the electronic device 100a increases the line thickness, as indicated by an increase in the thickness level having focus within the thickness indicator 2132 illustrated in FIG. 21P. The slide down gesture 2142 is indicated by a slide down gesture indicator 2144 in stylus settings box 2118 in FIG. 21P.

Figure 21Q:
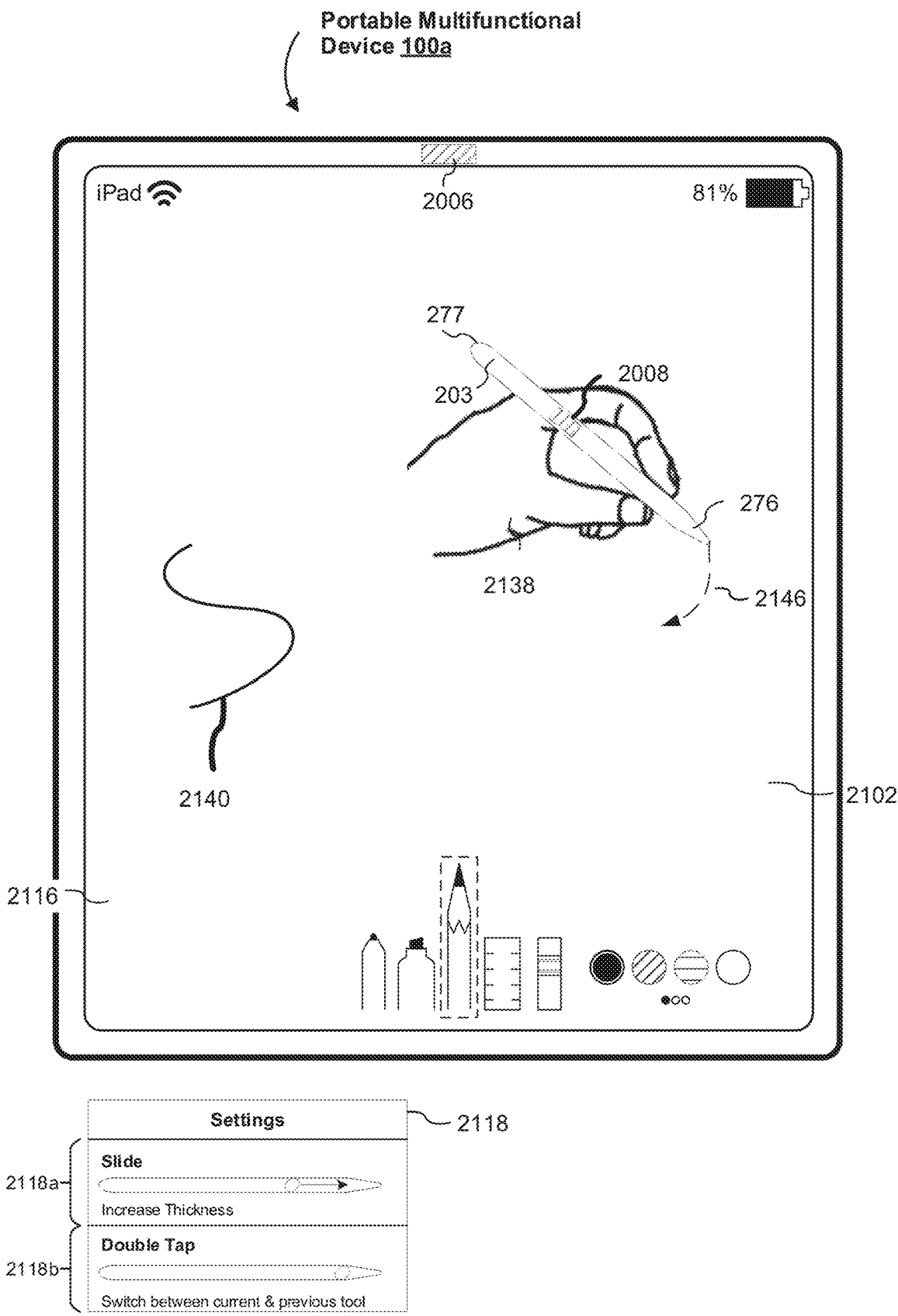
Figure 21R:
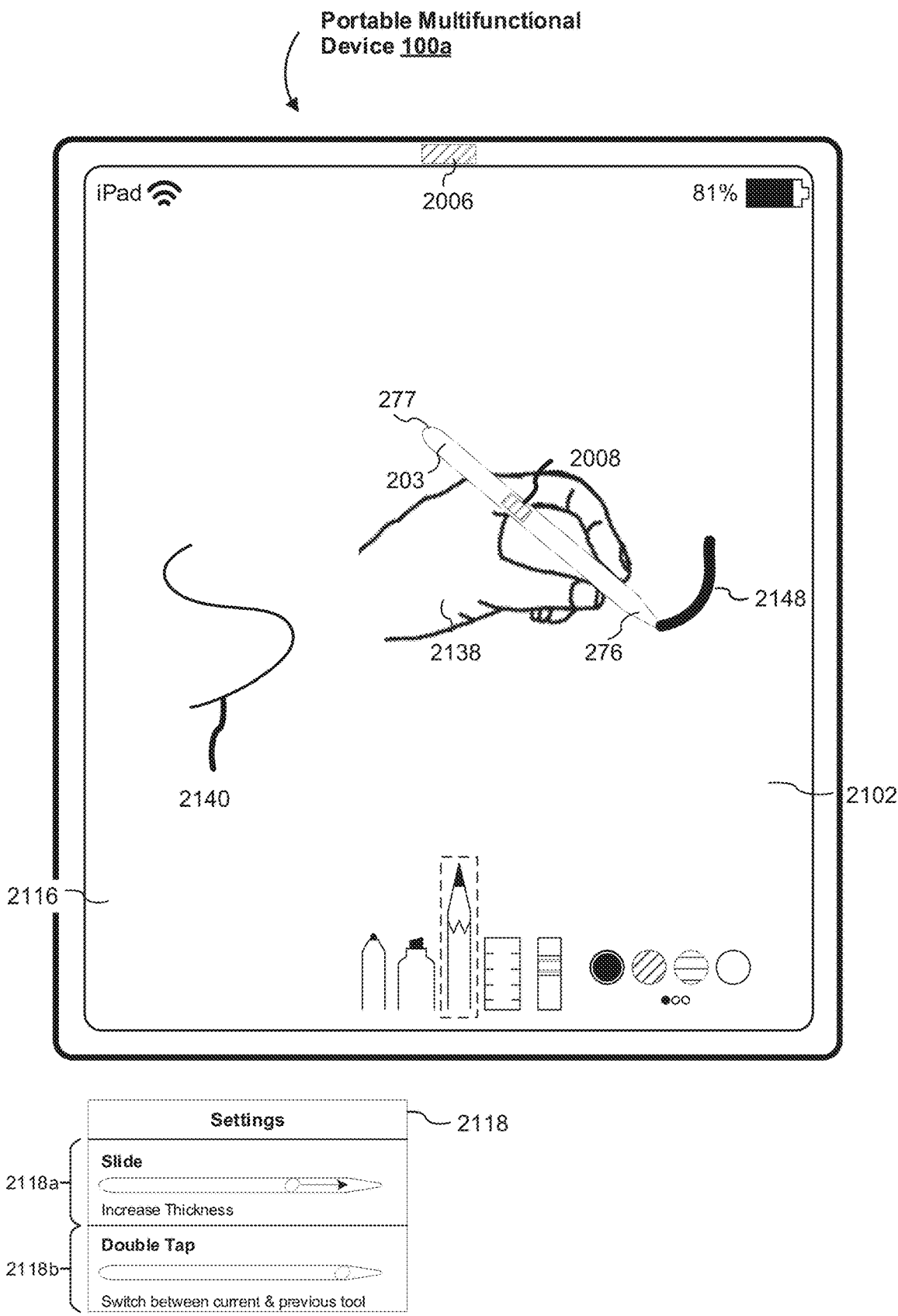

As illustrated in FIG. 21Q, the electronic device 100a detects a draw input 2146 by the stylus 203. In response to detecting the draw input 2146 in FIG. 21Q, the electronic device 100a ceases to display the thickness indicator 2132 in FIG. 21Q. Further in response to detecting the draw input 2146 in FIG. 21Q, the electronic device 100a displays a corresponding mark 2148, as illustrated in FIG. 21R, that is thicker than the initial mark 2140.

In some embodiments, the electronic device 100a performs different operations based on gestures at the stylus 203. For example, as illustrated in FIGS. 21S-21V, the electronic device 100a changes opacity levels of marks in response to gestures at the stylus 203.

Figure 21S:
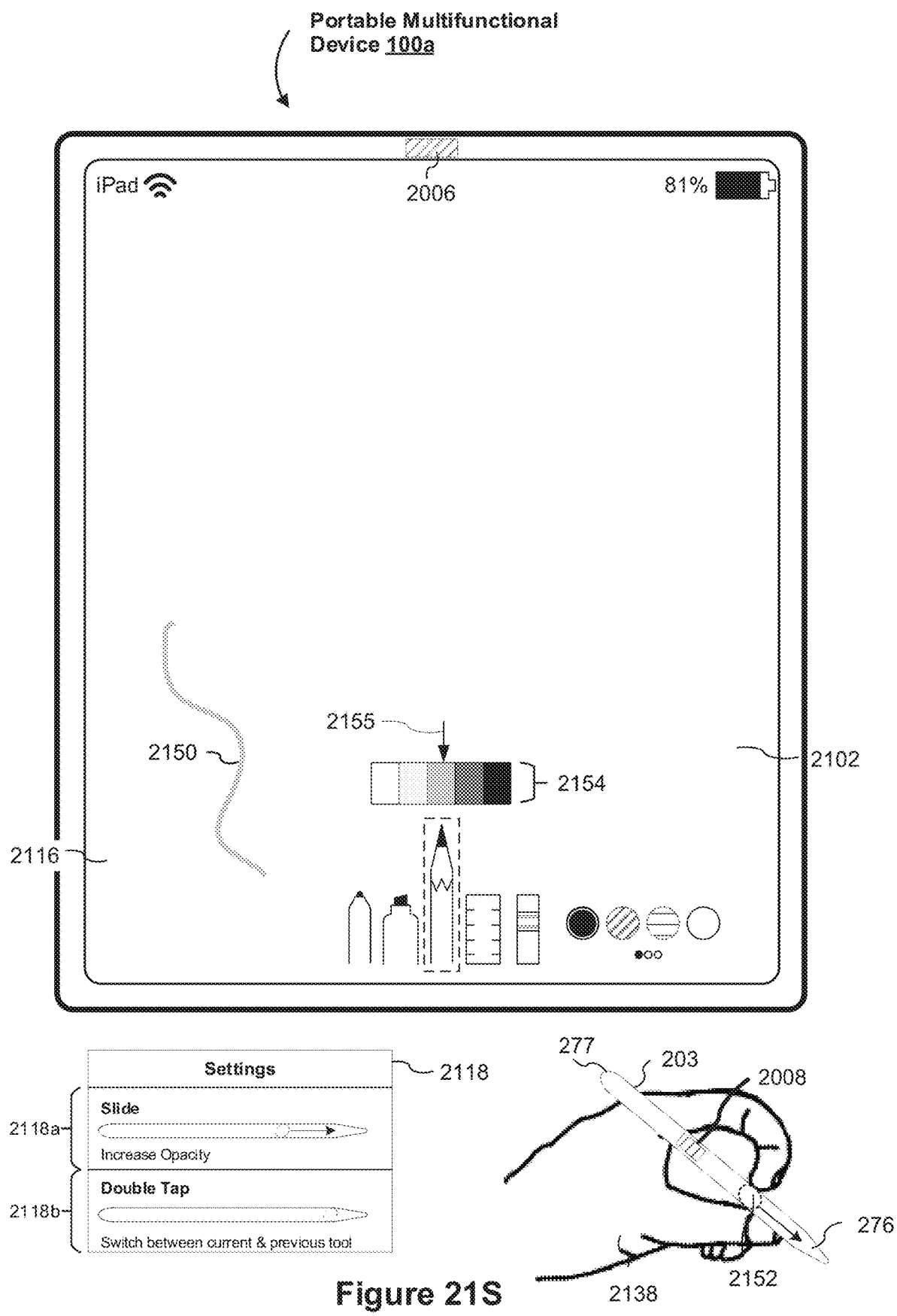

As illustrated in FIG. 21S, the electronic device 100a displays an initial mark 2150 on the canvas 2116. In FIG. 21S, the electronic device 100a obtains finger manipulation data from the stylus 203 indicating a slide down gesture 2152. In response to obtaining the finger manipulation data, the electronic device 100a displays an opacity indicator 2154, as illustrated in FIG. 21S. The opacity indicator 2154 includes five opacity boxes corresponding to respective opacity levels. The respective opacity levels corresponding to the five opacity boxes increase from left to right within the opacity indicator 2154: low opacity, low-medium opacity, medium opacity, medium-high opacity, and high opacity. As illustrated in FIG. 21S, the initial opacity level corresponds to the medium opacity level, as indicated by current opacity level indicator 2155 pointing to the medium opacity box.

Figure 21T:
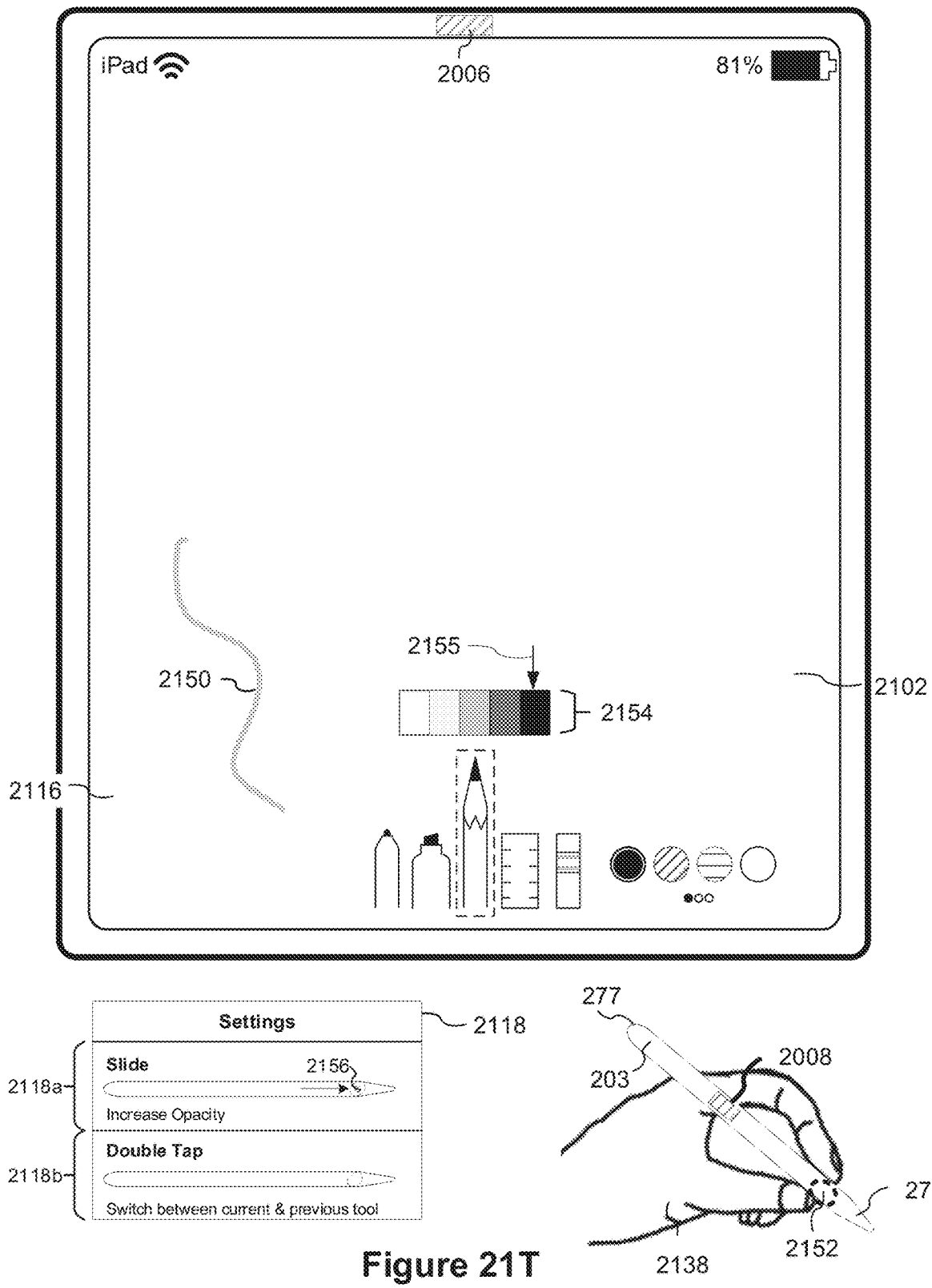

In response to obtaining the finger manipulation data in FIG. 21S, the electronic device 100a increases the line opacity by moving the current opacity level indicator 2155 rightwards to the rightmost, high opacity box of the opacity indicator 2154, as illustrated in FIG. 21T. The slide down gesture 2152 is indicated by a slide down indicator 2156 in the stylus settings box 2118 in FIG. 21T.

Figure 21U:
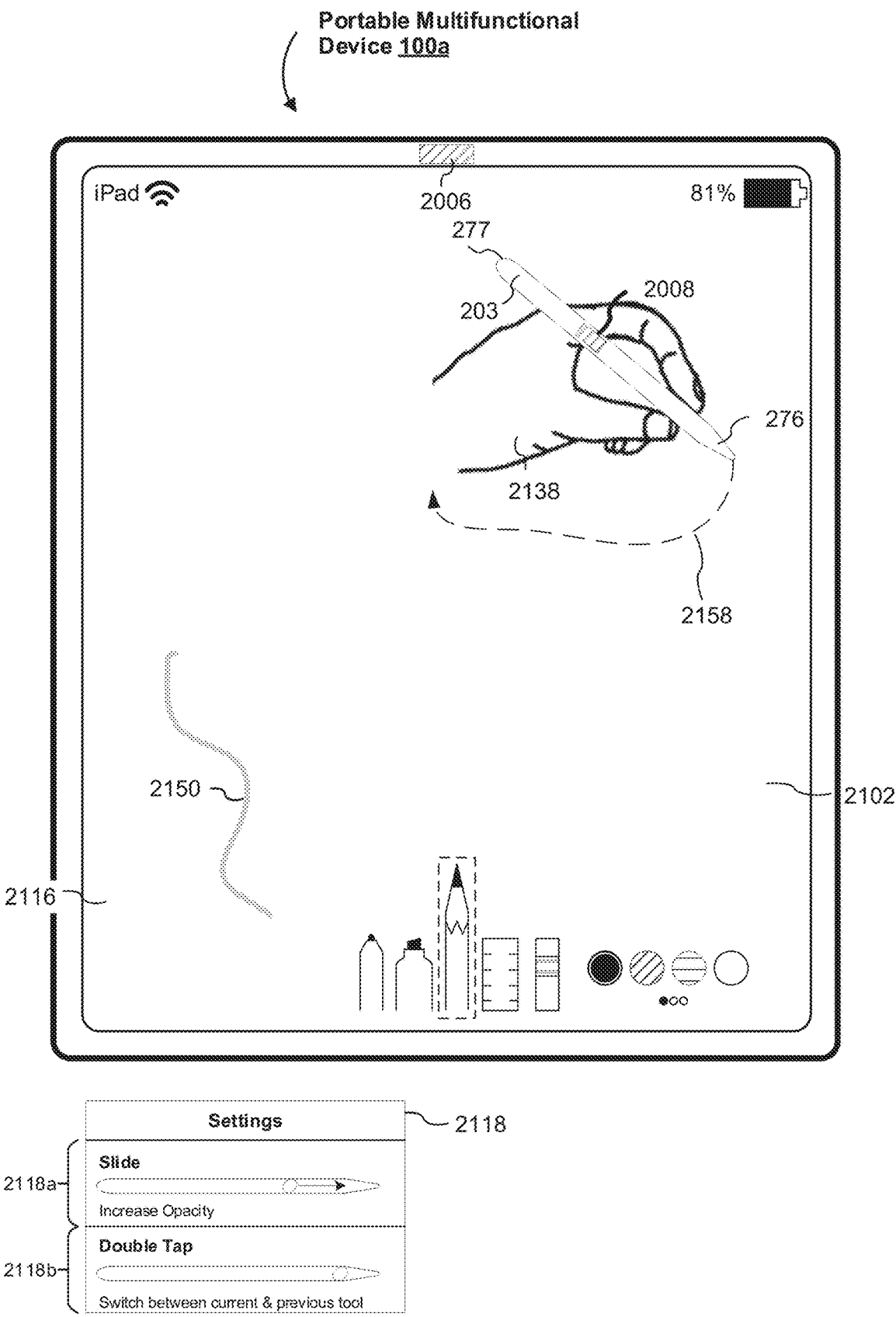
Figure 21V:
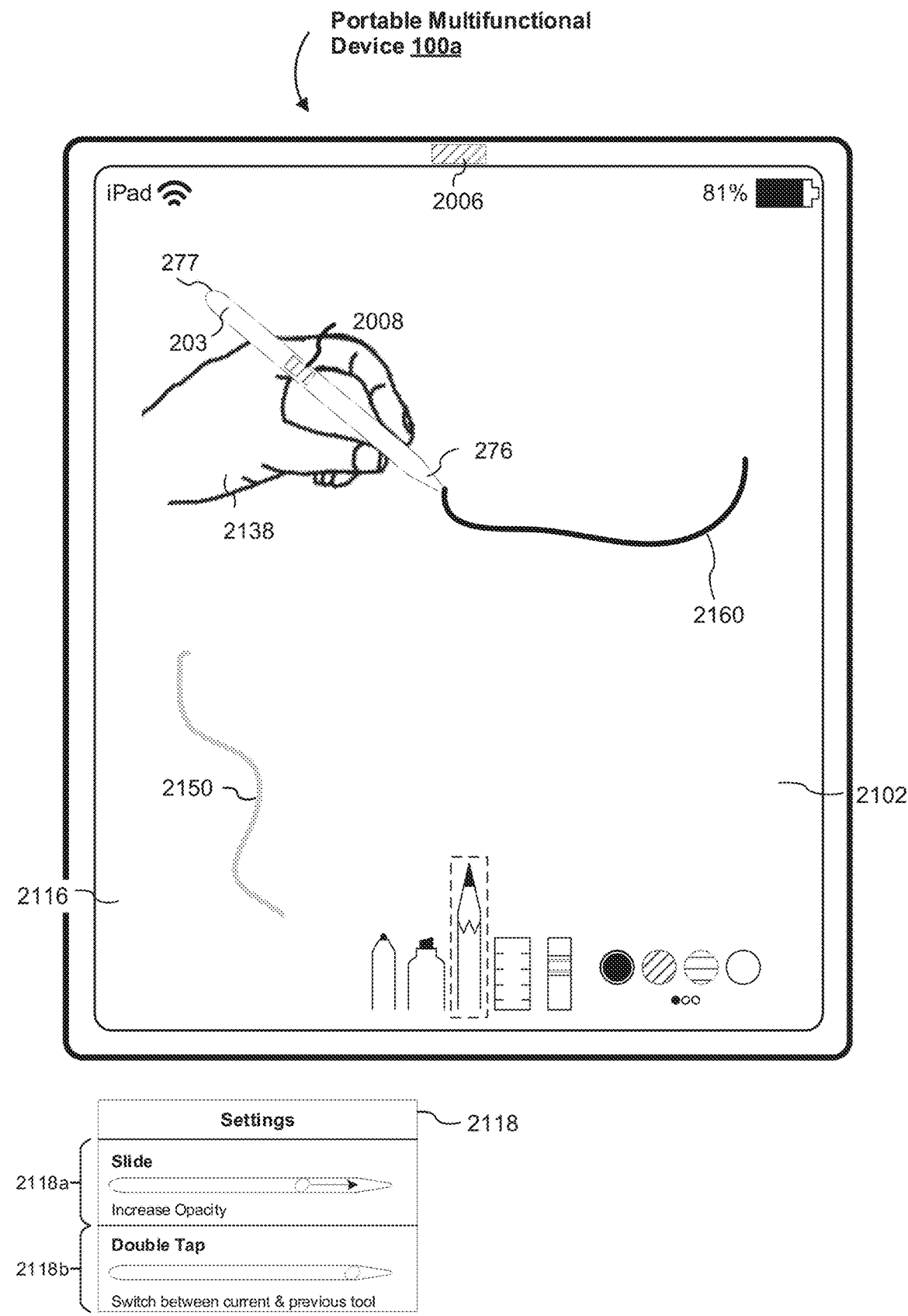

As illustrated in FIG. 21U, the electronic device 100a detects a draw input 2158 by the stylus 203. In response to detecting the draw input 2158 in FIG. 21U, the electronic device 100a ceases to display the opacity indicator 2154 and displays a corresponding mark 2160, as illustrated in FIG. 21V, having a higher opacity than the initial mark 2150.

Figure 21W:
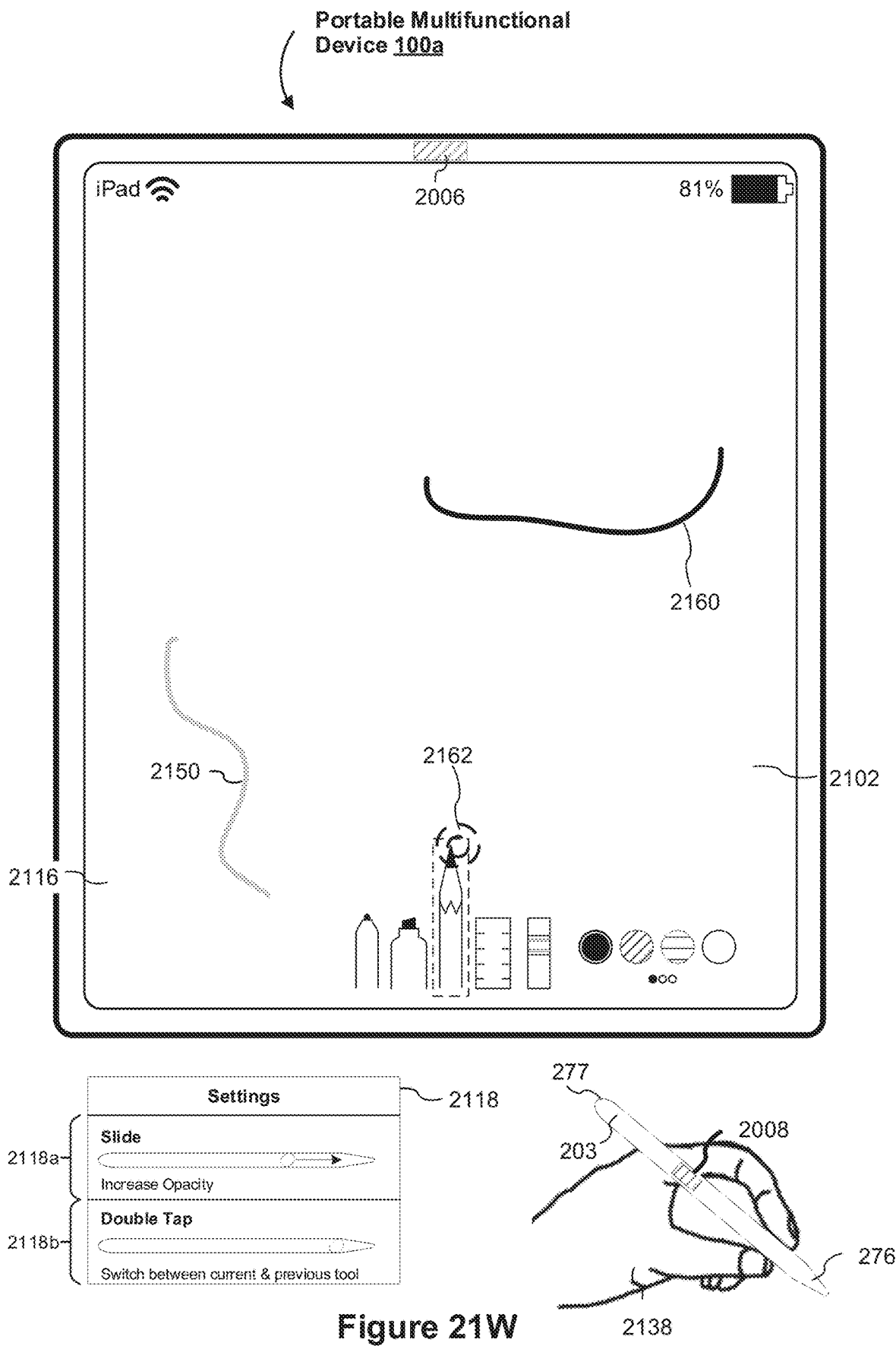
Figure 21X:
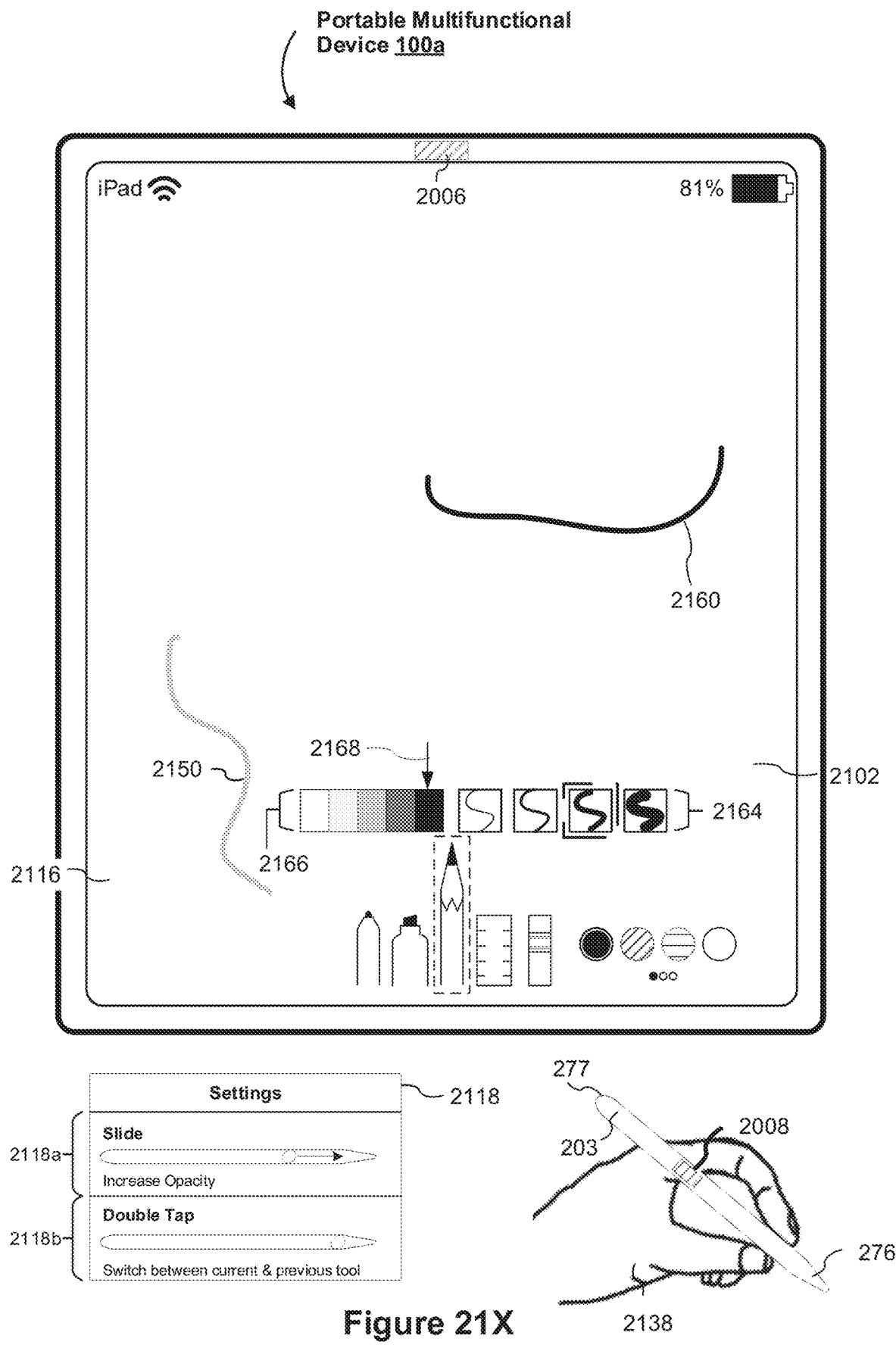

FIGS. 21W-21AB are illustrations of the electronic device 100a concurrently displaying thickness level and opacity level indicators. As illustrated in FIG. 21W, the electronic device 100a detects an input 2162 corresponding to the currently active pencil tool. In response to detecting the input 2162 in FIG. 21W, the electronic device 100a displays a thickness level indicator 2164, and an opacity level indicator 2166 including a current opacity level indicator 2168, as illustrated in FIG. 21X.

Figure 21Y:
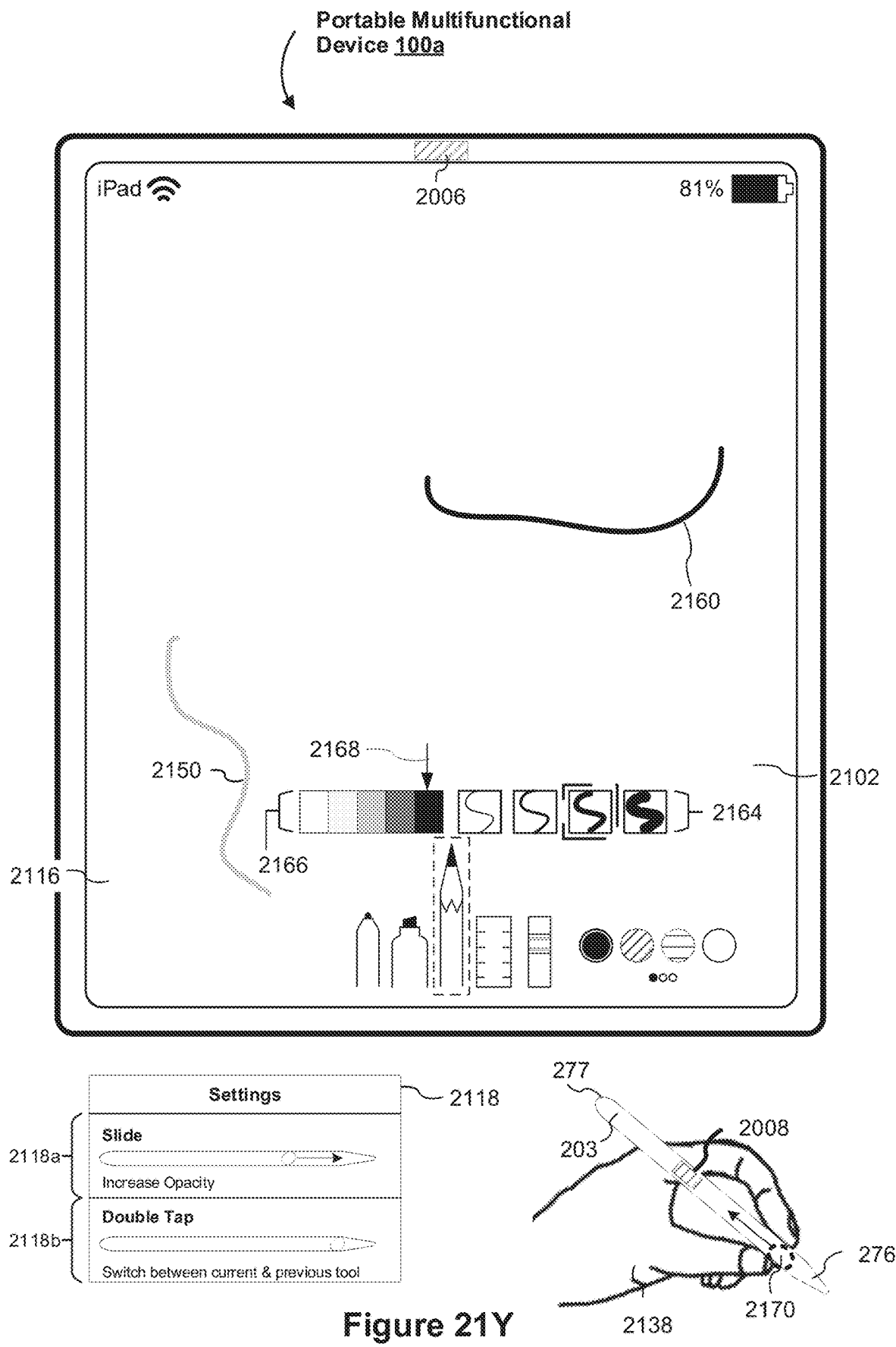
Figure 21Z:
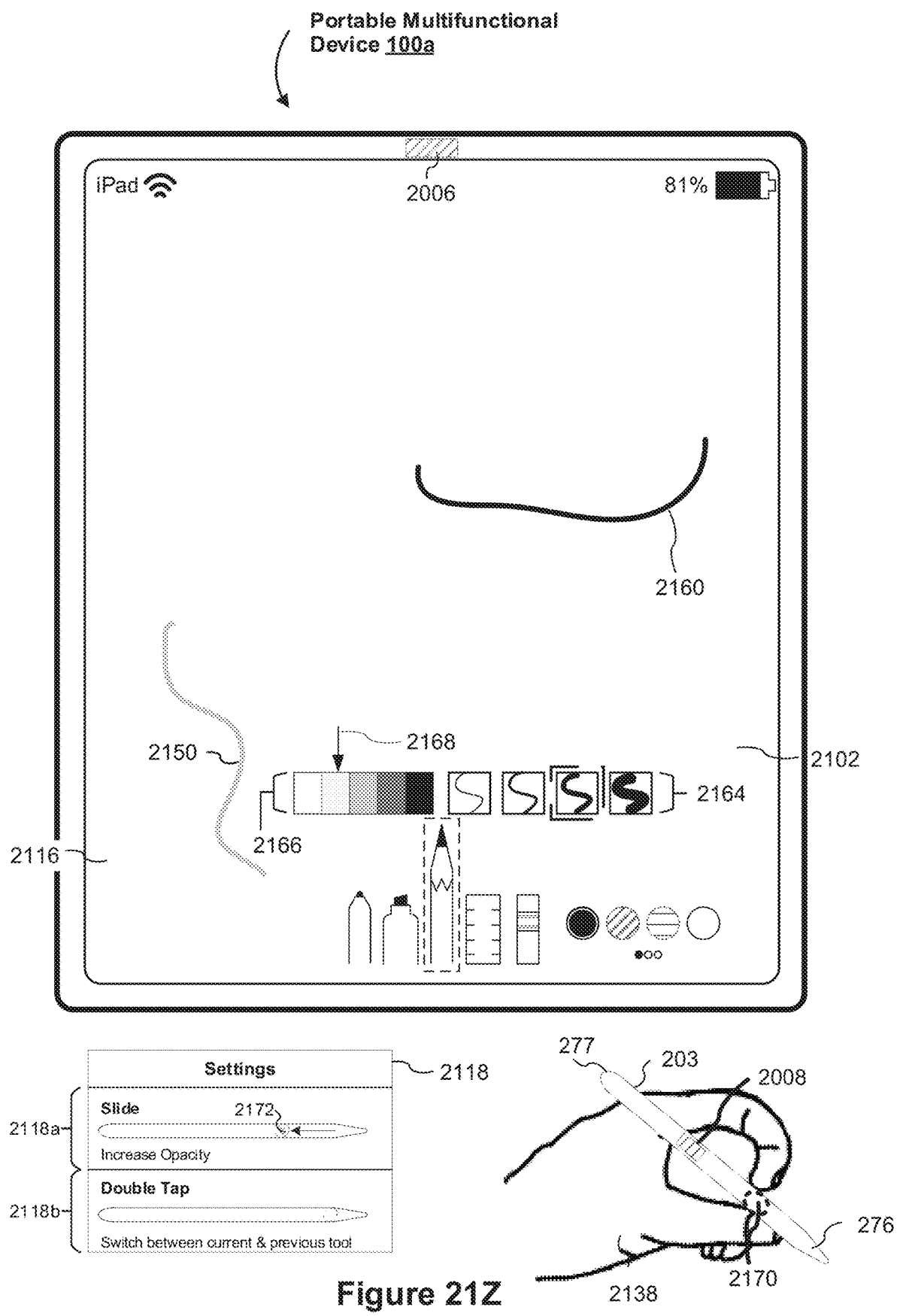
Figure 21A:
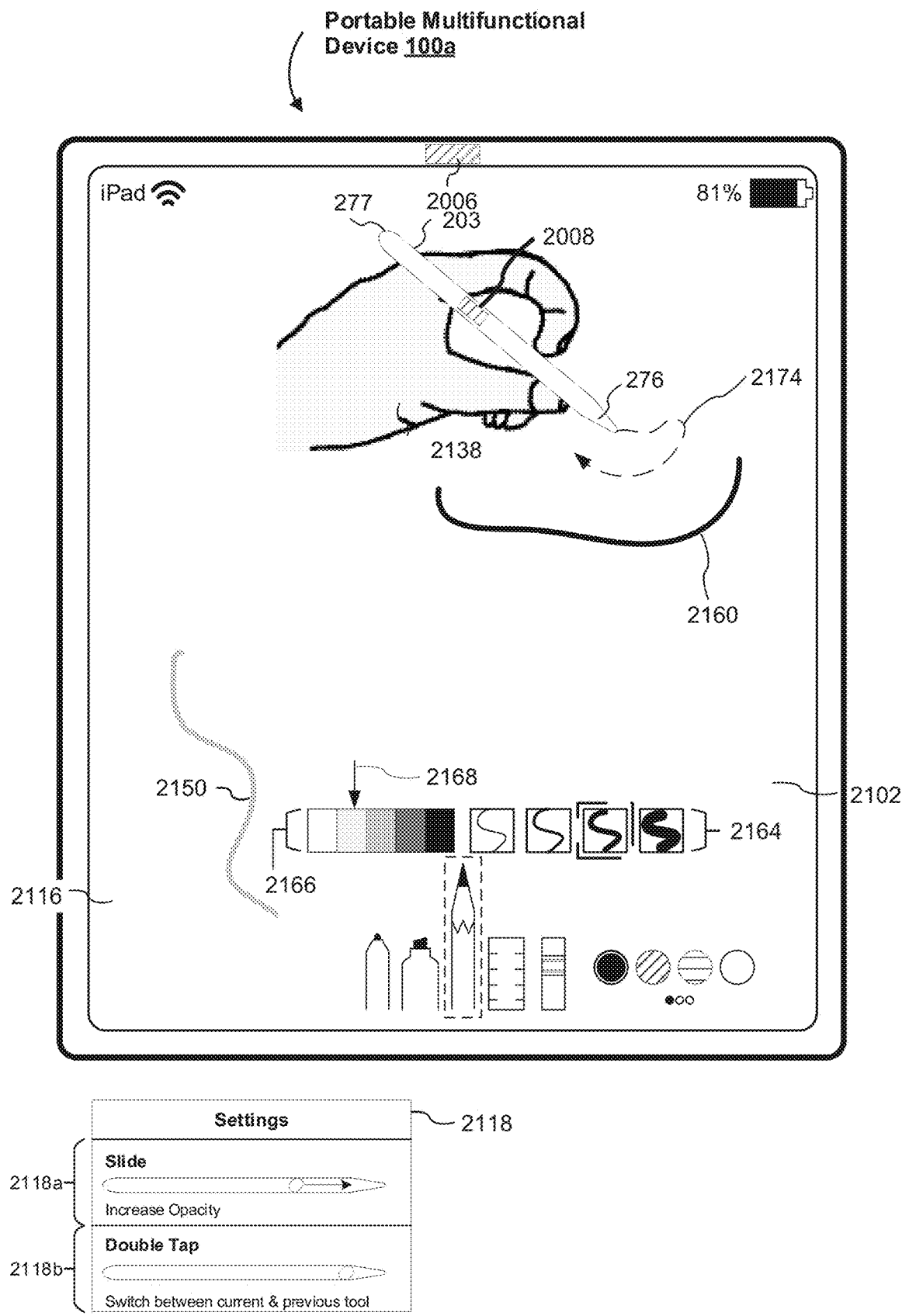
Figure 21A:
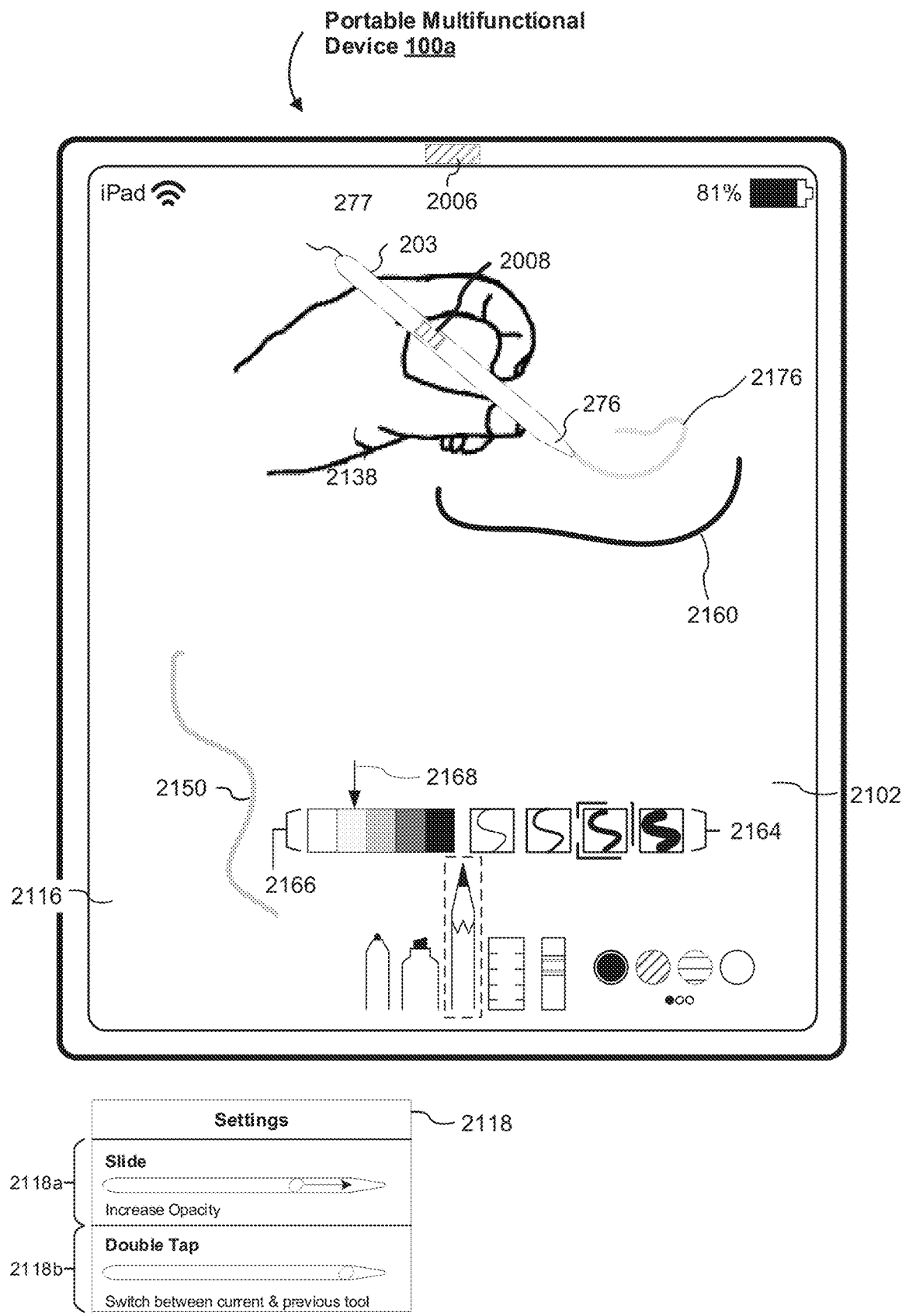

As illustrated in FIG. 21Y, the electronic device 100*a* obtains finger manipulation data from the stylus 203 indicating a slide up gesture 2170. In response to obtaining the finger manipulation data in FIG. 21Y, the electronic device 100*a* decreases the opacity, as illustrated in FIG. 21Z. The electronic device 100*a* moves the current opacity level indicator 2168 leftwards, from the highest opacity level in FIG. 21Y to the low-medium opacity level in FIG. 21Z. The slide up gesture 2170 is indicated by a slide up indicator 2172 in the stylus settings box 2118 in FIG. 21Z.

As illustrated in FIG. 21AA, the electronic device 100*a* detects a draw input 2174 by the stylus 203. In response to detecting the draw input 2174 in FIG. 21AA, the electronic device 100*a* displays a corresponding mark 2176, as illustrated in FIG. 21AB, having a low-medium opacity level.

FIGS. 22A-22G are illustrations of example user interfaces for maintaining stylus settings across electronic devices in accordance with some embodiments. The user interfaces in these figures are used to illustrate the processes described below, including portions of the processes in FIGS. 26A-26B. Although some of the examples which follow will be given with reference to inputs on a touchscreen display (where the touch-sensitive surface and the display are combined, for example on touch screen 112), in some embodiments, the electronic device 100*b* detects inputs on a touch-sensitive surface 651 that is separate from display 650, as shown in FIG. 6B.

As will be described below, in various embodiments, the electronic device 100*b* includes a first sensor 2206 and the stylus 203 includes a second sensor 2008. The first sensor 2206 and the second sensor 2008 collectively enable the electronic device 100*b* to detect that the electronic device 100*b* is proximate to the stylus 203. In some embodiments, the first sensor 2206 corresponds to the proximity sensor 166 in FIG. 1A. In some embodiments, the second sensor 2008 corresponds to the proximity sensor 466 in FIG. 4.

In various embodiments, the touch-sensitive surface (e.g., the touch-sensitive surface 275 in FIG. 2 and FIGS. 5A-5B) of the stylus 203 detects touch inputs and gesture inputs, or a lack thereof. Based on these detected inputs, the stylus 203 provides corresponding data to the electronic device 100*b*. For example, in some embodiments, the stylus 203 provides data to the electronic device 100*b* indicative of one or more of the following: whether the stylus is being held, a flick, a swipe, a tap, a double tap, and/or the like.

In various embodiments, the orientation and/or movement sensors (e.g., accelerometer, magnetometer, gyroscope) of the stylus 203 detect orientation/movement inputs or a lack thereof. Based on these detected inputs, the stylus 203 provides corresponding data to the electronic device 100*b*. For example, in some embodiments, the stylus 203 provides data to the electronic device 100*b* indicative of one or more of the following: whether the stylus is being held, barrel rotation and/or direction thereof, twirl and/or direction thereof, orientation (e.g., position) of the tip 276 and/or the end 277 of the stylus 203 relative to a reference plane, and/or the like.

As described above with reference to FIGS. 21A-21AB, the electronic device 100*a* obtained inputs to a stylus settings menu 2104 and/or obtained finger manipulation data from the stylus 203 in order to set various settings of the stylus 203. As illustrated in FIGS. 22A-22G, after the stylus 203 has been disconnected from the electronic device 100*a*, the settings for the stylus 203 that were previously set (as described above with respect to FIGS. 21A-21AB) are transferred to a different, electronic device 100*b* upon (e.g., in response to) pairing the stylus 203 with the electronic device 100*b*.

Figure 22A:
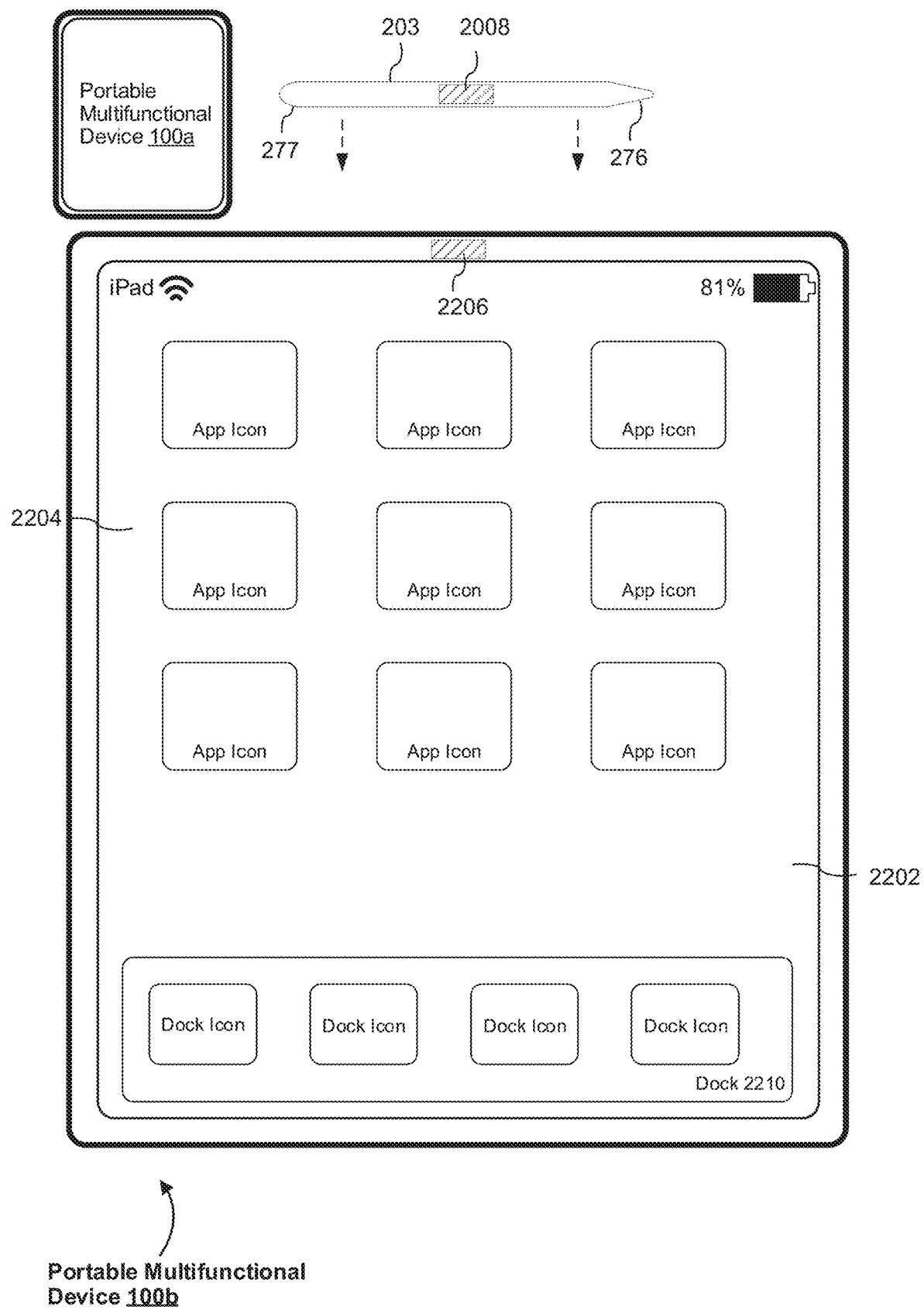
Figure 23A:
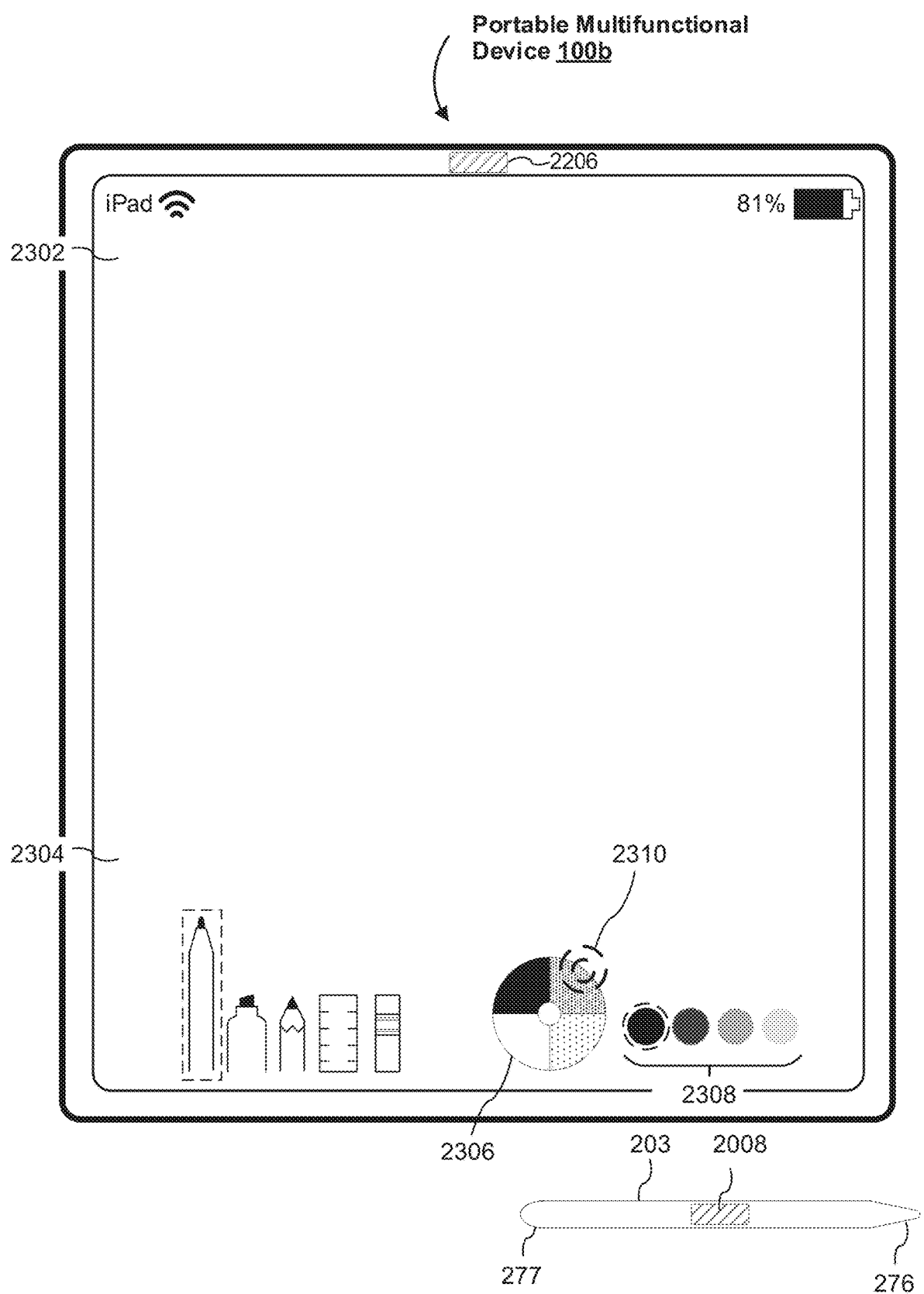
FIGS. 23A-23Z are illustrations of example user interfaces including a color-picker user interface to assign an active color in accordance with some embodiments.

As illustrated in FIG. 22A, the electronic device 100*b* displays a user interface 2202 corresponding to a home screen. The user interface 2202 includes a matrix of application icons (e.g., Apps) arranged in a main area 2204 of the user interface 2202. The user interface 2002 further includes a dock 2010 that includes a row of dock icons. One of ordinary skill in the art will appreciate that the number and arrangement of application icons and/or dock icons can differ. One of ordinary skill in the art will further appreciate that the user interface 2202 may include any number of a variety of user interface elements.

Figure 22B:
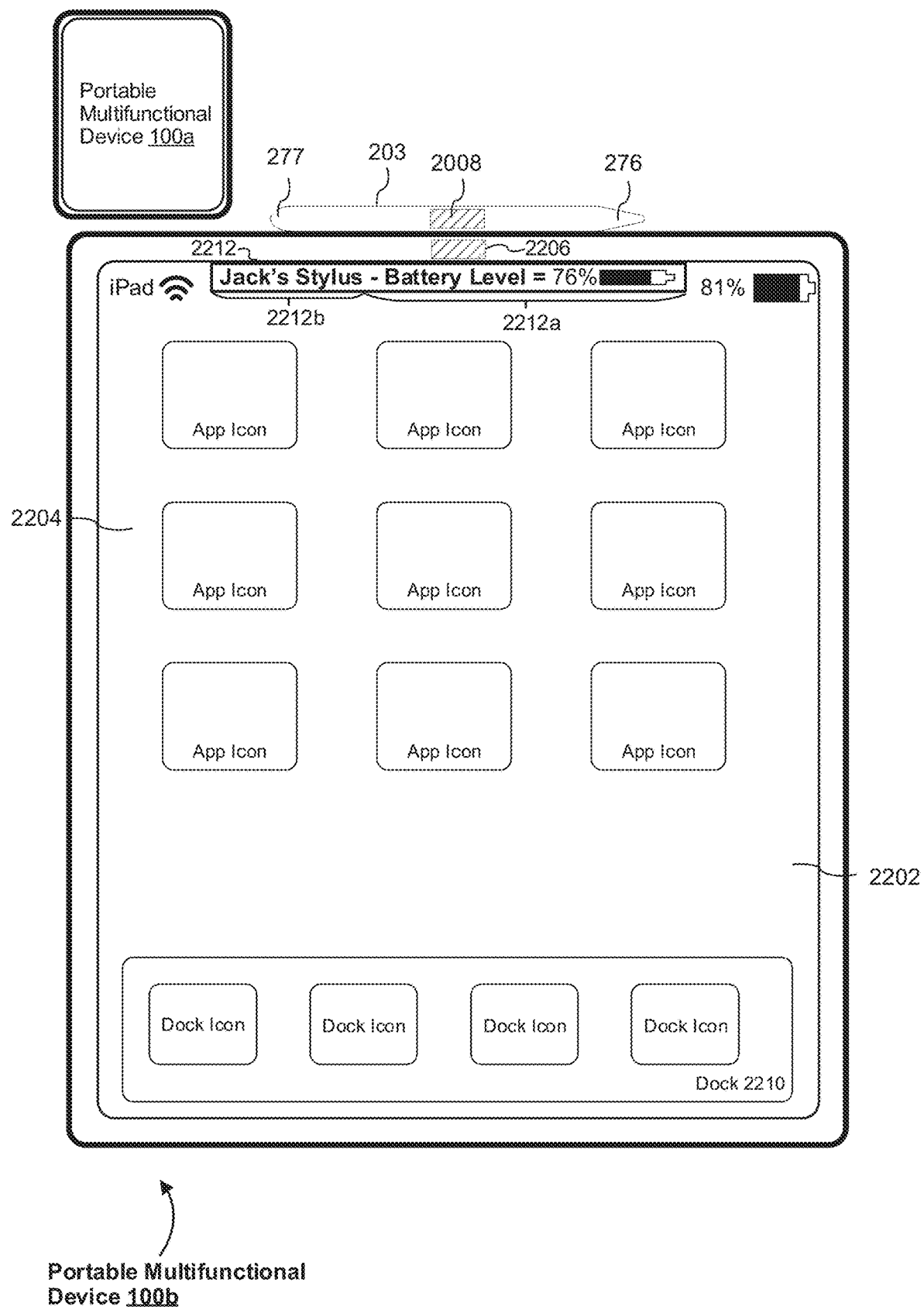

As illustrated in FIG. 22A, the stylus 203 moves within the proximity of the first sensor 2206 at the electronic device 100*b*. In response to detecting that the stylus is proximate to the electronic device 100*b*, the electronic device 100*b* pairs the electronic device 100*b* with the stylus 203. In various embodiments, the electronic device 100*b* detects that the stylus 203 is proximate to the electronic device 100*b* when the stylus 203 is sufficiently close to (e.g., 2 cm away from) the first sensor 2206 yet not contacting the electronic device 100*b*. For example, in some embodiments, radio frequency (RF) communications (e.g., 802.11x, peer-to-peer WiFi, BLUETOOTH, etc.) between the electronic device 100*b* and the stylus 203 inform the electronic device 100*b* that the stylus 203 is proximate to the electronic device 100*b*. In various embodiments, the electronic device 100*b* detects that the stylus 203 is proximate to the electronic device 100*b* when the stylus 203 is contacting the electronic device 100*a* at a connection point on the electronic device 100*b*. For example, in some embodiments, the electronic device 100*b* detects that the stylus 203 is proximate to the electronic device 100*b* when the stylus 203 is contacting a side of the electronic device 100*b* at which the first sensor 2206 resides, as illustrated in FIG. 22B.

Because the stylus 203 has been previously paired with an electronic device (e.g., paired with the electronic device 100*a* in FIGS. 20A-20B and again in FIGS. 20S-20T), the electronic device 100*b* foregoes displaying the stylus paired indicator 2010 as described above with respect to FIG. 20B. Rather, as illustrated in FIG. 22B, in response to detecting that the stylus 203 is proximate to (e.g., in contact with) the electronic device 100*b*, the electronic device 100*b* displays a stylus status bar 2212. The stylus status bar 2212 includes a stylus battery level indicator 2212*a* providing the current stylus battery level and a stylus user identifier 2212*b* providing an identification of a user currently associated with the stylus 203. In some embodiments, as illustrated in FIG. 22B, the electronic device 100*b* displays the stylus status bar 2212 on the side of the electronic device 100*b* the stylus 203 is contacting (e.g., attached to).

Figure 22C:
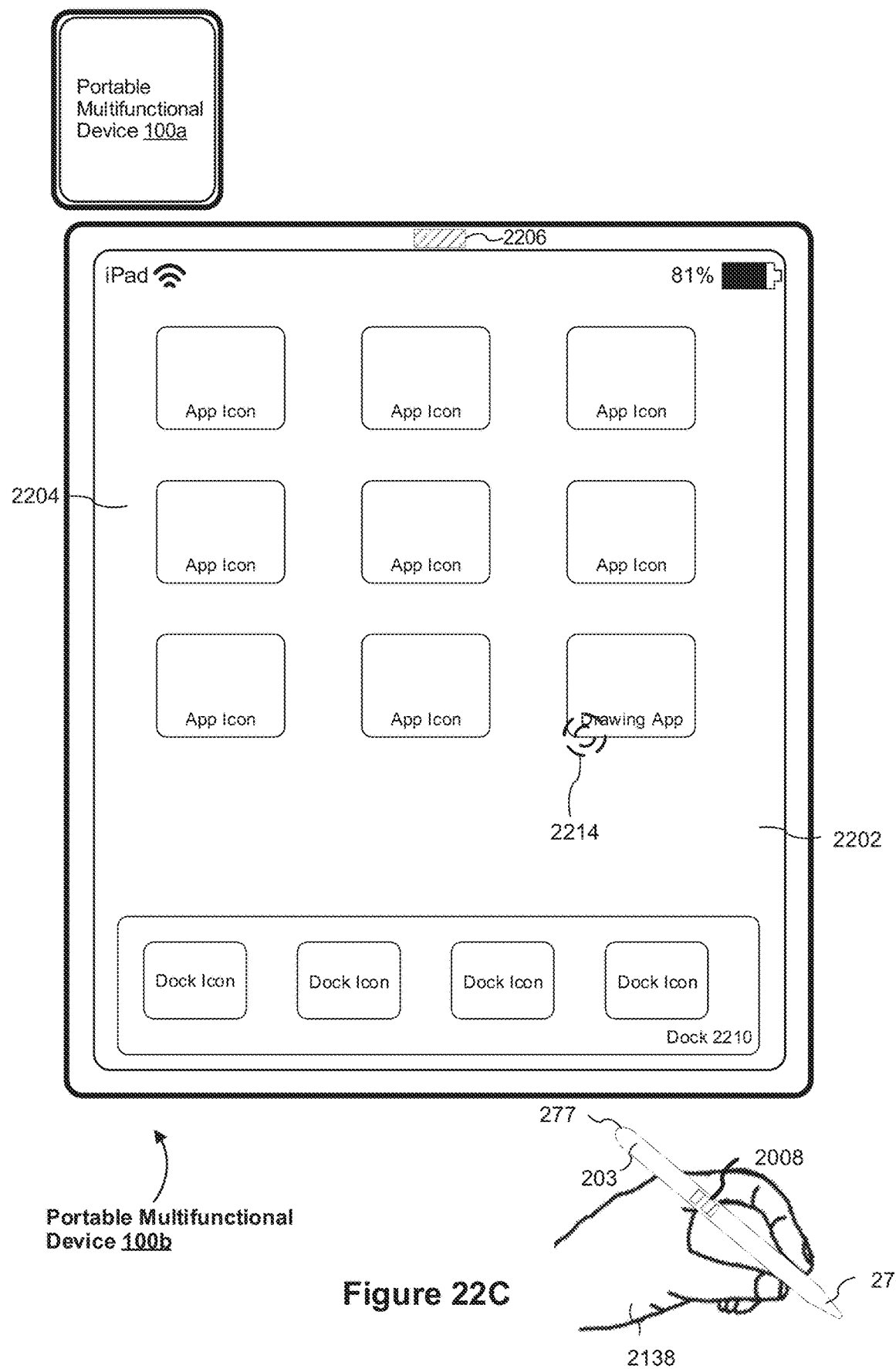

After a threshold amount of time, as illustrated in FIG. 22C, the electronic device 100*b* ceases display of the stylus status bar 2212. As further illustrated in FIG. 22C, the electronic device 100*b* detects an input 2214 corresponding to a drawing application icon. In response to detecting the input 2214 in FIG. 22C, the electronic device 100*b* displays, as illustrated in FIG. 22D, a canvas 2216 associated with the selected drawing application and a set of corresponding drawing tools. Notably, as illustrated in FIG. 22D, the drawing tool having focus (e.g., active drawing tool) is the pencil because the last drawing tool having focus before the stylus 203 was disconnected from electronic device 100*a* was a pencil. Thus, the value of the previous drawing tool associated with the electronic device 100a is effectively transferred to a different electronic device 100b.

Moreover, for explanatory purposes, FIGS. 22D-22G include a stylus settings box 2217 indicating current stylus settings and gestures being performed at the stylus 203. The stylus settings box 2217 includes a slide settings portion 2217a and a double tap settings portion 2217b. Notably, the values of settings of the stylus 203 indicated by the stylus settings box 2217 match the last values of the corresponding settings before the stylus 203 was disconnected from the electronic device 100a. Namely, as illustrated in FIG. 21AB with respect to the previous electronic device 100a, a slide down gesture results in increasing opacity and a double tap results in switching to the previous tool. These same settings are indicated by the stylus settings box 2217 in FIG. 22D with respect to the electronic device 100b.

As further illustrated in FIG. 22D, the electronic device 100b obtains finger manipulation data from the stylus 203 indicating a first tap gesture 2218 of a double tap gesture. As illustrated in FIG. 22E, the electronic device 100b obtains finger manipulation data from the stylus 203 indicating a second tap gesture 2220 of a double tap gesture, as indicated by the double tap gesture indicator 2222 within the double tap settings portion 2217b of the stylus settings box 2217. In response to obtaining the finger manipulation data, the electronic device 100b switches to the previous drawing tool. Namely, the electronic device 100b moves focus from the pencil to the marker, as illustrated in FIG. 22E.

As illustrated in FIG. 22F, the electronic device 100b obtains finger manipulation data from the stylus 203 indicating a slide down gesture 2224. In response to obtaining the finger manipulation data, the electronic device 100b displays an opacity indicator 2226 in FIG. 22F. The opacity indicator 2226 includes five opacity boxes corresponding to respective opacity levels. Notably, as illustrated in FIG. 22F, the current opacity level 2228 is a low-medium level, because the last opacity before the stylus 203 was disconnected from the previous electronic device 100a was a low-medium level. Accordingly, the opacity level associated with the electronic device 100a is transferred to the different electronic device 100b.

In response to obtaining the finger manipulation data in FIG. 22F, the electronic device 100b increases the line opacity by moving the current opacity level indicator 2228 rightwards to the medium-high opacity level, as illustrated in FIG. 22G. The slide down gesture 2224 is indicated by a slide down indicator 2230 in the slide settings portions 2217a of the stylus settings box 2217 in FIG. 22G.

FIGS. 23A-23Z are illustrations of example user interfaces including a color-picker for assigning an active color in accordance with some embodiments. The user interfaces in these figures are used to illustrate the processes described below, including portions of the processes in FIGS. 27A-27C. Although some of the examples which follow will be given with reference to inputs on a touch-screen display (where the touch-sensitive surface and the display are combined, for example on touch screen 112), in some embodiments, the electronic device 100b detects inputs on a touch-sensitive surface 651 that is separate from display 650, as shown in FIG. 6B.

In various embodiments, the touch-sensitive surface (e.g., the touch-sensitive surface 275 in FIG. 2 and FIGS. 5A-5B) of the stylus 203 detects touch inputs and gesture inputs, or a lack thereof. Based on these detected inputs, the stylus 203 provides corresponding data to the electronic device 100b. For example, in some embodiments, the stylus 203 provides data to the electronic device 100b indicative of one or more of the following: whether the stylus is being held, a flick, a swipe, a tap, a double tap, and/or the like.

In various embodiments, the orientation and/or movement sensors (e.g., accelerometer, magnetometer, gyroscope) of the stylus 203 detect orientation/movement inputs or a lack thereof. Based on these detected inputs, the stylus 203 provides corresponding data to the electronic device 100b. For example, in some embodiments, the stylus 203 provides data to the electronic device 100b indicative of one or more of the following: whether the stylus is being held, barrel rotation and/or direction thereof, twirl and/or direction thereof, orientation (e.g., position) of the tip 276 and/or the end 277 of the stylus 203 relative to a reference plane, and/or the like.

Figure 23B:
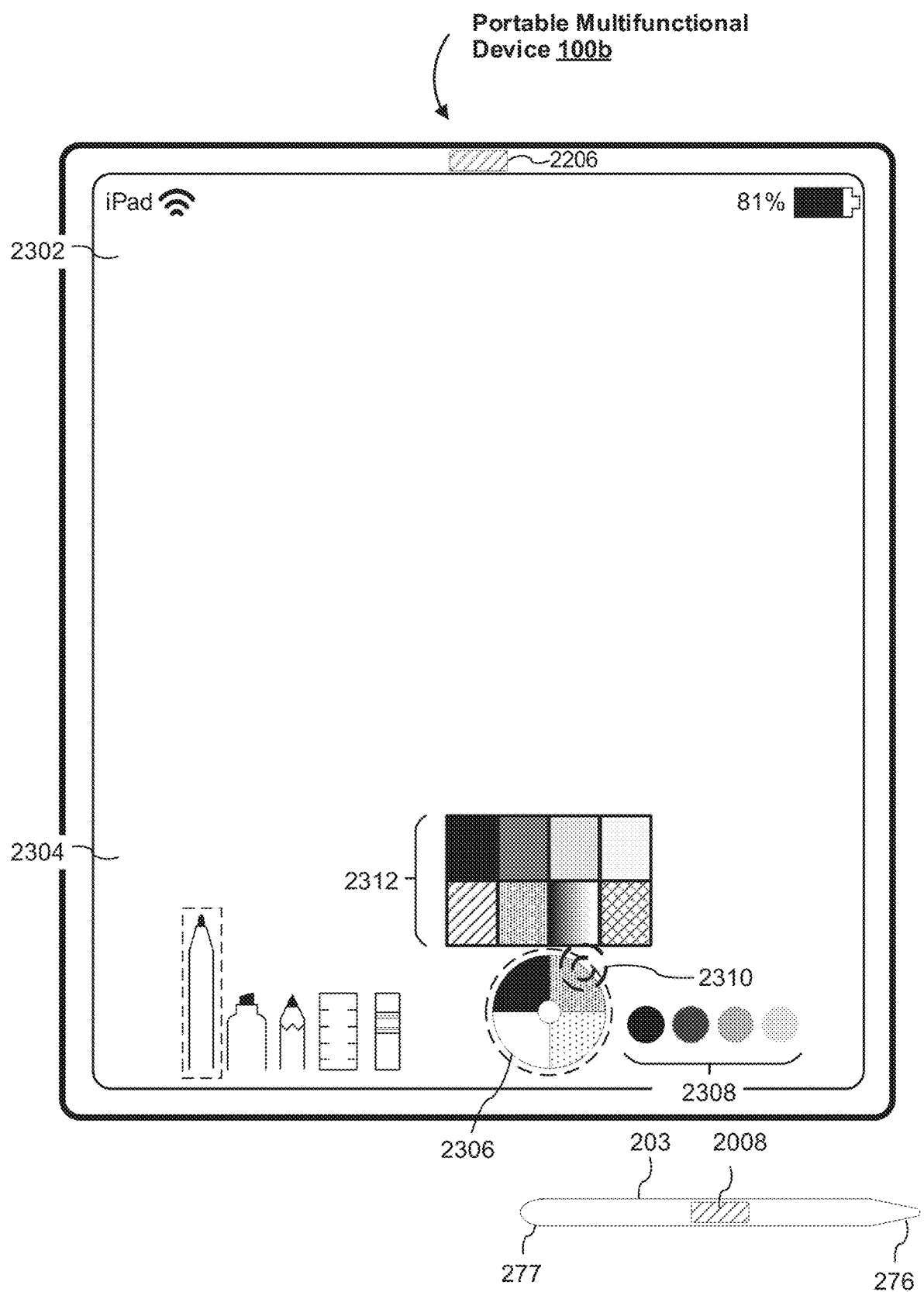
Figure 23C:
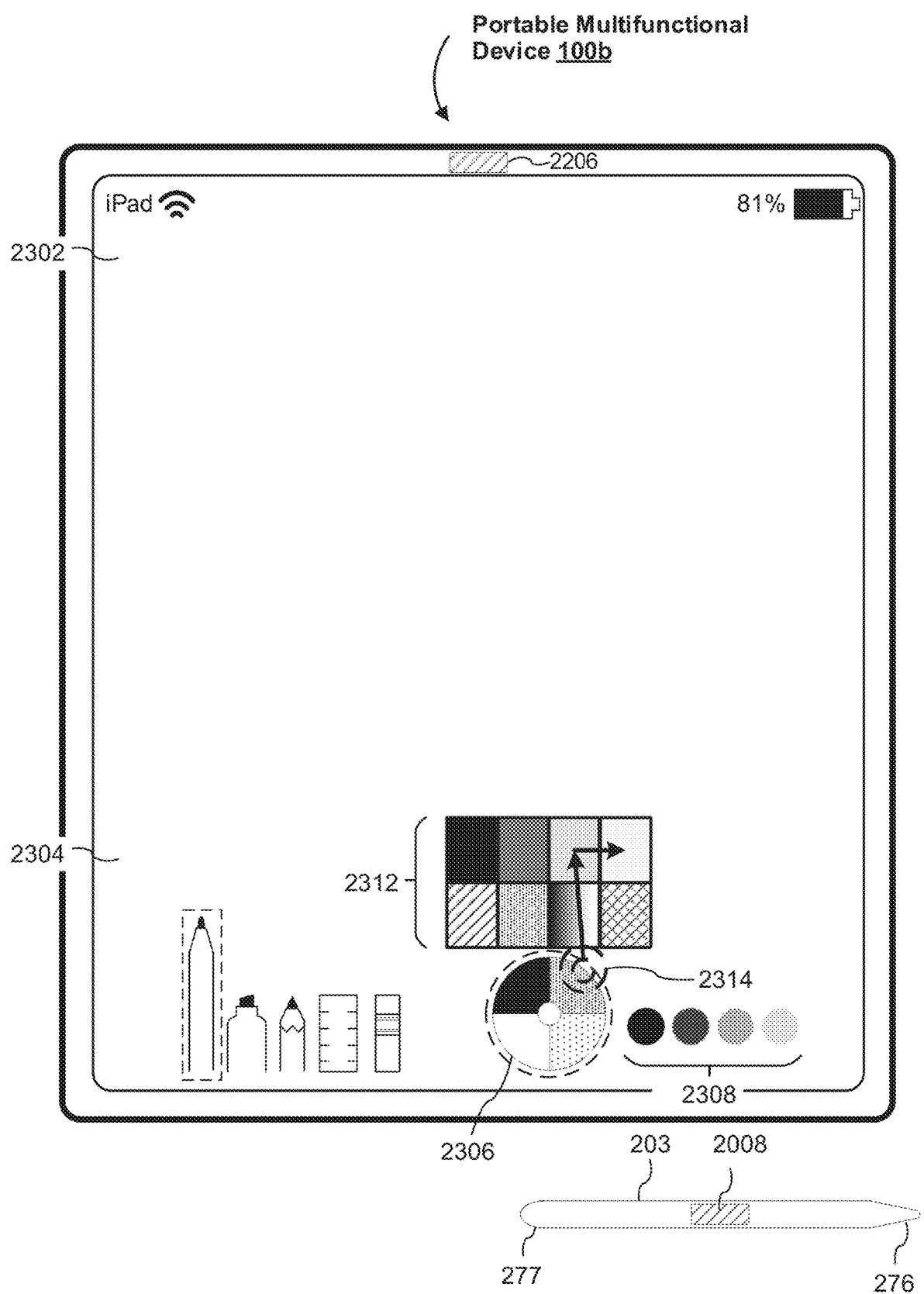
Figure 23D:
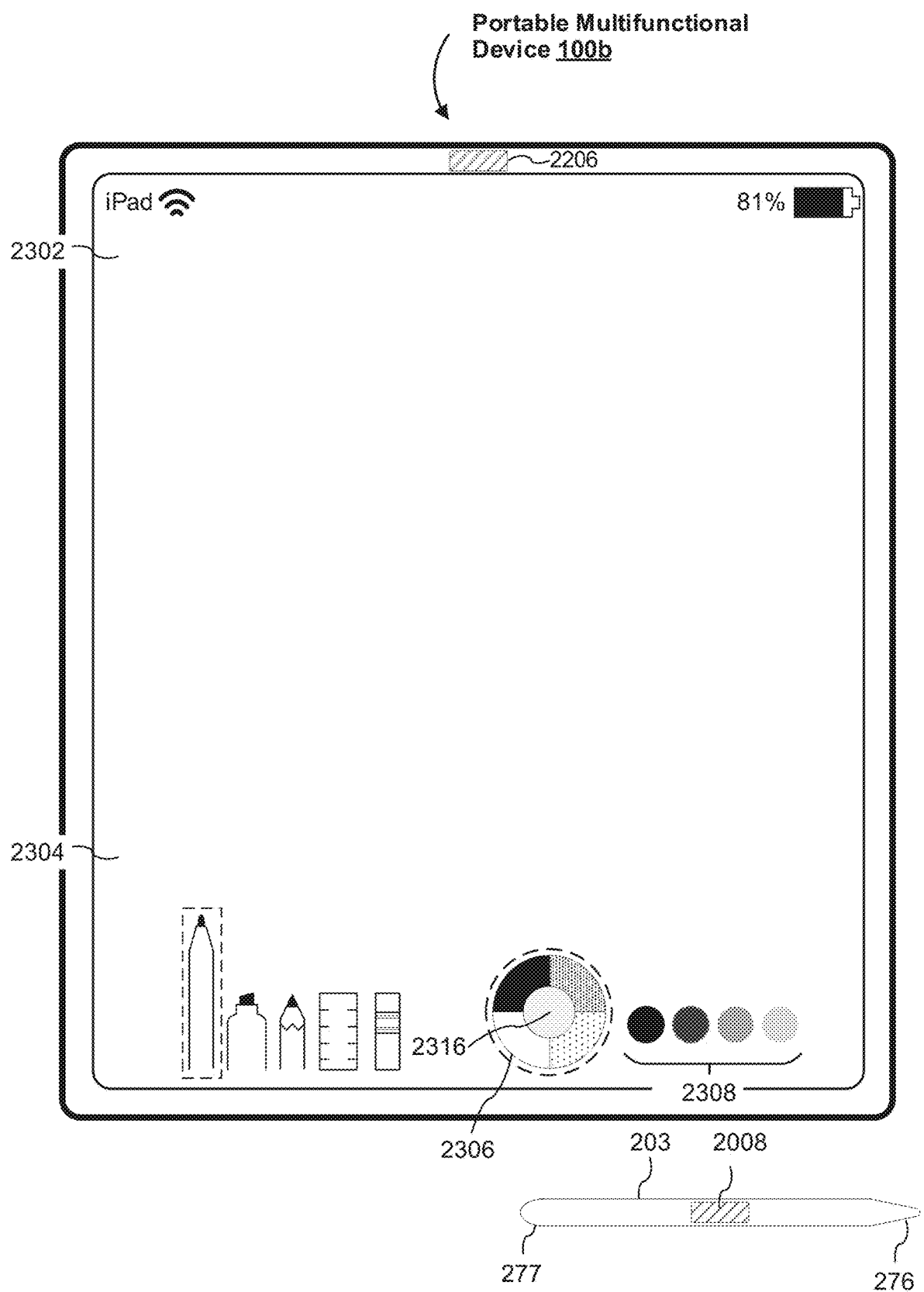
Figure 23E:
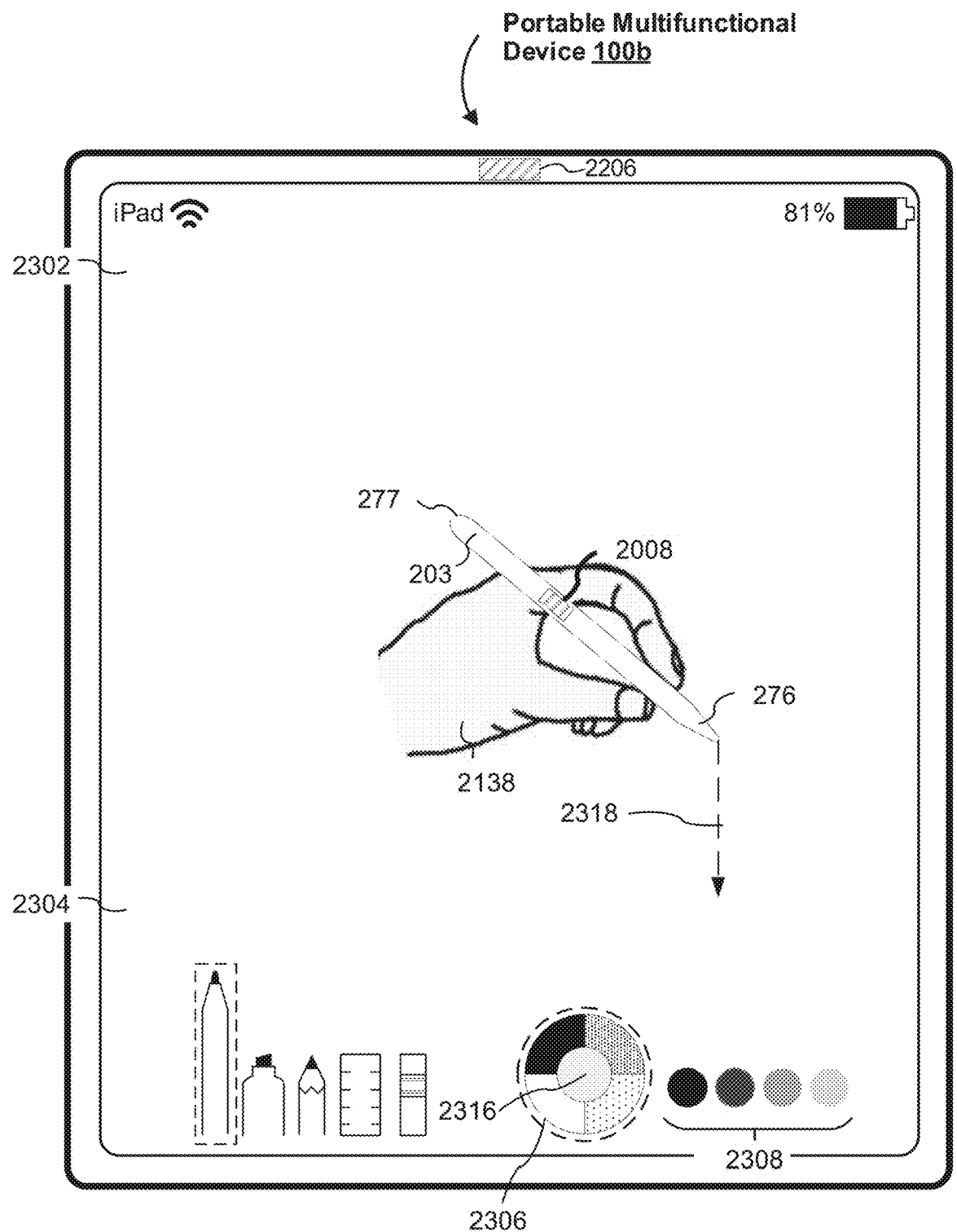
Figure 23F:
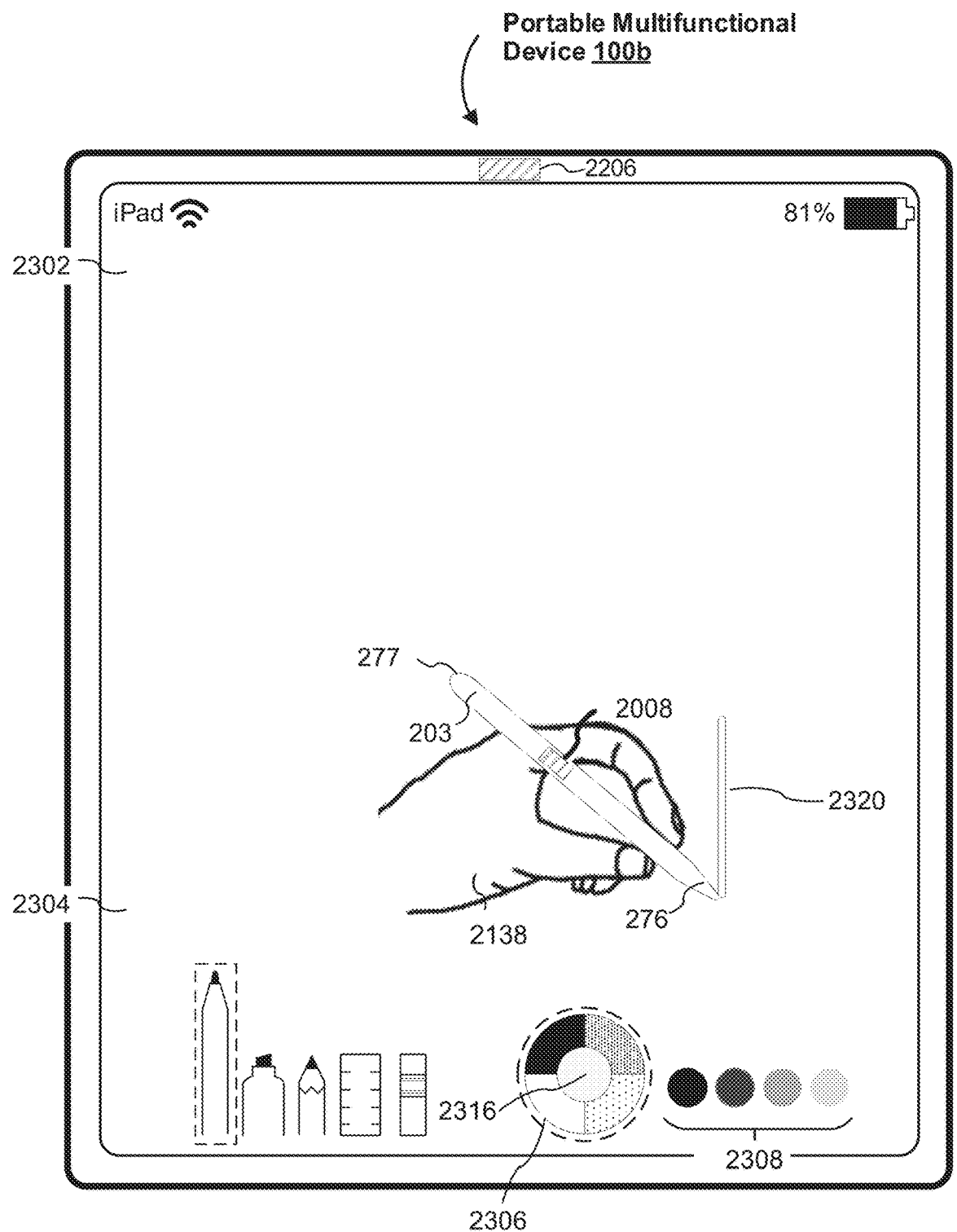
Figure 23G:
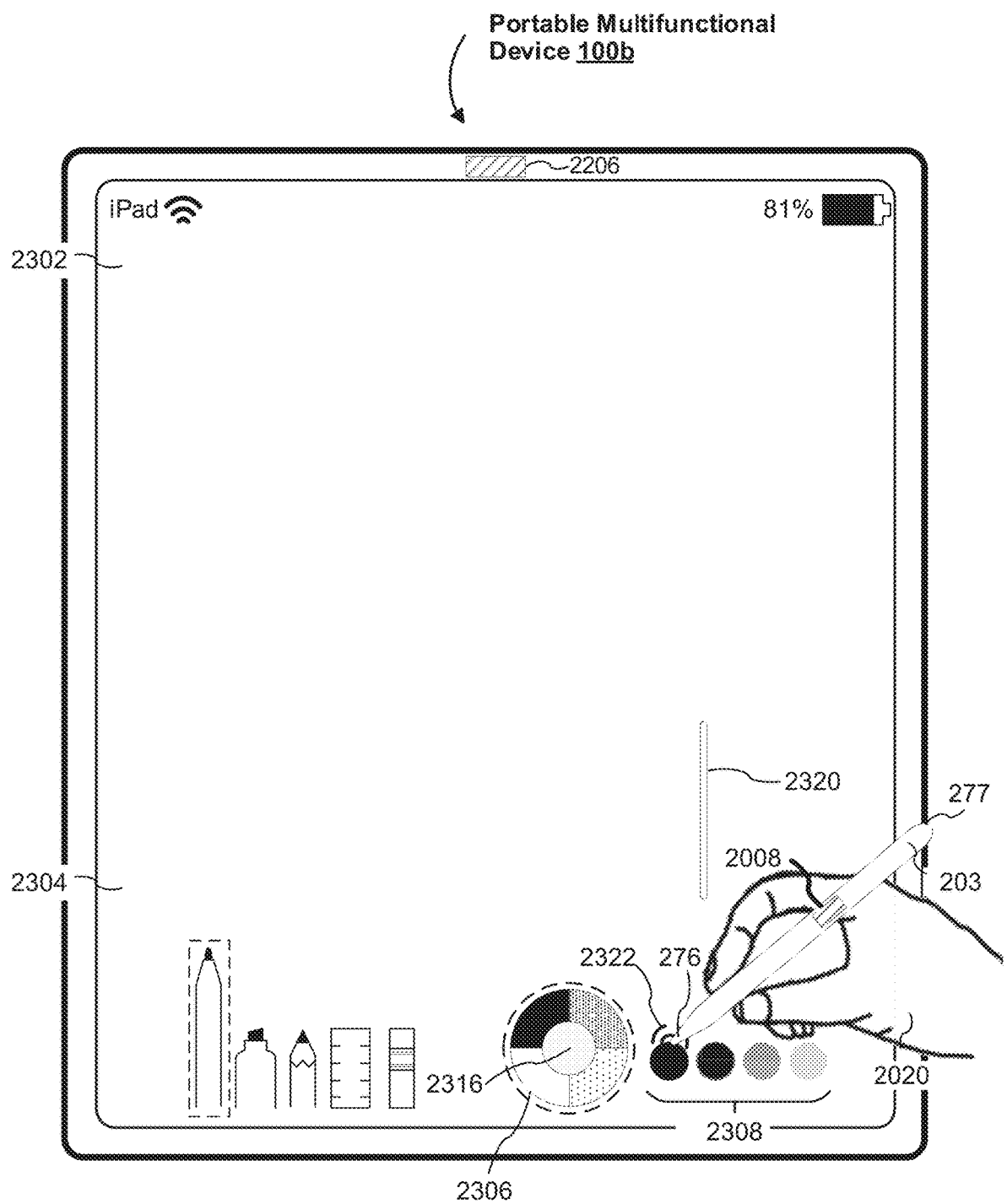
Figure 23H:
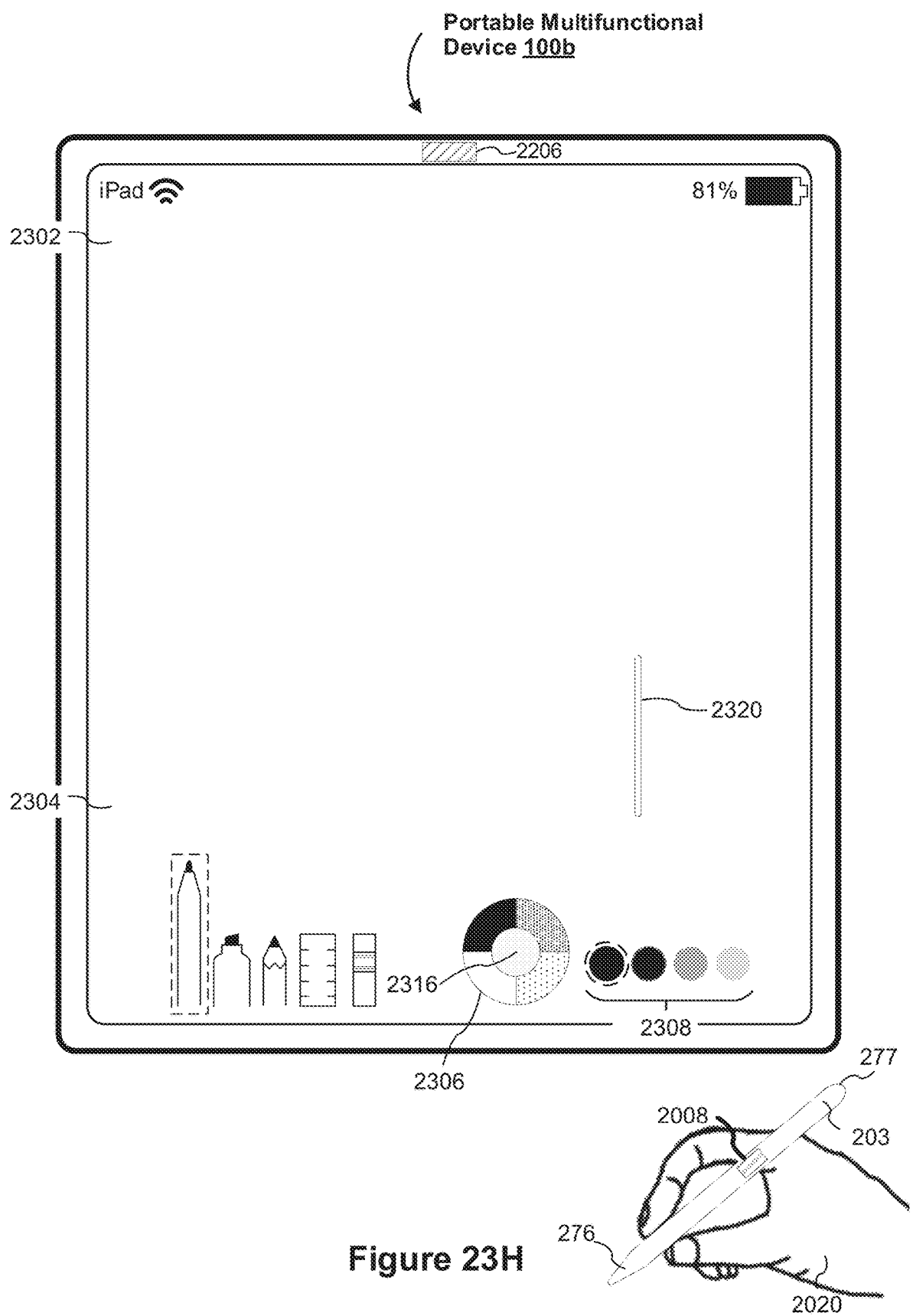
Figure 23I:
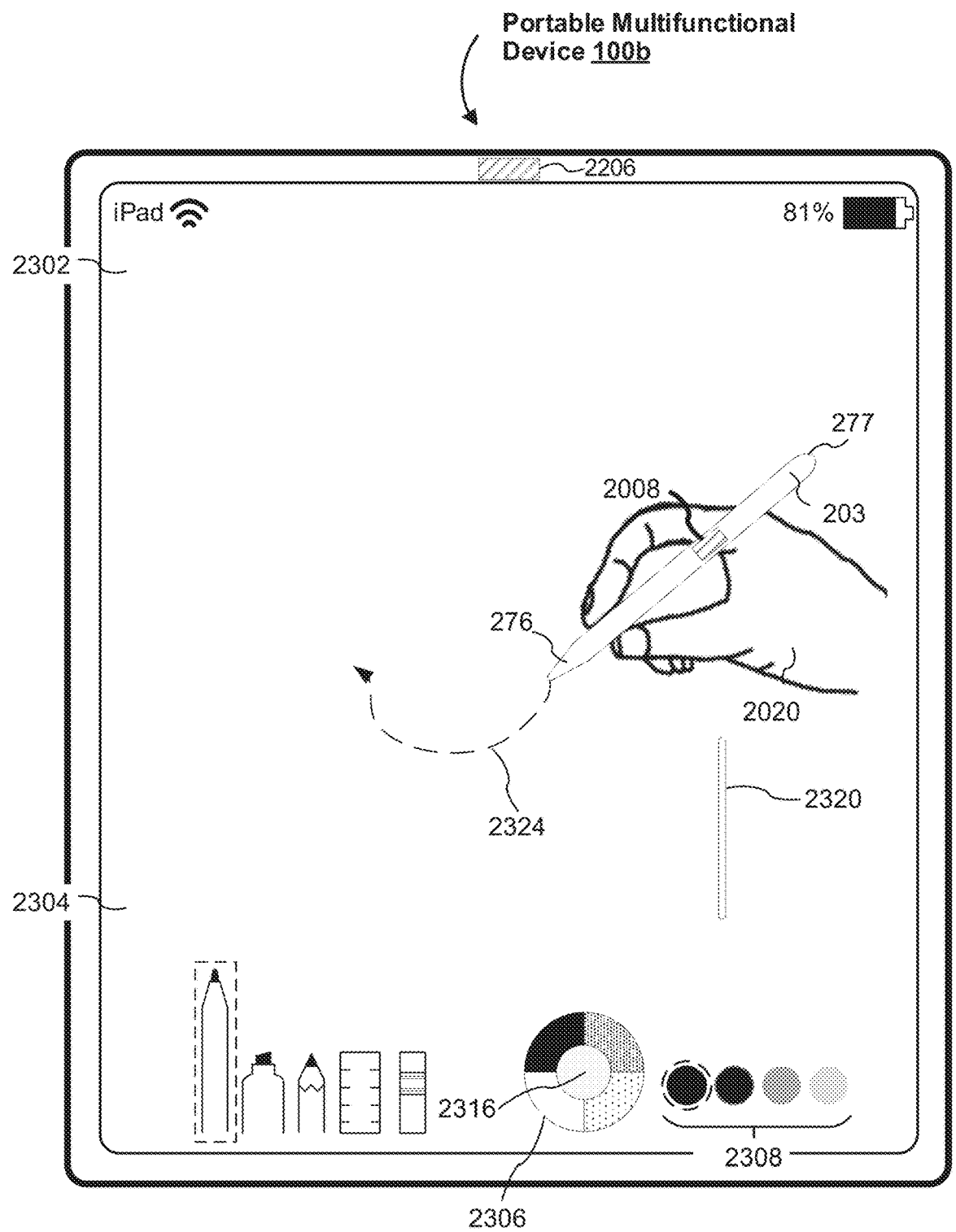
Figure 23J:
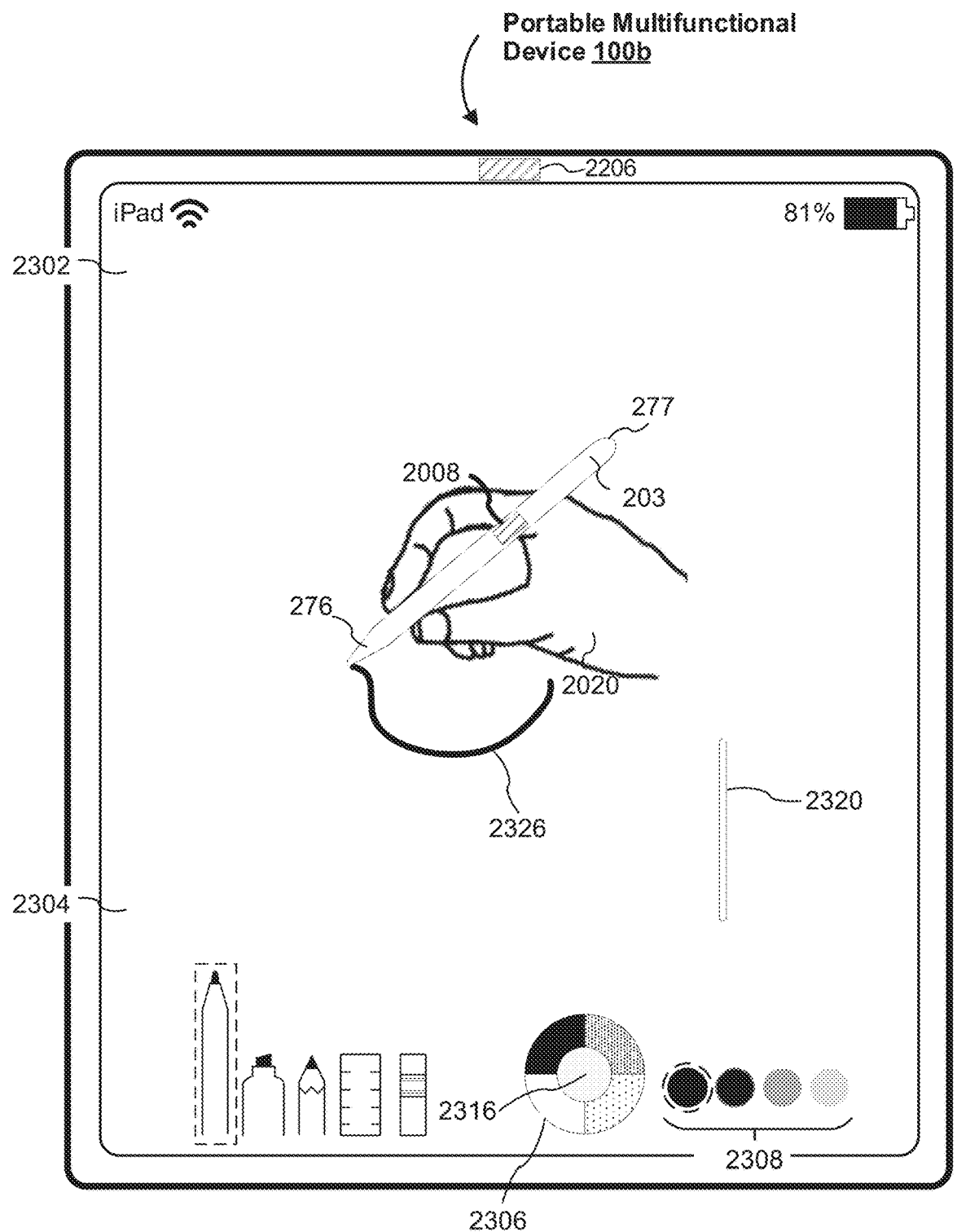
Figure 23K:
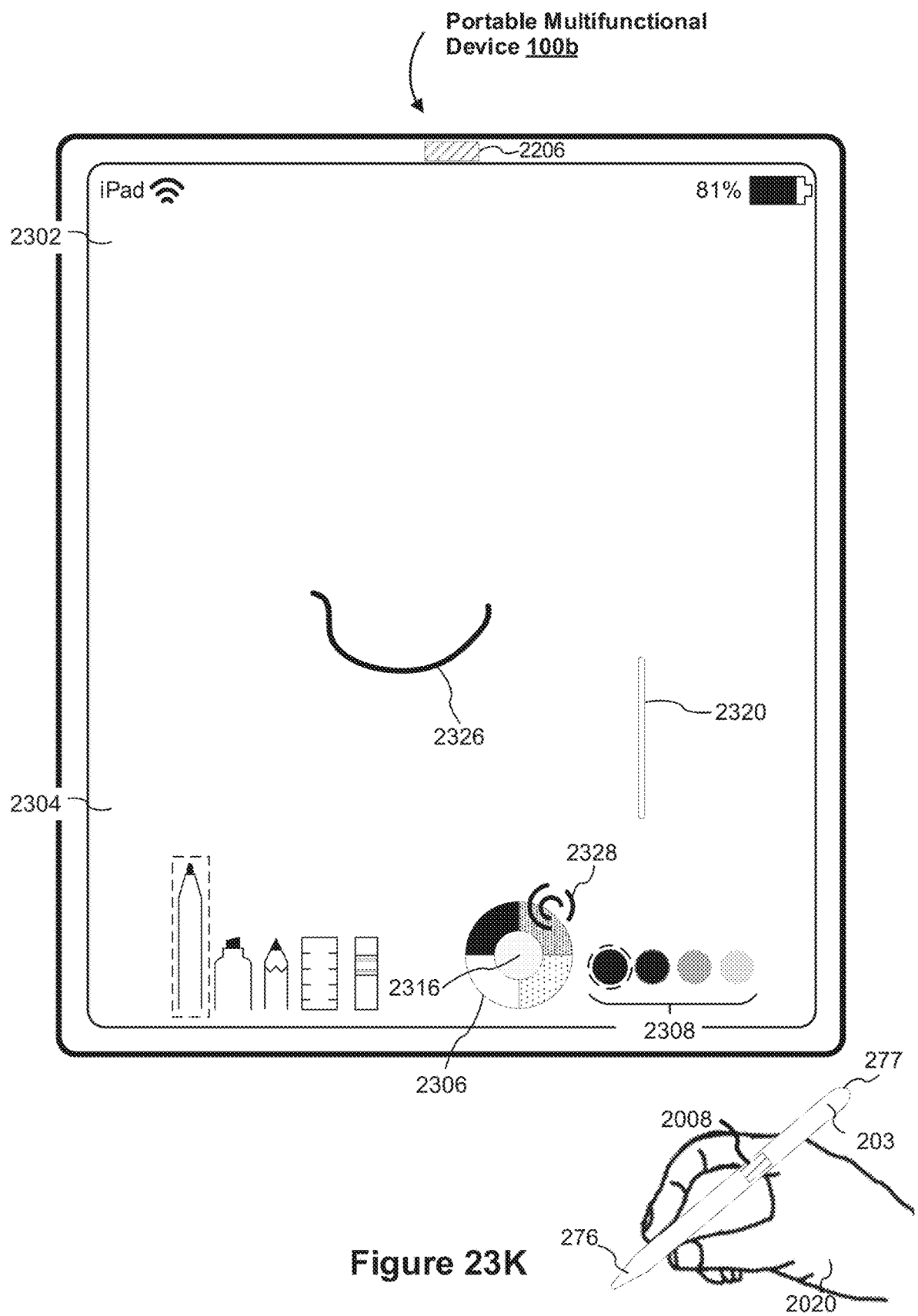
Figure 23L:
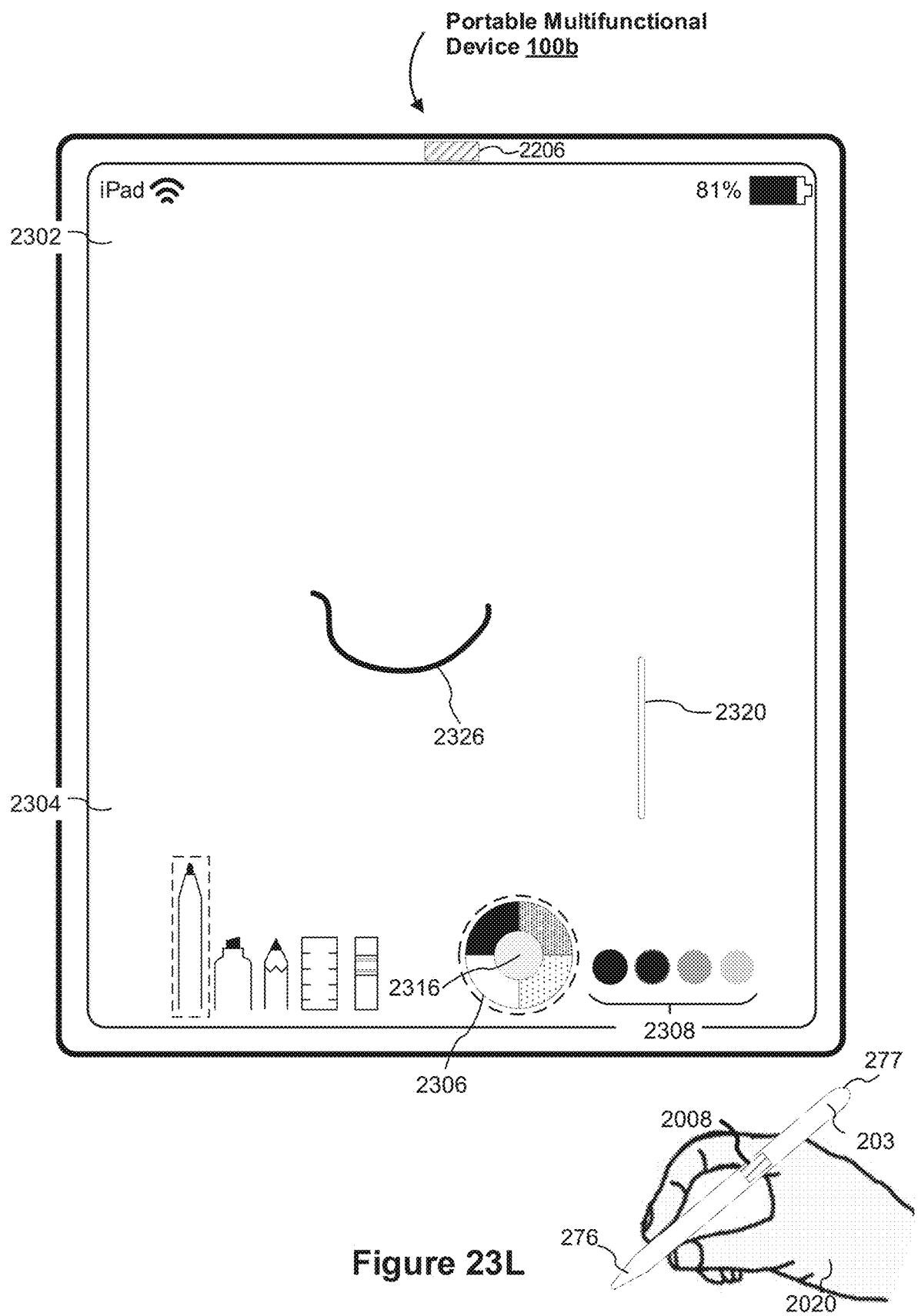
Figure 23M:
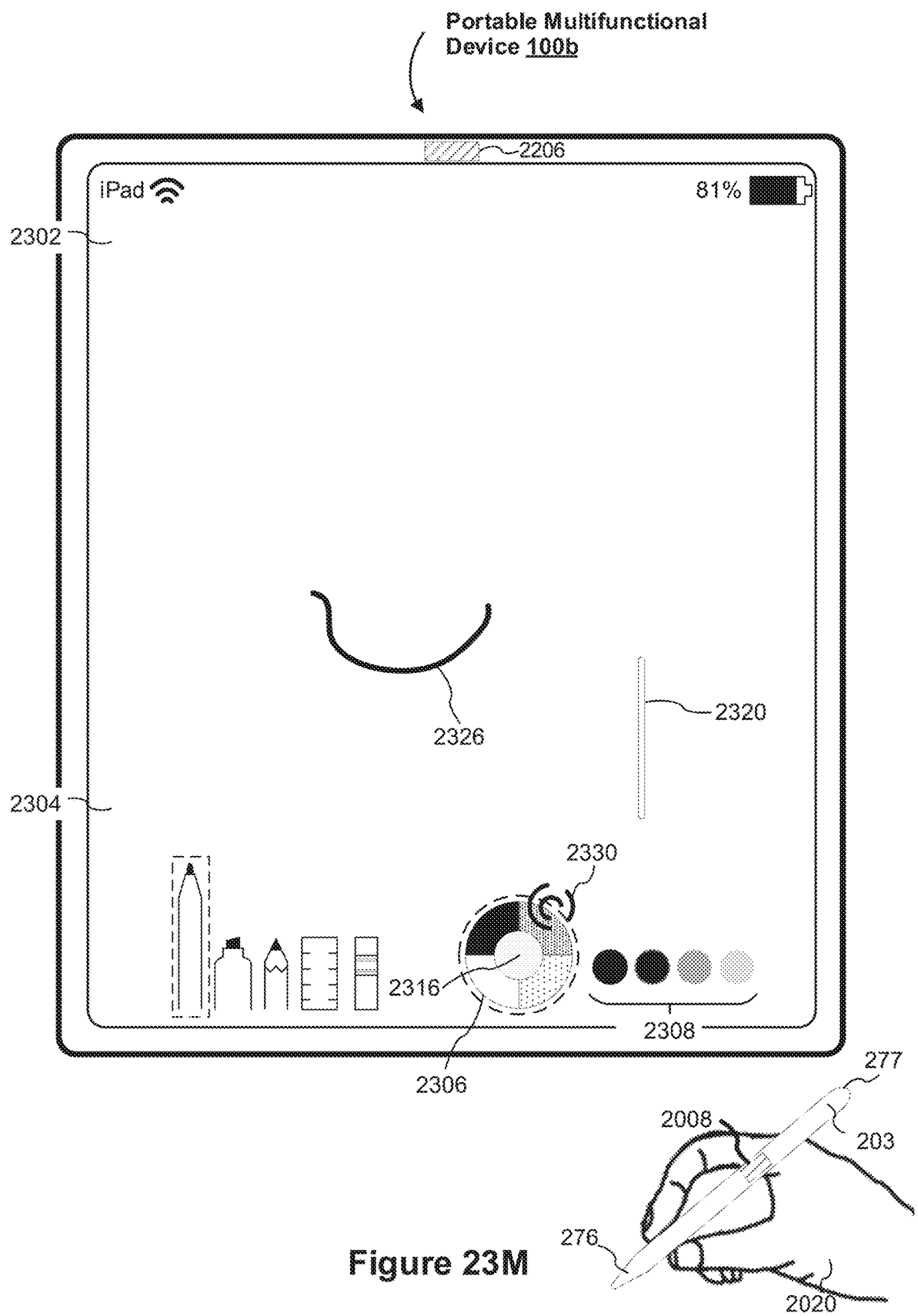
Figure 23N:
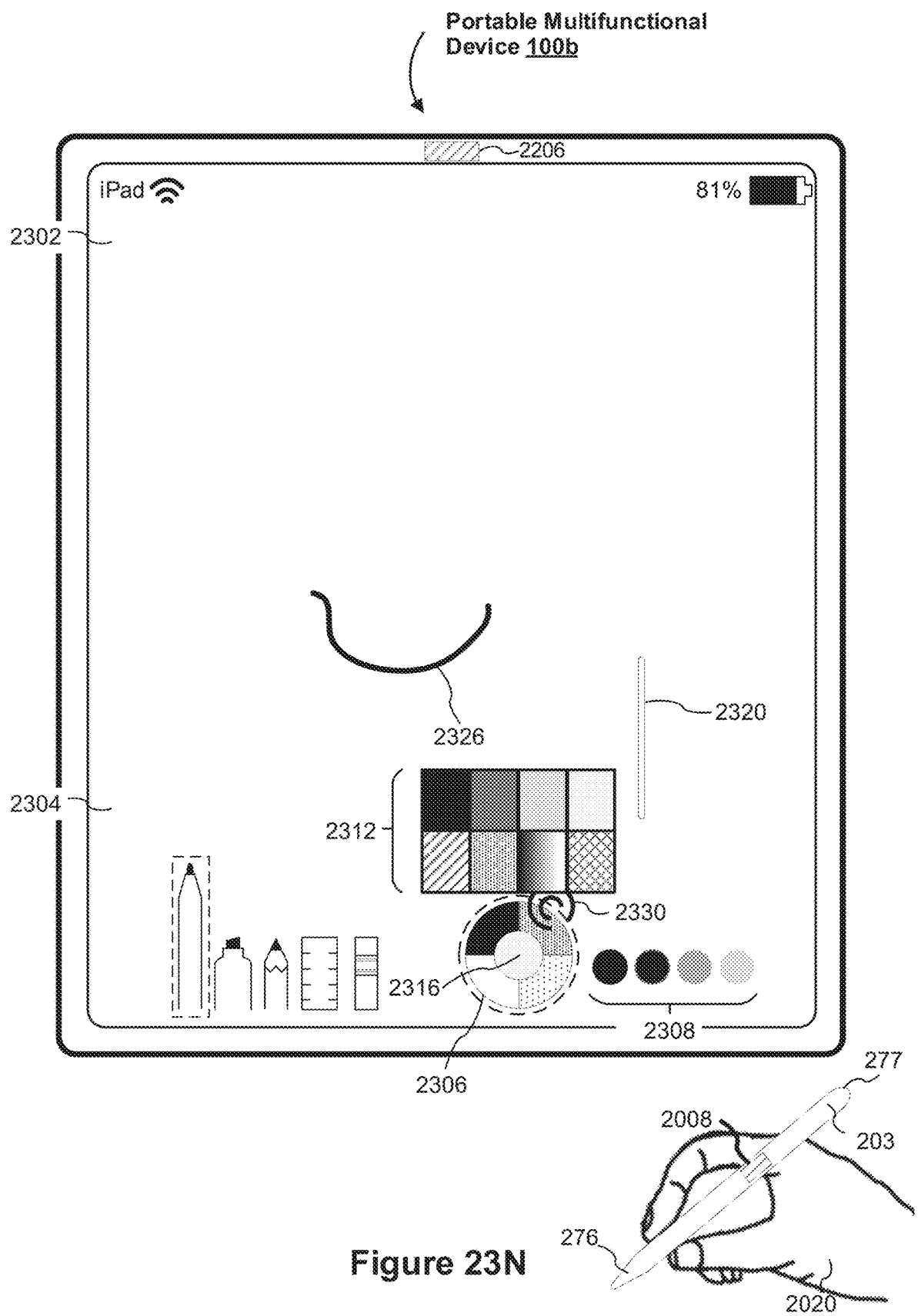
Figure 23O:
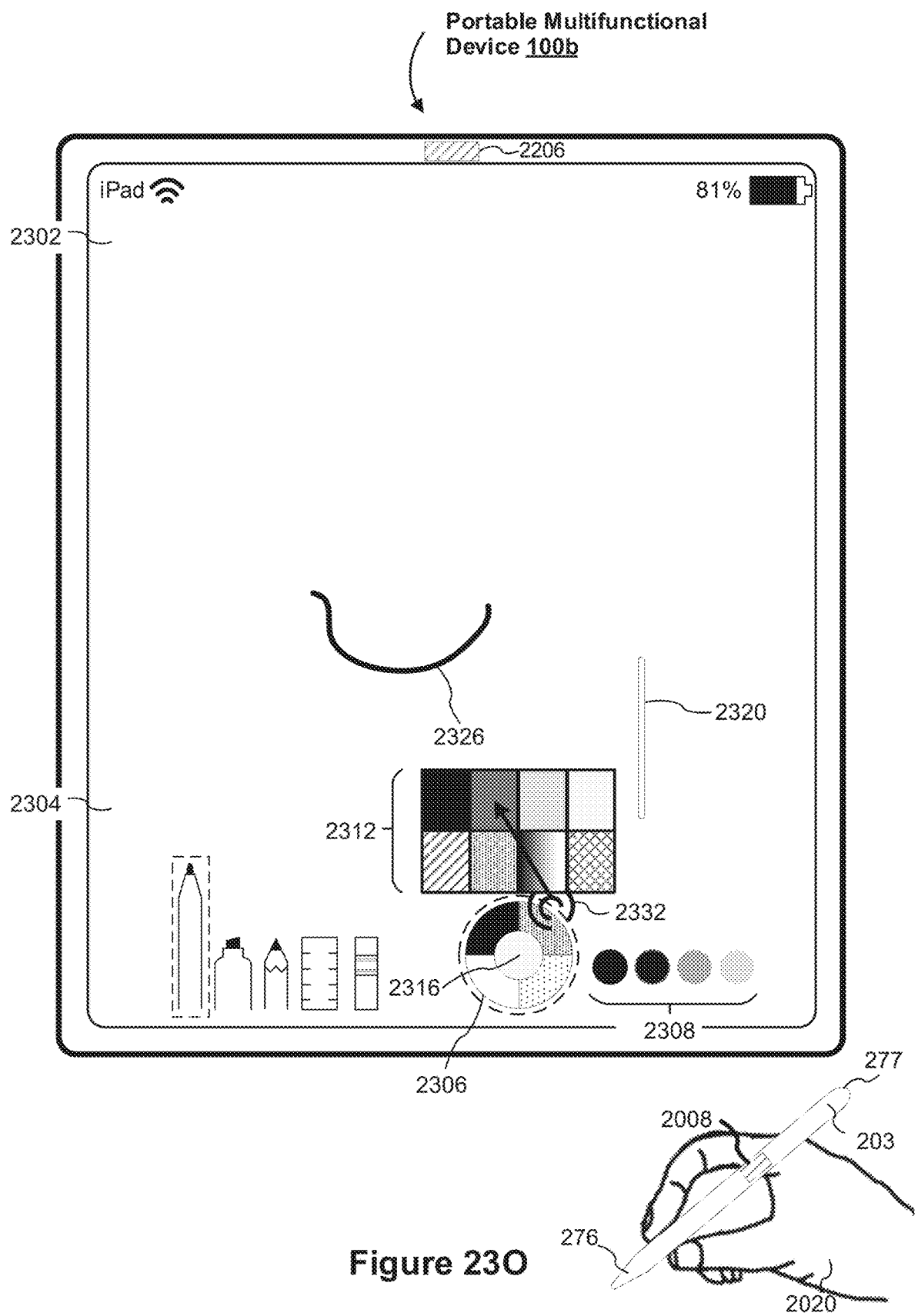
Figure 23P:
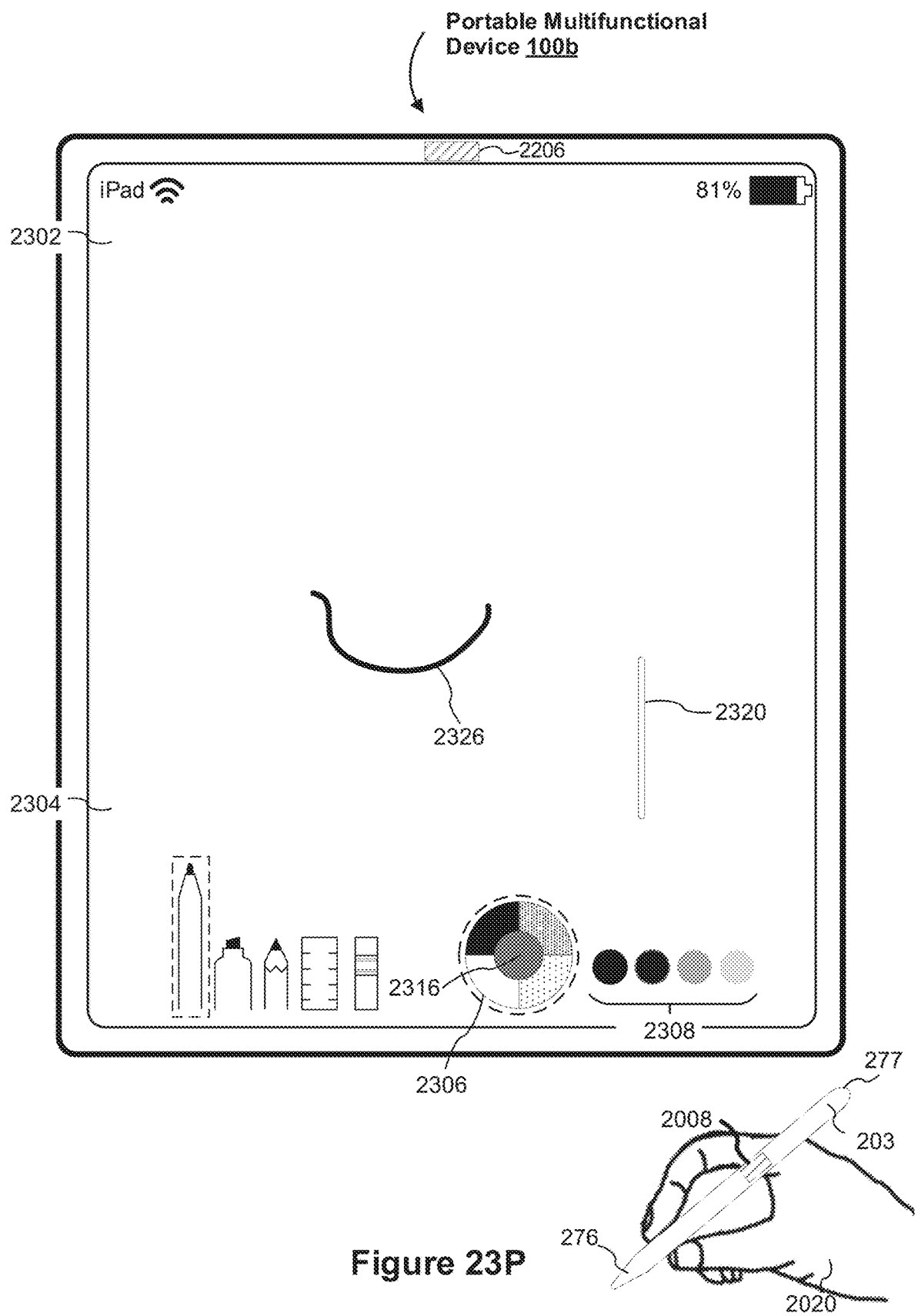
Figure 23Q:
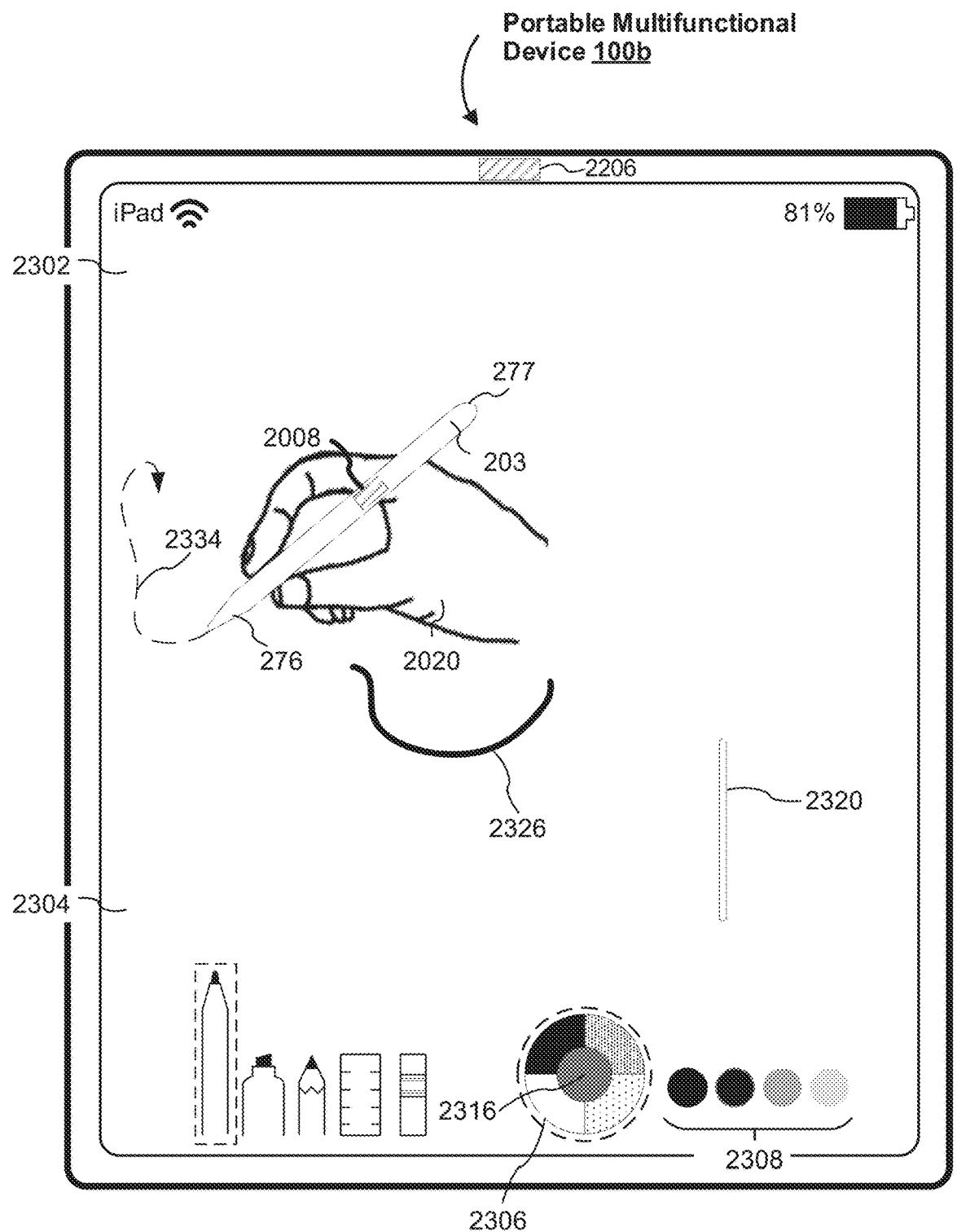
Figure 23R:
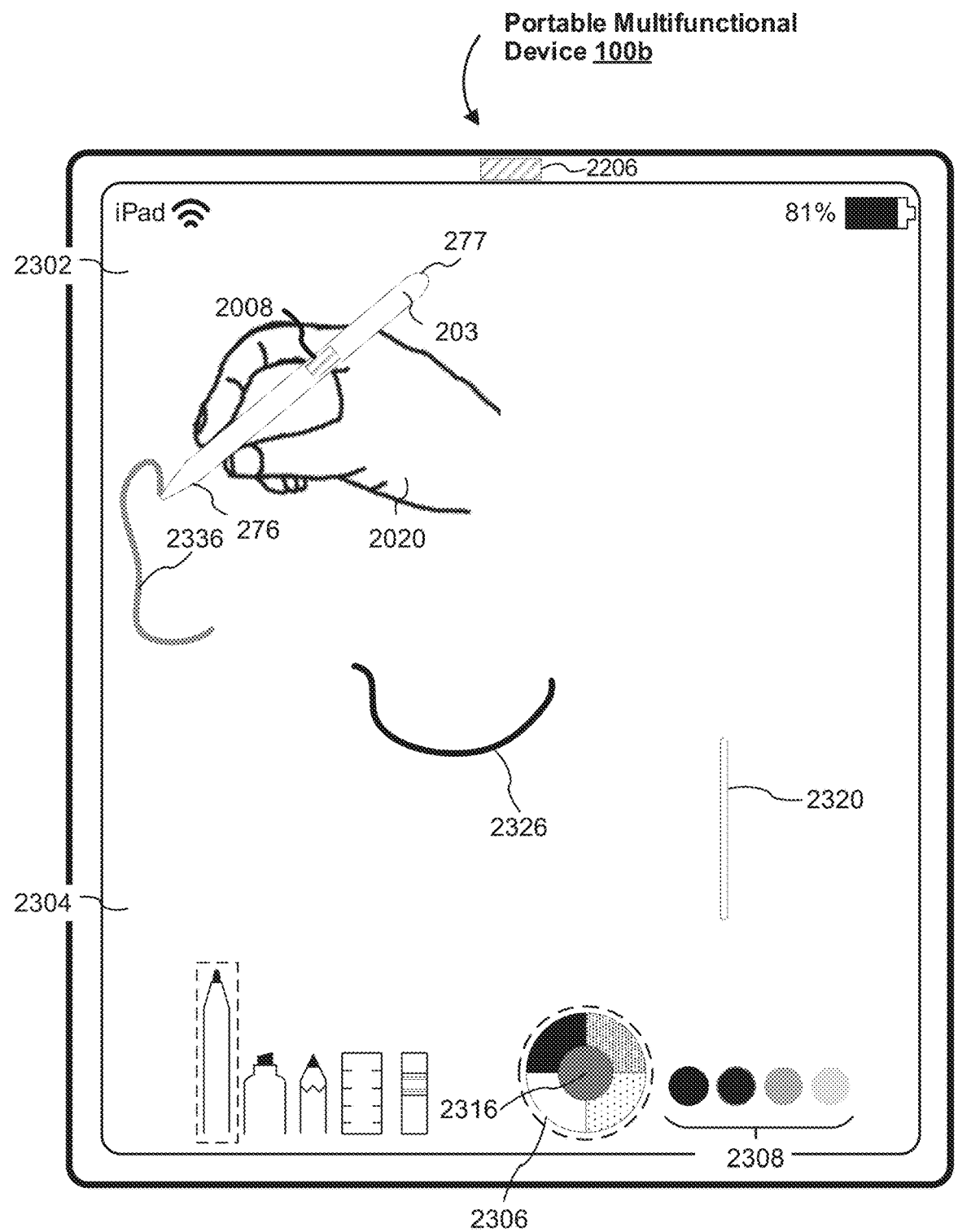

FIGS. 23A-23R are illustrations of using a color-picker user interface to assign an active color in accordance with a first mechanism. As illustrated in FIG. 23A, the electronic device 100b displays a user interface 2302. The user interface includes a canvas 2304 associated with a drawing application, corresponding drawing tools, a user-selected color selection affordance 2306, and a set of predefined color selection affordances 2308. As illustrated in FIG. 23A, the darkest (e.g., left-most) affordance of the set of predefined color selection affordances 2308 currently has focus (e.g., is the active color).

As further illustrated in FIG. 23A, the electronic device 100b detects an input 2310 corresponding to the user-selected color selection affordance 2306. In response to detecting the input 2310 in FIG. 23A, the electronic device 100b moves focus from the darkest affordance to the user-selected color selection affordance 2306, as illustrated in FIG. 23B, and displays a color-picker user interface 2312. The color-picker user interface 2312 includes a plurality of options for selecting a user-selected color, including a variety of different colors (e.g., black, dark grey, light gray, white) and patterns. One of ordinary skill in the art will appreciate that the color-picker user interface 2312 may include any number of colors and/or patterns, represented in any number of ways (e.g., color slider, color wheel, etc.). As further illustrated in FIG. 23B, the electronic device 100b continues to detect the input 2310. In other words, the input 2310 remains in contact with the electronic device 100b in FIG. 23B.

As illustrated in FIG. 23C, the electronic device 100b detects an input 2314 corresponding to a two-part drag input. First, from the user-selected color selection affordance 2306 to a light gray color within the color-picker user interface 2312; and second, from the light gray color within the color-picker user interface 2312 to a white color within the color-picker user interface 2312. Notably, the electronic device 100b detects an input during the entirety of time between detection of the input 2310 in FIG. 23A and detection of the input 2314 reaching the white color in FIG. 23C.

As illustrated in FIG. 23D, in response to detecting liftoff of the input 2314 (e.g., no longer contacting), the electronic device 100b ceases to display the color-picker user interface 2312 and changes the appearance of the user-selected color selection affordance 2306 in order to indicate that white is assigned as the currently active color. Namely, the electronic device 100b displays the user-selected color selection affordance 2306 with an enlarged center 2316 filled with the selected white color.

As illustrated in FIG. 23E, the electronic device 100b detects a drawing input 2318 made by the stylus 203. In response to detecting the drawing input 2318 in FIG. 23E, the electronic device 100b displays a corresponding mark

2320, as illustrated in FIG. 23F. The corresponding mark 2320 is white in color because white is the currently selected color. However, in order to improve visibility of the corresponding mark 2320 in FIGS. 23F-23X, a black outline is added around the corresponding mark 2320.

As illustrated in FIG. 23G, the electronic device 100b detects an input 2322 corresponding to the black color of the set of predefined color selection affordances 2308. In response to detecting the input 2322 in FIG. 23G, the electronic device 100b moves focus from the user-selected color selection affordance 2306 to the black preselected color affordance, as illustrated in FIG. 23H. In other words, the electronic device 100b assigns black as the currently active color. However, as further illustrated in FIG. 23H, the electronic device 100b maintains display of the enlarged center 2316 of the user-selected color selection affordance 2306. This provides an indication that the user-selected color selection affordance 2306 is currently associated with the white color, even though black is the currently active color.

As illustrated in FIG. 23I, the electronic device 100b detects a drawing input 2324 made by the stylus 203. In response to detecting the drawing input 2324 in FIG. 23I, the electronic device 100b displays a corresponding mark 2326, as illustrated in FIG. 23J. Because the currently active color is black, the corresponding mark 2326 is likewise black.

As illustrated in FIG. 23K, the electronic device 100b detects an input 2328 corresponding to the user-selected color selection affordance 2306. The input 2328 corresponds to a first input type, such as a tap input. In response to detecting the input 2328 corresponding to the first input type in FIG. 23K, the electronic device 100b, as illustrated in FIG. 23L, moves focus from the black preselected color affordance to the user-selected color selection affordance 2306 without displaying the color-picker user interface 2312. Accordingly, the electronic device 100b reassigns the color white, which was previously selected to be associated with the user-selected color selection affordance 2306 in FIGS. 23C and 23D, as the currently active color.

As illustrated in FIG. 23M, the electronic device 100b detects an input 2330 corresponding to the user-selected color selection affordance 2306. The input 2330 corresponds to a second input type different from the first input type. For example, the input 2330 corresponds to a special input type, such as a force touch or long touch. In response to detecting the input 2330 corresponding to the second input type in FIG. 23M, the electronic device 100b displays the color-picker user interface 2312, as illustrated in FIG. 23N. As further illustrated in FIG. 23N, the electronic device 100b continues to detect the input 2330. In other words, the input 2330 remains in contact with the electronic device 100b in FIG. 23N.

As illustrated in FIG. 23O, the electronic device 100b detects an input 2332 corresponding to a drag input ending at a dark grey color. As illustrated in FIG. 23P, in response to detecting liftoff of the input 2332 (e.g., no longer contacting), the electronic device 100b ceases to display the color-picker user interface 2312 and changes the appearance of the user-selected color selection affordance 2306 in order to indicate that dark gray is assigned as the currently active color. Namely, the electronic device 100b displays the user-selected color selection affordance 2306 with an enlarged center 2316 filled with the selected dark gray.

As illustrated in FIG. 23Q, the electronic device 100b detects a drawing input 2334 made by the stylus 203. In response to detecting the drawing input 2334 in FIG. 23Q, the electronic device 100b displays a corresponding mark 2336, as illustrated in FIG. 23R. Because the currently active color is dark gray, the corresponding mark 2336 is likewise dark gray.

Figure 23S:
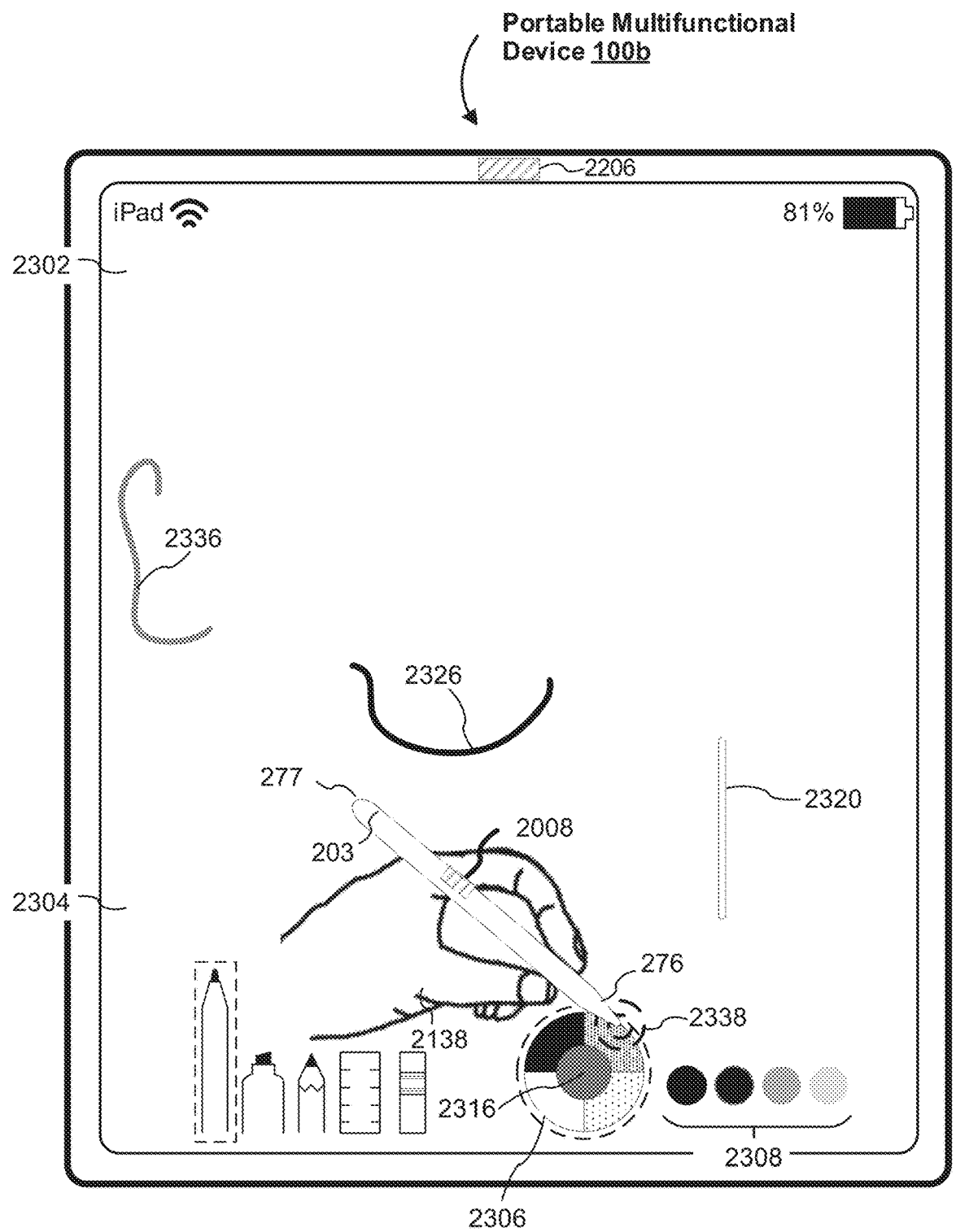
Figure 23T:
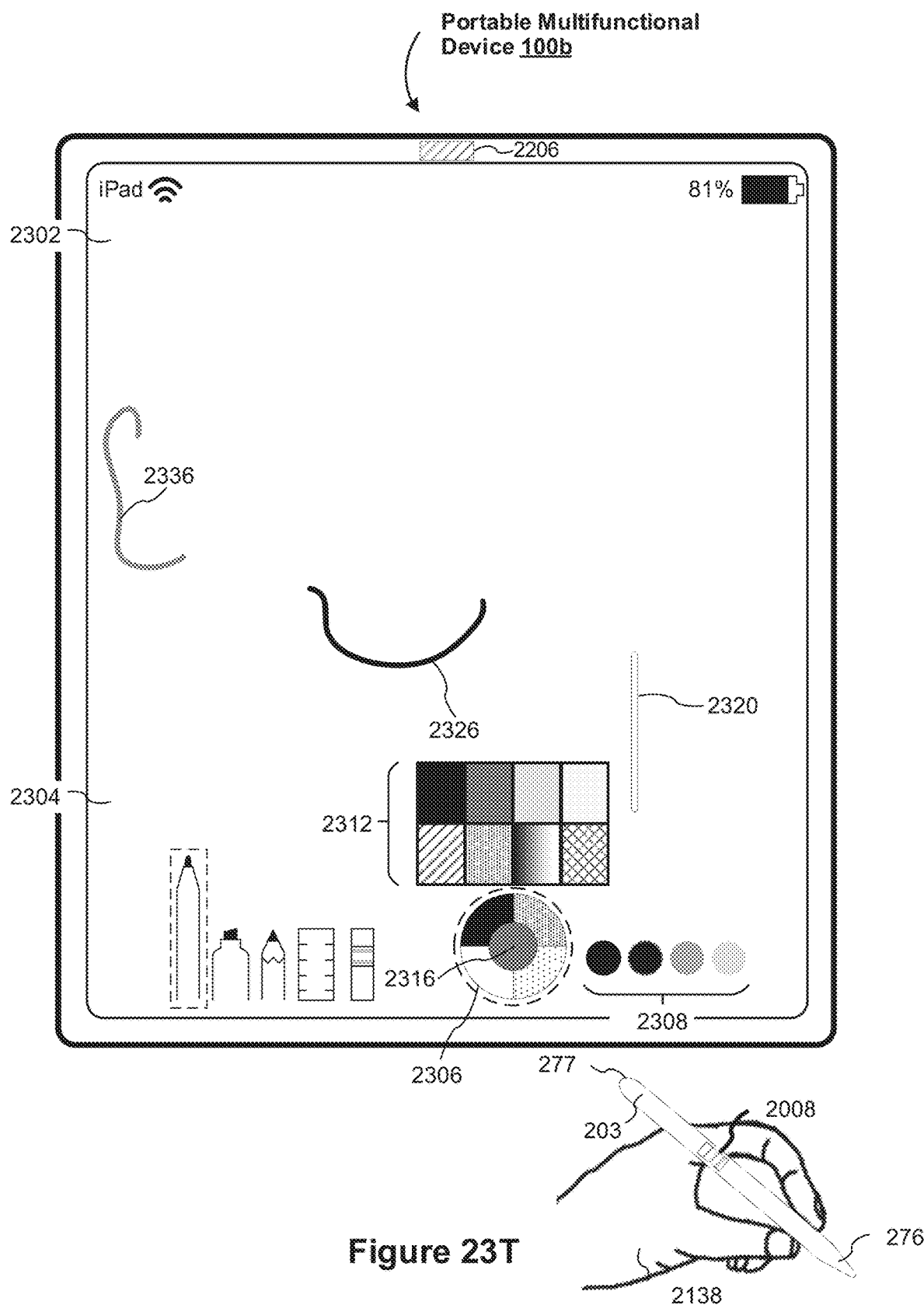

FIGS. 23S-23V are illustrations of using a color-picker user interface to assign an active color in accordance with a second mechanism. As illustrated in FIG. 23S, the electronic device 100b detects an input 2338 from the stylus 203 that corresponds to the user-selected color selection affordance 2306. In response to detecting the input 2338 in FIG. 23S, the electronic device 100b, as illustrated in FIG. 23T, displays the color-picker user interface 2312. Notably, in contrast to FIGS. 23C and 23D and FIGS. 23O and 23P, lifting off the input 2338 in FIG. 23T (e.g., stylus 203 no longer touching the touch-sensitive surface) does not result in the electronic device 100b foregoing display of the color-picker user interface 2312.

Figure 23U:
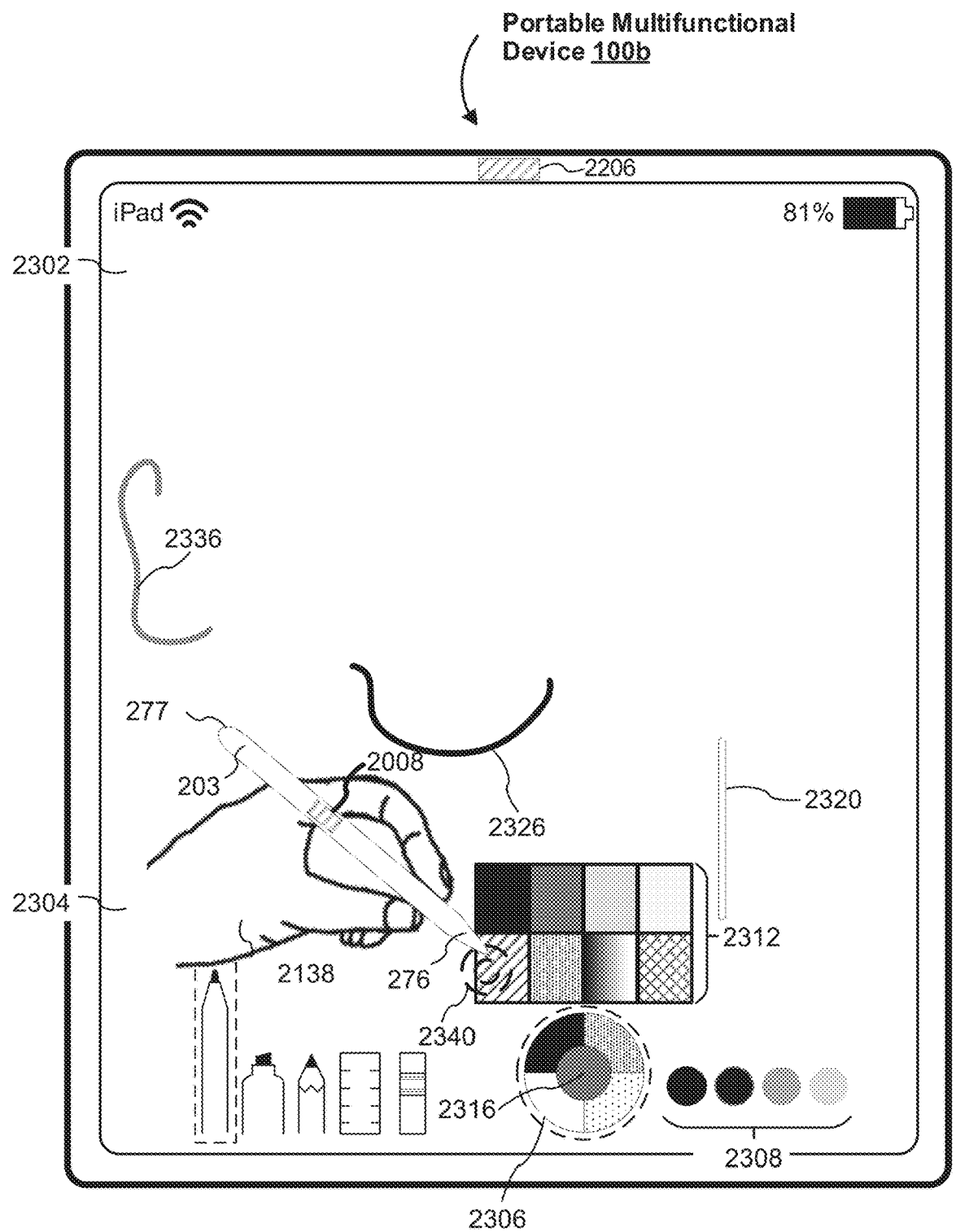
Figure 23V:
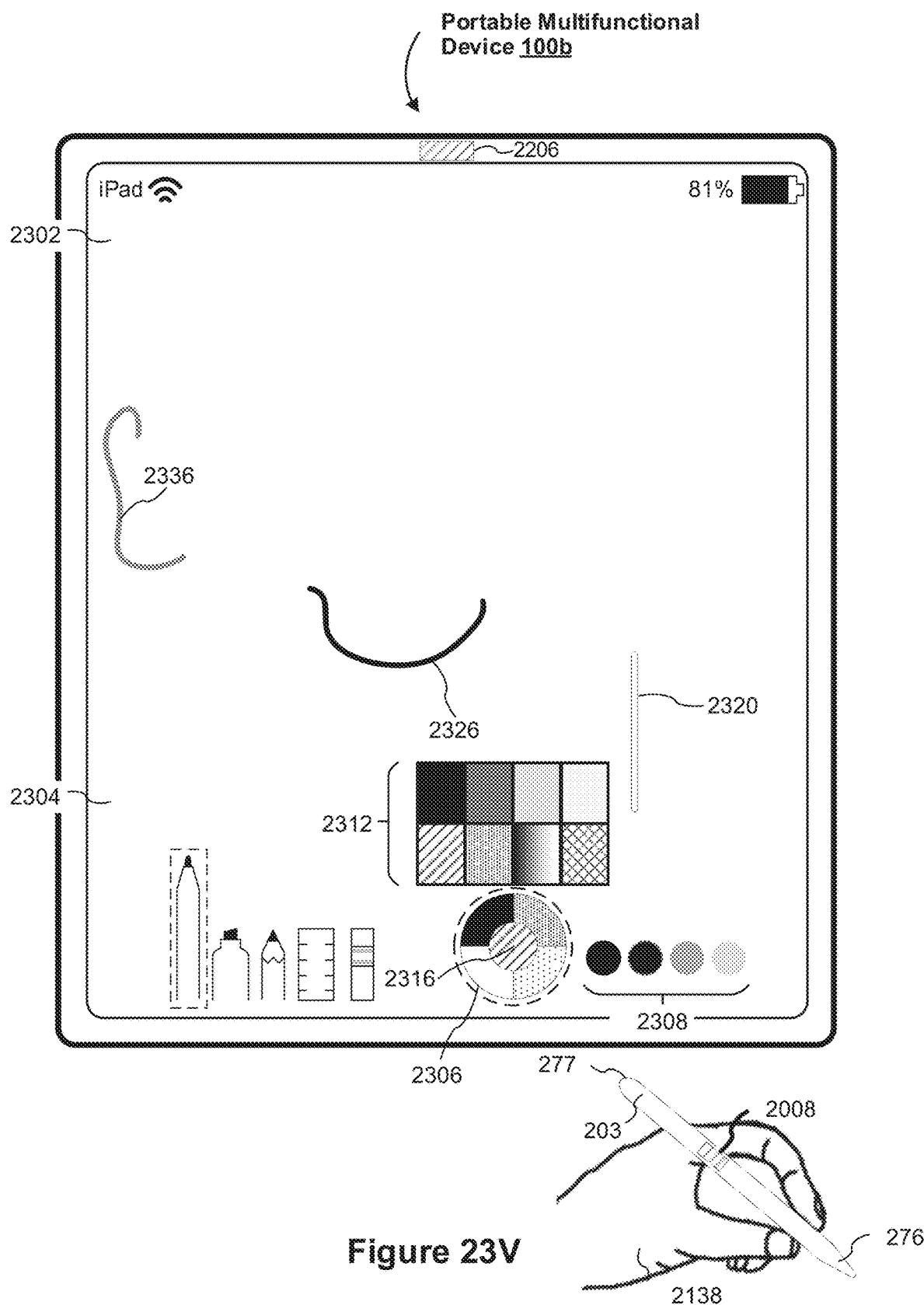

As illustrated in FIG. 23U, the electronic device 100b detects an input 2340 from the stylus 203 that corresponds to a diagonal-striped pattern within the color-picker user interface 2312. In response to detecting the input 2340, the electronic device 100b, in FIG. 23V, maintains display of the color-picker user interface 2312 and changes the appearance of the user-selected color selection affordance 2306 in order to indicate that the diagonal-striped pattern is assigned as the currently active color. Namely, the electronic device 100b displays the user-selected color selection affordance 2306 with an enlarged center 2316 filled with a diagonal-striped pattern, as illustrated in FIG. 23V.

Figure 23W:
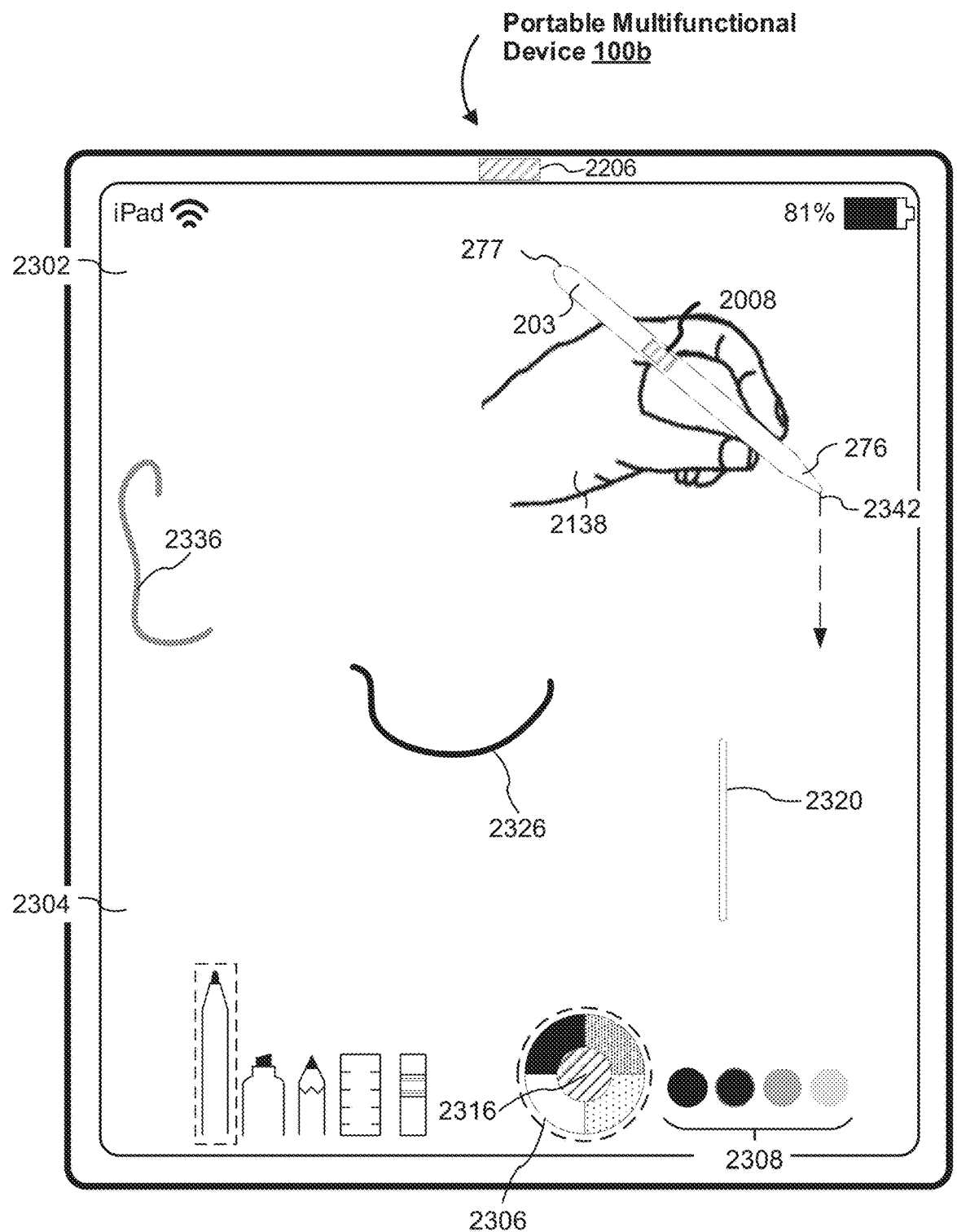
Figure 23X:
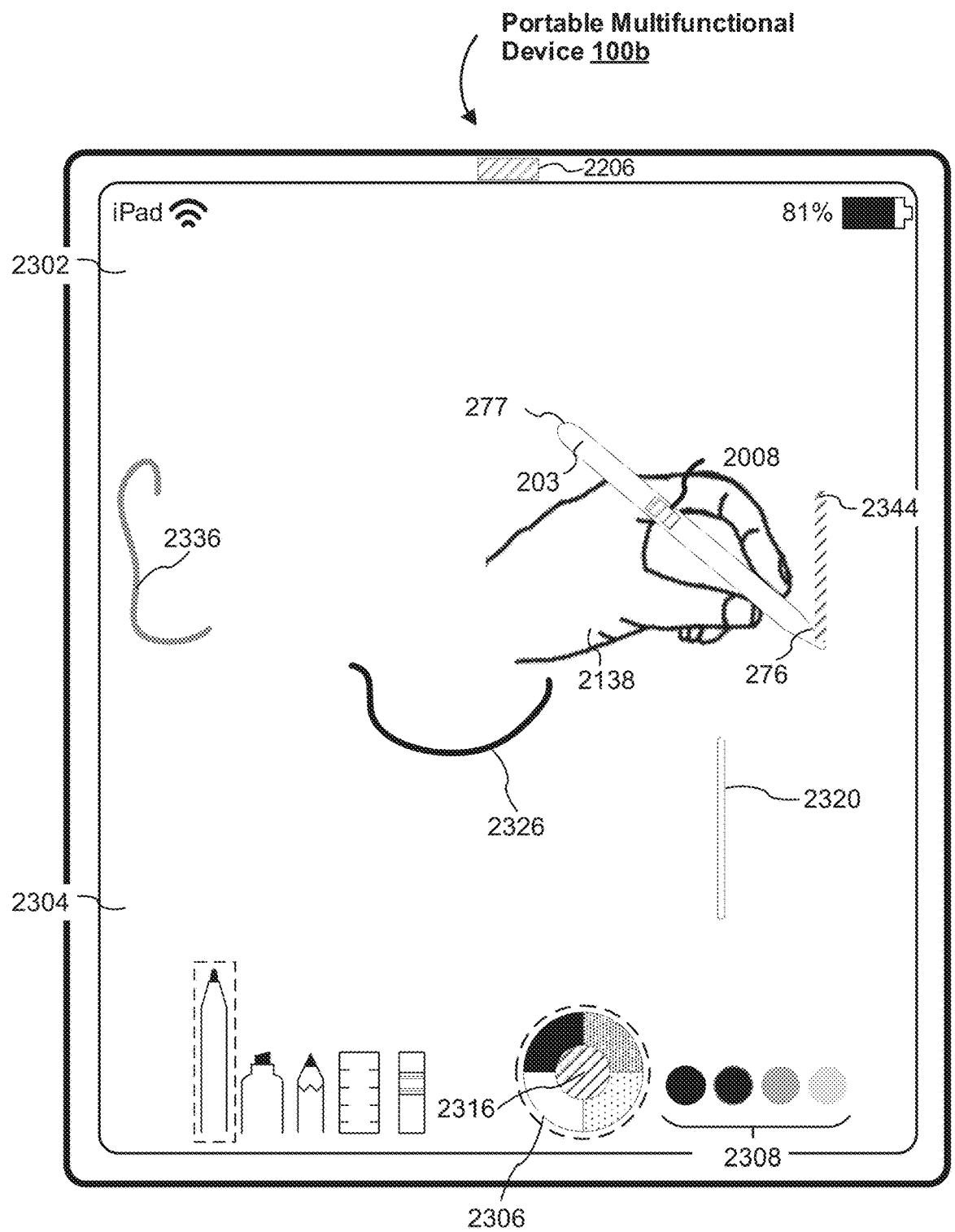

As illustrated in FIG. 23W, the electronic device 100b detects a drawing input 2342 made by the stylus 203. In response to detecting the drawing input 2342 in FIG. 23W, the electronic device 100b displays a corresponding mark 2344, as illustrated in FIG. 23X. Because the currently active color is a diagonal-striped pattern, the corresponding mark 2344 is likewise a diagonal-striped pattern.

Figure 23Y:
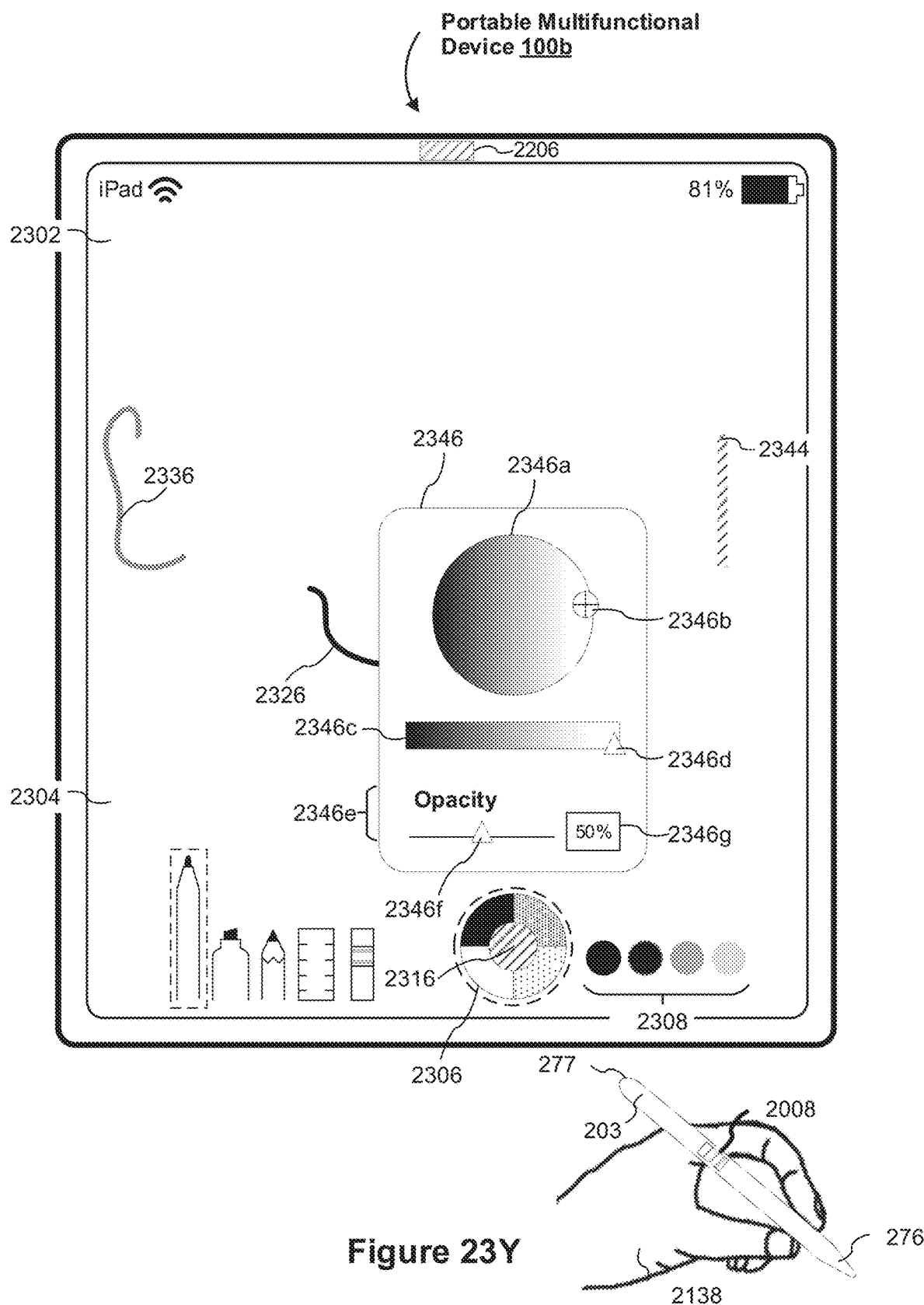

FIG. 23Y illustrates an example of a continuous user-selected color selection affordance 2346 according to some embodiments. The continuous user-selected color selection affordance 2346 enables selection of any color along the RGB color spectrum. The continuous user-selected color selection affordance 2346 includes a circular color affordance 2346a for assigning the active color. The circular color affordance 2346a includes a reticle 2346b that indicates the currently active color. The continuous user-selected color selection affordance 2346 also includes a slider color selector 2346c for assigning the active color. The slider color selector 2346c includes a color notch 2346d that indicates the currently active color. The continuous user-selected color selection affordance 2346 also includes an opacity adjuster 2346e for adjusting the opacity of marks. The opacity adjuster 2346e includes an opacity notch 2346f and an opacity textbox 2346g, both of which indicate the current opacity level (e.g., 50% in FIG. 23Y).

FIG. 23Z illustrates an example of a color model user-selected color selection affordance 2348 according to some embodiments. The color model user-selected color selection affordance 2348 includes a color model selector 2348a, indicating that RGB (red, green, blue) is the current color model. One of ordinary skill in the art in the art will appreciate that any color model may be utilized, such as tristimulus, CIE XYZ color space, CMYK, and/or the like. Because RGB is the current color model, the color model user-selected color selection affordance 2348 includes red, green, and blue sliders 2348b for adjusting the relative weight of the respective color. Each slider includes notch and textbox indicators of the respective weight of the corresponding color. For example, the blue slider includes a notch touching the left side of the blue slider and includes a textual value of "0," both of which indicate the currently active color contains no blue component. Sliding the notch and/or typing in a textual value for any slider will update the currently active color. The color model user-selected color selection affordance 2348 also includes a hexadecimal representation 2348c of the currently active color. Thus, as illustrated in FIG. 23Z, the current hexadecimal value of 0xFF2600 corresponds to a red weight of 255, a green weight of 38, and a blue weight of 0. Entering a text value into the hexadecimal text box accordingly updates the respective red, green, and blue notch levels and textbox values.

Figure 24C:
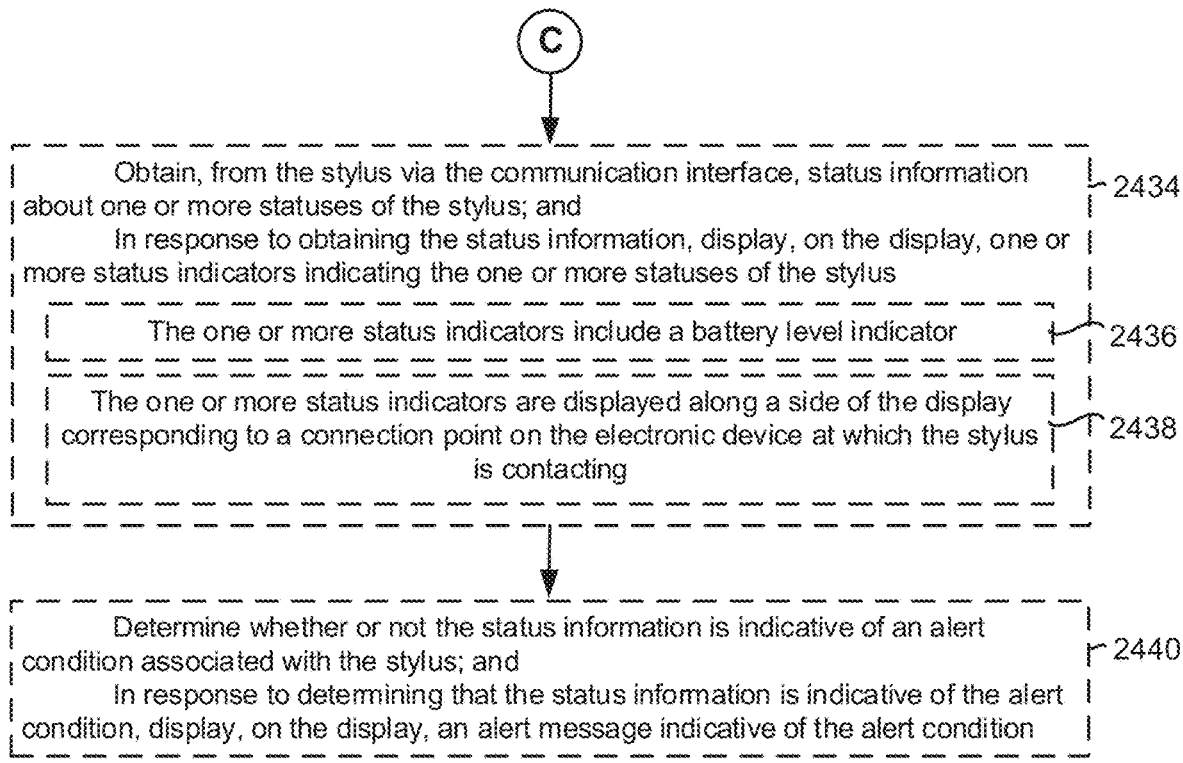

FIGS. 24A-24C is a flow diagram illustrating a method 2400 of displaying example user interfaces providing an interactive stylus tutorial in accordance with some embodiments. The method 2400 is performed at an electronic device (e.g., the electronic device 300 in FIG. 3, or the portable multifunction device 100 in FIG. 1A) with a touch-sensitive surface, a display, and a communication interface provided to communicate with a stylus (e.g., a BLUETOOTH interface). In some embodiments, the touch-sensitive surface and display are combined into a touch screen display (e.g., a mobile phone or tablet). In some embodiments, the touch-sensitive surface and display are separate (e.g., a laptop or desktop computer with a separate touchpad and display). Some operations in the method 2400 are, optionally, combined and/or the order of some operations is, optionally, changed.

The method 2400 contemplates the electronic device providing an interactive stylus tutorial. The electronic device utilizes finger manipulation data received from a stylus in order to exploit the myriad of detectable input types at the stylus. The stylus detects inputs from the hand of the user (e.g., gestures) while the user is holding the stylus and detects inputs while the user is not holding the stylus. Because of the intricate varied hand-manipulation capabilities of the user, the stylus can detect many types of user inputs. The stylus provides data to the electronic device indicative of these user inputs. Accordingly, the method 2400 contemplates the electronic device receiving various of types of data from the stylus indicative of the various user inputs detected at the stylus.

This enhances the operability of the electronic device and makes the electronic device interface more efficient and robust. As noted above, the user can provide a variety of input types to the stylus (e.g., finger manipulations on the stylus, gestures on the stylus, rotational movements of the stylus, etc.). On the other hand, the touch-sensitive surface of the electronic device can receive a single input type (e.g., a touch input). A single input type limits a user's ability to interact with the electronic device and can lead to erroneous user inputs. Accordingly, a shift in at least some of the user inputs from the touch-sensitive surface of the electronic device to the stylus provides a more efficient user interface with the electronic device and can reduce the number of mistaken inputs registered at the electronic device. Additionally, this shift to fewer touch inputs at the touch-sensitive surface of the electronic device reduces wear-and-tear of and power usage of the electronic device. This improves battery life of the electronic device by enabling the user to use the electronic device more quickly and efficiently. For battery-operated electronic devices, enabling a user to enter fewer inputs on the touch-sensitive surface of the electronic device conserves power and increases the time between battery charges of the electronic device.

Referring to FIG. 24A, in response to detecting that the stylus is proximate to the electronic device, the electronic device pairs (2402) the electronic device with the stylus. For example, pairing includes making the communication link between the stylus and electronic device functional. As another example, pairing the stylus with the electronic device includes enabling a cooperative link between the stylus and electronic device.

In some embodiments, the stylus being proximate to the electronic device corresponds (2404) to the stylus not being in contact with the electronic device. The stylus being proximate to and paired with (e.g., in communication with) the electronic device while not being in contact with the electronic device enhances the operability of the electronic device. Rather than performing operations based on inputs detected on the touch-sensitive surface of the electronic device, the electronic device performs the operations based on RF-signal based data obtained from the stylus that is indicative of inputs at the stylus. Accordingly, the number of inputs to the touch-sensitive surface of the electronic device is reduced, making the electronic device more efficient by extending the battery life and reducing wear-and-tear of the electronic device. For example, the stylus and the electronic device are proximate to one another, although not in contact, and communicate via a communication protocol, such as BLUETOOTH, 802.11x (e.g, Wi-Fi), peer-to-peer WiFi, etc. As one example, with reference to FIG. 20V, although the stylus 203 is not in contact with the electronic device 100a, the stylus 203 is sufficiently close to the electronic device 100a to be proximate, as indicated by the BLUETOOTH indicator 2050.

In some embodiments, the stylus being proximate to the electronic device corresponds (2406) to the stylus contacting the electronic device at a connection point on the electronic device. The stylus being proximate to and paired with (e.g., in communication with) the electronic device while being in contact with the electronic device enhances the operability of the electronic device. Detecting contact between the electronic device and the stylus indicates to the electronic device that the stylus is not being held. Accordingly, in some embodiments, the electronic device deactivates features that support obtaining data from the stylus indicative of inputs at the stylus because the electronic device knows that the stylus is not providing finger manipulation data to the electronic device while the stylus is contacting the electronic device. Deactivating certain features results in less processing power and longer battery life in the electronic device. As one example, with reference to FIGS. 20A and 20B, the stylus 203 is brought into contact with the electronic device 100a at a connection point on the electronic device 100a. In some embodiments, the connection point corresponds to a side of the electronic device 100a including the first sensor 2006 of the electronic device 100a.

In response to pairing the stylus with the electronic device, the electronic device displays (2408) a first representation of a first gesture performed on the stylus. Displaying the first representation of the first gesture without user intervention reduces the amount of user interaction with the touch-sensitive surface of the electronic device. The reduction in user interaction increases battery life and reduces wear-and-tear of the electronic device. For example, in various implementations, the first representation of the first gesture corresponds to a swipe-up, swipe-down, double tap, tap, flick, etc. In some embodiments, the electronic device stores the first representation of the first gesture. As one example, with respect to FIG. 20J, the electronic device 100a displays a first representation of a first gesture animation 2014e corresponding to a slide up gesture on the stylus representation 2014d.

In some embodiments, the electronic device detects (2410) on the touch-sensitive surface, one or more inputs corresponding to a request to select a particular tutorial. The first representation of the first gesture is based on the particular tutorial. Enabling selection of a particular tutorial reduces the number of inputs to the electronic device connected with learning about how to use the stylus. Reducing the number of inputs to the touch-sensitive surface of the electronic device extends battery life and reduces wear-and-tear of the electronic device. For example, the particular tutorial is selected from a plurality of available tutorials. As one example, the electronic device 100a receives an input 2022 illustrated in FIG. 20I specifying a different tutorial, and in response, the electronic device 100a changes the tutorial from a "Quick-Swap" tutorial to an "Adjust Brush" tutorial as illustrated in FIG. 20J.

In some embodiments, the first representation of the first gesture is (2412) predetermined. Having predetermined displayed gesture representations enhances the operability of the electronic device and reduces the number of inputs to the touch-sensitive surface of electronic device connected with selecting a particular gesture representation. Reducing the number of inputs to the touch-sensitive surface of the electronic device makes the electronic device more efficient by extending the battery life and reducing wear-and-tear of the electronic device. For example, prior to starting the stylus tutorial, the electronic device receives an input specifying that the default tutorial (e.g., tutorial that plays after starting the stylus tutorial) is an adjust brush tutorial.

In some embodiments, the electronic device displays (2414) the first representation of the first gesture without user intervention. Displaying the first representation of the first gesture without user intervention enhances the operability of the electronic device and reduces the number of inputs to the touch-sensitive surface of electronic device. Reducing the number of inputs to the touch-sensitive surface of the electronic device makes the electronic device more efficient by extending the battery life and reducing wear-and-tear of the electronic device. As one example, with respect to FIGS. 20A-20D, in response to pairing the stylus 203 with the electronic device 100a, the electronic device 100a displays the first representation of the first gesture animation 2014e in FIG. 20D without user intervention.

In some embodiments, the electronic device displays (2416) the first representation of the first gesture within a tutorial interface. Displaying the first representation of the first gesture within a tutorial interface prevents the first representation of the first gesture from being obscured by other displayed objects, such as application icons on a home screen. Because the electronic device clearly displays the first representation of the first gesture, the number of inputs to the touch-sensitive surface of the electronic device related to rearranging objects in order to more clearly view the first representation of the first gestures is reduced. Reducing the number of inputs to the touch-sensitive surface of the electronic device makes the electronic device more efficient by extending the battery life and reducing wear-and-tear of the electronic device. As one example, with reference to FIG. 20D, the electronic device 100a displays first representation of the first gesture (e.g., a gesture animation 2014e) within a stylus tutorial interface 2014.

In response to pairing the stylus with the electronic device, the electronic device obtains (2418) finger manipulation data from the stylus via the communication interface.

The finger manipulation data indicates a finger manipulation input received by the stylus. For example, the finger manipulation data corresponds to data collected by a magnetometer of the stylus, an accelerometer of the stylus, and/or a capacitive touch element or touch-sensitive surface on the barrel of the stylus. As another example, the finger manipulation data is transmitted/received via a BLUETOOTH connection, IEEE 802.11x connection, NFC, etc. As yet another example, the finger manipulation data includes information about the movement of fingers on the stylus or movement of the stylus relative to the fingers of a user (e.g., data indicating how the fingers moved). As yet another example, the finger manipulation data includes a processed representation of the movement of fingers on the stylus or movement of the stylus relative to the fingers of a user (e.g., data indicating a gesture or manipulation that was performed at the stylus such as a slide, tap, double tap, etc. As one example, with reference to FIGS. 20E and 20F, the electronic device 100a obtains finger manipulation data from the stylus 203 indicating a double tap gesture, as indicated by the double tap gesture indicator 2018. As another example, with reference to FIGS. 20K and 20L, the electronic device 100a obtains finger manipulation data from the stylus 203 indicating a slide up gesture, as indicated by the slide up gesture indicator 2026.

In response to pairing the stylus with the electronic device and in response to obtaining the finger manipulation data, the electronic device displays (2420), on the display, a second representation of a second gesture performed on the stylus corresponding to the finger manipulation input received by the stylus. For example, in various embodiments, the second gesture corresponds to a swipe-up, swipe-down, tap, flick, etc. performed at the stylus by a user holding the stylus. In various embodiments, the second representation of the second gesture includes one of a variety of animations. In some embodiments, the first and second representations are the same, such as when both the first and second representations correspond to a double tap gesture. In some embodiments, the first and second representations are different from each other, such as when the first representation corresponds to a slide-up gesture and the second representation corresponds to a tap gesture. As one example, the electronic device 100a displays a slide up gesture animation 2014e in FIG. 20L in response to obtaining finger manipulation data from the stylus 203 indicating a slide up gesture at the stylus 203 in FIG. 20K.

In some embodiments, the electronic device displays (2422) the second representation of the second gesture in response to determining that the finger manipulation input satisfies a gesture criterion. Displaying the second representation of the second gesture based on a criterion enhances the operability of the electronic device by not displaying extraneous inputs at the stylus, increasing the display life of the electronic device. For example, the electronic device displays a representation of a swipe gesture if the corresponding swipe by the user at the stylus is longer than a threshold distance. As another example, the representation of the swipe gesture is displayed if the swipe by the user occurs for longer than a durational threshold, such as a swipe for more than half a second.

In some embodiments, the electronic device displays (2424) the second representation of the second gesture within a tutorial interface. Displaying the second representation of the second gesture within a tutorial interface prevents the second representation of the second gesture from being obscured by other displayed objects, such an application icons on a home screen. Because the electronic device clearly displays the second representation of second first gesture, the number of inputs to the touch-sensitive surface of the electronic device related to rearranging objects in order to more clearly view the second representation of the second gestures is reduced. Reducing the number of inputs to the touch-sensitive surface of the electronic device makes the electronic device more efficient by extending the battery life and reducing wear-and-tear of the electronic device. As one example, with reference to FIG. 20L, the electronic device 100a displays the second representation of the second gesture (e.g., gesture animation 2014e) within the stylus tutorial interface 2014.

Turning to FIG. 24B, in some embodiments, the electronic device displays (2426) with the tutorial interface, a canvas and a set of drawing tools. Displaying the canvas and drawing tools while displaying the stylus representation renders unnecessary inputs to the touch-sensitive surface corresponding to requests to display the canvas/drawing tools. The reduced number of inputs to the touch-sensitive surface of the electronic device extends battery life and reduces wear and tear of the electronic device. For example, the drawing tools include one or more of: a pencil, pen, ruler, eraser highlighter, color selector, etc. As another example, the canvas corresponds to a scratchpad for drawing scratch marks in order to test the currently selected drawing tool. As one example, with reference to FIGS. 20Q and 20R, the electronic device 100a displays a canvas 2014b and drawing tools 2014c and, based on the currently active drawing tool and associated opacity/thickness level, the electronic device 100a displays a corresponding mark 2040 shown in FIG. 20R.

In some embodiments, in accordance with a determination that the finger manipulation data corresponds to a first type, the electronic device moves (2428) focus to a particular drawing tool of the set of drawing tools and, in accordance with a determination that the finger manipulation data corresponds to a second type, the electronic device changes (2428) a property of a drawing tool that currently has focus. Performing two different operations based on the type of finger manipulation data provides an efficient mechanism to perform either of the operations, thus reducing the amount of user interaction with the electronic device to perform at least one of the operations. Reducing the amount of user interaction with the electronic device reduces wear-and-tear of the electronic device and, for battery powered devices, increases battery life of the electronic device. For example, the first type corresponds to a first gesture type, such as a tap, and the second type corresponds to a second, different gesture type, such as a slide. As one example, with reference to FIGS. 20E and 20F, the electronic device 100a determines that the double tap gesture (a first tap 2016 and a second tap 2017) at the stylus 203 corresponds to the first type, and, in response, moves focus from a pencil tool to a marker tool, as illustrated in FIG. 20F. As another example, with reference to FIGS. 20K and 20L, the electronic device 100a determines that the slide up gesture 2024 at the stylus 203 corresponds to the second type, and, in response, changes the line thickness property 2014g of the currently active tool to the thickest line value, as illustrated in FIG. 20L.

In some embodiments, in response to detecting a drawing input corresponding to the canvas, the electronic device displays (2430) a corresponding mark within the canvas according to a particular drawing tool of the set of tools that has focus. Displaying a mark within the tutorial interface, rather than having to navigate to a separate drawing application, enhances the operability of the electronic device and reduces the number of inputs to the touch-sensitive surface of electronic device. Reducing the number of inputs to the touch-sensitive surface of the electronic device makes the electronic device more efficient by extending the battery life and reducing wear-and-tear of the electronic device. For example, the longer the input line, the longer the displayed drawn line. As one example, the mark 2030 shown in FIG. 20N corresponds to a pen mark because the currently active tool is a pen. Moreover, the mark 2030 is thick because the current thickness level was set to the thickest value as described with respect to FIGS. 20K and 20L.

In some embodiments, the electronic device obtains (2432) additional finger manipulation data from the stylus, wherein the additional finger manipulation data indicates a second finger manipulation input received by the stylus corresponding to a movement of a finger on the stylus. In response to obtaining the additional finger manipulation data, the electronic device changes (2432), on the display, the second representation of the second gesture performed on the stylus according to the second finger manipulation input. Changing display of the second representation of the second gesture based on finger manipulation data from the stylus, rather than based on inputs to the touch-sensitive surface of the electronic device, enhances the operability of the electronic device and reduces the number of inputs to the touch-sensitive surface of electronic device. Reducing the number of inputs to the touch-sensitive surface of the electronic device makes the electronic device more efficient by extending the battery life and reducing wear-and-tear of the electronic device. As one example, with reference to FIGS. 20O and 20P, in response to detecting the slide down gesture 2032 illustrated in FIG. 20O, the electronic device 100a changes the gesture animation 2014e. Namely, the dotted-line portion of the gesture animation 2014e is shown at the tip of the stylus representation 2014d in FIG. 20P.

Turning to FIG. 24C, in some embodiments, the electronic device obtains (2344) status information about one or more statuses of the stylus, and, in response to obtaining the status information, displays (2344) one or more status indicators indicating the one or more statuses of the stylus. Providing an indication to a user of status information about the stylus enables the user to more efficiently utilize applications running on the electronic device that utilize data from the stylus. For example, an indicator that the stylus has a low battery level signals to the user to stop using and/or deactivate features of applications that use stylus data as inputs. More efficient usage of applications at the electronic device extends the battery life of the electronic device. For example, the stylus status indicators indicate (2436) the battery life of the stylus.

Moreover, the stylus status indictors may indicate one or more of: an amount of battery life, a currently selected drawing tool and its state (e.g., color, thickness, opacity), whether the stylus is being held, whether the stylus is paired to the electronic device and how (e.g., contacting electronic device, BLUETOOTH, 802.11x, etc.), an identity of a user of the stylus (e.g., Apple ID), the stylus model, an amount of currently unused memory at the stylus, etc. In some embodiments, the electronic device ceases display of the status indicator in response to detecting loss of pairing with the stylus. In some embodiments, after running the stylus tutorial on the electronic device, subsequently pairing the stylus to an electronic device causes the electronic device to display the stylus status indicators rather than the stylus tutorial.

Figure 20S:
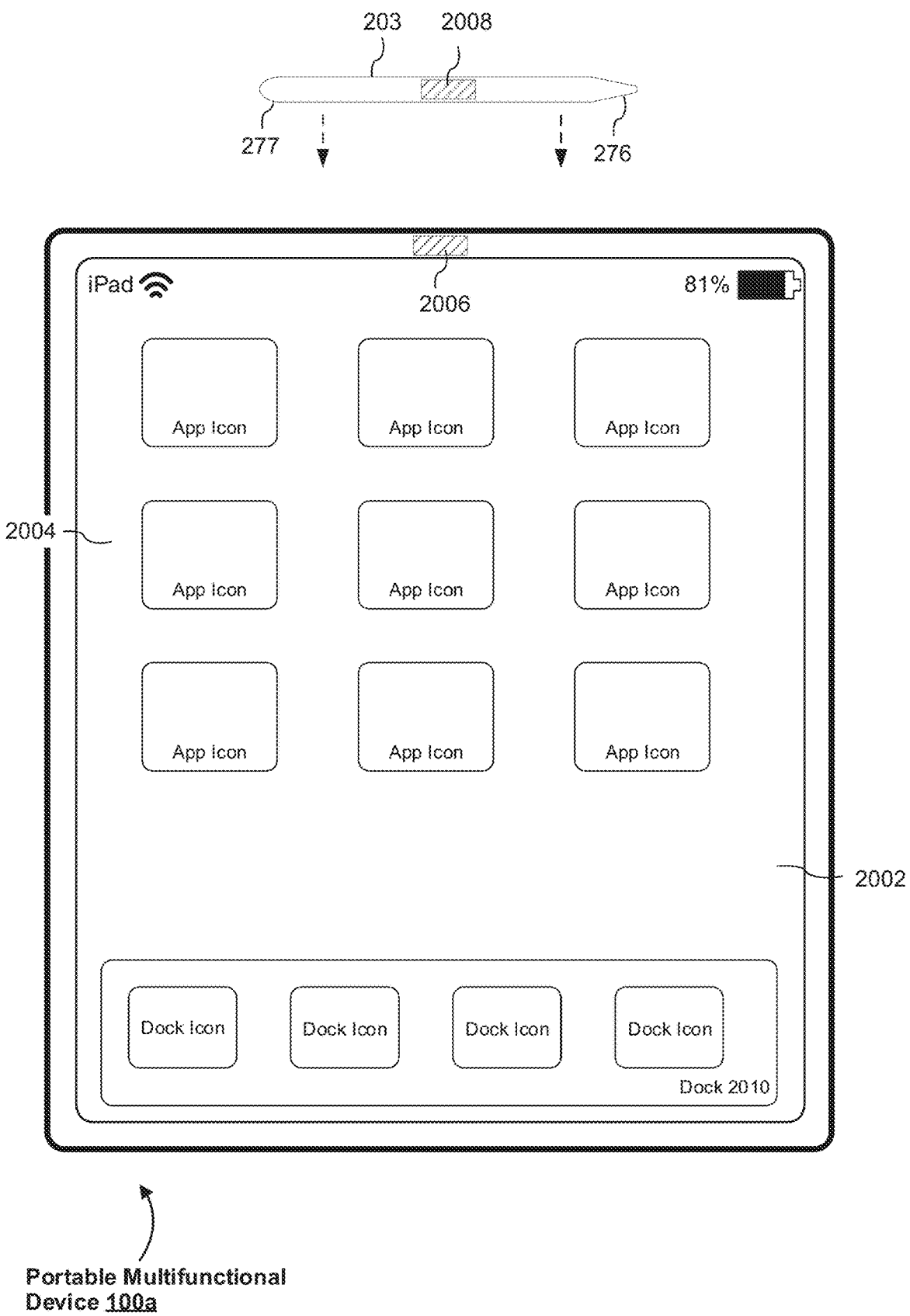
Figure 20T:
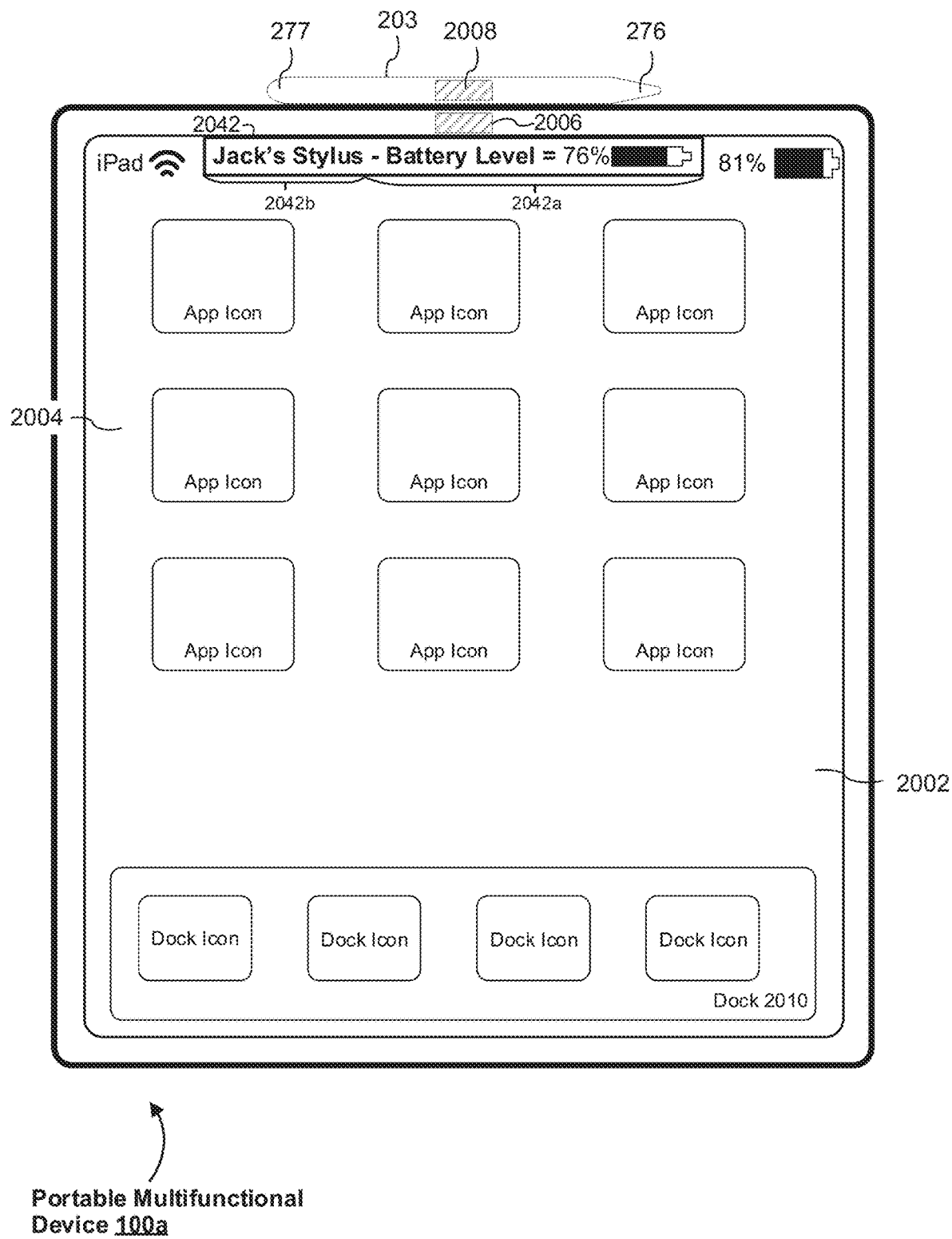
Figure 20U:
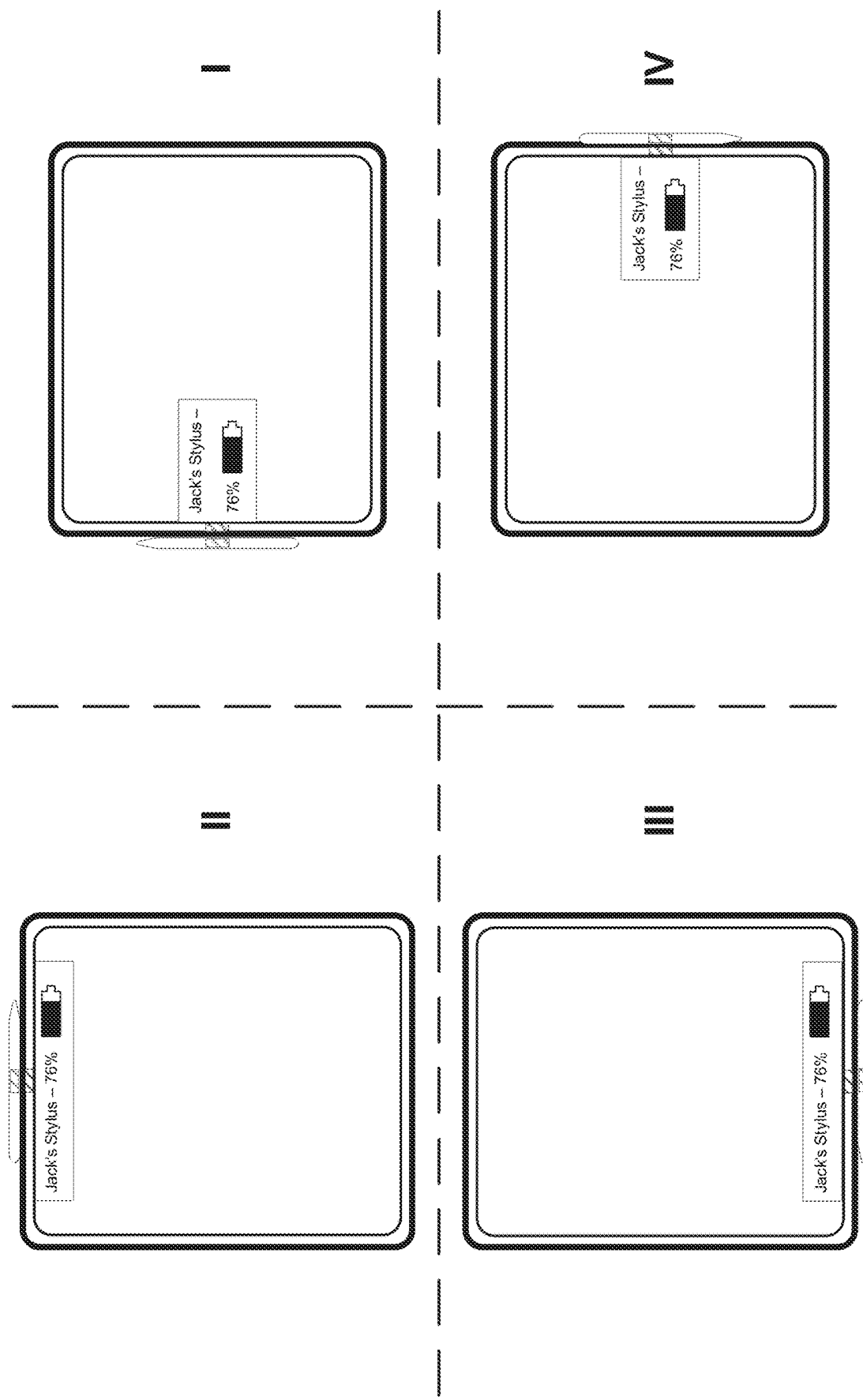
Figure 20V:
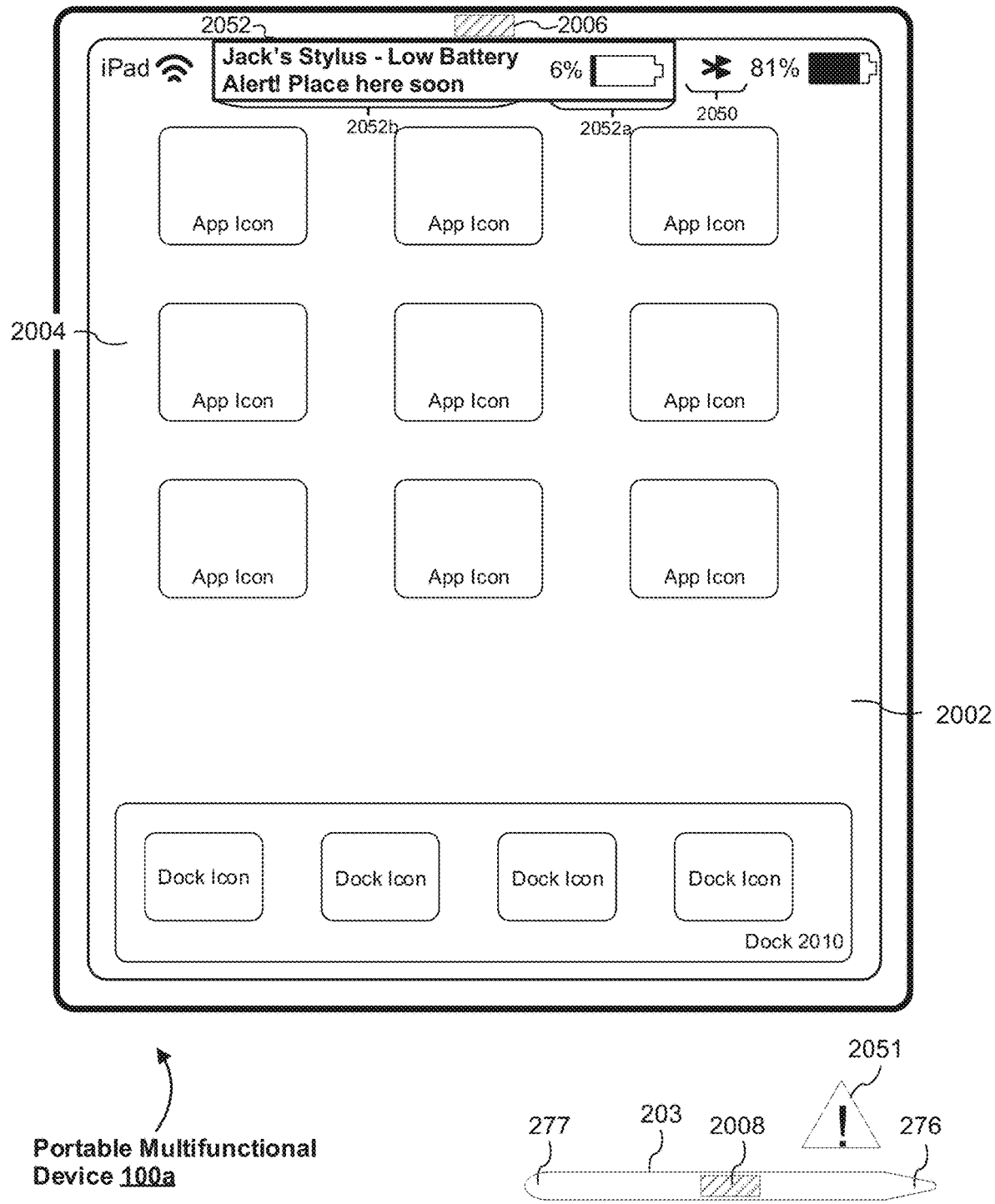
Figure 20W:
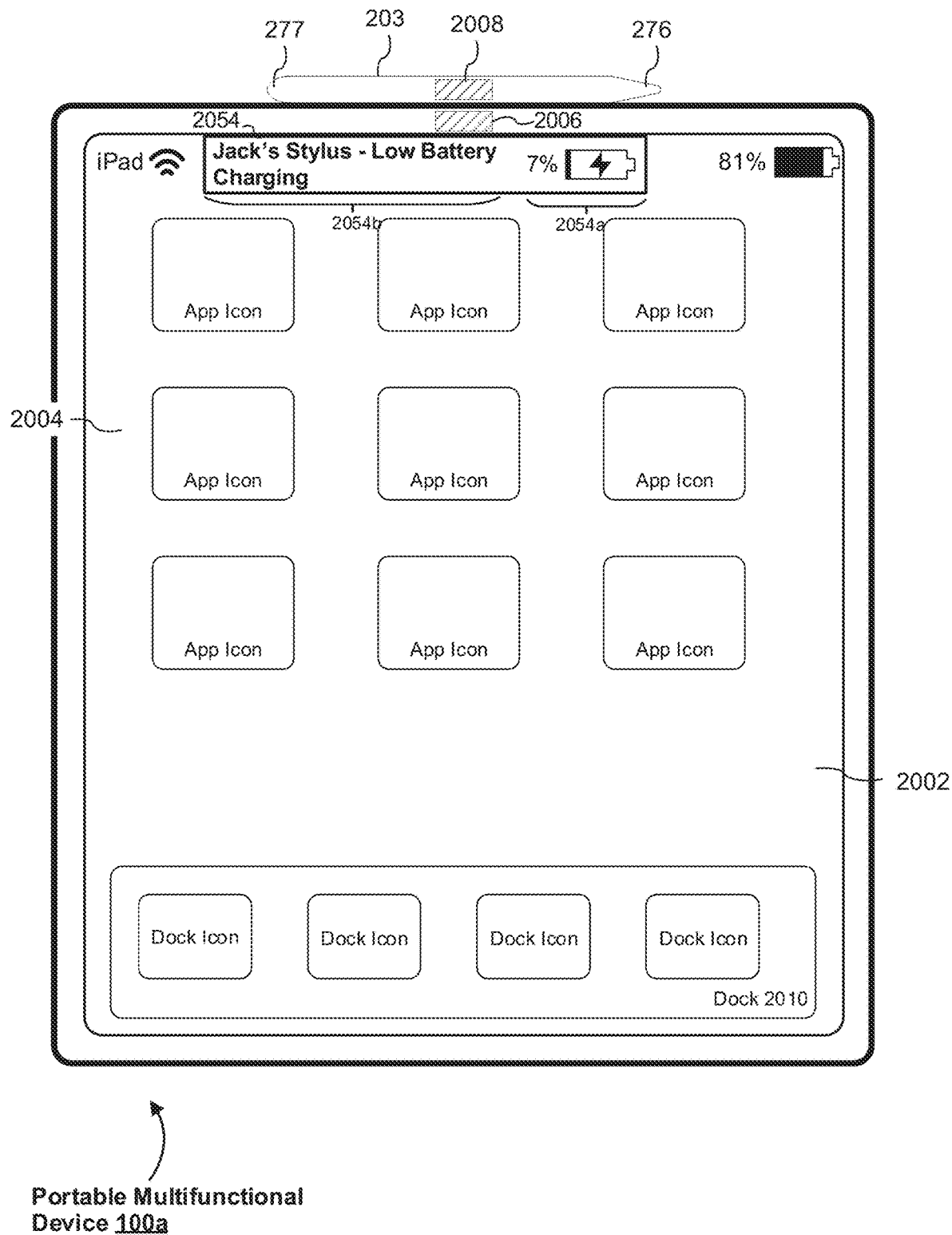

As one example, with reference to FIGS. 20S and 20T, the electronic device 100a, in response to pairing with the stylus 203, displays stylus status indicators indicating the stylus battery level indicator 2042*a* of the stylus 203 and the stylus user identifier 2042*b* associated with the stylus. As another example, with reference to FIGS. 20V and 20W, the electronic device 100*a* displays a BLUETOOTH indicator 2050 indicating that the electronic device 100*a* and stylus 203 are communicating via BLUETOOTH.

In some embodiments, the electronic device 100*a* displays (2438) the one or more status indicators along a side of the display corresponding to a connection point on the electronic device at which the stylus is contacting. As one example, with reference to FIG. 20U, the electronic device 100*a* displays the stylus status indicator on the side of the electronic device 100*a* to which the stylus 203 is contacting, and changes how the stylus status indicators are displayed based on the orientation of the electronic device 100*a*.

In some embodiments, the electronic device determines (2440) whether or not the status information is indicative of an alert condition associated with the stylus, and in response to determining that the status information is indicative of the alert condition, displays an alert message indicative of the alert condition. Providing an indication to a user of an alert condition associated with the stylus enables the user to more efficiently utilize applications running on the electronic device that utilize data from the stylus. For example, an alert condition that the stylus has a low battery level signals to the user to stop using and/or deactivate features of applications that use stylus data as inputs. More efficient usage of applications at the electronic device extends the battery life of the electronic device. As one example, the electronic device 100*a* displays a low-battery alert 2052, as illustrated in FIG. 20V, and, in response to detecting contact with the stylus 203 (e.g., begin charging the stylus 203), displays a recharging indicator 2054, as illustrated in FIG. 20W.

Note that details of the processes described above with respect to method 2400 are also applicable in an analogous manner to other methods described herein (e.g., 1400, 1500, 1600, 1700, 1800, 1900, 2500, 2600, 2700). For example, the stylus, finger manipulation data, gestures, touch-sensitive surface, and communication interface described above with reference to method 2400 optionally have one or more of the properties of the stylus, finger manipulation data, gestures, touch-sensitive surface, and communication interface described herein with reference to other methods described herein (e.g., 1400, 1500, 1600, 1700, 1800, 1900, 2500, 2600, 2700).

Figure 25A:
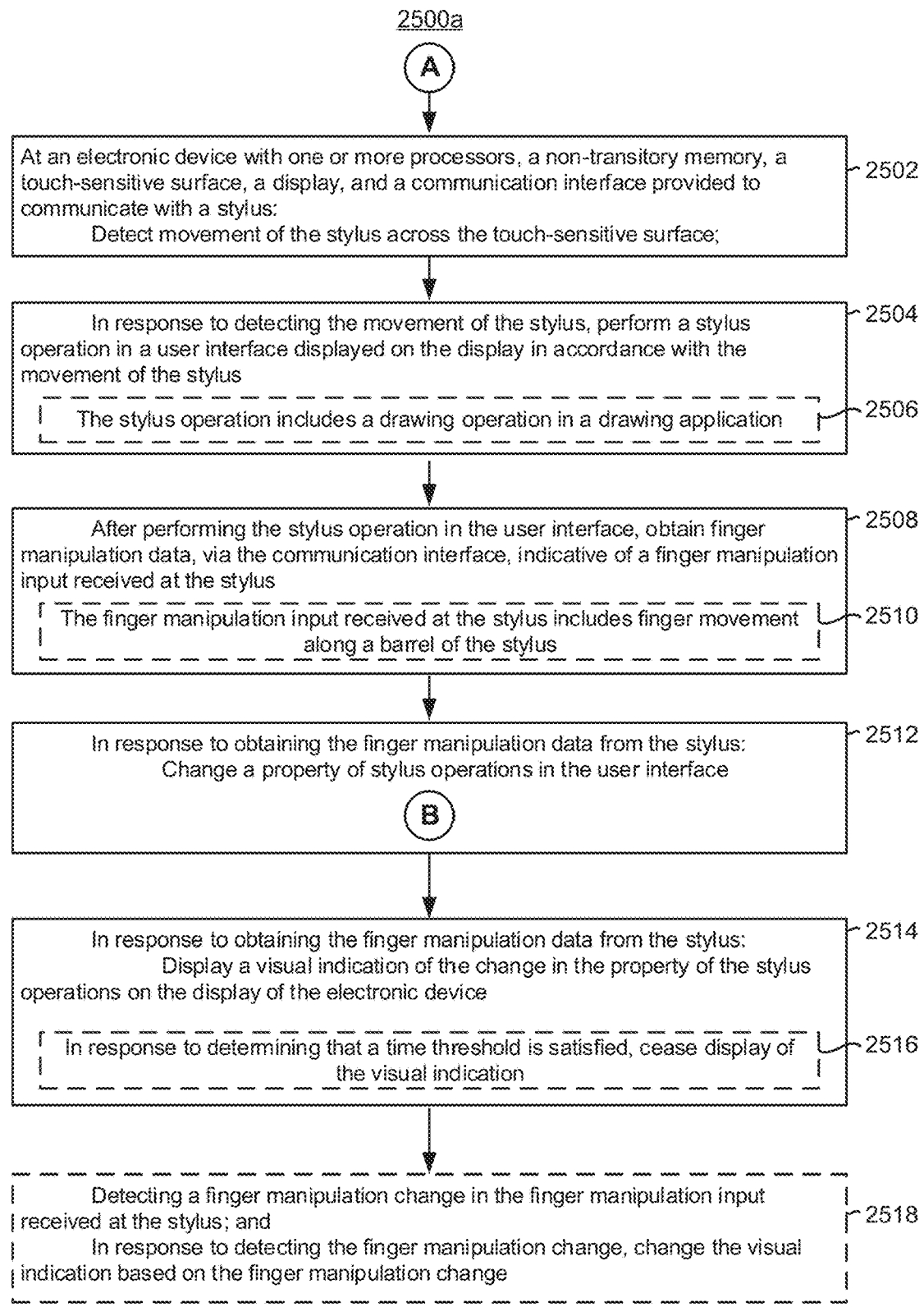

FIGS. 25A-25B is a flow diagram illustrating a method 2500 of displaying example user interfaces for selecting stylus settings and drawing marks based on the stylus settings in accordance with some embodiments. The method 2500 is performed at an electronic device (e.g., the electronic device 300 in FIG. 3, or the portable multifunction device 100 in FIG. 1A) with a touch-sensitive surface, a display, and a communication interface provided to communicate with a stylus (e.g., a BLUETOOTH interface). In some embodiments, the touch-sensitive surface and display are combined into a touch screen display (e.g., a mobile phone or tablet). In some embodiments, the touch-sensitive surface and display are separate (e.g., a laptop or desktop computer with a separate touchpad and display). Some operations in the method 2500 are, optionally, combined and/or the order of some operations is, optionally, changed.

The method 2500 contemplates the electronic device providing user interfaces for selecting stylus settings and drawing marks based on the stylus settings in accordance with some embodiments. The electronic device utilizes finger manipulation data received from a stylus in order to exploit the myriad of detectable input types at the stylus. The stylus detects inputs from the hand of the user (e.g., gestures) while the user is holding the stylus and detects inputs while the user is not holding the stylus. Because of the intricate varied hand-manipulation capabilities of the user, the stylus can detect many types of user inputs. The stylus provides data to the electronic device indicative of these user inputs. Accordingly, the method 2500 contemplates the electronic device receiving various of types of data from the stylus indicative of the various user inputs detected at the stylus.

This enhances the operability of the electronic device and makes the electronic device interface more efficient and robust. As noted above, the user can provide a variety of input types to the stylus (e.g., finger manipulations on the stylus, gestured on the stylus, rotational movements of the stylus, etc.). On the other hand, the touch-sensitive surface of the electronic device can receive a single input type (e.g., a touch input). A single input type limits a user's ability to interact with the electronic device and can lead to erroneous user inputs. Accordingly, a shift in at least some of the user inputs from the touch-sensitive surface of the electronic device to the stylus provides a more efficient user interface with the electronic device and can reduce the number of mistaken inputs registered at the electronic device. Additionally, this shift to fewer touch inputs at the touch-sensitive surface of the electronic device reduces wear-and-tear of and power usage of the electronic device. This improves battery life of the electronic device by enabling the user to use the electronic device more quickly and efficiently. For battery-operated electronic devices, enabling a user to enter fewer inputs on the touch-sensitive surface of the electronic device conserves power and increases the time between battery charges of the electronic device.

Referring to FIG. 25A, the electronic device detects (2502) movement of the stylus across the touch-sensitive surface. As one example, with reference to FIG. 21I, the electronic device 100*a* detects a draw input 2124 of the stylus 203 across the touch-sensitive surface of the electronic device 100*a*.

In response to detecting the movement of the stylus, the electronic device performs (2504) a stylus operation in a user interface displayed on the display in accordance with the movement of the stylus. For example, the electronic device performs a drawing operation according to the currently active drawing tool and the specified thickness, color, and/or opacity. As another example, the user interface corresponds to a canvas in a drawing application. As one example, in response to the draw input 2124 of the stylus 203 in FIG. 21I, the electronic device 100*a* displays a corresponding pencil mark 2126, as illustrated in FIG. 21K, because the pencil is the currently active drawing tool.

In some embodiments, the stylus operation includes (2506) a drawing operation in a drawing application. As one example, in response to the draw input 2124 of the stylus 203 in FIG. 21I, the electronic device 100*a* displays a corresponding pencil mark 2126, as illustrated in FIG. 21K, because the pencil is the currently active drawing tool.

After performing the stylus operation in the user interface, the electronic device obtains (2508) finger manipulation data, via the communication interface, indicative of a finger manipulation input received at the stylus. For example, the finger manipulation data from the stylus is received by the device via the communication interface. As another example, the finger manipulation data corresponds to data collected by a magnetometer of the stylus, an accelerometer of the stylus, and/or a capacitive touch element or touch-sensitive surface on the barrel of the stylus. As yet another example, the finger manipulation data is transmitted/received via BLUETOOTH connection, IEEE 802.11x connection, etc. As yet another example, the finger manipulation input corresponds to a tap, double tap, slide up, slide down, flick, etc. In some embodiments, the finger manipulation data includes information about the movement of fingers on the stylus or movement of the stylus relative to the fingers of a user (e.g., data indicating how the fingers moved). In some embodiments, the finger manipulation data includes a processed representation of the movement of fingers on the stylus or movement of the stylus relative to the fingers of a user (e.g., data indicating a gesture or manipulation that was performed at the stylus such as a swipe).

In some embodiments, the finger manipulation input received at the stylus includes (2510) finger movement along a barrel of the stylus. The electronic device utilizing finger manipulation data from the stylus, rather than based on inputs detected at the touch-sensitive surface of the electronic device, enhances the operability of the electronic device and reduces the number of inputs to the touch-sensitive surface of electronic device. Reducing the number of inputs to the touch-sensitive surface of the electronic device makes the electronic device more efficient by extending the battery life and reducing wear-and-tear of the electronic device. As one example, the electronic device 100a obtains data indicative of a finger movement along the barrel of the stylus 203 (e.g., slide down gesture), as illustrated in FIG. 21K, and, in response, decreases the thickness level associated with the currently active tool, as illustrated in FIG. 21L.

In response to obtaining the finger manipulation data from the stylus, the electronic device changes (2512) a property of stylus operations in the user interface. Changing the property of the stylus operations based on finger manipulation data from the stylus, rather than based on inputs detected at the touch-sensitive surface of the electronic device, enhances the operability of the electronic device and reduces the number of inputs to the touch-sensitive surface of electronic device. Reducing the number of inputs to the touch-sensitive surface of the electronic device makes the electronic device more efficient by extending the battery life and reducing wear-and-tear of the electronic device. For example, the electronic device changes a property of a particular editing tool among the one or more editing tools, such as changing line thickness and/or opacity. As another example, the property corresponds to thickness, opacity, color, etc. As yet another example, a slide down increases thickness, while a slide up decreases the thickness. As yet another example, a clockwise roll of the barrel of the stylus increases opacity, while a counter-clockwise roll of the barrel decreases the opacity. As another example, a tap on the stylus cycles through the color wheel. As yet another example, a double tap changes which editing tool has focus (e.g., which tool is selected). As one example, with reference to FIGS. 21S and 21T, the electronic device 100a increase line opacity based on the slide down gesture 2152.

In response to obtaining the finger manipulation data from the stylus, the electronic device displays (2514) a visual indication of the change in the property of the stylus operations on the display of the electronic device. Displaying a visual indication of the change in the property of the stylus provides information about the current property of the stylus. Providing the current property of the stylus operations reduces the number of inputs to the touch-sensitive surface of the electronic device that are related to determining the current property of the stylus operations. Reducing the number of inputs to the touch-sensitive surface of the electronic device makes the electronic device more efficient by extending the battery life and reducing wear-and-tear of the electronic device. For example, the electronic device changes a color indicator, line thickness indicator, opacity indicator, etc. As one example, with reference to FIGS. 21S and 21T, the electronic device 100a displays an opacity indicator 2154 with a current opacity level indicator 2155 indicating an increased opacity level.

In some embodiments, in response to determining that a time threshold is satisfied, the electronic device ceases (2516) display of the visual indication of the change in the property. Ceasing to display the visual indication of the change in property in response to satisfaction of a time threshold reduces inputs to the touch-sensitive surface of the electronic device connected with dismissing the visual indication. Reducing the number of inputs to the touch-sensitive surface of the electronic device makes the electronic device more efficient by extending the battery life and reducing wear-and-tear of the electronic device. Moreover, ceasing to display the visual indication results in a larger useable screen area. By using less space on the screen, a smaller (and less expensive) screen can provide the same usability. For example, the time threshold is predetermined. As another example, the time threshold is satisfied if the electronic device detects no contact input on the touch-sensitive surface of the electronic device for a certain amount of time. As yet another example, the time threshold is satisfied if the electronic device detects that the stylus is no longer being held for a certain amount of time.

In some embodiments, the electronic device detects (2518) a finger manipulation change in the finger manipulation input received at the stylus and, in response to detecting the finger manipulation change, changes (2518) the visual indication based on the finger manipulation change. Changing the visual indication based on data obtained from the stylus provides information about the current property of the stylus and enhances the operability of the electronic device. Rather than utilizing detected inputs at the touch-sensitive surface of the electronic device, the electronic device utilizes RF-based data from the stylus in order to change the visual indication. Reducing the number of inputs to the touch-sensitive surface of the electronic device makes the electronic device more efficient by extending the battery life and reducing wear-and-tear of the electronic device. For example, the finger manipulation change is detected based on obtained finger manipulation data from the stylus. As one example, with reference to FIGS. 21K and 21L, the electronic device 100a changes the thickness level indicator 2132 to indicate that the thickness level has changed from the thickest level to the second thinnest level.

Referring to FIG. 25B, in some embodiments, while displaying, on the display, a settings interface provided for setting how the property of the stylus operations is affected in response to obtaining the finger manipulation data from the stylus, the electronic device detects (2520) a settings input corresponding to the settings interface, wherein the settings input specifies how a particular property of the stylus operations is affected in response to a particular finger manipulation input received by the stylus. Moreover, while displaying the setting interface, in response to detecting the settings input, the electronic device sets (2520) how the particular property of the stylus operations is affected in response to determining that the finger manipulation data from the stylus is indicative of the particular finger manipulation input received by the stylus. Providing a single settings interface for changing stylus settings reduces the number of navigation inputs to the touch-sensitive surface of the electronic device and enhances the operability of the electronic device. Reducing the number of inputs to the touch-sensitive surface of the electronic device makes the electronic device more efficient by extending the battery life and reducing wear-and-tear of the electronic device. For example, the settings interface includes options for specifying the operation associated with a double tap gesture at the stylus (e.g., switch from current tool to eraser) and the operation associated with a slide up gesture at the stylus (e.g., increase opacity, increase thickness, change color, etc.). As one example illustrated in FIG. 21A, the electronic device 100a detects an input 2106. In response, the electronic device 100a changes, as illustrated in FIG. 21B, the operation associated with a double tap gesture to be "Switch between current tool and previous tool."

In some embodiments, the settings input specifies (2522) that the particular property of the stylus operations is unchanged in response to determining that the finger manipulation data from the stylus is indicative of the particular finger manipulation input received by the stylus. Disabling the finger manipulation data from affecting the property of the stylus operations prevents unintended operations, leading to fewer undo operations resulting from the unintended operations. A reduced number of undo operations performed on the touch-sensitive surface of the electronic device makes the electronic device more efficient by extending the battery life of the electronic device. As one example, with reference to FIG. 21A, the slide gesture submenu 2104b and the double tap gesture submenu 2104c include respective "Off" affordances for disabling operations associated with the respective stylus gesture.

In some embodiments, the settings input specifies (2524) that the particular property of the stylus operations corresponds to changing thickness of a line drawn by the stylus. Setting the stylus operation to change line thickness enables the electronic device to change the line thickness based on subsequently obtained finger manipulation data from the stylus. Utilizing the finger manipulation data from the stylus leads to a reduced number of inputs to the touch-sensitive surface performed in order to effect the same change line thickness operation. Reducing the number of inputs to the touch-sensitive surface of the electronic device makes the electronic device more efficient by extending the battery life and reducing wear-and-tear of the electronic device. As one example, as illustrated in FIG. 21D, the electronic device 100a detects an input 2112 specifying to reverse the slide direction (from slide up to slide down) at the stylus 203 associated with a thickness decrease operation. As a result, as illustrated in FIG. 21E, a slide down operation is associated with a thickness decrease operation.

In some embodiments, the settings input specifies (2526) that the particular property of the stylus operations corresponds to changing opacity of a line drawn by the stylus. Setting the stylus operation to change line opacity enables the electronic device to change the line opacity based on subsequently obtained finger manipulation data from the stylus. Utilizing the finger manipulation data from the stylus leads to a reduced number of inputs to the touch-sensitive surface performed in order to effect the same change line opacity operation. Reducing the number of inputs to the touch-sensitive surface of the electronic device makes the electronic device more efficient by extending the battery life and reducing wear-and-tear of the electronic device. As one example, as illustrated in FIGS. 21A-21E, the slide gesture submenu 2104b of the stylus settings menu 2104 includes an "Increase opacity level" affordance to enable changing opacity levels based on a slide operation at the stylus 203.

In some embodiments, the settings input specifies (2528) that the particular property of the stylus operations corresponds to reversing how a swipe finger manipulation input received at the stylus affects line thickness or line opacity. Providing an option that reverses the operation performed by the electronic device in response to a gesture at the stylus avoids having two additional setting submenus. Namely, this feature makes it unnecessary to have additional settings submenus for setting the change opacity level and change thickness level operations resulting from gestures (e.g., slide gestures) in the reverse direction at the stylus. Avoiding additional submenus from the display saves display space and enables a smaller and cheaper display to provide the same functionality. Moreover, avoiding displayed submenus reduces the amount of operations to scroll through different options. As one example, in FIG. 21D, the electronic device 100a detects an input 2112 specifying to reverse the slide direction (from slide up to slide down) at the stylus 203 associated with a thickness decrease operation. As a result, as illustrated in FIG. 21E, a slide down operation is associated with a thickness decrease operation.

In some embodiments, the property of the stylus operation corresponds (2530) to line width. Changing the line width property associated with a drawing tool based on RF-signals based on finger manipulation data from the stylus, rather than based on inputs detected at the touch-sensitive surface of the electronic device, enhances the operability of the electronic device and reduces the number of inputs to the touch-sensitive surface of the electronic device. Reducing the number of inputs to the touch-sensitive surface of the electronic device makes the electronic device more efficient by extending the battery life and reducing wear-and-tear of the electronic device. As one example, in response to obtaining data indicating a slide down gesture 2130 at the stylus 203 illustrated in FIG. 21K, the electronic device 100a decrease the line thickness as indicated by a thickness indicator 2132 shown in FIGS. 21K and 21L.

In some embodiments, the property of the stylus operation corresponds (2532) to line opacity. Changing the line opacity property associated with a drawing tool based on RF-signals based on finger manipulation data from the stylus, rather than based on inputs detected at the touch-sensitive surface of the electronic device, enhances the operability of the electronic device and reduces the number of inputs to the touch-sensitive surface of the electronic device. Reducing the number of inputs to the touch-sensitive surface of the electronic device makes the electronic device more efficient by extending the battery life and reducing wear-and-tear of the electronic device. As one example, in response to obtaining data indicating a slide down gesture 2152 at the stylus 203 illustrated in FIG. 21S, the electronic device 100a increases the opacity level as indicated by opacity indicator 2154 and current opacity level indicator 2155 shown in FIGS. 21S and 21T.

In some embodiments, the property of the stylus operation corresponds (2534) to an editing tool having focus. Changing which tool has focus based on RF-signals based on finger manipulation data from the stylus, rather than based on inputs detected at the touch-sensitive surface of the electronic device, enhances the operability of the electronic device and reduces the number of inputs to the touch-sensitive surface of the electronic device. Reducing the number of inputs to the touch-sensitive surface of the electronic device makes the electronic device more efficient by extending the battery life and reducing wear-and-tear of the electronic device. As one example, in response to obtaining data indicating a double tap 2120 (a first tap 2120a shown in FIG. 21G and a second tap 2120*b* shown in FIG. 21H), the electronic device 100*a* moves focus from the current tool (marker) to the previous tool (pencil), as illustrated in FIG. 21H.

In some embodiments, the electronic device changes (2536) the property of the stylus operations in response to determining that the finger manipulation input satisfies a gesture criterion. Changing the property of the stylus operations in response to satisfaction of a criterion enhances the operability of the electronic device and prevents unintended stylus property change property operations, leading to fewer undo operations resulting from the unintended change property operations. A reduced number of undo operations performed on the touch-sensitive surface of the electronic device makes the electronic device more efficient by extending the battery life of the electronic device. For example, the electronic device changes line thickness if the slide along the barrel of the stylus is longer than a threshold distance (e.g., 1 cm). As another example, the electronic device changes line opacity if the slide along the barrel of the stylus lasts longer than a threshold amount of time (e.g., quarter of a second).

In some embodiments, after changing the property of the stylus operations, the electronic device detects (2538) a subsequent movement of the stylus across the touch-sensitive surface and performs a subsequent stylus operation in the user interface in accordance with the subsequent movement and the property of the stylus operation. As one example, the electronic device 100*a* displays a corresponding mark 2160 shown in FIG. 21V having a higher opacity than a corresponding mark 2176 shown in FIG. 21AB because the opacity level was decreased as a result of the slide up gesture 2170 at the stylus 203 shown in FIG. 21Y.

Note that details of the processes described above with respect to method 2500 are also applicable in an analogous manner to other methods described herein (e.g., 1400, 1500, 1600, 1700, 1800, 1900, 2400, 2600, 2700). For example, the stylus, stylus operations, finger manipulation inputs, display, touch-sensitive surface, and communication interface described above with reference to method 2500 optionally have one or more of the properties of the stylus, stylus operations, finger manipulation inputs, display, touch-sensitive surface, and communication interface described herein with reference to other methods described herein (e.g., 1400, 1500, 1600, 1700, 1800, 1900, 2400, 2600, 2700).

Figure 26B:
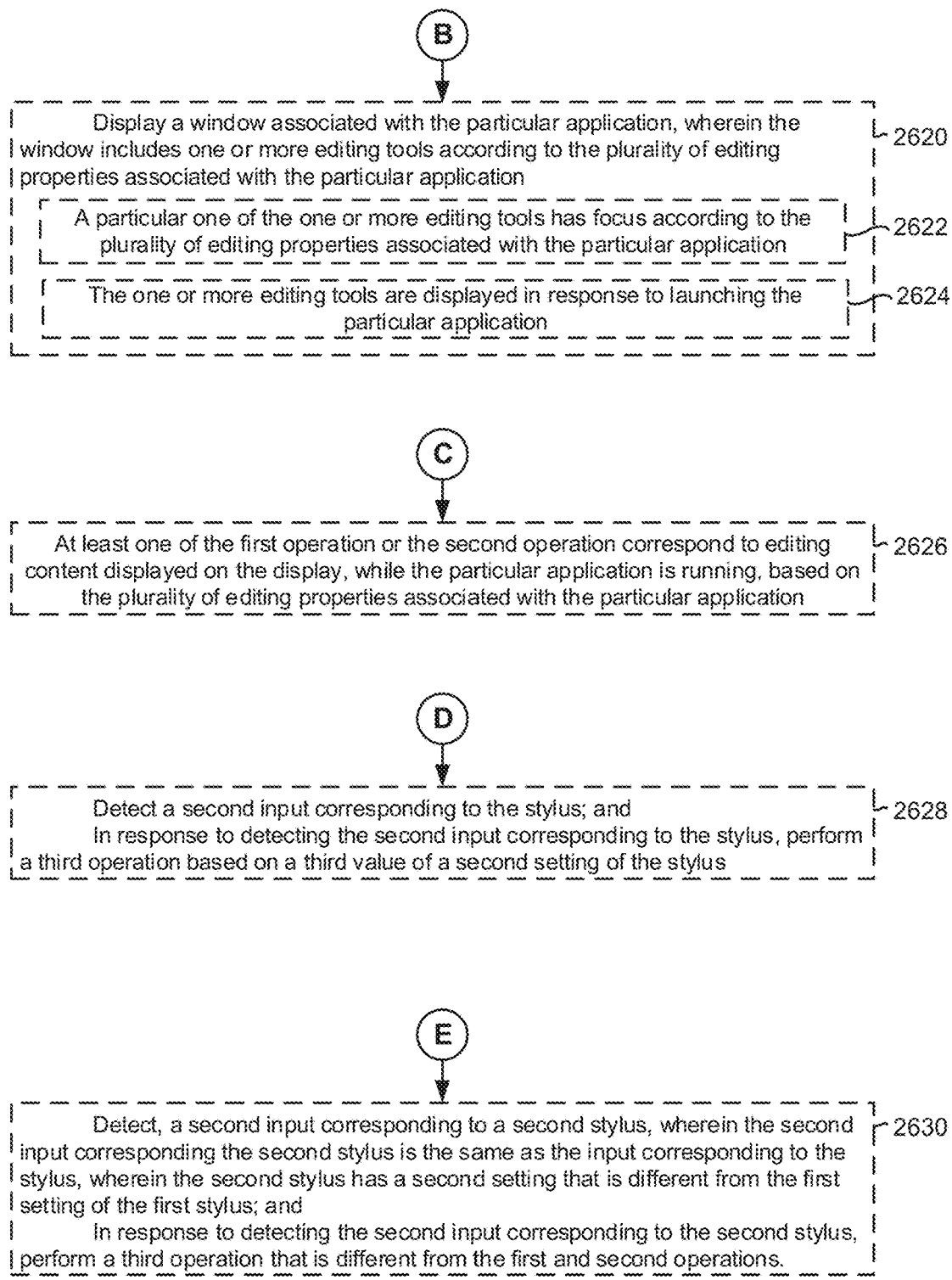

FIGS. 26A-26B is a flow diagram illustrating a method 2600 of maintaining stylus settings across electronic devices in accordance with some embodiment. The method 2600 is performed at an electronic device (e.g., the electronic device 300 in FIG. 3, or the portable multifunction device 100 in FIG. 1A) with a touch-sensitive surface, a display, and a communication interface provided to communicate with a stylus (e.g., a BLUETOOTH interface). In some embodiments, the touch-sensitive surface and display are combined into a touch screen display (e.g., a mobile phone or tablet). In some embodiments, the touch-sensitive surface and display are separate (e.g., a laptop or desktop computer with a separate touchpad and display). Some operations in the method 2600 are, optionally, combined and/or the order of some operations is, optionally, changed.

The method 2600 contemplates the electronic device performing various operations based on stylus settings. For example, if a particular stylus setting has a first value, the electronic performs a first operation. On the other hand, if the particular stylus setting has a second value different from the first value, the electronic performs a second operation different from the first operation. Performing operations based on data obtained from the stylus reduces the number of inputs to the touch-sensitive surface of the electronic device. For example, rather than receiving an input to the touch-sensitive surface activating a particular editing tool, the electronic device obtains data from the stylus specifying the particular editing tool. In response to obtaining the data, the electronic device activates the editing tool without the input to the touch-sensitive surface.

Accordingly, a reduction in the number of inputs to the touch-sensitive surface of the electronic device provides a more efficient user interface with the electronic device and can reduce the number of mistaken inputs registered at the electronic device. Additionally, this shift to fewer touch inputs at the touch-sensitive surface of the electronic device reduces wear-and-tear of and power usage of the electronic device. This improves battery life of the electronic device by enabling the user to use the electronic device more quickly and efficiently. For battery-operated electronic devices, enabling a user to enter fewer inputs on the touch-sensitive surface of the electronic device conserves power and increases the time between battery charges of the electronic device.

Referring to FIG. 26A, a first electronic device detects (2602) an input corresponding to a stylus that is in communication with the first electronic device. For example, the stylus and the first electronic device are communicating via one or more of: BLUETOOTH, 802.11x, peer-to-peer WiFi, etc. As another example, the input corresponds to drawing input on a canvas (e.g., the canvas 2216) associated with a drawing application.

In some embodiments, before detecting the input corresponding to the stylus, a second electronic device changes (2604) a first setting of the stylus. Having the second electronic device change the first setting of the stylus reduces wear-and-tear of the first electronic device. As one example, while the stylus 203 is paired with the second electronic device 100*a*, the second electronic device 100*a* sets the opacity level of the stylus 203 to light gray, as shown in FIG. 21Z. After the stylus 203 pairs with (e.g., upon pairing with or in response to pairing with) the first electronic device 100*b*, the light gray setting is transferred to the first electronic device 100*b*, as indicated by the initial value of the opacity indicator 2226 shown in FIG. 22F being light gray.

In some embodiments, the input corresponds (2606) to a gesture detected at the stylus. The electronic device utilizing RF-signals based data from the stylus as an input, rather than inputs detected at the touch-sensitive surface of the electronic device, enhances the operability of the first electronic device and reduces the number of inputs to the touch-sensitive surface of the first electronic device. Reducing the number of inputs to the touch-sensitive surface of the first electronic device makes the first electronic device more efficient by extending the battery life and reducing wear-and-tear of the first electronic device. For example, the gesture corresponds to one or more of a tap, double tap, slide, swipe, tap, flick, etc. As one example, the gesture corresponds to a double tap, such as first tap gesture 2218 shown in FIG. 22D and second tap gesture 2220 shown in FIG. 22E.

In some embodiments, the input corresponds (2608) to the stylus contacting a touch-sensitive surface of the first electronic device. Detecting a stylus input contacting the touch-sensitive surface of the first electronic device enhances the operability of the first electronic device. The precision of the stylus input to the touch-sensitive surface of the first electronic device reduces extraneous inputs and prevents unintended operations, leading to fewer undo operations resulting from the unintended operations. A reduced number of undo operations performed on the touch-sensitive surface of the first electronic device makes the first electronic device more efficient by extending the battery life of the first electronic device. For example, with reference to FIGS. 21Q and 21R, the electronic device 100*a* detects an input from the stylus 203.

In response to detecting the input corresponding to the stylus, in accordance with a determination that a first setting of the stylus has a first value, the first electronic device performs (2610) the first operation at the first electronic device. For example, the first operation corresponds to editing content displayed on the display, such as undo/redo, drawing a line, resizing elements, inserting an interface element, and/or the like. As another example, the first operation corresponds to changing which editing tools has focus and/or changing a property (e.g., thickness, opacity, color, etc.) of the currently active editing tool. As yet another example, the first operation corresponds to a navigation operation. As yet another example, the first operation corresponds to invoking a color palette, such as the opacity indicator 2226 in FIG. 22G.

In some embodiments, the first electronic device displays (2612) status information about the stylus, wherein the status information includes information indicative of the first setting of the stylus. Providing an indication to a user of status information about the stylus enables the user to more efficiently utilize applications running on the first electronic device that utilizes data from the stylus. For example, an indicator indicating the current stylus opacity level prevents additional inputs to the touch-sensitive surface of the first electronic device related to determining the current stylus opacity level. More efficient usage of applications at the first electronic device extends the battery life of the first electronic device. For example, the stylus status information includes an opacity level and/or current thickness level associated with the currently active tool. As one example, with reference to FIG. 22B, the electronic device 100*b* (sometimes referred to with respect to FIGS. 26A-26B as "first electronic device 100*b*" to highlight the correspondence with the language of the flowchart whereas electronic device 100*a* is sometimes referred to with respect to FIGS. 26A-26B as "second electronic device 100*a*"), in response to pairing with the stylus 203, displays a stylus status bar 2212 including the battery level indicator 2212*a* of the stylus 203 and the stylus user identifier 2212*b* associated with the stylus 203.

In some embodiments, the first setting includes (2614) a plurality of editing properties associated with a particular application. The first setting including a plurality of editing properties, rather than one editing property, reduces the number of inputs to the touch-sensitive surface of the first electronic device connected with setting different editing properties. Reducing the number of inputs to the touch-sensitive surface of the first electronic device makes the first electronic device more efficient by extending the battery life and reducing wear-and-tear of the first electronic device. For example, the plurality of editing properties correspond to types of editing tools and associating properties of the editing tools. For instance, one editing property is that a highlighter has a 50% thickness, and another editing property is that the pencil tool is associated with a red color. In some embodiments, the editing properties include information about settings of a user that were previously programmed into the stylus, such as programmed by a different (second) electronic device. In some embodiments, the editing properties are application-specific, such as having a pencil as the default tool for a drawing application and a text tool as the default tool for a word process application.

In response to detecting the input corresponding to the stylus, in accordance with a determination that the first setting of the stylus has a second value that is different from the first value, the first electronic device performs (2616) a second operation at the first electronic device that is different from the first operation, wherein the value of the first setting was determined based on inputs at the second electronic device with which the stylus was previously in communication. For example, the second operation corresponds to editing content displayed on the display, such as undo/redo, drawing a line, resizing elements, inserting an interface element, and/or the like. As another example, the second operation corresponds to changing which editing tools has focus and/or changing a property (e.g., thickness, opacity, color, etc.) of the currently active editing tool. As yet another example, the second operation corresponds to a navigation operation. As yet another example, the second operation corresponds to invoking a color palette. In some embodiments, the second value is stored within memory allocated at the stylus. As one example, in response to a double tap input, the first electronic device 100*b* changes the currently active pencil tool to the previous marker tool, as illustrated in FIG. 22E, based on the first setting of the stylus 203 having the second value. The first setting of the stylus 203 was set to the second value via a second electronic device 100*a*, as illustrated in FIGS. 21A and 21B.

In some embodiments, in response to pairing the stylus with the first electronic device, the first electronic device obtains (2618) from the stylus, data indicative of the first setting. In various implementations, data indicative of the first setting includes data indicative of a value of the first setting. Obtaining RF-signals based data from a stylus indicative of values of settings, rather than obtaining inputs to the touch-sensitive surface of the first electronic device specifying the values, reduces the number of inputs to the touch-sensitive surface of the first electronic device. Reducing the number of inputs to the touch-sensitive surface of the first electronic device makes the first electronic device more efficient by extending the battery life and reducing wear-and-tear of the first electronic device. As one example with respect to FIGS. 22A-22B, the stylus 203 pairs with the first electronic device 100*b*. In response to pairing with the stylus 203, the first electronic device 100*b* obtains data from the stylus 203, including various stylus setting values that were set via the second electronic device 100*a* as described with respect to FIGS. 21A-21AB.

Turning to FIG. 26B, in some embodiments, the first electronic device displays (2620) a window associated with the particular application, wherein the window includes one or more editing tools according to the plurality of editing properties associated with the particular application. Displaying application-specific editing tools without user intervention (e.g., automatically) removes the need for an input to the touch-sensitive surface of the first electronic device requesting display of the one or more editing tools. Reducing the number of inputs to the touch-sensitive surface of the first electronic device makes the first electronic device more efficient by extending the battery life and reducing wear-and-tear of the first electronic device. For example, in some embodiments, the first electronic device displays a pencil because the application is a word document. As another example, in some embodiments, the first electronic device displays an eraser because the application is a drawing application. As one example, as shown in FIG. 22C, in response to detecting an input 2214 requesting a drawing application, the first electronic device 100b displays, as shown in FIG. 22D, a canvas 2216 associated with the drawing application, along with drawing tools (e.g., a pencil, pen, marker, eraser, and/or the like).

In some embodiments, a particular one of the one or more editing tools has (2622) focus according to the plurality of editing properties associated with the particular application. Displaying a particular tool having focus, rather than obtaining navigation inputs to set the focus, enhances the operability of the first electronic device and reduces the number of inputs to the touch-sensitive surface of the first electronic device. Reducing the number of inputs to the touch-sensitive surface of the first electronic device makes the first electronic device more efficient by extending the battery life and reducing wear-and-tear of the first electronic device. As one example, in response to detecting an input 2214, illustrated in FIG. 22C requesting a drawing application, the first electronic device 100b displays the pencil having focus, as shown in FIG. 22D, based on the corresponding setting of the stylus 203 previously set via the second electronic device 100a.

In some embodiments, the first electronic device displays (2624) one or more editing tools in response to launching the particular application. By displaying editing tools, the user interface provides an efficient mechanism for a user to select an editing tool, thus reducing the amount of user interaction to perform various different predefined operations upon drawing objects. The reduction in user interaction reduces wear-and-tear of the first electronic device. The reduction in user interaction also results in faster initiation of the performance of the predefined operations and, thus, reduces power drain to perform the predefined operations, increasing battery life of the first electronic device. As one example, in response to detecting an input 2214, as illustrated in FIG. 21C, requesting a drawing application, the first electronic device 100b displays, as illustrated in FIG. 22D, drawing tools, such as a pencil, pen, marker, eraser, and/or the like.

In some embodiment, at least one of the first operation or the second operation correspond (2626) to editing content displayed on the display, while the particular application is running, based on the plurality of editing properties associated with the particular application. Editing content based on editing properties previously set based on RF-signals based data obtained from the stylus, rather than based on previous inputs detected on the touch-sensitive surface of the first electronic device, reduces the number of inputs to the touch-sensitive surface of the first electronic device. Reducing the number of inputs to the touch-sensitive surface of the first electronic device makes the first electronic device more efficient by extending the battery life and reducing wear-and-tear of the first electronic device. For example, editing content corresponds to a markup operation based on the plurality of editing properties functions. As another example, displaying the markup corresponds to displaying a thin red pencil mark on a canvas of a drawing application because the editing properties indicate a thin red pencil as the default tool for the drawing application.

In some embodiments, the first electronic device detects (2628) a second input corresponding to the stylus and, in response to detecting the second input corresponding to the stylus, performs (2628) a third operation based on a third value of a second setting of the stylus. The first electronic device performing a different (third) operation based on a detected stylus input provides an efficient mechanism to perform various operations based on the nature of the input from the stylus. Accordingly, different input types perform different operations, reducing the number of extraneous inputs detected at the first electronic device and therefore reducing the number of undo operations performed on the touch-sensitive surface of the first electronic device. Reducing the amount of user interaction with the first electronic device reduces wear-and-tear of the device and, for battery powered devices, increases battery life of the first electronic device. In some embodiments, the third operation is different from the first and/or second operations. As one example, the first electronic device 100b performs a color change operation in response to obtaining data from the stylus 203 indicating that the stylus 203 is being rolled, such as being rolled about a particular axis.

In some embodiments, the first electronic device detects (2630) detects a second input corresponding to a second stylus, wherein the second input corresponding the second stylus is the same as the input corresponding to the stylus, wherein the second stylus has a second setting that is different from the first setting of the first stylus. In response to detecting the second input corresponding to the second stylus, the first electronic device performs a third operation that is different from the first and second operations. Performing different operations at electronic devices for different styluses in response to the same input enhances the operability of the electronic devices and reduces the number of inputs to the touch-sensitive surface of the electronic devices. Reducing the number of inputs to the touch-sensitive surface of the electronic devices makes the electronic devices more efficient by extending the battery life and reducing wear-and-tear of the electronic devices. As one example, the first electronic device 100b is paired with a second stylus. In response to obtaining data from the second stylus indicating a double tap operation performed at the second stylus, the first electronic device 100b performs a show color palette operation. This show color palette operation differs from the switch to previous tool operation illustrated in FIGS. 22D and 22E with respect to the stylus 203.

Note that details of the processes described above with respect to method 2600 are also applicable in an analogous manner to other methods described herein (e.g., 1400, 1500, 1600, 1700, 1800, 1900, 2400, 2500, 2700). For example, the stylus, inputs, stylus settings, operations, display, and communication interface described above with reference to method 2600 optionally have one or more of the properties of the stylus, inputs, stylus settings, operations, display, and communication interface described herein with reference to other methods described herein (e.g., 1400, 1500, 1600, 1700, 1800, 1900, 2400, 2500, 2700).

Figure 27A:
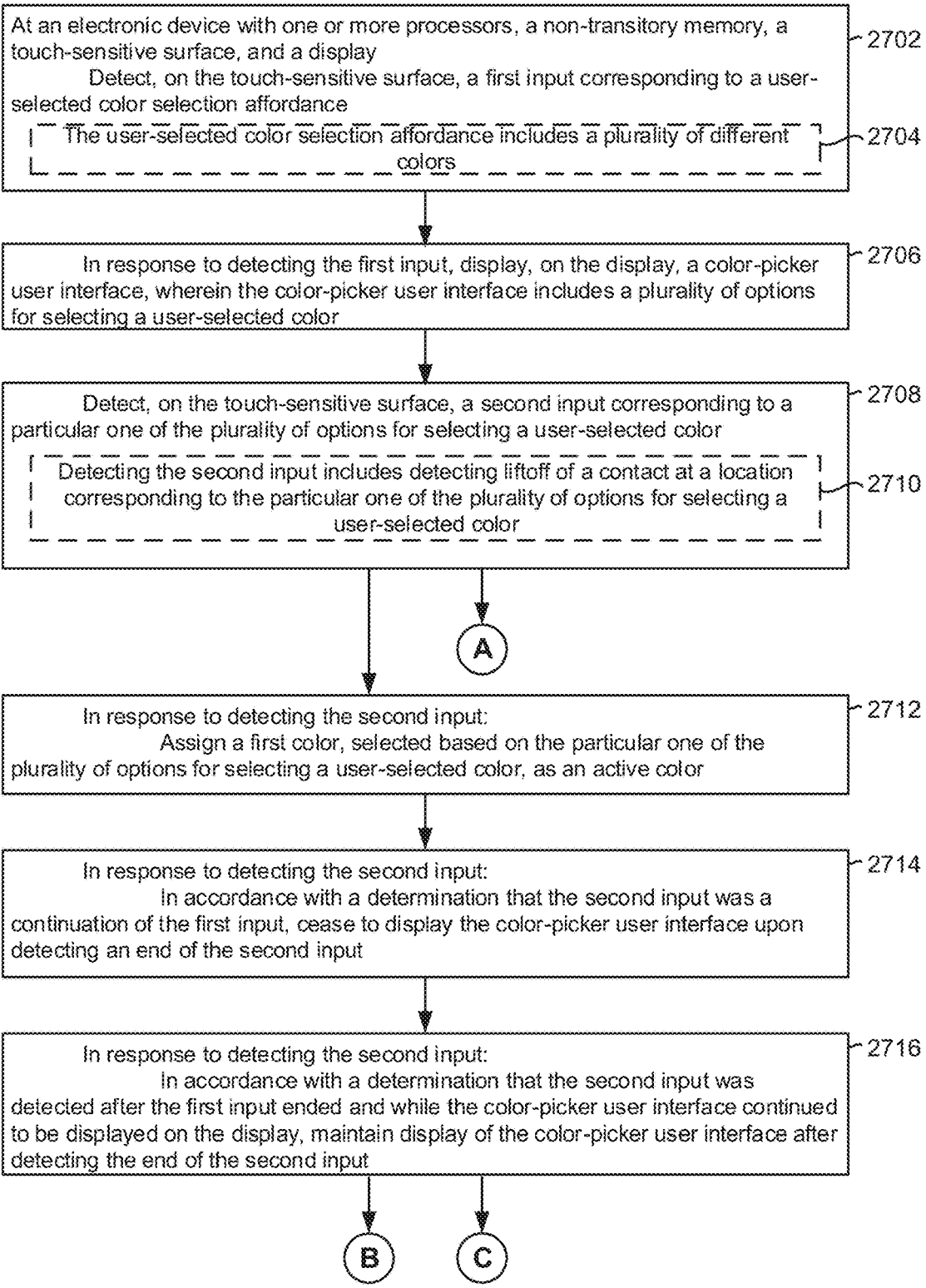
Figure 27B:
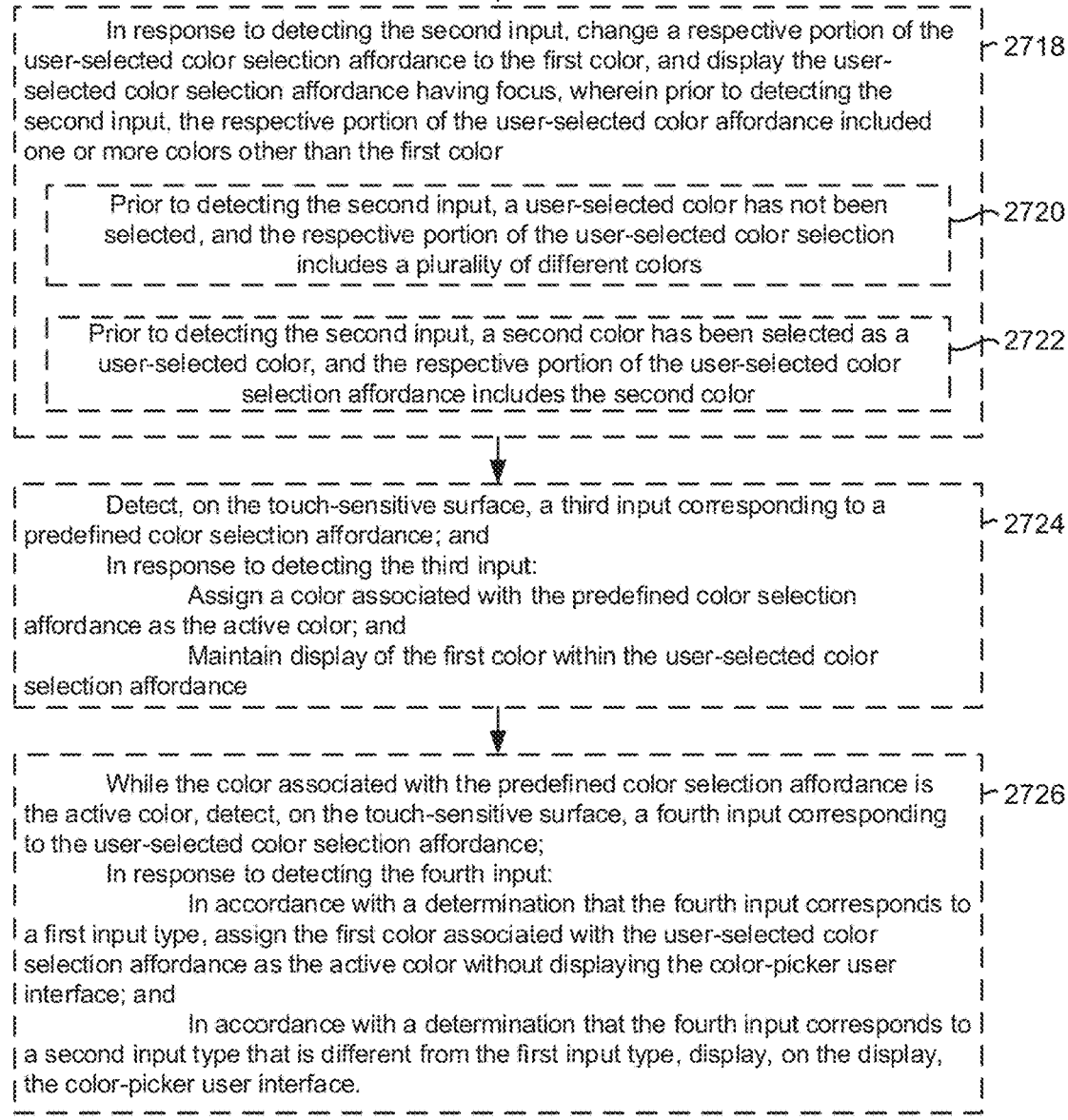

FIGS. 27A-27C is a flow diagram illustrating a method 2700 of displaying example user interfaces including a color-picker user interface to assign an active color in accordance with some embodiments. The method 2700 is performed at an electronic device (e.g., the electronic device 300 in FIG. 3, or the portable multifunction device 100 in FIG. 1A) with a touch-sensitive surface, a display, and a communication interface provided to communicate with a stylus (e.g., a BLUETOOTH interface). In some embodiments, the touch-sensitive surface and display are combined into a touch screen display (e.g., a mobile phone or tablet). In some embodiments, the touch-sensitive surface and display are separate (e.g., a laptop or desktop computer with a separate touchpad and display). Some operations in the method 2700 are, optionally, combined and/or the order of some operations is, optionally, changed.

The method 2700 contemplates the electronic device providing user interfaces including a color-picker user interface for assigning an active color in accordance with some embodiments. The color-picker user interface provides a quicker color section than certain current systems. As a result, battery usage of the electronic device is reduced, thereby extending the battery life of the electronic device.

Moreover, as will be detailed below, the number of inputs to the touch-sensitive surface of the electronic device is reduced as compared with previous color picker interfaces, due to how the color picker interface is invoked and/or how a particular color is selected. This shift to fewer touch inputs at the touch-sensitive surface of the electronic device reduces wear-and-tear of and power usage of the electronic device. This improves battery life of the electronic device by enabling the user to use the electronic device more quickly and efficiently. For battery-operated electronic devices, enabling a user to enter fewer inputs on the touch-sensitive surface of the electronic device conserves power and increases the time between battery charges of the electronic device.

Turning to FIG. 27A, the electronic device detects (2702), on a touch-sensitive surface, a first input corresponding to a user-selected color selection affordance. For example, the user-selected color selection affordance corresponds to an affordance including a plurality of colors, designs, hues, etc., such as a color pot affordance. As one example, with reference to FIG. 23A, the electronic device 100b detects an input 2310 corresponding to the user-selected color selection affordance 2306.

In some embodiments, the user-selected color selection affordance includes (2704) a plurality of different colors. As one example, with reference to FIG. 23A, the electronic device 100b displays the user-selected color selection affordance 2306 including four distinct patterns. One of ordinary skill in the art will appreciate that the user-selected color selection affordance may include any number of different colors (e.g., hues, shades, patterns, etc.), arranged in any matter.

In response to detecting the first input, the electronic device displays (2706), on the display, a color-picker user interface, wherein the color-picker user interface includes a plurality of options for selecting a user-selected color. For example, the color-picker user interface includes a plurality of color affordances that correspond to different colors, a gradient selector, hue/saturation/brightness sliders, red/blue/green sliders, and/or the like. As one example, in response to detecting the first input 2310, the electronic device 100b displays a color-picker user interface 2312 including a number of distinct patterns and shades (e.g., colors), as illustrated in FIG. 23B. As another example, the electronic device 100b displays a color-picker user interface 2346 including a continuous (e.g., gradient) color interface, as illustrated in FIG. 23Y.

The electronic device detects (2708), on the touch-sensitive surface, a second input corresponding to a particular one of the plurality of options for selecting a user-selected color. As one example, with reference to FIG. 23C, the second input 2314 includes both dragging inputs, and ends at the white color affordance (e.g., upper-right most affordance). As another example, with reference to FIG. 23U, the second input 2340 corresponds to a tap input by the stylus 203.

In some embodiments, detecting the second input includes (2710) detecting liftoff of a contact at a location corresponding to the particular one of the plurality of options for selecting a user-selected color. Liftoff of the second input corresponds to ceasing contact with the touch-sensitive surface of the electronic device. The electronic device utilizing a second input that corresponds to liftoff of the contact with the touch-sensitive surface of the electronic device, rather than utilizing a separate contact input that occurs after the liftoff as the second input, reduces the total number of contact and liftoff sequences. Reducing these sequences may extend the battery life and reduce wear-and-tear of the electronic device. As one example, with reference to FIGS. 23O and 23P, the second input includes the dragging input 2332 and includes liftoff of the dragging input 2332 between FIGS. 23O and 23P.

In response to detecting the second input, the electronic device assigns (2712) a first color, selected based on the particular one of the plurality of options for selecting a user-selected color, as an active color. As one example, in response to detecting the second input 2340 corresponding to a diagonal striped pattern illustrated in FIG. 23U, the electronic device 100b assigns the diagonal striped pattern as the active color. This resulting active color is indicated by the enlarged center 2316 including the diagonal striped pattern illustrated in FIG. 23V.

In response to detecting the second input, in accordance with a determination that the second input was a continuation of the first input, the electronic device ceases (2714) to display the color-picker user interface upon detecting an end of the second input. For example, in some embodiments, the electronic device ceases to display color-picker user interface in response to detecting the liftoff of a stylus or finger touch associated with the second input. As one example with respect to FIG. 23C, the electronic device 100b determines that the dragging input 2314 is a continuation of the first input 2310 shown in FIG. 23B. Accordingly, in response to detecting the end of the dragging input 2314, the electronic device 100b ceases to display the color-picker user interface 2312, as illustrated in FIG. 23D.

In response to detecting the second input, in accordance with a determination that the second input was detected after the first input ended and while the color-picker user interface continued to be displayed on the display, the electronic device maintains (2716) display of the color-picker user interface after detecting the end of the second input. For example, in some embodiments, the first and second inputs correspond to respective tapping inputs, and the electronic device maintains display of the color-picker user interface after detecting the end of the second tapping input. As one example, the electronic device 100b displays the color-picker user interface 2312, as shown in FIG. 23T, in response to the first input 2338 illustrated in FIG. 23S. The electronic device 100b detects the second input 2340, as shown in FIG. 23U, and determines that the second input 2340 was detected after the first input 2338 ended and while the color-picker user interface 2132 continued to be displayed on the display. Accordingly, the electronic device 100b maintains display of the color-picker user interface 2132, as illustrated in FIG. 23V, in response to detecting the second input 2340 shown in FIG. 23U.

Turning to FIG. 27B, in some embodiments, in response to detecting the second input, the electronic device changes (2718) a respective portion of the user-selected color selection affordance to the first color and displays (2718) the user-selected color selection affordance having focus. Prior to detecting the second input, the respective portion of the user-selected color affordance included one or more colors other than the first color. Displaying the first color within the user-selected color selection affordance provides a current color indication, thereby rendering unnecessary navigational and/or drawing inputs to the touch-sensitive surface of the electronic device in order to determine the current color. Reducing the number of inputs to the touch-sensitive surface of the electronic device makes the electronic device more efficient by extending the battery life and reducing wear-and-tear of the electronic device. As one example, in response to detecting the second input 2332 shown in FIG. 23O, the electronic device 100*b* displays the color corresponding to the second input 2332 in the enlarged center 2316 of user-selected color selection affordance 2306 as illustrated in FIG. 23P.

In some embodiments, prior to detecting the second input, a user-selected color has not been selected, and the respective portion of the user-selected color selection includes (2720) a plurality of different colors. By displaying a plurality of different colors, the color picker interface provides an efficient mechanism for a user to select a particular color, thus reducing the amount of user interaction to perform various color selection operations. The reduction in user interaction reduces wear-and-tear of the device. The reduction in user interaction also results in faster initiation of the performance of the color selection operations and, thus, reduces power drain to perform the color selection operations, increasing battery life of the device. As one example, with reference to FIG. 23A, the electronic device 100*b* displays the user-selected color selection affordance 2306 including four distinct patterns. One of ordinary skill in the art will appreciate that the user-selected color selection affordance may include any number of different colors (e.g., hues, shades, patterns, etc.), arranged in any matter.

In some embodiments, prior to detecting the second input, a second color has been selected as a user-selected color, and the respective portion of the user-selected color selection affordance includes (2722) the second color. Displaying the second color within the user-selected color selection affordance provides a current color indication, thereby rendering unnecessary navigational and/or drawing inputs to the touch-sensitive surface of the electronic device in order to determine the current color. Reducing the number of inputs to the touch-sensitive surface of the electronic device makes the electronic device more efficient by extending the battery life and reducing wear-and-tear of the electronic device. As one example, prior to detecting the second input 2340 shown in FIG. 23U, a second color (dark gray) was selected, as illustrated in FIG. 23O, and the electronic device 100*b* displays the selected second color at the center 2316 the user-selected color selection affordance 2306, as shown in FIGS. 23P-23U. One of ordinary skill in the art will appreciate that the selected color may be displayed in any manner within and/or bordering the user-selected color selection affordance.

In some embodiments, the electronic device detects (2724), on the touch-sensitive surface, a third input corresponding to a predefined color selection affordance. In response to detecting the third input, the electronic device assigns (2724) a color associated with the predefined color selection affordance as the active color and maintains (2724) display of the first color within the user-selected color selection affordance. Maintaining display of first color within the user-selected color selection affordance indicates the current color associated with the user-selected color selection affordance. Because the first color is being displayed, the number of inputs (e.g., navigational inputs) to the touch-sensitive surface of the electronic device related to determining the first color is reduced. Reducing the number of inputs to the touch-sensitive surface of the electronic device makes the electronic device more efficient by extending the battery life and reducing wear-and-tear of the electronic device. For example, the predefined color selection affordance corresponds to a standard (e.g., non-customized) color, such as red, blue, yellow, etc. In some embodiments, in response to detecting the third input, the electronic device moves focus from the user-selected color selection affordance to the predefined color selection affordance. As one example, in response to detecting an input 2322 corresponding to a predefined color (black) selection affordance, as shown in FIG. 23G, the electronic device 100*b* assigns black as the active color while maintaining display of the light gray color at the enlarged center 2316 of the user-selected color selection affordance 2306, as illustrated in FIG. 23H.

In some embodiments, while the color associated with the predefined color selection affordance is the active color, the electronic device detects (2726), on the touch-sensitive surface, a fourth input corresponding to the user-selected color selection affordance. In response to detecting the fourth input, in accordance with a determination that the fourth input corresponds to a first input type, the electronic device assigns the first color associated with the user-selected color selection affordance as the active color without displaying the color-picker user interface and, in accordance with a determination that the fourth input corresponds to a second input type that is different from the first input type, the electronic device displays, on the display, the color-picker user interface. Changing the active color without displaying the color-picker user interface reduces resource utilization at the electronic device. Reducing resource utilization at the electronic device makes the electronic device more efficient by extending the battery life of the electronic device. For example, the first input type corresponds to a standard input, such as a tap input, a dragging input, and/or the like. As another example, the second input type corresponds to a non-standard input type, such as a touch input with a duration exceeding a durational threshold or a force touch input with an intensity above an intensity threshold. As one example, in response to detecting an input 2328 corresponding to a first input type, as shown in FIG. 23K, the electronic device 100*b* changes the active color from black to light gray, as shown in FIG. 23L (focus moves to user-selected color selection affordance). As another example, in response to detecting an input 2330 corresponding to a second input type, as shown in FIG. 23M, the electronic device 100*b* displays the color-picker user interface 2312, as shown in FIG. 23N.

Turning to FIG. 27C, in some embodiments, after detecting the second input and while the color-picker user interface continues to be displayed on the display, the electronic device detects (2728) a third input that corresponds to movement of a touch across the touch-sensitive surface at a location that corresponds to a drawing region on the display. In response to detecting the third input, the electronic device draws a mark in the drawing region based on the movement of the touch, wherein the mark has a color that is based on the active color and ceases to display the color-picker user interface on the display. Ceasing to display the color-picker user interface reduces resource utilization at the electronic device. Reducing resource utilization at the electronic device makes the electronic device more efficient by extending the battery life of the electronic device. For example, the movement of a touch corresponds to a drawing operation. As one example, with reference to FIGS. 23V and 23W, the electronic device 100*b* ceases to display the color-picker user interface 2312, as shown in FIG. 23W, in response to detecting a third drawing input 2342 corresponding to a drawing operation on the canvas 2304.

In some embodiments, the electronic device detects (2730) a third input corresponding to the user-selected color selection affordance. In response to detecting the third input, in accordance with a determination that a respective user-selected color is associated with the user-selected color selection affordance, the electronic device assigns (2730) the respective user-selected color as the active color without displaying, on the display, the color-picker user interface and, in accordance with a determination that no user-selected color has been associated with the user selected-color selection affordance, the electronic device displays (2730), on the display, the color-picker user interface. Changing the active color without displaying the color-picker user interface reduces resource utilization at the electronic device. Reducing resource utilization at the electronic device makes the electronic device more efficient by extending the battery life of the electronic device. As one example, because light gray was previously associated with the user-selected color selection affordance 2306, the electronic device 100b assigns light gray as the active color without displaying the color-picker user interface, as illustrated in FIG. 23L. As another example, because no color was previously associated with the user-selected color selection affordance 2306, the electronic device 100b displays the color-picker user interface 2312, as illustrated in FIG. 23B.

Note that details of the processes described above with respect to method 2700 are also applicable in an analogous manner to other methods described herein (e.g., 1400, 1500, 1600, 1700, 1800, 1900, 2400, 2500, 2600). For example, the stylus, inputs, display, user interfaces, touch-sensitive surface, and communication interface described above with reference to method 2500 optionally have one or more of the properties of the stylus, inputs, display, user interfaces, touch-sensitive surface, and communication interface described herein with reference to other methods described herein (e.g., 1400, 1500, 1600, 1700, 1800, 1900, 2400, 2500, 2600).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device with one or more processors, a non-transitory memory, a display, a touch-sensitive surface, and a communication interface provided to communicate with a stylus:
in response to detecting that the stylus is proximate to the electronic device, pairing the electronic device with the stylus; and
in response to pairing the stylus with the electronic device:
displaying, on the display, a first representation of a first gesture performed on the stylus, wherein the first representation of the first gesture includes a representation of a finger input displayed on a representation of the stylus that is displayed on the display;
obtaining finger manipulation data from the stylus via the communication interface, wherein the finger manipulation data indicates a finger manipulation input received by the stylus; and
in response to obtaining the finger manipulation data, displaying, on the display, a second representation of a second gesture performed on the stylus corresponding to the finger manipulation input received by the stylus, wherein the second representation of the second gesture includes a representation of a finger input displayed on a representation of the stylus that is displayed on the display.

2. The method of claim 1, further comprising:
obtaining additional finger manipulation data from the stylus via the communication interface, wherein the additional finger manipulation data indicates a second finger manipulation input received by the stylus corresponding to a movement of a finger on the stylus; and
in response to obtaining the additional finger manipulation data, changing, on the display, the second representation of the second gesture performed on the stylus according to the second finger manipulation input.

3. The method of claim 1, wherein the stylus being proximate to the electronic device corresponds to the stylus not being in contact with the electronic device.

4. The method of claim 1, wherein the stylus being proximate to the electronic device corresponds to the stylus contacting the electronic device at a connection point on the electronic device.

5. The method of claim 1, wherein the first representation of the first gesture is predetermined.

6. The method of claim 1, further comprising detecting, on the touch-sensitive surface, one or more inputs corresponding to a request to select a particular tutorial, wherein the first representation of the first gesture is based on the particular tutorial.

7. The method of claim 1, wherein the first representation of the first gesture is displayed without user intervention.

8. The method of claim 1, further comprising:
obtaining, from the stylus via the communication interface, status information about one or more statuses of the stylus; and
in response to obtaining the status information, displaying, on the display, one or more status indicators indicating the one or more statuses of the stylus.

9. The method of claim 8, wherein the one or more status indicators include a battery level indicator.

10. The method of claim 8, wherein the one or more status indicators are displayed along a side of the display corresponding to a connection point on the electronic device at which the stylus is contacting.

11. The method of claim 8, further comprising:
determining whether or not the status information is indicative of an alert condition associated with the stylus; and
in response to determining that the status information is indicative of the alert condition, displaying, on the display, an alert message indicative of the alert condition.

12. The method of claim 1, wherein the first representation of the first gesture and the second representation of the second gesture are displayed within a tutorial interface that includes a canvas and a set of drawing tools.

13. The method of claim 12, further comprising:
in accordance with a determination that the finger manipulation data corresponds to a first type, moving focus to a particular drawing tool of the set of drawing tools; and in accordance with a determination that the finger manipulation data corresponds to a second type, changing a property of a drawing tool that currently has focus.

14. The method of claim 12, further comprising, in response to detecting a drawing input corresponding to the canvas, displaying a corresponding mark within the canvas according to a particular drawing tool of the set of tools that has focus.

15. The method of claim 1, wherein the second representation of the second gesture is displayed in response to determining that the finger manipulation input satisfies a gesture criterion.

16. An electronic device comprising:
   a touch-sensitive surface;
   a display;
   one or more processors;
   a non-transitory memory;
   a communication interface provided to communicate with a stylus; and
   one or more programs, wherein the one or more programs are stored in the non-transitory memory and configured to be executed by the one or more processors, the one or more programs including instructions for:
      in response to detecting that the stylus is proximate to the electronic device, pairing the electronic device with the stylus; and
      in response to pairing the stylus with the electronic device:
         displaying, on the display, a first representation of a first gesture performed on the stylus, wherein the first representation of the first gesture includes a representation of a finger input displayed on a representation of the stylus that is displayed on the display;
         obtaining finger manipulation data from the stylus via the communication interface, wherein the finger manipulation data indicates a finger manipulation input received by the stylus; and
         in response to obtaining the finger manipulation data, displaying, on the display, a second representation of a second gesture performed on the stylus corresponding to the finger manipulation input received by the stylus, wherein the second representation of the second gesture includes a representation of a finger input displayed on a representation of the stylus that is displayed on the display.

17. The electronic device of claim 16, wherein the one or more programs include additional instructions for:
   obtaining additional finger manipulation data from the stylus via the communication interface, wherein the additional finger manipulation data indicates a second finger manipulation input received by the stylus corresponding to a movement of a finger on the stylus; and
   in response to obtaining the additional finger manipulation data, changing, on the display, the second representation of the second gesture performed on the stylus according to the second finger manipulation input.

18. The electronic device of claim 16, wherein the one or more programs include additional instructions for:
   obtaining, from the stylus via the communication interface, status information about one or more statuses of the stylus; and
   in response to obtaining the status information, displaying, on the display, one or more status indicators indicating the one or more statuses of the stylus.

19. The electronic device of claim 16, wherein the first representation of the first gesture and the second representation of the second gesture are displayed within a tutorial interface that includes a canvas and a set of drawing tools.

20. A non-transitory computer readable storage medium storing one or more programs, the one or more programs comprising instructions, which, when executed by an electronic device with one or more processors, a touch-sensitive surface, a display, and a communication interface provided to communicate with a stylus, cause the electronic device to:
   in response to detecting that the stylus is proximate to the electronic device, pair the electronic device with the stylus; and
   in response to pairing the stylus with the electronic device:
      display, on the display, a first representation of a first gesture performed on the stylus, wherein the first representation of the first gesture includes a representation of a finger input displayed on a representation of the stylus that is displayed on the display;
      obtain finger manipulation data from the stylus via the communication interface, wherein the finger manipulation data indicates a finger manipulation input received by the stylus; and
      in response to obtaining the finger manipulation data, display, on the display, a second representation of a second gesture performed on the stylus corresponding to the finger manipulation input received by the stylus, wherein the second representation of the second gesture includes a representation of a finger input displayed on a representation of the stylus that is displayed on the display.

* * * * *